US012681993B2

(12) United States Patent
Stevens et al.

(10) Patent No.: US 12,681,993 B2
(45) Date of Patent: Jul. 14, 2026

(54) HIERARCHICAL, PARALLEL MODELS FOR EXTRACTING IN REAL TIME HIGH-VALUE INFORMATION FROM DATA STREAMS AND SYSTEM AND METHOD FOR CREATION OF SAME

(71) Applicant: Target Brands, Inc., Minneapolis, MN (US)

(72) Inventors: Luis F. Stevens, San Jose, CA (US); John Skolfield, San Jose, CA (US); Vince Schiavone, Berwyn, PA (US); Steve Weissinger, San Jose, CA (US); George Tretyakov, Campbell, CA (US); Ryan Mammina, San Jose, CA (US); Mo Malakiman, San Jose, CA (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/643,602

(22) Filed: Apr. 23, 2024

(65) Prior Publication Data

US 2024/0273143 A1    Aug. 15, 2024

Related U.S. Application Data

(63) Continuation of application No. 17/835,428, filed on Jun. 8, 2022, now abandoned, which is a continuation
(Continued)

(51) Int. Cl.
*G06F 16/903* (2019.01)
*G06F 16/2455* (2019.01)
(Continued)

(52) U.S. Cl.
CPC .. *G06F 16/90335* (2019.01); *G06F 16/24568* (2019.01); *G06F 40/237* (2020.01); *G06F 40/284* (2020.01); *G06F 40/30* (2020.01)

(58) Field of Classification Search
None
See application file for complete search history.

(56) References Cited

U.S. PATENT DOCUMENTS

| 5,873,081 A | 2/1999 | Harel |
| 5,913,038 A | 6/1999 | Griffiths |

(Continued)

FOREIGN PATENT DOCUMENTS

| EP | 1462950 A1 | 9/2004 |
| WO | 2017091774 A1 | 6/2017 |

OTHER PUBLICATIONS

Extended European Search Report for 18897650.0 mailed Feb. 8, 2022, 8pgs.

(Continued)

*Primary Examiner* — Augustine K. Obisesan
(74) *Attorney, Agent, or Firm* — Merchant & Gould, P.C.

(57) ABSTRACT

A method includes receiving a first post from an electronic source including first content; determining a source identifier; determining an attribute for the source by broadcasting the first post to a first plurality of filter graph definitions configured to identify attributes of sources according to the respective filter graph definition; and storing in memory, as a source profile identified by the source identifier for the source, the attribute for the source; receiving a second post from the source including second content; determining a source identifier; using the source identifier, querying the memory to access the source profile; correlating the second post with attributes of the source stored in the source profile to produce a correlated second post; and broadcasting the correlated second post to a second plurality of filter graph
(Continued)

definitions configured to identify posts with high value information according to the respective filter graph definition.

20 Claims, 131 Drawing Sheets

Related U.S. Application Data of application No. 16/917,447, filed on Jun. 30, 2020, now Pat. No. 11,366,859, which is a continuation of application No. PCT/US2018/068047, filed on Dec. 28, 2018.

(60) Provisional application No. 62/612,432, filed on Dec. 30, 2017.

(51) Int. Cl.
    *G06F 40/237* (2020.01)
    *G06F 40/284* (2020.01)
    *G06F 40/30* (2020.01)

(56) References Cited

U.S. PATENT DOCUMENTS

| | | | |
|---|---|---|---|
| 5,920,876 A | 7/1999 | Ungar et al. | |
| 6,233,652 B1 | 5/2001 | Mathews et al. | |
| 6,859,807 B1 | 2/2005 | Knight et al. | |
| 7,188,168 B1 | 3/2007 | Liao | |
| 7,277,885 B2 | 10/2007 | Eppley et al. | |
| 7,346,753 B2 | 3/2008 | Chase et al. | |
| 7,792,846 B1 | 9/2010 | Raffill et al. | |
| 8,370,460 B1 | 2/2013 | Khakpour et al. | |
| 8,407,217 B1 | 3/2013 | Zhang | |
| 8,504,579 B1 | 8/2013 | Broekhuijsen | |
| 8,909,643 B2 | 12/2014 | Ankan et al. | |
| 9,047,283 B1 | 6/2015 | Zhang et al. | |
| 9,317,593 B2 | 4/2016 | Marvit et al. | |
| 9,498,983 B1 | 11/2016 | Goto | |
| 9,553,922 B1 | 1/2017 | Guarraci et al. | |
| 2002/0099861 A1 | 7/2002 | Miller et al. | |
| 2002/0099870 A1 | 7/2002 | Miller et al. | |
| 2004/0039786 A1 | 2/2004 | Horvitz et al. | |
| 2004/0042470 A1 | 3/2004 | Cooper et al. | |
| 2004/0078779 A1 | 4/2004 | Dutt et al. | |
| 2004/0107227 A1 | 6/2004 | Michael | |
| 2005/0080792 A1 | 4/2005 | Ghatare | |
| 2005/0114700 A1 | 5/2005 | Barrie et al. | |
| 2005/0138092 A1 | 6/2005 | Abuaiadh et al. | |
| 2005/0249080 A1* | 11/2005 | Foote | G06F 16/639 |
| 2006/0069872 A1 | 3/2006 | Bouchard et al. | |
| 2006/0107216 A1* | 5/2006 | Cooper | G06F 16/7847 |
| | | | 382/173 |
| 2006/0155920 A1 | 7/2006 | Smith et al. | |
| 2006/0155922 A1 | 7/2006 | Gorobets et al. | |
| 2007/0043565 A1* | 2/2007 | Aggarwal | G10L 15/063 |
| | | | 704/245 |
| 2007/0143326 A1 | 6/2007 | Chase et al. | |
| 2008/0162547 A1 | 7/2008 | Bonev et al. | |
| 2008/0319746 A1 | 12/2008 | Okamoto et al. | |
| 2009/0037350 A1 | 2/2009 | Rudat | |
| 2009/0097413 A1 | 4/2009 | Todd et al. | |
| 2009/0132553 A1 | 5/2009 | Kohn et al. | |
| 2009/0204610 A1 | 8/2009 | Hellstrom et al. | |
| 2009/0327377 A1 | 12/2009 | Ylonen | |
| 2010/0191772 A1 | 7/2010 | Brown et al. | |
| 2010/0191773 A1 | 7/2010 | Stefik et al. | |
| 2010/0262684 A1 | 10/2010 | Valois et al. | |
| 2011/0047166 A1 | 2/2011 | Stading et al. | |
| 2011/0078167 A1 | 3/2011 | Sundaresan et al. | |
| 2011/0154236 A1 | 6/2011 | Stoeck et al. | |
| 2011/0202555 A1 | 8/2011 | Cordover et al. | |
| 2011/0246457 A1 | 10/2011 | Dong et al. | |
| 2011/0246485 A1 | 10/2011 | Rinearson et al. | |
| 2011/0302124 A1 | 12/2011 | Cai et al. | |
| 2011/0302162 A1 | 12/2011 | Xiao et al. | |
| 2011/0302551 A1 | 12/2011 | Hummel, Jr. | |
| 2012/0078918 A1 | 3/2012 | Somasundaran et al. | |
| 2012/0102021 A1 | 4/2012 | Hill et al. | |
| 2012/0117533 A1 | 5/2012 | Hatcherson et al. | |
| 2012/0197980 A1 | 8/2012 | Terleski et al. | |
| 2012/0246097 A1 | 9/2012 | Jain et al. | |
| 2012/0278477 A1 | 11/2012 | Terrell et al. | |
| 2013/0081056 A1 | 3/2013 | Hu et al. | |
| 2013/0124504 A1 | 5/2013 | Haugen et al. | |
| 2013/0212095 A1 | 8/2013 | Barad et al. | |
| 2013/0268534 A1 | 10/2013 | Mathew et al. | |
| 2013/0275656 A1 | 10/2013 | Talagala et al. | |
| 2013/0282765 A1 | 10/2013 | Bhattacharjee et al. | |
| 2013/0291007 A1 | 10/2013 | Shimy et al. | |
| 2013/0325862 A1* | 12/2013 | Black | G06F 16/285 |
| | | | 707/E17.089 |
| 2014/0032579 A1* | 1/2014 | Merriman | G06F 16/258 |
| | | | 707/756 |
| 2014/0078887 A1 | 3/2014 | Yu et al. | |
| 2014/0280168 A1 | 9/2014 | Setayesh et al. | |
| 2014/0297652 A1 | 10/2014 | Stevens et al. | |
| 2014/0297664 A1 | 10/2014 | Stevens et al. | |
| 2014/0297665 A1 | 10/2014 | Stevens et al. | |
| 2015/0032448 A1 | 1/2015 | Wasserblat et al. | |
| 2015/0248476 A1 | 9/2015 | Weissinger et al. | |
| 2016/0282394 A1 | 9/2016 | House et al. | |
| 2017/0075990 A1* | 3/2017 | Leu | G06F 11/3409 |
| 2017/0168751 A1 | 6/2017 | Stevens et al. | |
| 2017/0255536 A1 | 9/2017 | Weissinger et al. | |
| 2020/0311384 A1* | 10/2020 | Thompson | G06V 20/698 |

OTHER PUBLICATIONS

Detection and Reaction to Contextual Information based on analysis of a Live Data Stream (Year: 2010).
Akuda Labs LLC, International Search Report and Written Opinion, PCT/US2014/029759, May 29, 2015, 17 pages.
Akuda Labs LLC, International Preliminary report on Patentability, PCT/US2014/029759, Sep. 15, 2015, 12 pgs.
Akuda Labs, LLC, International Search Report and Written Opinion, PCT/US2015/026252, Jul. 31, 2015, 10 pgs.
Akuda Labs LLC, International Preliminary Report on Patentability, PCT/US2015/026252, Oct. 18, 2016, 8 pgs.
Akuda Labs LLC, International Search Report and Written Opinion, PCT/US2016/063678, Feb. 16, 2017, 6 pgs.
Akuda Labs LLC, International Preliminary Report on Patentability, PCT/US2016/063678, May 29, 2018, 5 pgs.
Akuda Labs LLC, Communication Pursuant to Rules 161(2) and 162, EP14730617.9, Oct. 30, 2015, 2 pgs.
Akuda Labs LLC, Extended European Search Report, EP14730617.9, Oct. 7, 2016, 8 pgs.
Akuda Labs LLC, Communication Pursuant to Rules 70(2) and 70a(2), EP14730617.9, Oct. 25, 2016, 1 pg.
Akuda Labs LLC, Communication Pursuant to Article 94(3), EP14730617.9, Aug. 10, 2018, 8 pqs.
UDA LLC, Extended European Search Report, EP15780371.9, dated Jan. 29, 2018, 6 pages.
UDA LLC, Communication Pursuant to Rules 70(2) and 70a(2), EP15780371.9, Feb. 16, 2018, 1 pg.
UDA LLC, Communication Pursuant Article 94-3, EP15780371.9, Nov. 26, 2018, 6 pgs.
Anastasiu et al., "Document Clustering: The Next Frontier," UMN-CS&E TR 13-004, Feb. 2013, 20 pgs.
Chen, Edwin, "What is a good explanation of Latent Dirichlet Allocation," Aug. 2011, Quora.com, printed on Jun. 25, 2017, 17 pgs.
Goldberg, "Introducing The Decision Model: A Business Logic Framework," Jan. 18, 2012, retrieved from http://WWW.irmac.ca/1112/The%20Decision%20Model%20for/o20irmac%202012_18_01.pdf?lbisphpreq=1, 82 pgs.
Park et al., "Topic Word Selection for Biogs by Topic Richness Using Web Search Result Clustering," In proceedings Df the 6th

(56) References Cited

OTHER PUBLICATIONS

International Conference on Ubiquitous Information Management and Communication, No. 80, 20-22, Feb. 2012, 6 pgs.

Stevens, Office Action, U.S. Appl. No. 14/214,410, filed Jan. 13, 2016, 14 pgs.

Stevens, Office Action, U.S. Appl. No. 14/214,443, filed Feb. 11, 2016, 11 pgs.

Stevens, Notice of Allowance, U.S. Appl. No. 14/214,443, filed Jun. 9, 2016, 11 pgs.

Stevens, Office Action, U.S. Appl. No. 14/214,490, filed Mar. 24, 2016, 11 pgs.

Stevens, Notice of Allowance, U.S. Appl. No. 14/214,490, filed Nov. 7, 2016, 11 pgs.

Stevens, Office Action, U.S. Appl. No. 15/360,934, filed Jan. 30, 2018, 7 pages.

Stevens, Notice of Allowance, U.S. Appl. No. 15/360,934, filed Jul. 24, 2018, 9 pgs.

Weissinger, Office Action, U.S. Appl. No. 14/688,865, filed Jun. 30, 2017, 18 pgs.

Weissinger, Final Office Action, U.S. Appl. No. 14/688,865, filed Jun. 19, 2018, 19 pgs.

Weissinger, Office Action, U.S. Appl. No. 15/530,187, filed Feb. 2, 2018, 12 pages.

International Search Report issued in PCT/US2016/068047, completed on Mar. 11, 2019 and mailed Mar. 27, 2019.

International Preliminary Report on Patentability and Written Opinion, issued in PCT/US2016/068047, issued Jun. 30, 2020.

* cited by examiner

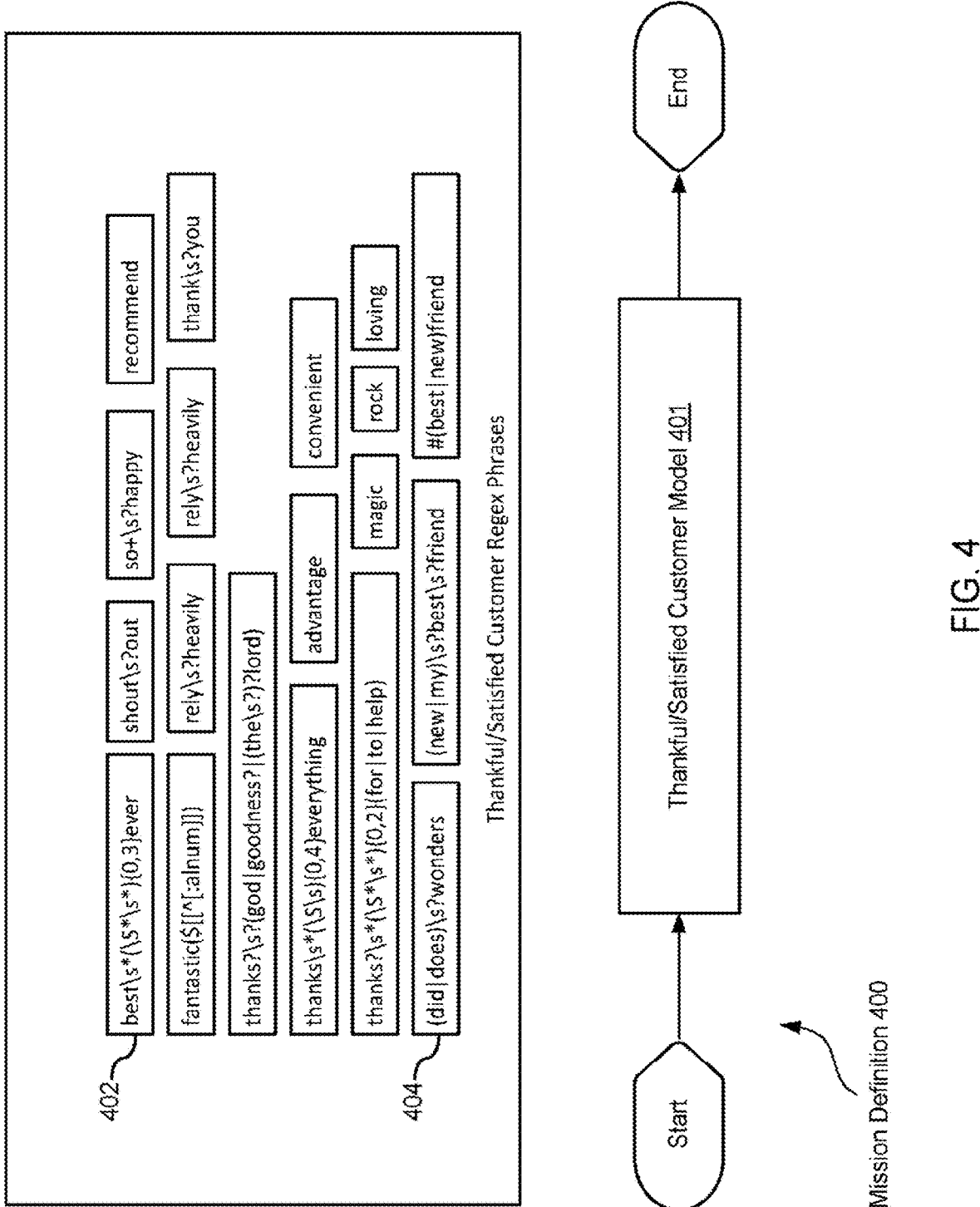

402 best\s*(\S*\s*){0,3}ever fantastic($|[^[:alnum:]])

thanks?\s?(god|goodness?|(the\s?)?lord)

thanks\s*(\S\s){0,4}everything thanks?\s*(\S*\s*){0,2}(for|to|help)

(did|does)\s?wonders shout\s?out rely\s?heavily advantage magic (new|my)\s?best\s?friend so+\s?happy rely\s?heavily convenient rock recommend thank\s?you loving

(best|new)friend

404

Thankful/Satisfied Customer Regex Phrases

Start

Thankful/Satisfied Customer Model 401

End

Mission Definition 400

FIG. 4

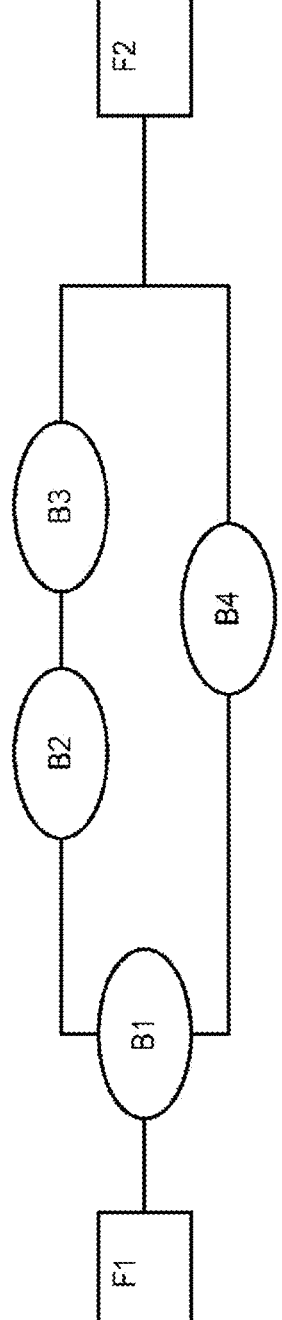
1600-1
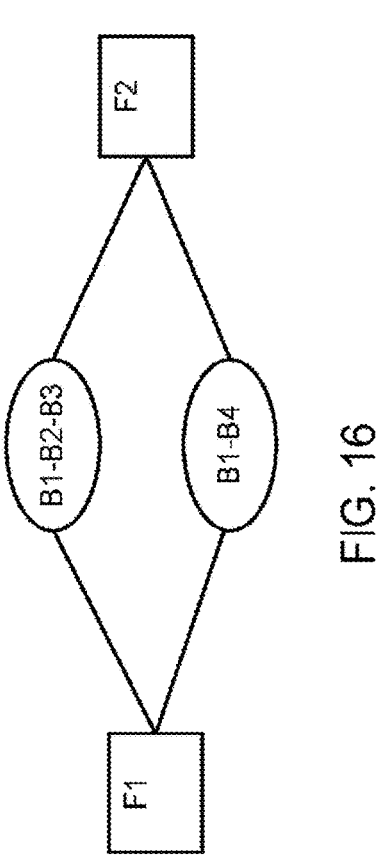
1600-2
FIG. 16

Figure 21:
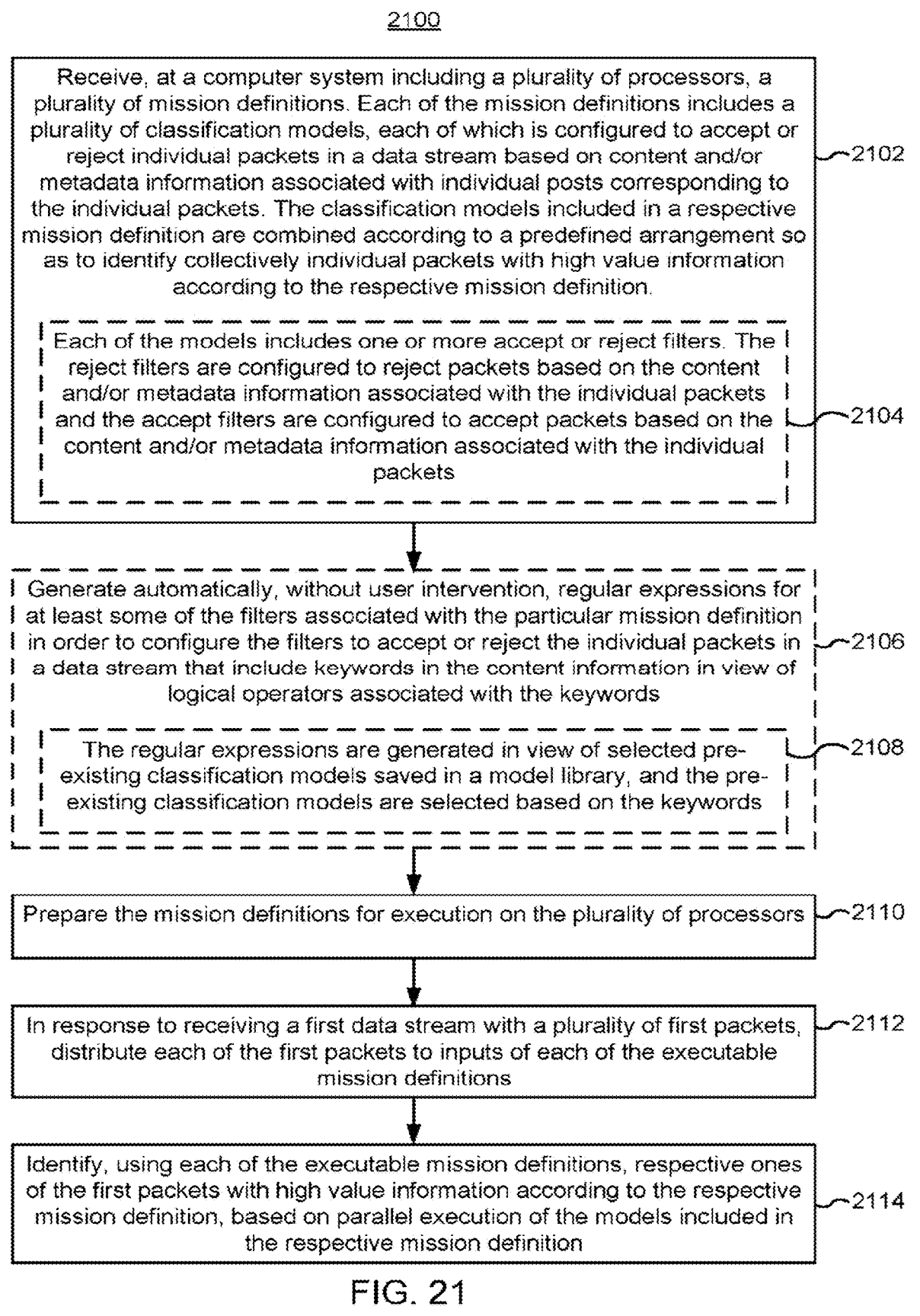

2100

Receive, at a computer system including a plurality of processors, a plurality of mission definitions. Each of the mission definitions includes a plurality of classification models, each of which is configured to accept or reject individual packets in a data stream based on content and/or metadata information associated with individual posts corresponding to the individual packets. The classification models included in a respective mission definition are combined according to a predefined arrangement so as to identify collectively individual packets with high value information according to the respective mission definition. —2102

Each of the models includes one or more accept or reject filters. The reject filters are configured to reject packets based on the content and/or metadata information associated with the individual packets and the accept filters are configured to accept packets based on the content and/or metadata information associated with the individual packets —2104

Generate automatically, without user intervention, regular expressions for at least some of the filters associated with the particular mission definition in order to configure the filters to accept or reject the individual packets in a data stream that include keywords in the content information in view of logical operators associated with the keywords —2106

The regular expressions are generated in view of selected pre-existing classification models saved in a model library, and the pre-existing classification models are selected based on the keywords —2108

Prepare the mission definitions for execution on the plurality of processors —2110

In response to receiving a first data stream with a plurality of first packets, distribute each of the first packets to inputs of each of the executable mission definitions —2112

Identify, using each of the executable mission definitions, respective ones of the first packets with high value information according to the respective mission definition, based on parallel execution of the models included in the respective mission definition —2114

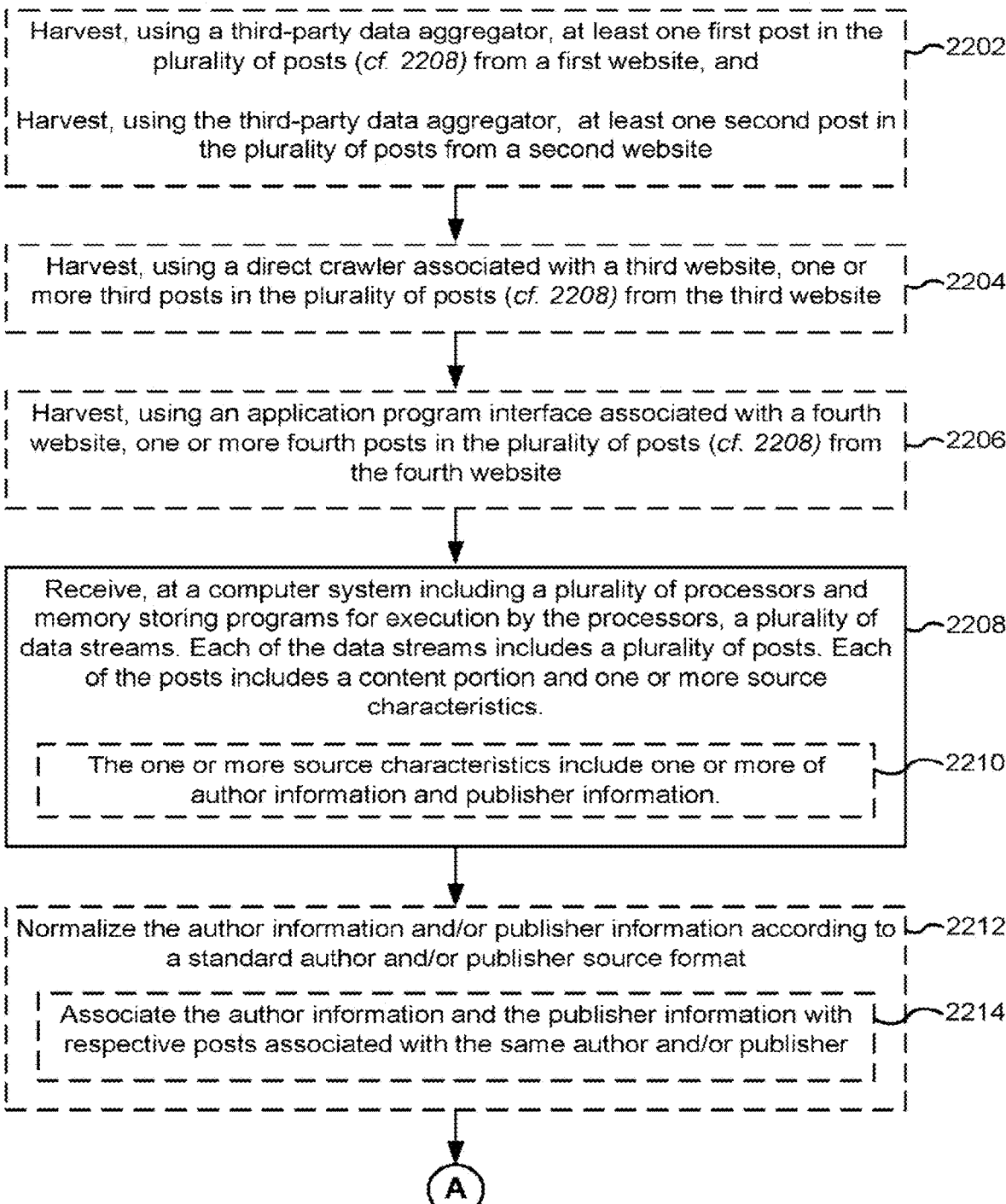

Harvest, using a third-party data aggregator, at least one first post in the plurality of posts (cf. 2208) from a first website, and Harvest, using the third-party data aggregator, at least one second post in the plurality of posts from a second website
2202

Harvest, using a direct crawler associated with a third website, one or more third posts in the plurality of posts (cf. 2208) from the third website
2204

Harvest, using an application program interface associated with a fourth website, one or more fourth posts in the plurality of posts (cf. 2208) from the fourth website
2206

Receive, at a computer system including a plurality of processors and memory storing programs for execution by the processors, a plurality of data streams. Each of the data streams includes a plurality of posts. Each of the posts includes a content portion and one or more source characteristics.
2208

The one or more source characteristics include one or more of author information and publisher information.
2210

Normalize the author information and/or publisher information according to a standard author and/or publisher source format
2212

Associate the author information and the publisher information with respective posts associated with the same author and/or publisher
2214

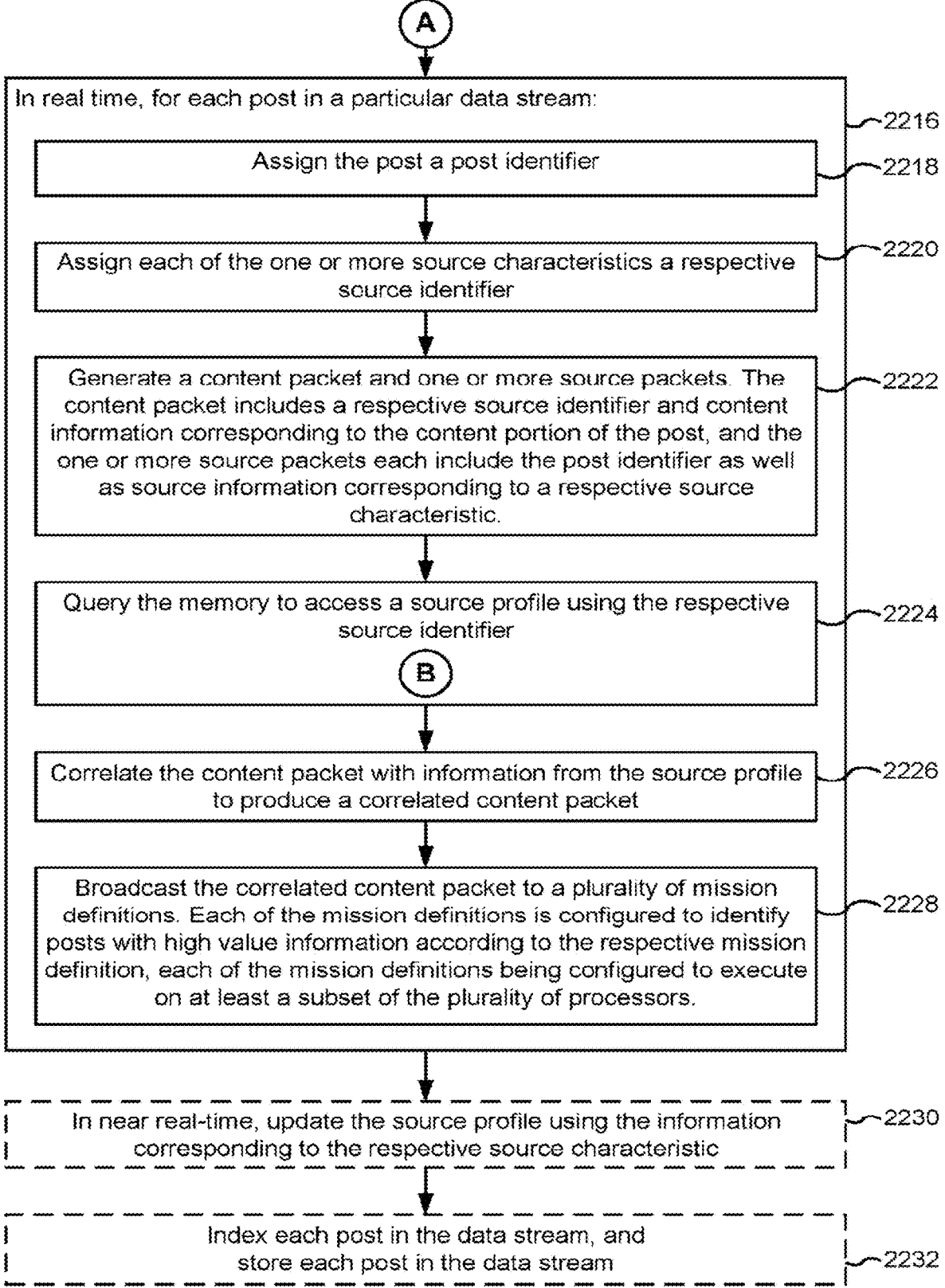

In real time, for each post in a particular data stream:    2216

Assign the post a post identifier    2218

Assign each of the one or more source characteristics a respective source identifier    2220

Generate a content packet and one or more source packets. The content packet includes a respective source identifier and content information corresponding to the content portion of the post, and the one or more source packets each include the post identifier as well as source information corresponding to a respective source characteristic.    2222

Query the memory to access a source profile using the respective source identifier    2224

B

Correlate the content packet with information from the source profile to produce a correlated content packet    2226

Broadcast the correlated content packet to a plurality of mission definitions. Each of the mission definitions is configured to identify posts with high value information according to the respective mission definition, each of the mission definitions being configured to execute on at least a subset of the plurality of processors.    2228

In near real-time, update the source profile using the information corresponding to the respective source characteristic    2230

Index each post in the data stream, and store each post in the data stream    2232

FIG. 22B

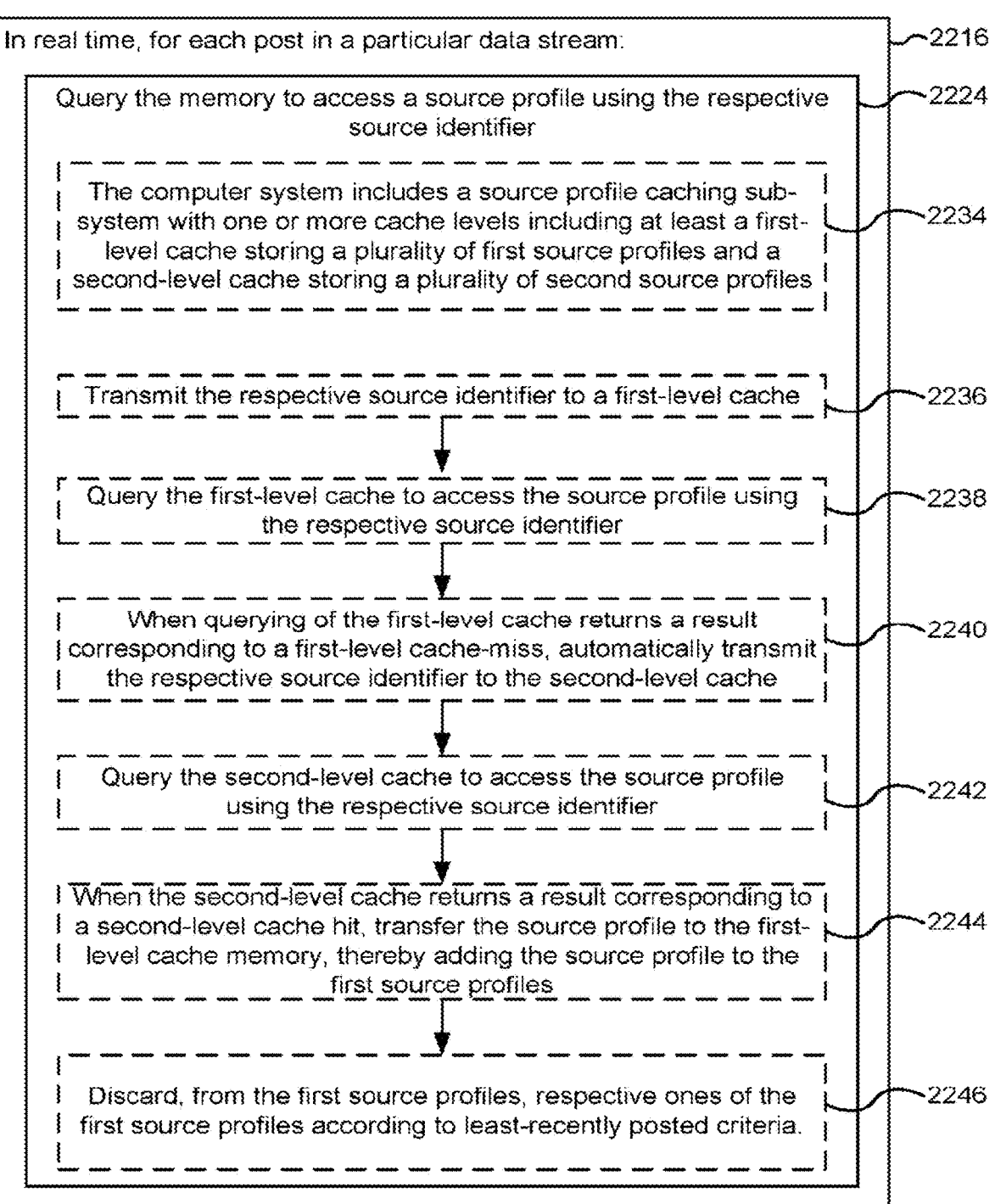

In real time, for each post in a particular data stream:    ⟩2216

Query the memory to access a source profile using the respective source identifier    ⟩2224

The computer system includes a source profile caching subsystem with one or more cache levels including at least a first-level cache storing a plurality of first source profiles and a second-level cache storing a plurality of second source profiles    ⟩2234

Transmit the respective source identifier to a first-level cache    ⟩2236

Query the first-level cache to access the source profile using the respective source identifier    ⟩2238

When querying of the first-level cache returns a result corresponding to a first-level cache-miss, automatically transmit the respective source identifier to the second-level cache    ⟩2240

Query the second-level cache to access the source profile using the respective source identifier    ⟩2242

When the second-level cache returns a result corresponding to a second-level cache hit, transfer the source profile to the first-level cache memory, thereby adding the source profile to the first source profiles    ⟩2244

Discard, from the first source profiles, respective ones of the first source profiles according to least-recently posted criteria.    ⟩2246

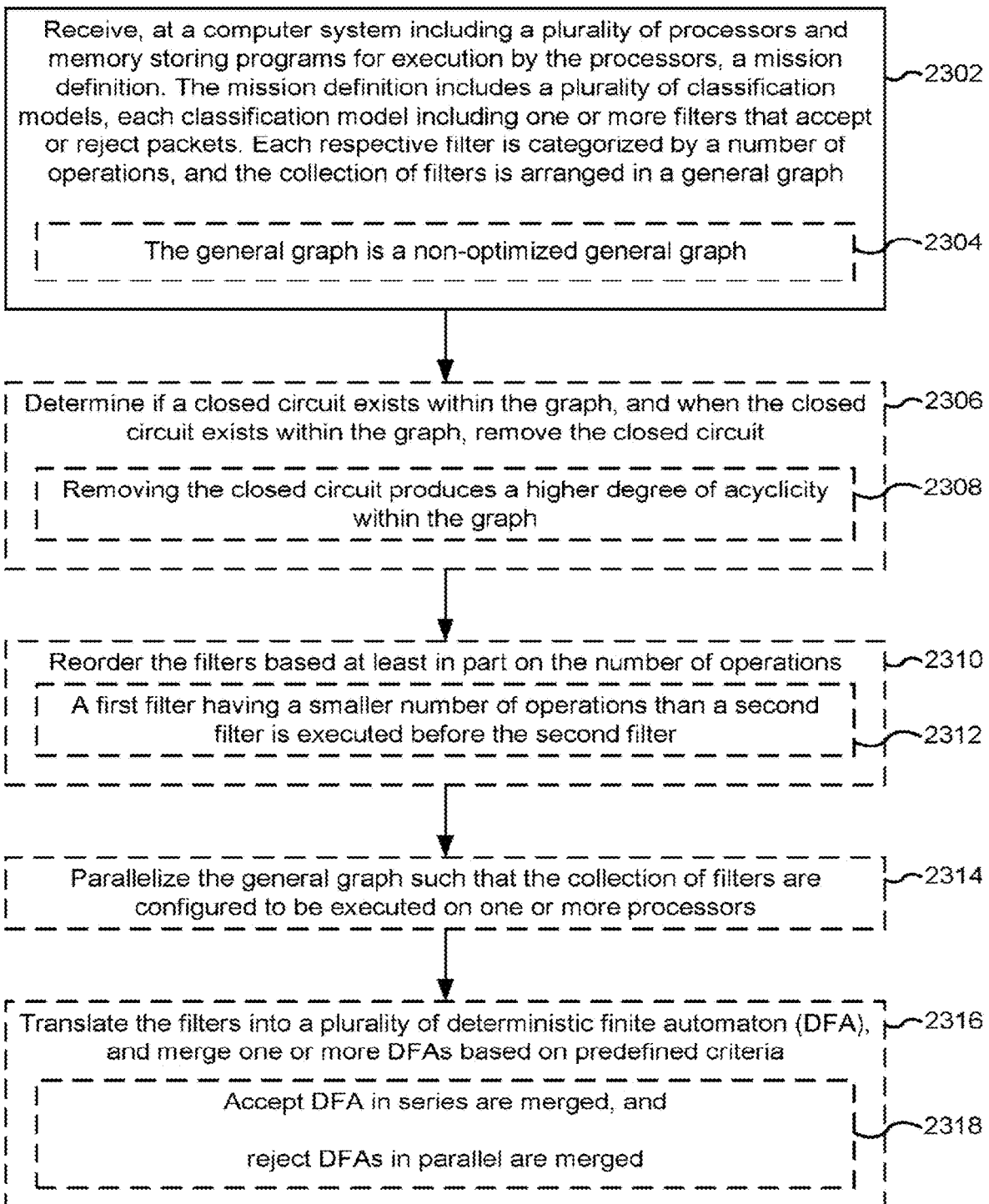

Receive, at a computer system including a plurality of processors and memory storing programs for execution by the processors, a mission definition. The mission definition includes a plurality of classification models, each classification model including one or more filters that accept or reject packets. Each respective filter is categorized by a number of operations, and the collection of filters is arranged in a general graph ⌐2302

The general graph is a non-optimized general graph ⌐2304

Determine if a closed circuit exists within the graph, and when the closed circuit exists within the graph, remove the closed circuit ⌐2306

Removing the closed circuit produces a higher degree of acyclicity within the graph ⌐2308

Reorder the filters based at least in part on the number of operations ⌐2310

A first filter having a smaller number of operations than a second filter is executed before the second filter ⌐2312

Parallelize the general graph such that the collection of filters are configured to be executed on one or more processors ⌐2314

Translate the filters into a plurality of deterministic finite automaton (DFA), and merge one or more DFAs based on predefined criteria ⌐2316

Accept DFA in series are merged, and reject DFAs in parallel are merged ⌐2318

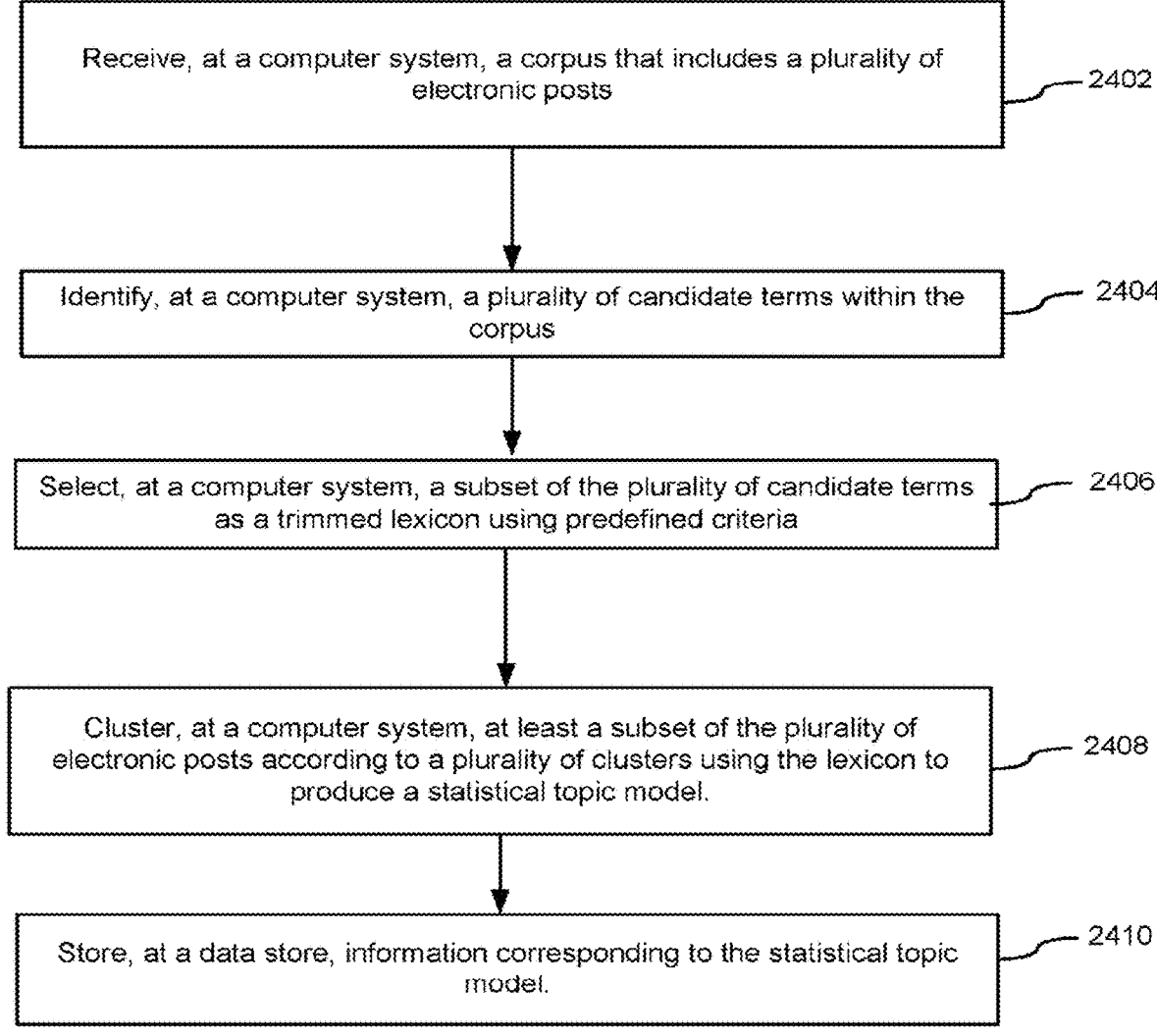

Receive, at a computer system, a corpus that includes a plurality of electronic posts — 2402

Identify, at a computer system, a plurality of candidate terms within the corpus — 2404

Select, at a computer system, a subset of the plurality of candidate terms as a trimmed lexicon using predefined criteria — 2406

Cluster, at a computer system, at least a subset of the plurality of electronic posts according to a plurality of clusters using the lexicon to produce a statistical topic model. — 2408

Store, at a data store, information corresponding to the statistical topic model. — 2410

FIG. 24

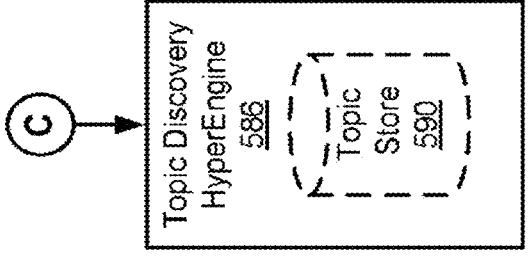
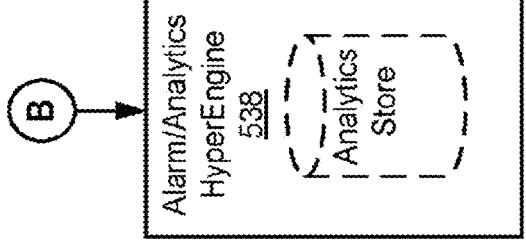
FIG. 25C

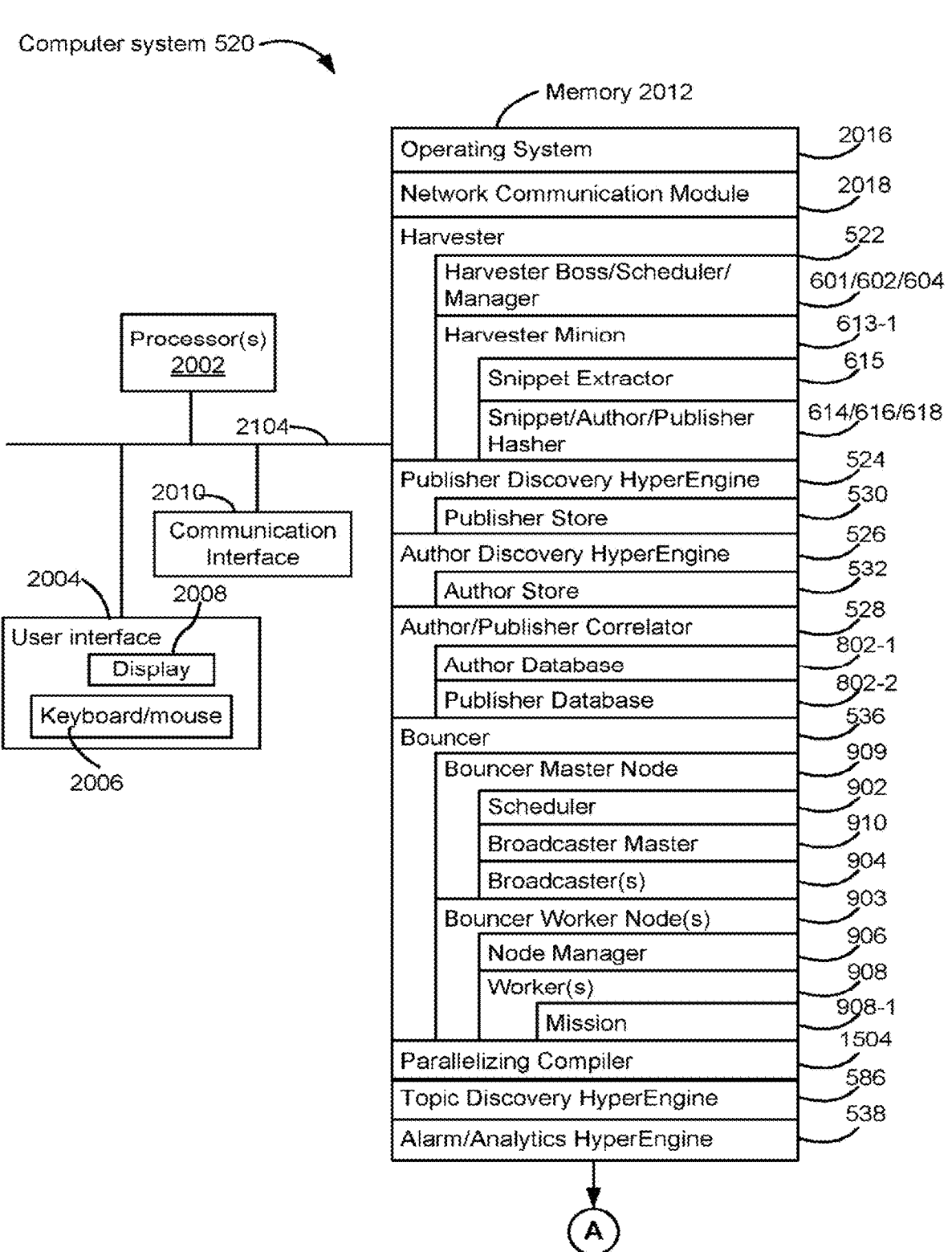

Computer system 520

Memory 2012

| | |
|---|---|
| Operating System | 2016 |
| Network Communication Module | 2018 |
| Harvester | 522 |
|     Harvester Boss/Scheduler/ Manager | 601/602/604 |
|     Harvester Minion | 613-1 |
|         Snippet Extractor | 615 |
|         Snippet/Author/Publisher Hasher | 614/616/618 |
| Publisher Discovery HyperEngine | 524 |
|     Publisher Store | 530 |
| Author Discovery HyperEngine | 526 |
|     Author Store | 532 |
| Author/Publisher Correlator | 528 |
|     Author Database | 802-1 |
|     Publisher Database | 802-2 |
| Bouncer | 536 |
|     Bouncer Master Node | 909 |
|         Scheduler | 902 |
|         Broadcaster Master | 910 |
|         Broadcaster(s) | 904 |
|     Bouncer Worker Node(s) | 903 |
|         Node Manager | 906 |
|         Worker(s) | 908 |
|             Mission | 908-1 |
| Parallelizing Compiler | 1504 |
| Topic Discovery HyperEngine | 586 |
| Alarm/Analytics HyperEngine | 538 |

Processor(s) 2002

2104

2010

Communication Interface

2008

2004

User interface

Display

Keyboard/mouse

Computer system 520

AD01-900

In non-real-time with receiving the data stream and in parallel with the real-time monitoring process: identify, using the second filter, respective packets of the at least second subset of the plurality of packets as relevant to the subject ⎯AD01-914

Index and store, with a second version number that is different from the first version number, the respective packets identified by the second filter as relevant to the subject ⎯AD01-915

The non-real-time retrieving, distributing, and identifying are performed in response to a user request to filter packets according to the second filter ⎯AD01-916

The first filter is an executable instance of a first filter definition and the second filter is an executable instance of a second filter definition different from the first filter definition ⎯AD01-918

The first relevance criteria and the second relevance criteria are distinct relevance criteria ⎯AD01-920

The second subset of the plurality of packets comprises the respective packets identified, using the first filter, as relevant to the subject ⎯AD01-922

The second subset of the plurality of packets and the first subset of the plurality of packets have one or more packets in common ⎯AD01-924

The second filter definition is a modified version of the first filter definition ⎯AD01-926

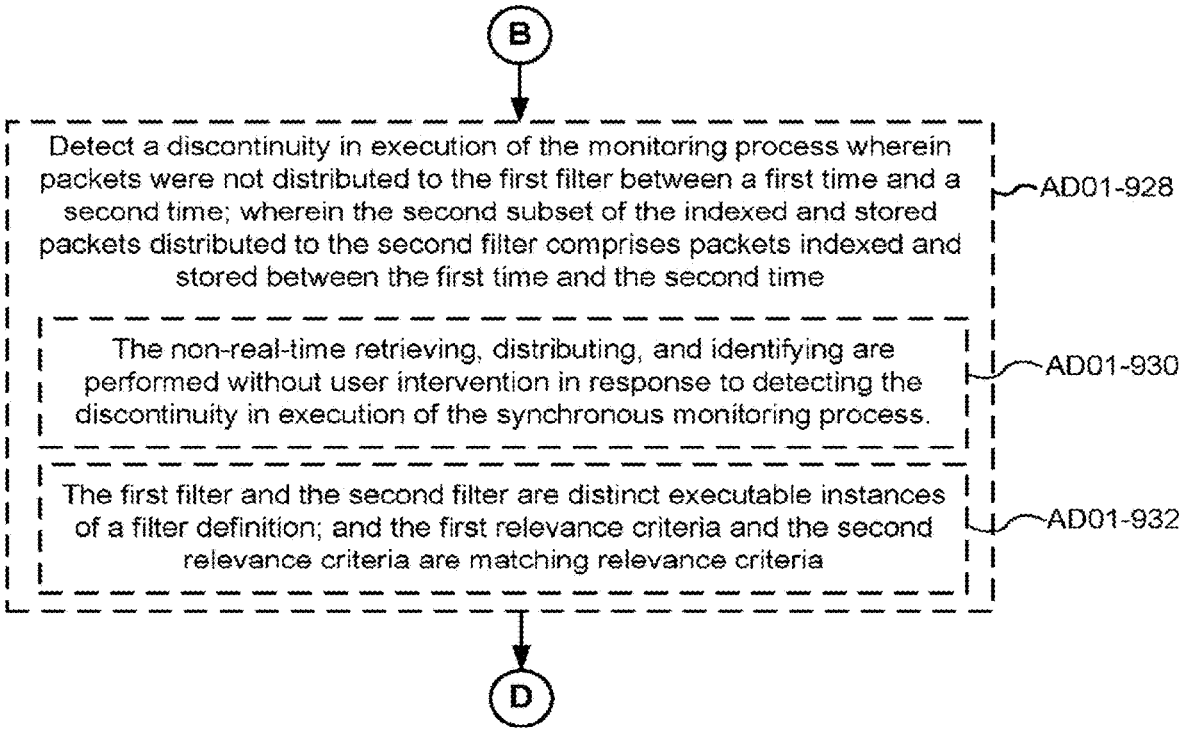

B

Detect a discontinuity in execution of the monitoring process wherein packets were not distributed to the first filter between a first time and a second time; wherein the second subset of the indexed and stored packets distributed to the second filter comprises packets indexed and stored between the first time and the second time — AD01-928

The non-real-time retrieving, distributing, and identifying are performed without user intervention in response to detecting the discontinuity in execution of the synchronous monitoring process. — AD01-930

The first filter and the second filter are distinct executable instances of a filter definition; and the first relevance criteria and the second relevance criteria are matching relevance criteria — AD01-932

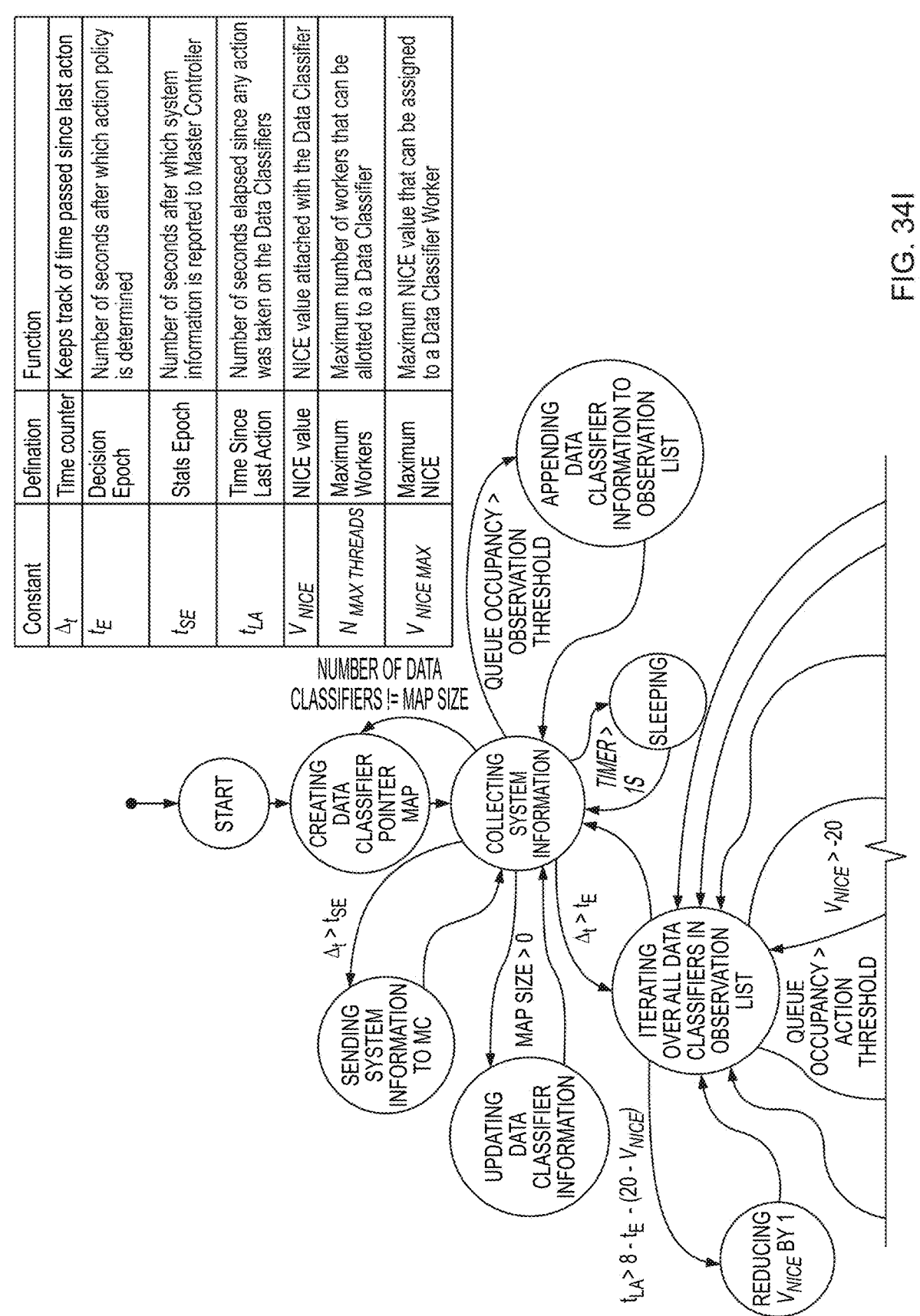

| Constant | Definition | Function |
|---|---|---|
| $\Delta_t$ | Time counter | Keeps track of time passed since last action |
| $t_E$ | Decision Epoch | Number of seconds after which action policy is determined |
| $t_{SE}$ | Stats Epoch | Number of seconds after which system information is reported to Master Controller |
| $t_{LA}$ | Time Since Last Action | Number of seconds elapsed since any action was taken on the Data Classifiers |
| $V_{NICE}$ | NICE value | NICE value attached with the Data Classifier |
| $N_{MAX\ THREADS}$ | Maximum Workers | Maximum number of workers that can be allotted to a Data Classifier |
| $V_{NICE\ MAX}$ | Maximum NICE | Maximum NICE value that can be assigned to a Data Classifier Worker |

FIG. 341

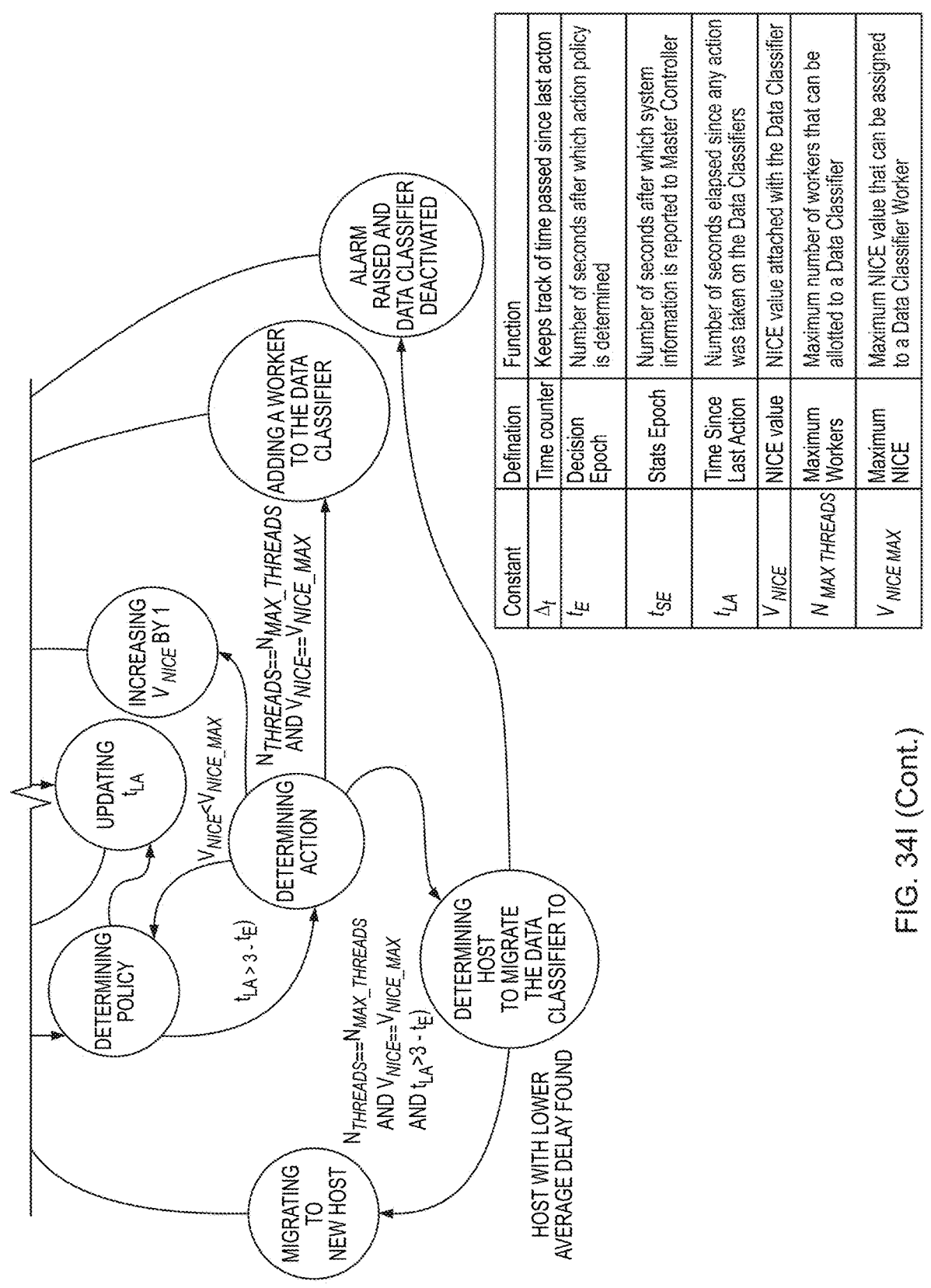

| Constant | Defination | Function |
|---|---|---|
| $\Delta_t$ | Time counter | Keeps track of time passed since last acton |
| $t_E$ | Decision Epoch | Number of seconds after which action policy is determined |
| $t_{SE}$ | Stats Epoch | Number of seconds after which system information is reported to Master Controller |
| $t_{LA}$ | Time Since Last Action | Number of seconds elapsed since any action was taken on the Data Classifiers |
| $V_{NICE}$ | NICE value | NICE value attached with the Data Classifier |
| $N_{MAX\ THREADS}$ | Maximum Workers | Maximum number of workers that can be allotted to a Data Classifier |
| $V_{NICE\ MAX}$ | Maximum NICE | Maximum NICE value that can be assigned to a Data Classifier Worker |

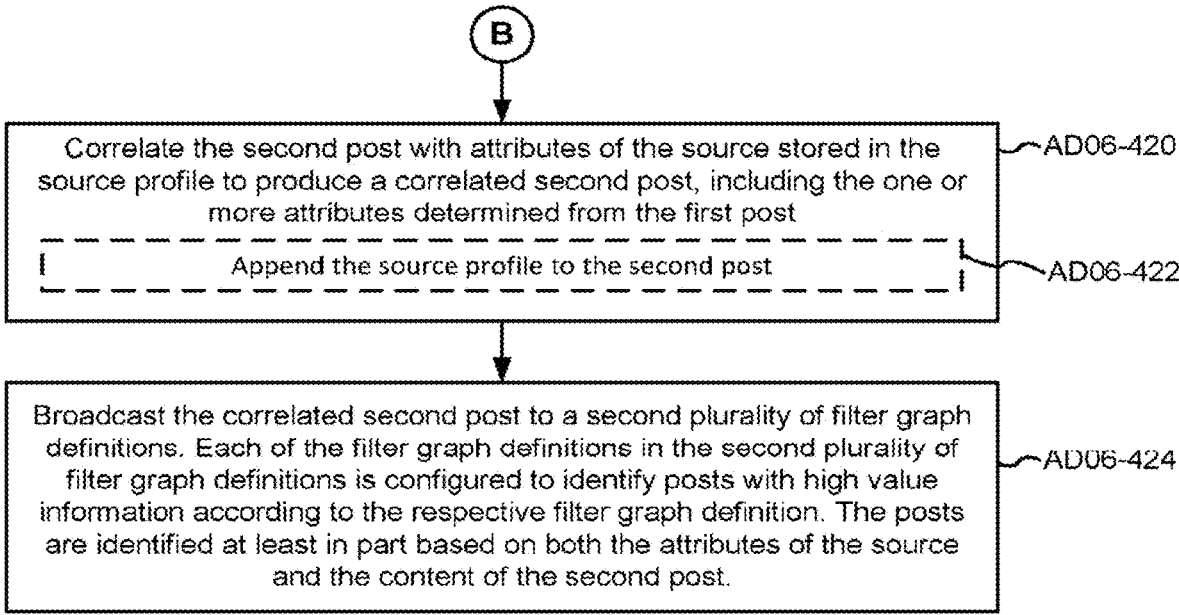

Correlate the second post with attributes of the source stored in the source profile to produce a correlated second post, including the one or more attributes determined from the first post     AD06-420

Append the source profile to the second post     AD06-422

Broadcast the correlated second post to a second plurality of filter graph definitions. Each of the filter graph definitions in the second plurality of filter graph definitions is configured to identify posts with high value information according to the respective filter graph definition. The posts are identified at least in part based on both the attributes of the source and the content of the second post.     AD06-424

FIG. 38B

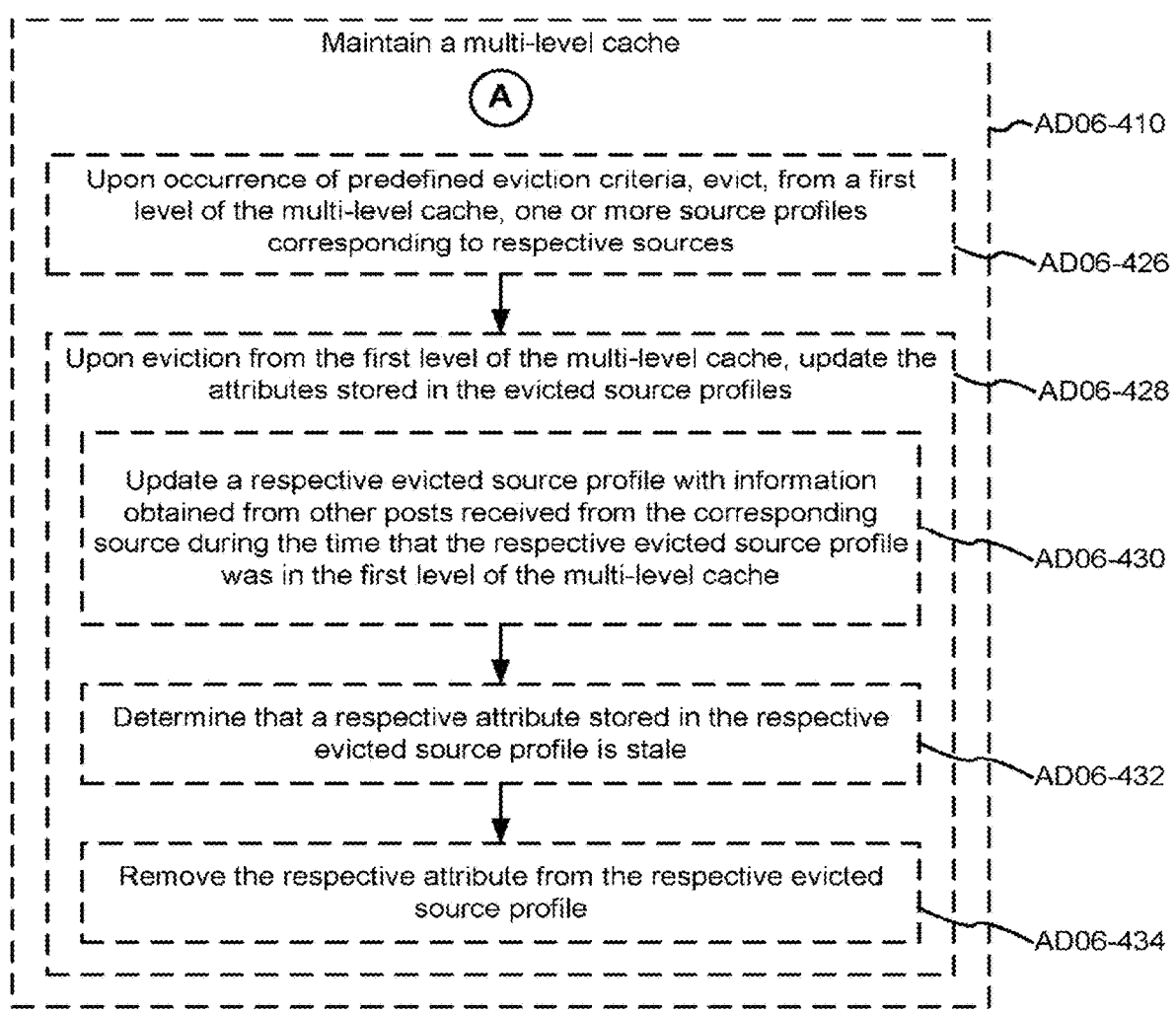

Maintain a multi-level cache

A

AD06-410

Upon occurrence of predefined eviction criteria, evict, from a first level of the multi-level cache, one or more source profiles corresponding to respective sources

AD06-426

Upon eviction from the first level of the multi-level cache, update the attributes stored in the evicted source profiles

AD06-428

Update a respective evicted source profile with information obtained from other posts received from the corresponding source during the time that the respective evicted source profile was in the first level of the multi-level cache

AD06-430

Determine that a respective attribute stored in the respective evicted source profile is stale

AD06-432

Remove the respective attribute from the respective evicted source profile

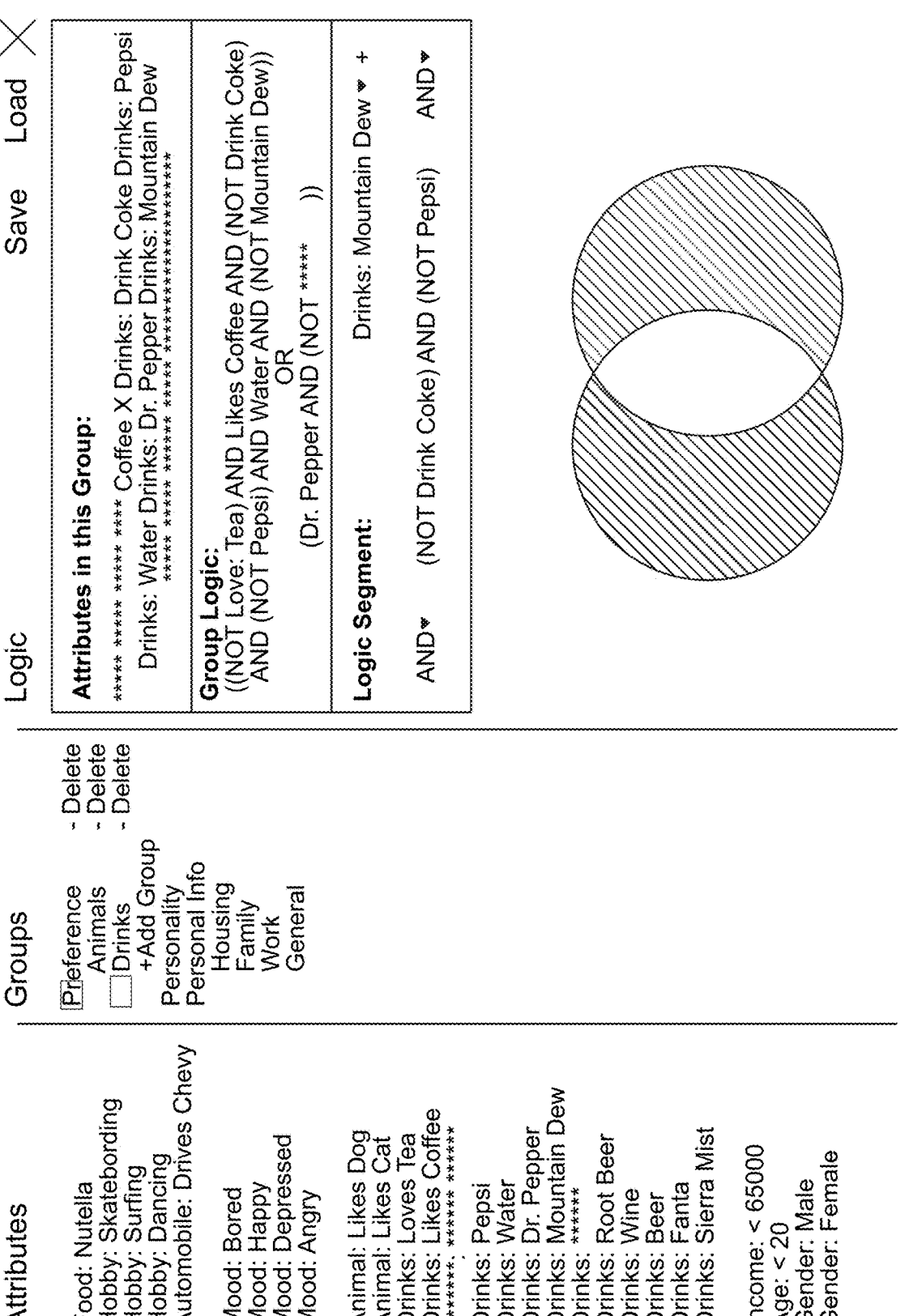

FIG. 39L

Attributes

Food: Nutella
Hobby: Skateboarding
Hobby: Surfing
Hobby: Dancing
Automobile: Drives Chevy Mood: Bored
Mood: Happy
Mood: Depressed
Mood: Angry Animal: Likes Dog
Animal: Likes Cat
Drinks: Loves Tea
Drinks: Likes Coffee
****, ** ****

Drinks: Pepsi
Drinks: Water
Drinks: Dr. Pepper
Drinks: Mountain Dew
Drinks: ******
Drinks: Root Beer
Drinks: Wine
Drinks: Beer
Drinks: Fanta
Drinks: Sierra Mist Income: < 65000
Age: < 20
Gender: Male
Gender: Female Groups ☑Preference    - Delete
Animals    - Delete
☐Drinks    - Delete
+Add Group
Personality
Personal Info
Housing
Family
Work
General Logic      Save    Load ✕

Attributes in this Group:

*** * * ** Coffee X Drinks: Drink Coke Drinks: Pepsi
Drinks: Water Drinks: Dr. Pepper Drinks: Mountain Dew
*** * ** * * ******************

Group Logic:
((NOT Love: Tea) AND Likes Coffee AND (NOT Drink Coke)
AND (NOT Pepsi) AND Water AND (NOT Mountain Dew))
OR
(Dr. Pepper AND (NOT *****    ))

Logic Segment:     Drinks: Mountain Dew ▾ +

AND▾    (NOT Drink Coke) AND (NOT Pepsi)    AND▾

AD02_118

Cache
Indices

AUTHOR 1
AD07_100-1

AUTHOR 2
AD07_100-2

AUTHOR 3
AD07_100-3

AUTHOR 4
AD07_100-4

AUTHOR 5
AD07_100-5

AUTHOR 6
AD07_100-6

AUTHOR 7
AD07_100-7

ID1 - ATTR
AD07_102-1

ID2 - ATTR
AD07_102-2    NULL

ID3 - ATTR
AD07_104-1    NULL

ID4 - ATTR
AD07_106-1    [OID5 OIDO]

ID5 - ATTR
AD07_106-2    [OID6 OIDO]
Bucket

ID6 - ATTR
AD07_106-3    NULL

AD02_118

ID1-
ATTR

[0000 0ID2]

AD07_102-1

ID2-
ATTR

NULL

AD07_102-2

ID3-
ATTR

AD07_104-1

NULL

[0000 0ID5]

AD07_110-3

ID4-
ATTR

AD07_106-1

[0000 0ID6]

ID5-
ATTR

AD07_106-2

ID6-
ATTR

NULL

AUTHOR 1

AD07_100-1

AUTHOR 2

AD07_100-2

AUTHOR 3

AD07_100-3

AUTHOR 4

AD07_100-4

AUTHOR 5

AD07_100-5

AUTHOR 6

AD07_100-6

AUTHOR 7

AD07_100-7

Cache
Indices

AD07_110-1

AD07_110-2

Bucket

Figure 40E:
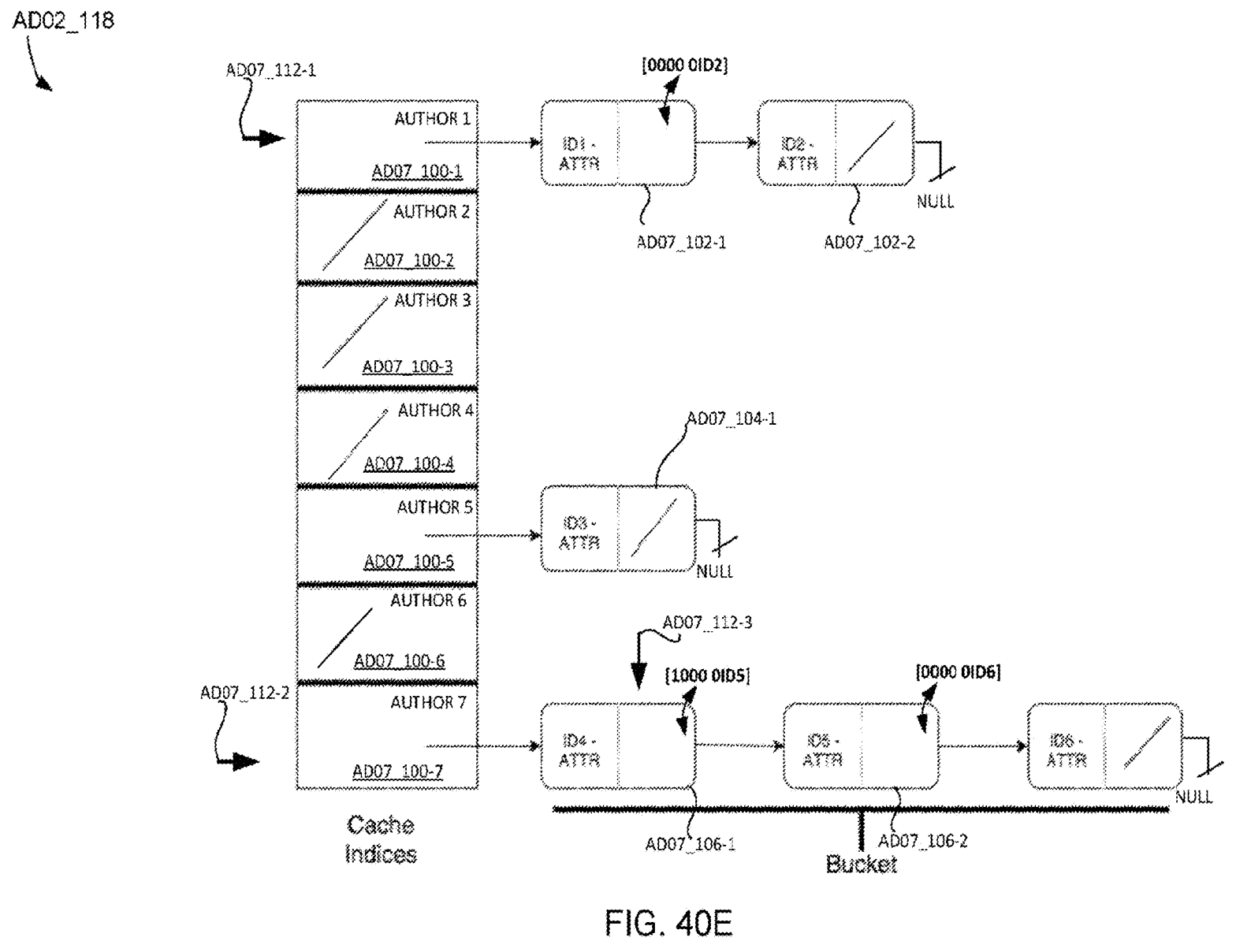

AD02_118

AD07_112-1

Cache Indices

AUTHOR 1
AD07_100-1

AUTHOR 2
AD07_100-2

AUTHOR 3
AD07_100-3

AUTHOR 4
AD07_100-4

AUTHOR 5
AD07_100-5

AUTHOR 6
AD07_100-6

AUTHOR 7
AD07_100-7

AD07_112-2

[0000 0ID2]

ID1 - ATTR
AD07_102-1

ID2 - ATTR
AD07_102-2

NULL

ID3 - ATTR
AD07_104-1

NULL

[1000 0ID5]
AD07_112-3

[0000 0ID6]

ID4 - ATTR
AD07_106-1

ID5 - ATTR

ID6 - ATTR
AD07_106-2

NULL

Bucket

ID2 - ATTR

AD07_102-1

AD07_102-2

NULL

ID1 - ATTR

AUTHOR 1

AD07_100-1

AUTHOR 2

AD07_100-2

AUTHOR 3

AD07_100-3

AUTHOR 4

AD07_100-4

AUTHOR 5

AD07_100-5

AUTHOR 6

AD07_100-6

AUTHOR 7

AD07_100-7

Cache Indices

AD07_112-1

AD07_112-2

AD07_104-1

ID3 - ATTR

NULL

AD07_112-3

ID4 - ATTR

[0000 0ID6]

AD07_106-1

Bucket

AD07_112-4

ID6 - ATTR

NULL

AD07_106-3 start node end node

Newly initialized Bucket with sentinel nodes

AD07-300

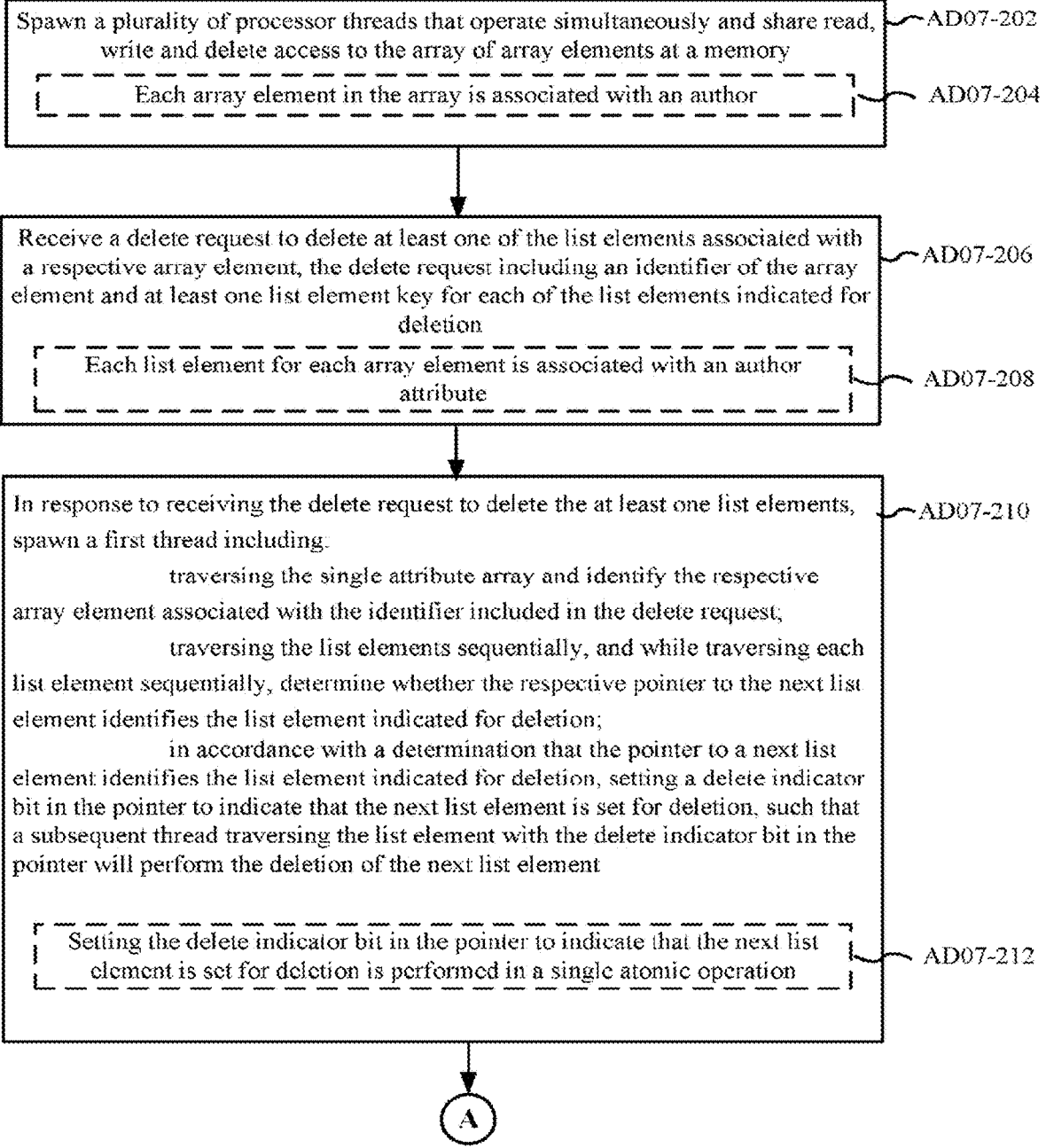

Spawn a plurality of processor threads that operate simultaneously and share read, write and delete access to the array of array elements at a memory ⟋AD07-202

Each array element in the array is associated with an author ⟋ AD07-204

Receive a delete request to delete at least one of the list elements associated with a respective array element, the delete request including an identifier of the array element and at least one list element key for each of the list elements indicated for deletion ⟋AD07-206

Each list element for each array element is associated with an author attribute ⟋ AD07-208

In response to receiving the delete request to delete the at least one list elements, spawn a first thread including: ⟋AD07-210 traversing the single attribute array and identify the respective array element associated with the identifier included in the delete request;

traversing the list elements sequentially, and while traversing each list element sequentially, determine whether the respective pointer to the next list element identifies the list element indicated for deletion;

in accordance with a determination that the pointer to a next list element identifies the list element indicated for deletion, setting a delete indicator bit in the pointer to indicate that the next list element is set for deletion, such that a subsequent thread traversing the list element with the delete indicator bit in the pointer will perform the deletion of the next list element Setting the delete indicator bit in the pointer to indicate that the next list element is set for deletion is performed in a single atomic operation ⟋ AD07-212

Receive an access request to retrieve at least one of the list elements associated with a respective identifier of one of the array elements, the request including the respective identifier of the one of the array elements and at least one list element key, each list element key being associated with at least one respective list element;                    ⟋AD07-214 in response to receiving the access request, spawning a second thread including:

traversing the single attribute array and identifying the respective array element associated with the respective identifier;

traversing the list elements sequentially and selectively retrieving the at least one of the list elements associated with the access request, while traversing each list element, determining whether the delete indicator bit in the respective pointer to the next list element indicates that the next list element is designated for deletion;

in accordance with a determination that the delete indicator bit indicates that the next list element is designated for deletion:

deleting the next list element by changing the respective pointer to the subsequent list element after the next list element; and continuing traversing the list elements until the at least one of the list elements are retrieved

---

Deleting the next list element includes storing the key/value pair of the next list element in a local memory associated with second thread                    AD07-216

---

The access request is transmitted in response to receiving a document from an external data source and wherein the retrieved list elements are associated with the document while the document is traversing mission filters                    AD07-218

FIG. 42B

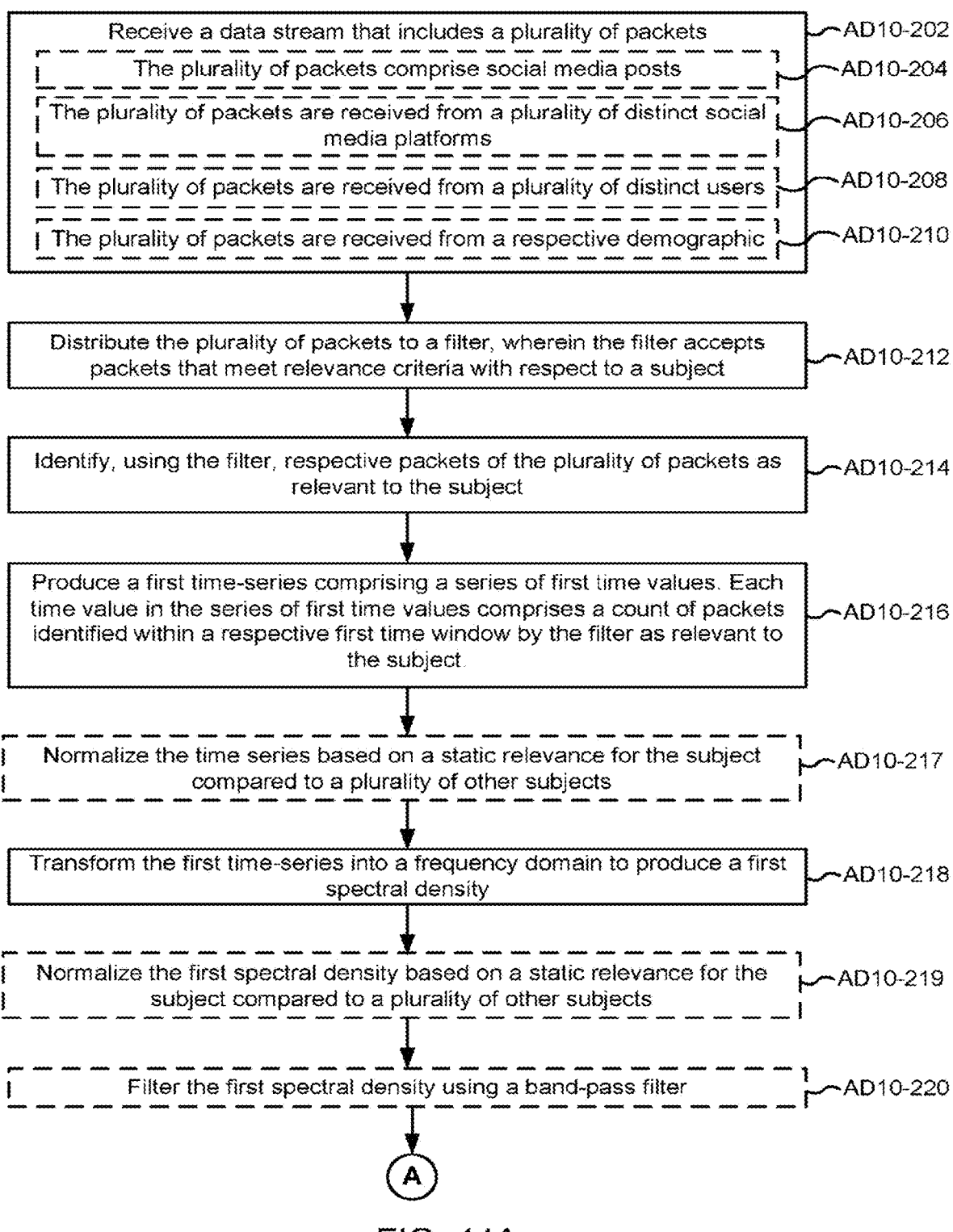

AD10-200

Receive a data stream that includes a plurality of packets — AD10-202

The plurality of packets comprise social media posts — AD10-204

The plurality of packets are received from a plurality of distinct social media platforms — AD10-206

The plurality of packets are received from a plurality of distinct users — AD10-208

The plurality of packets are received from a respective demographic — AD10-210

Distribute the plurality of packets to a filter, wherein the filter accepts packets that meet relevance criteria with respect to a subject — AD10-212

Identify, using the filter, respective packets of the plurality of packets as relevant to the subject — AD10-214

Produce a first time-series comprising a series of first time values. Each time value in the series of first time values comprises a count of packets identified within a respective first time window by the filter as relevant to the subject. — AD10-216

Normalize the time series based on a static relevance for the subject compared to a plurality of other subjects — AD10-217

Transform the first time-series into a frequency domain to produce a first spectral density — AD10-218

Normalize the first spectral density based on a static relevance for the subject compared to a plurality of other subjects — AD10-219

Filter the first spectral density using a band-pass filter — AD10-220

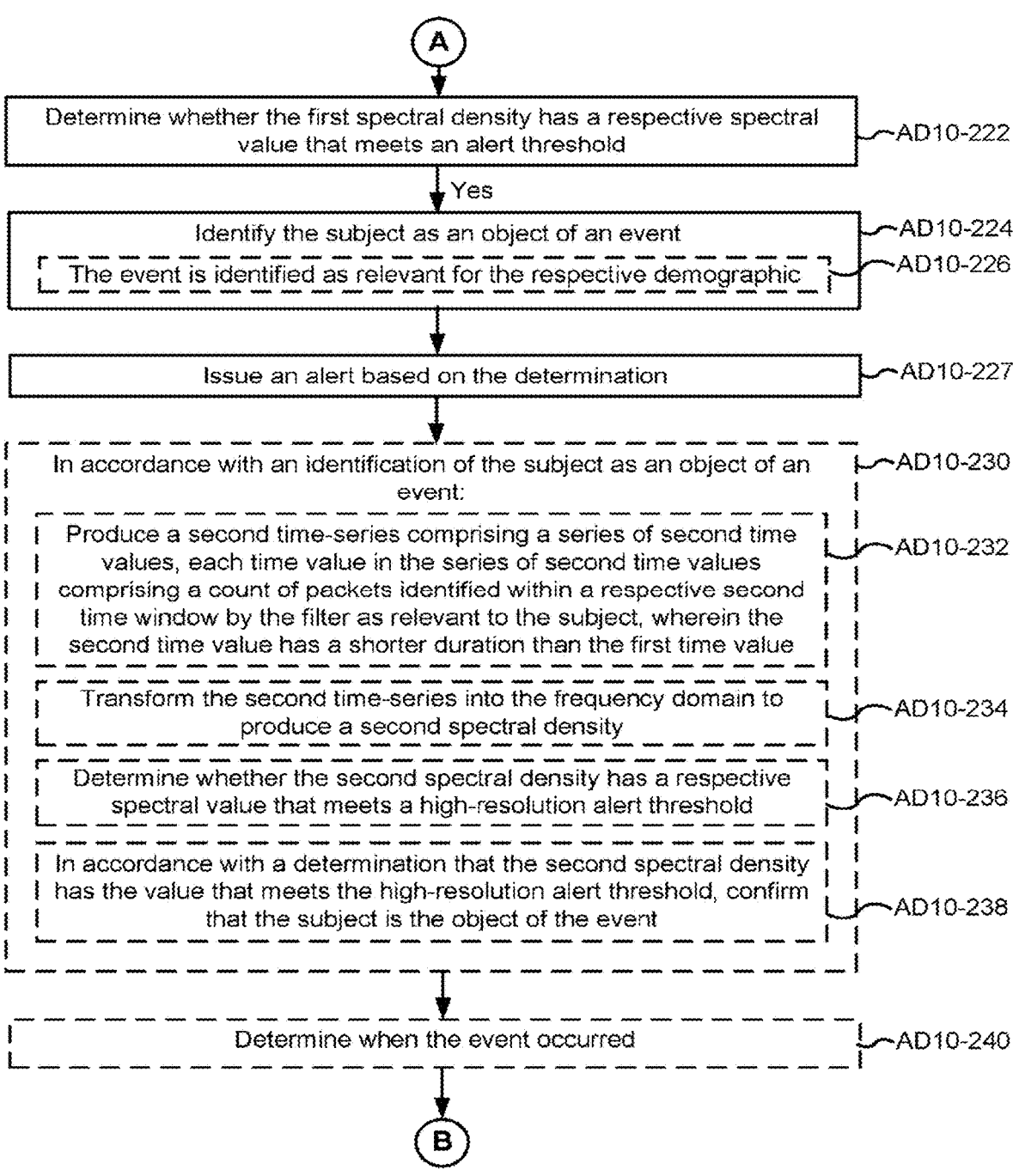

AD10-200

Ⓐ

Determine whether the first spectral density has a respective spectral value that meets an alert threshold    AD10-222

↓Yes

Identify the subject as an object of an event    AD10-224

The event is identified as relevant for the respective demographic    AD10-226

Issue an alert based on the determination    AD10-227

In accordance with an identification of the subject as an object of an event:    AD10-230

Produce a second time-series comprising a series of second time values, each time value in the series of second time values comprising a count of packets identified within a respective second time window by the filter as relevant to the subject, wherein the second time value has a shorter duration than the first time value    AD10-232

Transform the second time-series into the frequency domain to produce a second spectral density    AD10-234

Determine whether the second spectral density has a respective spectral value that meets a high-resolution alert threshold    AD10-236

In accordance with a determination that the second spectral density has the value that meets the high-resolution alert threshold, confirm that the subject is the object of the event    AD10-238

Determine when the event occurred    AD10-240

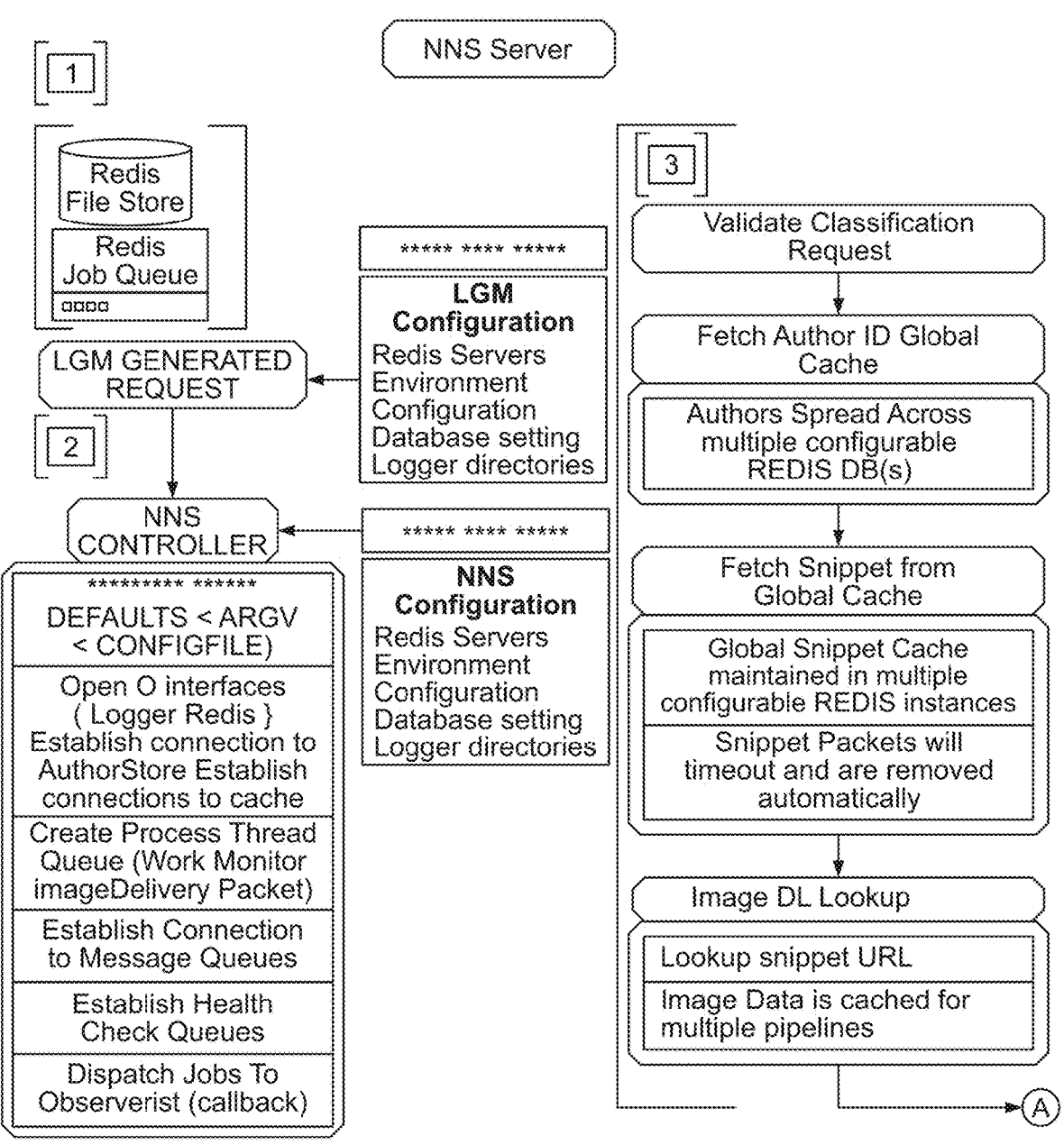

NNS Server

1

Redis
File Store

Redis
Job Queue
▢▢▢▢

LGM GENERATED
REQUEST

2

***  ***

**LGM
Configuration**

Redis Servers
Environment
Configuration
Database setting
Logger directories

NNS
CONTROLLER

***  ***

**NNS
Configuration**

Redis Servers
Environment
Configuration
Database setting
Logger directories

******* ****

DEFAULTS < ARGV
< CONFIGFILE)

Open O interfaces
( Logger Redis }
Establish connection to
AuthorStore Establish
connections to cache Create Process Thread
Queue (Work Monitor
imageDelivery Packet)

Establish Connection
to Message Queues

Establish Health
Check Queues

Dispatch Jobs To
Observerist (callback)

3

Validate Classification
Request

Fetch Author ID Global
Cache

Authors Spread Across
multiple configurable
REDIS DB(s)

Fetch Snippet from
Global Cache

Global Snippet Cache
maintained in multiple
configurable REDIS instances

Snippet Packets will
timeout and are removed
automatically

Image DL Lookup

Lookup snippet URL

Image Data is cached for
multiple pipelines (A)

[1] LGM Generates a classification request for a given author
    The request may be for gender age ethnicity or other
[2] The request is processed by the NeuralNetsServer control
[3] The request is pipelined thru the NNS system and requires
    Author Identification
    SAP snippet/packet and
    Image from a ImageDL lookup or cache

FIG. 46

LGM NEURAL NETS CLASSIFIER SERVICE

[4] The specific model is loaded and trheimage is pre filtered
as per requirements. The NeuralNet weights are
evaluated against the image and return a prediction with
confidence specific to the model
[5] The prediction is recorded via the LGM system and the
DB is updated

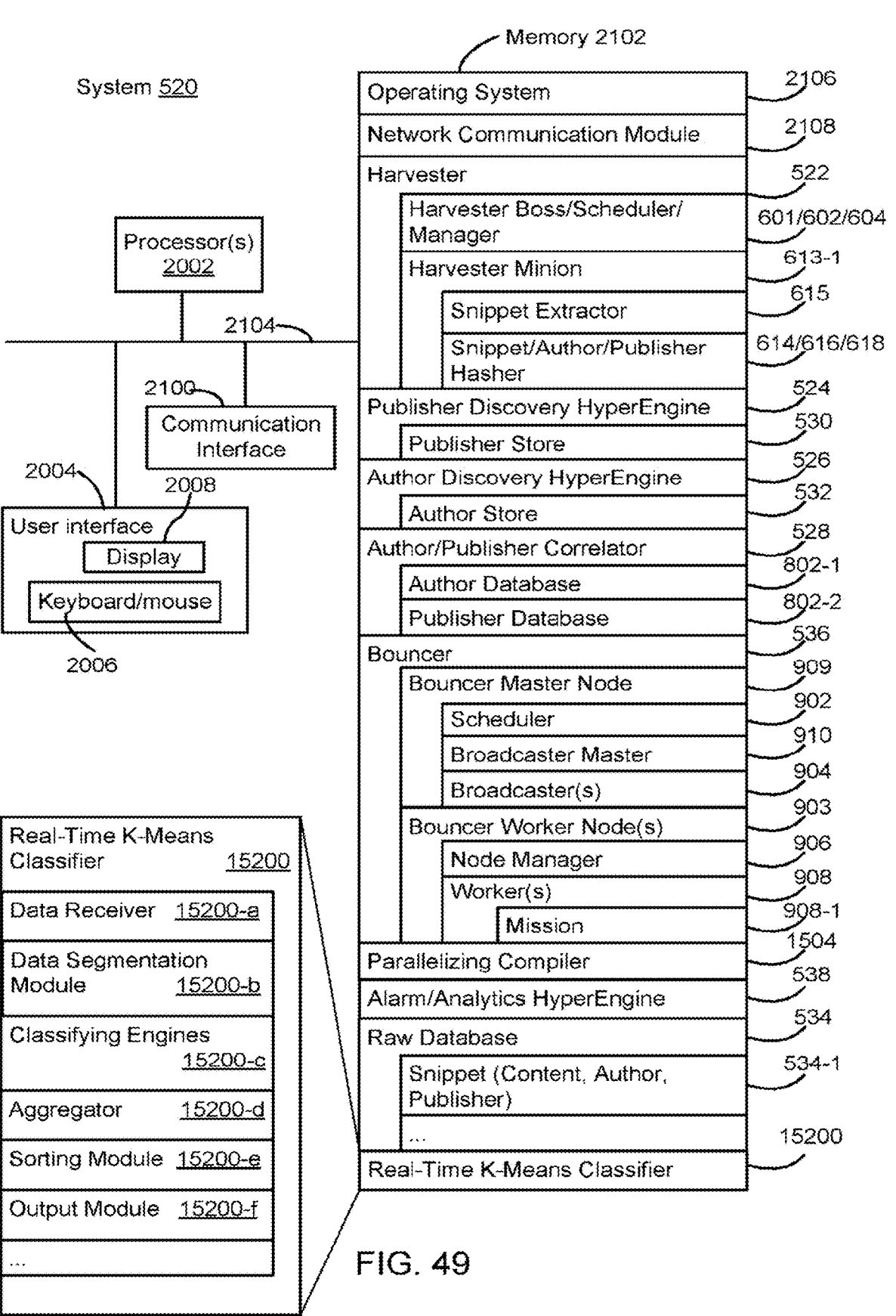

System 520

Processor(s) 2002

2104

2100

Communication Interface

2004

2008

User interface

Display

Keyboard/mouse

2006

Memory 2102

| Operating System | 2106 |
| Network Communication Module | 2108 |
| Harvester | 522 |
| Harvester Boss/Scheduler/ Manager | 601/602/604 |
| Harvester Minion | 613-1 |
| Snippet Extractor | 615 |
| Snippet/Author/Publisher Hasher | 614/616/618 |
| Publisher Discovery HyperEngine | 524 |
| Publisher Store | 530 |
| Author Discovery HyperEngine | 526 |
| Author Store | 532 |
| Author/Publisher Correlator | 528 |
| Author Database | 802-1 |
| Publisher Database | 802-2 |
| Bouncer | 536 |
| Bouncer Master Node | 909 |
| Scheduler | 902 |
| Broadcaster Master | 910 |
| Broadcaster(s) | 904 |
| Bouncer Worker Node(s) | 903 |
| Node Manager | 906 |
| Worker(s) | 908 |
| Mission | 908-1 |
| Parallelizing Compiler | 1504 |
| Alarm/Analytics HyperEngine | 538 |
| Raw Database | 534 |
| Snippet (Content, Author, Publisher) | 534-1 |
| ... | |
| Real-Time K-Means Classifier | 15200 |

Real-Time K-Means Classifier　15200

Data Receiver　15200-a

Data Segmentation Module　15200-b

Classifying Engines　15200-c

Aggregator　15200-d

Sorting Module　15200-e

Output Module　15200-f

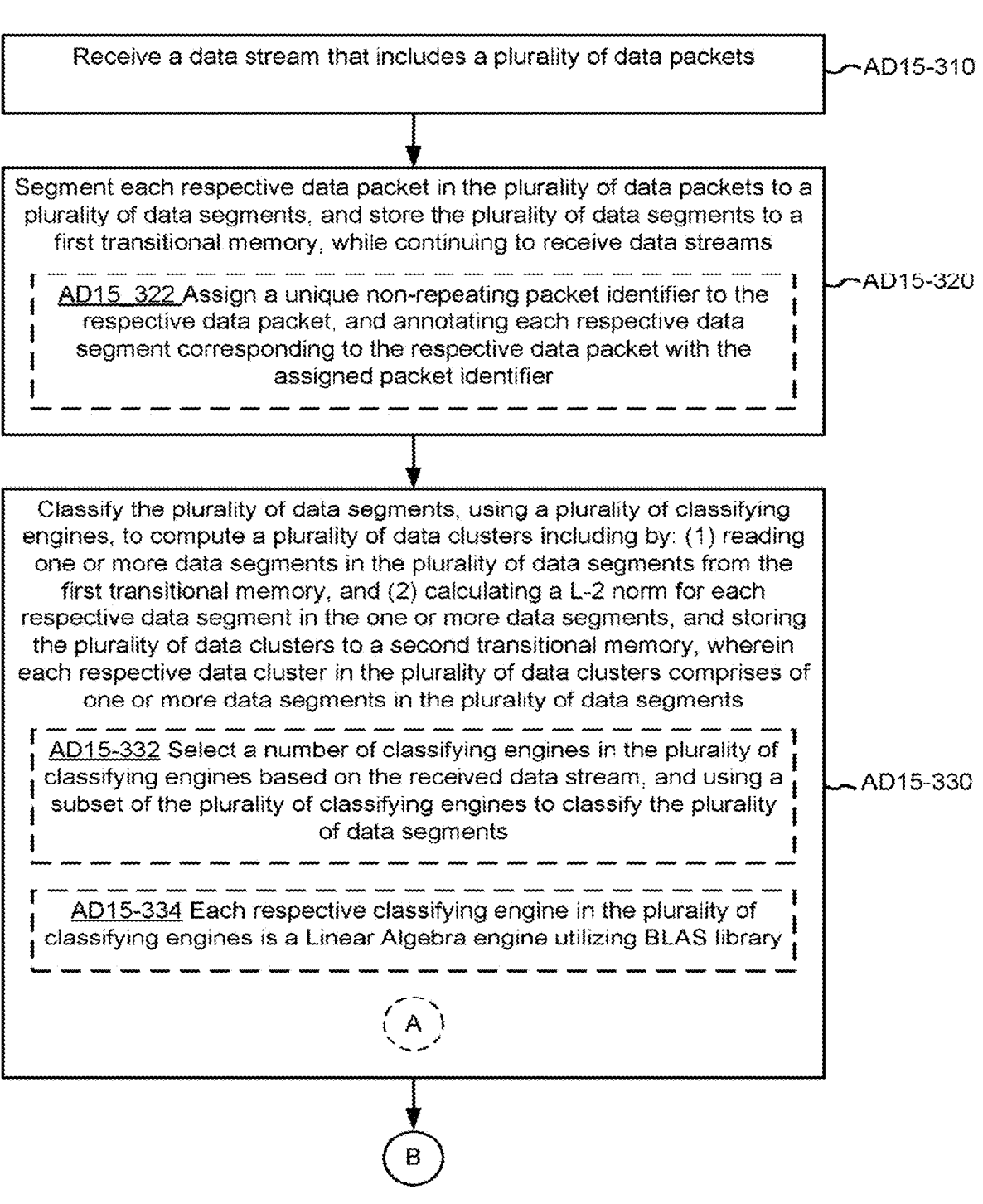

Receive a data stream that includes a plurality of data packets    AD15-310

Segment each respective data packet in the plurality of data packets to a plurality of data segments, and store the plurality of data segments to a first transitional memory, while continuing to receive data streams AD15_322 Assign a unique non-repeating packet identifier to the respective data packet, and annotating each respective data segment corresponding to the respective data packet with the assigned packet identifier

AD15-320

Classify the plurality of data segments, using a plurality of classifying engines, to compute a plurality of data clusters including by: (1) reading one or more data segments in the plurality of data segments from the first transitional memory, and (2) calculating a L-2 norm for each respective data segment in the one or more data segments, and storing the plurality of data clusters to a second transitional memory, wherein each respective data cluster in the plurality of data clusters comprises of one or more data segments in the plurality of data segments AD15-332 Select a number of classifying engines in the plurality of classifying engines based on the received data stream, and using a subset of the plurality of classifying engines to classify the plurality of data segments AD15-334 Each respective classifying engine in the plurality of classifying engines is a Linear Algebra engine utilizing BLAS library

Aggregate the plurality of data clusters, using a lockless hash-map, to compute a plurality of min-distance vectors including by reading one or more data clusters in the plurality of data clusters from the second transitional memory, and storing the plurality of min-distance vectors to a third transitional memory, wherein each respective min-distance vector in the plurality of min-distance vectors corresponds to a data packet in the plurality of data packets AD15-342 Use the packet identifier in each respective data segment in the plurality of data segments that comprise the plurality of data clusters as a key for the lockless hash-map.

AD15-344 Aggregation of the plurality of data clusters is implemented using multi-threaded processes AD15-346 The lockless hash-map is a Lockless Akuda Hash-map

AD15-340

Sort each respective min-distance vector in the plurality of min-distance vectors to compute a plurality of minimum distances for each respective data packet in the plurality of data packets including by reading the plurality of min-distance vectors from the third transitional memory AD15-352 Sorting to compute the plurality of minimum distances is implemented using multi-threaded processes AD15-354 Identify a respective min-distance vector in the plurality of min-distance vectors read from the third transitional memory that corresponds to a respective data packet based on a packet identifier corresponding to the respective data packet, and sorting the respective min-distance vector

AD15-350

Output, for each respective data packet in the plurality of data packets, the plurality of minimum distances that corresponds to the respective data packet.

AD15-362 Tabulate the plurality of minimum distances along with information related to centroid of the clusters and packet identifiers for the plurality of data packets

AD15-360

Train a model to compute centroids for K clusters in N dimensions, wherein K is a predetermined number of classification categories and N is a predetermined data-dimensionality for the data stream.

AD15-370

Calculate the L2-norm for each respective data segment in the one or more data segments using either the computed centroids or a predetermined list of centroids

AD15-372

Compute the plurality of clusters based on the L2-norm of the one or more data segments

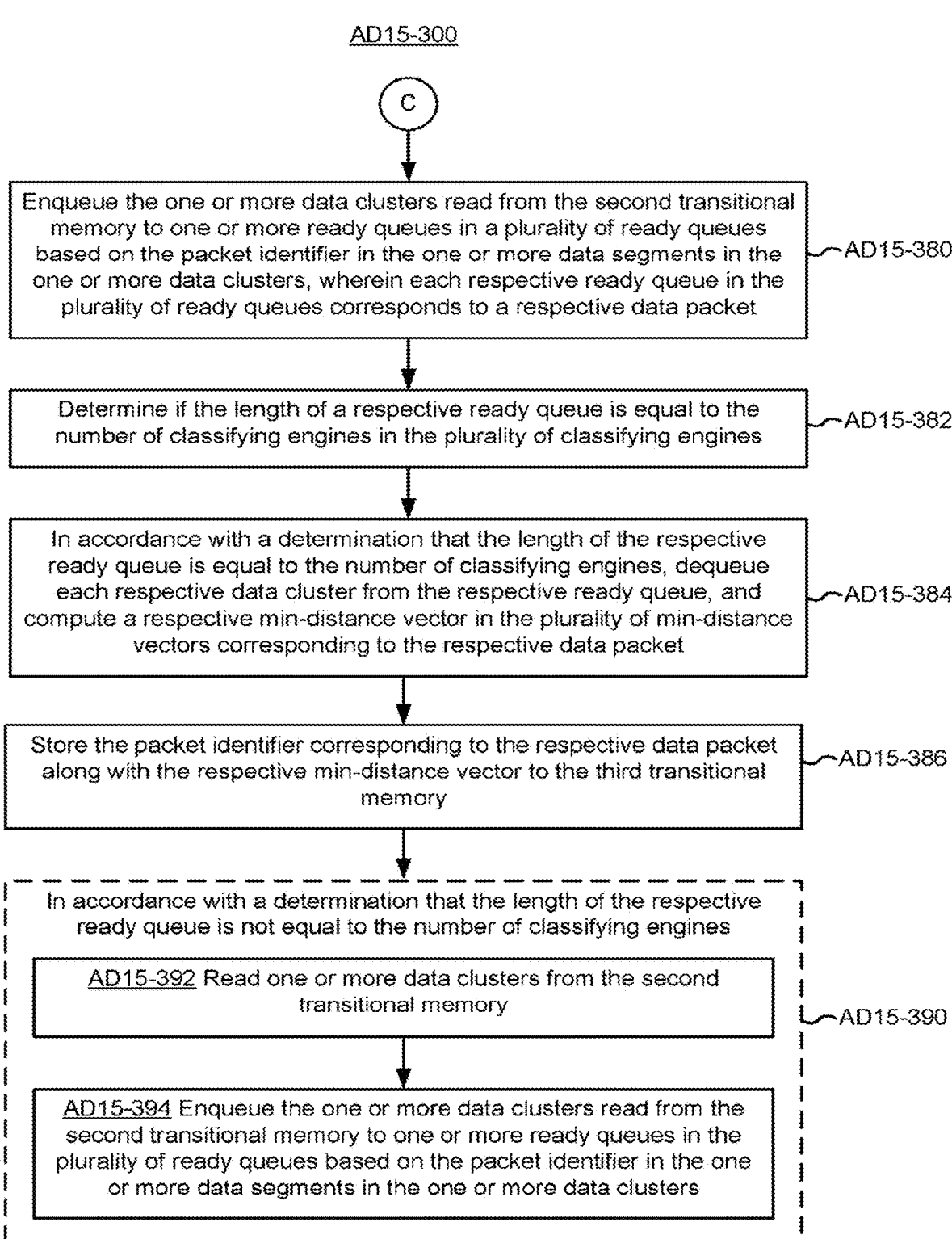

AD15-300

C

Enqueue the one or more data clusters read from the second transitional memory to one or more ready queues in a plurality of ready queues based on the packet identifier in the one or more data segments in the one or more data clusters, wherein each respective ready queue in the plurality of ready queues corresponds to a respective data packet — AD15-380

Determine if the length of a respective ready queue is equal to the number of classifying engines in the plurality of classifying engines — AD15-382

In accordance with a determination that the length of the respective ready queue is equal to the number of classifying engines, dequeue each respective data cluster from the respective ready queue, and compute a respective min-distance vector in the plurality of min-distance vectors corresponding to the respective data packet — AD15-384

Store the packet identifier corresponding to the respective data packet along with the respective min-distance vector to the third transitional memory — AD15-386

In accordance with a determination that the length of the respective ready queue is not equal to the number of classifying engines AD15-392 Read one or more data clusters from the second transitional memory AD15-394 Enqueue the one or more data clusters read from the second transitional memory to one or more ready queues in the plurality of ready queues based on the packet identifier in the one or more data segments in the one or more data clusters

Computer system 520

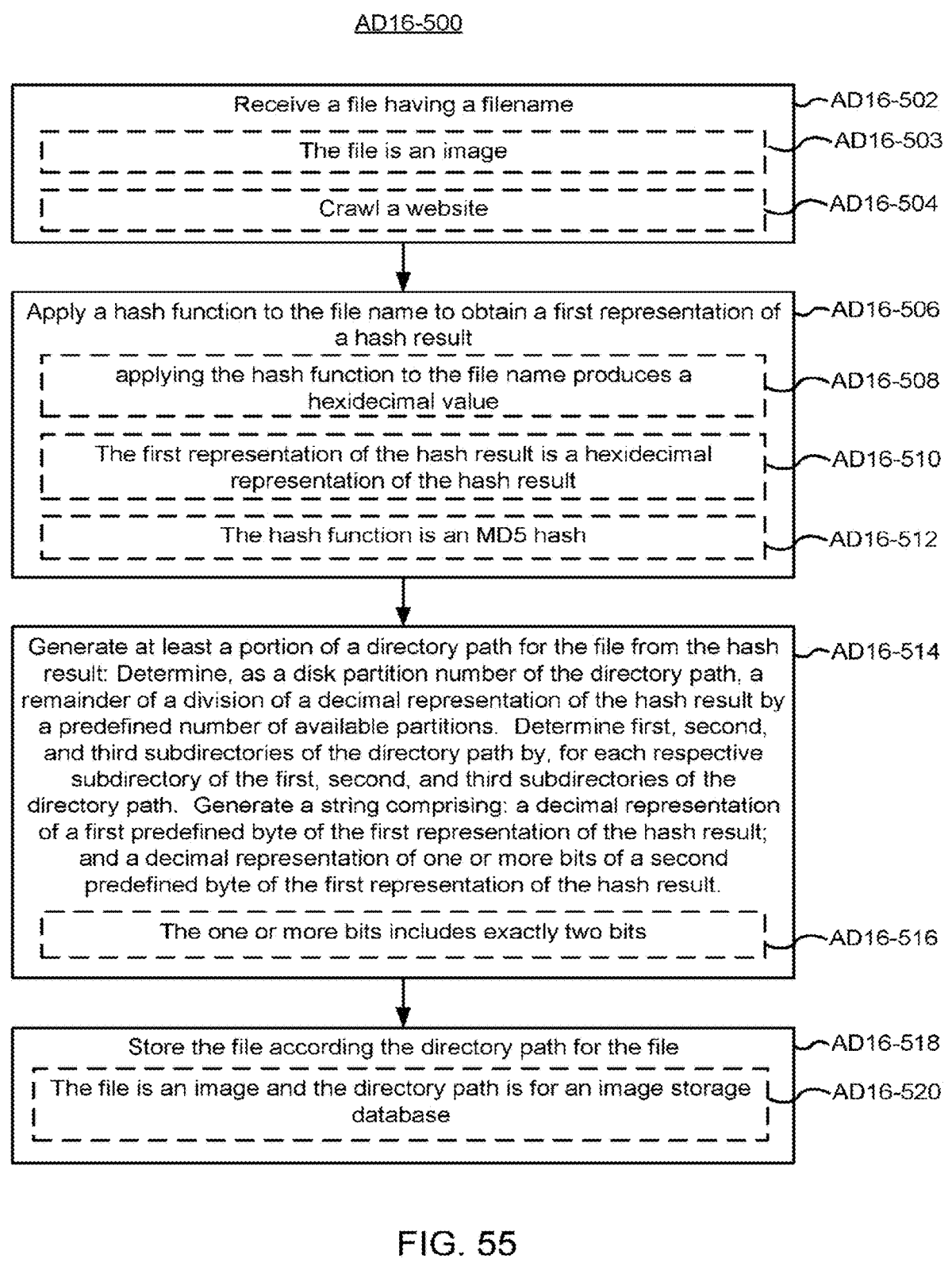

AD16-500

Receive a file having a filename — AD16-502

The file is an image — AD16-503

Crawl a website — AD16-504

Apply a hash function to the file name to obtain a first representation of a hash result — AD16-506 applying the hash function to the file name produces a hexidecimal value — AD16-508

The first representation of the hash result is a hexidecimal representation of the hash result — AD16-510

The hash function is an MD5 hash — AD16-512

Generate at least a portion of a directory path for the file from the hash result: Determine, as a disk partition number of the directory path, a remainder of a division of a decimal representation of the hash result by a predefined number of available partitions. Determine first, second, and third subdirectories of the directory path by, for each respective subdirectory of the first, second, and third subdirectories of the directory path. Generate a string comprising: a decimal representation of a first predefined byte of the first representation of the hash result; and a decimal representation of one or more bits of a second predefined byte of the first representation of the hash result. — AD16-514

The one or more bits includes exactly two bits — AD16-516

Store the file according the directory path for the file — AD16-518

The file is an image and the directory path is for an image storage database — AD16-520

FIG. 55

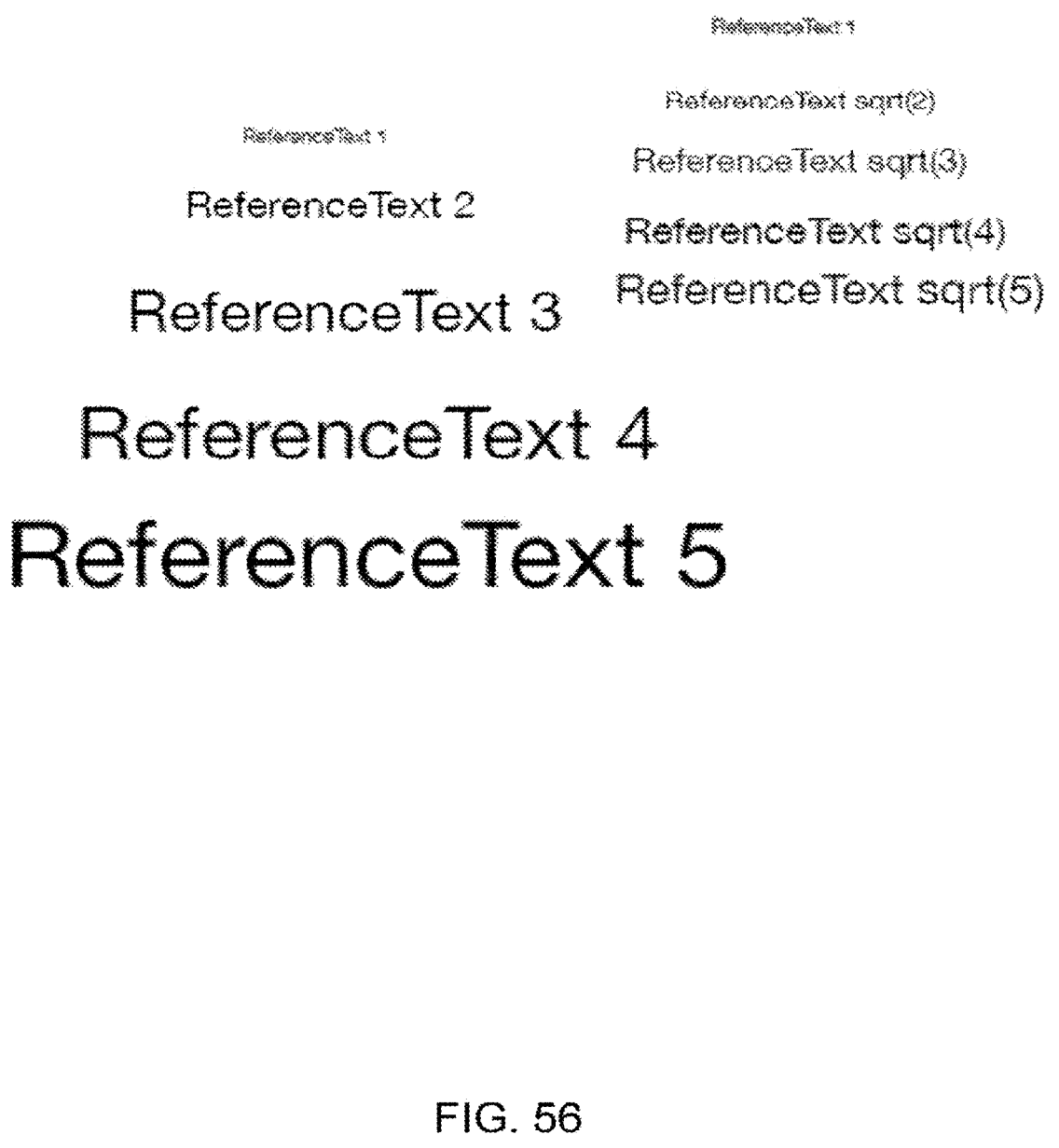

ReferenceText 1

ReferenceText 2

ReferenceText 3

ReferenceText 4

ReferenceText 5

ReferenceText 1

ReferenceText sqrt(2)

ReferenceText sqrt(3)

ReferenceText sqrt(4)

ReferenceText sqrt(5)

FIG. 56

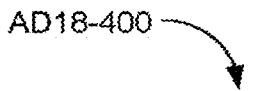
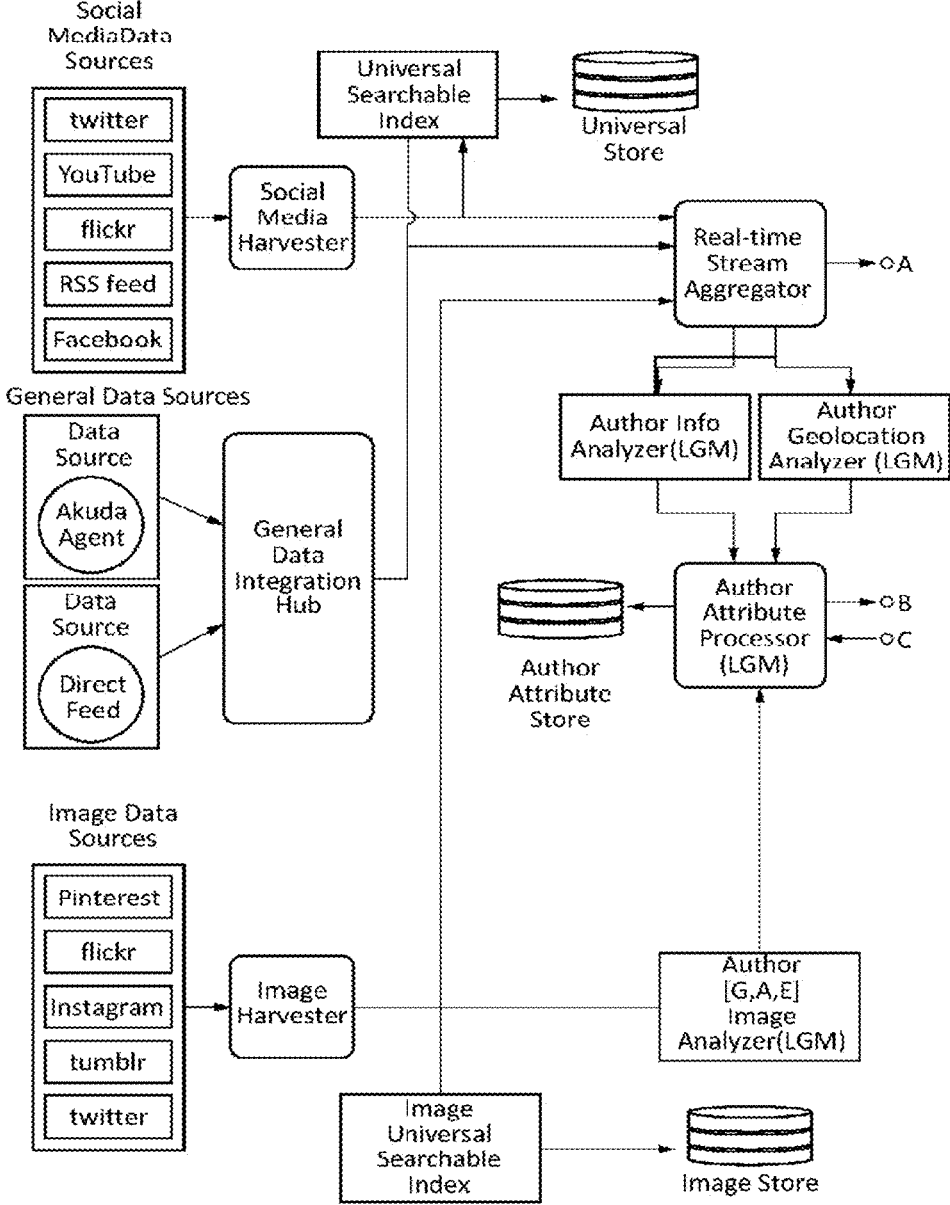
FIG. 60

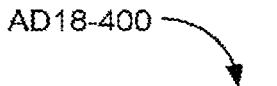
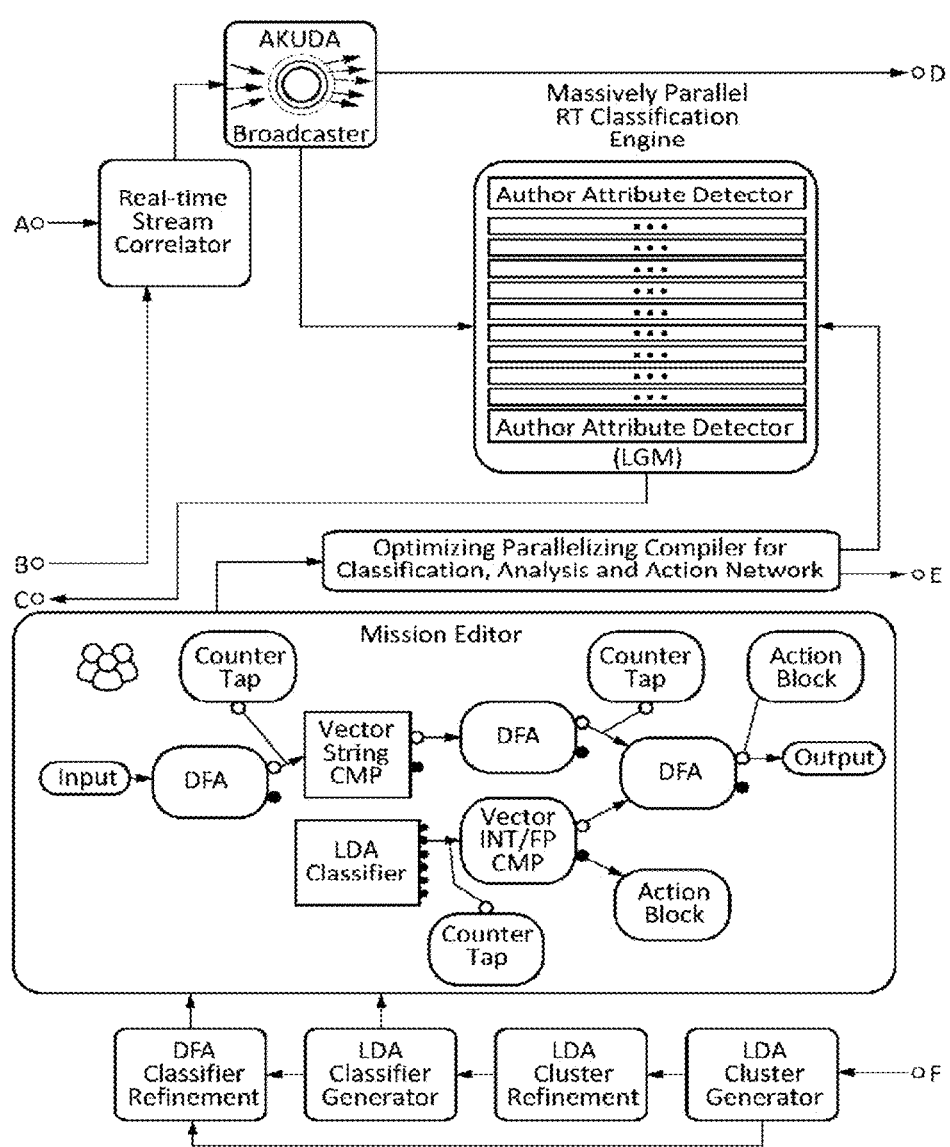
FIG. 61

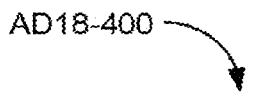
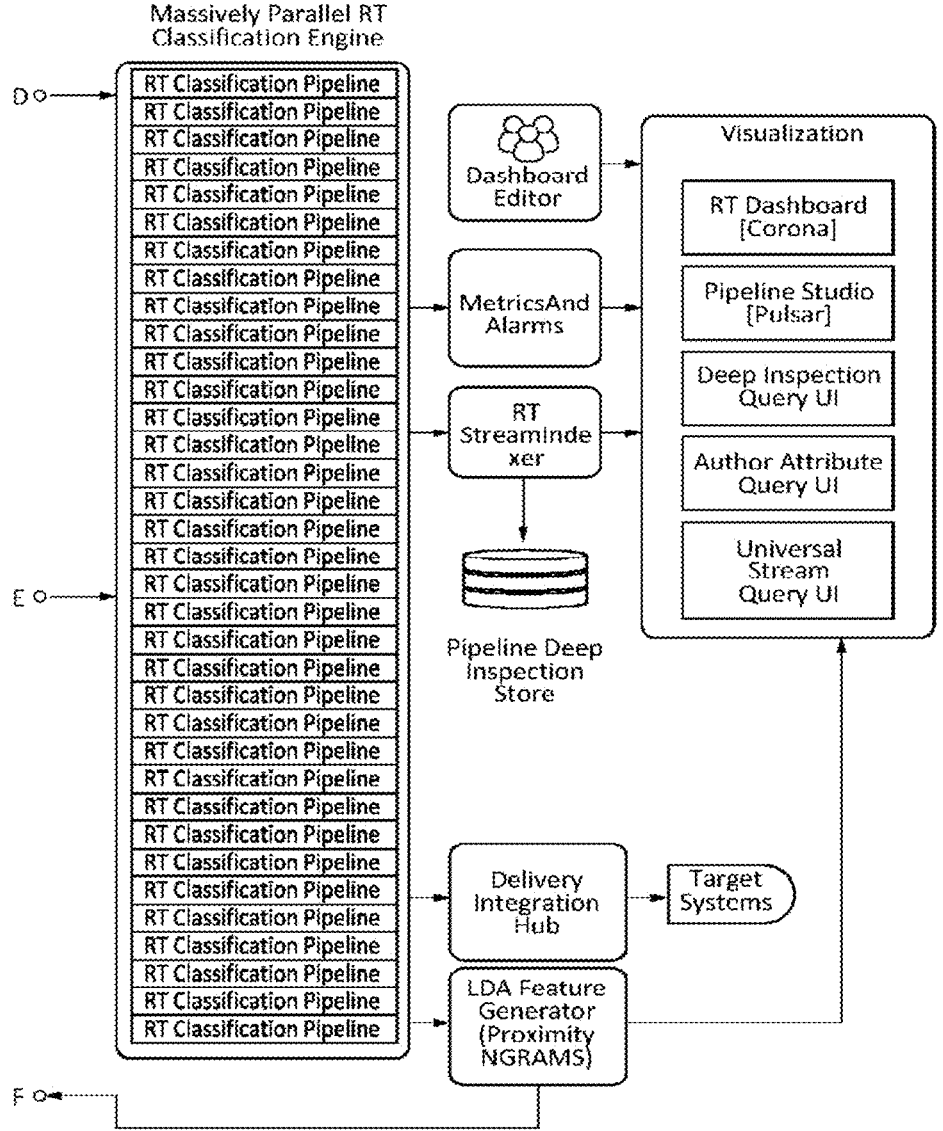
FIG. 62

HIERARCHICAL, PARALLEL MODELS FOR EXTRACTING IN REAL TIME HIGH-VALUE INFORMATION FROM DATA STREAMS AND SYSTEM AND METHOD FOR CREATION OF SAME

RELATED APPLICATIONS

This application is a continuation of U.S. patent application Ser. No. 17/835,428, filed Jun. 8, 2022, which is a continuation of U.S. patent application Ser. No. 16/917,447, filed Jun. 30, 2020, entitled "Hierarchical, Parallel Models for Extracting in Real Time High-Value Information From Data Streams and System and Method for Creation of Same," which issued Jun. 21, 2022, as U.S. Pat. No. 11,366, 859 which is a continuation of International Patent Application No. PCT/US18/68047, filed Dec. 28, 2018, entitled "Hierarchical, Parallel Models for Extracting in Real Time High-Value Information From Data Streams and System and Method for Creation of Same," which claims priority to U.S. Provisional Application No. 62/612,432, filed Dec. 30, 2017, entitled "Hierarchical, Parallel Models for Extracting in Real Time High-Value Information From Data Streams and System and Method for Creation of Same," each of which is hereby incorporated by reference in its entirety.

This application is related to U.S. patent application Ser. No. 14/214,410, filed Mar. 14, 2014, U.S. patent application Ser. No. 14/214,443, filed Mar. 14, 2014, U.S. patent application Ser. No. 14/214,490, filed Mar. 14, 2014, U.S. patent application Ser. No. 14/688,865, filed Apr. 16, 2015, U.S. patent application Ser. No. 15/360,934, filed Nov. 23, 2016, U.S. patent application Ser. No. 15/360,935, filed Nov. 23, 2016, and U.S. patent application Ser. No. 15/530,187, filed Dec. 8, 2016, each of which is hereby incorporated by reference in its entirety.

TECHNICAL FIELD

The application relates to methods of automatically discovering topics in streams of electronic posts and computer systems that perform such methods.

BACKGROUND

Several methods exist for topic discovery within a corpus of documents. As an example, one could imagine applying such methods to all of the newspaper articles written in the United States during the nineteen sixties. In this example, the articles serve as the documents and, collectively, they form the corpus of documents. One would not be surprised to see such methods discover the Vietnam War, the Watergate scandal, the movement for civil rights, etc., as the pertinent topics for such a corpus.

The problem with conventional methods of automatic topic discovery is that they are too slow to be of use for near real-time applications, such as analyzing social media post to determine "hot" topics on-the-fly. The exact timescales required depend on the number of words in the lexicon, the number of documents and the corpus, and the number of desired topics. Stated another way, the dimensionality of the computational problem involved with automatic topic discovery is proportional to the size of the lexicon, which tends to be quite large (e.g., thousands of words). Hours, days, or even weeks of required processing time to automatically discover topics are not uncommon.

SUMMARY

To address the aforementioned problems with conventional automatic topic discovery techniques, systems and methods are described herein that greatly increase the speed of topic discovery such that, in some circumstances, it can be used to discover, for example, social media topics in near real-time.

The implementations described herein may be applied to a number of different applications, including, but not limited to: extraction of high value information from unstructured images in massively parallel processing system, real-time massively parallel pipeline processing system, additional applications directed to specific aspects/improvements of real-time massively parallel pipeline processing system, topic and trend discovery within real-time online content streams, system and method for implementing enterprise risk models based on information posts, additional applications directed to specific models other than risk models, real-time stream correlation with pre-existing knowledge, image harvesting and optimal scalable storage, structurizing parser for unstructured data streams, realtime IoT parallel vector classification, real-time image harvesting and storage system, method for social media event detection and cause analysis, systems and methods for analyzing unsolicited product/service customer reviews, neural network based system for credit/insurance processing using unstructured data, system and method for correlating social media data and company financial data, systems and methods for identifying an illness and course of treatment for a patient, system and method for identifying facial expressions from social media images, system and method for detecting health maladies in a patient using unstructured images, system and method for detecting political destabilization at a specific geographic location based on social media data, system and method for scalable processing of data pipelines using a lockless shared memory system, asynchronous web page data aggregator, applications of distributed processing and data broadcasting technology to real time news service, distributed processing and data broadcasting technology for real time threat analysis, distributed processing and data broadcasting technology for real time emergency response, distributed processing and data broadcasting technology for climate analytics, distributed processing and data broadcasting technology for insurance risk assessment, distributed parallel architectures for real time processing of streams of structured and unstructured data, pulsar systems and methods, bananas core systems and methods, corona blank slate visualization systems and methods, general statistical classification systems and methods, structured and unstructured data and analytical tools, and method for automatic extraction of author features from social media data.

In some implementations, a method is performed at a computer system including a plurality of processors and memory storing programs for execution by the processors. The method includes receiving a corpus that includes a plurality of electronic posts. The method further includes identifying, within the corpus, a plurality of candidate terms. The method further includes selecting, as a trimmed lexicon, a subset of the plurality of candidate terms using predefined criteria. The method further includes clustering at least a subset of the plurality of electronic posts according to a plurality of clusters using the lexicon to produce a plurality of statistical topic models. The method further includes storing information corresponding to the statistical topic models.

In some implementations, a server system is provided to perform the steps of the method. In some implementations, a non-transitory computer readable storage medium storing a set of instructions, which when executed by a server system with one or more processors cause the one or more processors to perform the steps of the method.

BRIEF DESCRIPTION OF FIGURES

FIG. 4 illustrates a "Thankful/Satisfied" customer model, in accordance with some implementations.

FIG. 16 illustrates an exemplary process of combining filters in the graph that are not all in sequence, in accordance with some implementations.

FIG. 21 is a flow chart illustrating a method of creating hierarchical, parallel models for extracting in real-time high-value information from data streams, in accordance with some implementations.

FIGS. 22A-22C are flow charts illustrating a method for real-time extraction of high-value information from data streams, in accordance with some implementations.

FIG. 23 is a flow chart illustrating a method for optimizing real-time, parallel execution of models for extracting high-value information from data streams, in accordance with some implementations.

FIG. 24 is a flow chart illustrating a method for generating statistical topic models, in accordance with some implementations.

FIGS. 25A through 25C illustrate a schematic representation of a massively parallel computer system for real-time extraction of high value information and for automatically classifying, storing, and assigning versions to data streams, in accordance with some implementations.

FIGS. 32A and 32B are block diagrams of a computer system for automatically classifying, storing, and assigning versions to data streams, in accordance with some implementations.

FIGS. 33A-33D are flowchart representations of a method for automatically classifying, storing, and assigning versions to datasets from data streams, in accordance with some implementations.

FIG. 34I is an example of a FSM implementing a dynamic CPU resource allocation policy method, in accordance with at least some implementations.

FIGS. 38A through 38C illustrate a method of annotating a post received from the internet with information about the post's source, e.g., for use in a system for real-time extraction of high-value information from data streams, in accordance with some embodiments.

FIG. 39L is an example of a visual representation of the user interface of the system according to one embodiment of the invention.

FIGS. 40A-40F illustrate an exemplary process for accessing and annotating a lockless memory storage database (or memory storage system, as referred to herein), in accordance with at least some implementations.

FIGS. 42A to 42B are flowchart representations of a method for accessing and annotating a lockless memory storage database (or memory storage system, as referred to herein), in accordance with at least some implementations.

FIGS. 44A-44D are flowchart representations of a method for event detection and cause identification, in accordance with some implementations.

FIG. 49 is block diagram of a computer system for real-time k-means classification of structured data, in accordance with some implementations.

FIGS. 50A-50D represent a flowchart of a method for classifying structured data in real-time using k-means classification, in accordance with some implementations.

FIG. 55 is a flowchart representation of a method for real-time data harvesting, and scalable data storage and organization, in accordance with some implementations.

FIG. 56 is a representation of word set visualizations in accordance with some implementations.

FIGS. 60 through 62 illustrate a schematic diagram of a system architecture for identifying valuable information from the internet, in accordance with some embodiments.

DETAILED DESCRIPTION

Figure 1:
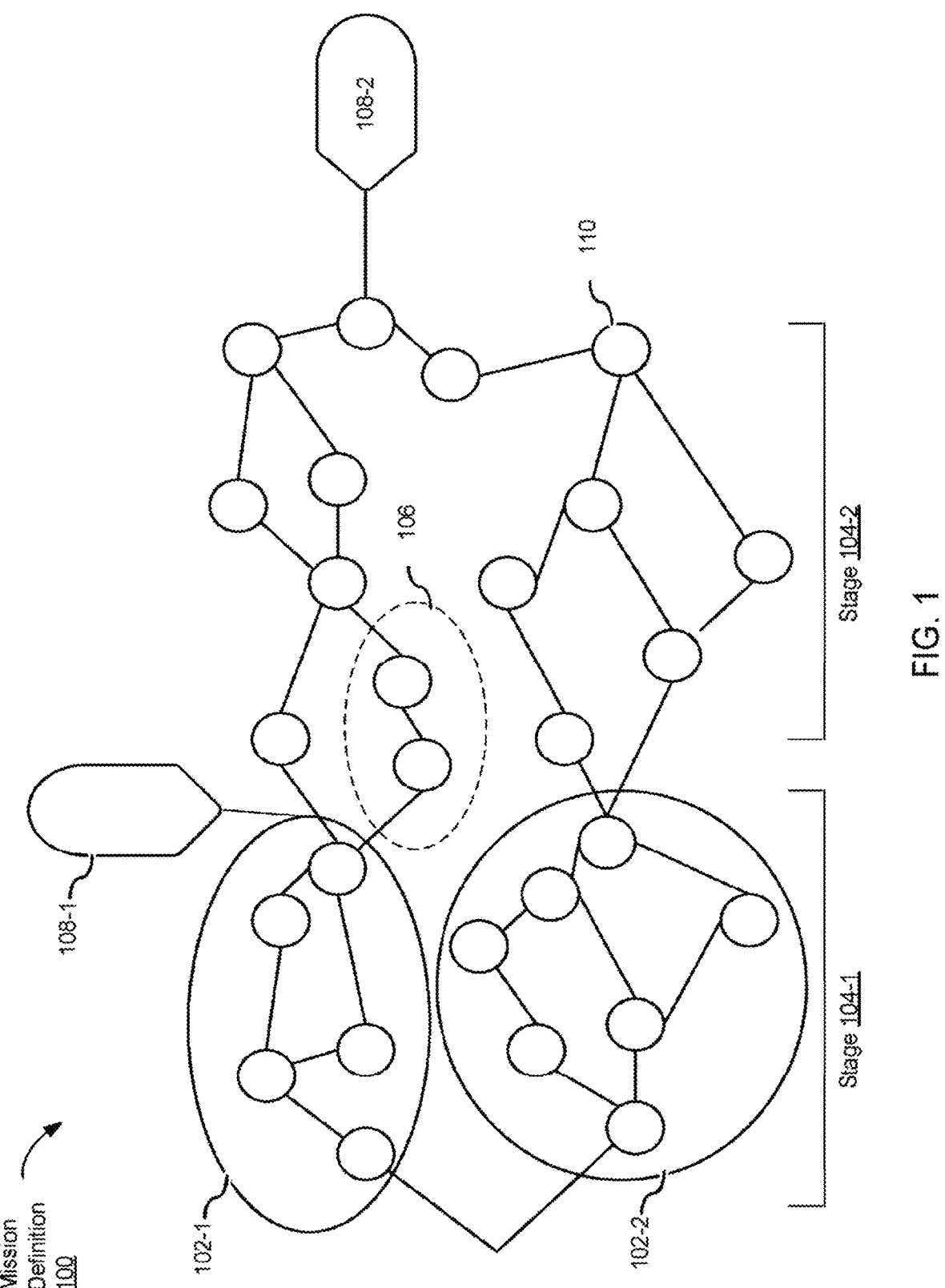
FIG. 1 illustrates a general graph representing a mission definition, in accordance with some implementations.

Hierarchical, Parallel Models for Extracting in Real Time High-Value Information from Data Streams and System and Method for Creation of Same FIG. 1 illustrates a general graph representing a mission definition 100. A mission definition is a specification (e.g., a computer file or a data structure) describing one or more filters (represented as filter nodes 110 in FIG. 1) and the relationships (e.g., connections, or "graph edges") between the filters (e.g., filter nodes, sometimes called "classification models") that together form the general graph (e.g., in some circumstances, a mission definition is referred to as a "filter graph"). Mission definitions are compiled into executable mission definitions and executed against data streams that include a plurality of posts to produce a filtering network classification stream (e.g., a stream of packets, each corresponding to a particular post and classified as to whether the post includes high-value information).

As described in greater detail below, posts can include any type of information update that is received over a network. For example, in some implementations, posts include TWITTER TWEETS, FACEBOOK posts, online forum comments, Youtube videos, and the like. Alternatively, in some implementations, posts can include updates from smart thermostats, smart utility meters, information from a mobile device (e.g., a smart-phone, Fitbit device, etc.). In some implementations, posts are parsed into content portions, which are sometimes referred to herein as a "snippets." For example, a user's online car forum post can be parsed into a snippet that includes the text within the post (e.g., "So happy with my new car!").

In some implementations, a mission definition (e.g., a filter graph) comprises one or more filters (e.g., filter nodes of the filter graph). In some implementations, filters are regular expressions that are converted to finite state automata such as deterministic finite automata (DFAs) or non-deterministic automata (NDAs).

In some implementations, a mission definition (e.g., filter graph) comprises one or more models (e.g., model 102). In some implementations, models comprise one or more filters that, collectively, represent a concept. For example, in some circumstances, a model represents "Happy Customers" and is therefore designed to answer the question, "Does a particular piece of information (e.g., a post from a data source) represent, or originate from, a happy customer?" As an example, to extract information corresponding to happy customers of a particular brand, a mission definition will include a concatenation of a generic "Happy Customers" model with a model for the particular brand.

In some circumstances, it is heuristically useful to refer to blocks rather than models. The term "block" is used to mean a sub-graph of one or more filters and their relationship to one another. It should be understood that the distinction between blocks and models is arbitrary. However, for heuristic purposes, the term "model" is used to refer to one or more filters that represent a particular concept whereas the term "block" is used to describe procedures for optimizing the graph (e.g., combining blocks) during parallelization and compilation.

In some implementations, a mission definition includes one or more stages 104. Each stage of the one or more stages 104 represents a successive level of refinement. For example, a mission definition for a car manufacturer optionally includes the following stages: (i) a "broad listening" stage utilizing a "Car" model and a "Truck" model (e.g., in a Boolean 'OR' such that the broad listening stage accepts snippets related to cars OR trucks), (ii) a brand refinement stage (or a medium accept stage) utilizing a brand specific model, and (iii) a product refinement stage (e.g., a fine accept stage) utilizing models generated for particular products offered by the brand. In addition, the mission definition for the car manufacturer optionally includes one or several reject stages (e.g., a medium reject stage, a fine reject stage, etc.). For example, a medium reject stage for a hypothetical brand Katahdin Wool Products may include a medium reject stage that rejects snippets relating to Mount Katahdin in Maine.

In some implementations, a mission definition 100 includes one or more taps 108. Taps 108 are leaf nodes in the mission definition used for accessing any level of refinement of the filtering network classification stream (e.g., in some implementations, taps produce an output to other aspects of the computer ecosystem). Taps 108 are inserted into a mission definition 100 to generate additional analytics data from the stream output. The analytics data is then accessible to the additional components of the system (e.g., Stream Analytics Charts, Deep Inspection, and Topic Discovery systems, described later in this document). Taps 108 reduce system complexity and resource utilization by allowing a stream to be partitioned into multiple branches, which can be processed in parallel. This also permits common operations, such as broad concept matching and noise filtering, to be performed once rather than repeated across multiple streams. Stream data may then be refined downstream by specific filters and tapped at desired access points.

For convenience of understanding, a portion of a mission definition 100 that reaches a respective tap is considered a sub-mission definition. Likewise, although each model includes one or more filters 110, in some implementations, models 110 are concatenated or otherwise arranged with relationships relative to one another in the general graph to form larger models (e.g., parent models). It should be understood, however, that whether an element described herein is referred to as a "filter," "model," "block," "sub-mission definition," or "stage" is purely a matter of convenience of explanation. Such terms can apply interchangeably to processing elements at different hierarchical levels of a mission definition.

Figure 2:
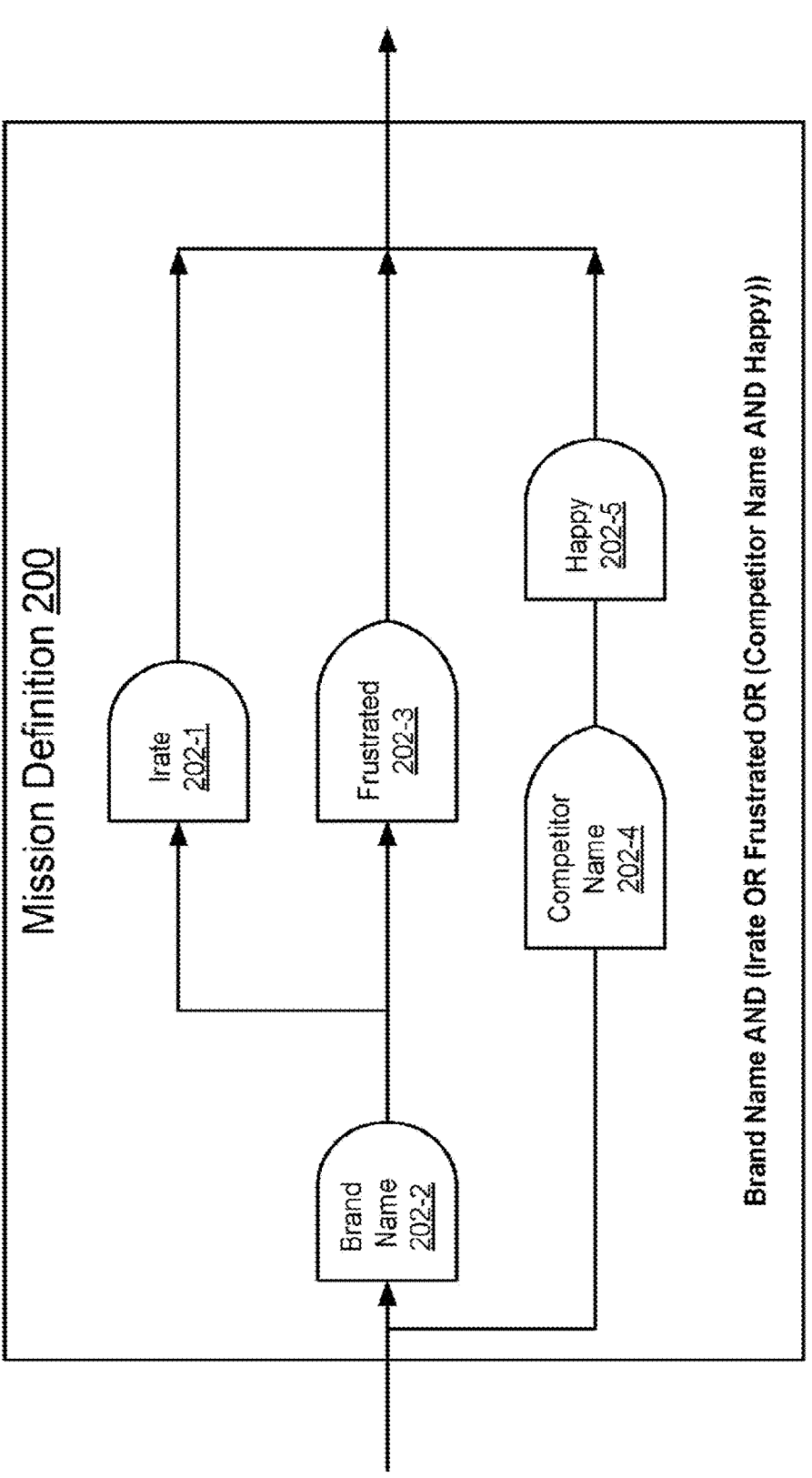
FIG. 2 illustrates an example mission definition, in accordance with some implementations.

FIG. 2 illustrates an example mission definition 200 (e.g., a filter graph). The mission definition 200 (e.g., filter graph) includes several classification models 202 (e.g., filter nodes). Each classification model 202 includes one or more filters that, together, embody a concept. For example, classification model 202-1 indicates whether a respective post represents an "irate" person; classification model 202-2 indicates whether a respective post pertains to a particular brand name (e.g., Chevrolet, Pepsi); classification model 202-3 senses whether the post represents a frustrated person; classification model 202-4 indicates whether a post pertains to a particular competitor's name (e.g., if brand name classification model 202-2 corresponds to "Chevrolet," competitor name classification model 202-4 may correspond to "Ford"); and classification model 202-5 indicates whether a respective post represents a happy person.

When a classification model 202 receives a post, the system (e.g., the processors) executing the mission definition determine whether the post meets predefined criteria with respect to the classification model 202 so as to be "accepted" by the classification model 202. When a post is accepted by the classification model 202, in some implementations, the post progresses further downstream in the mission definition (e.g., when the mission definition is embodied as a directed filter graph, the post follows the direction of the filter edges to the next classification model 202). In some implementations, when the post is accepted, the post is tagged (e.g., in a corresponding data structure) with an identifier of the classification model 202. In some implementations, when the post is not accepted (e.g., is rejected) by classification model 202, the system forgoes tagging the post with the identifier. In some implementations, when the post is not accepted, the system removes the post from the mission definition 200 (e.g., the post no longer progresses through the filter graph).

In some implementations, a classification model 202 includes a reject filter, which can be represented by including a logical "NOT" in the specification for the classification model 202. For example, by including a logical "NOT" in the specification for classification model 202-1, the system will reject all posts corresponding to irate persons. In some implementations, when a post is rejected by a reject filter, it is tagged as rejected with an identifier of the reject classification model 202. In some implementations, when a post is not rejected (e.g., is accepted) by a reject classification model 202, it is not tagged (e.g., the system forgoes tagging the post). In some implementations, when a post is rejected, it is removed from the mission definition 200. In some implementations, the post continues to progress through the mission definition 200 regardless of whether it was rejected or not. By tagging rejected posts as rejected and allowing the posts to continue through the mission definition, more information is available for future analytics.

Classification models 202 (e.g., filter nodes) that occur on parallel branches of the mission definition 200 represent a logical "OR" relationship between the classification model. Classification models 202 that occur in series represent a logical "AND" relationship between the classification models.

In some implementations, a post is "matched" to the mission definition 200 if the post proceeds all the way through the mission definition 200 using at least one path through the mission definition 200 (e.g., is accepted by all of the accept classification models along the at least one path and is not rejected by all of the reject models along the at least one path).

In this manner, the mission definition 200 is designed to determine when a post indicates that its author is either frustrated or irate with a particular brand (e.g., according to the path corresponding to Brand Name Model AND [Irate OR Frustrated]) or alternatively, whether a post indicates that its author is happy with a competitor (e.g., according to the path corresponding to a Competitor Name AND Happy).

In this example, the mission definition 200 produces high-value information to a company owning the particular brand because in either case (e.g., whether a post was accepted through either path or both), the company will be able to intervene to limit the spread of information that is harmful to the company's reputation.

Figure 3:
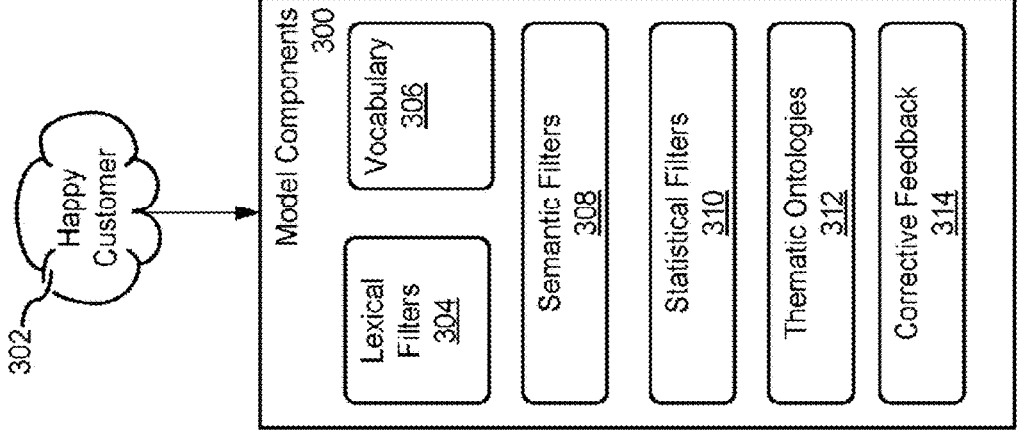
FIG. 3 illustrates example components of a model for "Happy Customers," in accordance with some implementations

FIG. 3 illustrates example components of an example model 302 for "Happy Customers." In some implementations, the model includes one or more of the group consisting of: lexical filters 304, vocabulary filters 306, semantic filters 308, statistical filters 310, thematic ontologies 312 and corrective feedback 314.

FIG. 4 illustrates a simple mission definition 400 including a single model 401. In this example, the model 401 is a model for "thankful/satisfied" customers, which classifies posts according to whether they represent a generically (e.g., without regard to a particular brand) thankful or satisfied customer. The model 401 includes a plurality of filters embodied as regular expressions, such as the regular expression 402, which accepts phrases such as "Best Car Wash Ever," "Best Burger Ever," and "Best Movie I Have Ever Seen." The model also includes regular expression 404, which accepts phrases such as "XCleaner does wonders!" and "That lip balm did wonders for me!").

Figure 5A:
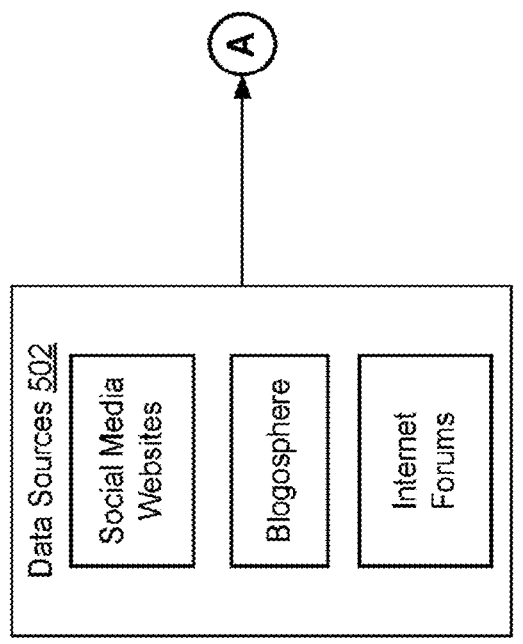
FIGS. 5A-5B illustrate a schematic representation of a massively-parallel computer system for real-time extraction of high-value information from data streams, in accordance with some implementations.
Figure 5B:
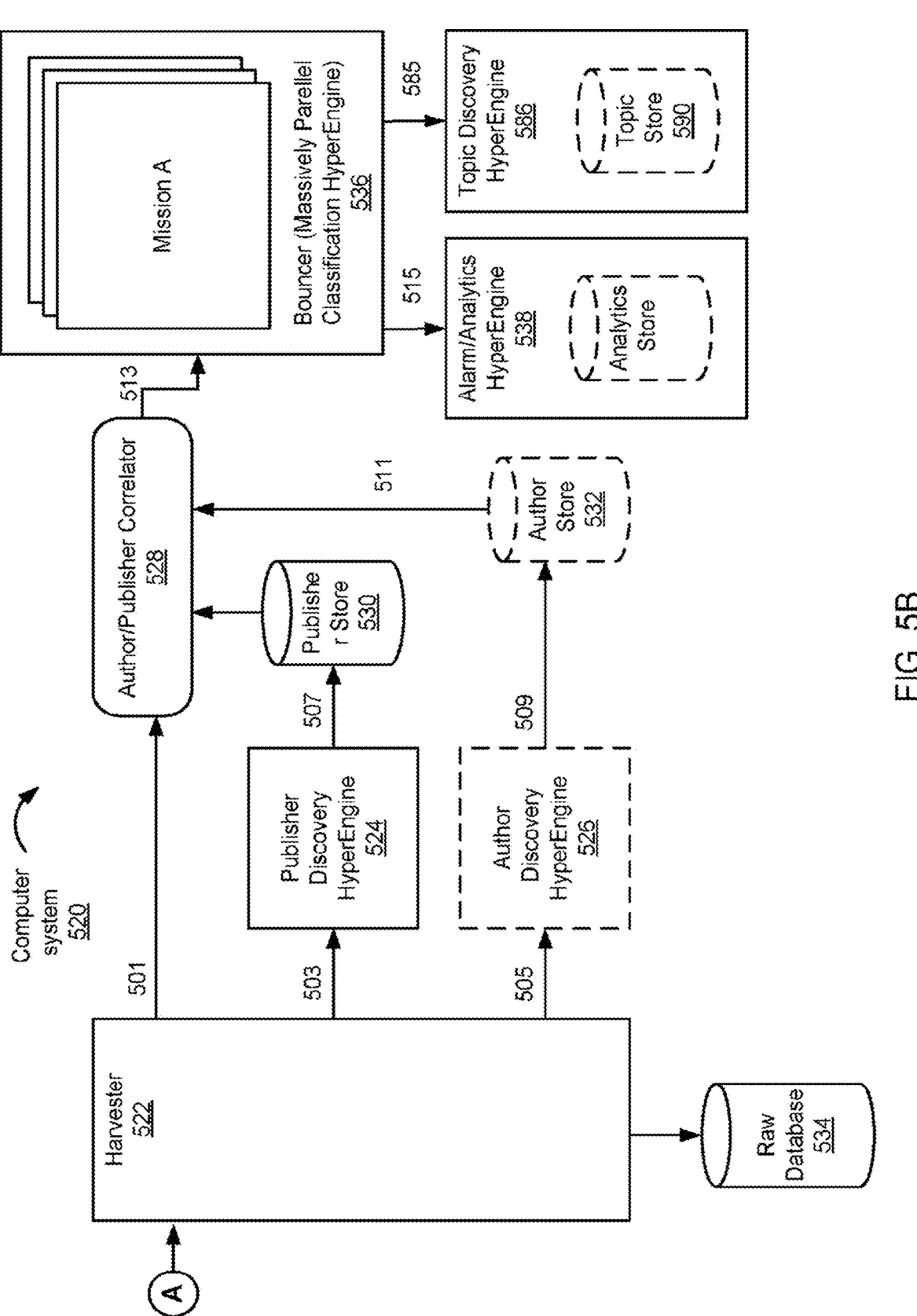

Massively-Parallel System Architecture and Method for Real-Time Extraction of High-Value Information from Data Streams FIGS. 5A-5B illustrate a data environment that includes data sources 402 and a schematic representation of a massively-parallel computer system 520 for real-time extraction of information satisfying one or more mission definitions (e.g., filter graphs), which may be of high value for a user of the system (hereinafter referred to as "high-value information") from data streams, according to some implementations. System 520 includes a Harvester 522. Harvester 522 collects posts (e.g., data) from multiple Data Sources 502 (see FIG. 5A) such as social media websites, internet forums that host conversation threads, blogs, news sources, etc. In some implementations, the posts include a content portion and one or more source characteristics, such as an author and/or a publisher. In some implementations, the Data Sources 502 include smart thermostats, gas/electric smart meters, automobiles, or any other source of real-time data. In some implementations, as described below, the Harvester 522 generates one or more packets from each post, including, in some implementations, a content packet (sometimes hereinafter referred to as a "snippet"), a publisher packet and/or an author packet. For example, in some implementations, a post will originate from a social media site or blog, and the corresponding snippet generated by the Harvester 522 includes the text and/or title of post, the author packet includes a name of the person who wrote the post, and the publisher packet includes the site or blog from which the post originated.

In some implementations, collected posts are indexed and stored upon harvesting (e.g., in real-time) so that full-data searches can be executed quickly (e.g., in Raw Database 534). In some implementations, the collected posts are indexed and stored in near real-time. Because data comes in many different formats (e.g., from the various data sources 502), in some implementations, the Harvester 522 performs an initial normalization of each post. In some implementations, this initial normalization includes identifying the content (e.g., the text of a social media post), the author, and the publisher. In some implementations, the normalized data is divided and sent down three paths: a snippet path 501, a publisher path 503, and an author path 505. In some implementations, all of the collected data corresponding to a respective post is passed down each of the three paths 501, 503, 505. In some implementations, a distinct subset of the collected data is passed down each of the three paths (e.g., a first subset is passed down the snippet path 501, a second subset is passed down publisher path 503, and a third subset is passed down author path 505).

Data passed down the publisher path 503 is provided to a Publisher Discovery HyperEngine 524 for inspection of the data in order to develop a publisher profile. Alternatively, in the event that a publisher profile already exists for a respective publisher, the inspection result of the data is provided to the Publisher Discovery HyperEngine 524 to refine (e.g., update) the publisher profile. The publisher profile (or alternatively the refined publisher profile) is passed down path 507 and stored in publisher store 530.

Likewise, data passed down the author path 505 is provided to an Author Discovery HyperEngine 526 for inspection of the data in order to develop an author profile. Alternatively, in the event that an author profile already exists for a respective author, the inspection of the data is provided to the Author Discovery HyperEngine 524 to refine (e.g., update) the author profile. The author profile (or alternatively the refined author profile) is then passed down path 509 and stored in author store 532.

In some implementations, the inspection of the collected data during publisher discovery (e.g., by the Publisher Discovery HyperEngine 524) and author discovery (e.g., by Author Discovery HyperEngine 526) may be too time-consuming for achieving real-time processing (e.g., classification) of author and publisher packets. For this reason, each respective snippet is passed via snippet path 501 to an Author/Publisher Correlator 528, which performs real-time data correlation with existing information about the respective snippet's author and publisher (e.g., information obtained by inspection of previous snippets originating from the same author or publisher, but not including information obtain by inspection of the respective snippet, since that would require prohibitively long processing times). For example, at this point information from a well-known author would be associated with a current snippet/post from the same author. Thus, a correlated snippet is produced that includes author/publisher information.

A respective correlated snippet is passed to the Bouncer 536 in which the correlated snippet is compared to one or more high specificity data stream filters (e.g., executable mission definitions), each defined by a set of models, each model including one or more filters. The filters are organized into a general graph that determines what type of data to accept and what type of data to reject based on contents and metadata (such as author/publisher information, demographics, author influences, etc.) associated with the post/snippet.

In some implementations, information about a snippet (whether accepted by any filters or not) is passed to the Alarm/Analytics HyperEngine 538, which determines if and how to deliver messages (e.g., to an end-user) and/or when to issue alarms/alerts. In some implementations, information about those snippets that were accepted by at least one filter is passed to the Alarm/Analytics HyperEngine 538. The Alarm/Analytics HyperEngine 538 generates statistics based on the incoming information and compares the statistics against configurable thresholds and triggers alarms for any violations. Trigger alarms are routed to their designated recipients based on the mission definition's alarm delivery policy (e.g., a customer relationship management system, an e-mail message, a short-message service message, etc.).

For example, in some circumstances, companies often use employees to make house calls to customers. Such companies have a strong interest in ensuring that such employees are good representatives of the company. Thus, such a company will want to know if a customer complains on an online forum (e.g., FACEBOOK, TWITTER) about the representative's behavior during the house call. The company may create a "bad employee" mission, with a predefined set of alarms (e.g., an alarm for if a post accuses an employee of drug use, profanity, or the like, during the house call). Each of these alarms triggers an e-mail message to a high-level company executive who can proactively deal with the problem, for example, by disciplining the employee or reaching out to the customer to make amends. Alternatively, or in addition, the alarms correspond in some implementations to statistical trends. For example, an alarm for a fast food corporation may indicate an unusual number of people complaining online of feeling sick after eating at the corporation's franchises (or at a particular franchise).

In some implementations, information about snippets (e.g., the text of the snippets, the entire snippets) is passed to Topic Discovery HyperEngine 586. Topic Discovery HyperEngine 586 generates statistical topic models associated with a plurality of snippets. To this end, on some implementations, the snippets (e.g., electronic posts), whether accepted by any filters or not, are passed from the Bouncer 536 to the Topic Discovery HyperEngine 586, which generates a trimmed lexicon of candidate terms that includes proximity n-grams and clusters related snippets based on a topic (e.g., a set of candidate terms) with the highest probability of occurring in the clustered snippets.

In some circumstances, the plurality of snippets is the set of snippets that have been accepted by a respective mission. So, for example, when a mission produces (e.g., by filtering) snippets that are pertinent to a particular topic (e.g., cars), those snippets are be made available to Topic Discovery HyperEngine 586 as a corpus from which to generate statistical topic models (e.g., by clustering the plurality of electronic posts). Heuristically, these statistical topic models may be viewed as automatically discovered "trending" subtopics that are present in those snippets that are pertinent to cars. The Topic Discovery HyperEngine 586 stores information related to the snippets, such as topic information, in the topic discovery store 590. The functionality of the Topic Discovery HyperEngine 586 is described in more detail in FIGS. 20 and 24.

Figure 6:
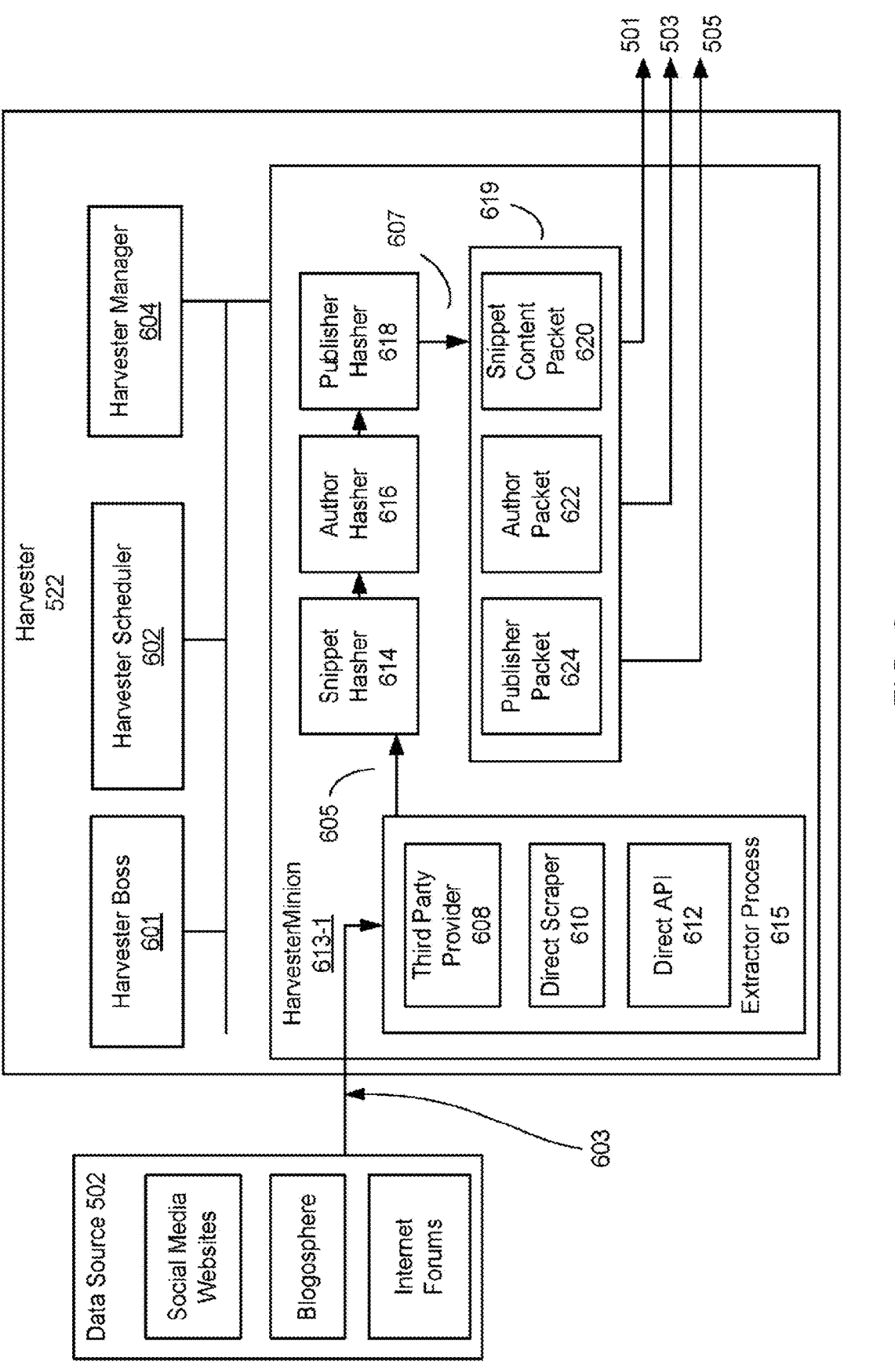
FIG. 6 illustrates a schematic representation of a data harvester, in accordance with some implementations.

FIG. 6 illustrates a schematic representation of the Harvester 522 in greater detail, in accordance with some implementations. In some implementations, the Harvester 522 runs a master harvester process called the Harvester Boss 601. Harvesting operations are performed by one or more servers running Harvester Minion 613 processes. In addition, the Harvester 522 includes a Harvester Scheduler 602 and a Harvester Manager 604. The Harvester Boss 601 passes instructions to the various Harvester Minion 613 processes. As described below, among other operations, the Harvester Minion 613 runs various modules that combine to receive posts from a variety of data sources 502 and generate snippet, author and/or publisher packets corresponding to posts from the data sources 502. Because posts come from a range of sources, the Harvester 522 includes modules 608, 610 and 612 that are configured to interact with the different types of sources. For example, a third party provider module 608 is configured to operate on posts obtained from third party providers 608 (e.g., when the posts are not obtained directly from the source), a direct scraper 610 is configured to directly scrape public information from websites and other internet information resources, and a direct API module 612 is configured to access information from websites through direct APIs provided by those sites. Regardless of the module used harvest a respective post (e.g., the modules 608, 610 and 612), the respective post is passed via path 605 to one or more hashing modules (e.g., snippet hasher 614, author hasher 616, publisher hasher 618) which each perform hashing of a respective post component (e.g., content, author, or publisher information) so as to provide one or more hash-based IDs for snippet, author and publisher information, respectively. The posts, along with the one or more hash-based IDs, are then passed to packetizer 619 which produces one or more of a snippet packet 620, an author packet 622, and a publisher packet 624, which are described in greater detail below.

The different data sources 502 (e.g., social media websites or other sites that provide comprehensive, real-time information streams, or sites such as internet forums that do not provide streaming posts), can be classified according to their respective connection type and dataset completeness. In some implementations, connection types include "continuous real-time stream" and "scheduled API call." Dataset completeness can be "full," indicating all data provided by a connection is collected, and "keyword filtered," indicating only snippets that match at least one keyword in a specified dataset are received.

The Harvester Scheduler 602 periodically checks a timetable of sources stored in memory (e.g., by running a job scheduler such as Cron in UNIX or UNIX-like operating systems). The timetable of sources is used to keep track of the last known time the system has collected data from a particular source (e.g., a particular internet forum). Once a source is due for data harvesting, the source is scheduled into Harvester Boss 601. Harvester Boss 601 locates an available machine by contacting Harvester Manager 604 and passes the source information to a Harvester Minion 613, running on one machine. For ease of explanations, Harvester Minion 613 processes are explained with regard to a single Harvester Minion 613. It should be understood that, in some circumstances, one or more Harvester Minions 613 are running on one or more servers at any given time. Continuous stream-based sources that do not require a periodic API call are scheduled once. Harvester Minion 613 is responsible for maintaining the uptime for these types of stream-based data sources.

Alternatively, for sources with scheduled periodic API calls, Harvester Minion 613 schedules work by spawning as many Extractor Processes 615 as needed to maintain full keyword coverage without overloading the system. The Harvester Minion 613 will also periodically check its available resources and pass that information on to the Harvester Manager 604.

In some implementations, Extractor Processes 615 spawned by Harvester Minion 613 load a relevant extractor code for a respective source (e.g., direct scraper code, or API call code). Thus, in some implementations, system 520 receives a plurality of data streams 603 each corresponding to a respective data source 502 and receives a plurality of posts from each respective data source 502. In some implementations, an Extractor Processes 615 interacts (e.g., using Third Party Provider module 608) with third-party data providers such as SocialMention™, BoardReader™, or MoreOver™. Source codes also optionally utilize one or more direct scrapers 610. For example, in some circumstances, a pharmaceutical company may be interested in monitoring activity on a niche internet forum (e.g., they might want to monitor internet lupus forums in connection with the manufacture of a new lupus treatment). Third-party data providers, however, will often not provide real-time data streams with data from such niche forums. In such circumstances, the Harvester 522 includes a custom scraper that caters to the particular pharmaceutical company's interests. In some implementations, the Harvester 522 includes one or more direct application program interfaces (APIs) 612 provided by respective websites. For example, some social media websites allow users to publish certain data openly. The social media website will often provide APIs so that outside developers can access that data.

Each post is extracted by the Harvester 522 via an extractor process spawned by a Harvester Minion 613. The Harvester Minion 613 loads the relevant extractor code for a respective source (e.g., direct scraper code, API call code) when spawning the extractor processes 615. The Harvester 522 receives, via a data stream 603, a raw coded post and the raw coded post is hashed using a hash function (such as a universal unique identifier, or UUID, standard) and backed up in the raw database 534 (FIG. 5). For example, the extractor process decodes an incoming post received from a respective data stream 603 and generates UUIDs for the contents of the post (text and title, Snippet Hasher 614), the author of the post (who wrote the snippet, Author Hasher 616), and the publisher of the post (where the snippet came from, Publisher Hasher 618), respectively. The extractor process 615 generates a plurality of packets corresponding to the post including one or more of: a snippet contents packet, an author packet, and a publisher packet. Packets are encoded using appropriate data structures as described below with reference to FIG. 7. Snippet contents packets are transmitted via the snippet packet channel 501 to other services including the Bouncer 536. Publisher packets are transmitted via publisher packet channel 503 to Publisher Discovery HyperEngine 524 for publisher profile development, as explained below. Author packets are transmitted via author packet channel 505 to Author Discovery HyperEngine 526 for author profile development, as explained below. Packets of a particular type (e.g., snippet contents, author, or publisher) are aggregated such that packets of the same type from different extractor processes on the system are combined into one stream per channel.

Figure 7:
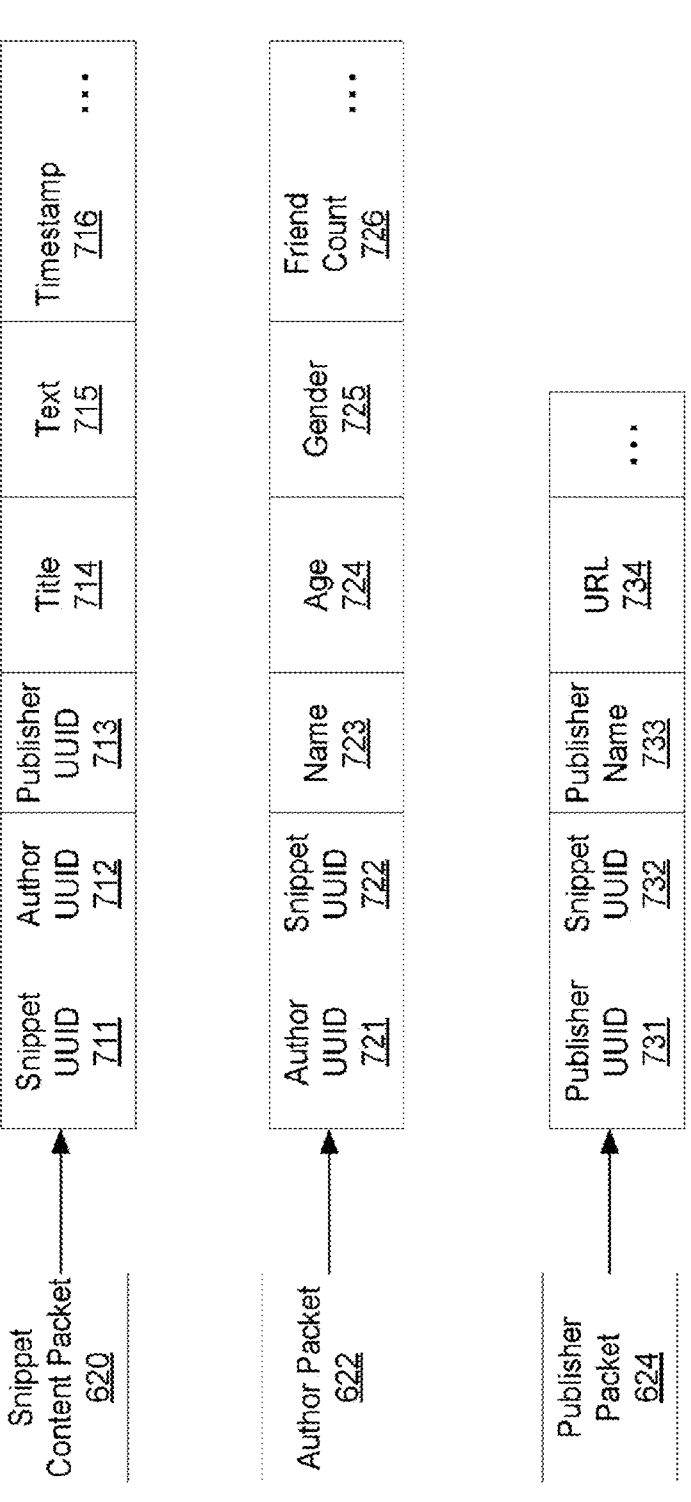
FIG. 7 illustrates example data structures for snippet packets, in accordance with some implementations.

FIG. 7 illustrates example data structures for snippet packets 620, author packets 622, and publisher packets 624. Snippet packets 620 include a field for a hash key created by Snippet Hasher 614 for the snippet (Snippet UUID 711), a hash key created by Author Hasher 616 for the author of the snippet (Author UUID 712), and a hash key created by Publisher Hasher 618 for the publisher of the snippet (Publisher UUID 713). Author UUID 712 and Publisher UUID 713 are used by Author/Publisher Correlator 528 (FIG. 1) to associate other information about the author and publisher with the snippet in real-time, including an author's job, gender, location, ethnicity, education, and job status. Snippet packet 620 also optionally includes a title 714, text 715 (e.g., if the snippet corresponds to a social media post), and a timestamp 716, as well as other fields. Author packet 622 includes Author UUID 721, Snippet UUID 722 (e.g., through which the system can retrieve the snippet and corresponding author profile during deep author inspection by Author Discovery HyperEngine 524, FIG. 1). Author packet 622 optionally includes other fields containing information that can be garnered from the original post, such as a name 723 of the author, an age 724, a gender 725, and a friend count 726 (or a follower count or the like). Publisher packet 624 includes publisher UUID 731, snippet UUID 732 (e.g., which is used for later deep author inspection by Publisher Discovery HyperEngine 526, FIG. 1). Publisher packet 624 optionally includes other fields containing information that can be garnered from the original snippet, such as a publisher name 733, a URL 734 and the like. These data structures are optionally implemented as JavaScript Object Notation (JSON) encoded strings.

Snippet packets 620 are passed via path 501 (FIG. 5) from Harvester 522 to Author/Publisher Correlator 528 for author publisher/correlation, as described in greater detail with reference to FIG. 8.

Figure 8:
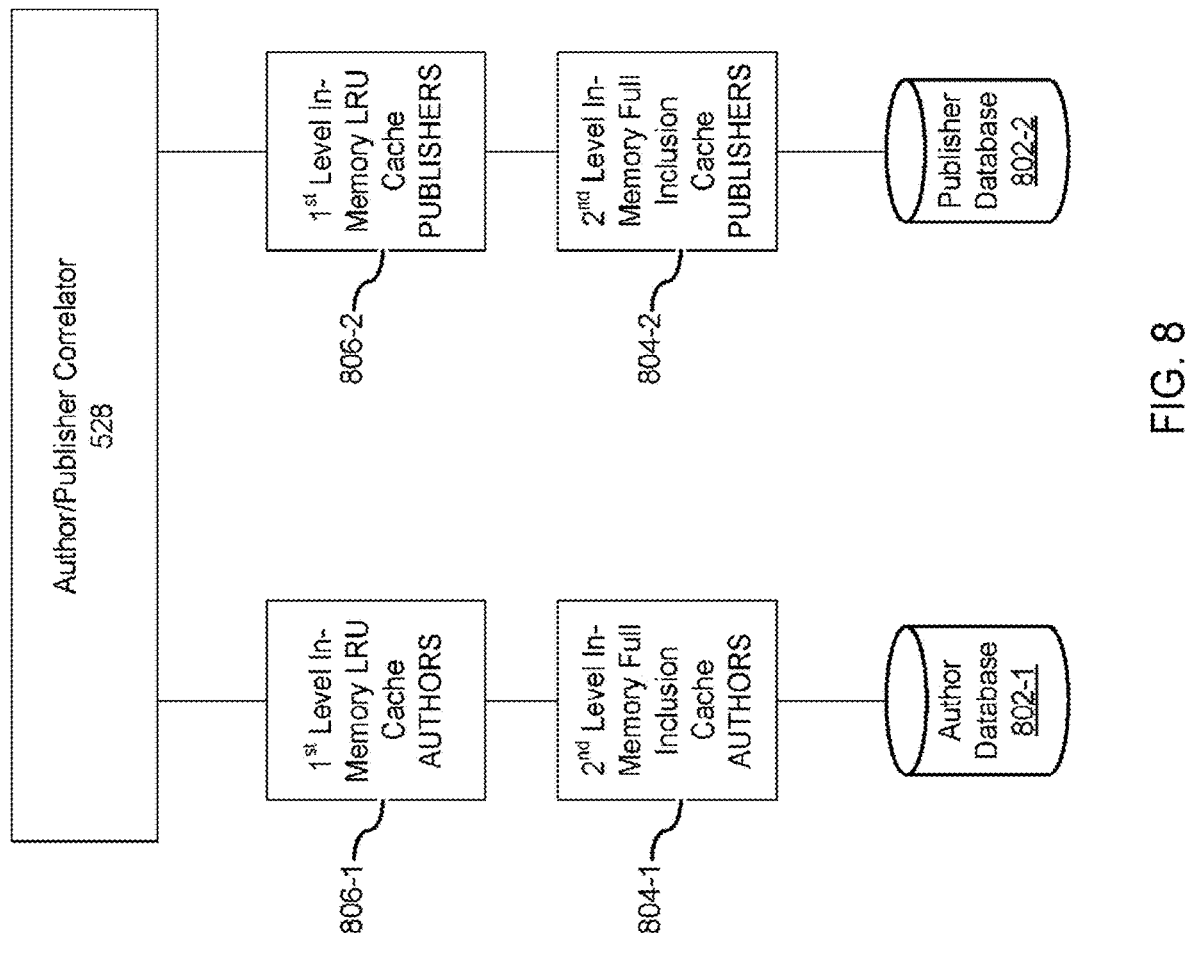
FIG. 8 illustrates an architecture for achieving fast author/publisher correlation, in accordance with some implementations.

FIG. 8 illustrates a memory architecture for achieving fast author/publisher correlation. Snippet packets are processed by the Bouncer 536 (FIG. 5B) according to their associated publisher and author information (including demographics), in addition to snippet content. To execute filters requiring this additional information while keeping the filtering process scalable and execution times meeting real-time requirements (e.g., on the order of 50 milliseconds), Author/ Publisher Correlator 528 quickly (e.g., in real-time) correlates snippets with previously known data about their publishers and authors. A 3-level storage system is used to accomplish this fast correlation procedure. All author and publisher information is stored in a highly scalable data base system 802 (3rd level). All data is also pushed into an in-memory cache 804 (2nd level) that contains a full mirror of the author/publisher information. Lastly, the correlation processors maintain a least recently used (LRU) first level cache 806 in their own memory address space (1st level). For example, when a snippet is received, the Author/Publisher Correlator 528 performs a lookup operation attempting to access the snippet from the first level author cache 806-1 using the Authors UUID 721 as a hash key. When the lookup operation returns a cache miss, first level author cache 806-1 transmits the request to the second level author cache 804-1. When the lookup operation returns a cache miss at the second level author cache 804-1, the request is forward to author database 802-1, where it is read from disk.

Referring again to FIG. 5B, correlated snippet packets 513 are passed to the Bouncer 536 for processing. In some implementations, the processing in the Bouncer 536 includes parallel execution of multiple mission definitions (e.g., filter graphs) on every snippet packet 513 that is passed to the Bouncer 536. Efficient distribution of processing required by each mission definition (e.g., distribution to respective processors of the classification filters that are executed to classify, accept and/or reject the posts/snippet packets 513) enable the classification system 520 to process enormous numbers of posts per minute.

Figure 9:
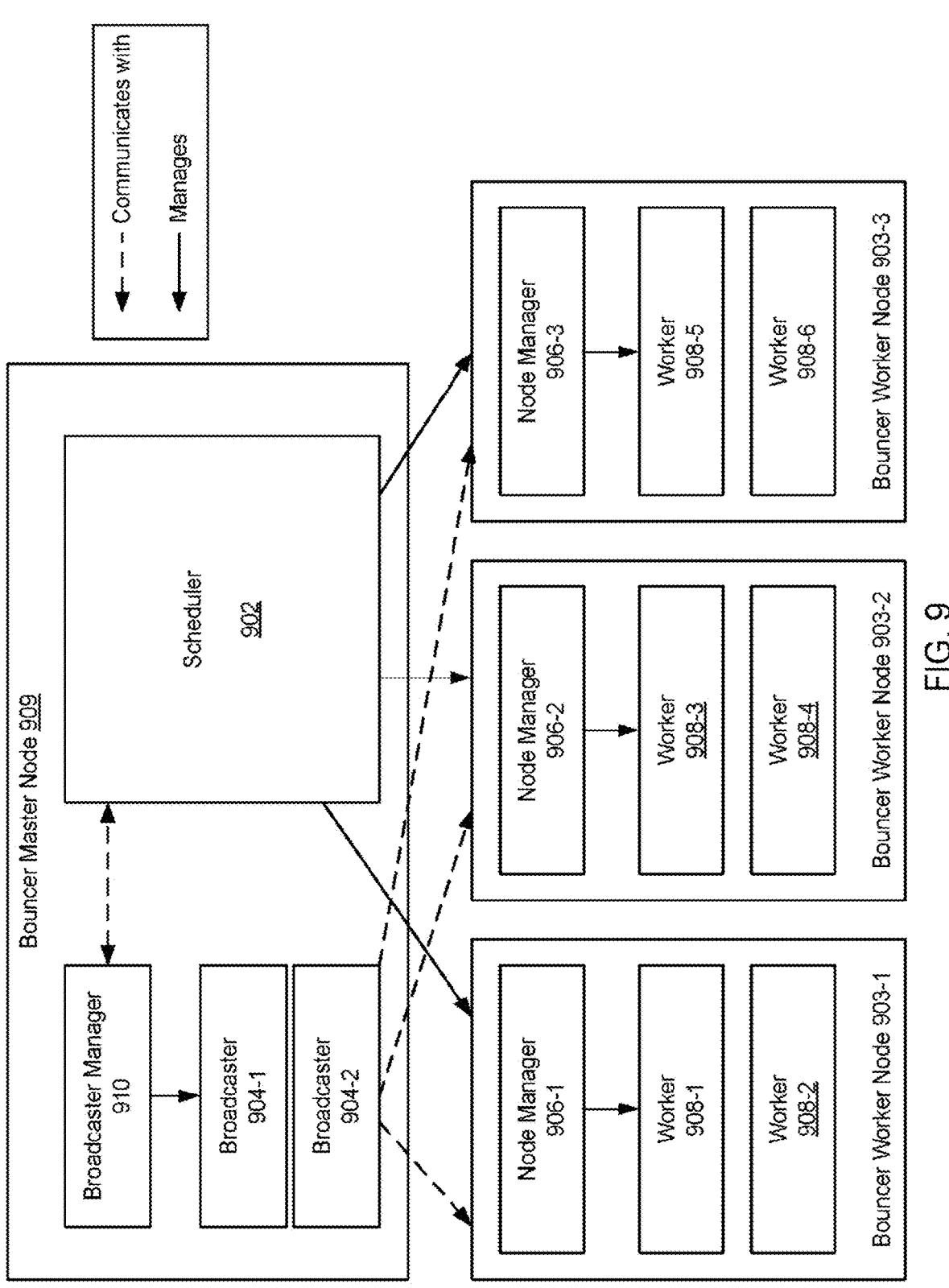
FIG. 9 illustrates a massively parallel classification (e.g., filtering) system, in accordance with some implementations

FIG. 9 illustrates Bouncer 536 in greater detail. Bouncer 536 is a real-time massively parallel classification (filtering) system. The filtering specification is specified via a set of regular expressions encapsulated in an object called a mission definition (as described above in greater detail, e.g., with reference to FIG. 1 and FIG. 2). A mission definition is a high specificity data stream filter network defined by a set of filtering "models," and taps (e.g., leaf nodes) organized in a general graph that defines what type of data to accept and what type of data to reject, based on content and metadata, including information such as publisher, author, author demographics, author influence. Filters within a model are converted to finite state automata such as deterministic finite automata (DFAs) or non-deterministic automata (NDAs), and automatically parallelized and executed on multiple processing engines. The filtered data stream can be delivered to one or more destinations of various types, including, but not limited to, customer relationship management (CRM) systems, web consoles, electronic mail messages and short message service (SMS) messages.

As shown in FIG. 9, the Bouncer 536 is divided into four main components: a Scheduler 902, one or more Broadcasters 904, one or more NodeManagers 906 and one or more Workers 908. The Scheduler 902, Broadcasters 904, and an additional Broadcaster Manager 910 run on a master machine called Bouncer Master Node 909. NodeManagers 906 and Workers 908 run on slave machines called Bouncer Worker Nodes 903. Broadcaster Manager 910 manages and monitors the individual Broadcasters 904. Broadcasters 904 receive snippets from Harvester 522. Broadcasters 904 transmit the received snippets to Workers 908 and Workers 908 determine which mission definitions (e.g., filter graphs) accept those snippets. Scheduler 902 and NodeManagers 906 manage the execution of Workers 908 and update them as the mission definition descriptions change. All interprocess communication in Bouncer 536 is accomplished through a dedicated queue manager.

Figure 10:
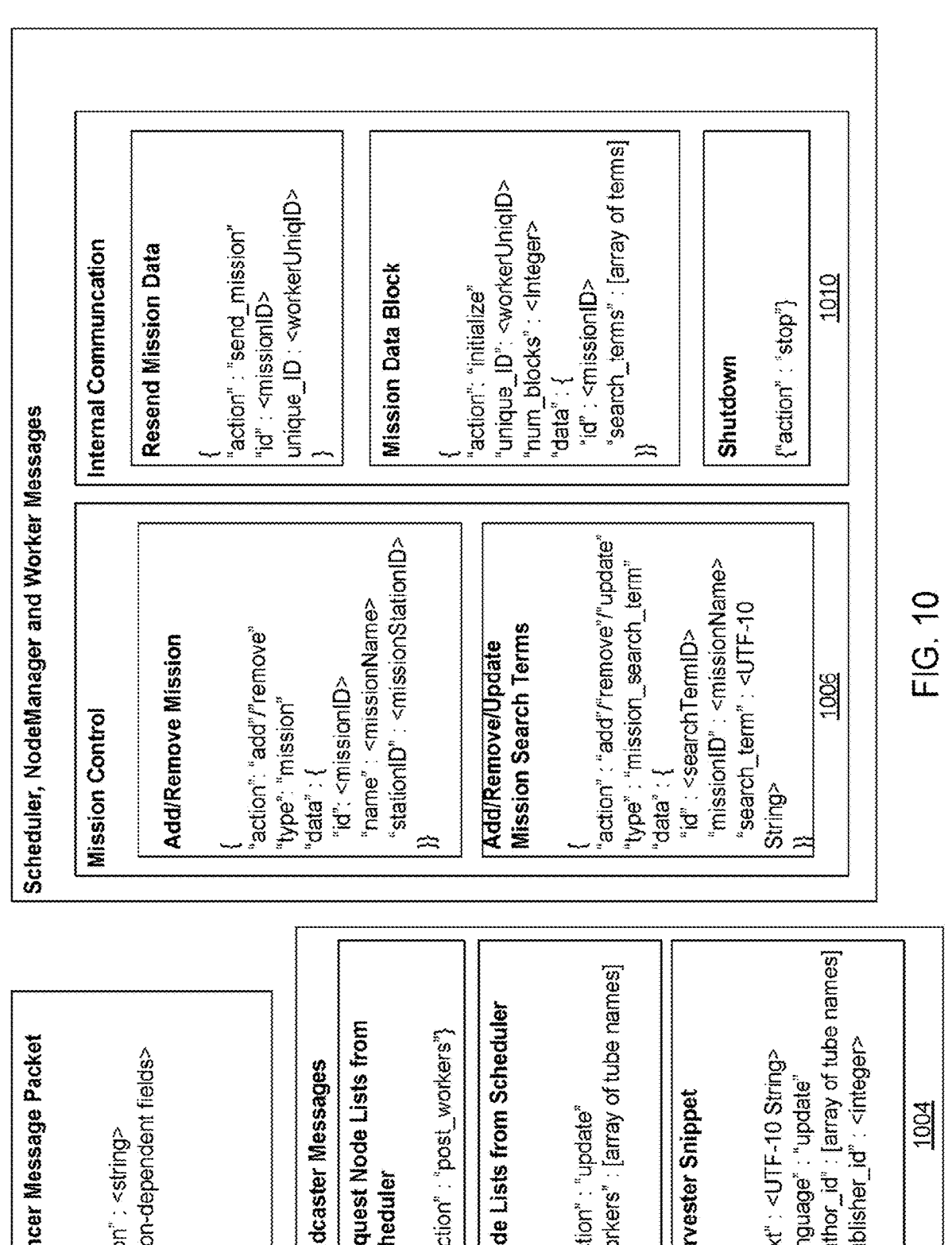
FIG. 10 illustrates example data structures for messages within the massively parallel classification (e.g., filtering) system, in accordance with some implementations.

FIG. 10 illustrates example data structures for Bouncer Message Packets 1002. In some implementations, messages in Bouncer 536 are JSON-encoded strings. Messages have an "action" field that tells a receiving process (e.g., a worker 908) what to do with it. For example, possible values for the "action" field include: "add," "remove," "update," "send-_mission definition," "initialize," or "stop." Messages also have a "type" field. Possible values for the "type" field include "mission definition" and "mission definition _search_term." The data fields vary depending on the type. For example, several example structures (e.g., specific examples of Bouncer Message Packets 1002) for broadcaster messages 1004, mission definition control message 1006, and internal communication message 1008 are shown in detail in FIG. 10. Broadcaster messages 1004 include snippets. Mission definition control messages 1006 include messages that add and remove mission definitions, and messages that add and remove search terms from a particular mission definition (e.g., filter graph). Internal communication messages 1010 include messages requesting that the Bouncer Master Node 1010 resend mission definition data, or shutdown a mission definition altogether.

The Scheduler 902 is the master process of the bouncer system. Scheduler 902 receives data about the mission definitions from a compiler (which is discussed in more detail with reference to FIG. 15). Scheduler 902 stores the data an internal hash table. When a particular worker 908 or NodeManager 906 fails, the scheduler 902 resends the relevant mission definition data using the internal hash, so as not to interact with the compiler more than necessary. Scheduler 902 also manages a list of machines performing the regular expression matching.

Referring again to FIG. 9, when the Scheduler 902 needs to use a machine for regular expression matching, it spawns a NodeManager 906 process to manage all workers on that machine. Whenever Scheduler 902 receives an update from the Broadcaster Monitor telling it to create a new mission definition, it forwards that update message to a respective NodeManager 906. Any future updates to that mission definition are also forwarded to the respective NodeManager 906.

When a NodeManager 906 is added to Bouncer 536, Scheduler 902 notifies Broadcaster Manager 910 so it can start broadcasting to Bouncer Worker Node 903 corresponding to the NodeManager 906. Alternatively, whenever a NodeManager 906 is removed from Bouncer 536, Scheduler notifies Broadcaster Manager 910 so it can stop broadcasting to Bouncer Worker Node 903 corresponding to the Node-Manager 906. If Scheduler 902 receives an update that it cannot currently process (such as adding a search term to a mission definition that does not yet exist), Scheduler 902 places the update in a queue, and will attempt to handle it later. This allows messages that are received out-of-order to be roughly handled in the correct order. Messages that cannot be handled in a specified amount of time are deleted.

Broadcasters 904 are the connection between Bouncer 536 and Harvester 522. Broadcasters 904 receive snippets from the Harvester 522, and broadcast them to each Bouncer Worker Node 903 via a NodeManager 906. Scheduler 904 sends a list of NodeManagers 906 to Broadcaster Manager 910, who manages all the broadcaster processes that are running in parallel. In order to decrease the load on an individual broadcaster, the number of broadcaster processes is dynamically changed to be proportional to the number of NodeManagers 906. Broadcaster Manager 910 ensures that at least a desired number of broadcasters are running on Bouncer Master Mode 909 at a given moment, restarting them if necessary.

Broadcaster performance affects the overall performance of Bouncer 536. If the Broadcaster 904 cannot send snippets as fast as it receives them, the latency of the system increases. To avoid this, Harvester 522 manages snippet traffic as to not put too much load on any one individual Broadcaster 904. This is accomplished by making Harvester 522 aware of the current number of broadcaster processes in Bouncer 536, and having Harvester 522 send each snippet to a randomly selected broadcaster 904.

The Bouncer 536 needs to scale well as the number of mission definitions (e.g., filter graphs) increases. In implementations in which Broadcasters 904 communicate directly with Workers 906, the number of connections required is O(NM) where N is the number of mission definitions and M is the number of Broadcasters 904 (since each Broadcaster 904 must have a connection to each Worker 908). This will quickly surpass the maximum connection limit of a typical server running a fast work queue (such as a Beanstalk'd queue or an open source alternative). Thus, it is preferable to introduce an extra layer between Workers 908 and Broadcasters 904. In some implementations, the NodeManager 906 has one instance on each Bouncer Worker Node 903 in the Bouncer 536, and acts like a local broadcaster. The Broadcasters 904 then only need to broadcast to all Node-Managers 906 (of which there are far less than the number of mission definitions). The NodeManager 906 can then broadcast to the local Workers 908 using the local queues, which are much more efficient than global distributed queues when in a local context.

In some implementations, Bouncer 536 includes a plurality of Bouncer Worker Nodes 903. Each Bouncer Worker Node 903 is a machine (e.g., a physical machine or a virtual machine). Each Bouncer Worker Node 903 runs a single instance of a NodeManager 906 process, which is responsible for handling all the worker processes on that machine. It responds to "add" and "remove" messages from Scheduler 902, which cause it to start/stop the worker processes, respectively. For example, the NodeManager 906 starts a worker 908 when it receives an "add" message from its Scheduler 902. The worker 908 can be stopped when NodeManager 906 receives a message with the "stop" action. When a mission definition's search terms are updated, Scheduler 902 sends a message to the appropriate NodeManager 906, which then forwards the message to the appropriate Worker 908. Unlike Scheduler 902 and Workers 908, NodeManager 906 does not maintain an internal copy of the mission definition data, since its purpose is to forward updates from Scheduler 902 to Workers 908. It also routinely checks the status of Workers 908. If one of its Workers 908 has failed, NodeManager 906 restarts the Worker 908 and tells Scheduler 902 to resend its mission definition data.

Figure 11A:
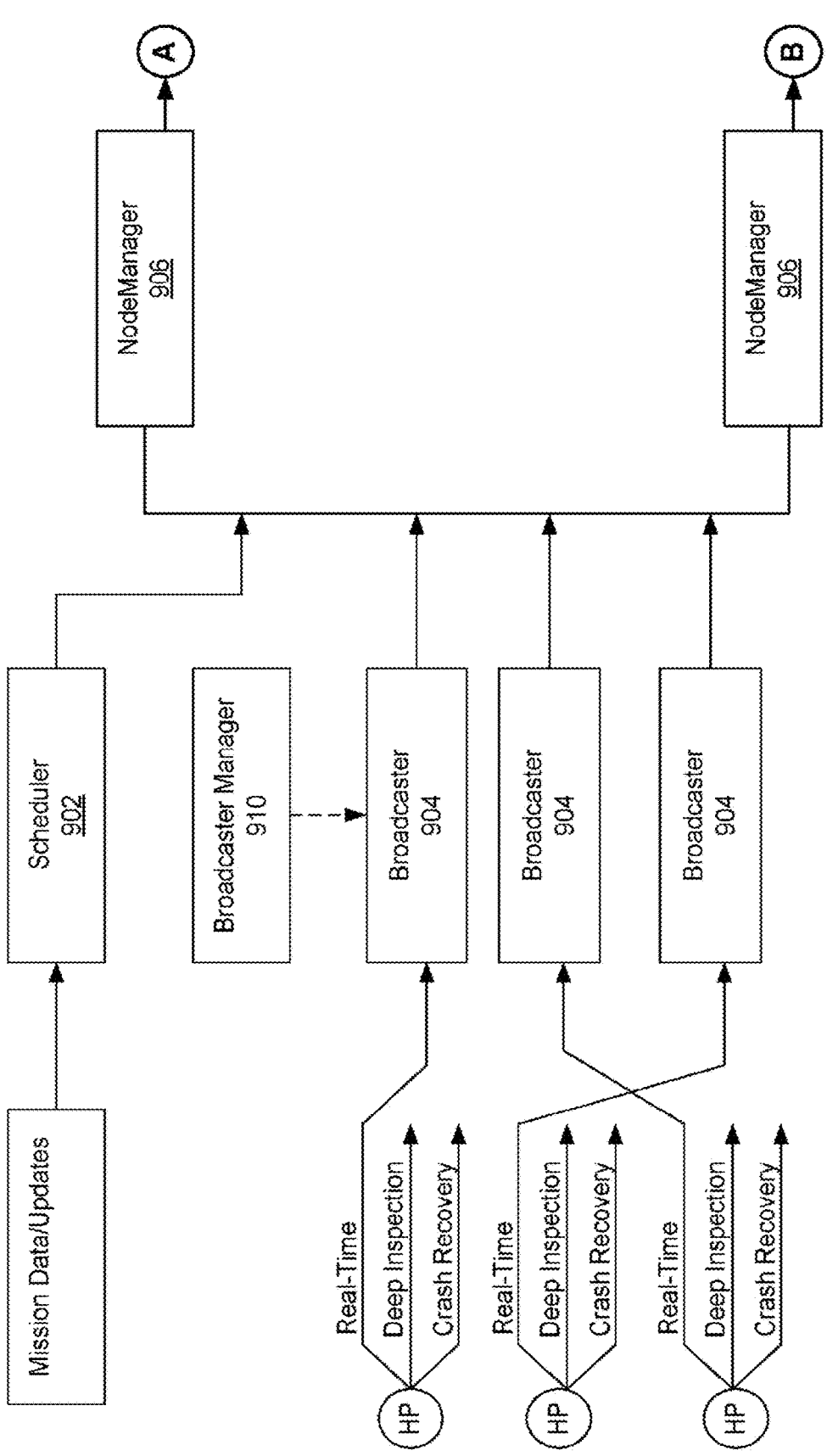
FIGS. 11A-11B illustrate an example flow for snippet processing, in accordance with some implementations.
Figure 11B:
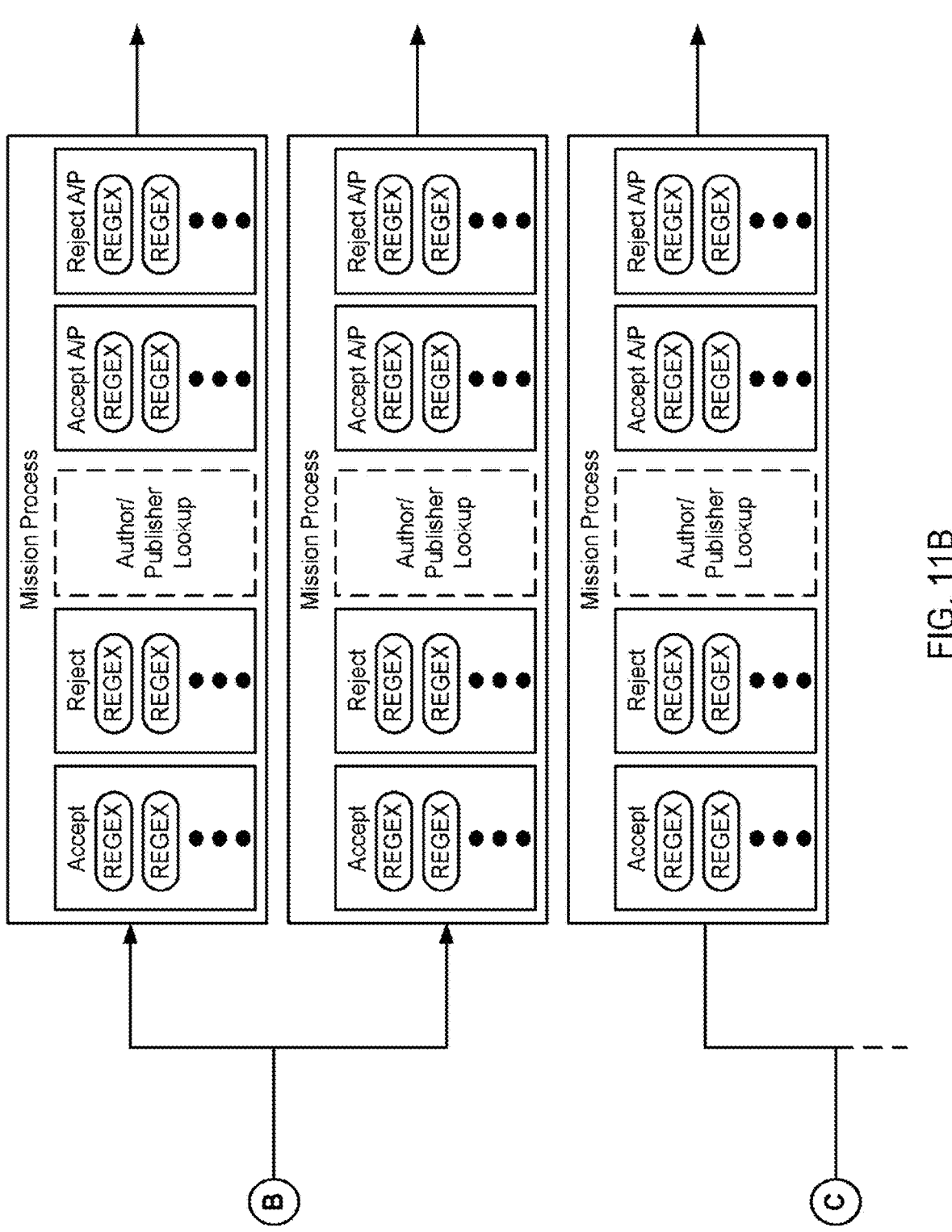

FIGS. 11A-11B illustrate an example flow for snippet processing. In some implementations, NodeManager 906 serves as the entry point for snippets on the Bouncer Worker Node 903. Snippets are sent to the NodeManager 906 via a fast work queue (e.g., a Beanstalk'd queue), and NodeManager 906 then broadcasts the snippets to all Workers 908. NodeManager 906 also manages a message queues (e.g., POSIX message queues) that are used to communicate with the Workers 908.

The worker processes the regular expression matching for Bouncer 536. There is typically one worker process per mission definition, so each worker has all the regular expression data needed to match snippets to its mission definition. By doing so, each worker operates independently from the others, thus avoiding any synchronization costs that would arise if the regular expressions of a mission definition were split over multiple workers. This parallelization method also scales well as the number of mission definitions increase, since the number of mission definitions does not affect the work done by a single worker (like it would if a worker handled multiple mission definitions).

In some implementations, a respective Worker 908 (e.g., a Worker 908-1) receives input snippets for a mission definition from a message queue, and outputs snippets accepted by the mission definition to a fast work queue (e.g., a Beanstalk'd queue). The respective worker 908 also maintains an internal copy of the search terms of that mission definition, and it receives updates to these via the input message queue. Similarly to other components in the system, the respective worker 908 will hold updates that it cannot immediately process and will try again later.

In some implementations, there are several stages involved in determining whether or not to accept a snippet (as shown in FIG. 11B). A snippet needs to pass through all the stages before it is accepted by the mission definition. First, worker 908 checks if the snippet's content (e.g., text) matches any of the mission definition's "accept" filters. Second, the snippet is discarded if its text matches any of the mission definition's "reject" filters. In some implementations, in addition to filtering by the snippet's content, Workers 908 can also filter a snippet using its author/publisher information and the language of the snippet. In some implementations, rather than utilizing the author/publisher Correlator 528 (FIG. 5), author/publisher correlation is only performed after a snippet has passed a missions content-related filters. In such implementations, a worker 908 looks up information regarding the author and/or publisher of the snippet (e.g., in a manner analogous to that which is described with reference to FIG. 8). Each of the author and publisher fields associated with the snippet should pass through its own "accept" and "reject" filters before being accepted. When the snippet's author/publisher does not have a field that is being filtered on, the filter specifies whether or not to accept the snippet. Since the author/publisher stage requires a look-up from an external location, it is expected to be slower than the snippet content filtering stage. But since a small percentage of snippets are expected to pass through the content filters, the lookup is only performed after the content has been accepted thus reducing the number of lookup requests by the workers. In addition to the regular expression filters, the mission definition also contains a set of accepted languages. This check is performed before any regular expression matching is done. If the snippet's "language" field matches a language in the set, the snippet goes through and is compared with the rest of the filters. If not, the snippit is discarded.

In some implementations, the actual regular expression matching is performed using IBM's ICU library. The ICU library assumes input snippets as UTF-8 encoded strings. A worker spawns multiple threads capable of doing the regular expression matching, so the worker can handle multiple snippets in parallel. In some implementations, multiple snippets may be associated with different sources. Each incoming snippet is assigned to a single worker thread that will perform the regular expression matching. Each thread reads from the mission definition data (but does not write) so it has access to the regular expressions necessary to match a snippet. This avoids the need for any synchronization between threads. One exception to this is when the worker needs to update the mission definition data, in which case all the snippet threads are blocked.

Once a snippet has passed all the author/publisher stages, the mission definition accepts snippet and outputs it to a predefined destination (e.g., in an email message, CRM, or the like).

Figure 12:
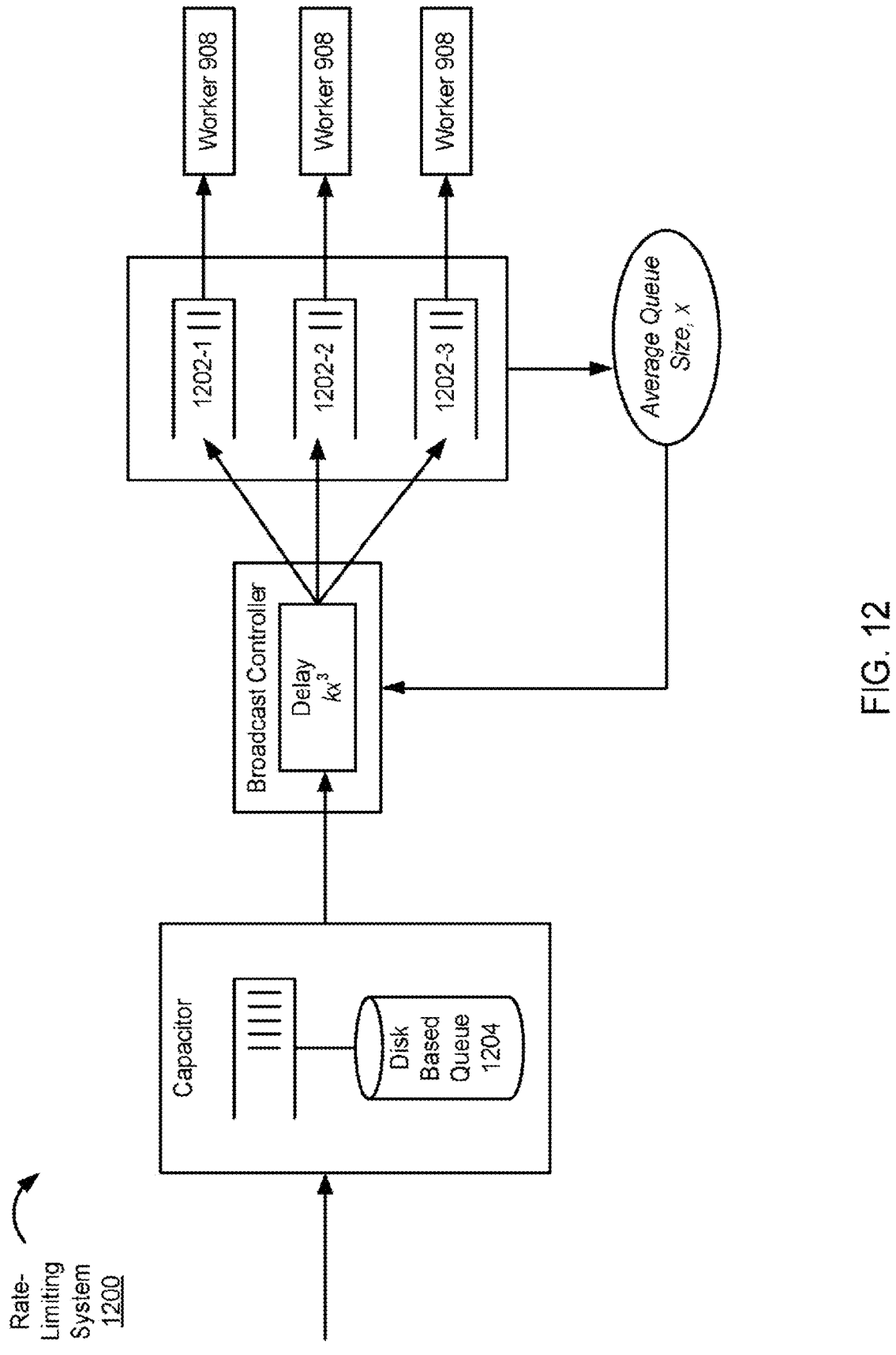
FIG. 12 illustrates a traffic smoothing system, in accordance with some implementations.

FIG. 12 illustrates a traffic, (e.g., rate-limiting) system 1200 optionally included in bouncer 536. Traffic to bouncer 536 does not arrive from harvester 522 at a constant rate. Rather, the traffic pattern may contain periods of low/moderate traffic followed by very high peaks that bouncer 536 cannot keep up with. Even though Bouncer 536 can, on average, handle the traffic, the stream of snippets can quickly build up in memory during one of these peaks. Due to the high snippet traffic, this buildup could quickly consume all RAM on a bouncer worker node 903, rendering it unusable.

The rate-limiting system 1200 is designed to ensure that peaks in traffic do not cause peaks in memory usage. Bouncer master node 909 broadcasts all snippets to each bouncer worker node 903. There, each snippet is placed in a local node queue 1202. A separate worker process pulls items off of a respective Local Node Queue 1202 and processes them through each filter on that Bouncer Worker Node 903. If the amount of processing cannot keep up with the incoming traffic, the respective local queue 1202 increases in size.

The Bouncer Master Node 909 monitors the size of the various Local Node Queues 1202 and uses them as feedback into the rate-limiting system 1200. In some implementations, a maximum rate is set to a value proportional to the cube of the average downstream queue size, x. A cubic function (e.g., $kx^3$, where k is a proportionality constant) provides a smooth transition between unlimited and limited traffic. For example, a queue size of 1 snippet happens very often and is no need to limit the rate at which snippets are fed to local queues 1202. However, were a linear function chosen, even a queue size of 1 would cause a noticeable rate limit delay. With a cubic function, however, the rate limit delay is not noticeable until the queue size is significant.

When the traffic from the Harvester 522 goes above a maximum rate (e.g., a rate which is inversely proportional to the rate limit delay), incoming snippets are placed into a Global Master Queue 1204 on the Bouncer Master Node 909. Global Master Queue 1204 writes items to disk-storage as it grows, ensuring that RAM usage does not grow out of control as snippets build up.

Figure 13:
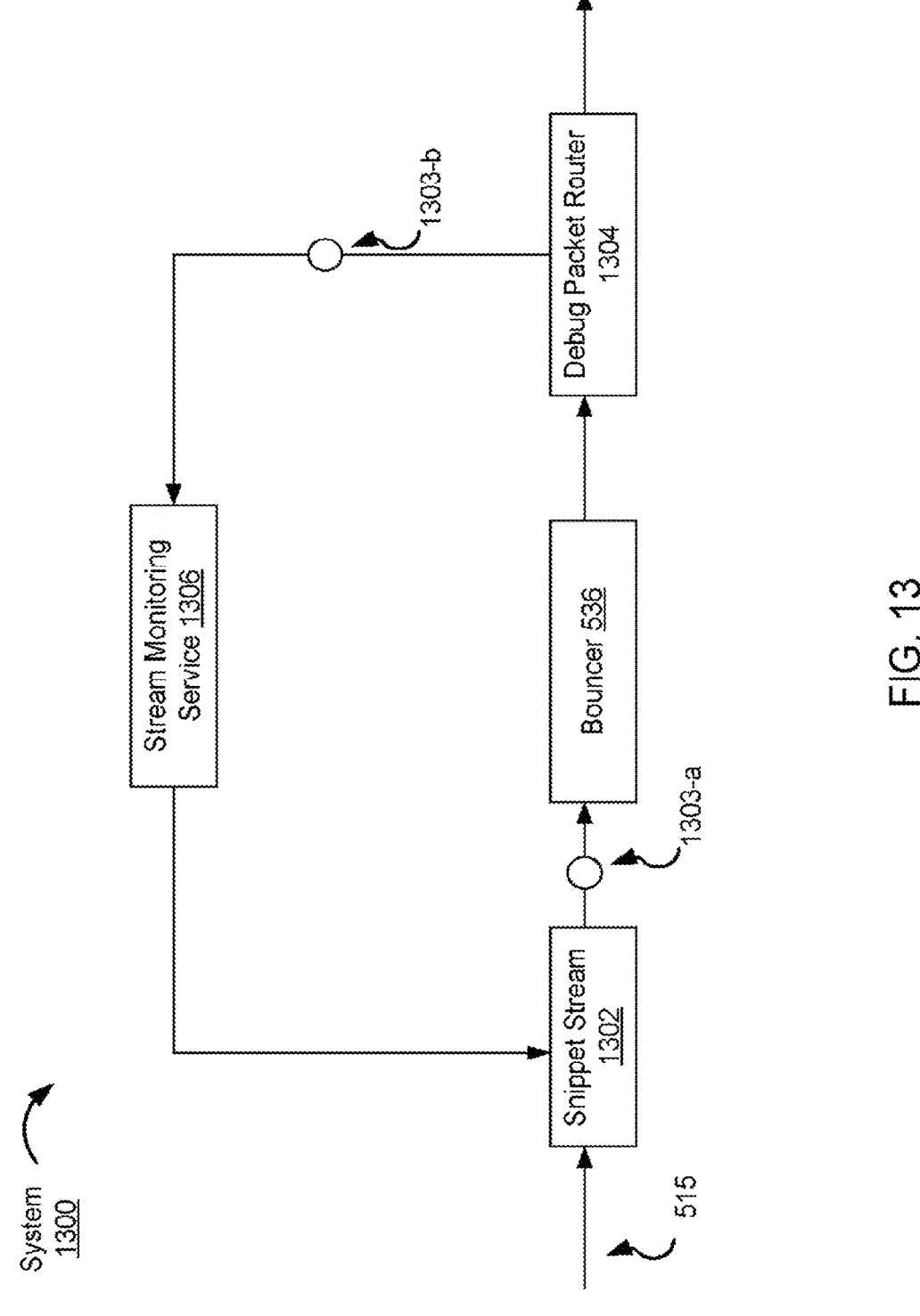
FIG. 13 illustrates a monitoring and debugging packet injection system, in accordance with some implementations.

FIG. 13 illustrates a monitoring and debugging packet injection system 1300, in accordance with some implementations. In general, a snippet stream 1302 that includes all of the snippets harvested by harvester 522 is transmitted to each mission definition via the path 515 (see FIG. 5). The snippet stream 1302 includes all of the relevant snippets (e.g., in some implementations, all of the snippets) and also includes a heartbeat message that is broadcast periodically (e.g., once a second). The heartbeat message informs subscribers that the feed is still active. However, a feed can remain silent for arbitrarily long periods of time without sending out any alarms. This is not an error, but it is indistinguishable from an internal error in the broadcasting network of bouncer 536 (e.g., an error in which snippets are not making it to the respective mission definition).

To detect this sort of error, a "debug" packet 1303 is periodically inserted into the snippet stream 1302 going into the bouncer 536 (1303-a indicates where the debug packet 1303 is initially inserted). Debug packets are configured as snippets that are accepted by every mission definition. To test the broadcasting network of the bouncer 536, a Debug Packet Router 1304 connects to every mission definition feed and waits for the next debug packet 1303. When it receives a debug packet, Debug Packet Router 1304 passes it to a stream monitoring service 1306 (1303-b indicates where the debug packet is routed by the debug packet router 1304). If a stream monitoring service 1306 receives the debug packet, then snippets have successfully arrived at the mission definition. Otherwise, a problem is detected with the mission definition and the problem can be reported using an alarm.

Figure 14A:
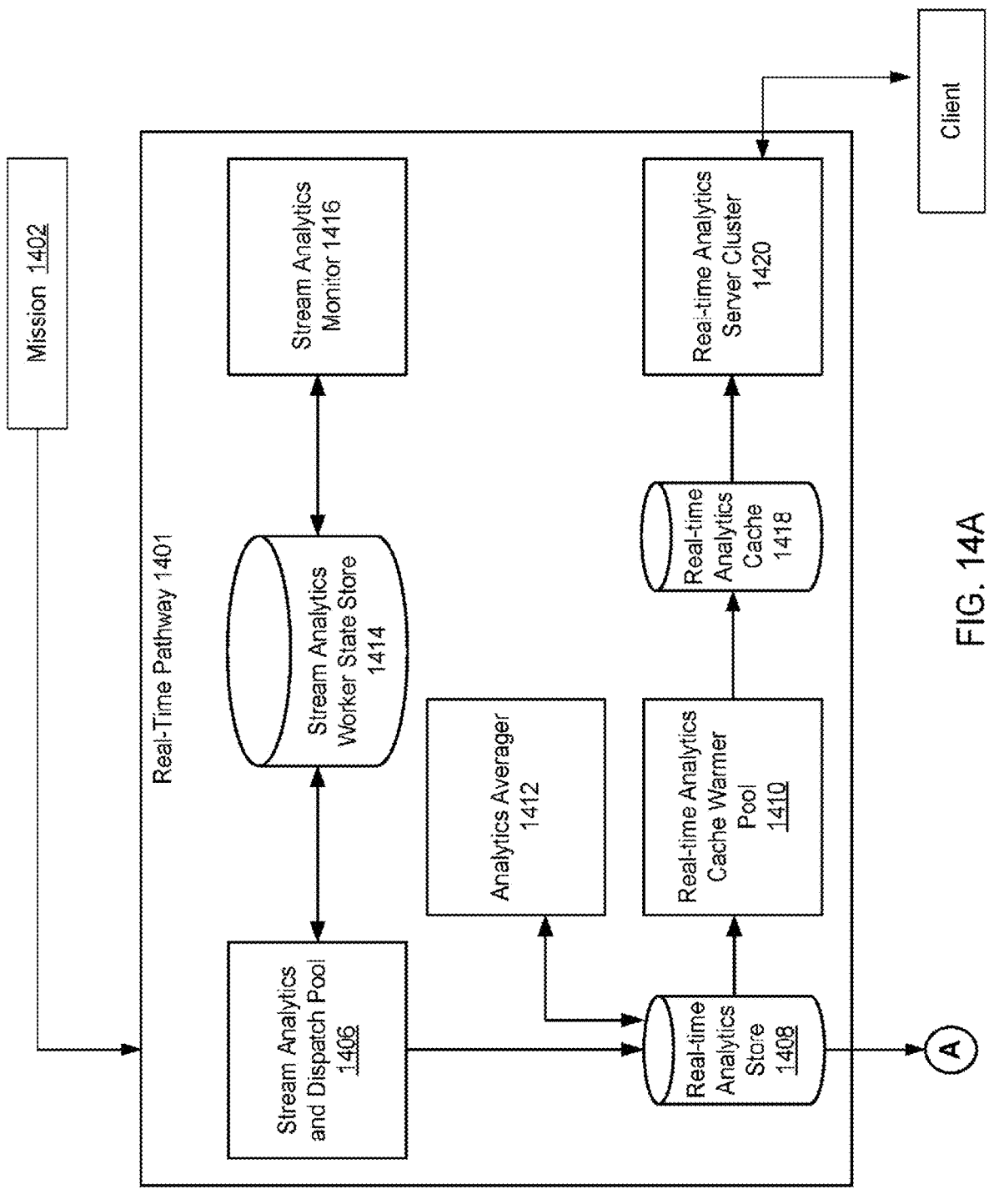
FIGS. 14A-14B are schematic diagrams illustrating an analytics/alarm system, in accordance with some implementations.
Figure 14B:
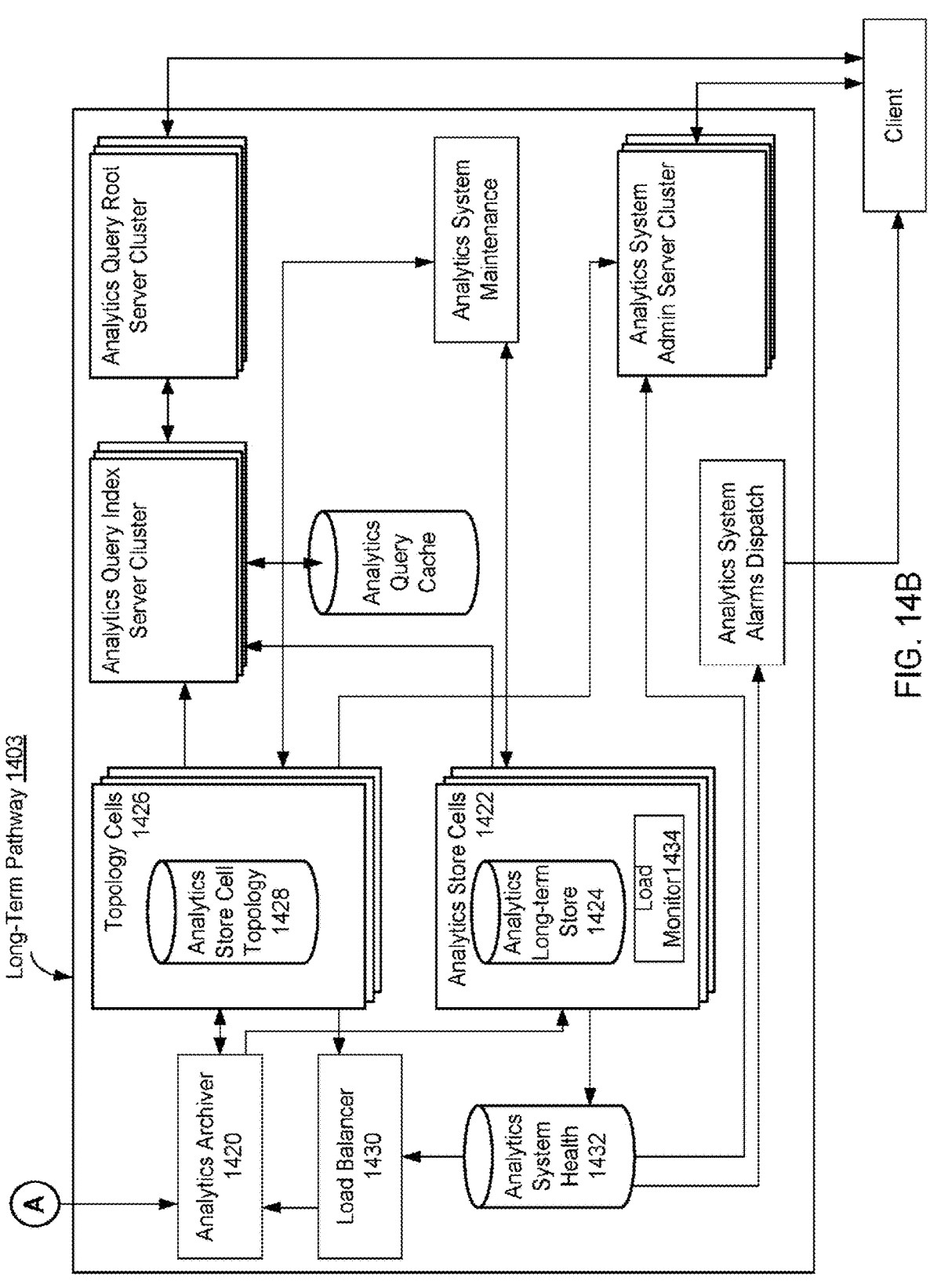

FIGS. 14A-14B illustrates an analytics/alarm hyper-engine system 538 (see FIG. 5) in accordance with some implementations. In some implementations, analytics data is collected and stored for different mission definitions (e.g., mission definition 1402). In some implementations, packet volumes for all streams are continuously calculated according to their publisher time and media type. Low latency access is required for two uses of analytics data—instantaneous monitoring and historical querying. Both instantaneous monitoring and historical querying require loading, organizing and delivering millions of data points. Instantaneous monitoring requires continuous calculation of volume averages to support trend analysis for predictive analytics and threat detection. Historical queries require access to any time range of stream data with arbitrary selection of granularity, sorting, and attributes. Interactive speed is necessary to support deep exploration of data. In addition, high scalability is required to maintain peak performance as data accumulates and new classification streams are added to the system.

In some implementations, the alarm analytics Hyper-Engine 538 is divided into two main pathways (e.g., subcomponents), real-time pathway 1401 (shown in FIG. 14A) and a long-term pathway 1403 (shown in FIG. 14B), to provide optimum performance for processing, real-time and/or nearly real-time monitoring and historical queries. The real-time pathway 1401 is the entry point for streams of classified packets. In some implementations, a stream of classified packets (sometimes referred to as "classification streams") exists for each mission definition and comprises packets broadcast to the mission definition as well as information indicating whether the packet was accepted, or not accepted, by the mission definition. The real-time pathway 1401 operates on continuously changing data at high transmission rates while providing fast access to millions of data points. In some implementations, the following tasks are performed within a data flow in the real-time pathway 1401:

Receiving classification streams from each executable mission definition;

Continuously calculating analytics for each classification stream;

Regularly publishing analytics data to a real-time store;

Caching real-time data packets to minimize retrieval latency and network traffic; and Serving applications large quantities of stream analytics data at high speed.

In some implementations, real-time pathway 1401 is executed by an analytics worker. In some implementations, an individual analytics worker executing real-time pathway 1401 is dedicated to each mission definition.

In some implementations, executing real-time pathway 1401 includes a stream analytics and dispatch pool 1406 for each classification stream broadcast by the mission definition 1402. Each stream analytics and dispatch pool 1406 continuously calculates analytics for packets received from the stream according to the packets' publisher time and media type. The stream analytics and dispatch pools 1406 regularly publish analytics to a real-time analytics store 1408.

In some implementations, the real-time pathway 1401 includes a stream analytics worker state store 1414. Two queues—a running queue and a waiting queue—are maintained in the stream analytics worker state store 1414 to identify which mission definitions already have an analytics worker assigned, and which require an analytics worker. When assigned to a mission definition an analytics worker continuously publishes heartbeat messages and subscribes to control messages (e.g., mission definition control messages 1006, FIG. 6) related to its stream.

In some implementations, the real-time pathway 1401 includes a stream analytics monitor 1416. The stream analytics monitor 1416 includes a watchdog process that maintains the queues in the worker state store 1414 and monitors worker heartbeats. When a worker stops publishing heartbeats it is marked as dead and its mission definition is queued for reassignment to another worker. The stream analytics monitor 1416 subscribes to system messages related to stream states and forwards control messages to the appropriate workers.

In some implementations, real-time pathway 1401 includes an analytics averager 1412. There, averages are continuously calculated for all stream analytics and published to the real-time analytics store 1408. This data is used for trend analysis in threat detection and predictive analytics.

In some implementations, real-time pathway 1401 includes the real-time analytics store 1408. There, a storage layer is provided to facilitate parallelization of stream analytics and to protect against data loss in the event of worker failure. The storage layer keeps all data in memory to optimize data access speed and regularly persists data to disk to provide fault tolerance.

In some implementations, real-time pathway 1401 includes a real-time analytics cache warmer pool 1410. Because a single mission definition may potentially require continuously scanning millions of data points, stream analytics are packaged, compressed, and cached in real-time analytics cache warmer pool 1410 for speed and efficiency. This operation is distributed across a pool of workers for scalability.

In some implementations, real-time pathway 1401 includes a real-time analytics cache 1418, which receives stream analytics packages from analytics cache warmer pool 1410 and keeps information corresponding to the stream analytics packages in memory by a cache layer. This provides fast and consistent data to all downstream applications.

In some implementations, the real-time pathway 1401 includes a real-time analytics server cluster 1420. Real-time analytics server cluster 1420 comprises a cluster of servers that handles application requests for stream analytics. Each server is responsible for loading requested packages from the cache layer, decompressing packages, and translating raw analytics to a format optimized for network transmission and application consumption.

Referring to FIG. 14B, the long-term pathway 1403 provides permanent storage for analytics. The long-term pathway 1403 operates on large amounts of historical data. By partitioning data into parallel storage cells, long-term pathway 1403 provides high scalability, high availability, and high speed querying of time series analytics. In some implementations, the following tasks are performed within a data flow in the long-term pathway 1403:

Regularly retrieving analytics data from the real-time store.

Persisting data to analytics store cells.

Maintaining a topology of analytics store cells.

Continuously monitoring performance of analytics store cells and perform maintenance as necessary.

Dispatching alarms if system performance degrades.

Serving applications with query results summarizing large quantities of historical data at high speed.

In some implementations, an individual worker executing long-time pathway 1403 is dedicated to each mission definition.

In some implementations, long-term analytics pathway 1403 includes an analytics archiver 1420. There, historical stream analytics data is regularly transferred from the real-time pathway to permanent storage. An archive process loads data from the real-time analytics store 1408 and persists it to long-term analytics storage cells 1422 (e.g., in Analytics Long-term Store 1424), selecting appropriate storage cells based on information returned from the topology cells 1426 and the load balancer 1430.

In some implementations, long-term analytics pathway 1403 includes topology cells 1426. The distribution of data across storage cells 1422 is maintained in an indexed topology. The topology is replicated across multiple cells 1426 to provide high availability.

In some implementations, long-term analytics pathway 1403 includes an analytics store cell topology 1428. The topology stores the locations and functions of all storage cells, as well as the mapping of data to storage cells. The topology is consulted for information insertion and retrieval.

In some implementations, long-term analytics pathway 1403 includes one or more analytics store cells 1422. Data is evenly distributed across multiple storage cells to provide high availability and high scalability.

In some implementations, long-term analytics pathway 1403 includes an analytics long-term store 1424. The core of a storage cell is its permanent data store. Data within a store is partitioned into multiple indexed tables. Data store size and table size are optimized to fit in system memory to provide low latency queries.

In some implementations, long-term analytics pathway 1403 includes a load monitor 1434. The load monitor 1434 process regularly collects statistics for the data store and system resource utilization, publishing the results to the system health store.

In some implementations, long-term analytics pathway 1403 includes load balancer 1430. When data must be mapped to a storage cell the load balancer is responsible for selecting the optimum mapping. Storage cell load statistics are read from the system health store and the load balancer selects the storage cell that will provide the most even distribution of data across cells.

In some implementations, long-term analytics pathway 1403 includes a analytics system health database 1432. Statistics for data stores and system resource utilization across all storage cells are centralized in the system health store.

Figure 15:
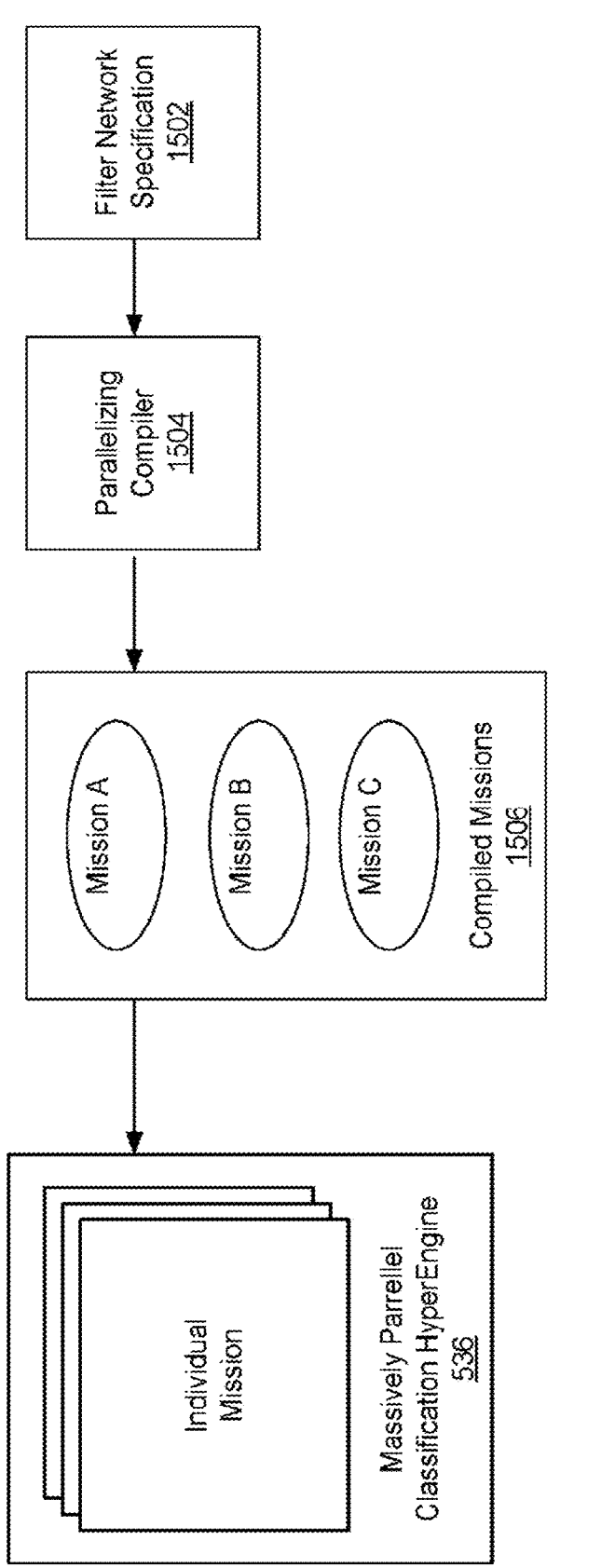
FIG. 15 is a schematic diagram illustrating a process of specifying and compiling a mission definition, in accordance with some implementations.

Optimization for Real-Time, Parallel Execution of Models for Extracting High-Value Information from Data Streams FIG. 15 illustrates the process of specifying and compiling a mission definition. A filter network specification 1502 is produced using, for example, a Visio Modeling Studio. In some implementations, for example, the visual modeling studio is an application with a user interface that allows users to drag-and-drop particular models into a general graph, as described in more detail with reference to FIGS. 16 and 17. A parallelizing compiler 1504 optimizes the filter network specification 1502 by, for example, appropriately merging, reordering filters and removing cycles (e.g., closed circuits within the general graph) that are extraneous to the filter and result in non-optimized performance. The parallelizing compiler 1504 also optimizes the manner in which filters are distributed to one or more processors in the Massively Parallel Classification HyperEngine 536. In some implementations, the parallelizing compiler 1504 is a pre-compiler that performs the tasks of optimizing the general graph and parallelizing the filters, but it does not translate the filters (e.g., the regular expression definitions) into machine readable code. In such implementations, the regular expressions are translated into deterministic finite automatons (DFA) by the parallelizing compiler 1504 and the DFAs are interpreted by a DFA interpreter coupled with the one or more processors in the Massively Parallel Classification HyperEngine 536.

The compiled mission definitions 1506 (e.g., mission definition a, mission definition b, mission definition c) are then transmitted to Massively Parallel Classification HyperEngine 536.

The purpose of the parallelizing compiler 1504 is to convert the high-level mission definition description language (comprising filters and taps) into a network of regular expressions that can be applied against incoming traffic efficiently. This compilation process consists of several steps:

- Convert each instance of a filter to a set of regular expressions (regexes).
- Concatenate regular expressions associated with a chain of filters into a single regular expression.
- Merge the filters into a single graph, and "flatten" the filter network.
- Perform various optimizations to generate the final graph of regex stages.
- Combine trees of chain mission definitions into a single large mission definition (to simplify chain mission definition handling).
- Assign the filter graph and associated mission definition feeds to appropriate worker VMs.

A filter consists of one or more phrases, short keywords/ regular expressions, as well as options describing how the phrases combine together. A phrase may be a user-defined variable, which differs for each instance of that phrase. These phrases, together with the spacing options, can be used to generate one or more regular expressions. The follow are two examples:

"a", "b", "c", all phrases beginning with "a", including "b", and ending with "c" with whitespace in-between is encapsulated as the regular expression: (a\s+b\s+c), "hello", "world", an instance of any of the two words is encapsulated as the regular expression (hello) and (world) OR (hello|world).

In some implementations, blocks of filters are split into multiple regular expressions for readability and performance. When a block must be concatenated with other blocks, it is always compiled to a single regular expression.

Filters in sequence are combined with a Boolean AND operation (e.g., a snippet must pass both Filter 1 AND Filter 2). Predefined groups of filters (called blocks) combine differently in sequence, by concatenating each regex from the blocks in order. For example, consider these blocks (previously compiled into regexes):

$$\text{Sequence of Regex:}(\text{hello}) \rightarrow (\backslash s + \backslash S +)\{1, 5\}?\backslash s + \rightarrow (\text{world})$$

$$\text{Concatenated Regex:}(\text{hello})(\backslash s + \backslash S +)\{1, 5\}?\backslash s + (\text{world})$$

A filter represented by this sequence therefore accepts any snippet containing the word "hello" followed by up to 5 other words (separated by spaces) and then by the word "world."

Difficulty arises if the blocks in the graph are not all in sequence (e.g., some blocks are arranged in parallel). In this case, a regular expression is generated for all possible paths through the graph. In some implementations, this is accomplished via a depth-first traversal of this group of blocks to identify all of the paths. Groupings of blocks that have been merged are then referred to as stages.

FIG. 16 illustrates combining blocks in the graph are not all in sequence. As shown in the figure, before the combination 1600-1, a filter network specification includes two filters F1 and F2 that are in sequence with a block B1. Blocks B2 and B3 are sequential, forming a path that is in parallel with another block B4. After the combination 1600-2, each parallel path is combined with the block B1, generating a regular expression for a possible path through the graph.

Once all groups of blocks have been compiled into regexes, each filter and block effectively forms a sub-graph of the mission definition. The parallelizing compiler 1504 recursively looks at each filter and block contained within a stage and merges its sub-graph into a larger graph. Since blocks may contain other filters, blocks are checked first (resulting in a depth-first traversal of the filter dependencies). The options associated with each filter (field, accept/ reject, etc.) only apply to blocks in that graph, not the sub-graphs. Once the flattening is done, the result is a graph containing only stages of grouped regular expressions.

At this point, the graph can be optimized to decrease the work required to check a snippet. In some implementations, the parallelizing compiler 1504 utilizes one or more of the following optimizations:

- Stages sharing the same options and marked as "accept" are merged into a single stage if they are in parallel;
- Stages sharing the same options and marked as "reject" are merged into a single stage if they are in sequence;
- Stages are reordered for fast rejection of snippets (e.g., blocks that require a fewer number of operations are applied to snippets earlier in the graph than blocks requiring a greater number of operations).

For an accept stage, a snippet is accepted if it matches any regex in the stage. Therefore, any separate accept stage that are in parallel are merged into a single block (simplifying the graph traversal). Parallel stages will only be merged if they share the exact same predecessors and successors. In the case of a reject stage, where a snippet passes if it does not match any regex, different merging logic is required. Instead of parallel stages, stages are only considered for merging when they are in sequence.

Figure 17:
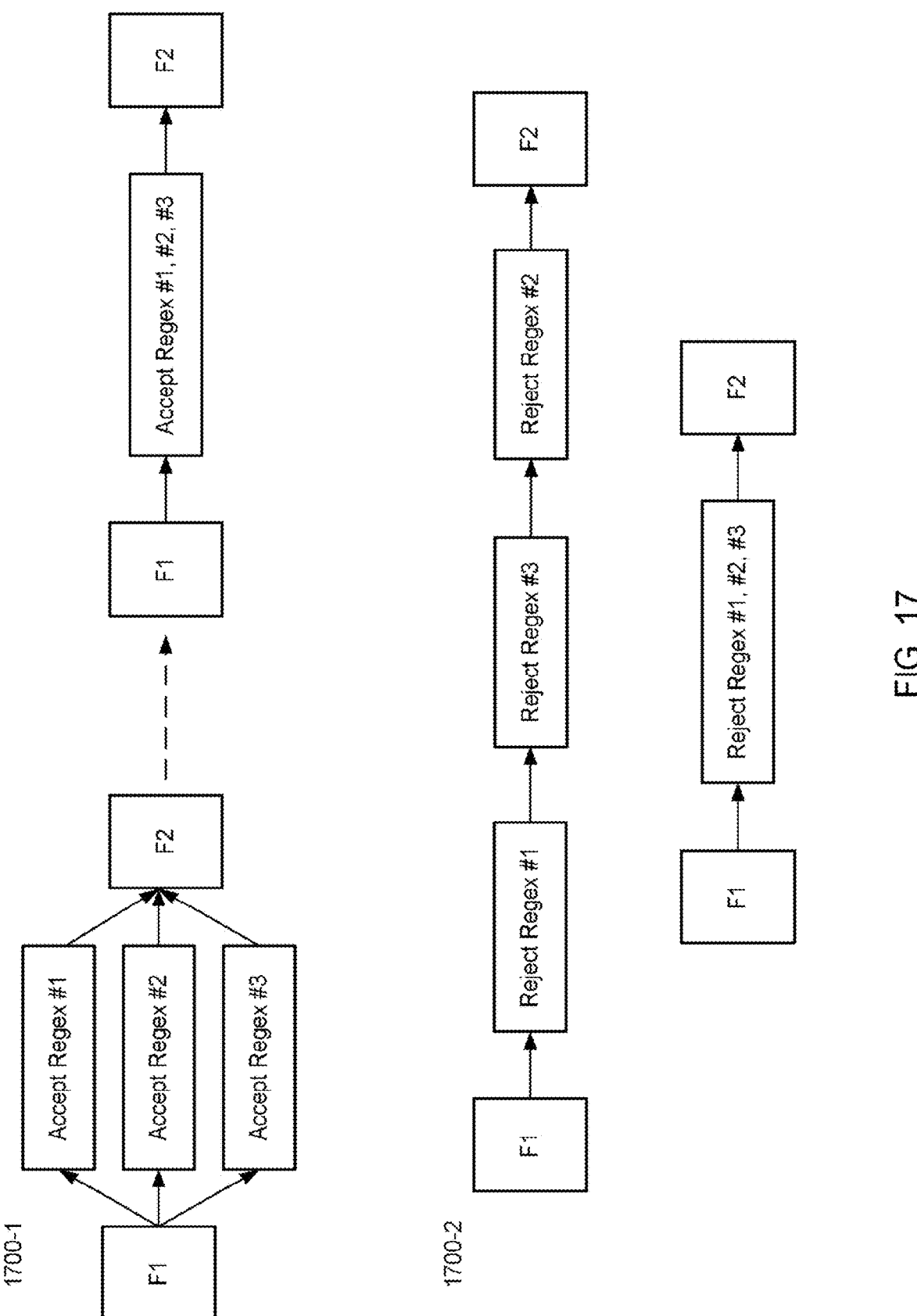
FIG. 17 illustrates an example of merging accept and reject regular expressions, in accordance with some implementations.

FIG. 17 illustrates an example of merging accept and reject regexes. As shown in 1700-1, accept regexes that are in parallel (e.g., accept regex #1, accept regex #2, accept regex #3) are merged whereas reject regexes that are in series (e.g., reject regexes #1, reject regex #2, reject regex #3) are merged.

In some circumstances, snippets are most likely to be rejected by the first few stages they encounter. Smaller stages (with fewer regexes) are faster to check. Therefore, further optimization occurs by reorganizing the stages to increase performance. In a chain of stages (or groups of stages), the parallelizing compiler 1504 reorders the stages to place the smaller ones ahead of other stages. Reordering allows smaller stages to reject those snippets as early as possible without checking them against the larger stages that come behind the smaller stages.

Figure 18:
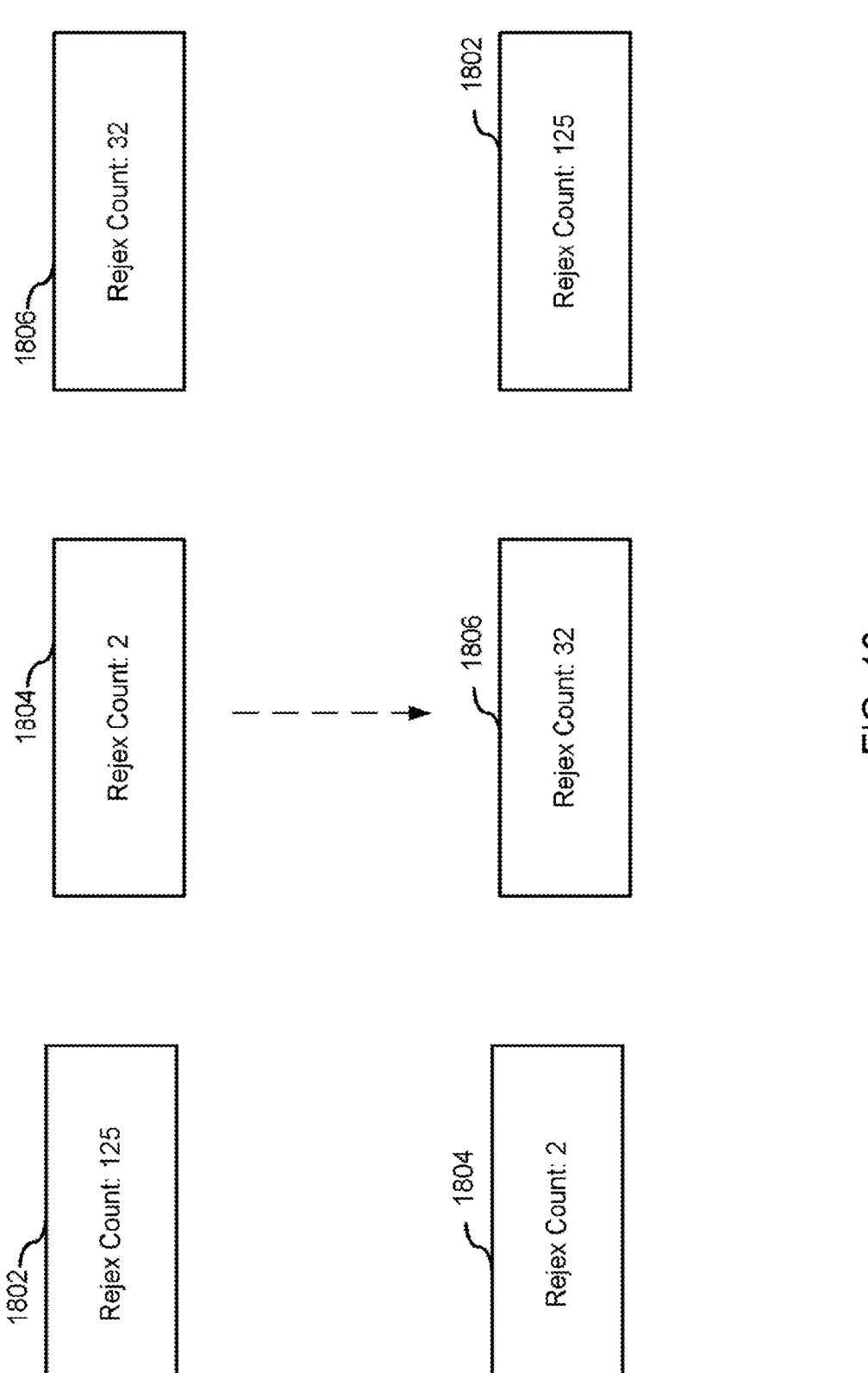
FIG. 18 illustrates an example of re-ordering filters based on the number of operations needed to determine whether the filter accepts or rejects a snippet, in accordance with some implementations.

FIG. 18 illustrates an example of reordering stages based on the number of operations necessary for determining whether the stage accepts or rejects a snippet (e.g., the number of regexes that the snippet is to be checked against within a stage). Stage 1802 includes 132 regexes, stage 1804 includes 2 regexes, and stage 1806 includes 32 regexes. Therefore, after reordering (e.g., to place the stages with fewest number of regexes earliest), the reordered stages occur in the order: stage 1804, stage 1806, stage 1802.

In some implementations, mission definitions are chained together such that they receive their inputs from other mission definitions rather than the Harvester 522. These mission definitions are referred to as chain mission definition s. Chain mission definitions present additional restrictions on stage merging and reordering because a snippet cannot be checked against a chain mission definition until all mission definitions in the chain have also been checked (thus, chain mission definitions include constraints on their placement within the chain). To handle this, all chain mission definitions connected to a Harvester mission definition are combined into one single mission definition graph. Each mission definition is treated as a special version of a tap.

Once a mission definition has been compiled, it is assigned to one or more virtual machines (VM) where snippet processing takes place. In some implementations, a mission definition includes two components: a filter graph and a list of feed names (e.g., names corresponding to data sources 522). Each feed is assigned to a location, and it receives accepted snippets from the VM where the filter graph is located. It then publishes the snippet to all downstream systems. Decoupling snippet processing from the publishing stage allows the mission definition graph to be freely moved between VMs without dropping any snippets. This is helpful for the dynamic load balancing described later.

Snippets are processed in parallel. The system 502 exploits the fact that filter graphs are independent of each other to boost performance by massive parallelization. Parallel processing is achieved on 2 levels: among the different machines in the system, and among each core on a single machine.

Parallelism amongst different machines happens when each respective mission definition is allocated to a VM (e.g., at least two mission definitions are allocated respectively to distinct virtual machines). The mission definitions are divided up equally (or substantially equally) among the VMs. Each respective VM receives a duplicate of the entire snippet stream, so the VM can process the stream according to the mission definition filter graphs assigned to that machine independently of other mission definition filter graphs assigned to other machines. When a new mission definition is added, it is assigned to the VM that has the least load at the moment.

In some implementations, the load of a mission definition is measured by the average number of streaming classification operations per second (SCOPS) required to check a snippet. Changes in a mission definition (or the creation/destruction of a mission definition) may change the load of the mission definition. As a result, the load on the VMs may become unbalanced over time. To counter this, the system 502 implements dynamic load balancing. The load of each mission definition is periodically measured, and then mission definitions are redistributed among the VMs to keep the load as balanced as possible. In order to prevent dropped or duplicated snippet, the entire system is be synchronized.

When necessary, in some implementations, a mission definition graph is split into smaller but equivalent graphs. This allows the dynamic load-balancing process to have finer control over the distribution of work.

Figure 19:
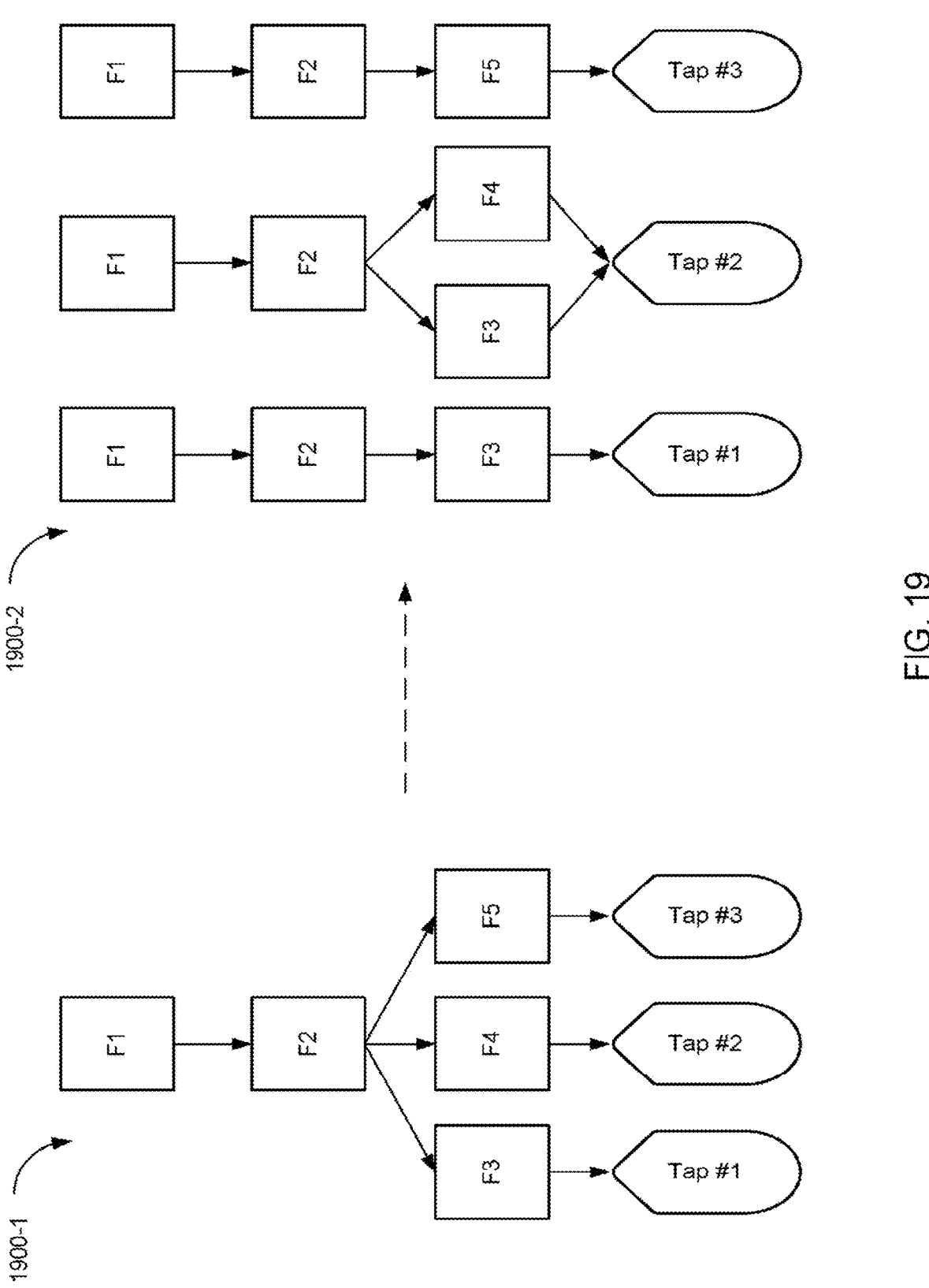
FIG. 19 illustrates an example of splitting a mission definition graph into smaller equivalent graphs by creating a new mission definition for each tap, in accordance with some implementations.

FIG. 19 illustrates an example of splitting a mission definition graph into three smaller equivalent graphs by creating a new mission definition for each tap (e.g., leaf node). In some implementations, the new mission definition for a respective tap is determined by taking the union of all paths leading from the start node to that Tap, for example, by using a depth-first search. In the example shown in FIG. 19, the system determines that, to reach Tap #1, a snippet must pass F1 AND F2 AND F3. To reach Tap #2, a snippet must pass F1 AND F2 AND (F3 OR F4). Likewise, to reach Tap #3, a snippet must pass F1 AND F2 AND F5. Thus, the mission definition graph shown in 1900-1 can be split into three respective filter graphs shown in 1900-2. If stages F1 and F2 accept a large amount of traffic but are significantly easier to check than F3, F4 and F5, then the system will benefit from splitting the mission definition. When other Taps (e.g., other than the respective tap) are encountered (e.g., in the depth-first search), the other taps are disabled for new mission definition corresponding to the respective tap.

Virtual machine level parallelism occurs on a single VM. All available cores check incoming snippets against all local mission definitions in parallel. Snippets are distributed evenly between cores.

To determine if a mission definition will accept a snippet, the content of the snippet is checked against the mission definition's filter graph. Initially, the snippet is checked against the root stage of the filter graph. If it passes through a stage, it is checked against that stage's successors, and so on, until it fails a stage's check. When that happens, the traversal stops. A snippet is accepted if the traversal finds its way to an end stage (either a mission definition endpoint, or a tap).

To avoid doing unnecessary checks and therefore improving the system performance, and early rejection optimization is disclosed herein. If at any point it becomes impossible for a snippet's traversal to hit an endpoint, the traversal is terminated (even if there are still paths to check). This is implemented by determining "dominator" stages for each endpoint. A stage X "dominates" another stage Y if every path that reaches Y must include X. An endpoint's list of dominators is pre-computed as part of the compilation process. If a snippet fails to pass through a dominator stage, the dominated endpoint is marked as being checked. Traversal finishes when all endpoints have been marked as being checked (either by reaching them explicitly or rejected through dominators).

In some implementations, the existence of cycles in the filter specification (e.g., closed form cycles, also referred to as closed circuits) is detrimental to system performance. These cycles occur when a user unwittingly connects the output of a model to the input of the same model (e.g., indirectly, with other filters and/or blocks in between) in a filtering chain, thus creating a feedback closed circuit. In some implementations, the compiler detects and removes such closed circuits while performing the compiler optimization operations (e.g., like those discussed above). In alternative implementations, a closed circuit removal stage of the parallel compiler 1504 is run every time a user edits the filtering network (e.g., in the visual modeling studio).

Figure 20:
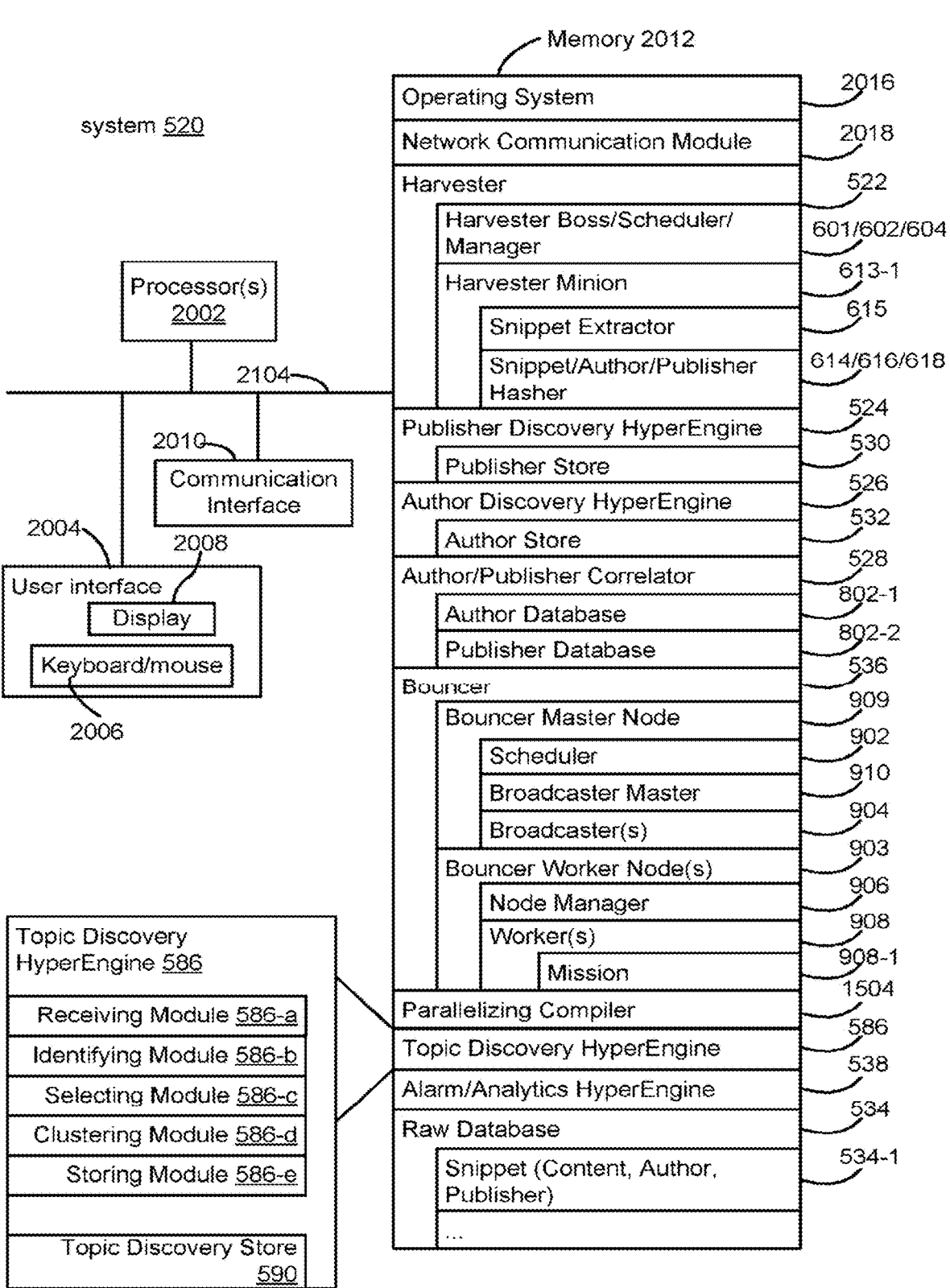
FIG. 20 is block diagram of a computer system for real-time extraction of high-value information from data streams, in accordance with some implementations.

FIG. 20 is a block diagram illustrating different components of the system 520 that are configured for analyzing stream data in accordance with some implementations. The system 520 includes one or more processors 2002 for executing modules, programs and/or instructions stored in memory 2012 and thereby performing predefined operations; one or more network or other communications interfaces 2010; memory 2012; and one or more communication buses 2014 for interconnecting these components. In some implementations, the system 520 includes a user interface 2004 comprising a display device 2008 and one or more input devices 2006 (e.g., keyboard or mouse).

In some implementations, the memory 2012 includes high-speed random access memory, such as DRAM, SRAM, or other random access solid state memory devices. In some implementations, memory 2012 includes non-volatile memory, such as one or more magnetic disk storage devices, optical disk storage devices, flash memory devices, or other non-volatile solid state storage devices. In some implementations, memory 2012 includes one or more storage devices remotely located from the processor(s) 2002. Memory 2012, or alternately one or more storage devices (e.g., one or more nonvolatile storage devices) within memory 2012, includes a non-transitory computer readable storage medium. In some implementations, memory 2012 or the computer readable storage medium of memory 2012 stores the following programs, modules and data structures, or a subset thereof:

an operating system 2016 that includes procedures for handling various basic system services and for performing hardware dependent tasks;

a network communications module 2018 that is used for connecting the system 520 to other computers (e.g., the data sources 502 in FIG. 5A) via the communication network interfaces 2010 and one or more communication networks (wired or wireless), such as the Internet, other wide area networks, local area networks, metropolitan area networks, etc.;

a Harvester 522 for collecting and processing (e.g., normalizing) data from multiple data sources 502 in FIG. 5A, the Harvester 522 further including a Harvester Boss 601, a Scheduler 602, a Harvester Manager 604, and one or more Harvester Minions 613-1, which are described above in connection with FIG. 6, and a Harvester Minion 613-1 further including a snippet extractor 615 for generating packets for the snippets, authors, and publishers encoded using appropriate data structures as described above with reference to FIG. 7, and a snippet hasher 614, an author hasher 616, and a publisher hasher 618 for generating a hash key for the snippet content, author, and publisher of the snippet, respectively;

a Publisher Discovery HyperEngine 524 for inspecting the data stream from the data sources 502 in order to develop a publisher profile for a data source based on, e.g., the snippets published on the data source and storing the publisher profile in the publisher store 530;

an Author Discovery HyperEngine 526 for inspecting the data stream from the data sources 502 in order to develop an author profile for an individual based on, e.g., the snippets written by the individual on the same or different data sources and storing the author profile in the author store 532;

an Author/Publisher Correlator 528 for performing real-time data correlation with existing author information in the author database 802-1 and existing publisher information in the publisher database 802-2 to determine a respective snippet's author and publisher;

a Bouncer 536 for identifying high-value information for a client of the system 520 from snippets coming from different data sources by applying the snippets to mission definitions associated with the client, the Bouncer 536 further including a bouncer master node 909 and one or more bouncer worker nodes 903, the bouncer master node 909 further including a scheduler 902, a broadcaster master 910, and one or more broadcasters 904, whose functions are described above in connection with FIG. 9, and each bouncer master node 909 further including a node manager 906 and one or more workers 908 (each worker handling at least one mission definition 908-1), a more detailed description of the components in the Bouncer 536 can be found above in connection with FIG. 9;

a Parallelizing Compiler 1504 for optimizing a filter network specification associated with a client of the system 520 by, e.g., appropriately merging, reordering filters and removing cycles from the resulting filter network, etc.;

an Alarm/Analytics HyperEngine 538 for determining if and how to deliver alarm messages produced by the Bouncer 536 to end-users using, e.g., predefined communication protocols with the end-users, and generating short-term or long-term statistics through analyzing the incoming information as well historical information from the data sources and determining whether or not to trigger alarms for any violations of predefined criteria associated with a client of the system;

a Topic Discovery HyperEngine 586, for generating a statistical topic model associated with the plurality of snippets, the Topic Discovery HyperEngine 586 further including: i) a receiving module 586-a for receiving a corpus that includes a plurality of electronic posts, ii) an identifying module 586-b for identifying, within the corpus, a plurality of candidate terms, iii) a selecting module 586-c for selecting, as a trimmed lexicon, a subset of the plurality of candidate terms according to predefined criteria, iv) a clustering module 586-d for clustering at least a subset of the plurality of electronic posts according to a plurality of clusters using the lexicon to produce a statistical topic model, and v) a storing module 586-e for storing information corresponding to the statistical topic model in a topic discovery store 590; and a Raw Database 934 for backing up snippets from the data sources, e.g., after the snippets are normalized by Harvester 522, each snippet having content, author, and publisher information.

It should be noted that the programs, modules, databases, etc., in the Pulsar system 520 describe above in connection with FIG. 20 may be implemented on a single computer server or distributed among multiple computer servers that are connected by a computer network. Although a specific hardware configuration may affect the performance of the Pulsar system 520, the implementation of the present application does not have any dependency on a particular hardware configuration.

FIG. 21 is a flow chart illustrating a method 2100 of creating hierarchical, parallel models for extracting in real time high-value information from data streams and system, in accordance with some implementations. The method 2100 is performed at a computer system including a plurality of processors and memory storing programs for execution by the processors.

The method 2100 includes receiving (2102) a mission definition. In some implementations, a mission definition comprises a filter graph. The mission definition includes a plurality of classification models, each classification model including one or more filters that accept or reject packets. For example, in some implementations, each classification model is a node on the filter graph (e.g., a "filter node"). Each respective filter is categorized by a number of operations (e.g., a count, such as 4, 6, or 9 operations), and the collection of filters is arranged in a general graph (e.g., the filter graph is defined by the plurality of classification models/filter nodes and a plurality of graph edges connecting the classification models/filter nodes). In some implementations, the filter graph is a directed graph, meaning that there is a direction associated with each graph edge. In other words, the filter graph is configured such that packets move from filter node to filter node within the graph with a predefined direction associated with the graph edge connecting the two filters nodes.

In some implementations, filter graphs are stored in a computer file or data structure. For ease of explanation, such computer files or data structures are also referred to as "filter graphs." In some implementations, the mission definition (e.g., filter graph) is received by a particular module in the computer system (e.g., Bouncer 536, FIG. 5) from a different module in the computer system (e.g., Parallelizing Compiler 538, FIG. 5). In some implementations, the mission definition (e.g., filter graph) is received from an external computer system (e.g., an external client or server connected to the computer system via a network connection). In some implementations, the mission definition (e.g., filter graph) is received at one or more processors of the computer system (e.g., processors 2002, FIG. 20).

In some implementations, each of the models includes (2104) one or more accept or reject filters. In some implementations, the accept and reject filters are at least partially embodied as regular expressions (which, for example, can be embodied at a lower computing level, such as in machine code, as deterministic finite automata (DFAs) or non-deterministic automata (NDA)). The reject filters are configured to reject packets based on the content and/or metadata information associated with the individual packets and the accept filters are configured to accept packets based on the content and/or metadata information associated with the individual packets. In some implementations, each of the mission definitions (e.g., filter graphs) is configured to identify an incoming packet as a packet with high value information when the incoming packet is not rejected by any of the reject filters and the particular packet is accepted by a predefined combination of the accept filters. In some implementations, the predefined combination is each of the accept filters. In some implementations, the reject and accept filters are defined using one or more of: regular expressions or any Non-Deterministic Automata (NDA)/Deterministic Finite automata (DFA) specification language. In some implementations, the reject and accept filters are configured for execution in parallel on a plurality of the processors.

In some implementations, each of the models embody one or more of: lexical filters, semantic filters, and ontological filters.

In some implementations, the method 2100 further includes generating (2106) automatically, without user intervention, regular expressions for at least some of the filters associated with the particular mission definition (e.g., filter graph) in order to configure the filters to accept or reject the individual packets in a data stream that include keywords in the content information in view of logical operators associated with the keywords. In some implementations, the graph edges of a respective filter graph are generated in accordance with logical relationships between the classification models (e.g., filter nodes) of a mission definition (e.g., filter graph). In some implementations, the logical operators include NOT, OR, NOR, NAND and XOR. In some implementations, the regular expressions are generated (2108) in view of selected pre-existing classification models (e.g., filter nodes) saved in a model library, and the pre-existing classification models are selected based on the keywords. For example, in some circumstances, a front-end user will develop a mission definition (e.g., filter graph) using an integrated development environment (IDE) with a graphical user interface and one or more libraries of models, each of which comprises one or more filters. In such circumstances, the user will "drag-and-drop" models into place to form (e.g., organize the models into) a general graph, which represents the mission definition (e.g., filter graph). In some implementations, one or more of the models will be keyword-based (e.g., filters within the model will be configured to accept or reject packets having a particular brand name within the contents of the packet). In some implementations, the models are organized into a general graph automatically without user intervention (e.g., by a client interface or a compiler).

In some implementations, the models include one or more of textual filters that are applied to text content of the packets, author filters that are applied to the author information associated with the packet, or publisher filters that are applied to the publisher information associated with the packets.

In some implementations, processing each of the packets includes first executing the textual filters on the content of the packets, including executing one or more reject or accept filters that reject or accept a packet based on the content and/or metadata of the packet, then executing the author and/or publisher filters on the packets not rejected by the textual filters, including executing one or more reject or accept filters that reject or accept a packet based respectively the author or publisher information associated with the packet. In some implementations, the accept and reject filters include accept and reject text filters that are applied in real-time to text content of the packets.

In some implementations, the keywords are translated by a compiler into regular expressions. In some implementations, each of the mission definitions (e.g., filter graphs) is independent of other mission definitions (e.g., filter graphs).

In some implementations, a subset of the classification models (e.g., filter nodes) in one or more of the mission definitions (e.g., filter graphs) are concatenated in a one-dimensional chain, so as to enable extraction of high-value information at different levels of specificity for the one or more mission definitions (e.g., filter graphs). For example, one or more of the mission definitions (e.g., filter graph) include a plurality of taps (e.g., leaf nodes of the filter graph, as described, for example, with reference to FIG. 1) positioned at the outputs of respective models, such that the taps allow the state of the respective model to be examined and/or used as inputs to other mission definitions (e.g., filter graphs) and/or models.

The method 2100 further includes preparing (2110) the mission definitions (e.g., filter graphs) for execution on the plurality of processors (e.g., compiling, optimizing, and the like).

The method 2100 further includes, in response to receiving a first data stream with a plurality of first packets, distributing (2112) each of the first packets to inputs of each of the executable mission definitions (e.g., filter graphs).

The method 2100 further includes, identifying (2114), using each of the executable mission definitions (e.g., in accordance with each of the executable mission definitions), respective ones of the first packets with high value information according to the respective mission definition (e.g., filter graph), based on parallel execution of the models included in the respective mission definition.

In some implementations, the method 2100 further includes, injecting a plurality debug packet into the first data stream in accordance with a predetermined schedule.

In some implementations, the method 2100 further includes determining, in accordance with the predetermined schedule, whether the debug packet was received at a terminus of each of the executable mission definitions. Reception of the debug packet at a respective terminus of a respective executable mission definition indicates active broadcasting of packets to the respective executable mission definition In some implementations, the method 2100 further includes, when the debug packet was not received at the respective terminus, providing an indication to a user of the respective mission definition that broadcasting of packets to the respective mission definition is not active.

FIGS. 22A-22C are flow charts illustrating a method 2200 for real-time extraction of high-value information from data streams, in accordance with some implementations. The method 2200 is performed at a computer system including a plurality of processors and memory storing programs for execution by the processors.

In some implementations, as a preliminary operation, the method 2200 includes harvesting (2202), using a third-party data aggregator, at least one first post in the plurality of posts (cf. 2208) from a first website, and harvesting, using the third-party data aggregator, at least one second post in the plurality of posts from a second website.

In some implementations, as a preliminary operation, the method 2200 includes harvesting using a direct crawler associated with a third website, one or more third posts in the plurality of posts (cf. 2208) from the third website. As described previously, direct harvesting is particularly useful when, for example, a relatively niche website (e.g., a website that is unlikely to be crawled by a third-party data aggregator) publishes a large number of posts that are of potentially high-value to a particular front-end user (e.g., a client/company).

In some implementations, as a preliminary operation, the method 2200 includes harvesting, using an application program interface (API) associated with a fourth website, one or more fourth posts in the plurality of posts (cf. 2208) from the fourth website. For example, several prominent social networking sites provide API's for harvesting a subset of the post published thereon. Often, users of such social networking sites will published posts on the social networking sites, for example, expressions frustration or satisfaction regarding a company and/or their product (e.g., the post represents high value information to the company). In some circumstances, such a post will be made available publicly using the social networking sites API, and thus can be harvested in that manner.

The method 2200 includes receiving (2208) a plurality of data streams. Each of the data streams includes a plurality of posts (e.g., via any of the harvesting operations 2202, 2204, and/or 2206). Each of the posts includes a content portion and one or more source characteristics. In some implementations, the one or more source characteristics include (2210) one or more of author information and publisher information.

In some implementations, the method 2200 further includes normalizing (2212) the author information and/or publisher information according to a standard author and/or publisher source format. For example, in some circumstances, author information for first posts (cf. 2202) will be held in a field unique to the first website, whereas author information for second posts (cf. 2202) will be held in a field unique to the second website. In this example, normalizing the author information according to a standard author format will include parsing the first posts and second posts in accordance with the first and second websites, respectively, to produce consistent author packets regardless of their origin. In this manner, the origin of a post (e.g., the first or second website) is transparent to downstream elements of the computer system.

In some implementations, the method 2200 further includes associating (2214) the author information and the publisher information with respective posts associated with the same author and/or publisher. For example, a publisher profile is accessed in publisher store 530 and said publisher profile is updated with the publisher information. As another example, an author profile is accessed in author store 532 and said author profile is updated with the author information. In some implementations, associating operation 2214 occurs in real-time. In some implementations, associating operation 2214 occurs in near real-time.

The method 2200 further includes, in real time (2216), for each post in a particular data stream:

assigning (2218) the post a post identifier (e.g., a post UUID);

assigning (2220) each of the one or more source characteristics a respective source identifier (e.g., an author or publisher UUID);

generating (2222) a content packet and one or more source packets; the content packet includes a respective source identifier and content information corresponding to the content portion of the post, and the one or more source packets each include the post identifier as well as source information corresponding to a respective source characteristic;

querying (2224) the memory to access a source profile using the respective source identifier;

correlating (2226) the content packet with information from the source profile to produce a correlated content packet broadcasting (2228) the correlated content packet to a plurality of mission definitions (e.g., filter graphs); each of the mission definitions is configured to identify posts with high value information according to the respective mission definition, each of the mission definitions being configured to execute on at least a subset of the plurality of processors.

In some implementations, the method 2200 further includes, in near real-time, updating (2230) the source profile using the information corresponding to the respective source characteristics.

In some implementations, the method 2200 further includes indexing (2232) each post in the data stream, and storing each post in the data stream. In some implementations, one or both of the indexing and storing operations occurs in real-time. In some implementations, one or both of the indexing and storing operations occurs in near real-time.

In some implementations, the computer system includes (2234) a source profile caching sub-system with one or more cache levels including at least a first-level cache storing a plurality of first source profiles and a second-level cache storing a plurality of second source profiles. In such implementations, the querying 2218 further includes one or more of the following operations:

transmitting (2236) the respective source identifier to a first-level cache. In some implementations;

querying (2238) the first-level cache to access the source profile using the respective source identifier;

automatically transmitting (2240), when querying of the first-level cache returns a result corresponding to a first-level cache-miss, the respective source identifier to the second-level cache;

querying (2242) the second-level cache to access the source profile using the respective source identifier transferring (2244), when the second-level cache returns a result corresponding to a second-level cache hit, the source profile to the first-level cache memory, thereby adding the source profile to the first source profiles.

discarding (2246), from the first source profiles, respective ones of the first source profiles according to least-recently posted criteria.

In some implementations, each of the mission definitions (e.g., filter graphs) includes a plurality of classification models (e.g., filter nodes), each of which is configured to accept or reject individual posts in a data stream based on content and/or metadata information associated with the individual posts. In some implementations, the classification models (e.g., filter nodes) included in a respective mission definition are combined (e.g., arranged) according to a predefined arrangement so as to identify the individual posts with high value information according to the respective mission definition (e.g., based on relevance of content and/or metadata information associated with a post with respect to an interest associated with the filter node). Configuring the mission definitions to execute on at least a subset of the plurality of processors includes preparing the models for executing on respective ones of the processors. In some implementations, the classification models include a plurality of natural language filters. In some implementations, the natural language filters are specified lexically using regular expressions. In some implementations, the regular expressions are implemented as deterministic finite automatons.

In some implementations, the source profile is based at least in part on information obtained from previously received posts associated the respective source identifier.

In some implementations, the least-recently posted criteria (cf. discarding operation 2246) include a least-recently author posted criterion whereby author profiles corresponding to authors who have posted more recently continue to be stored in a higher level author cache (e.g., a first level author cache) while author profiles corresponding to authors who have not posted recently are relegated to a lower level author cache (e.g., a second level author cache). Likewise, the least-recently posted criteria include a least-recently publisher posted criterion whereby publisher profiles corresponding to publishers who have posted more recently continue to be stored in a higher level publisher cache (e.g., a first level publisher cache) while publisher profiles corresponding to publishers who have not posted recently are relegated to a lower level publisher cache (e.g., a second level publisher cache). In some implementations, one or more respective first-level caches (e.g., author and/or publisher first-level caches) are of sufficient size to store, on average, all respective source profiles (e.g., author and/or publisher profiles) for which a corresponding packet has been received within a previous month.

FIG. 23 is a flow chart illustrating a method 2300 for optimizing real-time, parallel execution of models for extracting high-value information from data streams, in accordance with some implementations.

The method includes receiving (2302) a mission definition (e.g., filter graphs). The mission definition includes a plurality of classification models (e.g., filter nodes), each classification model including one or more filters that accept or reject packets. Each respective filter is categorized by a number of operations, and the collection of filters is arranged in a general graph. In some implementations, the mission definition is received at a compiler (e.g., parallelizing compiler 1504). In some implementations, the general graph is (2304) a non-optimized general graph.

In some implementations, the method further includes determining (2306) if a closed circuit exists within the graph, and when the closed circuit exists within the graph, removing the closed circuit. In some circumstances, removing the closed circuit produces a higher degree of acyclicity within the graph.

In some implementations, the method further includes reordering (2310) the filters based at least in part on the number of operations. In some implementations, a first filter having a smaller number of operations than a second filter is executed (2312) before the second filter (e.g., filters characterized by a smaller number of filters are executed before filters characterized by a larger number of filters).

In some implementations, the method further includes parallelizing (2314) the general graph such that the collection of filters are configured to be executed on one or more processors In some implementations, the method further includes translating (2316) the filters into a plurality of deterministic finite automaton (DFA), and merging one or more DFAs based on predefined criteria. In some implementations, accept DFA in series are merged, and reject DFAs in parallel are merged.

FIG. 24 is a flow chart illustrating a method 2400 of generating statistical topic models in accordance with some implementations. The method 2400 is performed at a computer system (e.g., the Topic Discovery HyperEngine 586) including a plurality of processors and memory storing programs for execution by the processors. Different implementations of the methods described herein are directed to improved techniques for generating statistical topic models that produce results more quickly than conventional methods with improved accuracy.

The method 2400 includes receiving (2402) (e.g., using receiving module 586-*a*) a corpus that includes a plurality of electronic posts from another module of the computer system (such as Bouncer 536) or from a device external to the Topic Discovery HyperEngine 586. The electronic posts comprise unstructured data (e.g., containing information that either does not have a pre-defined data model or is not organized in a pre-defined manner). Examples of electronic posts include social media posts (e.g., FACEBOOK posts, TWITTER posts), online forum posts and blog posts. Each electronic post includes at least one word. As described in more detail below, the words of the corpus are used in a topic discovery model described herein to identify topics (e.g., statistical topic models) in the corpus and cluster electronic posts accordingly.

In some implementations, the method 2400 includes indexing the plurality of electronic posts; and storing the plurality of electronic posts in the topic store 590 after receiving the plurality of electronic posts from Bouncer 536. As a result, the computer system may access the plurality of electronic posts from the topic discovery store 590 and execute a topic discovery model to cluster the plurality of electronic posts at a later time.

In some implementations, the received corpus is pre-filtered for relevance to a particular topic. For example, an unfiltered stream of TWITTER posts ("TWEETS") will be filtered (e.g., by a mission, as described above) in accordance with a "politics" filter to identify those TWEETS that pertain to politics. That is to say, in some implementations, the output of a mission is an input corpus for the method 2400. The method 2400 further includes identifying "hot" or trending TWITTER sub-topics in the stream of TWITTER posts within the general topic of politics.

The method 2400 includes identifying (2404) (e.g., using identifying module 586-*b*), within the corpus, a plurality of candidate terms. In some implementations, a computer system scans and parses the corpus to identify one or more words in the electronic posts that can be candidate terms. In some implementations, candidate terms include at least one of: individual words and proximity n-grams in the corpus. Stated another way, in some implementations, identifying the plurality of candidate terms includes augmenting a set of words within the corpus with a set of n-grams that is constructed from the words within the corpus. The candidate terms, whether individual words or proximity n-grams, can be used by the method 2400 to identify topics associated with the electronic posts.

Each individual word is representative of a word that appears in the corpus while each proximity n-grams (e.g., bi-gram, tri-gram) is representative of combinations of n words that appear in close proximity to each other in the corpus. As an example of a proximity n-gram, in some implementations, the following list of proximity n-grams are identified from the phrase "President Barack Obama": "president_barack," "barack_obama" and "president_obama."

In some implementations, close proximity means the words that appear within a predetermined number of words (e.g., 5 words or less) from each other. The Topic Discovery HyperEngine 586 associates each of the proximity n-gram with an integer corresponding to the sum of number of words that separate two terms that comprise a proximity n-gram, and one. For example, the phrase "President Barack Obama" may include proximity n-grams: "president_barack; 1," "barack_obama; 1" and "president_obama; 2." In this example, the first proximity n-gram, "president_barack" includes two terms that are consecutive, meaning no words separate the two terms that comprise the proximity n-gram. Here, the Topic Discovery HyperEngine 586 associates an integer of one with this proximity n-gram. In contrast, the proximity n-gram, "president_obama," includes two terms that are separated by one word. Here, the Topic Discovery HyperEngine 586 associates an integer of two with this proximity n-gram. As explained below, these integers associated with each of the proximity n-grams are utilized in one of a plurality of weighting methodologies to identify the most relevant candidate terms for use with the topic discovery model.

In some implementations, the Topic Discovery HyperEngine 586 combines proximity n-grams and sums the weightings of the proximity n-grams to create a single candidate term when the proximity n-grams include similar words. For example, the Topic Discovery HyperEngine 586 may initially create three proximity n-grams for the phrase "President Barack Obama": President_Obama, President-_Barack and Barack_Obama. As discussed above, the Topic Discovery HyperEngine 586 may also assign a weighting to each of the proximity n-grams. Because some of the words overlap in the proximity n-grams, the Topic Discovery HyperEngine 586 may combine the proximity n-grams to create a single proximity n-gram, "President_Obama" as a candidate term with a weighting equal to the sum of the weightings for each of the proximity n-grams.

Proximity n-grams are more relevant than individual words in topic discovery because proximity n-grams take syntax (i.e. word proximity) into account. By taking syntax into account, implementations described herein can select more relevant topics for clusters of electronic posts as compared to conventional models. In conventional topic discovery models, candidate terms are identified based on the "Bag of Words" model. In this model, each document or snippet is associated with the most relevant topic represented by a set of individual words. The relevancy of a topic is based on the frequency of each word appearing in the document or snippet. One of the problems with the "Bag of Words" model is that it does not take word syntax into account. For example, the words "President" and "Obama" may appear in an electronic post, but the fact that the two words might frequently appear next to each other, as "President Obama," will be lost in this model. Yet, because these two words frequently appear close to each other means the two terms together provide a better indicator of a relevant topic for an electronic post than the two terms individually. Proximity n-grams can improve upon the "Bag of Words" model by taking word syntax into account, thereby providing better candidate terms for clustering electronic posts and identifying relevant topics.

The method 2400 includes selecting (2406) (e.g., using selecting module 586-*c*), as a trimmed lexicon, a subset of the plurality of candidate terms according to predefined criteria. Instead of performing automatic topic discovery with the entire lexicon that is present in the corpus, some implementations only use a subset of available candidate terms in the lexicon for topic discovery. A trimmed lexicon (i.e. a subset of the entire lexicon) reduces the dimensionality of the computational topic discovery problem, thereby allowing the Topic Discovery HyperEngine 586 to utilize less computing resources to cluster electronic posts and generate relevant topics more quickly as compared to conventional techniques.

In some implementations, selecting the plurality of candidate terms according to the predetermined criteria includes using a weighting methodology. In a weighting methodology, the Topic Discovery HyperEngine 586 assigns a weighting (e.g., a score) to each of the candidate terms. These weightings can later be used to select a trimmed lexicon based on additional predetermined criteria (e.g., a predetermined threshold). In some implementations, candidate term weighting is based on a frequency with which the candidate terms appear in the corpus divided by the total number of candidate terms that appear in the corpus (e.g., a local weighting). In some implementations, candidate term weighting is based on one of: total frequency inverse document frequency ("TFIDF"), point-wise or paired mutual information ("PMI"), and entropy.

In the TFIDF weighting methodology, a weighting for a candidate term is equal to the local weighting of a candidate term divided by the global weighting of the candidate term. The local weighting (e.g., the frequency of the term appearing in the corpus) is equal to the number of times the term appears in the corpus divided by the total number of words in the corpus. For example, if the word "President" appears five times out of one hundred total words, the frequency of the term "President" appearing in the corpus is five percent. The global weighting (e.g., the frequency of the term appearing in the global corpus) is calculated using the same calculation above for local weighting, except a global corpus (e.g., a larger collection of electronic posts as compared to the corpus) is used instead of the corpus. The Topic Discovery HyperEngine 586 can use the TFIDF methodology to discriminate against words that appear frequently in the corpus but also appear frequently in the global corpus and prioritize words that do not appear frequently in the corpus but also do not appear frequently in global corpus.

The PMI and entropy weighting methodologies are similar to TFIDF except that they calculate weightings for proximity n-grams. For the PMI weighting methodology, the weighting for a proximity n-gram is equal to the log of the frequency of the proximity n-gram appearing in the corpus divided by the product of the frequency of each word that comprises the proximity n-gram individually appearing in the corpus. For example, the equation for calculating the frequency of a bigram appearing in the corpus using the PMI weighting methodology is as follows:

$$\log(PR(w_i,w_j)/(PR(w_i)*PR(w_j))),$$

where, $PR(w_i,w_j)$ is the frequency of a proximity n-gram term appearing in the corpus, $PR(w_i)$ is the frequency of a first term (e.g., a first word) in a proximity n-gram appearing in the corpus, $PR(w_j)$ is the frequency of a second term (e.g., a second word) in a proximity n-gram appearing in the corpus.

For the entropy weighting methodology, the weighting is equal to the product of the negative frequency of the candidate term occurring in the corpus and the log of the frequency of the candidate term occurring in the corpus. For example, the equation for calculating the frequency of a bigram appearing in the corpus using the entropy weighting methodology is as follows:

$$1.0*PR(wi,wj)*\log(PR(wi,wj))$$

where, $PR(w_i,w_j)$ is the frequency of the proximity n-gram term appearing in the corpus.

In some implementations, the Topic Discovery Hyper-Engine 586 multiplies a weighting for a proximity n-gram by a decreasing monotonic function based on the number of words that separate the terms that comprise a proximity n-gram. In these implementations, the Topic Discovery HyperEngine 586 retrieves the integer associated with a proximity n-gram from topic discovery store 590 and utilizes the integer in the decreasing monotonic function. In one implementation, the decreasing monotonic function is $1/r^2$, where r is the number of words that separate the terms that comprise the proximity n-gram. This candidate term weighting adjustment accounts for the inverse relationship between the relevancy of a proximity n-gram and the distance between words in a proximity n-gram increases.

In some implementations, after the Topic Discovery HyperEngine 586 calculates the weightings, the Topic Discovery HyperEngine 586 selects a predefined number of candidate terms with the best weightings (e.g., scores) to include in the trimmed lexicon used by the topic discovery model. In some implementations, the Topic Discovery HyperEngine 586 may select a predefined number (e.g., a number between 100 and 1000) or predefined percentage (e.g., top $1/100$ or top $1/4$) of candidate terms that have the highest weighting or score. In other implementations, the Topic Discovery HyperEngine 586 may select candidate terms having a weighting that exceeds a predetermined threshold. In other implementations, the Topic Discovery HyperEngine 586 normalizes the weightings for each candidate term by applying a normal distribution with a mean of zero and a variance of one to the candidate term weightings before selecting candidate terms that exceed a predetermined threshold.

The method 2400 includes clustering (2408) (e.g., using clustering module 586-*d*) at least a subset of the plurality of electronic posts using a topic discovery model and the trimmed lexicon to produce statistical topic models. In some implementations, the Topic Discovery HyperEngine 586 clusters the subset of the plurality of electronic posts by a discovery method called latent Dirichlet allocation (LDA). This topic discovery model characterizes sets of electronic posts based on combinations of candidate terms that are most relevant to the set of electronic posts. These combinations of candidate terms are referred to herein as topics. In some implementations, the Topic Discovery HyperEngine 586 assigns each term in the trimmed lexicon a probability corresponding to each cluster in the plurality of clusters (e.g., for each cluster, the Topic Discovery HyperEngine 586 generates a distribution over terms). The Topic Discovery HyperEngine 586 then assigns each cluster (e.g., topic) a probability corresponding to each electronic posts (e.g., for each electronic post, the Topic Discovery HyperEngine 586 generates a distribution over clusters).

In some implementations of the topic discovery model, the Topic Discovery HyperEngine 586 may assign a similar initial probability (e.g., an uninformative prior distribution) to each of the candidate terms. In these implementations, the Topic Discovery HyperEngine 586 treats each candidate term as initially equal when implementing any of the clustering algorithms described above.

Alternatively, in some implementations, the method 2400 further includes using the weightings for each of the selected candidate term as an input to clustering operation 2408. For example, the Topic Discovery HyperEngine 586 may use the weightings calculated for the candidate terms to determine how to assign candidate terms to each of the topics when implementing LDA. By using the previously-calculated weightings, the Topic Discovery HyperEngine 586 can reduce processing time necessary to perform topic discovery by focusing on candidate terms with higher weightings. The candidate terms with higher weightings are representative of candidate terms that are more likely to influence the topics applicability to the cluster of electronic posts.

In some implementations, the method 2400 includes, prior to identifying, within the corpus, the plurality of candidate terms, normalizing the plurality of electronic posts by performing one or more of the following operations on content within the plurality of electronic posts: stop term removal; spelling correction; synonym mapping; token downcasing; and duplicate post removal. Each of these normalizations improves the trimmed list of candidate terms selected by the Topic Discovery HyperEngine 586 to improve topic discovery for the corpus. Each of these normalization techniques are described below in greater detail.

Stop terms are common words, numbers or symbols that do not provide relevant information that can be used by a computer system to discover topics for a cluster. Examples of stop terms include: "the," "at," "which," "on," "@," "#," "$," an email address, file extensions, uniform resource locator, and emoticons. By removing these terms from the trimmed candidate list, the Topic Discovery HyperEngine 586 can predict more relevant topics for the corpus and improve clustering and topic discovery for the electronic posts.

Spelling mistakes also affect the ability of Topic Discovery HyperEngine 586 to discover topics for a cluster. By correcting for spelling mistakes, the Topic Discovery HyperEngine 586 improves candidate term frequency counts which are used to identify the most relevant candidate terms to use in the topic discover model. In some implementations, the Topic Discovery HyperEngine 586 matches characters of candidate terms to count candidate term frequency. Without correcting for spelling mistakes before character matching, the Topic Discovery HyperEngine 586 cannot properly count candidate term frequency. For example, the term "Obama" and the misspelled term "bOama" will be counted as different candidate terms unless the Topic Discovery HyperEngine 586 corrects for spelling mistakes. By correcting for spelling mistakes, the Topic Discovery HyperEngine 586 can properly count candidate term frequency and thereby properly weight each of the candidate terms.

In some implementations, the Topic Discovery HyperEngine 586 may replace a word or phrase with a synonym (e.g., synonym mapping) to improve candidate term counting and topic discovery. In these implementations, a plurality of synonym term pairs may be stored in the topic discovery store 590. Each synonym term pair includes a first term and a second term mapped to the first term. If the Topic Discovery HyperEngine 586 identifies a term in the corpus that corresponds to the first term, the Topic Discovery HyperEngine 586 replaces the term in the corpus with the second term. For example, the phrase "obamacare" is methodologically equivalent to "affordable care act." If the Topic Discovery HyperEngine 586 identifies the term "obamacare" in the corpus, the Topic Discovery HyperEngine 586 replaces the term "obamacare" with "affordable care act." By removing synonyms from the corpus, the Topic Discovery HyperEngine 586 can properly count candidate term frequency and thereby properly weight each of the candidate terms before performing topic discovery.

In some implementations, equivalent candidate terms may differ only by their case (e.g., uppercase, lowercase). For example, "President Barack Obama" is methodologically equivalent to "president barack obama." Yet, if the Topic Discovery HyperEngine 586 differentiates between candidate terms based on case sensitivity, each of these terms may be treated as different candidate terms. In some implementations, the Topic Discovery HyperEngine 586 may downcase all words in the plurality of electronic posts to prevent two equivalent words or phrases from being considered as different candidate terms. For example, the Topic Discovery HyperEngine 586 may replace "President Barack Obama" with "president barack obama."

In some implementations, the Topic Discovery HyperEngine 586 automatically, without user intervention, associates a topic label with each respective cluster that meets one or more prevalence criteria. As noted above, for each cluster, the Topic Discovery HyperEngine 586 generates a probability distribution over candidate terms. In one implementation, the prevalence criteria correspond to candidate term probabilities. For example, the Topic Discovery HyperEngine 586 automatically labels the cluster with the term with the highest probability within the probability distribution for that cluster. For example, when the term "presiden-t_obama" has the highest probability (or strength) within a cluster, "president_obama" is automatically used as the label for that cluster. Alternatively, the Topic Discovery HyperEngine 586 may set a predetermined number of candidate terms with the highest probability in the cluster of electronic documents as the topic label.

Lastly, the method 2400 includes storing (2410) (e.g., using storing module 586-*e*) information corresponding to the statistical topic models in the topic discovery store 590. In some implementations, the information includes i) the electronic posts, ii) the candidate terms (e.g., proximity n-grams and word separation count), iii) the trimmed lexicon, iv) for each electronic post, one or more topics associated with the electronic post and an associated probability for each of the one or more topic indicating the prevalence of the topic within the electronic post, and/or v) for each topic, an option label as well as one or more candidate terms associated with the topic and an associated probability for each of the one or more candidate term that indicates the prevalence of the candidate term within the topic.

In some implementations, the Topic Discovery HyperEngine 586 receives a second plurality of electronic posts that comprise a corpus. In these implementations, the Topic Discovery HyperEngine 586 clusters the second plurality of electronic posts according to the previously-generated statistical topic models.

Systems and Methods for Data Stream Classification, Storage, and Rebuilding

This application relates to methods, systems, and devices to automatically classify, store, and assign versions to data from data streams (e.g., streams of electronic posts, including social media posts).

Social media enables one to be informed about the happenings in the world. Every day, tens of millions of social media users go online to express opinions, share ideas, and publish media for the masses. Consumers control the conversation and play a significant role in shaping, for example, the purchasing decisions of others. Thus, companies have to work harder to manage their reputations and engage consumers in this fluid medium. Businesses that learn to understand and mine consumer-generated content across blogs, social networks, and forums have the opportunity to leverage the insights from others, make strategic business decisions and drive their bottom line. Social media monitoring is often the first step to adopting and integrating the social Web into business.

Because of the enormous amount of data generated on the internet, even a short outage in monitoring may result in millions of missed posts.

Thus, there is a need for systems that can continue to monitor data from the internet (for example, as described in U.S. patent application Ser. No. 14/214,410), while simultaneously rebuilding lost data resulting from, for example, an outage in monitoring. Because the flow of data from the internet is unrelenting, such systems should not stop monitoring in real-time while rebuilding lost data. Rather, the two should be executed in parallel.

The technical problem that arises in this context is that the already massive, resource intensive, task of monitoring data from the internet is effectively doubled while the rebuilding process is executed in parallel with the real-time monitoring process. The disclosed embodiments solve these problems by providing, among other things, architectures capable of handling these requirements. For example, the systems disclosed herein can monitor, at roughly 10% of their capacity, hundreds of thousands of documents each second (e.g., TWEETS, FACEBOOK posts), leaving ample capacity to rebuild lost data sets. In addition, the system architectures described herein use a small-fraction of the hardware that conventional massive computation systems use, reducing energy consumption and conserving resources.

In addition, the ability to monitor, in parallel, massive real-time data streams and rebuild historical datasets allows users to modify filter definitions after-the-fact, without losing data. Further, some embodiments described herein automatically assign a different version number to data sets built, using monitoring filters, at different times, regardless of whether it was generated in real-time or after-the-fact.

In one aspect, some implementations include a method of classifying, storing, and assigning versions to data stream history performed at a computer system including a plurality of processors and memory storing programs for execution by the processors. The method includes: (1) continuously receiving a data stream that includes a plurality of packets; (2) indexing and storing the plurality of packets in the data stream; (3) without user intervention, in real-time with receiving the data stream, performing a monitoring process, including: (a) distributing at least a first subset of the plurality of packets to a first filter, wherein the first filter accepts packets that meet first relevance criteria with respect to a subject; (b) identifying, using the first filter, respective packets of the at least first subset of the plurality of packets as relevant to the subject; (4) in non-real-time with receiving the data stream and in parallel with the monitoring process: (a) retrieving at least a second subset of the indexed and stored packets; (b) distributing the second subset of the plurality of packets to a second filter, wherein the second filter accepts packets that meet second relevance criteria with respect to the subject; and (c) identifying, using the second filter, respective packets of the at least second subset of the plurality of packets as relevant to the subject.

In another aspect, some implementations include a computing system including one or more processors and memory coupled to the one or more processors, the memory storing one or more programs configured to be executed by the one or more processors, the one or more programs including instructions for performing any of the methods described herein.

In yet another aspect, some implementations include a non-transitory computer-readable storage medium storing one or more programs for execution by one or more processors of a computing system, the one or more programs including instructions for performing any of the methods described herein.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 25A:
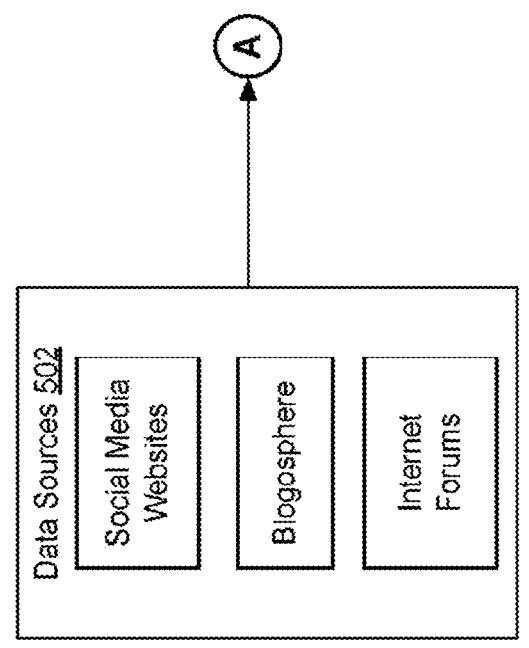
Figure 25B:
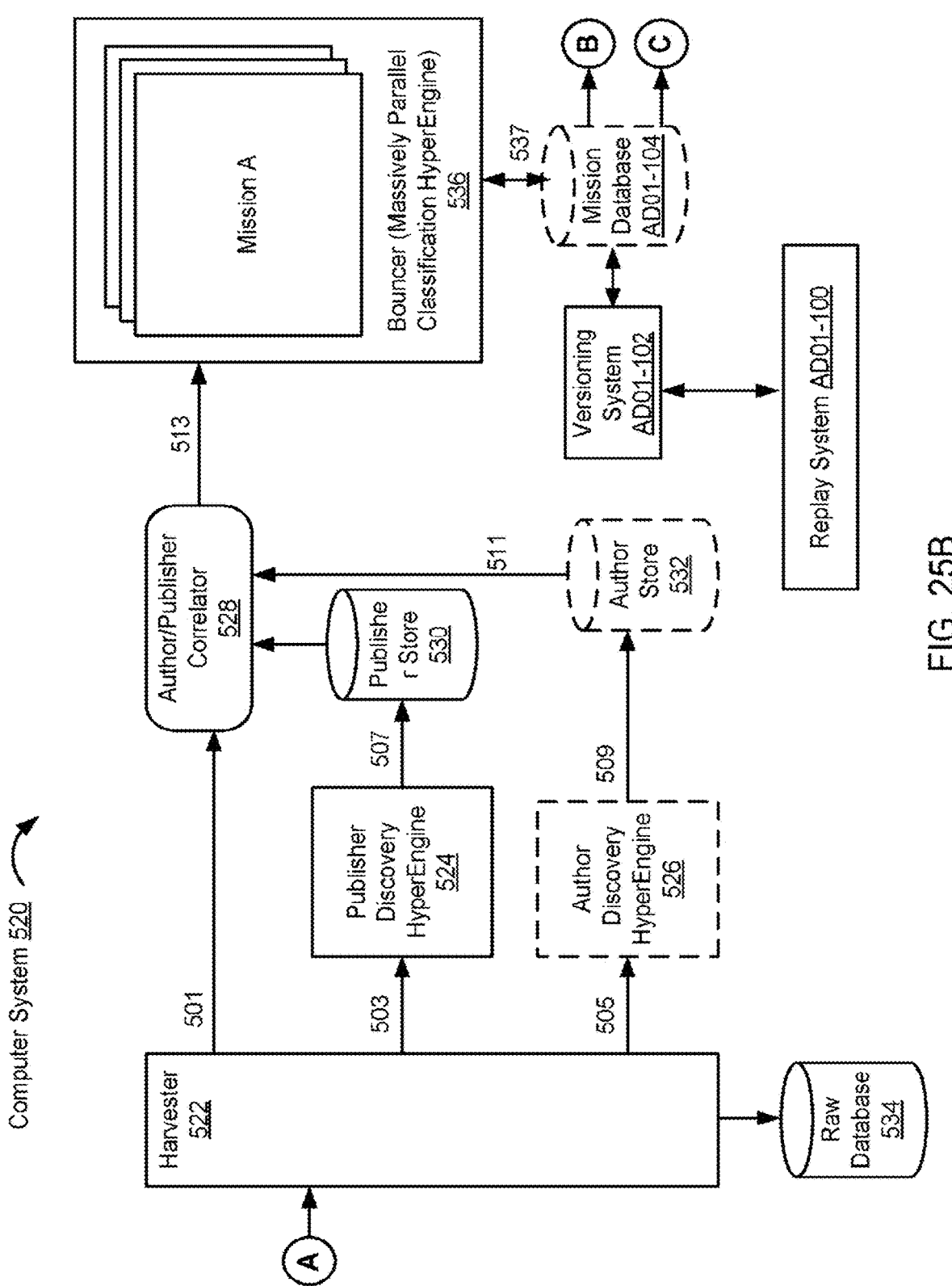

FIGS. 25A to 25C illustrate a modified representation of the massively parallel computer system 520 shown in FIGS. 5A and 5B of U.S. patent application Ser. No. 14/214,410, for automatically classifying and storing data streams, and assigning versions to data streams, in accordance with some implementations.

The computer system 520 includes a Harvester 522 that collects posts (e.g., data) from multiple data sources (e.g., data sources 502 in FIG. 25A), a raw database 534, a snippet path 501, a publisher path 503, an author path 505, a Publisher Discovery HyperEngine 524 that is connected to a Publisher Store 530 via a path 507, and an Author Discovery HyperEngine 526 that is connected to an Author Store 532 via a path 509. An Author/Publisher Correlator 528 performs real-time data correlation with existing information about the respective snippet's author and publisher. A respective correlated snippet is transmitted, via a path 513, to a Bouncer 536 that compares the correlated snippet to one or more high specificity data stream filters (e.g., executable mission definitions), each defined by a set of models, each model including one or more filters. These components and their functionalities have been described in greater detail in U.S. patent application Ser. No. 14/688,865, which is incorporated by reference herein in its entirety.

In some implementations, the computer system 520 further includes a Mission Database AD01-104, a versioning system AD01-102, and a replay system AD01-100, as illustrated in FIG. 25B.

The Mission Database AD01-104 receives, indexes and stores data stream(s), including data packets (e.g., snippets). In some implementations, the Mission Database AD01-104 stores packets that have been identified as relevant to a subject, using one or more missions (e.g., executable filter definitions, as explained elsewhere in this document).

In some implementations, the Mission Database AD01-104 stores all the data packets that are included in the data stream. In some implementations, the Bouncer 536 includes an "Accept All" mission that is configured to accept everything from the Author/Publisher Correlator 528. Accordingly, in this instance, the path 537 passes all of the data from Author/Publisher 528, and thus the Mission Database AD01-104 receives, indexes and stores all the data of the computer system. In some embodiments, mission database AD01-104 is combined with, or obviates the need for, raw database 534.

In some implementations, additional information such as the date, time, and processing conditions (e.g., filter(s) and relevance criteria applied) associated with each packet are stored alongside (e.g., as metadata corresponding to) the respective packet content.

In some implementations, each of the stored packets further includes a version ID that is assigned by a versioning system (e.g., versioning system AD01-102), based on versioning rules. In some implementations, a distinct (e.g., unique) version ID is assigned to the stored packet(s) according to one or more conditions (e.g., date, time, filter(s), relevance criteria, etc.). In some implementations, the version ID includes numbers, letters, hashkeys, or any of their combinations.

In some implementations, packets that are not processed by the one or more high specificity data stream filters of the Bouncer 536 and the replay system AD01-100 (e.g., data that are accepted by the "Accept All" mission) are assigned a version ID that is distinct from packets that have been processed by the filters. For example, data accepted by the "Accept All" mission is given a default version number "0." Data that is accepted, in real-time, by any other mission is given a default version number of "1." When a mission is run in a replay mode, e.g., to rebuild a data set or because the mission has been modified, the resulting data is given a version number distinct from the default version ID. For example, the mission number is given an incremental version number, so that if the mission replays version "1" data, the resulting data is given a version ID "2." In some implementations, the version number assigned increments the highest version number of any of the data replayed. Thus, if, because of an outage in the real-time system, a mission replays some version 1 data and some version 2 data, the resulting data is given a version number of "3."

Thus, in some implementations, data stored in the mission database AD01-104 are retrieved and replayed. For example, data packets are replayed according to different mission definitions to obtain various analytics. Alternatively, the same mission definition may be used to analyze data packets that were collected at different times. In some implementations, the versioning system AD01-102 generates a unique version ID for data packets based on their replay conditions. In some implementations, the versioning system AD01-102 generates unique increasing integers that act as a unique IDs for each replay. The packets are stored in the mission database AD01-104 along with their respective version IDs and replay conditions. In some implementations, the mission database AD01-104 includes an indexing search system that enables a user to perform a search query on the mission database AD01-104 that includes a timeframe. The indexing search system of the mission database AD01-104 then makes another request to the versioning system AD01-102 with the timeframe and receives the correct query to search on the latest version for every time interval within the search request. The results are then relayed back to the user.

In some implementations, in response to different clients issuing replay requests at the same time, the versioning system AD01-102 uses a blocking request reply protocol with its clients and therefore guarantees a response of a unique integer to the different clients issuing the requests at the same time.

In some implementations, the versioning system AD01-102 is connected to the replay system AD01-100 and rebuilds (e.g., replays) data sets for various timeframes. In some implementations, the versioning system AD01-102 includes a replay version manager that the replay system AD01-100 contacts for every new data set being replayed, and generates the latest version number. The versioning system AD01-102 takes this information and rebuilds information so the user always sees the latest version for a timeframe.

In some implementations, the versioning system AD01-102 further includes a 'skyline' system that presents to a user most recent data (e.g., including version ID(s)). In some implementations, the versioning system AD01-102 also stores a history of all the version IDs corresponding to the different replays. Accordingly, the version system AD01-102 serves as a backup for the mission database AD01-104 in terms of keeping track of data recency and data versions. Details of the skyline versioning system are described in subsequent paragraphs.

Figure 26:
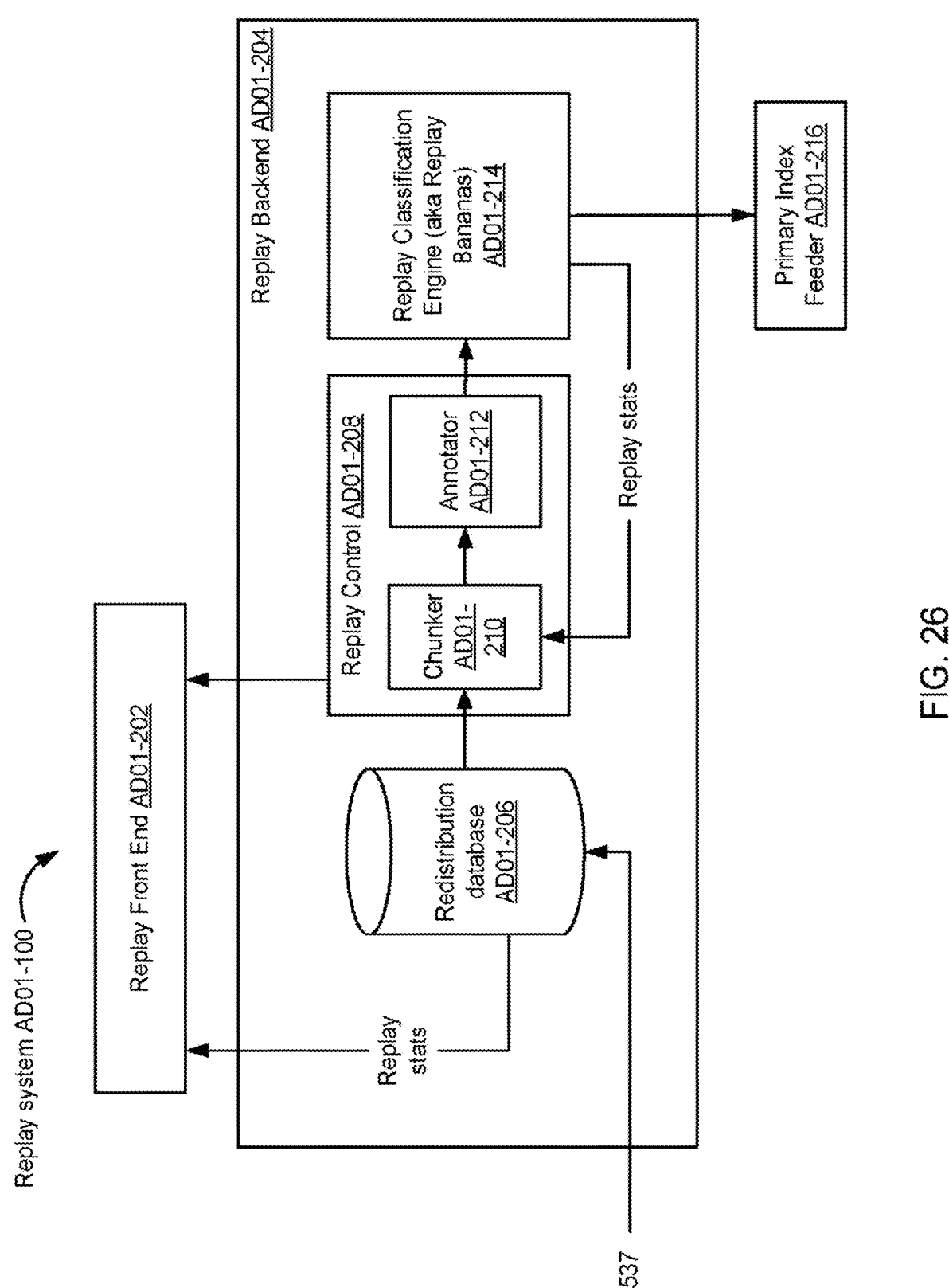
FIG. 26 illustrates a schematic representation of a replay system, in accordance with some implementations.

FIG. 26 illustrates a schematic representation of the replay system AD01-100 presented in FIG. 25B, in accordance with some implementations. The replay system AD01-100 can be described, at a high level, as consisting of a Replay Front End AD01-202 and a Replay Backend AD01-204.

The replay system AD01-100 identifies new (e.g., high value) information and performs analysis on data packets (e.g., data packets stored in the mission database AD01-104).

In some implementations, new (e.g., high-value) information can be identified through replay construction. A replay is constructed by defining one or more of: filters, set(s) of real-time mission graphs, keywords (e.g., customized, user-defined, user-specific), time selection of data packets (e.g., low-resolution and high-resolution), etc. In some implementations, the replay construction is analogous to the mission definition(s) for Bouncer 536 that is described in U.S. patent application Ser. No. 14/214,410. In some implementations, the replay front end AD01-202 includes a user interface that allows users to configure the mission definition(s) and replay conditions (e.g., date, time, time range, version IDs of packets, etc.) and to initiate replay of the data.

In some implementations, the replay front end AD01-202 includes one or more filters, and/or missions that are connected. Accordingly, in some implementations, the replay front end AD01-202 uses a generalized AVL tree structure to maintain ordering of parent-child relationships of missions, thereby enabling a user to maintain a consistent ordering of the missions.

Figure 27:
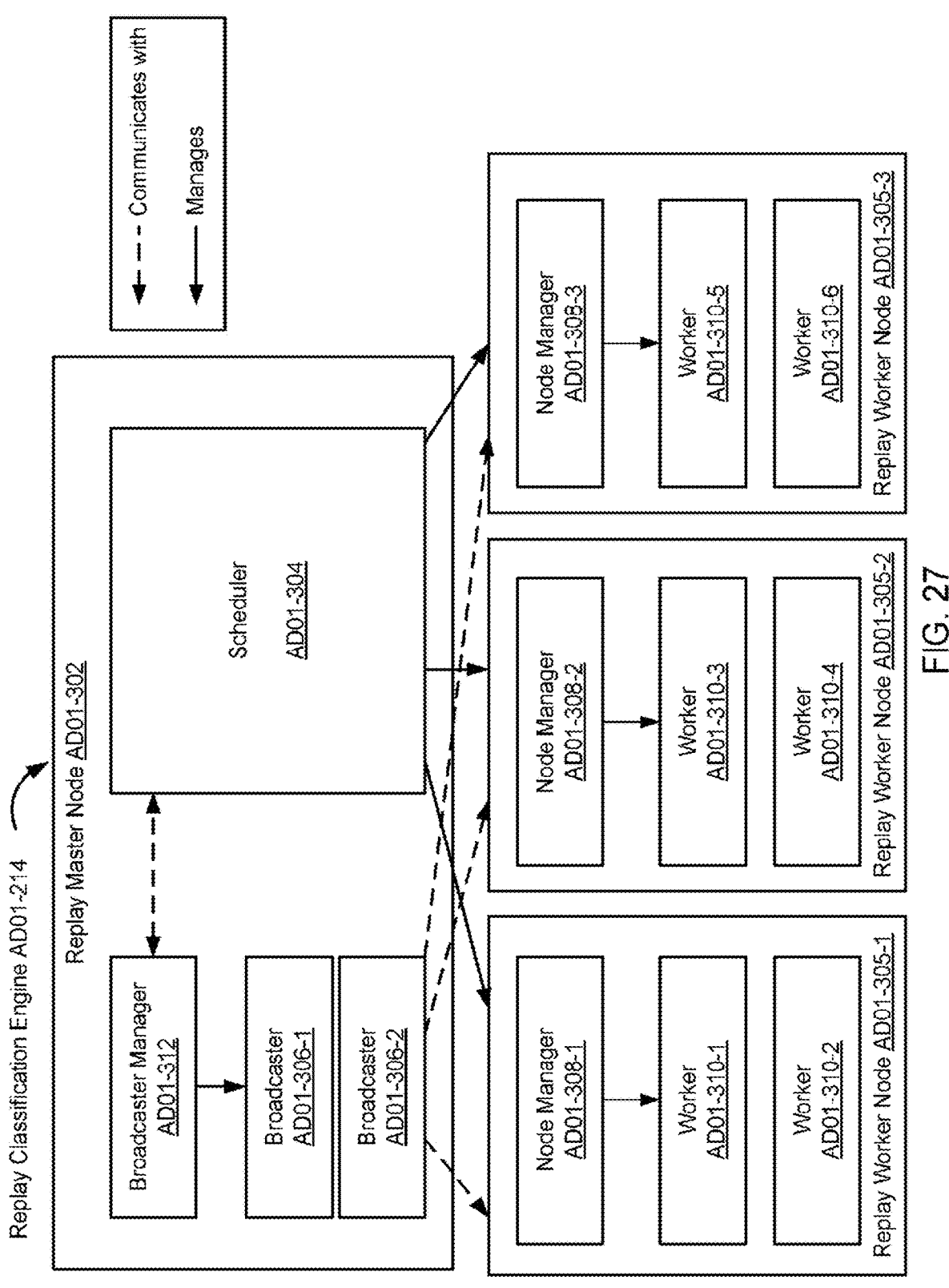
FIG. 27 illustrates a replay classification engine, in accordance with some implementations.

In some implementations, after a replay has been constructed and verified, the replay front end AD01-202 parses and formats the requested data (e.g., structures the mission nodes into a linear ordered array), and adds the replay job to a system queue (e.g., via scheduler AD01-304, FIG. 27). A unique job identifier is created for each replay. In some implementations, the versioning system AD01-102 saves a current version of the requested data and creates a new version for the requested data so that changes can be made to the new version In some implementations, the replay construction settings are saved into a database (e.g., mission database AD01-104) so that a user can recall the settings and re-run the replay. Furthermore, the mission nodes, keywords, and job-id are queued.

The replay job request is then sent to a multi-tiered replay backend AD01-204 that retrieves the data based on a priority assignment, and filters the data using dynamic clustered filtering.

In some implementations, as illustrated in FIG. 26, the replay backend AD01-204 includes a redistribution database AD01-206 for re-distributing the data from the path 537 within the replay system AD01-100, a replay control AD01-208 that includes a chunker AD01-210 and an annotator AD01-212, and a replay classification engine AD01-214.

The replay control AD01-208 connects to the replay front end AD01-202 and sets a non-blocking request reply protocol to obtain the description of a replay job. In some implementations, the replay control AD01-208 further verifies the replay job by validating the mission definition from the replay front end AD01-202 and validating the data from the redistribution database AD01-206.

In some implementations, the replay control AD01-208 interfaces with the versioning system AD01-102 and requests a unique version ID for a respective replay job. The unique version ID is then tagged to each and every snippet that is replayed in the respective job, so as to uniquely identify a snippet belonging to a particular replay.

In some implementations, the replay control AD01-208 also connects to the replay workers (e.g., workers AD01-310 in FIG. 27) and distributes the work of validating the mission definition from the replay front end AD01-202 and validating the data from the redistribution database AD01-206 to the replay workers. It also maintains the state of replay in case of a failure, to allow a user to recover the state in the event of failure and to start the replay from the point where it has stopped.

The replay control AD01-208 consists of the chunker AD01-210 and the annotator AD01-212. The chunker AD01-210 takes a filter definition from the replay front end AD01-202 and compiles the filter definition, including validating and dividing a snippet into data packets that are compatible with the replay classification engine AD01-214. The annotator AD01-212 tags each and every snippet with relevant author and publisher information in real-time.

In some implementations, the replay classification engine AD01-214 is a real-time parallel, distributed classification engine that is designed to handle high volume data streams (e.g., around 2,000 complex classification pipelines at an input traffic rate of 50,000 documents per second, where the average document size is 10 kilobytes). In some implementations, the replay classification engine AD01-214 is based on a Buffer Technology which uses chip inter-core fabric.

In some implementations, the replay classification engine AD01-214 includes a communication framework (e.g., a finite state machine messaging framework) to communicate messages (e.g., replay stats) with the replay control AD01-208 and to log the replay progress. In some implementations, logging the replay progress includes tracking status updates through the lifetime of the replay. In some implementations, the status updates are displayed at the replay front end AD01-202 (e.g., via a user interface at the replay front end AD01-202). In some implementations, status updates include notifications of errors that occur during replays, and when a replay starts, ends, and/or is in progress. In some implementations, a unique version ID is generated (e.g., by the versioning system AD01-102) after the completion of a replay, thus allowing the user to query the unique set of data based on the version.

In some implementations, the replay system AD01-100 further includes a primary indexer feed AD01-216 that subscribes to the output of the replay classification engine AD01-214. The primary indexer feed AD01-216 formats the filtered snippets into Elasticsearch compatible documents, so that the user can perform real-time analytics on data that has been stored (e.g., in the mission database AD01-104) after the replay.

FIG. 27 is a schematic representation of the replay classification engine AD01-214, in accordance with some implementations. In some implementations, the replay classification engine AD01-214 is a massively parallel classification (e.g., filtering) system. In some implementations, the replay classification engine AD01-214 contains components with functionalities analogous to the Bouncer 536.

In some implementations, the classification engine AD01-214 operates simultaneously, in real-time, with the Bouncer 536. In some implementations, the classification engine AD01-214 is a standby redundant system for the Bouncer 536. In some implementations, the classification engine AD01-214 goes into live mode (e.g., replay is triggered) in response to an alert message indicating failure of the Bouncer 536 (e.g., system failure, power outage, scheduled and/or unscheduled maintenance etc.).

In some implementations, the replay classification engine AD01-214 is divided into four main components: a Scheduler AD01-304, one or more Broadcasters AD01-306, one or more NodeManagers AD01-308, and one or more Workers AD01-310. The Scheduler AD01-304, Broadcasters AD01-306, and an additional Broadcaster Manager AD01-312 run on a replay master machine called Replay Master Node AD01-302. NodeManagers AD01-308 and Workers AD01-310 run on slave machines called Replay Worker Nodes AD01-305. Broadcaster Manager AD01-312 manages and monitors the individual Broadcasters AD01-306. Broadcasters AD01-306 receive snippets from the replay backend AD01-204. Broadcasters AD01-306 transmit the received snippets to Workers AD01-310. Workers AD01-310 determine which mission definitions (e.g., filter graphs) accept those snippets. Scheduler AD01-304 and NodeManagers AD01-308 manage the execution of Workers AD01-310 and update them as the mission definition descriptions change. In some implementations, the number of replay workers AD01-310 dynamically changes depending on the computing resources available. In some implementations, the replay classification engine AD01-214 is designed to optimally scan and scroll data from the redistribution database AD01-206 with minimal system overhead. All inter-process communication in the replay classification engine AD01-214 is accomplished through a dedicated queue manager.

As described above with respect to FIG. 26, the replay system AD01-100 also performs data analysis. Oftentimes, analyses of data streams include having to replay data under different conditions and using different parameters. Accordingly, there is a need to be able to track data streams. FIGS. 28 to 31B describe implementations of tracking data streams during replay.

Figure 28:
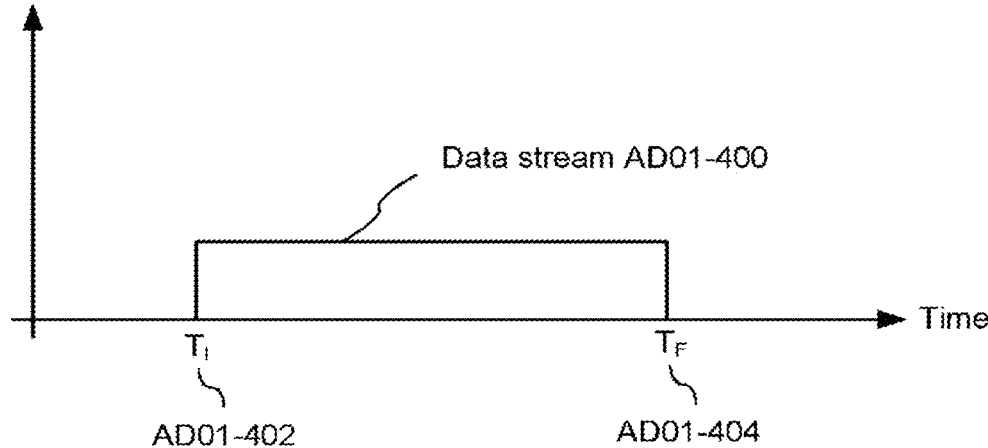
FIG. 28 is a schematic representation of a data stream, in accordance with some implementations.

FIG. 28 is a schematic representation of a data stream AD01-400 (e.g., a dataset), in accordance with some implementations. The data stream AD01-400 includes an initial (e.g., start and/or beginning) time $T_1$ AD01-402 and an end time $T_F$ AD01-404. In some implementations, the data stream AD01-400 includes one or more data packets.

In some implementations, the data stream AD01-400 corresponds to a stream of data in a computer system (e.g., computer system 520 in FIG. 25B). In some implementations, the data stream AD01-400 includes one or more data sources (e.g., data sources 502). In some implementations, data stream AD01-400 has a defined path in the computer system (e.g., any of paths 501, 503, 505, 507, 509, 511, 513, and 537 in FIG. 25B). In some implementations, the data stream AD01-400 is a real-time data stream. In some implementations, the data stream AD01-400 is non-real-time data that is stored in a database (e.g., raw database 534, mission database AD01-104 etc.), and retrieved for processing (e.g., replay construction).

In some implementations, the time between the initial time $T_1$ AD01-402 and the end time $T_F$ AD01-404 is known as a time interval of the data stream AD01-400. The initial time $T_1$ AD01-402, the end time $T_F$ AD01-404, and the time interval have units of time (e.g., milliseconds, minutes, months etc.). Alternatively, in some implementations, the initial time $T_I$ AD01-402, the end time $T_F$ AD01-404, and the time interval are defined in terms of a range of dates and/or times (e.g., the initial time AD01-402 is 23 Jan. 2000 at 8:01:05 AM and the end time $T_F$ AD01-404 is 26 Jan. 2000 at 12:03:04 PM).

Figure 29A:
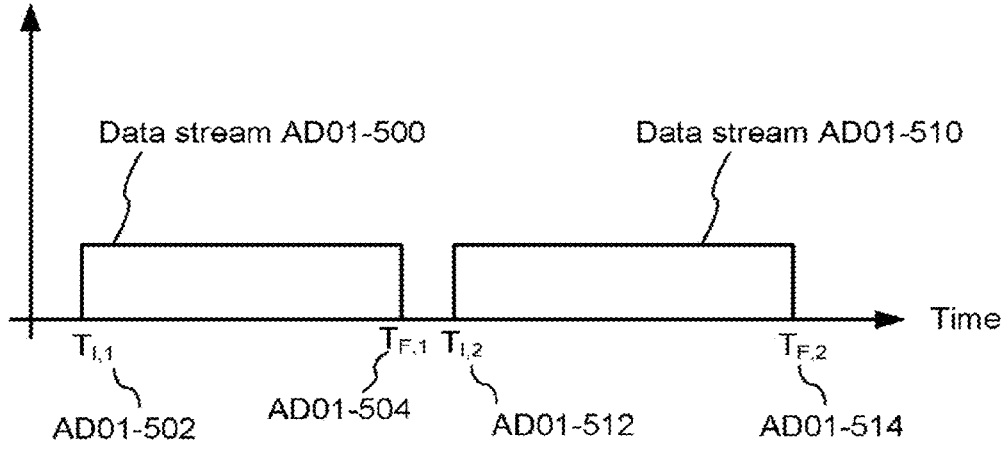
FIGS. 29A and 29B are schematic representations of two data streams, in accordance with some implementations.
Figure 29B:
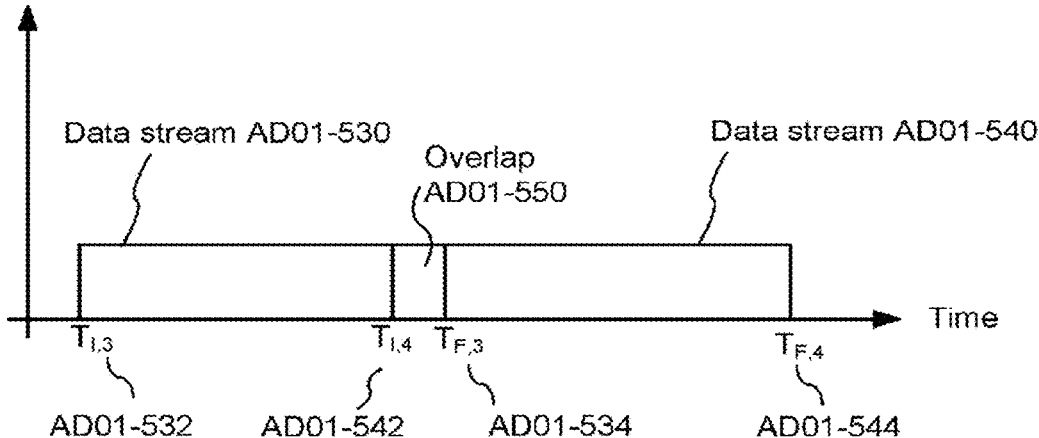

FIGS. 29A and 29B are schematic representations of two data streams, in accordance with some implementations.

FIG. 29A shows two data streams AD01-500 and AD01-510 in accordance with some implementations. The data stream AD01-500 has an initial time $T_{I,1}$ AD01-502 and an end time $T_{F,1}$ AD01-504. The data stream AD01-510 has an initial time $T_{1,2}$ AD01-512 and an end time $T_{F,2}$ AD01-514.

In some implementations, the data stream AD01-500 and the data stream AD01-510 are distinct data streams (e.g., consisting of different packets). For example, the data stream AD01-500 comprises real-time data from Harvester 522 whereas the data stream AD01-510 comprises an archived data stream that is stored in the raw database 534 and/or mission database AD01-104.

In some implementations, data stream AD01-500 and data stream AD01-510 are identical data streams. For example, data stream AD01-500 and data stream AD01-510 have the same content and/or the same data packets. In some implementations, data stream AD01-500 and data stream AD01-510 are identical packets that are stored in a database (e.g., mission database AD01-104) and are requested (e.g., by the replay system AD01-100) at different times.

In some implementations, data stream AD01-510 is a modification of data stream AD01-500. In some implementations, data stream AD01-510 is a subset of data stream AD01-500 that meet relevance criteria after data stream AD01-500 is distributed to a filter (e.g., Bouncer 536 or Replay Classification Engine AD01-214). For example, referring to FIG. 25B, data stream AD01-510 corresponds to packets in the path 513, and data stream AD01-510 corresponds to packets in the path 537 that have been accepted by the one or more mission definitions of the Bouncer 536.

As another example, data stream AD01-500 is original data that is stored in the mission database AD01-104 and data stream AD01-510 is a modification (e.g., a subset) of data stream AD01-500 that is accepted by the one or more filters of the replay classification engine AD01-214. In some implementations, data stream AD01-500 is also known as old data and data stream AD01-500 is new (e.g., rebuilt and/or replayed) data.

In some implementations, a system can replay data streams (e.g., AD01-400, AD01-500, AD01-510 etc.) from any timeframe. However, a problem occurs when the old data and the replayed data have common content and share a common (e.g., overlap) timeframe, as illustrated in FIG. 29B.

FIG. 29B shows two data streams in accordance with some implementations. Data stream AD01-530 (e.g., old data) has an initial time $T_{1,3}$ AD01-532 and an end time $T_{F,3}$ AD01-534. Data stream AD01-540 (e.g., replayed data) has an initial time $T_{1,4}$ AD01-542 and an end time $T_{F,4}$ AD01-544. There is an overlap AD01-550 between the old data and the rebuilt data, and the overlap time is from $T_{1,4}$ AD01-542 to $T_{F,3}$ AD01-534.

In some instances, a user would like to analyze both old and replayed data. However, the user does not want to analyze the old data (e.g., data stream AD01-530 in FIG. 29B) when the replayed data is available (e.g., the user wants to analyze data stream AD01-540 in the overlap AD01-550 timeframe in FIG. 29B). Thus, it is desirable to implement solutions that allow the user to analyze the most recent data.

Figure 30A:
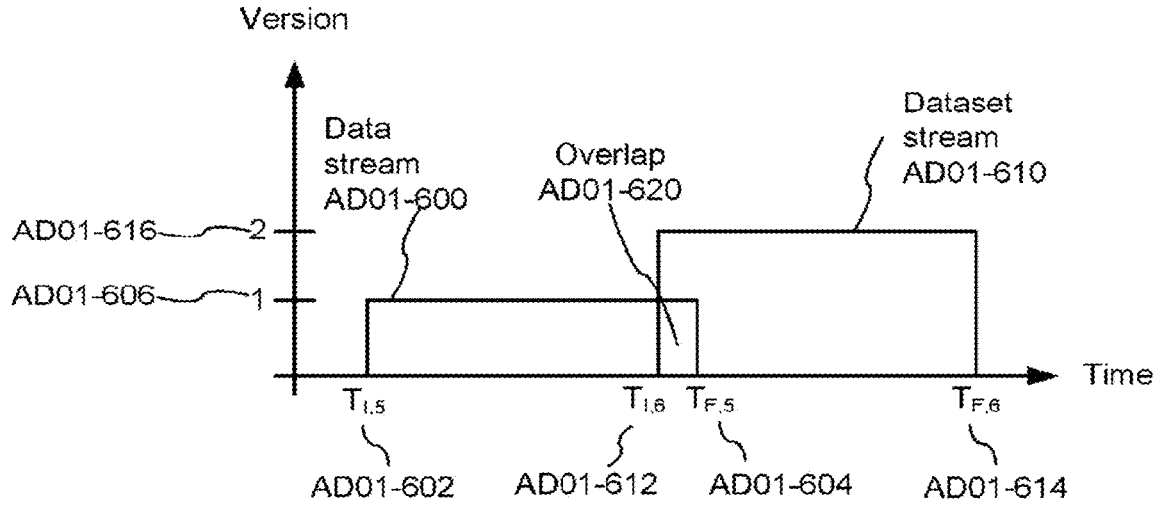
FIGS. 30A and 30B are schematic illustrations of operating on two data streams that share a common time interval, in accordance with some implementations.

FIG. 30A illustrates a schematic representation of operating on (e.g., analyzing) two data streams that share a common time interval (e.g., overlapping data), in accordance with some implementations. FIG. 30A shows two data streams AD01-600 with an initial time $T_{1,5}$ AD01-602 and an end time $T_{F,5}$ AD01-604, and AD01-610 with an initial time $T_{1,6}$ AD01-612 and an end time $T_{F,6}$ AD01-614. There is an overlap AD01-620 between the data stream AD01-600 and the data stream AD01-610. The overlap time is from time $T_{1,6}$ AD01-612 to time $T_{F,5}$ AD01-604.

As further shown in FIG. 30A, data stream AD01-600 has a version ID AD01-606 (version 1) and stream AD01-610 a version ID AD01-616 (version 2). In some implementations, data stream AD01-600 is an old data stream and data stream AD01-610 is a replayed data stream. In some implementations, a respective unique version ID is assigned to every data stream (e.g., by the versioning system AD01-102). In some implementations, the replayed data stream has a higher version number than the old data stream. In some implementations, the version ID is a version number and the versioning system AD01-102 monotonically increases the version number of every data stream (e.g., data set) that is built.

Figure 30B:
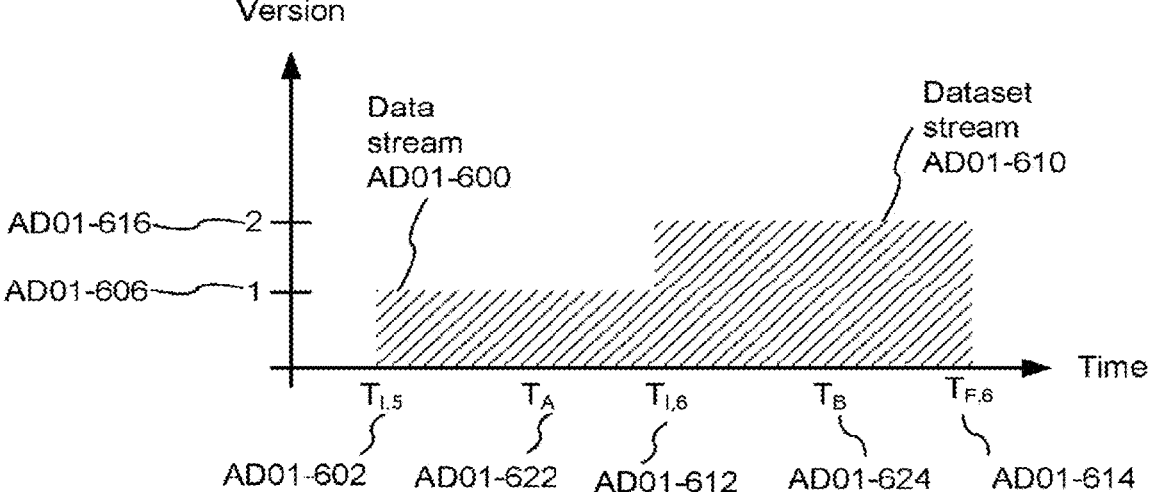

FIG. 30B illustrates a schematic representation of a user's view of the data streams described in FIG. 30A, in accordance with some implementations. In some implementations, only one data stream is available at a given time and accordingly, the user is presented (e.g., by the replay system AD01-100) with the only data stream that is available for the given time. For example, as shown in FIG. 30B, the user is presented with data stream AD01-600 at time $T_A$ AD01-622 and is presented with data stream AD01-610 at time $T_B$ AD01-624.

In some implementations, two or more data streams share a common time. For example, as illustrated in FIG. 30A, data streams AD01-600 and AD01-610 have an overlap AD01-620 from time $T_{1,6}$ AD01-612 to time $T_{F,5}$ AD01-604. In accordance with some implementations, the replay system AD01-100 presents the higher version (e.g., most recent) data to the user. Thus, as shown in FIG. 30B, the user is presented with the higher version data stream AD01-610 at time $T_{1,6}$ AD01-612. Furthermore, in some implementations, the user can continue to operate on the less recent data set of an overlap timeframe (e.g., data stream AD01-600 from time $T_{1,6}$ AD01-612 to time $T_{F,5}$ AD01-604) if desired. Therefore, there is no loss of data.

In some implementations, a versioning system (e.g., versioning system AD01-102) that presents the most recent version data to a user is referred to as a "skyline" versioning system.

Figure 31A:
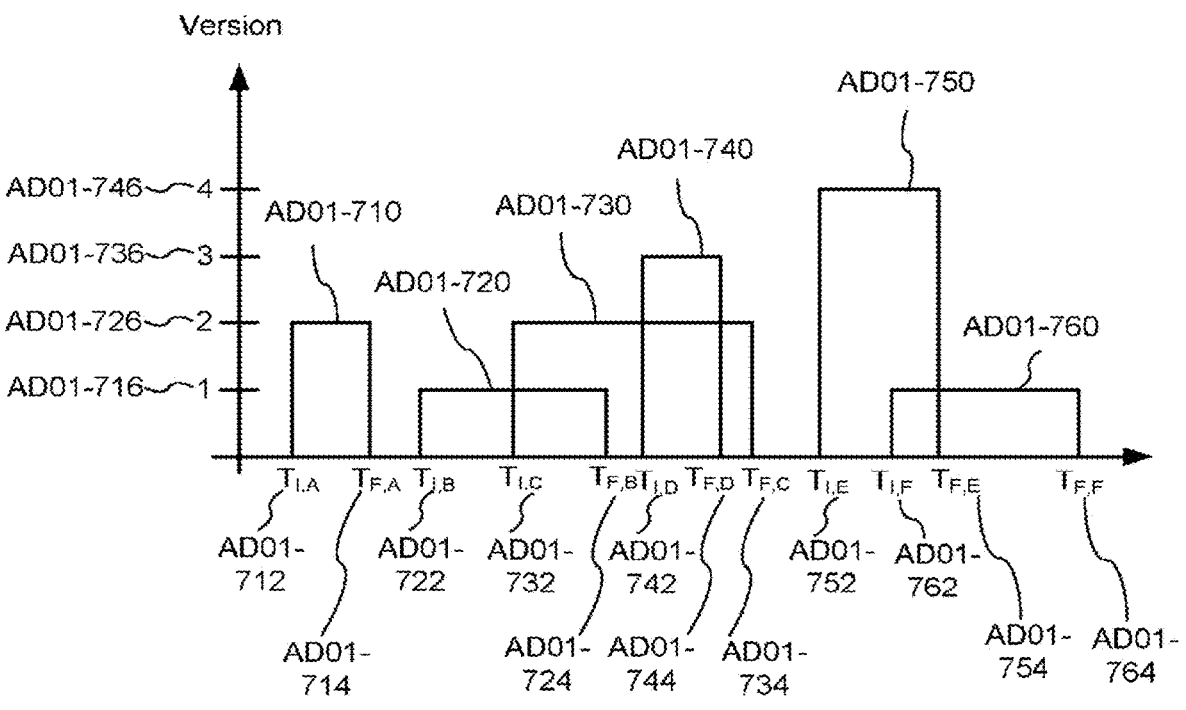
FIGS. 31A and 31B are schematic representations of operating on (e.g., analyzing) multiple overlapping data streams, in accordance with some implementations.
Figure 31B:
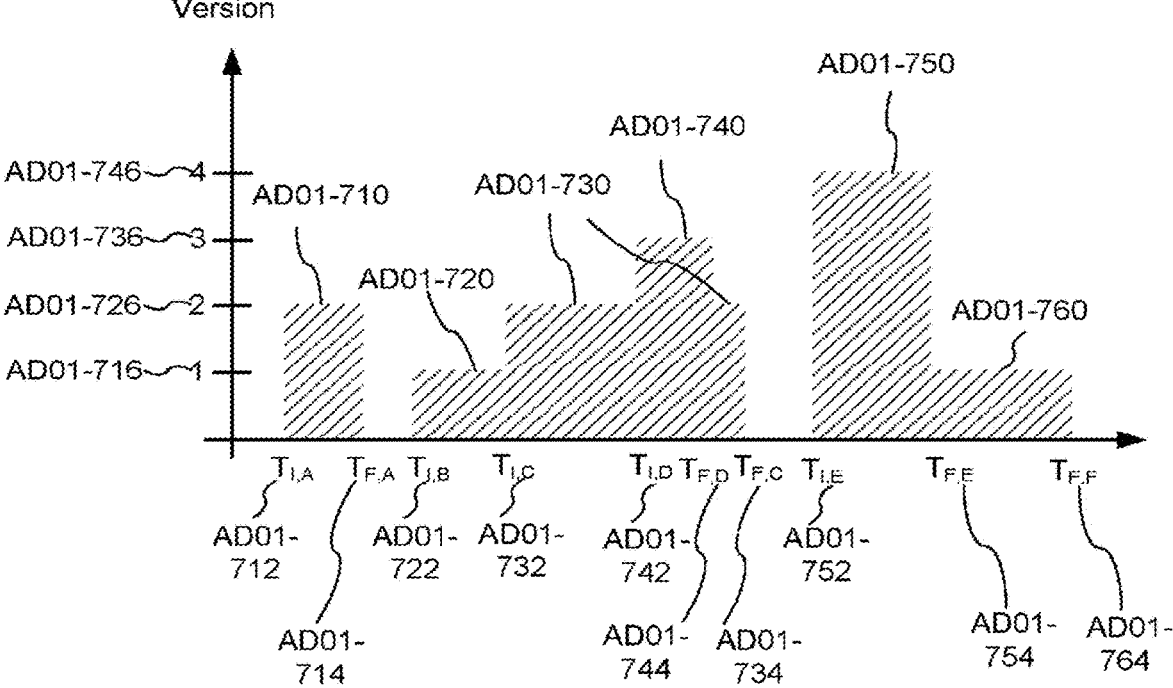

FIGS. 31A and 31B are schematic representations of operating on (e.g., analyzing) multiple overlapping data streams using the versioning method described above with respect to FIGS. 30A and 30B, in accordance with some implementations.

FIG. 31A consists of the following data streams:

Data stream AD01-710 has version AD01-726 (version 2), an initial time $T_{I,A}$ AD01-712 and an end time $T_{F,A}$ AD01-714;

Data stream AD01-720 has version AD01-716 (version 1), an initial time $T_{I,B}$ AD01-722 and an end time $T_{F,B}$ AD01-724;

Data stream AD01-730 has version AD01-726 (version 2), an initial time $T_{I,C}$ AD01-732 and an end time $T_{F,C}$ AD01-734;

Data stream AD01-740 has version AD01-736 (version 3), an initial time $T_{I,D}$ AD01-742 and an end time $T_{F,D}$ AD01-744;

Data stream AD01-750 has version AD01-746 (version 4), an initial time $T_{I,E}$ AD01-752 and an end time $T_{F,E}$ AD01-744; and Data stream AD01-760 has version AD01-716 (version 1), an initial time $T_{I,F}$ AD01-762 and an end time $T_{F,F}$ AD01-764.

As further illustrated in FIG. 31A, the overlapping datasets include:

Data stream AD01-720 and data stream AD01-730, from time $T_{I,C}$ AD01-732 to time $T_{F,B}$ AD01-724;

Data stream AD01-730 and data stream AD01-740, from time $T_{I,D}$ AD01-742 to time $T_{F,D}$ AD01-746; and Data stream AD01-750 and data stream AD01-760, from time $T_{I,F}$ AD01-762 to time $T_{F,E}$ AD01-754.

FIG. 31B illustrates a schematic representation of a user's view of the data streams described in FIG. 31A, in accordance with some implementations. As described above, the skyline versioning system (e.g., versioning system AD01-102) presents the most recent version data to the user. Accordingly, the data streams described in FIG. 31A are presented to the user at the following times:

From time $T_{I,A}$ AD01-712 to time $T_{F,A}$ AD01-714: data stream AD01-710;

From time $T_{I,B}$ AD01-722 to time $T_{I,C}$ AD01-732: data stream AD01-720;

From time $T_{I,C}$ AD01-732 to time $T_{I,D}$ AD01-742: data stream AD01-730;

From time $T_{I,D}$ AD01-742 to time $T_{F,D}$ AD01-744: data stream AD01-740;

From time $T_{F,D}$ AD01-744 to time $T_{F,c}$ AD01-734: data stream AD01-730;

From time $T_{I,E}$ AD01-752 to time $T_{F,E}$ AD01-754: data stream AD01-750; and From time $T_{F,E}$ AD01-754 to time $T_{F,F}$ AD01-764: data stream AD01-760.

Furthermore, as discussed above, the user can continue to operate on the less recent data set of an overlap timeframe (if desired. Therefore, there is no loss of data.

Figure 32B:
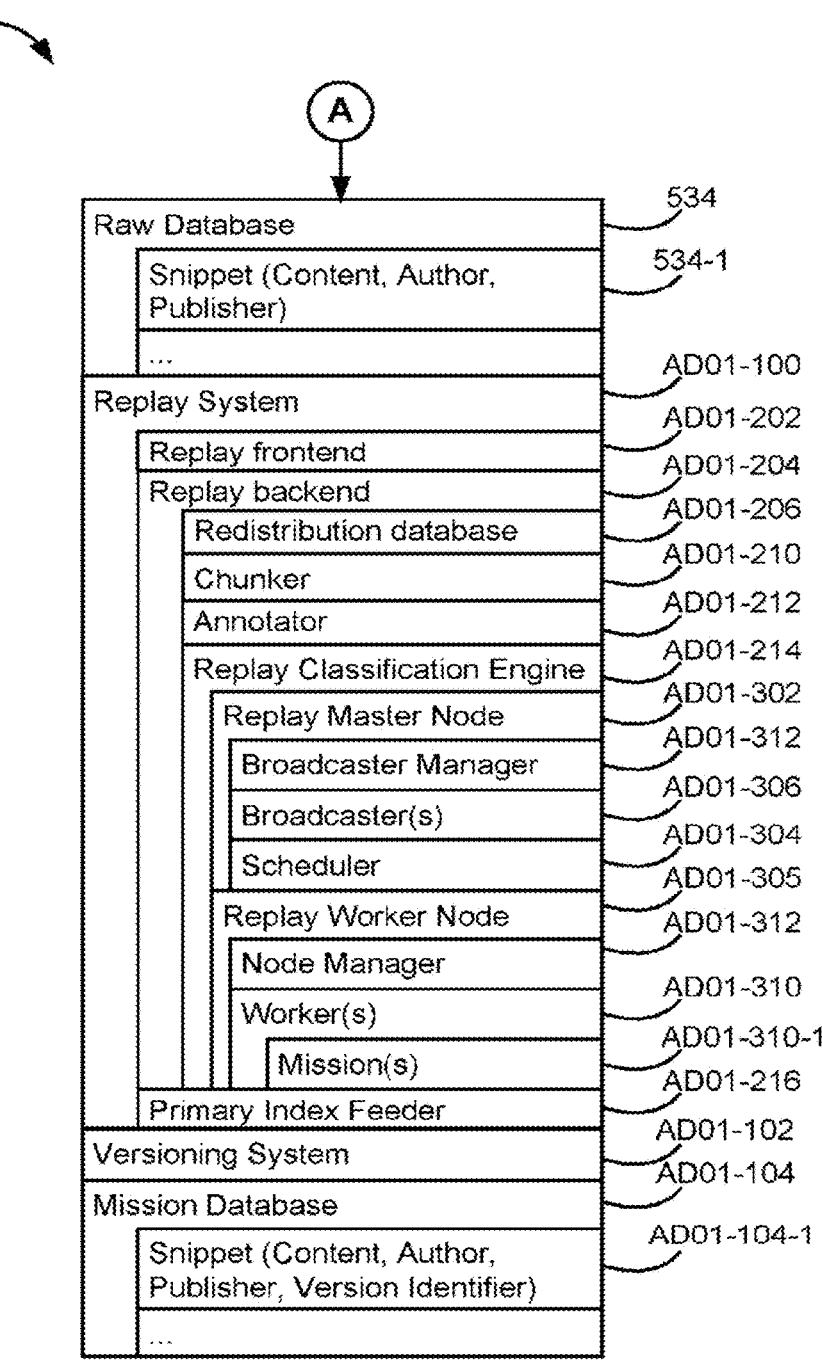
Figure 33A:
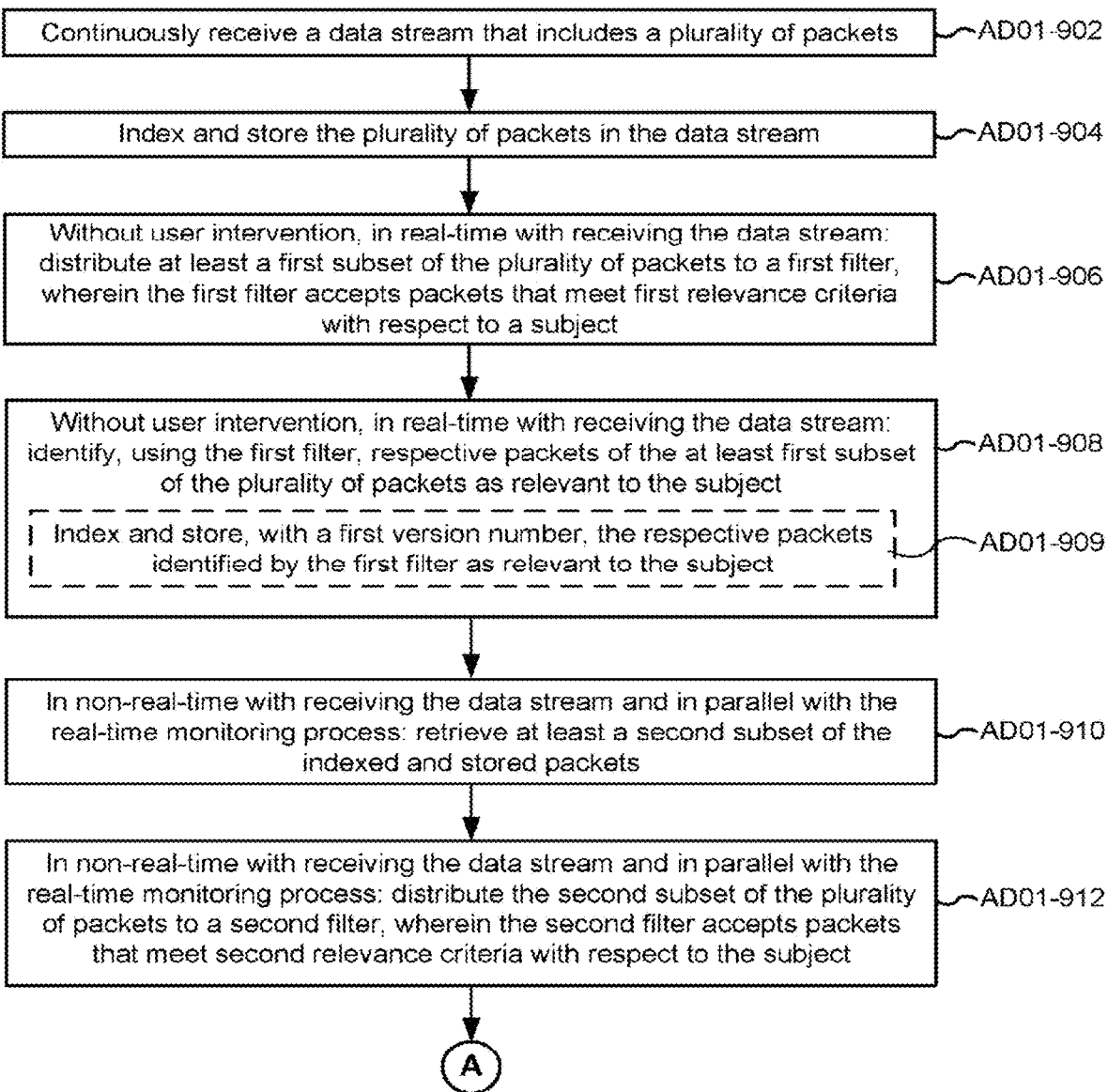
Figure 33D:
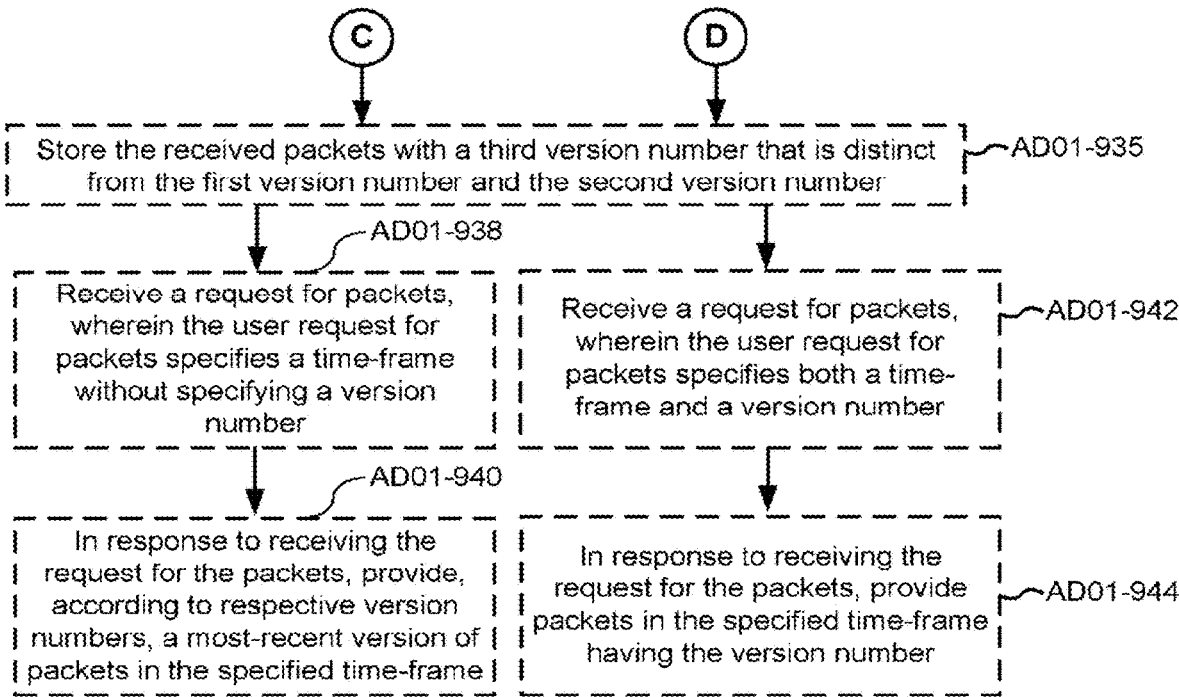

FIGS. 32A-32B are block diagrams of the computer system 520 shown in FIGS. 25A to 25C, for automatically classifying and storing data streams, and assigning versions to data streams, in accordance with some implementations. The system 520 includes one or more processors 2002 for executing modules, programs and/or instructions stored in memory 2102 and thereby performing predefined operations; one or more network or other communications interfaces 2100; memory 2102; and one or more communication buses 2104 for interconnecting these components. In some implementations, the system 520 includes a user interface 2004 comprising a display device 2008 and one or more input devices 2006 (e.g., keyboard or mouse).

In some implementations, the memory 2102 includes high-speed random access memory, such as DRAM, SRAM, or other random access solid state memory devices. In some implementations, memory 2102 includes non-volatile memory, such as one or more magnetic disk storage devices, optical disk storage devices, flash memory devices, or other non-volatile solid state storage devices. In some implementations, memory 2102 includes one or more storage devices remotely located from the processor(s) 2002. Memory 2102, or alternately one or more storage devices (e.g., one or more nonvolatile storage devices) within memory 2102, includes a non-transitory computer readable storage medium. In some implementations, memory 2102 or the computer readable storage medium of memory 2102 stores the following programs, modules and data structures, or a subset thereof:

an operating system 2106 that includes procedures for handling various basic system services and for performing hardware dependent tasks;

a network communications module 2108 that is used for connecting the system 520 to other computers (e.g., the data sources 502 in FIG. 5A) via the communication network interfaces 2100 and one or more communication networks (wired or wireless), such as the Internet, other wide area networks, local area networks, metropolitan area networks, etc.;

a Harvester 522 for collecting and processing (e.g., normalizing) data from multiple data sources 502 in FIG. 5A, the Harvester 522 further including a Harvester Boss 601, a Scheduler 602, a Harvester Manager 604, and one or more Harvester Minions 613-1, which are described above in connection with FIG. 6, and a Harvester Minion 613-1 further including a snippet extractor 615 for generating packets for the snippets, authors, and publishers encoded using appropriate data structures as described above with reference to FIG. 7, and a snippet hasher 614, an author hasher 616, and a publisher hasher 618 for generating a hash key for the snippet content, author, and publisher of the snippet, respectively;

a Publisher Discovery HyperEngine 524 for inspecting the data stream from the data sources 502 in order to develop a publisher profile for a data source based on, e.g., the snippets published on the data source and storing the publisher profile in the publisher store 530;

an Author Discovery HyperEngine 526 for inspecting the data stream from the data sources 502 in order to develop an author profile for an individual based on, e.g., the snippets written by the individual on the same or different data sources and storing the author profile in the author store 532;

an Author/Publisher Correlator 528 for performing real-time data correlation with existing author information in the author database 802-1 and existing publisher information in the publisher database 802-2 to determine a respective snippet's author and publisher;

a Bouncer 536 for identifying high-value information for a client of the system 520 from snippets coming from different data sources by applying the snippets to mission definitions associated with the client, the Bouncer 536 further including a bouncer master node 909 and one or more bouncer worker nodes 903, the bouncer master node 909 further including a scheduler 902, a broadcaster master 910, and one or more broadcasters 904, whose functions are described above in connection with FIG. 9, and each bouncer master node 909 further including a node manager 906 and one or more workers 908 (each worker handling at least one mission definition 908-1), a more detailed description of the components in the Bouncer 536 can be found above in connection with FIG. 9;

a Parallelizing Compiler 1504 for optimizing a filter network specification associated with a client of the system 520 by, e.g., appropriately merging, reordering filters and removing cycles from the resulting filter network, etc.;

an Alarm/Analytics HyperEngine 538 for determining if and how to deliver alarm messages produced by the Bouncer 536 to end-users using, e.g., predefined communication protocols with the end-users, and generating short-term or long-term statistics through analyzing the incoming information as well historical information from the data sources and determining whether or not to trigger alarms for any violations of predefined criteria associated with a client of the system; and a Topic Discovery HyperEngine 586, for generating a statistical topic model associated with the plurality of snippets a Raw Database 934 for backing up snippets from the data sources, e.g., after the snippets are normalized by Harvester 522, each snippet having content, author, and publisher information;

a Replay System AD01-100 for replaying, in non-real-time, snippets coming from the Bouncer 536 and/or from Author/Publisher Correlator 528, the Replay System AD01-100 including a Replay Front End AD01-202, a Replay Backend AD01-204, and a Primary Index feeder AD01-216. The Replay Backend AD01-204 further includes a Redistribution Database AD01-206, a Chunker AD01-210, an Annotator AD01-212, and a Replay Classification Engine AD01-214. The Replay Classification Engine AD01-214 includes a replay master node AD01-302 and one or more replay worker nodes AD01-305, the replay master node AD01-302 further including a scheduler AD01-304, a broadcaster manager AD01-312, and one or more broadcasters AD01-306, whose functions are described above in connection with FIG. 27, and each replay worker node AD01-305 further including a node manager AD01-308 and one or more workers AD01-310 (each worker handling at least one mission definition AD01-310-1), a more detailed description of the components in the Replay Classification Engine AD01-214 can be found above in connection with FIG. 27;

a versioning system AD01-102 for creating and assigning versions to snippets; and a Mission Database AD01-104 for storing snippets from the Bouncer 536, e.g., after the snippets are normalized by Harvester 522, each snippet having content, author, and publisher information, and a version identifier.

It should be noted that the programs, modules, databases, etc. in the Replay System AD01-100 described above in connection with Figures AD01-1 to 27 may be implemented on a single computer system (e.g., server) or distributed among multiple computer servers that are connected by a computer network. Although a specific hardware configuration may affect the performance of the Replay System AD01-100, the implementation of the present application does not have any dependency on a particular hardware configuration.

FIGS. 33A to 33D are flowcharts illustrating a method AD01-900 of automatically classifying, storing, and rebuilding data sets from data streams, in accordance with some implementations. The method AD01-900 is performed at a computer system (e.g., computer system 520 in FIG. 25B), including a plurality of processors (e.g., processors 2002 in FIGS. 32A-32B) and memory (e.g., memory 2102 in FIGS. 32A-32B) storing programs for execution by the processor.

The computer system continuously receives (AD01-902) a data stream that includes a plurality of packets. In some implementations, the data stream includes a plurality of posts, and/or any type of information received over a network. In some implementations, the data (e.g., posts) are received by a Harvester of the computer system (e.g., the Harvester 522 in FIG. 25B), and from multiple data sources (e.g., Data sources 502 in FIG. 25A) such as social media websites, internet forums that host conversation threads, blogs, news sources, etc. Alternatively, in some implementations, posts (e.g., from the Data Sources 502) can include updates from smart thermostats, smart utility meters, automobiles, information from a mobile device (e.g., a smartphone, Fitbit™ device, etc.), or any other source of real-time data.

In some implementations, the received posts include a content portion and one or more source characteristics, such as an author and/or a publisher. Each of these portions and/or characteristics is referred to as a packet.

Alternatively, in some implementations, the received posts are raw data. Accordingly, after receiving the data stream (e.g., posts), the Harvester 522 performs an initial normalization of each post, including identifying the content, the author, and the publisher. The Harvester 522 then generates one or more packets from each post, including, in some implementations, a content packet (sometimes hereinafter referred to as a "snippet"), a publisher packet and/or an author packet.

In some implementations, the plurality of packets comprises social media posts. For example, the social media posts include TWITTER™ TWEETS, FACEBOOK™ posts, online forum comments, Youtube™ videos, and the like. In some implementations, the plurality of packets are received from a plurality of distinct social media platforms (e.g., TWITTER™ TWEETS, FACEBOOK™ posts, and online forum comments). In some implementations, the plurality of packets are received from a plurality of distinct users. The plurality of distinct users include users with distinct social media user names, social media user accounts, social media platforms, demographics etc.

The computer system indexes (AD01-904) and stores the plurality of packets in the data stream. In some implementations, the computer system indexes and stores the packets upon harvesting (e.g., in real-time) so that full-data searches can be executed quickly (e.g., in Raw Database 534). In some implementations, the computer system indexes and stores the packets in near real-time.

In real-time (e.g., synchronously) with receiving the data stream, the computer system distributes (AD01-906) at least a first subset of the plurality of packets to a first filter, wherein the first filter accepts packets that meet first relevance criteria with respect to a subject.

In some implementations, the first filter is also known as a filter node (e.g., filter node 110 in FIG. 1) or a classification model. In some implementations, the first filter accepts packets based on content and/or metadata of the packets. In some implementations, the first filter is one of a plurality of filters that are interconnected to form a model (e.g., model 102 in FIG. 1). In some implementations, the first filter is part of a mission definition (e.g., mission definition 100 in FIG. 1 and/or mission definition 200 in FIG. 2). In some implementations, the first filter is the mission definition. In some implementations, the first filter is part of a real-time massively parallel classification system (e.g., Bouncer 536 in FIG. 9).

In some implementations, the first filter includes one or more of the group consisting of: lexical filters 304, vocabulary filters 306, semantic filters 308, statistical filters 310, thematic ontologies 312, and corrective feedback 314. The first filter can also be embodied as regular expressions, such as the regular expression 402 which accepts phrases like "Best Car Wash Ever," "Best Burger Ever," and "Best Movie I have ever seen."

In real-time with receiving the data stream, the computer system identifies (AD01-908), using the first filter, respective packets of the at least first subset of the plurality of packets as relevant to the subject.

In some implementations, relevance criteria can include one or more nouns (e.g., name of a person, name of a place, a location, a brand name, name of a competitor) and/or one or more verbs associated with the one or more nouns.

In some implementations, the first filter identifies respective packets of the plurality of packets as relevant to the subject, based on contents and metadata (such as author/ publisher information, demographics, author influences, etc.) associated with the post/snippet.

In some implementations, identifying, using the first filter, respective packets of the plurality of packets as relevant to the subject further includes tagging the respective packets of the plurality of packets with an identifier of the first filter.

In some implementations, identification of respective packets as relevant to the subject causes the respective packets to progress further downstream in the mission definition. In some implementations (e.g., FIG. 25B), an identification of respective packets as relevant to the subject causes the respective packets to be directed through the Bouncer 536, into path 537, and to one or more of: the Mission Database AD01-104, the Alarm/Analytics Hyper-Engine 538, and the Topic Discovery HyperEngine 586. In some implementations, an identification of respective packets as relevant to the subject causes the respective packets to be directed to a subsequent filter (e.g., a subsequent filter in the Bouncer 536 and/or the Replay System AD01-100).

In some implementations, the first filter is an "Accept All" mission that is configured to accept all data packets from the Author/Publisher Correlator 528. Accordingly, in this implementation, path 513 and path 537 consist of the same data packets.

In some implementations, the steps of distributing (AD01-906) and identifying (AD01-908) are performed without user intervention. In some implementations, the steps of distributing (AD01-906) and identifying (AD01-908) constitute a real-time monitoring process.

In some implementations, the computer system indexes (AD01-909) and stores, with a first version number, the respective packets identified by the first filter as relevant to the subject. In some implementations, the respective packets identified by the first filter as relevant to the subject are indexed and stored in a database (e.g., mission database AD01-104). In some implementations, the computer system includes a versioning system (e.g., versioning system AD01-102) that assigns a first version number to the respective packets identified by the first filter as relevant to the subject.

In non-real-time (e.g., asynchronously) with receiving the data stream and in parallel with the monitoring process, the computer system retrieves (AD01-910) at least a second subset of the indexed and stored packets. In some implementations, the computer system retrieves at least a second subset of the indexed and stored packets from the Harvester 522. In some implementations, the computer system retrieves at least a second subset of the indexed and stored packets from the Mission Database AD01-104.

In non-real-time with receiving the data stream and in parallel with the monitoring process, the computer system distributes (AD01-912) the second subset of the plurality of packets to a second filter, wherein the second filter accepts packets that meet second relevance criteria with respect to the subject. In some implementations, the second filter a second mission definition located in Bouncer 522. In some implementations, the second filter is in the replay system AD01-100.

In non-real-time with receiving the data stream and in parallel with the monitoring process, the computer system identifies (AD01-914), using the second filter, respective packets of the at least second subset of the plurality of packets as relevant to the subject.

In some implementations, the second filter identifies respective packets of the plurality of packets as relevant to the subject, based on contents and metadata (such as author/ publisher information, demographics, author influences, etc.) associated with the post/snippet.

In some implementations, identifying, using the second filter, respective packets of the plurality of packets as relevant to the subject further includes tagging the respective packets of the plurality of packets with an identifier of the second filter.

In some implementations, the computer system indexes (AD01-915) and stores, with a second version number that is different from the first version number, the respective packets identified by the second filter as relevant to the subject. In some implementations, the respective packets identified by the second filter as relevant to the subject are indexed and stored in a database (e.g., mission database AD01-104). In some implementations, the respective packets that are stored further include information such as one or more date- and time-stamps (e.g., date and time that the packet was received, processed, and/or stored) and the associated processing conditions (e.g., the filter(s) and/or relevance criteria used). In some implementations, the computer system includes a versioning system (e.g., versioning system AD01-102) that assigns a second version number to the respective packets identified by the second filter as relevant to the subject.

In some implementations, the non-real-time steps of retrieving (AD01-910), distributing (AD01-912), and identifying (AD01-914) are performed in response to a user request to filter packets according to the second filter. In some implementations the user request is a user input to the replay front end AD01-202. In some implementations, the second filter is defined by the user.

In some implementations, the first filter is (AD01-918) an executable instance of a first filter definition and the second filter is an executable instance of a second filter definition different from the first filter definition. In some implementations, the first filter definition and the second filter definition are distinct mission definitions of the bouncer 536. In some implementations, the first filter definition and the second filter definition are distinct mission definitions of the replay system AD01-100 (e.g., replay classification engine AD01-214). In some implementations, the first filter definition is from the Bouncer 536 and the second filter definition is from the replay system AD01-100.

In some implementations, the first relevance criteria and the second relevance criteria are (AD01-920) distinct relevance criteria (e.g., name of a company and a location, or names of two distinct companies).

In some implementations, the second subset of the plurality of packets comprises (AD01-922) the respective packets identified, using the first filter, as relevant to the subject.

In some implementations, the second subset of the plurality of packets and the first subset of the plurality of packets have (AD01-924) one or more packets in common.

In some implementations, the second filter definition is (AD01-926) a modified version of the first filter definition.

In some implementations, the computer system detects (AD01-928) a discontinuity in execution of the monitoring process wherein packets were not distributed to the first filter between a first time and a second time; wherein the second subset of the indexed and stored packets distributed to the second filter comprises packets indexed and stored between the first time and the second time. In some implementations, the monitoring process is performed at the Bouncer 536. In some implementations, the monitoring process is performed at the Bouncer 536 at real-time. In some implementations, the computer system detects a discontinuity in execution of the monitoring process by the Bouncer 536 due to failure at the Bouncer 536 (for e.g., system failure, power outage, scheduled and/or unscheduled maintenance etc.).

In some implementations, after detecting a discontinuity in execution of the monitoring process, the computer system directs all data packets through an "Accept All" mission of the Bouncer 536 that is configured to accept all data packets (e.g., all data packets from the Author/Publisher Correlator 528 in FIG. 25B). Accordingly, in this implementation, path 513 and path 537 consist of the same data packets, and are indexed and stored in the Mission Database AD01-104.

In some implementations, the non-real-time steps (AD01-930) of retrieving, distributing, and identifying are performed without user intervention in response to detecting the discontinuity in execution of the monitoring process. In some implementations, the non-real-time steps of retrieving, distributing, and identifying are performed at the Replay System AD01-100. In some implementations, the Replay System AD01-100 is a backup (e.g., redundant) system for the Bouncer 536. In some implementations, the Replay System AD01-100 is in a default standby mode and is designed to "awaken" upon the trigger of the "Accept All" mission of the Bouncer 536.

In some implementations, the first filter and the second filter are (AD01-932) distinct executable instances of a filter definition; and the first relevance criteria and the second relevance criteria are matching relevance criteria.

(As a continuation of the example of a discontinuity in execution of the monitoring process by the Bouncer 536 due to failure at the Bouncer 536 described earlier, in some implementations, the Bouncer 536 recovers after a finite amount of time and resumes its operation with the same filter definition and the same relevance criteria.)

In some implementations, the computer system stores (AD01-935) the received packets with a third version number that is distinct from the first version number and the second version number. In some implementations, the versioning system (e.g., versioning system AD01-102) assigns all raw data (e.g., data prior to classification by the Bouncer 536 or the Replay System AD01-100) with a unique version ID (e.g., version number) that is distinct from any of the version numbers that are assigned to data that have been classified by the Bouncer 536 and/or the Replay System AD01-100.

In some implementations, the computer system receives (AD01-938) a request for packets, wherein the user request for packets specifies a time-frame without specifying a version number. In response to receiving the request for the packets, the computer system provides (AD01-940), according to respective version numbers, a most-recent version of packets in the specified time-frame. In some implementations, the computer system is configured by default to provide data with the most recent version ID.

In some implementations, the computer system receives (AD01-942) a request for packets, wherein the user request for packets specifies both a time-frame and a version number. In response to receiving the request for the packets, the computer system provides (AD01-944) packets in the specified time-frame having the version number.

(A1) In one aspect, some implementations include a computer system including a plurality of processors and memory storing programs for execution by the processors: continuously receiving a data stream that includes a plurality of packets; indexing and storing the plurality of packets in the data stream; without user intervention, in real-time with receiving the data stream, performing a monitoring process, including: distributing at least a first subset of the plurality of packets to a first filter, wherein the first filter accepts packets that meet first relevance criteria with respect to a subject; identifying, using the first filter, respective packets of the at least first subset of the plurality of packets as relevant to the subject; in non-real-time with receiving the data stream and in parallel with the monitoring process: retrieving at least a second subset of the indexed and stored packets; distributing the second subset of the plurality of packets to a second filter, wherein the second filter accepts packets that meet second relevance criteria with respect to the subject; and identifying, using the second filter, respective packets of the at least second subset of the plurality of packets as relevant to the subject.

(A2) In some implementations of the computer system of (A1), further including: detecting a discontinuity in execution of the monitoring process wherein packets were not distributed to the first filter between a first time and a second time; wherein the second subset of the indexed and stored packets distributed to the second filter comprises packets indexed and stored between the first time and the second time.

(A3) In some implementations of the computer system of any of (A1)-(A2), the non-real-time retrieving, distributing, and identifying are performed without user intervention in response to detecting the discontinuity in execution of the monitoring process.

(A4) In some implementations of the computer system of any of (A1)-(A3), the first filter and the second filter are distinct executable instances of a filter definition; and the first relevance criteria and the second relevance criteria are matching relevance criteria.

(A5) In some implementations of the computer system of any of (A1)-(A4), the non-real-time retrieving, distributing, and identifying are performed in response to a user request to filter packets according to the second filter.

(A6) In some implementations of the computer system of any of (A1)-(A5), the first filter is an executable instance of a first filter definition and the second filter is an executable instance of a second filter definition different from the first filter definition; and the first relevance criteria and the second relevance criteria are distinct relevance criteria.

(A7) In some implementations of the computer system of any of (A1)-(A6), the second subset of the plurality of packets comprises the respective packets identified, using the first filter, as relevant to the subject.

(A8) In some implementations of the computer system of any of (A1)-(A7), the second subset of the plurality of packets and the first subset of the plurality of packets have one or more packets in common.

(A9) In some implementations of the computer system of any of (A1)-(A8), the second filter definition is a modified version of the first filter definition.

(A10) In some implementations of the computer system of any of (A1)-(A9), further comprising: indexing and storing, with a first version number, the respective packets identified by the first filter as relevant to the subject; and indexing and storing, with a second version number that is different from the first version number, the respective packets identified by the second filter as relevant to the subject.

(A11) In some implementations of the computer system of any of (A1)-(A11), wherein indexing and storing the plurality of packets in the data stream includes storing the received packets with a third version number that is distinct from the first version number and the second version number.

(A12) In some implementations of the computer system of any of (A1)-(A11), further including: receiving a request for packets, wherein the user request for packets specifies a time-frame without specifying a version number; and in response to receiving the request for the packets: providing, according to respective version numbers, a most-recent version of packets in the specified time-frame.

(A13) In some implementations of the computer system of any of (A1)-(A12), further including: receiving a request for packets, wherein the user request for packets specifies both a time-frame and a version number; and in response to receiving the request for the packets: providing packets in the specified time-frame having the version number.

(A14) In some implementations of the computer system of any of (A1)-(A13), further comprising: one or more processors; and memory coupled to the one or more processors, the memory storing one or more programs configured to be executed by the one or more processors, the one or more programs including instructions for performing the method of (A1-A13).

(A15) In some implementations of the computer system of any of (A1)-(A13), further comprising a non-transitory computer-readable storage medium storing one or more programs, the one or more programs comprising instructions which, when executed by a computer system, cause the system to perform the method of (A1)-(A13).

Dynamic Resource Allocator for Filtering Engine

This application relates generally to dynamic allocation of resources, including, for example, dynamic scalable processing of data pipelines, including but not limited to allocating resources to immediately process vast amounts of data in a given server.

The need to quickly process large amounts of complex data is growing. Existing data processing methods of computer processing units (CPU hereafter) are limited to static allocation methods where each processor will process data in a queue. When a queue length exceeds a certain amount, the processor is unable to allocate new resources for processing data quickly and effectively. As a result, new data is unable to enter a queue and data is lost. For example, if a certain queue reaches maximum queue length and multiple threads are already allocated in a given CPU to the extent that the CPU has reached a maximum thread count level, incoming data will have no position in the existing queue. In real time data processing, if latency extends over a certain time period (disclosure mentions millisecond), new data can potentially be lost and existing data may not reach the user in time. When data packets are lost, the user may receive inefficient and inaccurate data results.

Accordingly, there may be a need for systems and devices with faster, more efficient implementation methods for resource allocation in real-time parallel pipeline processing systems of large amounts of complex data. Such methods, systems and interfaces may optionally complement or replace conventional methods of processing complex data. Such methods and interfaces may reduce the time necessary to process large amounts of complex data and produce a more efficient human-machine interface. Such methods, systems and interfaces may optimize CPU resource allocation in real-time through parallel data processing.

Reference will now be made in detail to implementations, examples of which are illustrated in the accompanying drawings. In the following detailed description, numerous specific details are set forth in order to provide a thorough understanding of the various described implementations.

However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 34A:
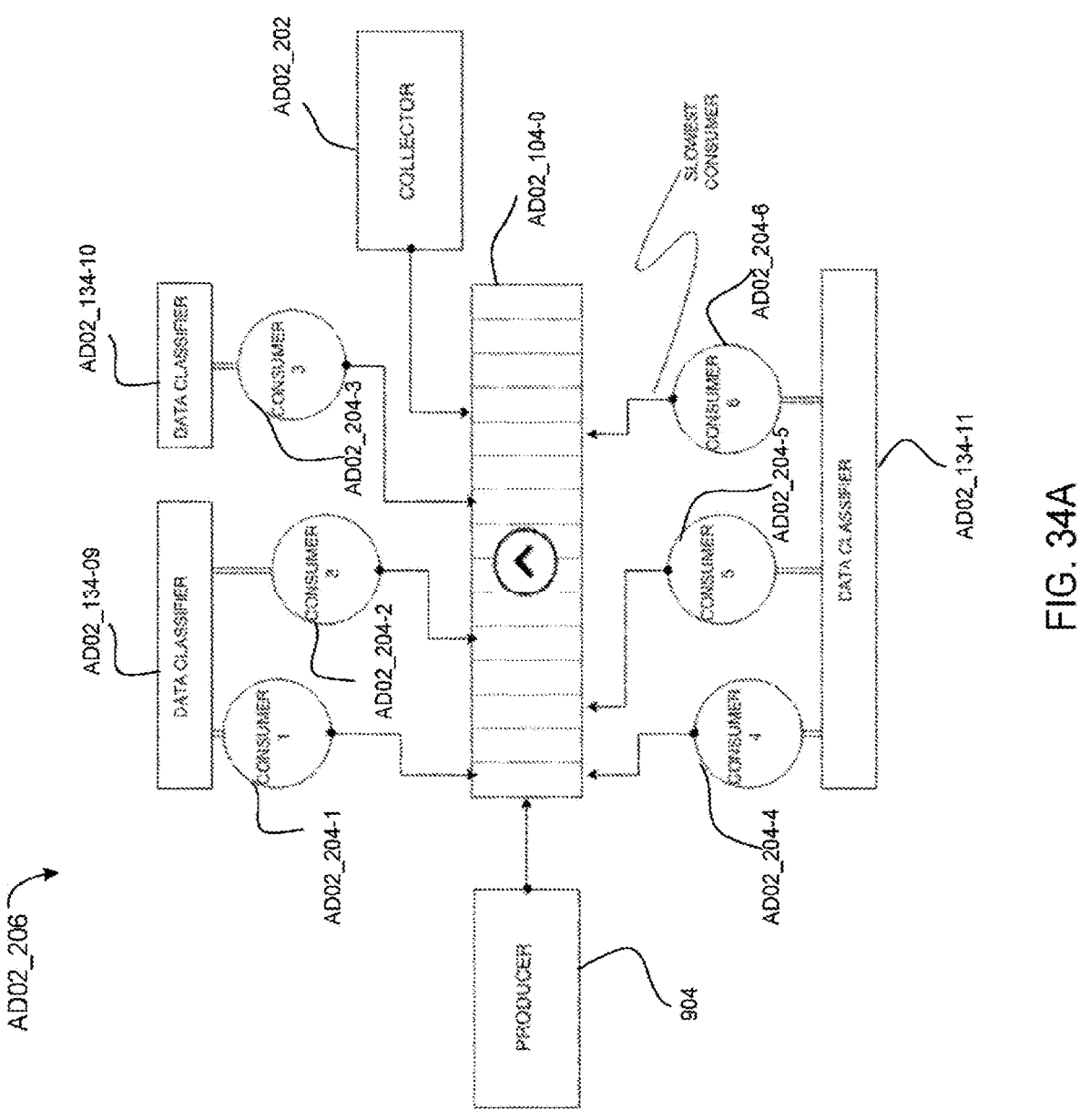
FIG. 34A illustrates an example of a dynamic CPU resource allocation system, in accordance with at least some implementations.

FIG. 34A illustrates a dynamic CPU resource allocation system AD02_206, in accordance with at least some implementations. The dynamic CPU resource allocation system AD02_206 may include a queue AD02_104 (also referred to herein as a data queue or queue). The data queue AD02_104 may consist of three main data interface components. These three data interface components may be the producer 904, collector AD02_202 and one or more consumers AD02_204.

As described herein, data queues AD02_104 may be lockless shared memory data structures that enable scalable processing of data pipelines. The implementation of a data queue AD02_104 in the data pipeline processing system is represented schematically in FIG. 34A.

The producer (also referred to herein as broadcaster) 904 may enqueue data packets, the consumer AD02_204 may dequeue data packets and the collector AD02_202 may clear the queue AD02_104 of consumed data packets which vacates memory slots that enable the producer 904 to enqueue data packets as they are received. The queue AD02_200 that connects the producer 904 with the data classifiers AD02_134 is subject to the 'convoy effect' wherein the slowest consumer AD02_204 determines the rate at which data packets can be enqueued by the producer. In FIG. 34A, the queue AD02_200 has six consumers AD02_204 with different consumption speeds; due to the different data consumption rates of the consumers AD02_204 the producer 904 can only enqueue data packets at the rate of consumption of the slowest consumer AD02_204. To avoid the convoy effect a controller process is implemented to ensure all data classifiers AD02_134 can process the data packets at approximately equal rates. This is achieved via an optimized CPU resource allocation policy determined at run-time by the controller process. The controller AD02_102 works in conjunction with the linux OS scheduler and modifies the NICE values associated with the data classifiers AD02_134 to adjust the CPU ticks allotted to each process. As shown in FIG. 34A and described herein, multiple threads (also may be referred to herein as consumers) AD02_204 may be allocated to a data classifier AD02_134 if it requires more CPU ticks than can be provided by one CPU core. Concurrently, NICE values (hence the associated priority and CPU clock ticks) may be adjusted for data classifiers AD02_134 as the incoming data rate fluctuates in order to create a well-balanced system. The incoming data rate may depend on factors such as time of day, occurrence of events, activity on social networks, and network bandwidth available, that are difficult to predict in advance. Additionally, new data classifiers AD02_134 may be added that would process data packets at varying rates. These processing rates are also hard to determine in advance, hence a controller is designed with the objective of rapid and adaptive response without generating instabilities in the system.

There exists a scenario wherein the variability of the CPU resources required by the data classifiers AD02_134 is large enough that a well-balanced system state may be difficult to attain. This is due to the fact that process priorities assigned via modifications in NICE numbers are relative: to assign all processes the highest possible NICE value of −20 may be the same as all of the processes being assigned the default value of 0. Hence, the well-balanced system state may require elimination of some of processes with the highest CPU resource requirement in order to process data packets at the same rate as those processes which require the least amount of CPU resources. The eliminated processes may be assigned a set of dedicated CPU cores via CPU affinity, or these processes may be relocated to another server with greater CPU resources. The latter method may be used to facilitate a dynamic inter-server CPU resource allocation, wherein the controller process may migrate those data classifiers that require more than the predetermined maximum share of CPU clock ticks to the server that has the lowest 'average delay'.

The average delay may be calculated as follows:

$$T_{delay} = \frac{Q_{avg} \times L}{\text{Rate}_{eff}}$$

$$\text{Where, Rate}_{eff} = \text{Rate}_{inp} - \frac{\text{Rate}_{buffer}}{S}$$

$T_{delay}$ is average delay of the system
$Q_{avg}$ is the average queue occupancy
L is the length of the queue
$R_{inp}$ is the average input data rate
$R_{buff}$ is the average RAM buffer memory buildup rate
S is the average data packet size The controller AD02_102 process may implement a FSM that tracks several parameters from each data classifier and the server AD02_116 to implement the optimal CPU resource allocation policy.

In some implementations, the dynamic CPU resource allocation policy may allow controlling of the number of threads AD02_106, processors AD02_108, servers AD02_116, priority of data processing and placement of data processing.

For example, four data pipelines may be running on a shared memory domain such as a server wherein a given CPU may experience a pipeline delay due to various factors such as complexity and amount of data. The optimized CPU resource allocation policy for thread and CPU allocation may allow for resource allocation from the shorter pipeline to the longer pipeline.

Regardless of pipeline length and amount of data processing required, the time to process the data may be comparable for each processer throughout the system. As a result, time needed to process data may be minimized.

Complexity of a given data pipeline may be dependent not only on the amount of processing, but may also depend on the type of data being processed. For example, after consumer A sends a tweet regarding a bad experience they had with furniture they purchased from user A, user A needs to know within a millisecond, wherein user A may have a thousand different data missions. One such data mission may be related to furniture, wherein 999 other missions may be related to other topics of interest for user A. Each pipeline may need to process the data being analyzed in order to produce a result for user A. As such, it may not be desirable to allot resources at the beginning of a data processing event.

In some implementations, it may be counter intuitive to assign a new thread (or resource) to a given processor because the creation of each thread may be associated with, for example, 100,000 clock cycles. As such, the system may essentially slow down if a new thread is created too often. To regulate the creation of new threads, the system may set an epoch timeline threshold where the difference between the longest queue and shortest queue may regulate said threshold.

In some implementations, if the queue occupancy for a given pipeline is greater than the epoch timeline threshold, the system may determine whether to perform an action.

FIGS. 34B-34H illustrate a dynamic CPU resource allocation system AD02_114, in accordance with one implementation. In some embodiments, the dynamic CPU resource allocation system AD02_114 is implemented at bouncer 536 as shown in FIGS. 5A-5B. The dynamic CPU resource allocation system AD02_114 may include a data source 502, broadcaster 904, data queues AD02_104, one or more data classifier and a controller AD02_102. A data source 502 may receive data from various sources and may transmit the data to the broadcaster 904. The broadcaster 904 may produce copies of the data and may transmit an individual copy of the data to each data classifier.

A data classifier may be represented by one or more processors AD02_108 executed on a server AD02_116. For example, in FIG. 34B, a first data classifier may be represented by processor AD02_108-1, a second data classifier may be represented by processor AD02_108-2, a third data classifier may be represented by processor AD02_108-3 and a fourth data classifier may be represented by processor AD02_108-4. Each processor AD02_108 may be executed on server AD02_116-1.

Each processor AD02_108 may process received data using one or more processor threads AD02_106. For example, in FIG. 34B, a processor AD02_108-1 may process received data using processor thread AD02_106-1; a second processor AD02_108-2 may process received data using processor thread AD02_106-2; a third processor AD02_108-3 may process received data using processor thread AD02_106-3; and a fourth processor AD02_108-4 may processor received data using processor thread AD02_106-4. Each consumer AD02_108 may include a data queue AD02_104. For example, in FIG. 34B, the first consumer AD02_108-1 may include data queue AD02_104-1; a second consumer AD02_108-2 may include data queue AD02_104-2; a third consumer AD02_108-3 may include data queue AD02_104-3; a fourth consumer AD02_108-4 may include data queue AD02_104-4. A data queue AD02_104 may be configured to store data received from the broadcaster 904 for later processing by the consumer AD02_108. The controller AD02_102 may be configured to ensure that all the consumers AD02_108 are processing the respective received data at comparable rates.

Figure 34B:
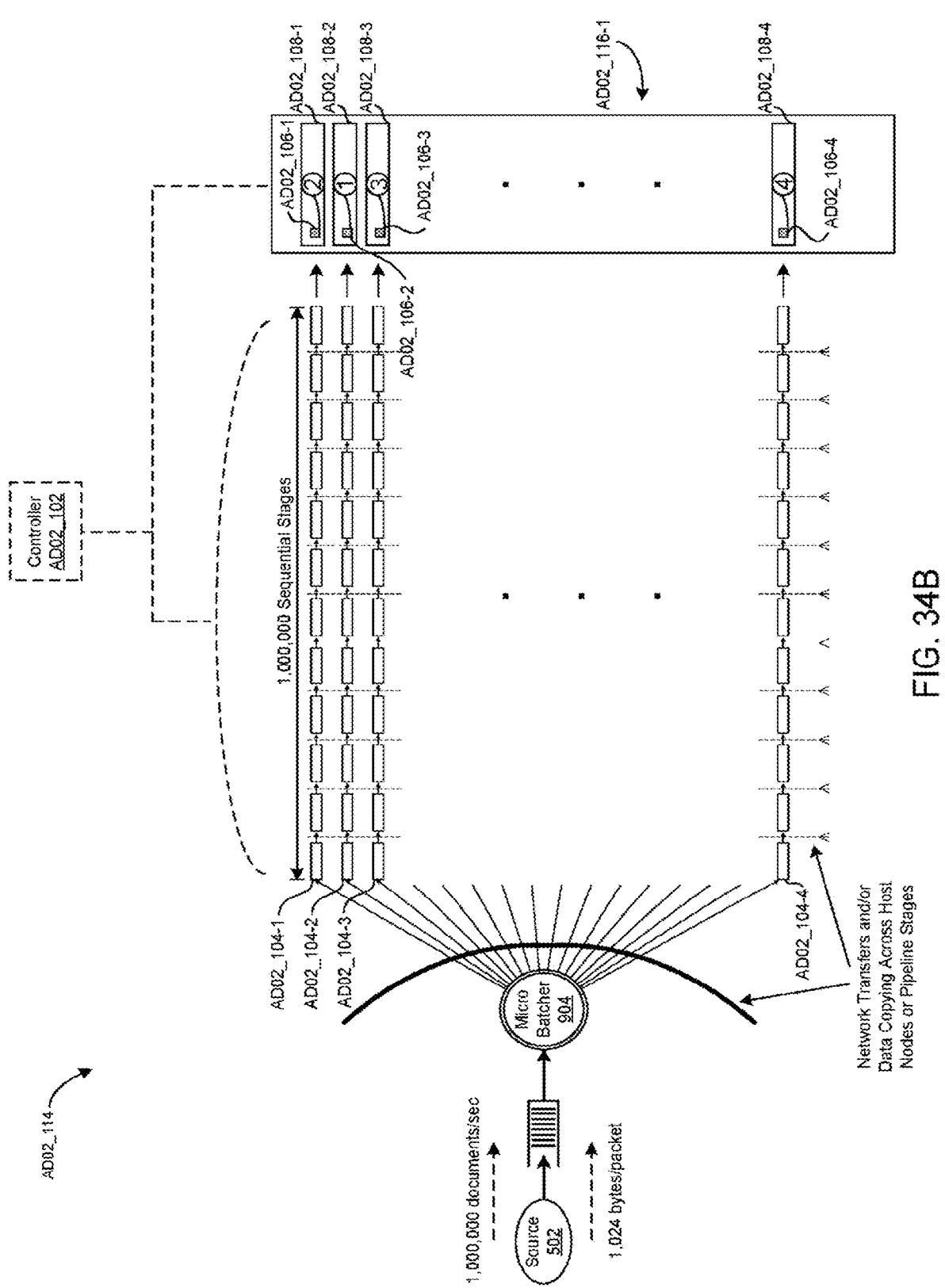
FIGS. 34B-34H illustrate an example of a dynamic CPU resource allocation system, in accordance with at least some implementations.
Figure 34C:
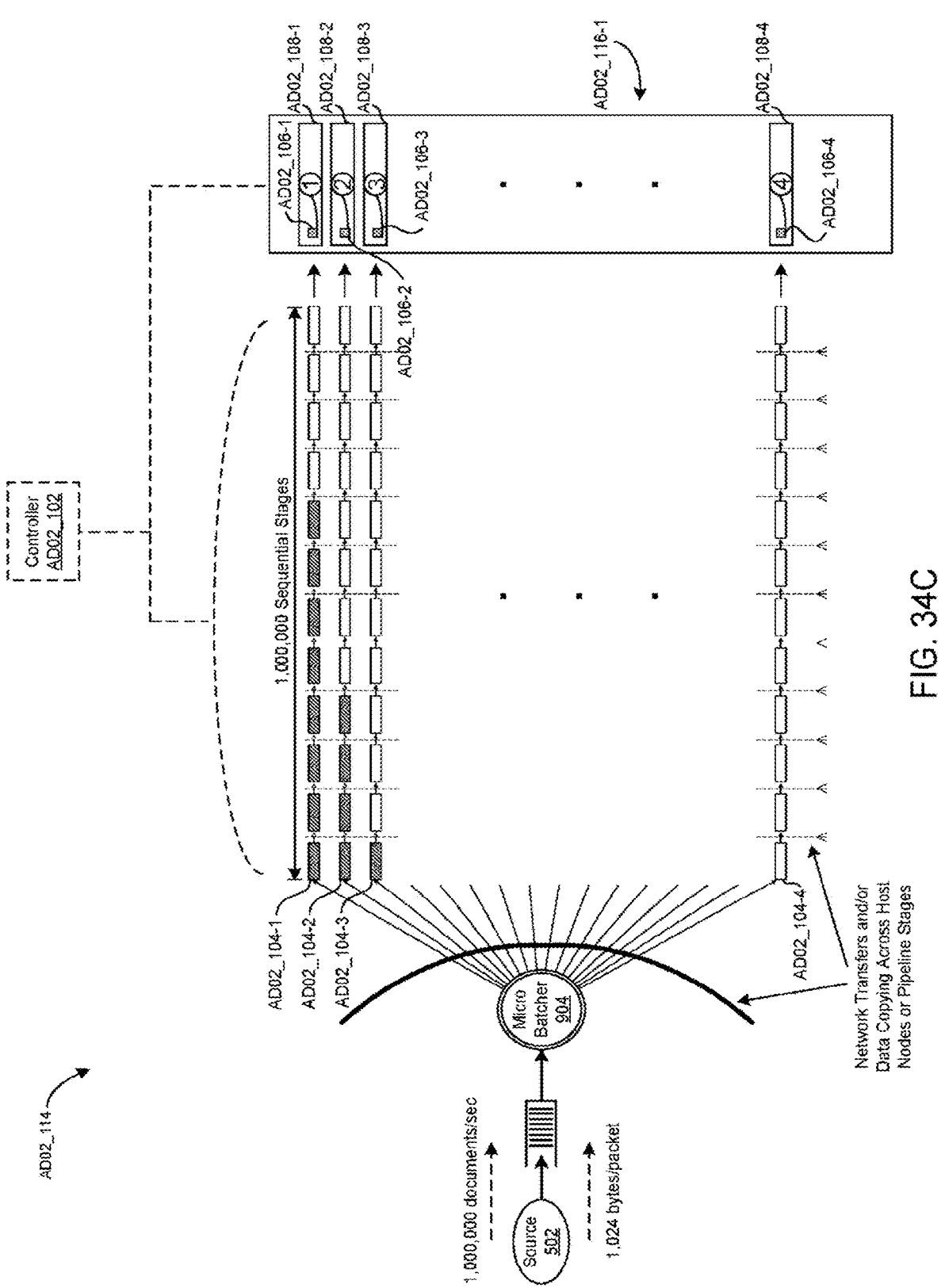

The controller AD02_102 may be configured to monitor queue lengths for each queue AD02_104 associated with a consumer AD02_108 and reprioritize threads to better allocate hardware or software resources accordingly. For example, in FIG. 34C the controller AD02_102 may determine that a difference between the number of data elements stored in data queue AD02_104-1 (which is the longest queue of 8 data elements, data elements represented throughout the figures as solid boxes) and the number of data elements stored in data queue AD02_104-4 (which is the shortest data queue of 8 data elements) may exceed a predetermined threshold of five data elements. In response, the controller AD_102 may determine whether thread AD02_106-1 has a highest priority level. The priority levels for each thread AD02_106 is shown as a number inside a circle. For example, in FIG. 34B, the priority level for thread AD02_106 is 2. In this example, the highest priority level is 1. In response to a determination that the thread AD02_106-1 associated with the processor AD02_108-1 does not have the highest priority level (i.e., a priority level of 2), the controller AD02_102 may increase priority for thread AD02_106-1 by adjusting a priority value for thread AD02_106-1 (e.g., changing the priority level from 2 to 1 as shown in FIG. 34C), to prioritize thread AD02_106-1, and adjust the priority level for thread AD02_106-2 (e.g., changing priority level from 1 to 2) to deprioritize the thread AD02_106-2. This change in priority level to adjust data queue AD02_104 priority may ensure data processing at comparable rates by prioritizing the use of thread AD02_106-1 as compared to thread AD02_106-2.

The controller AD02_102 may be configured to monitor queue lengths for each data queue AD02_104 associated with a data classifier and assign additional threads AD02_106 to better allocate hardware or software resources accordingly. For example, in FIG. 34D, over time, even after adjusting the priority values for the threads AD02_106, the controller AD02_102 may determine that the difference between the longest queue AD02_104-1 (e.g., 7 data elements) and shortest queue AD02_104-4 (e.g., 0 data elements) exceeds the predetermined threshold (e.g., 5 data elements). In response to a determination that the difference between queue lengths exceeded a predetermined threshold, the controller AD02_102 determines whether the thread AD02_106-1 associated with queue AD02_104-1 has a highest priority level. In response to a determination that the thread AD02_106-1 associated with the processor AD02_108-1 has the highest priority value, the controller AD02_102 may allocate a new thread AD02_106-5 to processor AD02_108-1 so that data queue AD02_104-1 may be processed at comparable rates as the other data queues in system AD02_114.

Figure 34D:
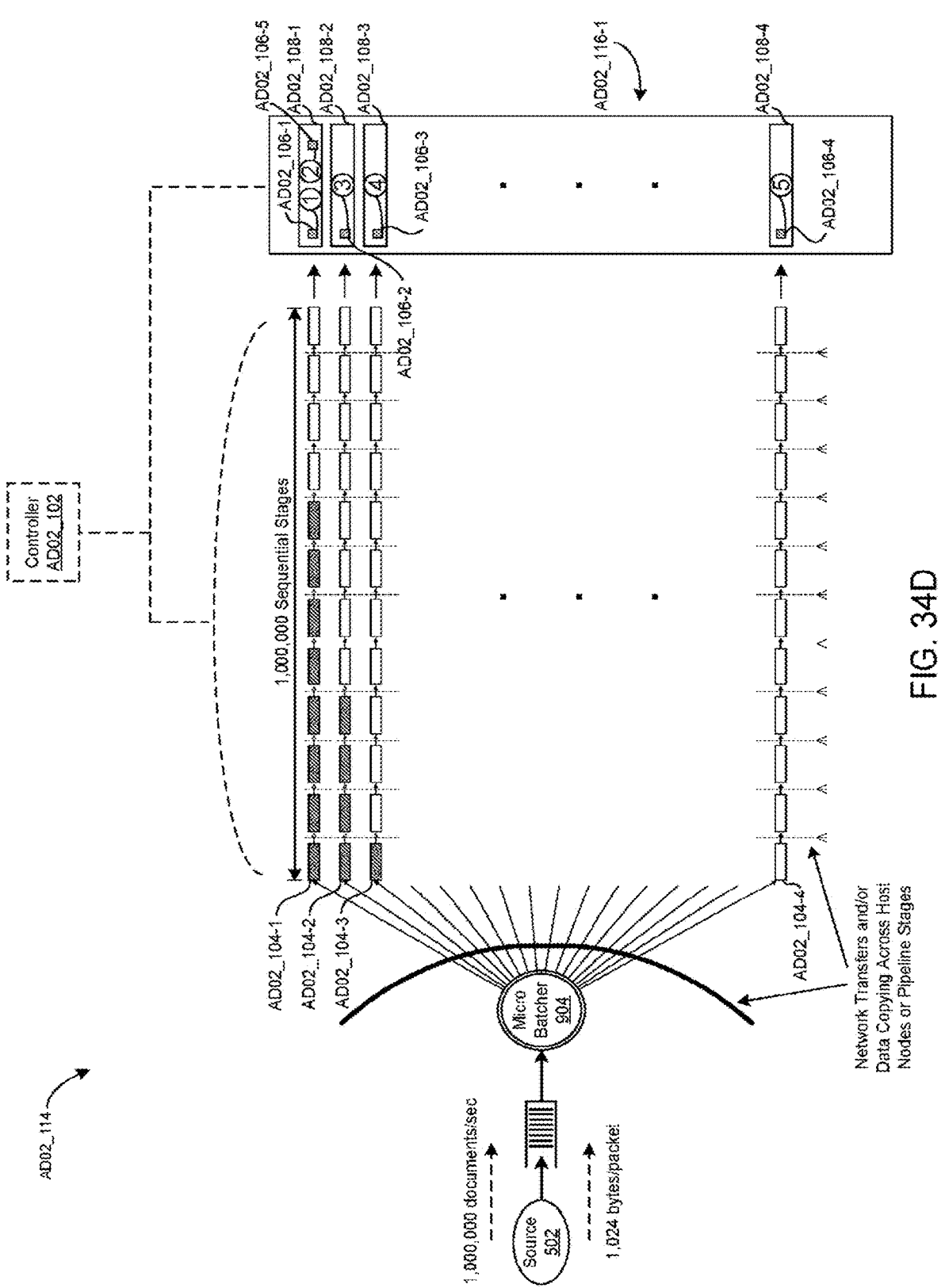
Figure 34E:
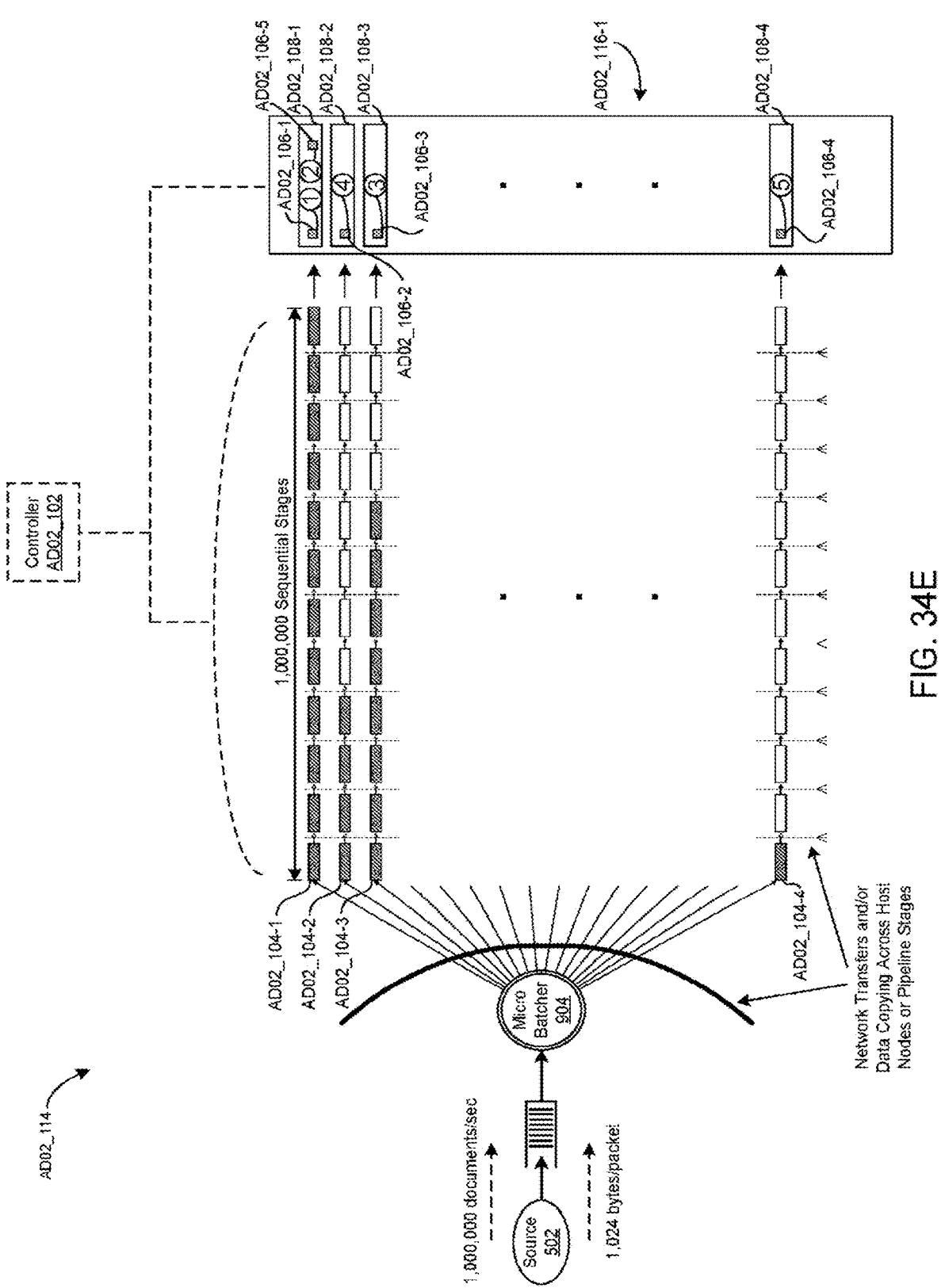
Figure 34F:
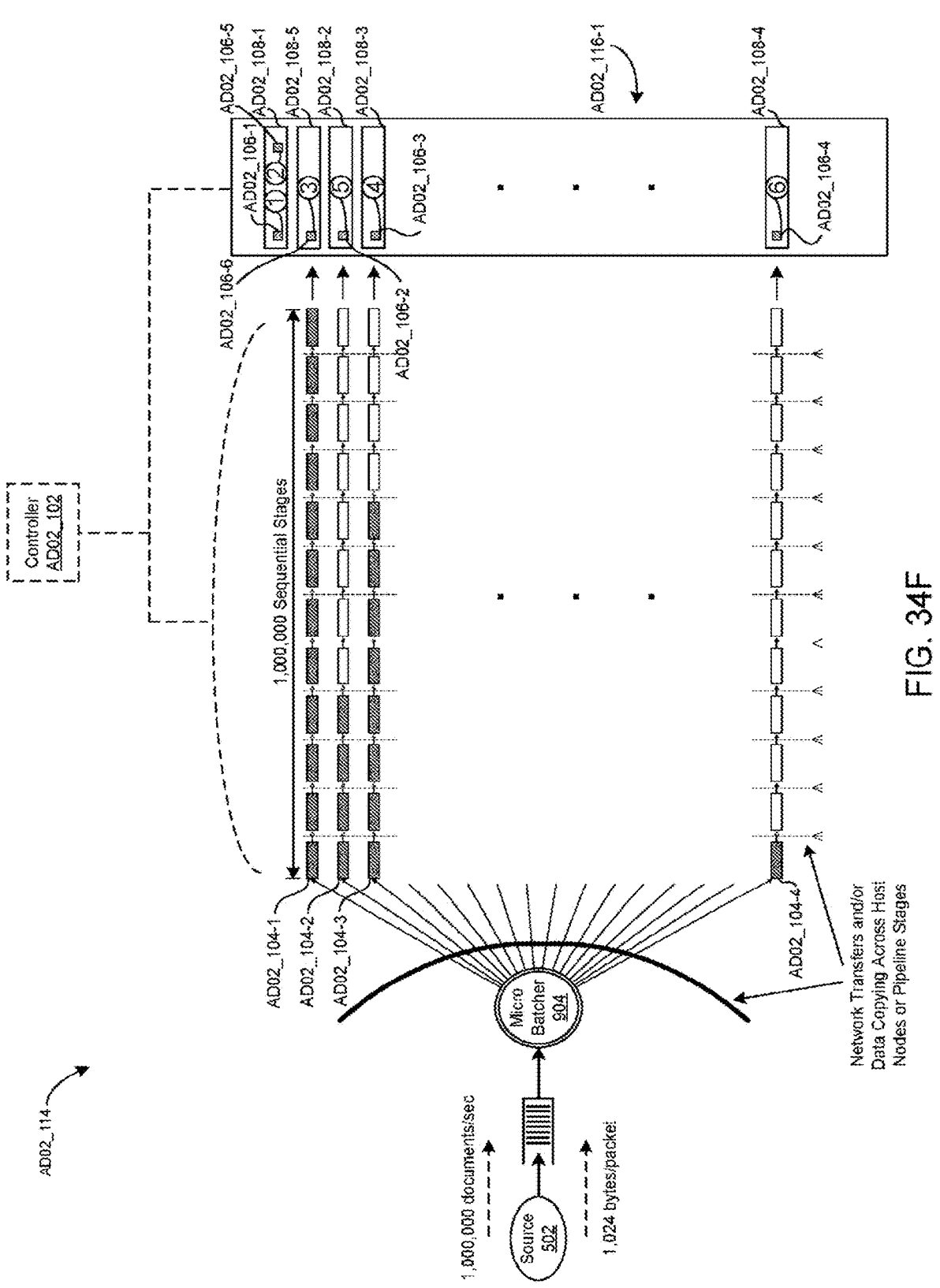
Figure 34G:
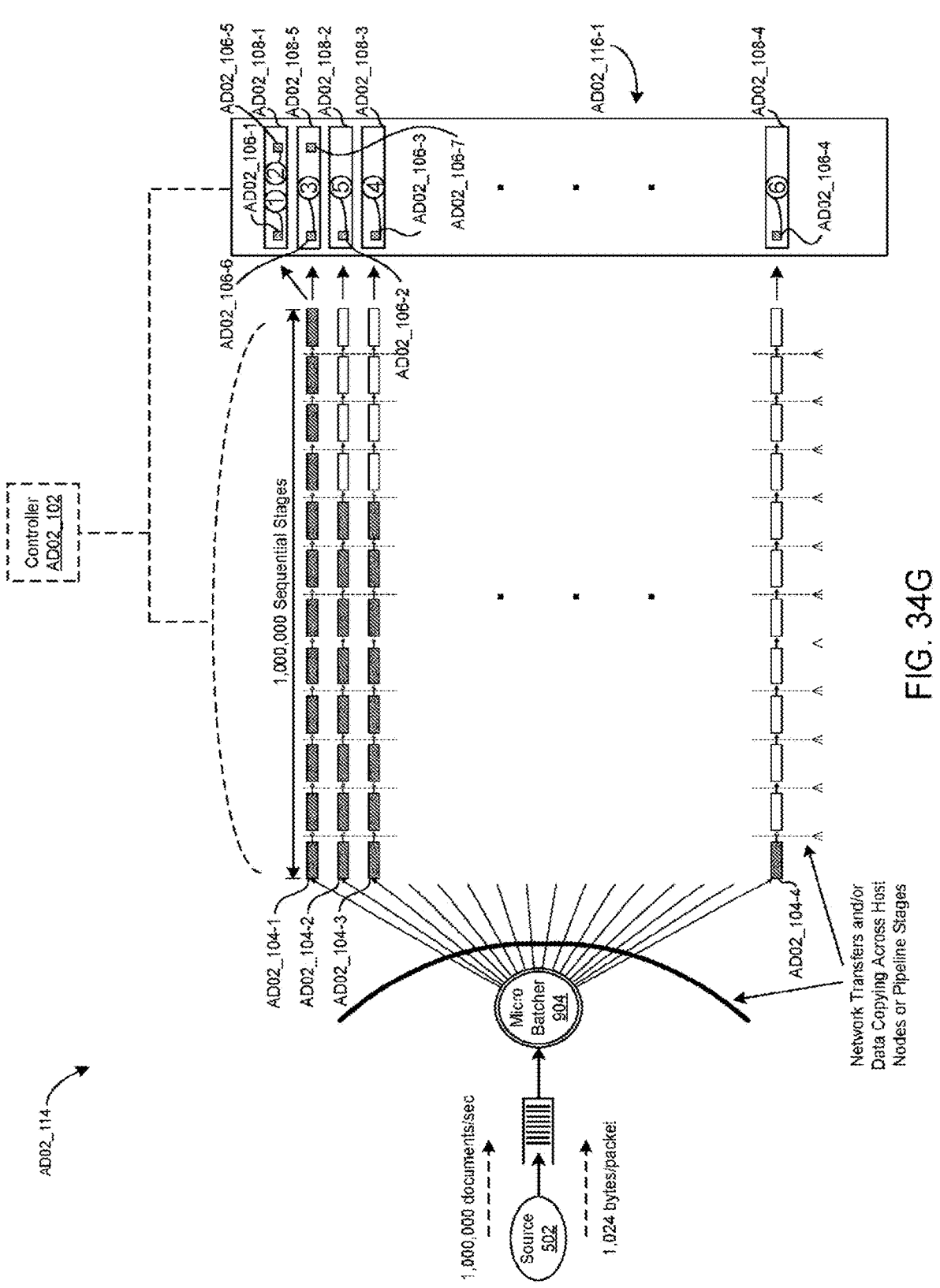

The controller AD02_102 may be configured to monitor queue lengths for each data queue AD02_104 associated with a consumer and assign a new processor AD02_108 to better allocate hardware and software resources accordingly. For example, in FIG. 34E, the controller AD02_102 may determine that the difference between the longest queue AD02_104-1 (e.g., 12 data elements) and shortest queue AD02_104-4 (e.g., 1 data element) exceeds the predetermined threshold (e.g., 5 data elements). In response to a determination that the difference between data queue lengths exceeded a predetermined threshold, the controller AD02_102 determines whether each of the threads AD02_106-1 and AD02_106-5 associated with the processor AD02_108-1 have the highest priority value. In response to a determination that the threads AD02_106-1 and AD02_106-5 associated with the processor AD02_108-1 have the highest priority value, the controller AD02_102 determines whether the maximum number of threads AD02_106 have been allocated to the processor AD02_108-1. In response to a determination that the maximum number of threads AD02_106 have been allocated to the processor AD02_108-1, the controller AD02_102 may assign a new processor AD02_108-5 to the data queue AD02_104-1 as shown in FIG. 34F.

Figure 34H:
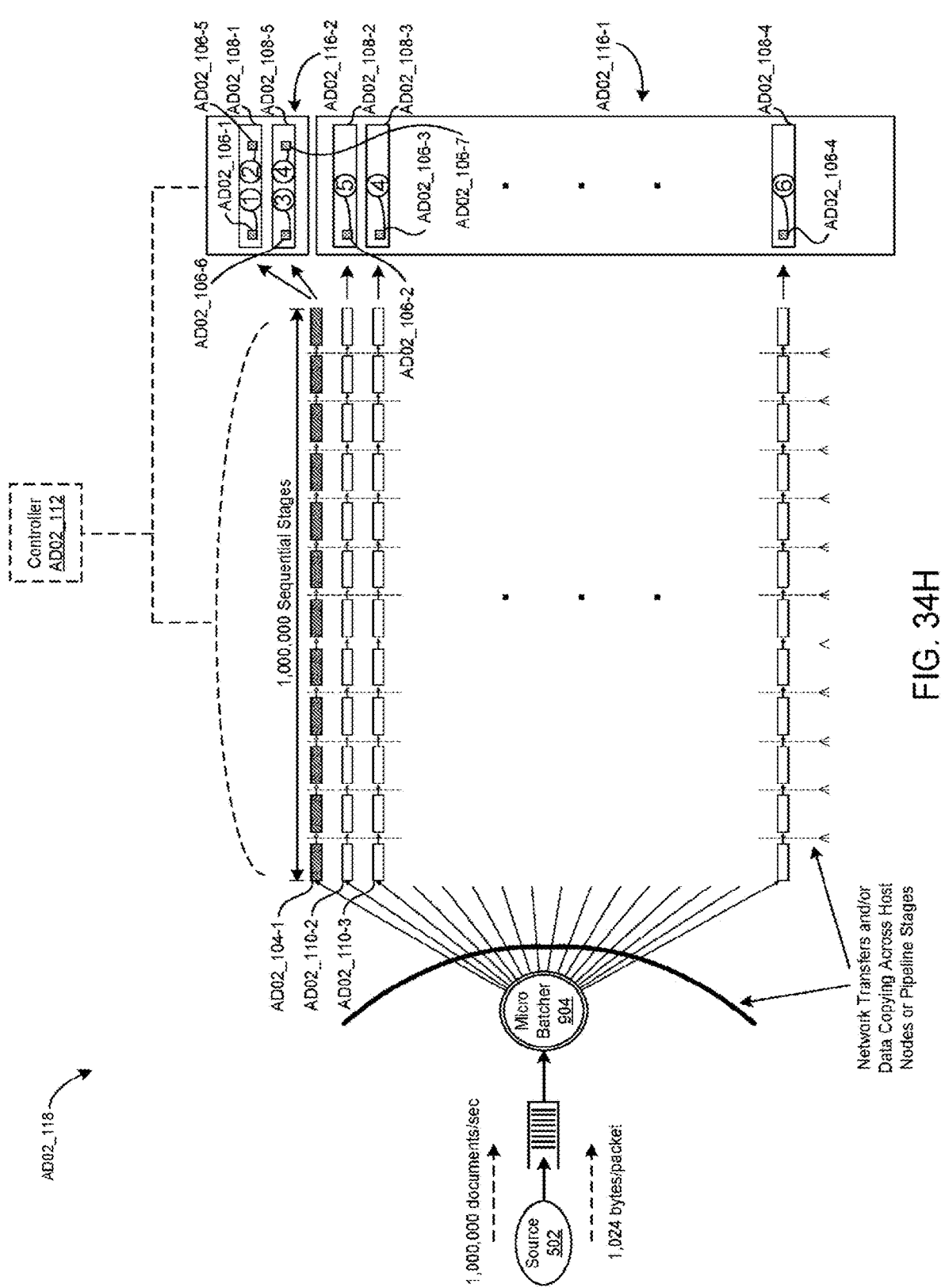

The controller AD02_102 may be configured to monitor queue lengths for each data queue AD02_104 associated with a consumer and assign a new server AD02_116 to better allocate hardware and software resources accordingly. For example, in FIG. 34G, the controller AD02_102 may determine that a difference between data queue AD02_104-1 which has 12 data elements and data queue AD02_104-4, which has 1 data element, exceeds predetermined threshold (e.g., 5 data elements). In response to a determination that the difference between the data queues AD02_104 exceeds a predetermined threshold, the controller AD02_102 determines whether the priority values for each thread AD02_106-1, AD02_106-5 and AD02_106-6 and AD02_106-7 associated with the data queue AD02_104-1 have a highest priority value. The controller AD02_102 may also determine whether the maximum number of threads (e.g., 4 threads, 2 in each processor) have been allocated to the data queue AD02_104-1. In response to a determination that the priority values for each thread AD02_106-1, AD02_106-5, AD02_106-6 and AD02_106-7 have the highest priority value and the maximum number of threads have been allocated to the processors, the controller AD02_102 may relocate the processors AD02_108-1 and AD02_108-5 from a first server AD02_116-1 to a second server AD02_116-2, as shown in FIG. 34H, while maintaining the remaining processors (e.g., AD02_108-2, AD02_108-3 and AD02_108-4) at the first server AD02_116-1.

FIG. 34I illustrates an example of a finite state machine implementing a dynamic CPU resource allocation system in accordance with some implementations.

Figure 34J:
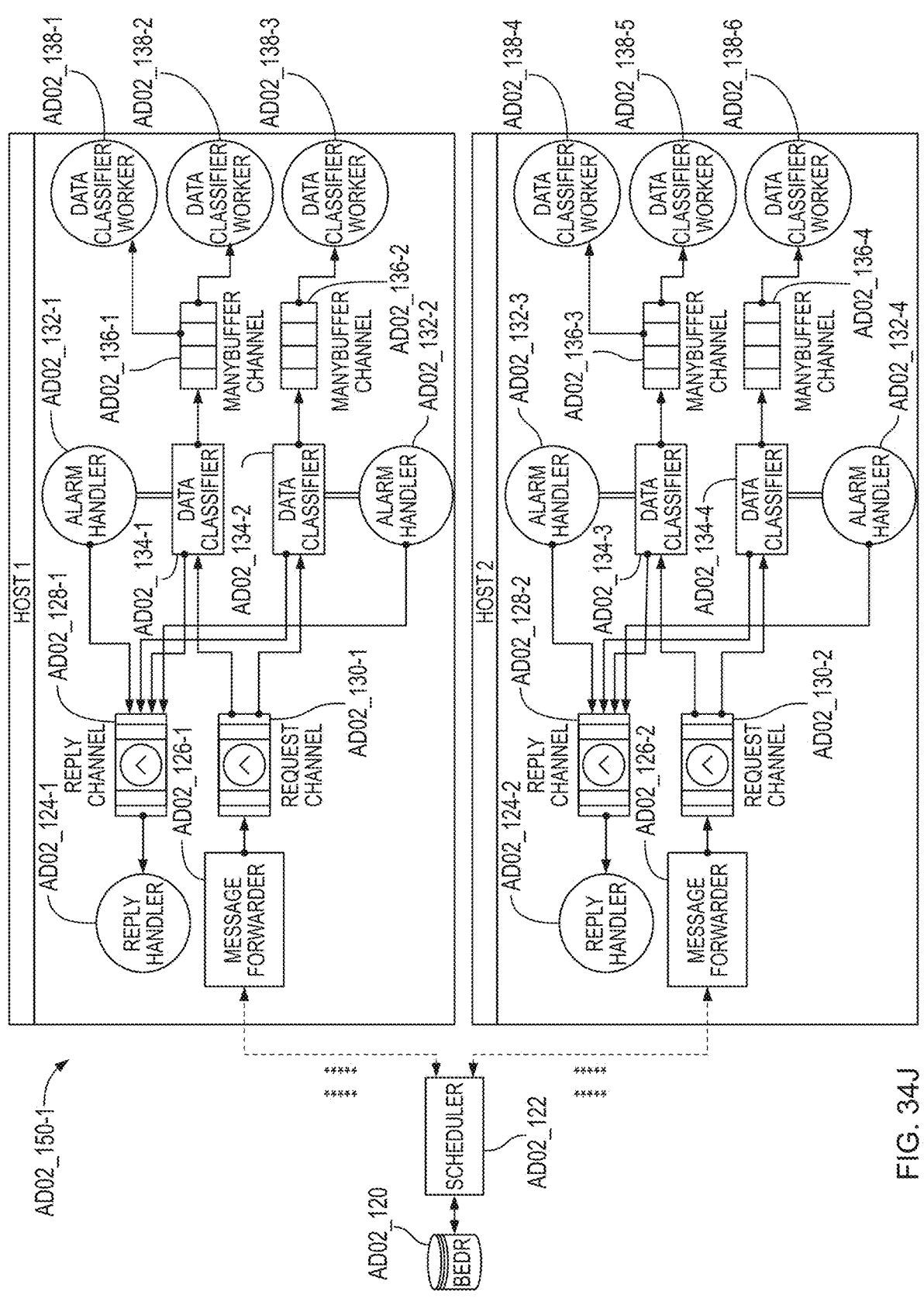
FIGS. 34J-34K illustrate an example of communication protocol architecture, in accordance with at least some implementations.

FIG. 34J illustrates an example of the data pipeline architecture in a command channel as described herein, in accordance with one implementation.

A command channel as defined herein may be an in-memory, lossless communication channel between processes which guarantees asynchronous request-reply pattern of communication. It may be formed from two queues: request command channel AD02_130 and reply command channel AD02_128.

Along with the data filtering and classification, the distributed system may need to maintain a state of a data classification and also may need to react to certain events that would change a data classifier AD02_134 or change the structure of the directed network. Such events, as defined herein may be realtime updates. Realtime updates packet format may be defined as: {"action": action_value, "id": classifier_id}

An annotator as defined herein may be the system that annotates the incoming data packets with author and publisher information, and converts the data into a serialized object format.

Manybuffer channel (also referred to herein as a many-buffer channel), as defined herein, may store the data classifier's AD02_134 latest filters, which are then accessed by the data classifier workers AD02_138. Each manybuffer channel AD02_136 is local to its corresponding data classifier AD02_134, as shown in FIG. 34J.

Packet as defined herein, may be a data structure with the following information embedded in it: {snippet_content, snippet_language, JSON_snippet_packet, author_info, publisher_info}.

Output packet format as defined herein, may be a data structure with the whole data packet format embedded in it along with meta information about the data classifier AD02_134 which processed it: {_data_packet, Taps_list, Number_of_taps, Data Classifier_ID}

Data channel as defined herein may be an in-memory lossless queue which only allows data in packet format to be enqueued in it.

Output channel as defined herein may be an in-memory lossless queue which only allows data in output packet format to be enqueued in it.

System Overview:

The system, as referred to herein, may be a complex and highly scalable distributed system which may be used to filter unstructured data in real time. The design of the system may be viewed as a directed network in which the different modules of the system may be the nodes and the edges may be the communication channels. Each node may store information about its neighboring node and may not hold the information of the directed graph as a whole. If two nodes are on a different host they may use ZeroMq messaging library to communicate with one another. If two nodes are on the same host they may use queues to communicate with each other.

System Architecture:

The components of the system may include:

Scheduler AD02_122

Message Forwarder AD02_126

Data Classifier AD02_134

Data Classifier Worker AD02_138

Aggregator AD02_146

Data Broadcaster AD02_160

Data Producer AD02_140

Router AD02_148

Whenever there may be a real time update, it may be of paramount importance that a message be delivered to the correct data classifier AD02_134. As a result, a communication protocol may need to be established that may be reliable, efficient, and guarantee immediate delivery of the message. Therefore, the communication protocol may be implemented over a command channel. There are several types of real time updates, but all of them may use the same command channel.

The architecture of the distributed system can be categorized into two parts:

1) Communication protocol architecture—This may concern the way specific components of the system interact with each other during real time updates.

2) Data pipeline architecture—This may concern the way the data flows through the specific components of the system.

Communication Protocol Architecture:

The components involved in handling the real time updates in the system are the following:

Scheduler AD02_122

Message Forwarder AD02_126

Data Classifier AD02_134

Data Classifier Worker AD02_138

The description of each component mentioned in the above diagram is as follows:

Scheduler AD02_122: All the real time updates may be first conveyed to the scheduler AD02_122, which may be the entry point for all realtime updates. As a result, there may be only one scheduler AD02_122 for a single system. The scheduler AD02_122 may determine the category of the real time update and may process it to convert it into compatible format (real time updates packet format). The scheduler AD02_122 may connect to the message forwarder AD02_126 and may send the message over a ZeroMq Request socket. The communication pattern between the scheduler AD02_122 and a message forwarder AD02_126 may be a synchronous request-reply pattern with a timeout option. This may essentially block the scheduler AD02_122 till the message forwarder AD02_126 replies within a certain timeout period. If the message forwarder AD02_126 fails to reply, the scheduler AD02_122 may discard the realtime update and notify the system that generated it. This process may ensure that the scheduler AD02_122 is always responsive to other incoming requests and ready to accept the next realtime update.

Message forwarders AD02_126 may forward the real time updates from the scheduler AD02_122 to the data classifiers AD02_134 and may primarily limit the scheduler's AD02_122 downstream fan-out connections. Each host may have a single message forwarder AD02_126 which may connect to a large number of data classifiers AD02_134 located on the same host. In order to ensure asynchronous messaging communication with the data classifiers AD02_134, the message forwarder AD02_126 may be divided into two sub-components (threads) called the message forwarder AD02_126 and the reply handler AD02_124.

The forwarder AD02_126 may broadcast real time updates that it receives from the scheduler AD02_122 to the data classifiers AD02_134. It may communicate with the data classifiers AD02_134 using the command request channel AD02_130

The reply handler AD02_124 may constantly monitors the command reply channel AD02_128 for messages from the data classifiers AD02_134. It may determine the message type and send a corresponding message to the scheduler AD02_122.

The data classifier AD02_134 may take the appropriate actions for the real time updates may be sent by the message forwarder AD02_126 and it may relay corresponding reply messages to the reply handler. It may also spawn multiple data classifier workers AD02_138, which may filter the data, and may communicate the real time updates using the many buffer channel AD02_136. In order to maintain the state of the classifier and raise certain interrupt signals, the data classifier AD02_134 may also spawn a thread called the alarm handler AD02_132. The alarm handler AD02_132 may track the current state of the data classifier AD02_134 and may directly communicate with the reply handler AD02_124 if there were any alarms.

Figure 34K:
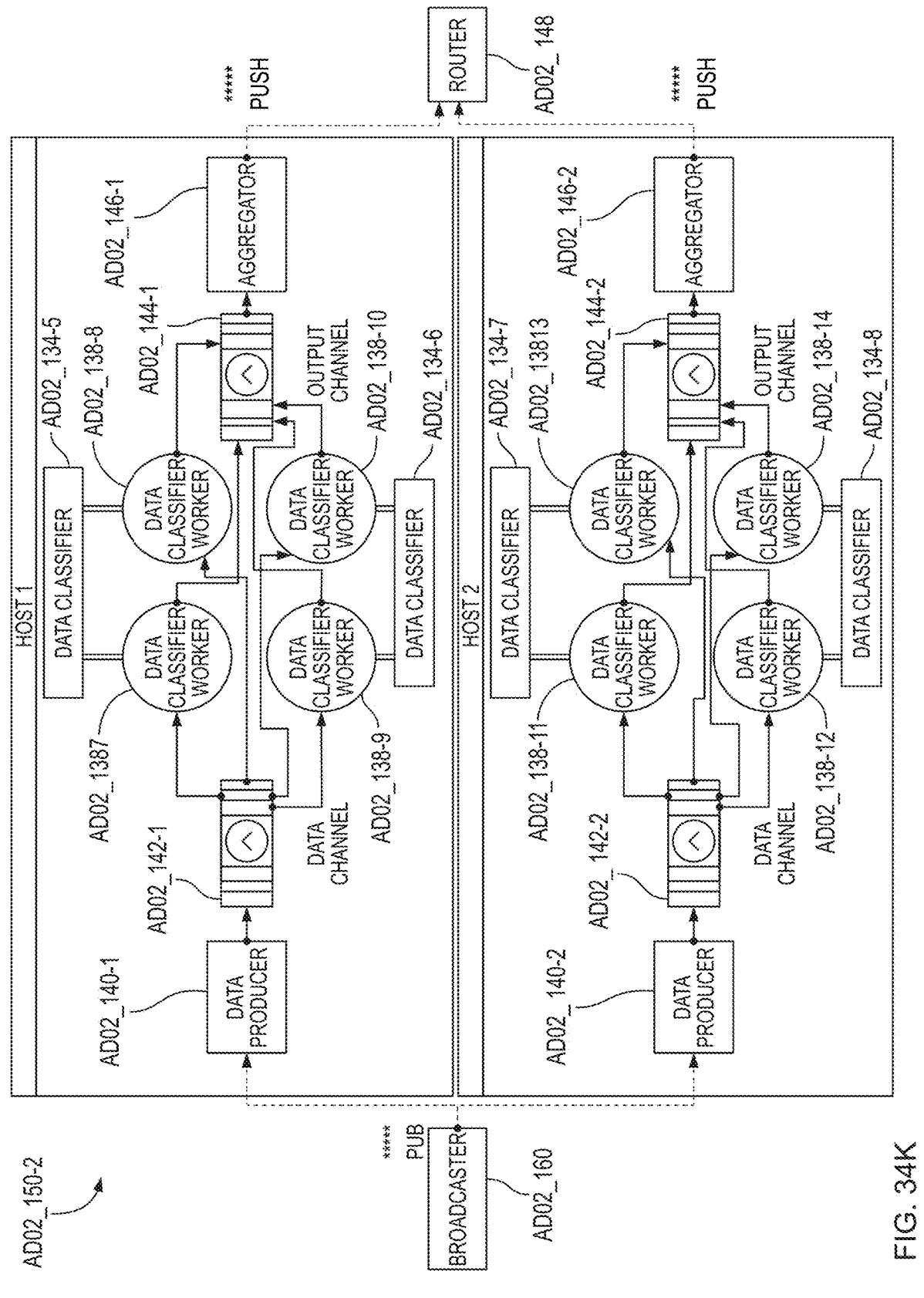

FIG. 34K illustrates an example of the data pipeline architecture of the system, in accordance with one implementation The components of system that process the data packets in the data pipeline are as follows:

Data Broadcaster AD02_160 (also may be referred to herein as broadcaster 904)

Data Producer AD02_140

Data Classifier Worker AD02_138

Data Aggregator AD02_146

The data broadcaster AD02_160 may subscribe to the full stream of data published by the annotator via the ZeroMQ subscriber socket that may broadcast to the connected host AD02_150. It may also be used as a data forwarder in order to limit the fan out of number of PUB/SUB sockets in order to scale the data pipeline architecture even further.

The data producer AD02_140 may subscribe to the data stream from the data broadcaster/forwarder and may convert the received data packets to the data packet format. It may connect to the data channel AD02_142 as a producer AD02_140 and enqueue data into the channel to be consumed by the data classifier workers AD02_138.

The data classifier workers AD02_138 may initialize the data classifier process. The data classifier worker AD02_138 may attach to the many buffer channel AD02_136 to get real time updates and may also attach to the data channel AD02_142 to dequeue and classify the data packets. The classified data may be converted into output packet format and may then be enqueued in the output channel AD02_144.

The aggregator AD02_146 may be the only consumer of the output channel AD02_144. All the data classifier workers AD02_138 may be on the same host AD02_150 enqueued by the classified data, tagged with metadata about the data classifiers AD02_134, into the output channel AD02_144. The aggregator AD02_146 may consume the filtered data from the other end. The aggregator AD02_146 may convert the dequeued output packet to a JSON multi-part packet and may send it to the router using a zeroMq PUSH socket.

The router AD02_148 may aggregate all the outgoing data streams from aggregators AD02_146 located on all the hosts AD02_150 and may convert each JSON multi-part packet to a standard JSON object. It may publish the filtered data in JSON format via a ZeroMq PUB socket that other downstream systems may subscribe to.

In some implementations, there is a dynamic resource allocation method, comprising at a server including a plurality of processors (e.g., processors AD02_108) and memory storing programs for execution by the processors. A dynamic resource allocation method receiving a data stream including a plurality of posts, executing a plurality of filter graph definitions, wherein each of the filter graph definitions is configured to identify posts with high value information according to the respective filter graph definition. An example of at least one implementation of the dynamic resource allocation method is described in FIGS. 34B-34H.

In some implementations, posts are identified at least in part based on both the information obtained from previously received posts associated with the respective source identifier and the content information corresponding to the content portion of the post.

In some implementations, executing the plurality of filter graph definitions includes allocating one or more initial processor threads (e.g. threads AD02_106) to each of the filter graph definitions to process the posts, and allocating a queue (e.g., queues AD02_104) configured to store each of the posts of the data stream as each post awaits processing by the respective one or more initial processor threads.

In some implementations, executing the plurality of filter graph definitions includes determining whether an amount of time since a last policy check occurred meets policy check timing criteria. In accordance with a determination that the amount of time since the last resource allocation occurred meets policy check timing criteria, determine whether a queue occupancy for a respective pipeline meets policy action criteria.

In accordance with a determination that the queue occupancy for the respective pipeline meets policy action criteria, selecting and performing a dynamic allocation action based on a priority of the respective one or more initial processor threads allocated to the respective pipeline at the server.

A total number of the one or more initial processor threads allocated to the respective pipeline at the server (e.g., server AD02_116-1).

In some implementations, policy check timing criteria includes a criterion that is met when the amount of time since the last policy check exceeds a policy check timing threshold. For example, a timing threshold of three may be set, such that a controller performs a policy action after a third policy check.

In some implementations, policy action criteria may include a criterion that is met when the queue occupancy for the particular filter graph definition exceeds a queue occupancy threshold. For example, a criterion of the policy action criteria is met when a queue occupancy for a single queue exceeds a threshold. As another example, a criterion of a policy action criteria may be met when a difference in queue occupancy between a most-filled queue and a least-filled queue exceeds a threshold.

In some implementations, selecting and performing the dynamic allocation action includes determining whether a thread priority number of the respective one or more initial processor threads allocated to the respective filter graph definition at the server is less than a highest thread priority threshold.

In some implementations, in accordance with a determination that the thread priority number of the respective one or more initial processor threads allocated to the respective filter graph definition at the server is less than the highest thread priority, incrementing the priority number of the respective one or more initial processor threads to a higher thread priority to cause the first server to utilize the respective one or more initial processor threads more often as compared to when the one or more initial processor threads had a lower thread priority number. For example, as shown in FIGS. 34B-34C, changing priority value from 2 to 1 for thread AD02_106-1 to prioritize thread AD02_106-1.

In some implementations, selecting and performing the dynamic allocation action includes determining whether a priority of the respective one or more initial processor threads allocated to the respective filter graph definition at the server meets a highest thread priority threshold. In accordance with a determination that the priority number of the respective one or more initial processor threads allocated to the respective filter graph definition at the server meets the highest priority, allocating another processor thread to the respective one or more initial processor threads to cause the first server to utilize the respective one or more initial processor threads more often as compared to when the one or more initial processor threads had a lower priority number. For example, as shown in FIG. 34D, in response to a determination that the thread AD02_106-1 associated with the processor AD02_108-1 has the highest priority value, the controller AD02_102 may allocate a new thread AD02_106-5 to processor AD02_108-1 so that data queue AD02_104-1 may be processed at comparable rates as the other data queues in system AD02_114.

In some implementations, selecting and performing the dynamic allocation action includes determining whether a total number of the respective one or more initial processor threads allocated to the respective filter graph definition at the server meets a total processor thread threshold. In accordance with a determination that the priority number of the respective one or more initial processor threads allocated to the respective filter graph definition at the server meets the total processor thread threshold, allocating the respective pipeline to a second server to cause the second server to process the posts in the pipeline more often as compared to when the first server processed the posts in the pipeline. For example, the controller AD02_102 may also determine whether the maximum number of threads (e.g., 4 threads, 2 in each processor) have been allocated to the data queue AD02_104-1. In response, the controller AD02_102 may relocate the processors AD02_108-1 and AD02_108-5 from a first server AD02_116-1 to a second sever AD02_116-2, while maintaining the remaining processors (e.g., AD02_108-2, AD02_108-3 and AD02_108-4) at the first server AD02_116-1, as shown in FIG. 34H.

(B1) In one aspect, some implementations include a server including a plurality of processors and memory storing programs for execution by the processors: receiving a data stream including a plurality of posts; executing a plurality of filter graph definitions, wherein each of the filter graph definitions is configured to identify posts with high value information according to the respective filter graph definition, wherein posts are identified at least in part on based on both the information obtained from previously received posts associated the respective source identifier and the content information corresponding to the content portion of the post, wherein executing the plurality of filter graph definitions includes: allocating one or more initial processor threads to each of the filter graph definitions to process the posts, and allocating a queue configured to store each of the posts of the data stream as each post awaits processing by the respective one or more initial processor threads; determine whether an amount of time since a last policy check occurred meets policy check timing criteria; in accordance with a determination that the amount of time since the last resource allocation occurred meets policy check timing criteria, determine whether a queue occupancy for a respective pipeline meets policy action criteria; in accordance with a determination that the queue occupancy for the respective pipeline meets policy action criteria: selecting and performing a dynamic allocation action based on: a priority of the respective one or more initial processor threads allocated to the respective pipeline at the server, and a total number of the one or more initial processor threads allocated to the respective pipeline at the server.

(B2) In some implementations of the dynamic resource allocation method of (B1), wherein the policy check timing criteria includes a criterion that is met when the amount of time since the last policy check exceeds a policy check timing threshold.

(B3) In some implementations of the dynamic resource allocation method of any of (B1)-(B2), wherein policy action criteria includes a criterion that is met when the queue occupancy for the particular filter graph definition exceeds a queue occupancy threshold.

(B4) In some implementations of the dynamic resource allocation method of any of (B1)-(B3), wherein selecting and performing the dynamic allocation action includes: determining whether a thread priority number of the respective one or more initial processor threads allocated to the respective filter graph definition at the server is less than a highest thread priority threshold, in accordance with a determination that the thread priority number of the respective one or more initial processor threads allocated to the respective filter graph definition at the server is less than the highest thread priority: incrementing the priority number of the respective one or more initial processor threads to a higher thread priority to cause the first server to utilize the respective one or more initial processor threads more often as compared to when the one or more initial processor threads had a lower thread priority number.

(B5) In some implementations of the dynamic resource allocation method of any of (B1)-(B4), wherein selecting and performing the dynamic allocation action includes: determining whether a priority of the respective one or more initial processor threads allocated to the respective filter graph definition at the server meets a highest thread priority threshold, in accordance with a determination that the priority number of the respective one or more initial processor threads allocated to the respective filter graph definition at the server meets the highest priority: allocating another processor thread to the respective one or more initial processor threads to cause the first server to utilize the respective one or more initial processor threads more often as compared to when the one or more initial processor threads had a lower priority number.

(B6) In some implementations of the dynamic resource allocation method of any of (B1)-(B5), wherein selecting and performing the dynamic allocation action includes: determining whether a total number of the respective one or more initial processor threads allocated to the respective filter graph definition at the server meets a total processor thread threshold, in accordance with a determination that the priority number of the respective one or more initial processor threads allocated to the respective filter graph definition at the server meets the total processor thread threshold: allocating the respective pipeline to a second server to cause the second server to process the posts in the pipeline more often as compared to when the first server processed the posts in the pipeline.

(B7) In some implementations a computer system comprising: one or more processors; and memory coupled to the one or more processors, the memory storing one or more programs configured to be executed by the one or more processors, the one or more programs including instructions for performing the method of any of (B1)-(B5).

(B8) In some implementations of a non-transitory computer-readable storage medium storing one or more programs, the one or more programs comprising instructions which, when executed by a computer system, cause the system to perform the method of any of (B1)-(B5).

Structurizing Parser

This application relates to methods, systems, and devices to parse and reorder information from streams of electronic posts (e.g., social media posts) into messages that follow natural sentence structure and are easy to read. Some embodiments can be used to issue alerts, e.g., in response to an event, that provide guidance to interested individuals (e.g., a "train is late" alert).

Social media enables one to be informed about happenings in the world. Every day, tens of millions of social media users go online to express opinions, share ideas, and publish media for the masses. When special circumstances happen (e.g., a train is late), people affected by those circumstances (e.g., those riding on or waiting for the train) tend to share their thoughts and feelings pertaining to the circumstance.

Data from social media posts can be useful in communicating relevant information pertaining to certain events and circumstances regarding the events, but aggregating relevant data and presenting it in a way that can be quickly, naturally, and easily read by an interested person remains a challenge due to the many ways different people communicate similar ideas. Thus, conventional systems for determining useful information from social media have difficulty presenting relevant information in a clear and concise way, forcing users to spend additional time sifting through the information in order to discern a relevant message. Even if conventional systems could detect relevant information, conventional systems would be too slow to streamline and communicate the information to a user looking to quickly discern actionable information.

Thus, there is a need for faster algorithms to process and display clear and concise information from social media posts.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

A structurizing parser, in accordance with some implementations, implements an inexact lexical analyzer that (i) parses packets into a token stream (e.g., trains, digits, tokens, ttime, etc.); (ii) runs rules to preprocess the input (northbound morning 237=>NB237); (iii) runs rules to identify sentence fragments (NB237 terminated at RWC); and (iv) copies resulting structures into a summary hash.

In some implementations, the parser processes social media information harvested in accordance with one or more of the systems and methods described in U.S. patent application Ser. No. 15/530,187 with respect to at least FIGS. 5B, 24, and 25, as well as the corresponding descriptions in the specification. The social media information processed by the computer system 520 in FIG. 5B of the U.S. Ser. No. 15/530,187 application forms an input stream.

In some implementations, the input stream is tokenized according to a schema. The schema describes which kinds of tokens are allowed (e.g., digits, hex, alphanumeric, hashtags, quotes, and so forth). In some implementations, the tokenized input is broken into subsets (e.g., sentences) and each subset is analyzed separately. A set of rules are constructed to match the tokenized input.

In some implementations, each rule has a name, logic to match tokens, and an action to fire if there is a match. For example, one rule may be constructed to parse train names by searching for particular keywords (e.g., nb or sb), performing a context analysis (e.g., by looking at neighboring words or characters to determine if there is a set of numbers (e.g., 237), and rewriting the keywords and relevant neighboring words or characters to a predefined label (e.g., #237 NB=>NB237). Further examples include rules that search for other keywords that are relevant to the schema, such as keywords describing particular trains, keywords describing particular actions (e.g., leaving, arriving), and keywords describing particular stations (e.g., Redwood City Station).

In some implementations, rules to cannonicalize the input are run first (e.g., Northbound train #371=>NB371; departing/leaving/left/leaves/boarding⇒departing; delayed/moving/slowly/stalled/held/holding/late/still=>delayed). Upon cannonicalizing the input, the parser arranges each keyword into a particular order, such as a natural sentence order (e.g., subject, verb, object).

For example, a plurality of TWEETS may be analyzed and parsed as described above, and the results may include multiple tweets including a particular train, a particular action, and a particular station. Rather than make the user read through each keyword and arrange them in an order that makes sense, the structurizing parser rearranges the keywords into a more natural order (e.g., Redwood City, depart, NB801, 6=>"NB801 departing Redwood City 6 minutes late").

A method of parsing social media information, in accordance with some implementations, includes: (i) separating a data stream into a first of a plurality of token streams in accordance with a predefined schema (e.g., what kind of tokens are allowed? digits hex alphanumeric hashtags quotes trains digits tokens, ttime, etc.); (ii) separating the token stream into sentences and analyzing each sentence separately; (iii) preprocessing the first token stream by replacing one or more groups of adjacent data with predefined labels (e.g., northbound morning 237=>"NB237"; departing/leaving/left/leaves/boarding=>"departing"); (iv) determining category types for respective predefined labels (e.g., B237="train", terminated="action", RWC="station"); (v) matching the preprocessed token stream with one or more of a plurality of predefined parsing rules based on the determined category types (e.g., if the stream includes "train,"

"action," and "station" category types, match with "train-action-station" parsing rule); and (vi) parsing the preprocessed token stream in a particular order in accordance with the one or more matched predefined parsing rules. (e.g., Rule (train_action): "train=NB375, action=depart"; Rule (train_action_station): "train=NB375, action=depart, station=RWC").

In some implementations, the token stream includes alphanumeric data, and separating the token stream includes extracting sentences and preprocessing a first of the plurality of sentences.

In some implementations, preprocessing the first token stream includes: (i) scanning the first token stream for predefined keywords or predefined groups of keywords (e.g., departing, leaving, left, leaves, boarding, about to leave); (ii) finding a first predefined keyword or group of keywords; and (iii) replacing the first predefined keyword or group of keywords with a corresponding predefined label (e.g., label: departing). In some implementations, a table of keywords and corresponding labels, stored in memory, is consulted for the replacing step.

In some implementations, preprocessing the first token stream includes: (i) scanning the first token stream for predefined patterns of alphanumeric data (e.g., patterns: "NB $$$" or "#$$$ NB" or "North Bound $$$," wherein $=a number); (ii) finding a first predefined pattern of alphanumeric data; and (iii) replacing the first predefined pattern of alphanumeric data with a truncated label (e.g., label: NB$$$; for example, "#237 NB" replaced with "NB237").

In some implementations, matching the preprocessed token stream includes determining that a plurality of predefined parsing rules match the preprocessed token stream.

In some implementations, matching the preprocessed token stream includes: (i) determining that the preprocessed token stream includes predefined label belonging to a first category type; (ii) searching a plurality of predefined parsing rules for rules that include the first category type; (iii) determining that one or more of the plurality of predefined parsing rules include the first category type; and (iv) matching the preprocessed token stream with the one or more predefined parsing rules.

In some implementations, each of the one or more predefined parsing rules includes: (i) a specified order for arranging parsed category types; and (ii) a category type-specific specification for selecting which data to include in the parsed token stream (e.g., "why" includes "so full we are warping spacetime" whereas "action" only includes "capacity").

In some implementations, parsing the preprocessed token stream includes: (i) keeping each predefined label; and (ii) discarding one or more words that are not represented by a predefined label.

In some implementations, parsing the preprocessed token stream further includes inserting predefined transition data between adjacent predefined labels (e.g., NB375 arriving "at" RWC).

In some implementations, a first of the matched parsing rules includes a first predefined label, and a second of the matched parsing rules does not include the first predefined label (e.g., Rule (train_action): "train=NB375, action=depart"; Rule (ttime): "time=T11:10").

In some implementations, results of the above method are displayed to a user in a specialized application designed to communicate information about particular events. For example, a train rider looking for information about a particular train would have access to the parsed information, and could immediately determine the train's current status without having to sift through and/or analyze multiple social media posts, thereby saving time and leading to more accurate and comprehensive results.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not the same type of electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

(C1) In one aspect, some implementations include a method comprising: separating a data stream into a first of a plurality of token streams in accordance with a predefined schema; preprocessing the first token stream by replacing one or more groups of adjacent data with predefined labels; determining category types for respective predefined labels; matching the preprocessed token stream with one or more of a plurality of predefined parsing rules based on the determined category types; and parsing the preprocessed token stream in a particular order in accordance with the one or more matched predefined parsing rules.

(C2) In some implementations of the method of (C1) wherein the token stream includes alphanumeric data, and separating the token stream includes extracting sentences and preprocessing a first of the plurality of sentences.

(C3) In some implementations of the method of any of (C1-C2), wherein preprocessing the first token stream comprises: scanning the first token stream for predefined keywords or predefined groups of keywords; finding a first predefined keyword or group of keywords; and replacing the first predefined keyword or group of keywords with a corresponding predefined label.

(C4)) In some implementations of the method of any of (C1-C3), wherein preprocessing the first token stream comprises: scanning the first token stream for predefined patterns of alphanumeric data; finding a first predefined pattern of alphanumeric data; and replacing the first predefined pattern alphanumeric data with a truncated label.

(C5) In some implementations of the method of any of (C1-C4), wherein preprocessing the preprocessed token stream comprises determining that the plurality of predefined parsing rules match the preprocessed token stream.

(C6) In some implementations of the method of any of (C1-C5), wherein matching the preprocessed token stream comprises: determining that the preprocessed token stream includes predefined label belonging to a first category type; searching a plurality of predefined parsing rules for rules that include the first category type; determining that one or more of the plurality of predefined parsing rules include the first category types; and matching the preprocessed token stream with the one or more predefined parsing rules.

(C7) In some implementations of the method of any of (C1-C6), wherein each of the one or more predefined parsing rules comprises: a specified order for arranging parsed category types; and a category type-specific specification selecting which data to include in the parsed token stream.

(C8) In some implementations of the method of any of (C1-C7), wherein parsing the preprocessed token stream comprises: keeping each predefined label; and discarding one or more words that are not represented by a predefined label.

(C9) In some implementations of the method of any of (C1-C8), wherein parsing the preprocessed token stream further comprises inserting predefined transition data between adjacent predefined labels.

(C10) In some implementations of the method of any of (C1-C9), wherein a first of the matched parsing rules includes a first predefined label, and a second of the matched parsing rules does not include the first predefined label.

(C11) In some implementations a computer system comprising: one or more processors; and memory coupled to the one or more processors, the memory storing one or more programs configured to be executed by the one or more processors, the one or more programs including instructions for performing the method of any of (C1)-(C10).

(C12) In some implementations of a non-transitory computer-readable storage medium storing one or more programs, the one or more programs comprising instructions which, when executed by a computer system, cause the system to perform the method of any of (C1)-(C10).

Author Attribute Annotation for Real-Time Extraction of High-Value Information from Data Streams This application relates to extraction of high-value information from streams of data (e.g., social media posts).

The growing phenomenon of social media has resulted in a new generation of "influencers." Every day, tens of millions of consumers go online to express opinions, share ideas and publish media for the masses. Consumers control the conversation and play a significant role in shaping, for example, the purchasing decisions of others. Thus, companies have to work harder to manage their reputations and engage consumers in this fluid medium. Businesses that learn to understand and mine consumer-generated content across blogs, social networks, and forums have the opportunity to leverage the insights from others, make strategic business decisions and drive their bottom line. Social media monitoring is often the first step to adopting and integrating the social Web into business.

The technical problem with monitoring social media (or more generally, the internet) for business (and other) interests is that it is difficult to "separate the wheat from the chaff." Conventional tools and methods for monitoring the internet often fail to turn data into actionable intelligence. Too often, such methods produce only statistical views of social media data, or produce far more data than a company can react to while missing critical pieces of data.

One difficulty in "separating the wheat from the chaff" (e.g., identifying high value, actionable, information from the enormous amount of data on the internet) is that conventional systems do not contextualize the source of the information. In many circumstances, however, the identity and attributes of the person speaking matters as much as the content of what the person is saying. To that end, some embodiments provide a method for real-time extraction of high-value information from data streams that correlates previously-obtained information about the source of data prior to filtering the data. This method improves the operation of the data filtering system (e.g., the computer system) because, without such correlation, it would be far more difficult if not impossible for the data filtering system to perform its task (e.g., real-time extraction of high-value information).

In some embodiments, the method is performed at a data filtering system (DFS) that includes one or more computers having a plurality of processors and memory storing programs for execution by the processors. The method includes receiving a first post from a source. The first post includes first content. The method further includes, in real time, for the first post: determining, from the first post, a source identifier for the source; determining one or more attributes for the source by broadcasting the first post to a first plurality of filter graph definitions, wherein each of the filter graph definitions is configured to identify, at least in part based on posts' contents, attributes of sources according to the respective filter graph definition; and storing in memory, as a source profile identified by the source identifier for the source, the one or more attributes for the source. The method further includes receiving a second post from the source. The second post includes second content. The method further includes, in real time, for the second post: determining, from the second post, the source identifier for the source; using the source identifier for the post, querying the memory to access the source profile using the source identifier; correlating the second post with attributes of the source stored in the source profile to produce a correlated second post, including the one or more attributes determined from the first post; and broadcasting the correlated second post to a second plurality of filter graph definitions, wherein each of the filter graph definitions in the second plurality of filter graph definitions is configured to identify posts with high value information according to the respective filter graph definition, wherein posts are identified at least in part based on both the attributes of the source and the content of the second post.

In another aspect, some implementations include a computing system including one or more processors and memory coupled to the one or more processors, the memory storing one or more programs configured to be executed by the one or more processors, the one or more programs including instructions for performing any of the methods described herein.

In yet another aspect, some implementations include a non-transitory computer-readable storage medium storing one or more programs for execution by one or more processors of a computing system, the one or more programs including instructions for performing any of the methods described herein.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

A key function of author annotation is to append relevant author (e.g., source) information (e.g., when available) to incoming packets from the internet before being passed to downstream components of a data filtering system (DFS). An author is a person or entity who generated a post, article, or Tweet on one of the platforms from which the DFS gathers data (e.g., any of the social media platforms, online blogs, or other data sources 502, FIG. 5A-5B). The author annotation system AD06-100 continuously gathers information about authors from the text of the published content (e.g., posts and TWEETS) and, when available, from meta-data available from the publishing source (e.g., the social media platform). The author annotation system AD06-100 uses this information to assign specific attributes or interests to the authors. The author annotation system AD06-100, which includes an asynchronous, lockless, massively parallelized, high-performance multi-level cache-based annotation system, performs the annotation of the author information in real-time. The details of the author annotation system AD06-100 are presented in the following sections.

In some embodiments, the author annotation system AD06-100 includes publisher discovery hyperengine 524, author discovery hyperengine 526, publisher store 530, author store 532, and/or author/publisher correlator 528. That is, in some embodiments, the author annotation system AD06-100 comprises a specific system implementation of one or more of the aforementioned modules.

Architecture

Figure 35:
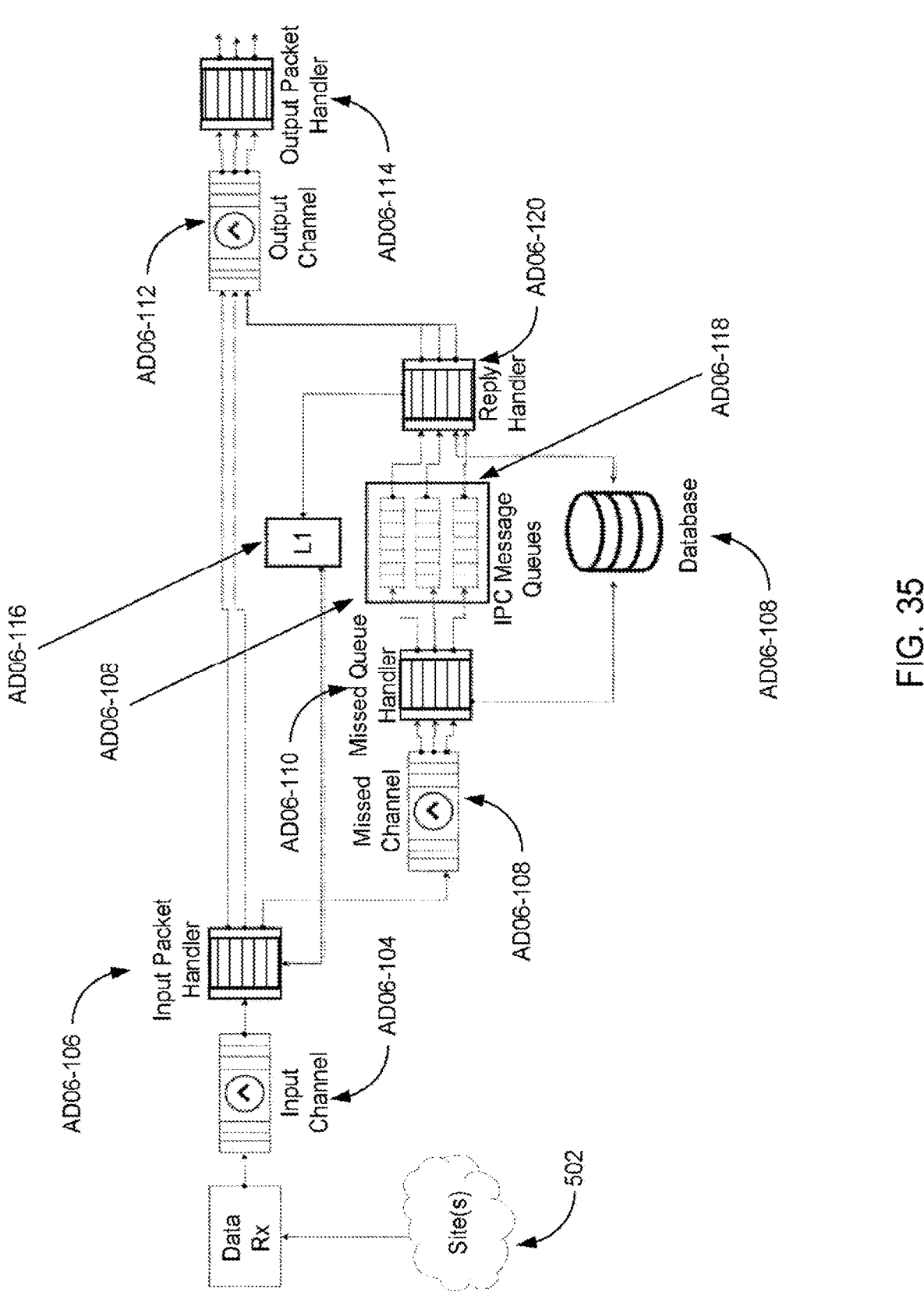
FIG. 35 illustrates a schematic diagram of an author annotation system, in accordance with some embodiments.

FIG. 35 illustrates a schematic diagram of an author annotation system AD06-100, in accordance with some embodiments. The components of the author annotation system AD06-100 can be divided into three broad sections: data storage, data retrieval and data management. The detailed description of individual processes that form each component is as follows:

Data Storage

The data storage components store author-attribute information records (e.g., hundreds of millions of records, also called source profiles) in a distributed manner, such that the information becomes available in real-time (e.g., within milliseconds) when requested. The requests (e.g., thousands per second) are handled by an array of servers that support the load of processing queries to reduce request-reply latency and enable nearly instant access to the requested data in a standardized format. The following processes are used for long-term, short-term and temporary data storage and communication:

Author-Attribute Information Database

The author-attribute database AD06-102 contains author-attribute information records (e.g., source profiles) that are updated as new information about the authors becomes available (e.g., through automatic discovery). The source profiles are indexed and stored (e.g., using Elasticsearch to enable quick access to information through a distributed storage architecture). The attributes span a large variety of fields but can be divided in two broad categories: individual information and preferences/characteristics. Individual information includes information such as gender, ethnicity, marital status, economic condition, and languages spoken, while preferences/characteristics encompass things such as topics the author has talked about in the past, material possessions of note, or brands they prefer/dislike. In some embodiments, the information for the authors is managed by assigning a unique string to represent each attribute, to which a Boolean value is assigned and the attributes that are found to be true about an author are stored in the database.

Lock-Free Cache

In some embodiments, the author annotation system AD06-100 uses a multi-level cache in which a hashmap is used in a first level (e.g. level 1) of the cache database. In some embodiments, this cache is or shares any of the features of the cache described with reference to FIG. 8. Several threads perform concurrent read-write-delete operations on this cache. Hence along with the thread-safe behavior, speed of access is of utmost importance in the design of the system. A level 1 cache AD06-116 stores author-attribute information that is maintained by the author annotation system's AD06-100 data retrieval processes. The author-attribute information packets are inserted without any read/write locks, thus enabling extremely fast data retrieval necessary for processing the high volume of data packets in real-time. Further details of the technical implementation of the Lock-Free Cache are presented elsewhere in this document.

Queue

The queue behaves as a general queue with many producers and many consumers, where each one of the consumers has its own independent "virtual queue." The elements are effectively removed from each virtual queue after each de-queue operation. It is a high-throughput lock-less queue that is used predominantly for message passing between different author annotation system AD06-100 processes. The queues also act like buffers in situations where a particular consumer lags behind others in consuming a data packet. The queue is used for three different message channels:

Input Channel AD06-104—to transfer data packets from the receiver to the input packet handler AD06-106.

Missed channel AD06-108—to transfer unannotated packets to the missed queue handler AD06-110.

Output channel AD06-112—to transfer packets to the output queue handler AD06-114.

The details about the information transferred and the processes referred above are presented in the section titled "Data Retrieval."

Inter-Process Communication (IPC) Message Queues

IPC message queues AD06-118 are a system-provided functionality that enable message passing between processes on the same machine. IPC message queues AD06-118 provide a simple interface for the creation, management, message passing and the deletion of the queues. IPC message queues AD06-118 can be created in real-time with little overhead and the messages persist in the shared memory until consumed by another process. A key advantage of the IPC message queues AD06-118 lies in avoiding two critical failure scenarios: system backlog and the convoy effect. System backlog occurs during high data traffic events when all the data packets cannot be concurrently processed by the system due to processing power limitations. Data packets then start occupying buffer memory, which further slows down the system. In such a scenario, the IPC message queues AD06-118 serve as a safe temporary storage in the shared memory and the limited and valuable buffer space is available for the process execution. The convoy effect refers to the condition where the entire system processes data at the speed of the slowest thread. In the case of the author annotation system AD06-100, since several requests are made to the author annotation system AD16-100 each second, and there is sub-second latency in the request fulfillment, the asynchronous nature of the IPC message queue consumption ensures that no thread is waiting for any particular request to be fulfilled by the author attribute database and is instead available to process any reply as soon as it becomes available.

Data Retrieval

Upon the arrival of a data packet, the real-time annotation relies on timely retrieval of relevant author attribute information from the data storage components, described above. The data retrieval components process data packets that contain unstructured text and create request packets in accordance with a high-performance communication protocol that enables timely fulfillment of requests. The details of the protocol and processes involved are as follows:

Input Packet Handler

The input packet handler AD06-106 is a multithreaded process that is responsible for annotating packets for which the corresponding information is available in the level 1 cache AD06-116. When the information is unavailable, the input packet handler AD06-106 is responsible for queuing those packets in the missed channel AD06-108. The successfully annotated packets and the packets for which a valid author ID (e.g., source ID) cannot be obtained, are directly queued in the output channel AD06-112. The process concurrently routes the data packets to their correct destination for further processing.

Missed Queue Handler

The missed queue handler AD06-110 is a process that is responsible for managing the packets in the missed channel AD06-108. The process de-queues a batch of packets and requests, from the author-attribute database AD06-102, information about the batch of authors. Once a request is made, the entire batch of packets gets queued in a dynamically-generated IPC message queue with a unique ID. The process manages the number of IPC message queues AD06-118 created, the lifetime of the IPC messages queues and also statistics about each IPC message queue. This ensures that the shared memory of the server is used in accordance with predetermined limits for each process.

Reply Handler

The reply handler AD06-120 is a multithreaded process that is responsible for handling replies from the author attribute database that contain author attribute information that was requested for a batch of authors by the missed queue handler AD06-110. The reply handler AD06-120 updates the level 1 cache AD06-116 with the information and manages eviction of author packets on a pseudo-random basis to prevent the cache size from going out-of-bounds. The reply handler AD06-120 accesses the IPC message queue for which the request was fulfilled, annotates the packets inside the queue for which information was available and queues the annotated packets in the output channel AD06-112. The reply handler then cleans up system resources allotted to the data that was annotated and queued and ensures concurrent, asynchronous, annotation of author packets (e.g., several thousand each second).

Output Queue Handler

The output queue handler is a multithreaded process that de-queues packets from the output channel AD06-112 and reformats the de-queued packets such that all the relevant information is readily accessible by other DFS processes without the need for parsing (e.g., JSON parsing). The system concurrently processes thousands of data packets per second and publishes them downstream in a serialized format.

Data Management

To ensure low-latency, high data bandwidth and efficient load balancing among servers, the DFS makes use of several data management systems and protocols, as follows:

Author-Attribute Compression

The author-attribute database AD06-102 maintains numerous author attributes, where each attribute represents a unique piece of information about the author. The attribute information spans a whole spectrum of attributes and hence to succinctly represent and store the attributes, a compression technique is advantageous. Each author attribute is represented by a unique string that corresponds to an index in an array that represents a universal set of author attributes. The universal array can be represented by a bitvector, as each attribute can be represented as a Boolean, in regards to whether the particular author possesses a particular attribute. Hence, if certain attributes are associated with an author, the bits in the corresponding positions are set (e.g. to a logical "1") and the rest of the bits remain unset (e.g., as logical "0"). Since, out of the universal set of author attributes, most authors possess only a small subset of attributes, the bitvector can be compressed using a modified Run-Length Encoding scheme to significantly reduce the size of the author attribute packets stored in the caches and also reduce the message size during inter-process communication.

The compression scheme works by identifying a group of consecutively occurring bits and storing, in place of the group of consecutively occurring bits, a number (e.g., count) of the consecutively occurring bits. In this manner, sparse bitvectors can be represented in a significantly compressed form. Conventional run-length encoding schemes store a value followed by a count of consecutive occurrences of that value. For example, in an image processing content, a hypothetical scan line, with B representing a black pixel and W representing a white pixel, might read as follows:

WWWWWWWWWWWWBWWWWWWWWW
WWWBBBWWWWWW
WWWWWWWWWWWWWWWBWWW
WWWWWWWWWW

With a conventional run-length encoding (RLE) scheme, the above hypothetical scan line can be represented as follows:

12W1B12W3B24W1B14W

This can be interpreted as a sequence of twelve Ws, one B, twelve Ws, three Bs, etc.

Figure 37:
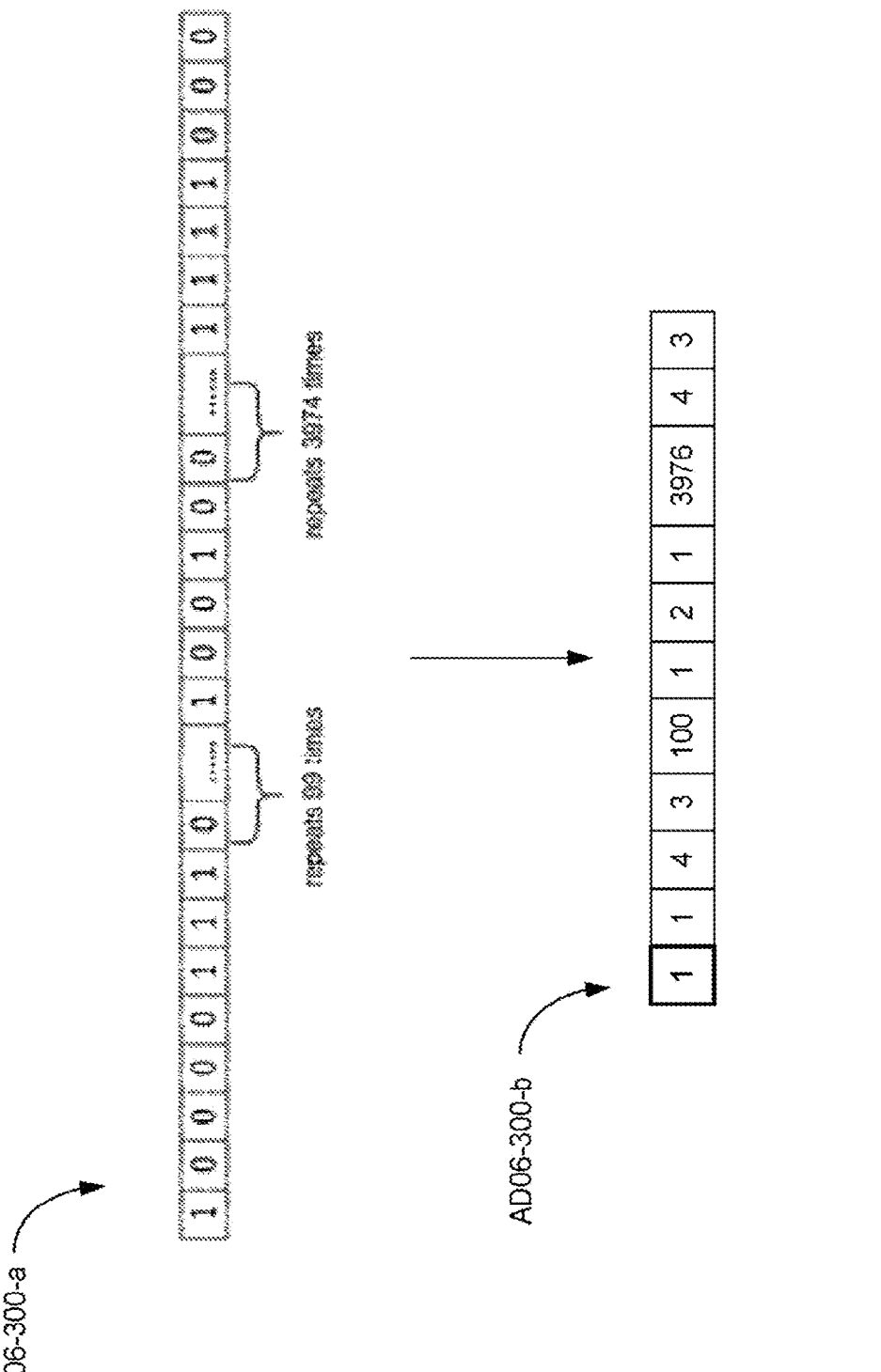
FIG. 37 illustrates a representation of an author attribute bitvector, in accordance with some embodiments.

Since attributes stored as Booleans, as described above, can have only one of two values, some embodiments store author attribute records by storing, as a value, only the first bit of the bitvector (e.g., the author attribute record takes form [value, count1, count2, count3, . . . countN]). The remainder of the bitvector stores only the number of consecutive bits of the same value. This further reduces the size of the compressed representation. For example, FIG. 37 illustrates an author attribute bitvector 300-a that can be represented in a compressed format 300-b, in accordance with some embodiments. In the example shown in FIG. 37, the compressed representation occupies 20 bytes as compared to 512 bytes for the uncompressed bitvector. In some embodiments, the same compression technique is applied to store author locations, where each zip code associated with the author corresponds to an index in the global bitvector of all US zip codes.

Another feature of these compressed representations is that all possible bitvector operations can be conducted on the compressed format in nearly the same time as for the uncompressed version. Some operations, such as the bitwise NOT operation, are much faster using the compressed format than on an uncompressed bitvector. For example, the bitwise NOT operation requires flipping only the first bit of the compressed vector. The bitwise AND operation involves counting the consecutive occurrences of bits that result in 0 (since 0 is the most likely outcome of a bitwise AND operation) after the bitwise AND, and adding them to the resulting compressed result vector when the value changes.

Using De Morgan's laws, all other bitwise operations can be done using a combination of NOT and operations. For example:

A OR B=NOT[NOT(A AND A) AND NOT(B AND B)]

Unprimed In-Memory Cache

As noted above, the author annotation system AD06-100 uses a hashmap as its first level (level 1) cache AD06-116 database. This cache stores author-attribute data obtained from author-attribute database AD06-102 and, unlike most other data lookup caches, this cache is not primed at startup. This is due to the following reasons:

1) The data filtering system functions in real-time and the time spent on priming the cache with several millions of author records is an impediment towards the goal of real-time data processing.
2) Due to the vast size of the author-attribute database AD06-102, only the most relevant authors (representing a small fraction of the entire author-attribute database AD06-102) need to be present in the level 1 cache AD06-116. This means that the authors who were most recently active should be present in the level 1 cache AD06-116 as it is highly likely that they are ones who would author another data packet in the near future. If priming were done, (e.g., using Elasticsearch for storage) somewhere around 35-40 minutes would be required to retrieve around 54 million records. Such a large cache priming time is not only unacceptable, it is also unnecessary as a cache hit-rate of 80% can be obtained with 50% of the cache size of a reasonably sized cache (around 27 million records). Hence, warming up the cache would lead to higher latency and maintenance of data duplication databases, while real-time queries for specific authors provide much lower request-reply latency when requests are pipelined. Also, more relevant author information is stored in level 1 cache AD06-116 using the no-priming policy.

Pseudo-Random Cache Eviction

As detailed in the above section, the level 1 cache AD06-116 has a limited size and needs to constantly evict author-attribute records to accommodate new records. There have been several studies on the best cache eviction strategy and several simple and complex algorithms have been implemented, such as random eviction, Least Recently Used (LRU) or First In First Out (FIFO). The general consensus among the technical community is that there is no perfect eviction strategy that works for all caches and that the best strategy for cache eviction is application dependent.

Hence, the author annotation system AD06-100 implements a pseudo-random cache eviction strategy for the level 1 cache AD06-116. The strategy uses a hashing function (e.g., Google XXHash) to generate a 64-bit integer key from the author ID and then takes the residual of the key with 1000 to obtain the last 3 digits of the key. The residual is then used to store the author ID to a vector of author IDs (unique to each thread) at the position corresponding to the residual value. For example, if the author ID of value "TWITTER: Joe_Smith" gives a residual of 386, then "TWITTER:Joe_Smith" is stored in the 386th index of the author ID vector. When a thread needs to evict an entry to make space for a new author-attribute record, it picks an author ID at random from its vector and tries to delete it from the level 1 cache AD06-116. If that record is no longer present then it picks another author ID at random and keeps trying until it is able to evict a record from the level 1 cache AD06-116. The corresponding indices in the thread-specific vector are marked empty and any new entries are made to the vector when the residual from an author ID is equal to that of an empty index.

Using this pseudo-random eviction procedure, the eviction distribution is fairly uniform with a standard deviation of only 0.3% of the mean. The advantage of the pseudo-random nature of the policy is that author-attribute records remain in the level 1 cache AD06-116 for a reasonable duration and even if frequently accessed, are eventually evicted so that the updated author-attribute information can be added to the level 1 cache AD06-116 the next time a packet from that author is encountered. Thus, eventual consistency is the resulting model for guaranteeing high availability from level 1 cache AD06-116. At any given moment, several thousands of records are updated in author-attribute database AD06-102, and it is extremely processor intensive to update all corresponding records in the level 1 cache AD06-116, hence a strong eventual consistency is not an appropriate model.

Figure 36:
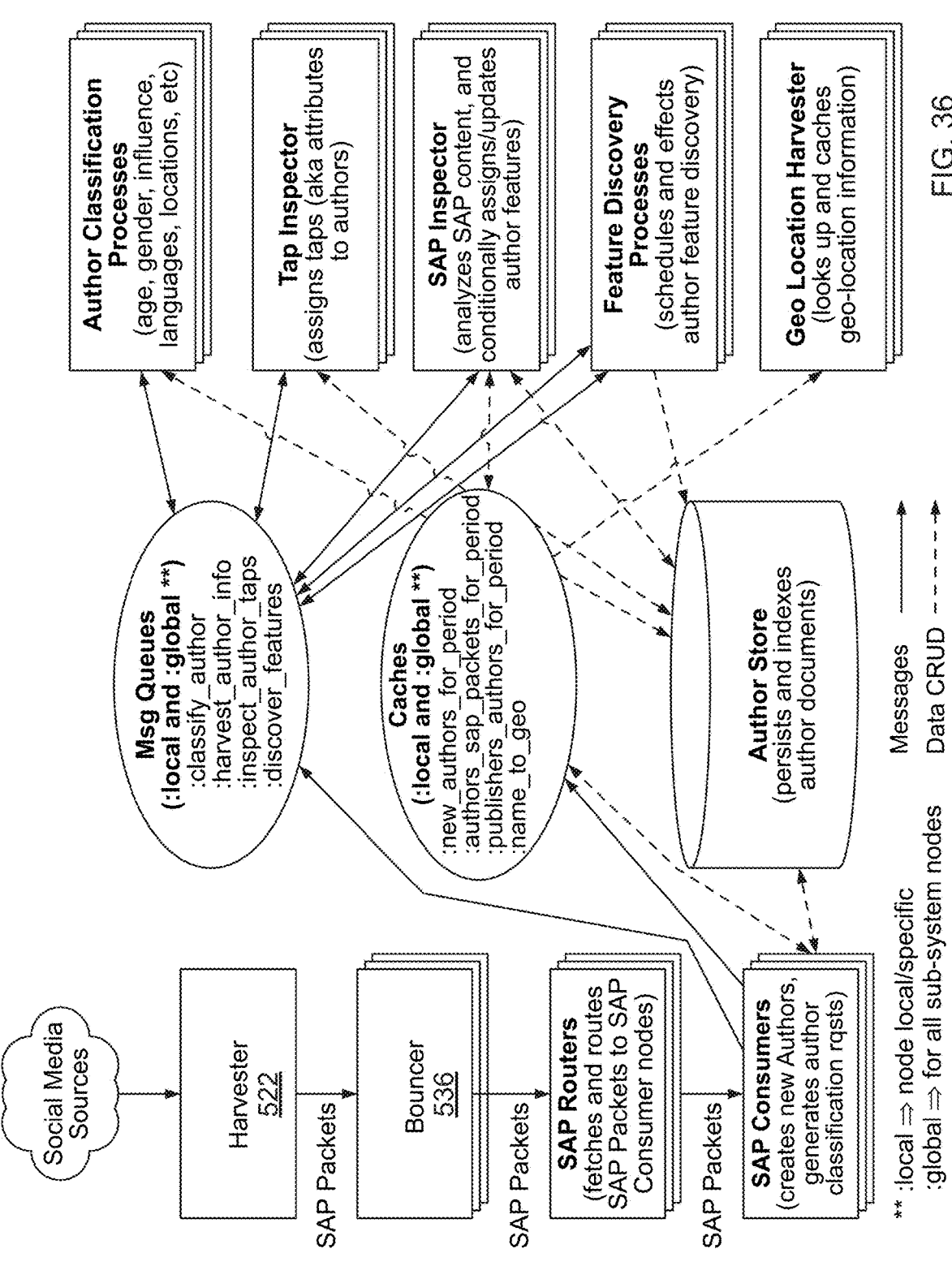
FIG. 36 illustrates a schematic overview of an author-attribute database, in accordance with some embodiments.

The schematic layout of the author annotation system AD06-100 with key processes and data storage indicated is shown in FIG. 36.

Figure 38A:
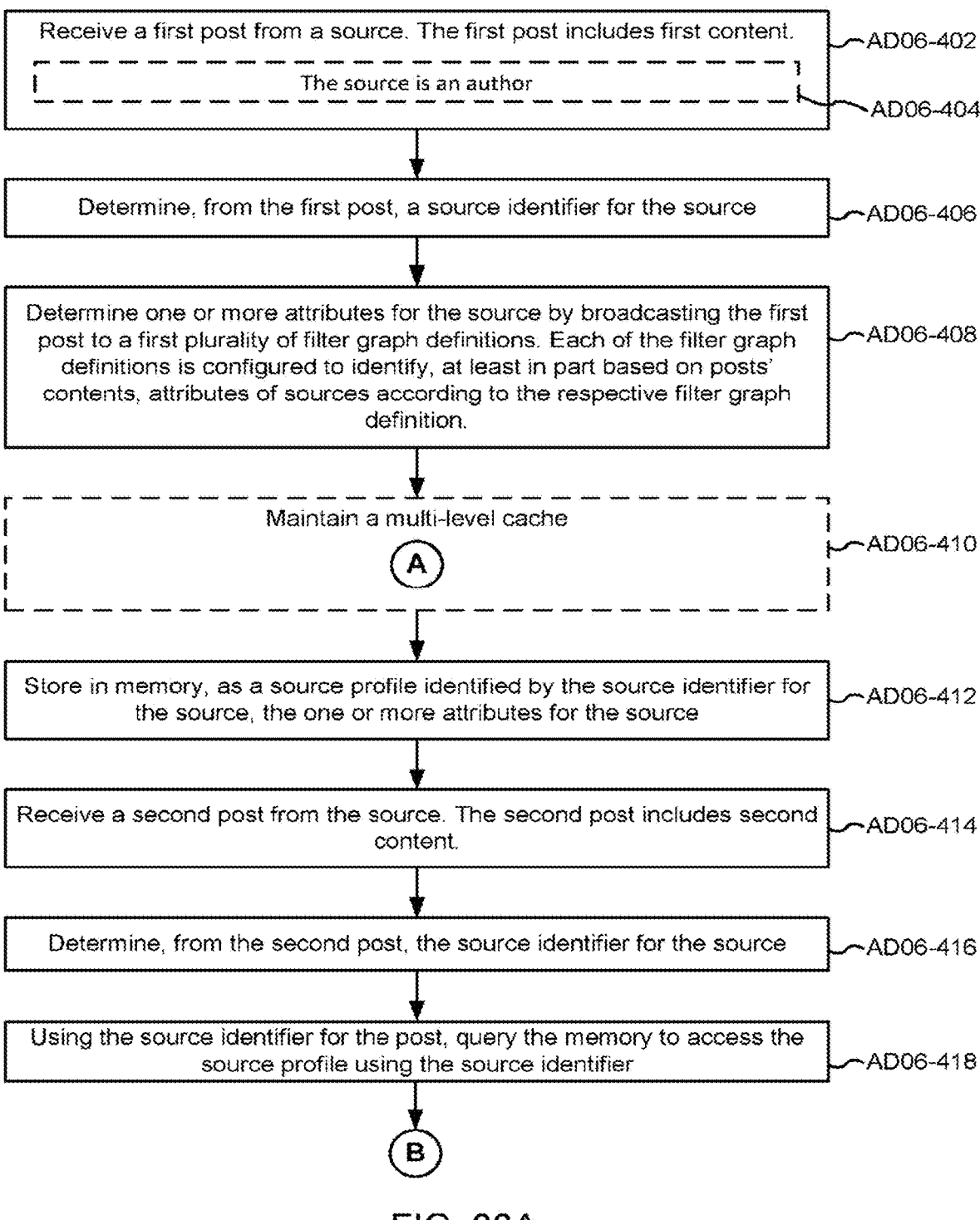
Figure 39A:
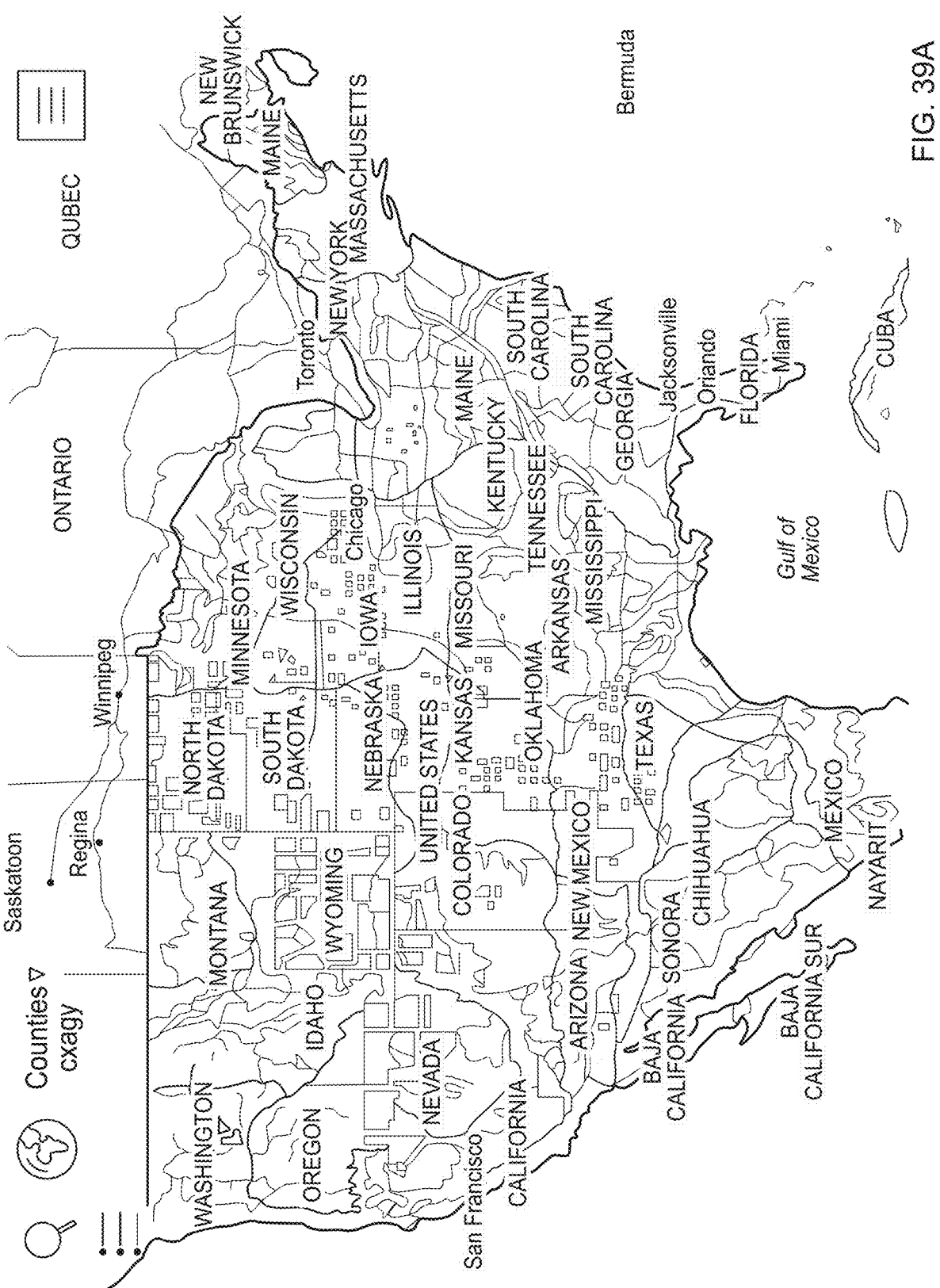
FIG. 39A is an example of a visual representation of the user interface of the system according to one embodiment of the invention.
Figure 39B:
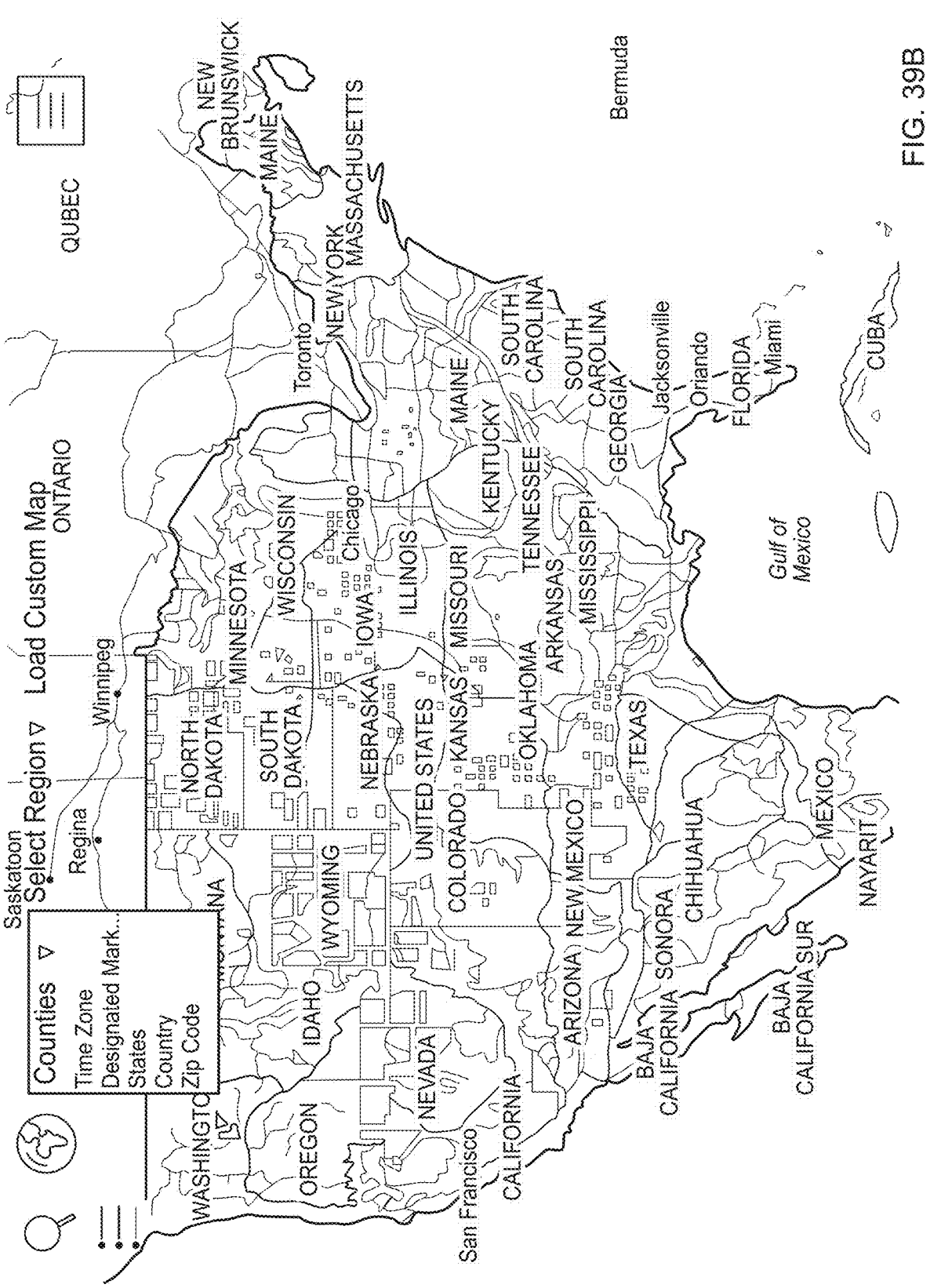
FIG. 39B is an example of a visual representation of the user interface of the system according to one embodiment of the invention.
Figure 39C:
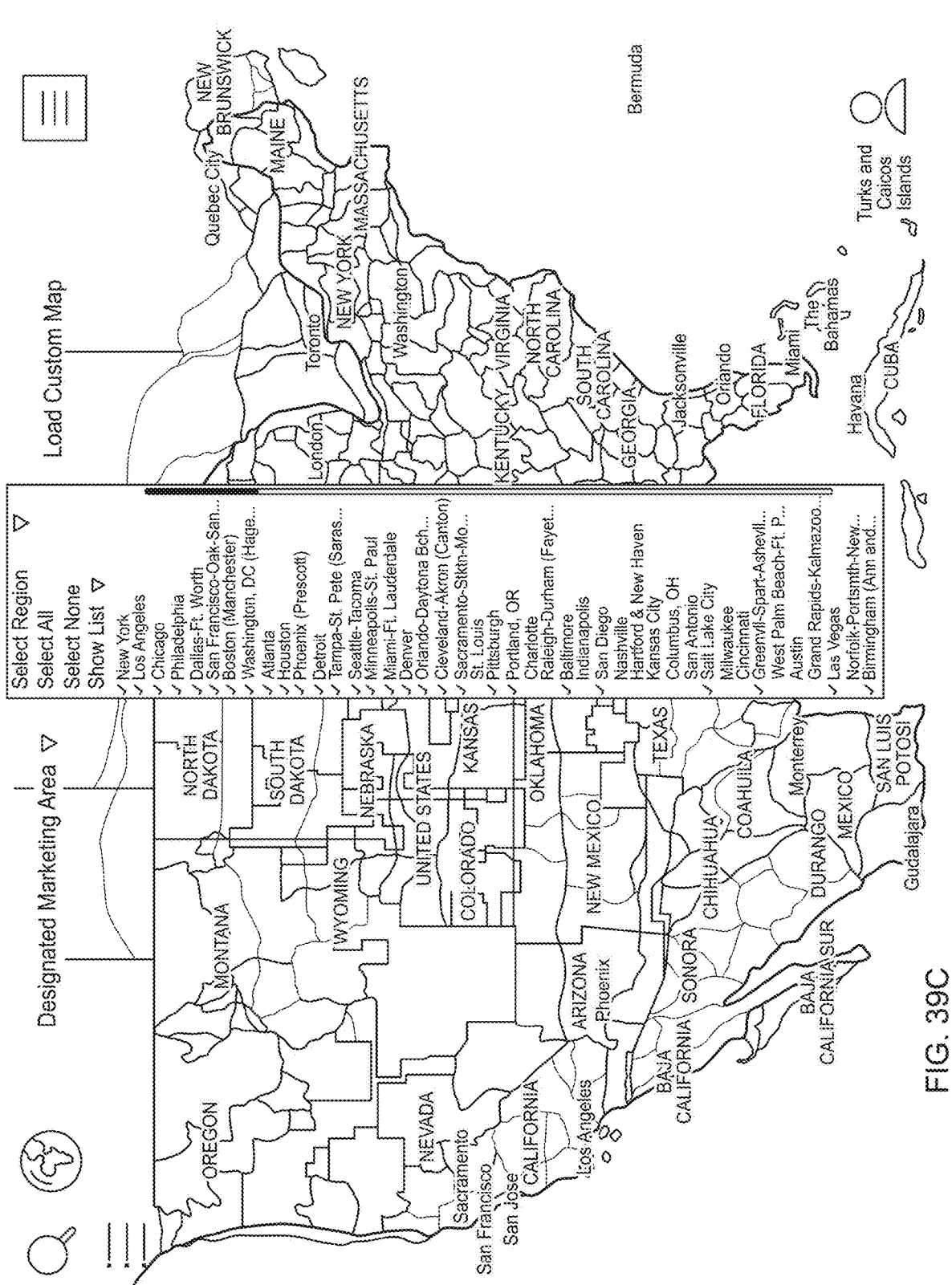
FIG. 39C is an example of a visual representation of the user interface of the system according to one embodiment of the invention.
Figure 39D:
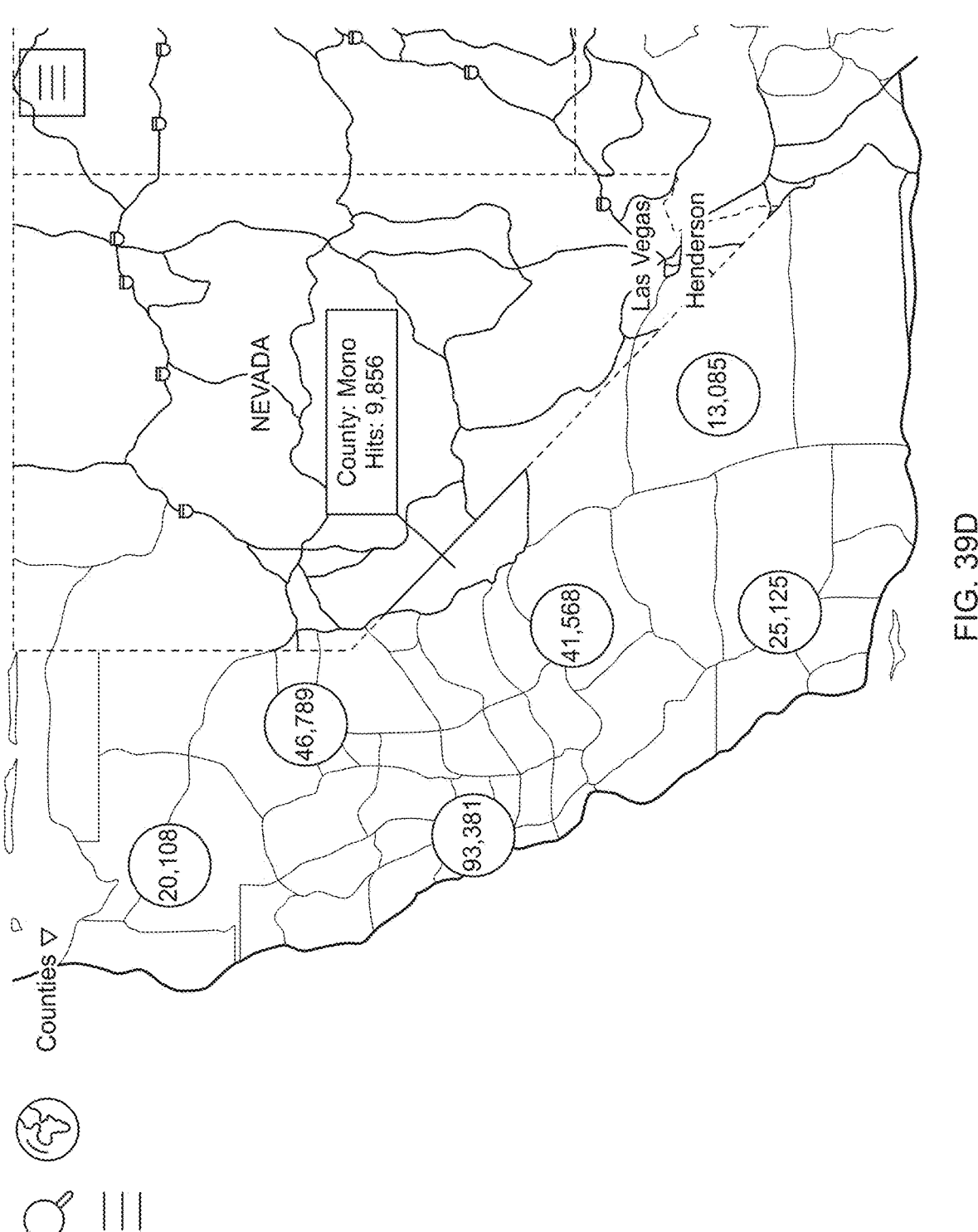
FIG. 39D is an example of a visual representation of the user interface of the system according to one embodiment of the invention.
Figure 39E:
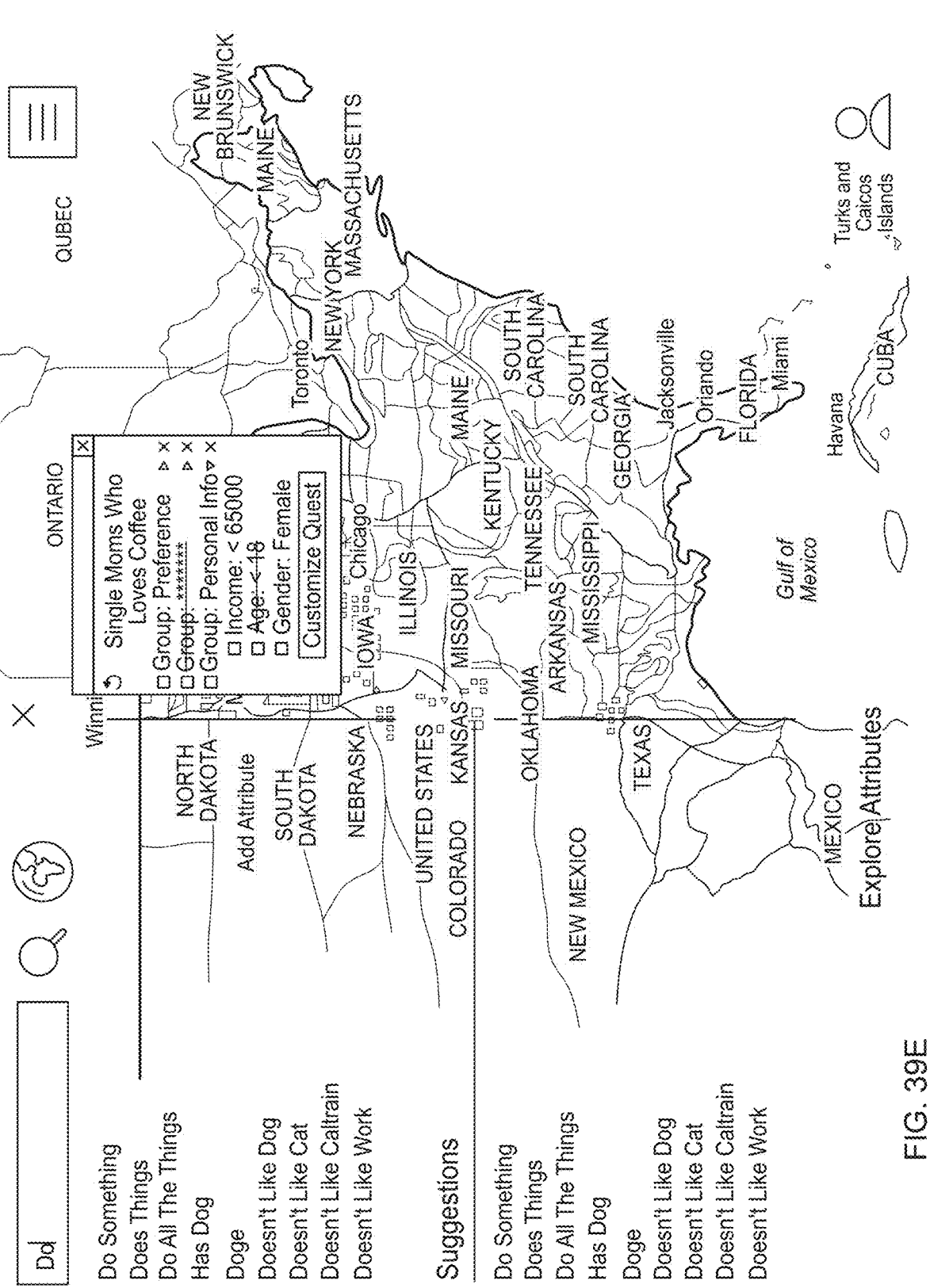
FIG. 39E is an example of a visual representation of the user interface of the system according to one embodiment of the invention.
Figure 39F:
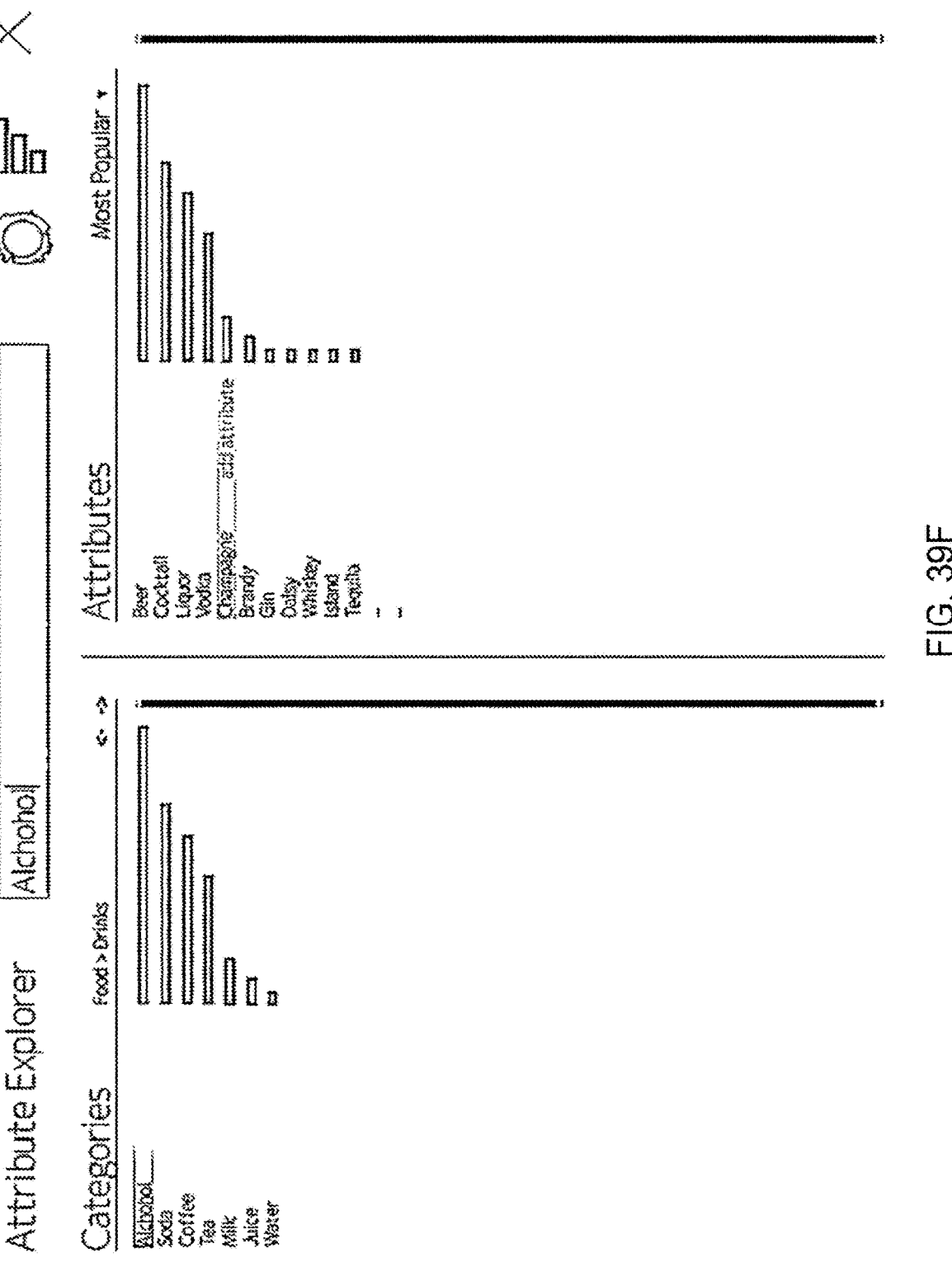
FIG. 39F is an example of a visual representation of the user interface of the system according to one embodiment of the invention.
Figure 39G:
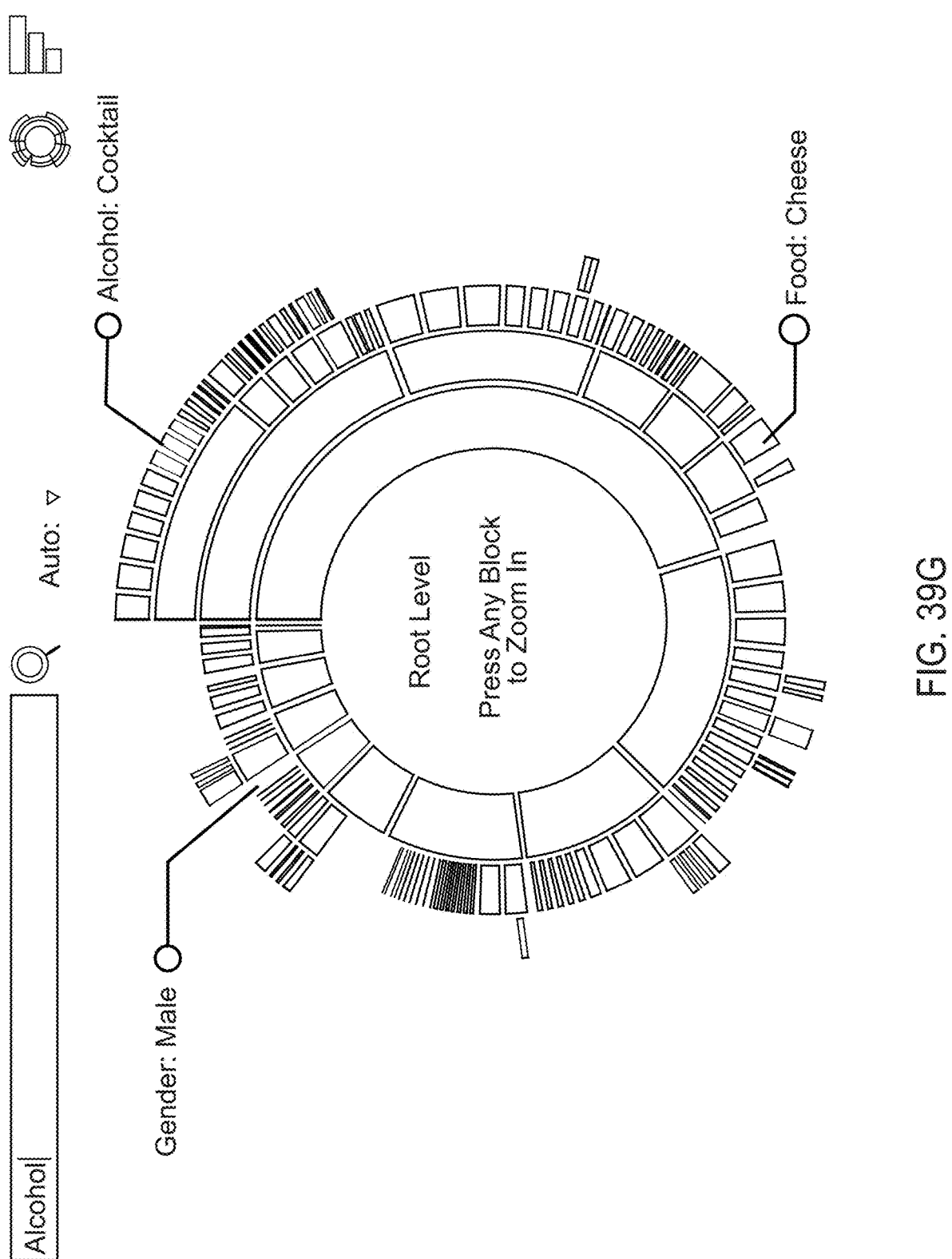
FIG. 39G is an example of a visual representation of the user interface of the system according to one embodiment of the invention.
Figure 39H:
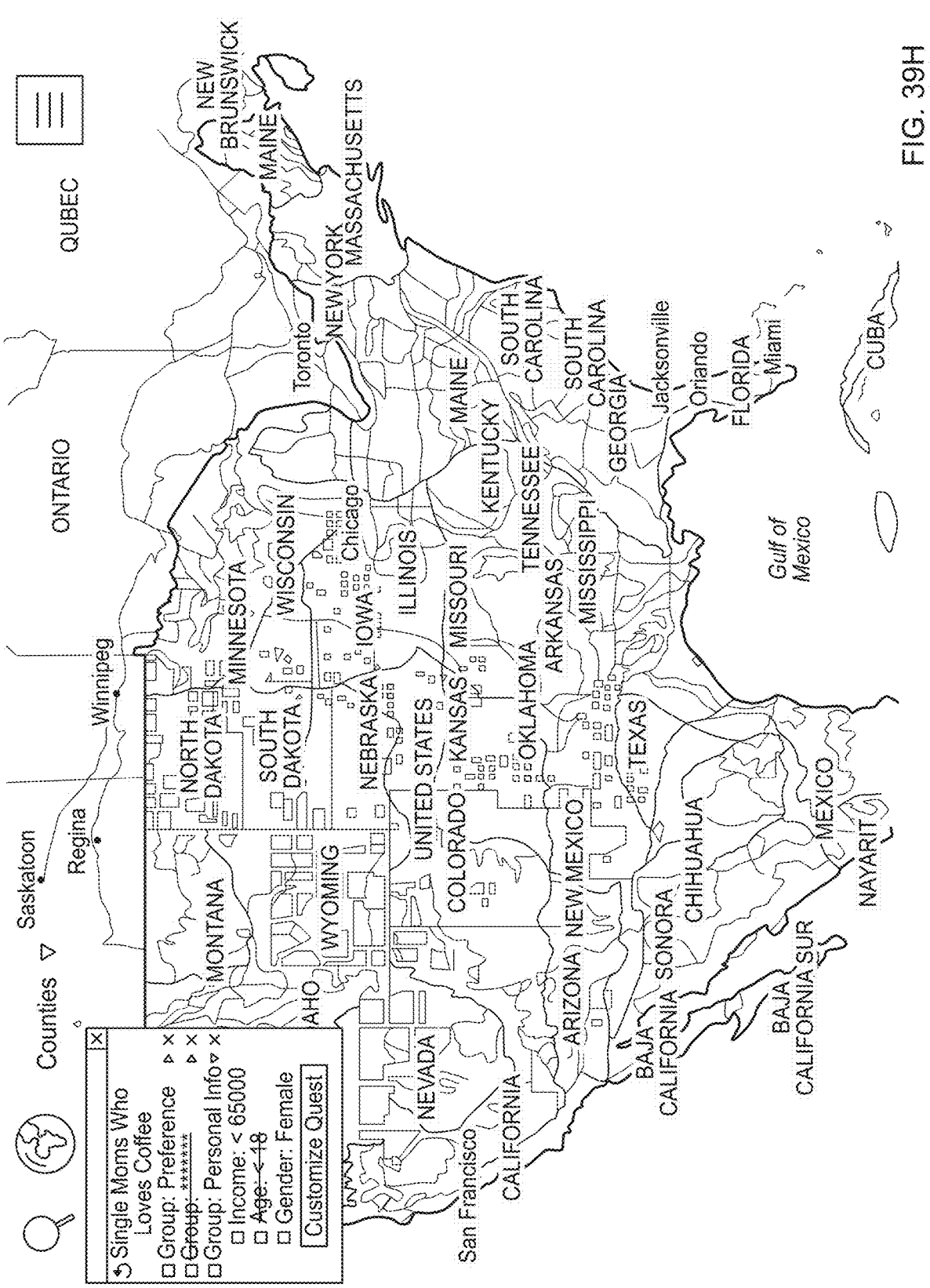
FIG. 39H is an example of a visual representation of the user interface of the system according to one embodiment of the invention.
Figure 39I:
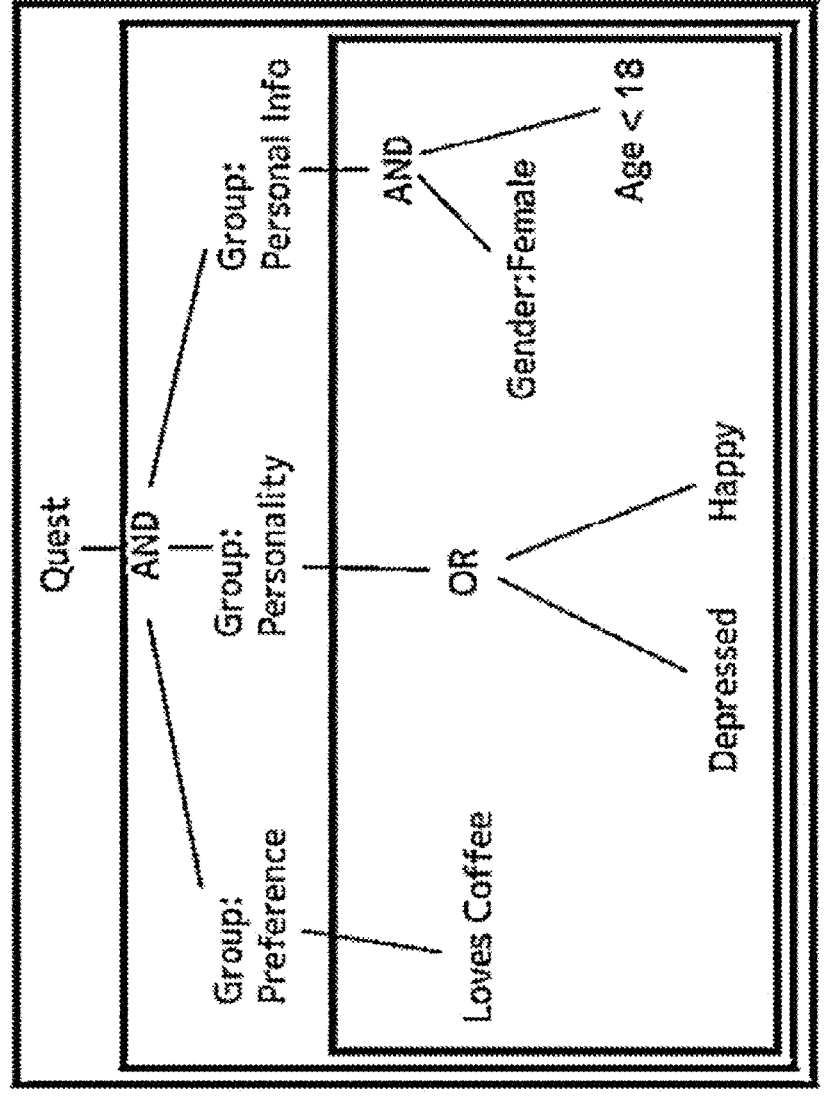
FIG. 39I is an example of a diagram representation of a quest according to one embodiment of the invention.
Figure 39J:
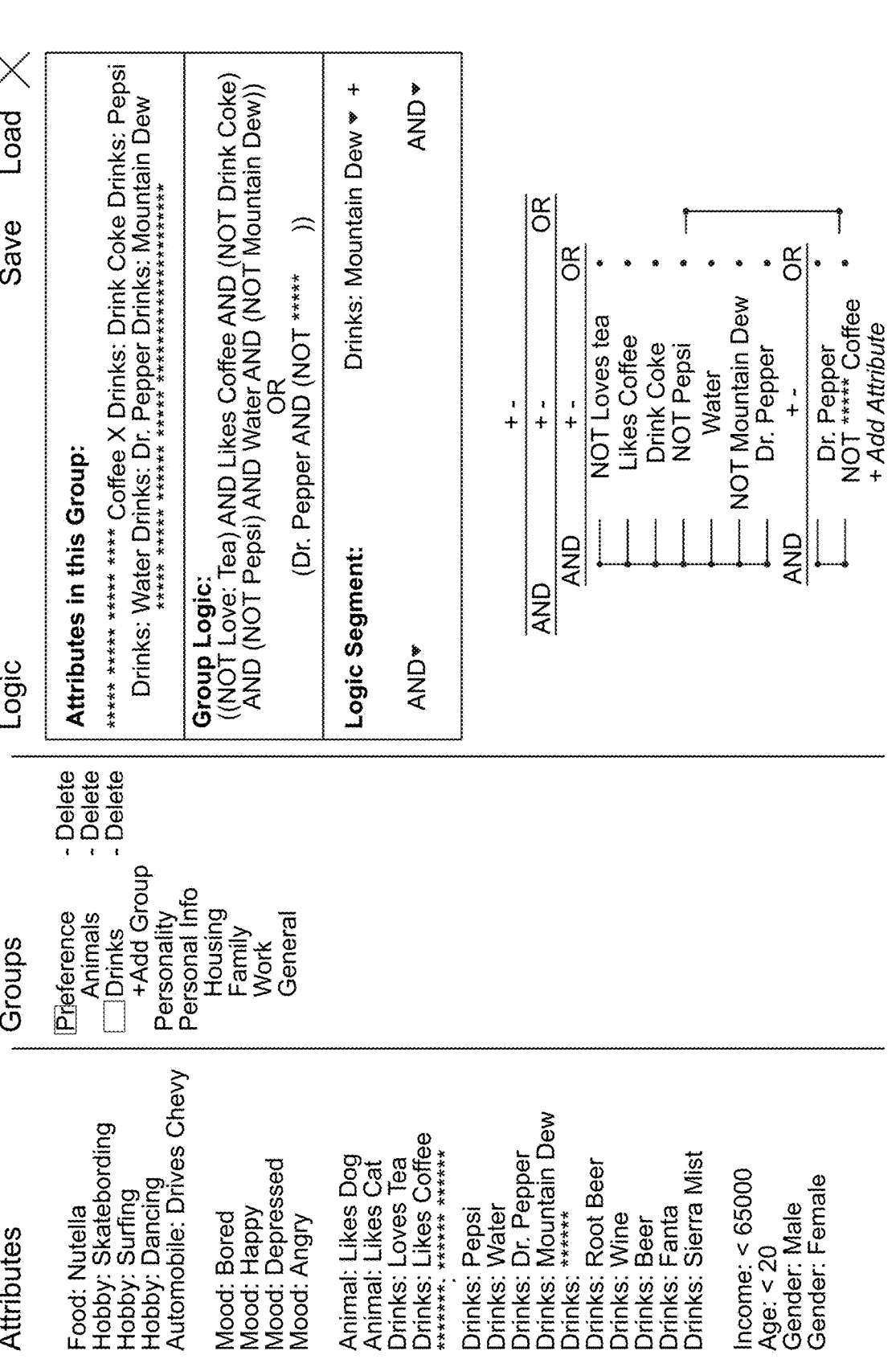
FIG. 39J is an example of a visual representation of the user interface of the system according to one embodiment of the invention.
Figure 39K:
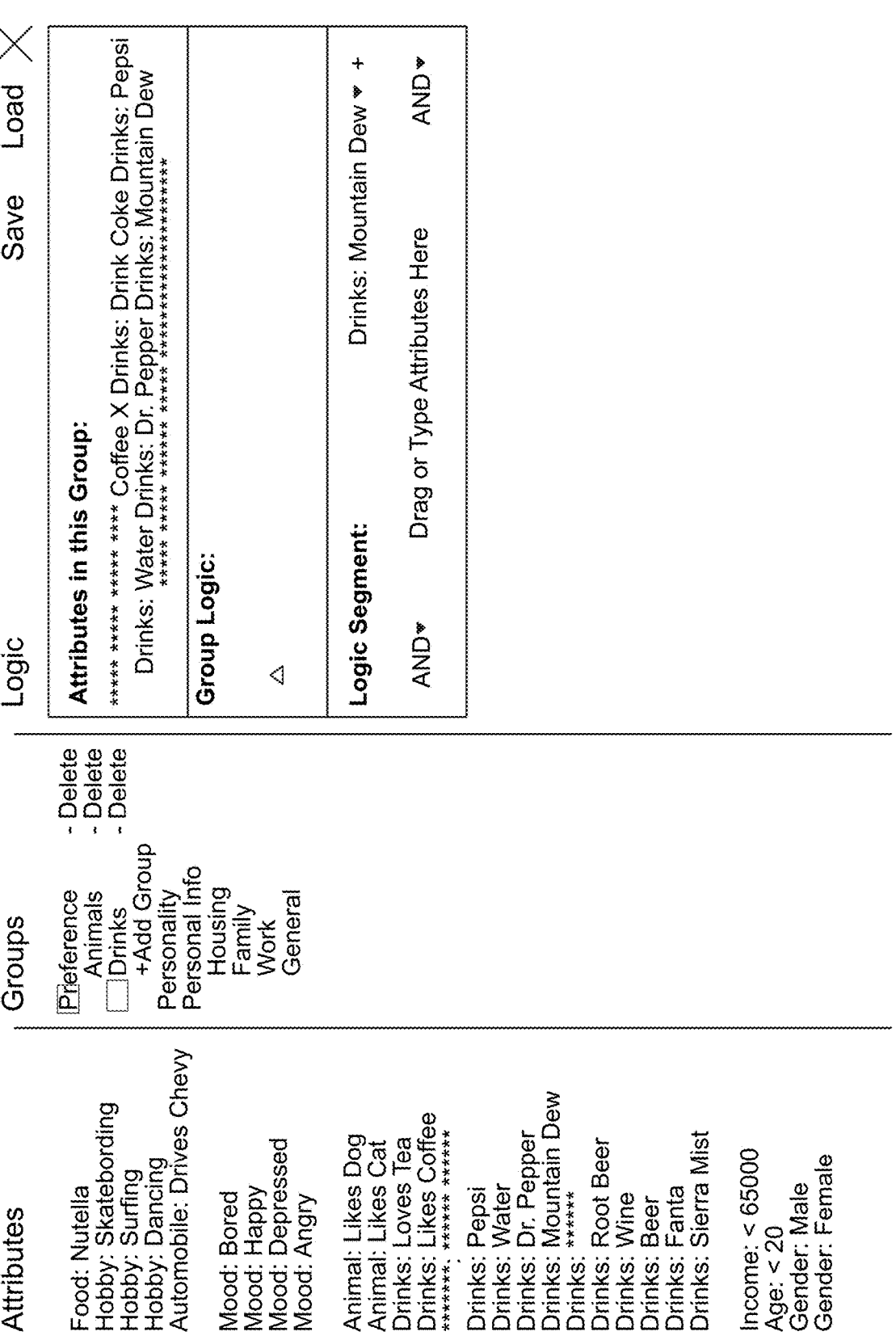
FIG. 39K is an example of a visual representation of the user interface of the system according to one embodiment of the invention.
Figure 39M:
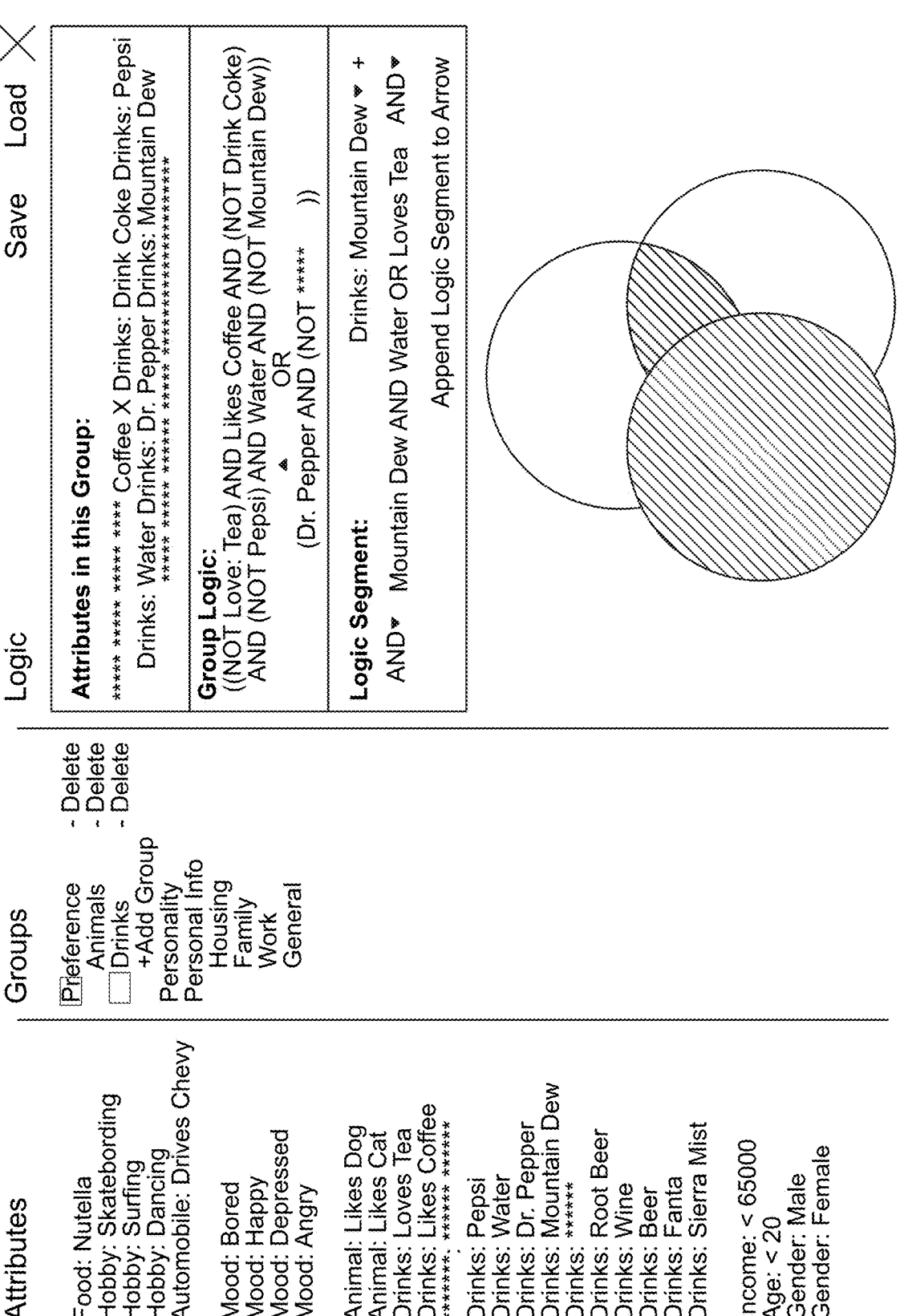
FIG. 39M is an example of a visual representation of the user interface of the system according to one embodiment of the invention.
Figure 39N:
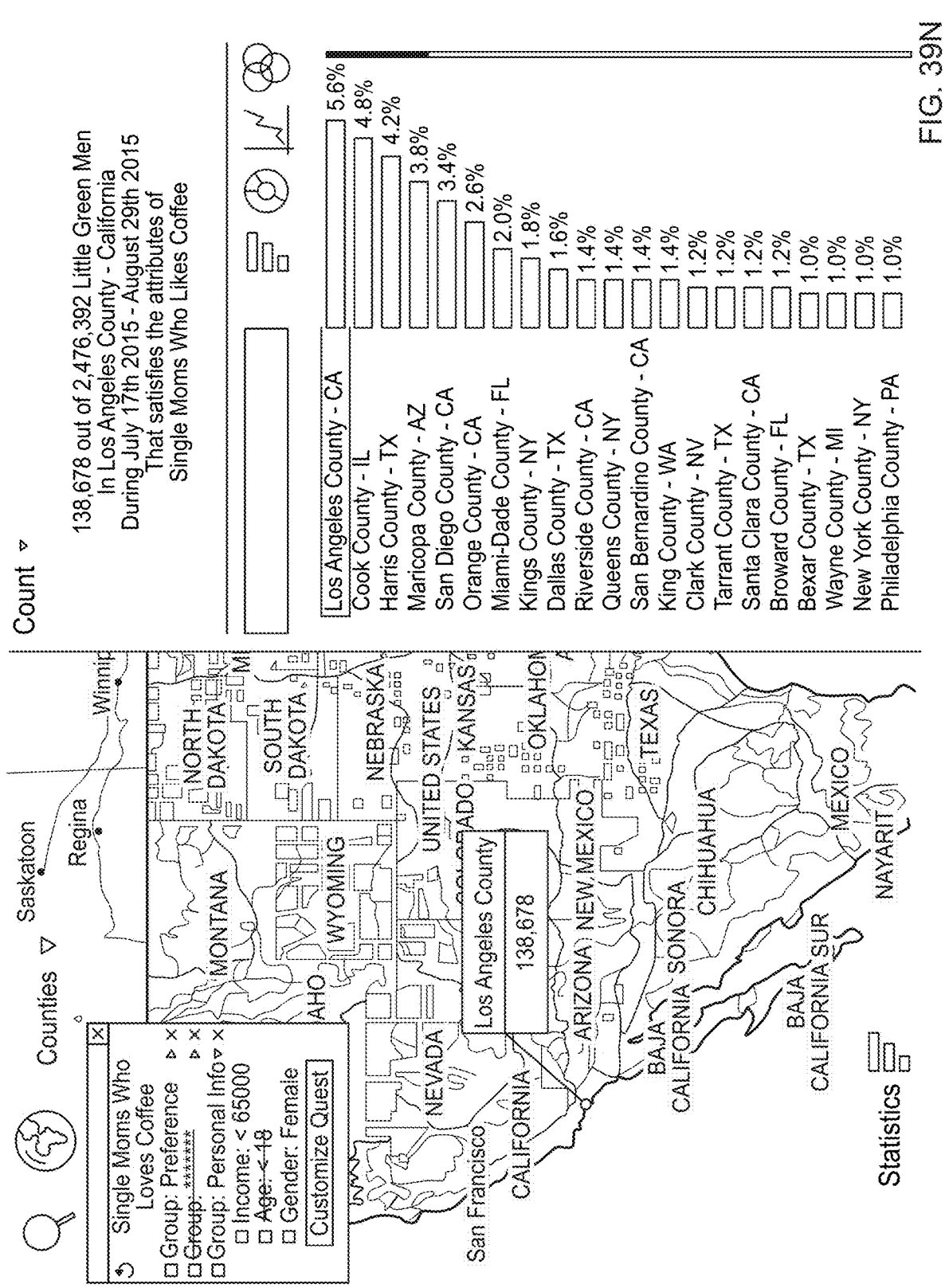
FIG. 39N is an example of a visual representation of the user interface of the system according to one embodiment of the invention.
Figure 39O:
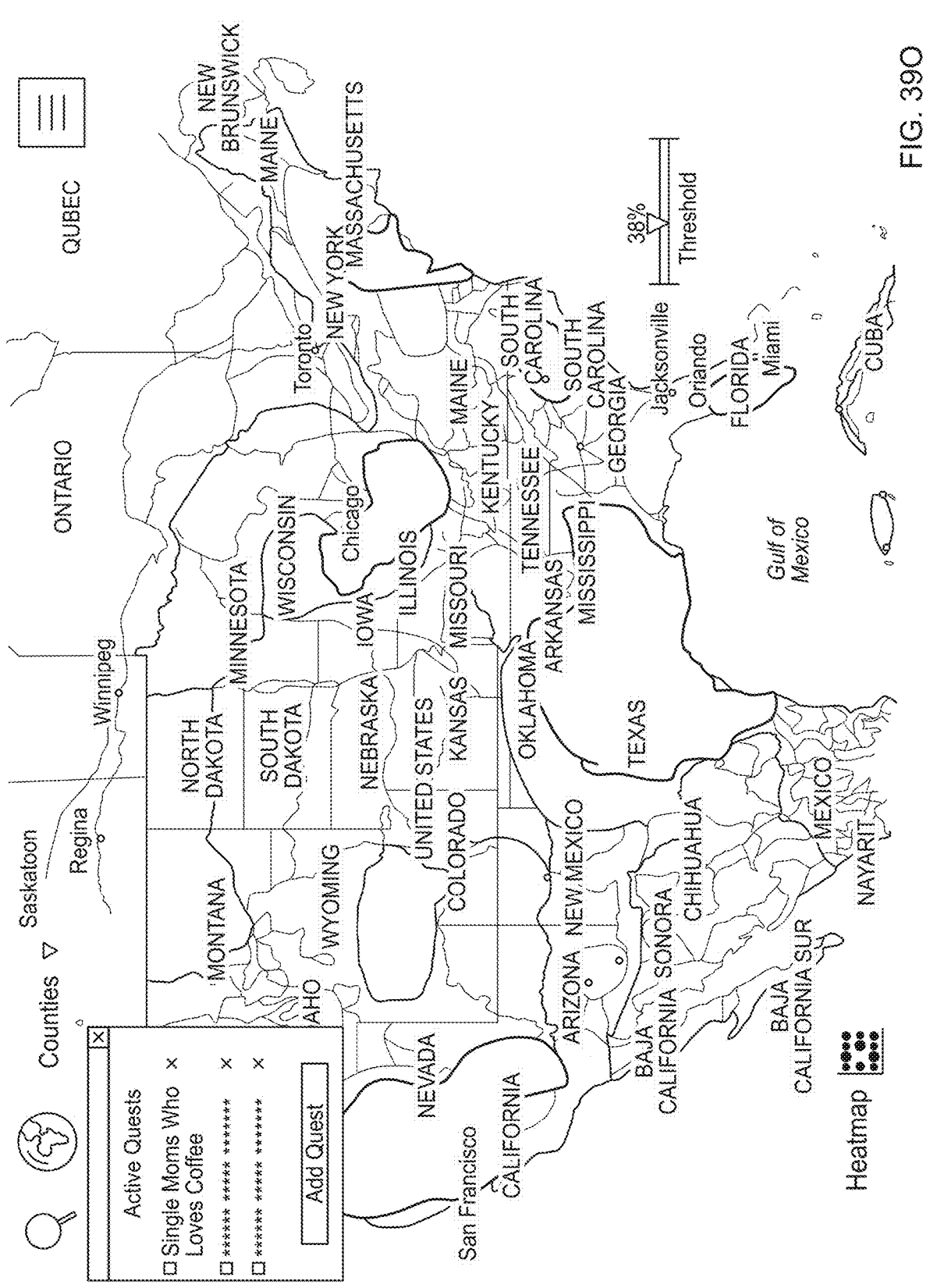
FIG. 39O is an example of a visual representation of the user interface of the system according to one embodiment of the invention.

FIG. 38A through 38C illustrate a method AD06-400 of annotating a post received from the internet with information about the post's source, e.g., for use in a system for real-time extraction of high-value information from data streams, in accordance with some embodiments.

The method AD06-400 is performed at a data filtering system (DFS) (e.g., computer system 520, FIGS. 5A-5B, or the Figures labelled AD18) that includes one or more computers (e.g., servers) having a plurality of processors and memory storing programs for execution by the processors. In some implementations, the method AD06-400 is a continuous monitoring process that is performed without user intervention.

The DFS receives (AD06-402) a first post from a source. The first post includes first content. In some embodiments, the source is (AD06-404) an author of the first post. In other embodiments, the source is a publisher of the first post. In some embodiments, the first content is user-entered content. In some embodiments, the first content includes text. In some embodiments, the first post is a social media post (e.g., a FACEBOOK post, Tweet, etc.) More generally, the first post can be a packet received from any of the data sources 502 described with reference to FIGS. 5A-5B and elsewhere in this document.

In some embodiments, operations AD06-406, AD06-408, and AD06-412, described below, are performed in real-time for the first post. In some embodiments, real-time means subject to one or more real-time constraints (e.g., a "deadline" for all of the operations AD06-406, AD06-408, and AD06-412 to be completed, such as seconds or milliseconds).

The DFS determines (AD06-406), from the first post, a source identifier for the source. In some embodiments, the source identifier identifies the author as well as the publisher (e.g., social media platform) of the source. For example, a post received from a TWITTER user john_smith (e.g., using an API provided by TWITTER) will have a source identifier TWITTER:john_smith. In some embodiments, the source identifier is hashed (e.g. using Google's XXHash to create a 64-bit integer).

The DFS determines (AD06-408) one or more attributes for the source by broadcasting the first post to a first plurality of filter graph definitions. Each of the filter graph definitions is configured to identify, at least in part based on posts' contents, attributes of sources according to the respective filter graph definition. Examples of possible attributes are "student," "diabetic," and "carries pepper spray." In some embodiments, the attributes include one or more individual attributes (e.g., attributes about the individual, such as gender, ethnicity, languages spoken, marital status, or economic condition) and one or more preference attributes (e.g., attributes characterizing the individual's preferences, such as topics the author has talked about in the past, material possessions of note, or brands they prefer/dislike).

In some embodiments, one or more of the attributes are user-defined (e.g., defined by an administrator). For example, in some embodiments, the administrator can create an attribute mission using a graphical user interface (GUI) front end, as described elsewhere in this document. In some embodiments, one or more of the attributes are automatically generated and labeled using the topic discovery systems described elsewhere in this document. In that manner, the DFS identifies attributes (e.g., automatically creates filters for the one or more attributes), which the administrator's may not have even known existed. These attributes may be particularly relevant to certain companies. For example, the DFS automatically learns about an attribute, which can then be correlated with particular brands that people having that attribute prefer.

In some embodiments, the DFS identifies a plurality of posts as having high-value information relevant to a subject, each post in the plurality of posts having a source. For example, the DFS identifies, for Company A, a plurality of post for which people are talking positively about Company A. Using the plurality of posts, the DFS automatically identifies one or more attributes of the sources of those posts (e.g., using automated topic discovery and labelling). For example, the automatic topic discovery will generate an attribute from posts made by people talking positively about Company A's products and label the attribute "Cat Lovers." The DFS then identifies, from a data stream (e.g., a stream of social media post), other sources who are "Cat Lovers," regardless of whether these new sources have mentioned, or even heard of, Company A. The DFS then alerts Company A of the newly-identified attribute and the additional sources having that attribute, e.g., so that Company A can direct their marketing efforts to the sources having that attribute.

Method AD06-400 thus replaces, in some embodiments, in a real-time and in an on-going manner, existing methods for identifying which people are interested in what. From a marketing standpoint, these existing methods included focus-groups and surveys, which are time-consuming, error-prone, and likely to be quickly outdated.

Method AD06-400 is also useful far outside the marketing context. For example, method AD06-400 can be used to determine previously-unknown attributes of people who are likely to become radicalized or violent (e.g., these previously-unknown attributes may be a combination of known or existing attributes). Thus, method AD06-400 can be used to alert authorities about dangerous individuals before a terrorist attack or mass shooting occurs. Since certain operations of method AD06-400 are done without human intervention, method AD06-400 does not rely on friends of the person to alert authorities. In addition, in some circumstances, AD06-400 may discover attributes which are not overtly radical or violent but are nonetheless indicative of radicalization or violence. Because of human's subjective expectations for what makes an individual radical or violent, even experts are unlikely to realize these correlations.

In some embodiments, the DFS maintains (AD06-410) a multi-level cache. In some embodiments, the multi-level cache is a lockless cache. In some embodiments, the multi-level cache is unprimed. Further details regarding maintenance of the multi-level cache are provided with reference to operations AD06-426 through AD06-434, described below.

The DFS stores (AD06-412) in memory (e.g., the multi-level cache), as a source profile identified by the source identifier for the source, the one or more attributes for the source. For example, as described above, one or more digits of a hashed version of the source identifier are used as an index for the source profile.

In some embodiments, the source profile includes data (e.g., represented as a bitvector) representing a plurality of attributes. Each datum (e.g. each bit) represents a respective attribute of the plurality of attributes. In some embodiments, the source profile is a universal array of source attributes, wherein the universal array of source attributes stores information for each attribute in a set of attributes that is independent of the source. For example, the set of attributes includes all of the attributes used by the DFS. In some embodiments, the set of attributes includes attributes within a category. For example, the set of attributes that is independent of the sources is a set of ZIP codes. In some embodiments, the universal array of source attributes is stored as a run-length-encoded bitvector. Thus, the source profile is compressed to use less memory as compared to uncompressed data storage. Run-length-encoded bitvectors are described above with reference to FIG. 37.

The DFS receives (AD06-414) a second post from the source. The second post includes second content. In some embodiments, the second content is user-generated content. In some embodiments, the source is the author and the second post is received from the same social media platform as the first post. In some embodiments, the second post also includes metadata.

In some embodiments, operations AD06-416 through AD06-424, described below, are performed in real-time for the second post.

The DFS determines (AD06-416), from the second post, the source identifier for the source (i.e., the same source identifier as the first post)

Using the source identifier for the post, the DFS queries (AD06-418) the memory to access the source profile using the source identifier. In some embodiments, querying the memory includes querying a first level (e.g., level 1 cache (L1) AD06-116) of the multi-level cache. The operations regarding L1 cache-hits and L1 cache misses are described above with reference to FIG. 35.

The DFS correlates (AD06-420) the second post with attributes of the source stored in the source profile to produce a correlated second post, including the one or more attributes determined from the first post. In some embodiments, correlating the second post with attributes of the source includes appending (AD06-422) the source profile to the second post.

The DFS broadcasts (AD06-424) the correlated second post to a second plurality of filter graph definitions. Each of the filter graph definitions in the second plurality of filter graph definitions is configured to identify posts with high value information according to the respective filter graph definition. The posts are identified at least in part based on both the attributes of the source and the content of the second post. For example, the DFS broadcasts the correlated posts to Bouncer 536, and filters the post as described with reference to Bouncer 536, FIGS. 5A-5B.

Operations AD06-426 through AD06-434 describe details of maintenance of the multi-level cache, in accordance with some embodiments.

In some embodiments, upon occurrence of predefined eviction criteria, the DFS evicts (AD06-426), from a first level of the multi-level cache, one or more source profiles corresponding to respective sources. In some embodiments, upon occurrence of the predefined eviction criteria, the DFS selects one or more source profiles randomly or pseudo-randomly for eviction. For example, in some embodiments, the DFS hashes the source identifier to determine an index for the source profile (e.g., by taking the last three digits of the hashed source identifier). When the predefined eviction criteria are met, the DFS selects, at random, an index to evict. In accordance with a determination that a source profile corresponds to the selected index, the DFS evicts the source profile corresponding to the selected index. In accordance with a determination that there is no source profile that corresponds to the selected index, the DFS selects another index and repeats the process until the necessary number of source profiles are evicted (e.g., one or more source profiles are evicted).

In some embodiments, upon eviction from the first level of the multi-level cache, the DFS updates (AD06-428) the attributes stored in the evicted source profiles. In some embodiments, the DFS forgoes updating source profiles in the first level of the multi-level cache, as doing so would require too much processing power and introduce too much latency. Thus, pseudo-random eviction means that even frequently-used source profiles will, from time-to-time, be evicted so that their attributes can be updated (e.g., leading to an eventual consistency model). This cache management approach thus addresses the trilemma between the need for fast access to frequently-used source profiles, the limits on the processing power, and the need to update all frequently-used source profiles. Thus, method AD06-400 solves this technical problem by balancing these needs, which allows the computer to process an incoming stream of data more quickly than conventional systems.

In some embodiments, updating the attributes stored in the evicted source profiles includes, for a respective evicted source profile, updating (AD06-430) the respective evicted source profile with information obtained from other posts received from the source corresponding to the respective evicted source profile during the time that the respective evicted source profile was in the first level of the multi-level cache. For example, the DFS updates the source profile with attributes determined as describe with reference to operation AD06-408. In some embodiments, after an attribute is determined as described with reference to operation AD06-408, the DFS determines if the source profile is in the first level of the multi-level cache. When the source profile is in the first level of the multi-level cache, the DFS stores the new attribute(s) in a temporary data structure until the source profile is evicted from the first level of the multi-level cache, at which point the source profile is updated with the new attributes.

In some embodiments, updating the attributes stored in the evicted source profiles includes, for a respective evicted source profile, determining (AD06-432) that a respective attribute stored in the respective evicted source profile is stale and removing (AD06-434) the respective attribute from the respective evicted source profile. In some embodiments, the determination is performed on a schedule (e.g., once a day, once a month, etc.) In some embodiments, the schedule is specific to the attribute and defined by an administrator (e.g., an attribute for "currently shopping for shoes" will go stale after a week, whereas an attribute for "currently shopping for a home" will go stale after 6 months). In some embodiments, one or more attributes are permanent. In some embodiments, the DFS determines whether an attribute is stale when it is evicted from the first level of the multi-level cache.

(D1) In one aspect, some implementations include a method for real-time extraction of high-value information from data streams, comprising: at a data filtering system that includes one or more computers having a plurality of processors and memory storing programs for execution by the processors, receiving a first post from a source, wherein the first post includes first content; in real time, for the first post: determining, from the first post, a source identifier for the source; determining one or more attributes for the source by broadcasting the first post to a first plurality of filter graph definitions, wherein each of the filter graph definitions is configured to identify, at least in part based on posts' contents, attributes of sources according to the respective filter graph definition; and storing in memory, as a source profile identified by the source identifier for the source, the one or more attributes for the source; receiving a second post from the source, wherein the second post includes second content; in real time, for the second post: determining, from the second post, the source identifier for the source; using the source identifier for the post, querying the memory to access the source profile using the source identifier; correlating the second post with attributes of the source stored in the source profile to produce a correlated second post, including the one or more attributes determined from the first post; and broadcasting the correlated second post to a second plurality of filter graph definitions, wherein each of the filter graph definitions in the second plurality of filter graph definitions is configured to identify posts with high value information according to the respective filter graph definition, wherein posts are identified at least in part based on both the attributes of the source and the content of the second post.

(D2) In some implementations of the method of (D1), wherein the source is an author.

(D3) In some implementations of the method of any of (D1)-(D2), wherein correlating the second post with attributes of the source includes appending the source profile to the second post.

(D4) In some implementations of the method of any of (D1)-(D3), wherein the source profile is a universal array of source attributes, wherein the universal array of source attributes stores information for each attributed in a set of attributes that is independent of the source.

(D5) In some implementations of the method of (D4), wherein the universal array of source attributes is stored as a run-length-encoded bitvector.

(D6) In some implementations of the method of any of (D4)-(D5), wherein the set of attributes that is independent of the sources is a set of ZIP codes.

(D7) In some implementations of the method of any of (D1)-(D6), wherein:
the source profile is stored in a multi-level cache; and the method further comprises maintaining the multi-level cache, including: upon occurrence of predefined eviction criteria, evicting, from a first level of the multi-level cache, one or more source profiles corresponding to respective sources; and upon eviction from the first level of the multi-level cache, updating the attributes stored in the evicted source profiles.

(D8) In some implementations of the method of (D7), wherein the multi-level cache is a lockless cache.

(D9) In some implementations of the method of any of (D7)-(D8), wherein the multi-level cache is unprimed.

(D10) In some implementations of the method of any of (D7)-(D9), wherein the eviction is random or pseudo-random.

(D11) In some implementations of the method of any of (D7)-(D10), wherein updating the attributes stored in the evicted source profiles includes, for a respective evicted source profile: updating the respective evicted source profile with information obtained from other posts received from the corresponding source during the time that the respective evicted source profile was in the first level of the multi-level cache.

(D12) In some implementations of the method of any of (D7)-(D11), wherein updating the attributes stored in the evicted source profiles includes, for a respective evicted source profile: determining that a respective attribute stored in the respective evicted source profile is stale; and removing the respective attribute from the respective evicted source profile.

(D13) In one aspect, some implementations include one or more processors; and memory coupled to the one or more processors, the memory storing one or more programs configured to be executed by the one or more processors, the one or more programs including instructions for performing the method of any of (D1)-(D12).

(D14) In one aspect, some implementations include a non-transitory computer-readable storage medium storing one or more programs, the one or more programs comprising instructions which, when executed by a computer system, cause the system to perform the method of any of (D1)-(D12).

Query Visual

In some implementations, there is provided a geo-based real-time profile query driven visualization tool (e.g., author attribute query UI as shown in FIG. 62, referenced herein) for visualizing data generated by processes described herein. For example, in some implementations, there is a web application that takes the data gathered by other processes and assists with visualizing the various geo located data of authors.

In some implementations, the visualization tool may allow a user to infer statistical data from author data. A visualization tool may be an interactive map displaying geo data.

In some implementations, the visualization tool may allow grouping of author attributes (into Quests) and allow user to build Boolean queries for the selected author attribute grouping.

In some implementations, the visualization tool may allow comparing and contrasting between different groupings (Quests) of author attributes. In some implementations, the visualization tool may allow the user to navigate and explore the vast amount of author attributes easily.

In some implementations, the visualization tool may assist the user in discovering related attributes, topics, location among similar authors.

In some implementations, an author may be referred to as a particular person that has many attributes In some implementations, an attribute may be referred to as a particular trait a person has. For example: "Mom", "Female", "Likes Coffee"

In some implementations, an attribute group may be referred to as a grouping of various attributes tied together by Boolean operators.

In some implementations, a quest may be referred to as a join of multiple attribute groups.

(M1) In one aspect, some implementations include a method for visualizing data generated by one or more of the operations described in the methods (A1)-(Z12) and/or claims disclosed herein, comprising, at a computer system including a plurality of processors and memory storing programs for execution by the processors: receiving data from one or more data streams; determining a first geographic attribute of a first subset of the data; and providing the first subset of the data for display in accordance with the first geographic attribute.

(M2) In some implementations of the method (M1), the first geographic attribute includes a geographic origin of an author of the first subset of the data.

(M3) In some implementations of any of the methods (M1)-(M2), the first geographic attribute includes a geographic feature of a product or service described in the first subset of the data.

(M4) In some implementations of any of the methods (M1)-(M3), providing the first subset of the data for display includes providing the first subset of data on a first area of a geographic map, wherein the first area is associated with the first geographic attribute.

(M5) In some implementations of any of the methods (M1)-(M4), the method further comprises: determining a second geographic attribute for a second subset of the data; and providing the second subset of the data for display in accordance with the second geographic attribute.

(M6) In some implementations of any of the methods (M1)-(M5), the method further comprises: receiving first user input designating the first and/or the second subset of the data as a first grouping of data of interest; and adjusting display of the first and/or second geographic attributes in accordance with the first user input.

(M7) In some implementations of any of the methods (M1)-(M6), the method further comprises: receiving second user input designating third and/or fourth subsets of the data as a second grouping of data of interest; comparing the first and second groups of data of interest; and adjusting display of the first and/or second geographic attributes in accordance with the comparison.

(M8) In some implementations of any of the methods (M1)-(M7), the second user input includes a Boolean query.

(M9) In some implementations, an electronic device comprising one or more processors and memory storing instructions that, when executed by the one or more processors, causes the one or more processors to perform any of the methods (M1)-(M8).

(M10) In some implementations, a non-transitory computer-readable storage medium storing instructions that, when executed by an electronic device with one or more processors, causes the one or more processors to perform any of the methods (M1)-(M8).

Lockless Key-Value Storage System

This application is related to methods systems and devices to accessing data in real-time, including reading and annotating large amounts of data (e.g., author attribute data) in real-time while also providing concurrent access to the data.

There is a growing need to annotate incoming data published by a large amount of authors (or users), with the author (or user) attributes, in real-time. The author attribute data can be helpful when analyzing the published data (e.g., using mission definitions as described herein). A source may publish around 6 GB of data every minute. In order to annotate such huge amount of data in real-time, an author lookup table may be used. In some implementations, the author lookup table cannot be stored on a disk as the access may be too slow. In some implementations, the author lookup table may be stored on in random access memory (RAM). However, even if the author (or user) attributes are stored in RAM, performance of accessing it in a thread safe manner may become extremely inefficient in a multiprocessor environment. In order to take advantage of highly parallel multiprocessor architecture, concurrent access to the cache, without locking multiple data elements to annotate a single data element, may be necessary.

Accordingly, there may be a need for a system with faster, more efficient implementation methods for annotating in real-time. Such methods, systems and interfaces may optionally complement or replace conventional methods of annotating complex data. Such methods and interfaces may reduce the time necessary to annotate large amounts of complex data and produce a more efficient human-machine interface. Such methods, systems and interfaces may optimize dynamic annotation methods in real-time.

Initialization:

Depending on the number of authors in the system, the size of the lockless cache may be decided during LGM annotator startup. A contiguous block of memory in the form of an array may be assigned for the cache in order to enable a random access to any memory address within that block. Each physical memory address in this contiguous block may be known as the cache index Total number of threads that may access the cache may be registered with it. These threads may be known as the actors. Each actor may perform any of the operations that the interface of the cache has provided. A global list called actor_token_list may be initialized. Each actor may be provided a unique ID through which it may access its own unique slot in the actor_token_list.

A global variable called as the global_token for the cache may also be initialized.

Each of the cache indexes may hold a reference to a bucket. A bucket may be an abstract data type implemented as a singly linked list. The limit on the size of the bucket may be the available RAM.

During the cache initialization all the buckets may also be initialized. Each bucket may have sentinel nodes marking the start and the end of the bucket. The start node may hold the smallest 64 bit unsigned integer and the end node may hold the largest possible 64 bit unsigned integer. This may enable for sorted insertion of data in the bucket, which may keep the bucket sorted at all times. The schematic layout of an exemplary bucket is shown in FIG. 40G.

The author lookup table may be made up of key value pairs in which the key may be the author ID and the value may be the author's attributes. Each author ID may be mapped to a particular cache index by a hashing function. The Hashing function used here may be a combination of Google xxHash (an extremely fast non-cryptographic Hash algorithm, working at speeds close to RAM limits) and a MOD function. This hashing function may convert the author ID into a positive integer, which may be in the limit of cache indices. After locating the cache index the author ID—ATTR pair may then be inserted into the appropriate bucket.

In accordance with at least one implementation, the schematic layout of the Lockless Cache is described in FIGS. 40A-40F.

Interface for the Lockless Cache

The interface may provide three methods to access the lockless cache:

put(x) adds 'x' to the cache. Returns true if x was absent and false otherwise.

get(x) returns true if key x is present and false otherwise delete_entry(x) removes 'x' from the cache. Returns true if x was present and false otherwise.

Algorithm:

In some implementations, the algorithm may explained via three method calls that are provided by the cache interface.

Put Method Call:

New ID-ATTR may be ready to be inserted in the cache. Appropriate bucket in which this key-value pair may be inserted may be located by using the hashing function described in the previous section.

In order to make this insertion non-blocking and linearizable a low level atomic primitive called compare-and-swap (CAS) may be used.

Traverse the bucket and find the previous and the next nodes between which the new node needs may be inserted.

Using the atomicity of CAS over this window may ensure the nodes on either side of insertion have indeed remained adjacent result=_sync_bool_compare_and_swap(&prev->next, curr,new_node) //if result equal to true insertion is successful Delete_Entry Method Call In order to delete a particular node from the bucket a single CAS operation may not be sufficient because once a node may be selected for deletion one may not prevent any changes that other threads may make between the time of selection of node for deletion and actual deletion of the node.

Therefore, a deletion call may never physically free a node inside the bucket. It may use a CAS operation to atomically mark the node to be logically deleted.

A marked node may still be traversed but insertions may never take place before and after the marked node.

Get Method Call

Empirical evidence shows that 90 percent of the method calls are to get a particular ID-ATTR from the cache. So this method may be extremely fast without a significant overhead.

By using the hash function a particular author ID's cache index may be found in constant time and traversing the bucket may take a linear amount of time. If the cache is huge enough the number of collisions may greatly b reduced, thus decreasing the size of the bucket which in turn may reduce the access time of the cache. Thus the amortized time complexity ay still remain constant for the get method call.

Lock-free garbage collection of the entries in the cache:

In order to access the cache each actor may need to collect a unique token

Each node in the cache may have a deletion_timestamp.

Each actor may have its own local list of references to nodes called as to_be_deleted_nodes.

The unique token may be generated by using an ever increasing 64 bit unsigned integer known as the global_token that is initialized to zero at the time of initialization of cache.

Each actor may increment this global token atomically by using a low level atomic primitive sync_fetch_and_add actor_token=_sync_fetch_and_add(&global_token, 1ULL).

Each actor may receive a unique token before accessing the cache. This token may then be written into the unique slot decided by the ID of the actor in the global_token_list.

Whenever an actor is traversing a bucket in order to insert/delete/read a particular entry in the cache it may check whether a node is marked as deleted before moving onto the next node.

If the node is marked as deleted (e.g. M_node) then it may mean that the memory of M_node can be freed. This physical deletion may involve two steps:

point the next pointer of previous node to the successor of the M_node using an atomic CAS operation. This may remove the M_node from the bucket in an atomic manner so that other actors accessing the cache after this point may not hold the reference to the M_node.

Free the M_node by calling its destructor method.

By using the methods above, it may never guarantee whether some actor currently accessing the cache is still holding a reference of the M_node that is about to be freed.

Here, the current actor (A) which is about to free a M_node may need to make sure that none of the others actors are accessing it. The only actors which may hold the reference of M_node are the actors whose tokens may have value lesser than that of actor A. All the actors whose token values are greater than that of actor A may never see the M_node because it may already be removed from the bucket by actor A.

The global_token_list may traverse to find the maximum value in the list(max_tv) and the delete_timestamp of the M_node is set to max_tv+1.

This M_node may then be added to the actor A's to_be_deleted_nodes list.

When the size of the to_be_deleted_nodes list reaches to a certain threshold it may be time that the actor A may start deleting them in the following manner.

The minimum value(min_ty) may be calculated by traversing the global_token_list and if the delete_timestamp of the node inside the to_be_deleted_nodes_list is lesser than the min_tv then the M_node may be safely deleted. This may ensure that no actors are currently holding the reference of the M_node.

The main motivation for building a lockless key-value store (cache) may be to enable the LGM (little green men—or should we say system?) annotator to tag incoming data published by various authors with their attributes in real-time. The Harvester may publish around 6 GB of data every minute. In order to annotate such huge amount of data in real-time the author lookup table may not be stored on a disk as the access will be too slow. Even if the author attributes may be stored in the cache (RAM) the performance of accessing it in a thread safe manner may become extremely inefficient in a multiprocessor environment. In order to take advantage of highly parallel multiprocessor architecture concurrent access to the cache must be provided.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIGS. 40A to 40F illustrate an exemplary process for accessing and annotating a lockless memory storage database AD02_118 (or memory storage system, as referred to herein), in accordance with at least some implementations. The memory storage database AD02_118 may be used for storing author attribute information. For example, the memory storage database AD07_118 may receive a post from a source to append certain author attribute information to an element for further processing by the system.

The memory storage database AD02_118 may include a single array AD07_100. In some implementations, the single array AD07_100 may include array elements (e.g., AD07_100-1. Each array element may store unique author identification with an associated linked list of array elements corresponding to each author identification (e.g., AD07_102). For example, in array AD07_100, array element AD07_100-7 may store author identification for author 7 and may contain a linked list of array elements AD07_106-1 and AD07_106-2 corresponding to author attributes for author 7 (e.g., location, education, age, gender, profession). As a further example, array element AD07_100-7 may correspond to author identification "John Smith" and may contain array elements AD07_106-1 corresponding to "John Smith" location and array element AD07_106-2 corresponding to "John Smith" profession.

Each linked list of array elements may store a key value pair for the attribute and a pointer which points to the next list element. For example, in FIG. 40A array element AD07_106-1 may store key value pair for the location of attribute about author 7 (AD07_100-7) and may contain pointer PTR [0000 0ID5] pointing to the next list element AD07_106-2.

Figure 40A:
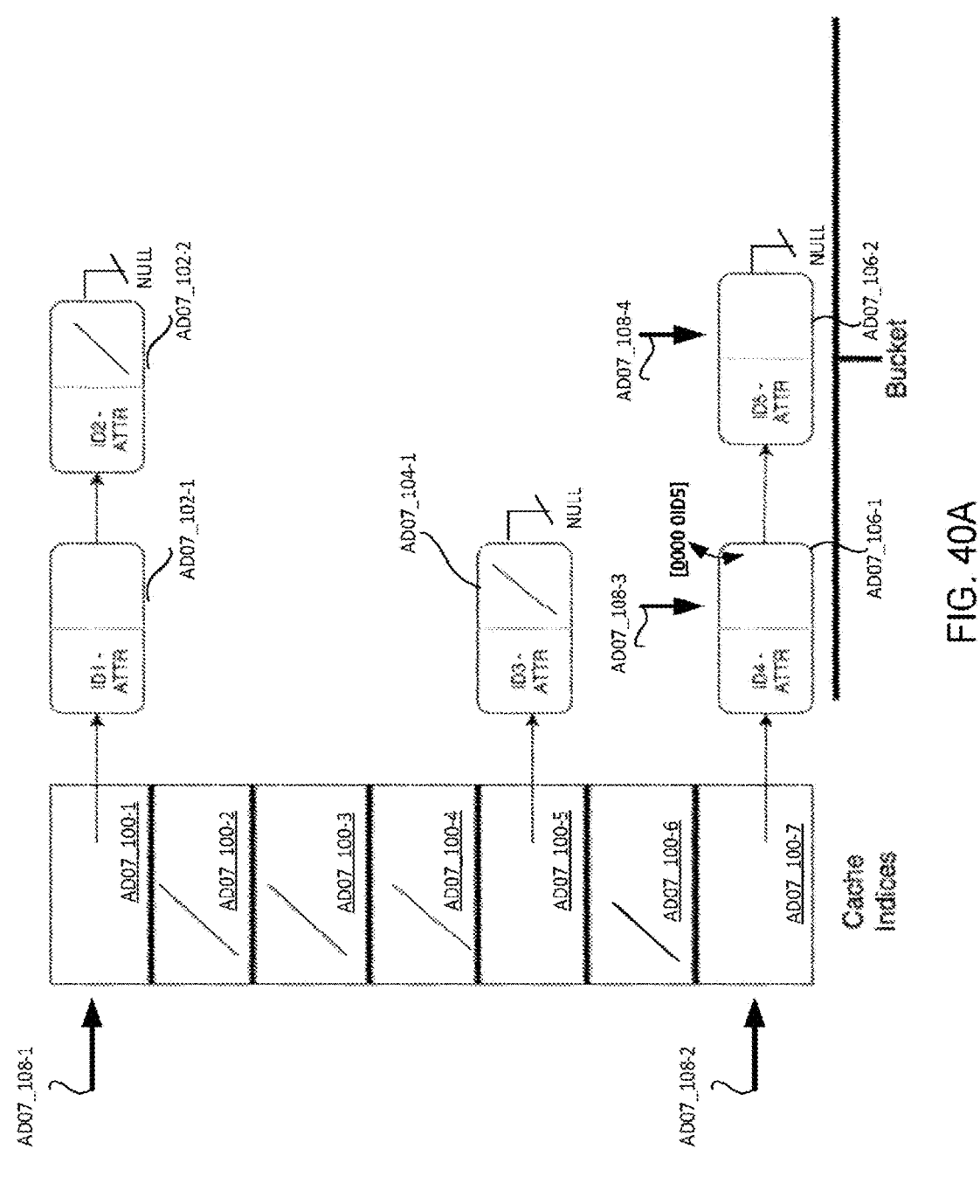

As shown in FIG. 40A, the last list element may have a null pointer to indicate that no further data is stored in the linked list of elements.

The memory storage database AD02_118 may be configured for concurrent read, write and delete access by reader thread AD07_112, writer thread AD07_108 and delete thread AD07_110, respectively.

Figure 40B:

FIG. 40A and FIG. 40B illustrate a method for writing author attribute data to the database with writer thread AD07_108, in accordance with one implementation. Initially, in FIG. 40A, the writer thread AD07_108 may receive a request to add location information to author AD07_100-7. In response, the writer thread AD07_108 may traverse the author array AD07_100 as shown in FIG. 40A by the representative arrow AD02_108-1 at a first time, representative arrow AD07_108-2 at a second subsequent time, a representative arrow AD02_108-3 at a subsequent third time and representative arrow AD07_108-4 at a subsequent fourth time. As shown in FIG. 40B, the writer thread AD07_108 may add pointer [0000 0ID6] which points to a new linked list element AD07_106-3 where the writer thread will write the requested location information.

Figure 40C:
Figure 40D:

FIGS. 40C to 40F illustrate a method for deleting author attribute data from the database AD02_118 with delete thread AD07_110 and reader thread AD07_112, in accordance with one implementation. Initially, delete thread AD07_110 may receive a request to delete author attribute data corresponding to linked list element AD07_106-2 for author 7. In response, delete thread AD07_110 may traverse the array AD07_100 until delete thread AD07_110 reaches author 7, and traverse linked list elements for author 7, until delete thread AD07_110 identifies a pointer pointing to the attribute required for deletion as shown in FIG. 40C by the representative arrow AD02_110-1 at a first time, representative arrow AD07_110-2 at a second subsequent time, a representative arrow AD02_110-3 at a subsequent third time. In response, the pointer AD07_110-3, corresponding to attribute AD02_106-2, and change the highest bit of the pointer from 0 to 1 as shown in FIG. 40D.

Figure 40F:
Figure 40G:
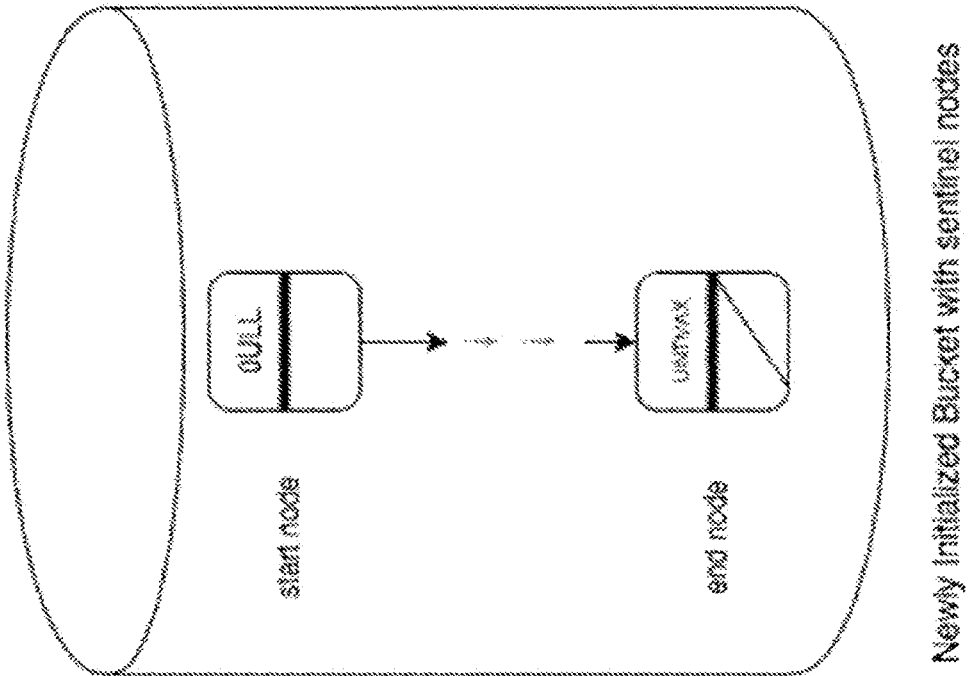
FIG. 40G illustrates an exemplary lockless memory storage database, in accordance with at least some implementations.

FIGS. 40E and 40F illustrate a method for removing a linked list element from the database AD02_118 using reader thread AD07_112, in accordance with one implementation. Initially, the reader thread AD07_112 may receive a request to read data for author 7. In response, the reader thread AD07_112 may traverse linked list elements for author 7, as shown in FIGS. 40E and 40F by the representative arrow AD02_112-1 at a first time, representative arrow AD07_112-2 at a second subsequent time, a representative arrow AD02_112-3 at a subsequent third time. In response to detecting a high bit for the pointer corresponding to AD07_106-2 (1000 0ID5), the reader thread AD07_112 may change the pointer to point to linked list element ID6. The result of changing the pointer to point to ID6 AD07_106-3 is shown in FIG. 40F.

Figure 41:
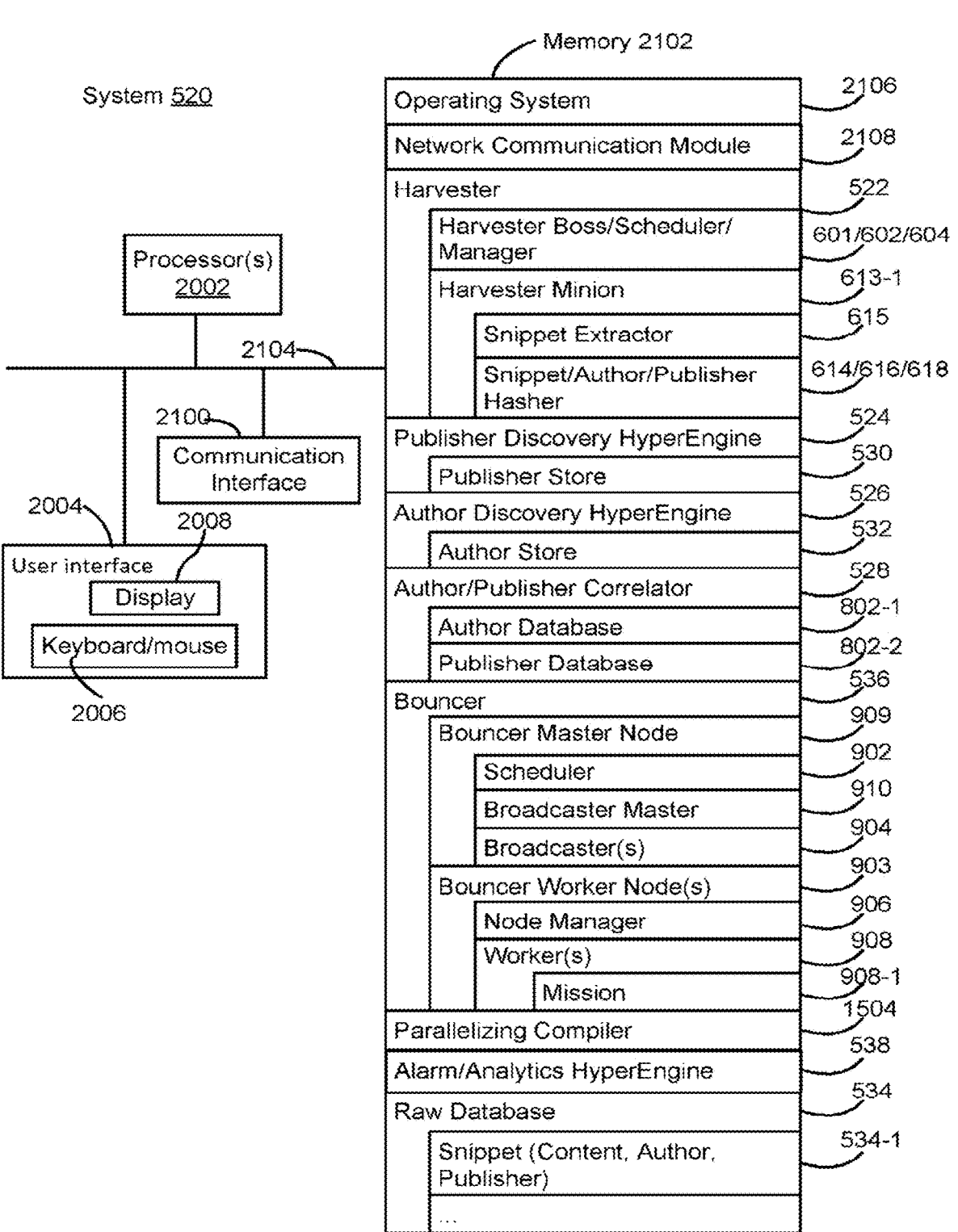
FIG. 41 is a block diagram of a computer system for accessing and annotating a lockless memory storage database (or memory storage system, as referred to herein), in accordance with at least some implementations.

FIG. 41 is a modified block diagram of the computer system 520 shown in FIG. 5B of U.S. patent application Ser. No. 14/214,410, for accessing and annotating a lockless memory storage database (or memory storage system, as referred to herein), in accordance with at least some implementations. The system 520 includes one or more processors 2002 for executing modules, programs and/or instructions stored in memory 2102 and thereby performing predefined operations; one or more network or other communications interfaces 2100; memory 2102; and one or more communication buses 2104 for interconnecting these components. In some implementations, the system 520 includes a user interface 2004 comprising a display device 2008 and one or more input devices 2006 (e.g., keyboard or mouse).

In some implementations, the memory 2102 includes high-speed random access memory, such as DRAM, SRAM, or other random access solid state memory devices. In some implementations, memory 2102 includes non-volatile memory, such as one or more magnetic disk storage devices, optical disk storage devices, flash memory devices, or other non-volatile solid state storage devices. In some implementations, memory 2102 includes one or more storage devices remotely located from the processor(s) 2002. Memory 2102, or alternately one or more storage devices (e.g., one or more nonvolatile storage devices) within memory 2102, includes a non-transitory computer readable storage medium. In some implementations, memory 2102 or the computer readable storage medium of memory 2102 stores the following programs, modules and data structures, or a subset thereof:

an operating system 2106 that includes procedures for handling various basic system services and for performing hardware dependent tasks;

a network communications module 2108 that is used for connecting the system 520 to other computers (e.g., the data sources 502 in FIG. 5A) via the communication network interfaces 2100 and one or more communication networks (wired or wireless), such as the Internet, other wide area networks, local area networks, metropolitan area networks, etc.;

a Harvester 522 for collecting and processing (e.g., normalizing) data from multiple data sources 502 in FIG. 5A, the Harvester 522 further including a Harvester Boss 601, a Scheduler 602, a Harvester Manager 604, and one or more Harvester Minions 613-1, which are described above in connection with FIG. 6, and a Harvester Minion 613-1 further including a snippet extractor 615 for generating packets for the snippets, authors, and publishers encoded using appropriate data structures as described above with reference to FIG. 7, and a snippet hasher 614, an author hasher 616, and a publisher hasher 618 for generating a hash key for the snippet content, author, and publisher of the snippet, respectively;

a Publisher Discovery HyperEngine 524 for inspecting the data stream from the data sources 502 in order to develop a publisher profile for a data source based on, e.g., the snippets published on the data source and storing the publisher profile in the publisher store 530;

an Author Discovery HyperEngine 526 for inspecting the data stream from the data sources 502 in order to develop an author profile for an individual based on, e.g., the snippets written by the individual on the same or different data sources and storing the author profile in the author store 532;

an Author/Publisher Correlator 528 for performing real-time data correlation with existing author information in the author database 802-1 and existing publisher information in the publisher database 802-2 to determine a respective snippet's author and publisher;

a Bouncer 536 for identifying high-value information for a client of the system 520 from snippets coming from different data sources by applying the snippets to mission definitions associated with the client, the Bouncer 536 further including a bouncer master node 909 and one or more bouncer worker nodes 903, the bouncer master node 909 further including a scheduler 902, a broadcaster master 910, and one or more broadcasters 904, whose functions are described above in connection with FIG. 9, and each bouncer master node 909 further including a node manager 906 and one or more workers 908 (each worker handling at least one mission definition 908-1), a more detailed description of the components in the Bouncer 536 can be found above in connection with FIG. 9;

a Parallelizing Compiler 1504 for optimizing a filter network specification associated with a client of the system 520 by, e.g., appropriately merging, reordering filters and removing cycles from the resulting filter network, etc.;

an Alarm/Analytics HyperEngine 538 for determining if and how to deliver alarm messages produced by the Bouncer 536 to end-users using, e.g., predefined communication protocols with the end-users, and generating short-term or long-term statistics through analyzing the incoming information as well historical information from the data sources and determining whether or not to trigger alarms for any violations of predefined criteria associated with a client of the system; and a Raw Database 534 for backing up snippets from the data sources, e.g., after the snippets are normalized by Harvester 522, each snippet having content, author, and publisher information.

FIGS. 42A to 42B are flowcharts illustrating a method AD10-300 for accessing data in real-time without locking multiple data elements during annotation of the data, in accordance with some implementations. The method AD10-300 is performed at a computer system (e.g., computer system 520 in FIG. 41) including a plurality of processors (e.g., processors 2002 in FIG. 41) and memory (e.g., memory 2102 in FIG. 41) storing programs for execution by the processor. In some implementations, the method AD10-300 is a continuous monitoring process that is performed without user intervention. In some implementations, the method AD10-300 is performed by a computer system of Author/Publisher Correlator 528, as shown in FIG. 41.

The computer system includes a multi-thread processor and memory. The memory includes an array of array elements, each array element having an identifier, each array element being associated with an array of list elements, each list element including a key/value pair and a pointer to a next list element; the memory storing programs for execution by the multi-thread processor. For example, in array AD07_100, array element AD07_100-7 may store author identification for author 7 and may contain a linked list of array elements AD07_106-1 and AD07_106-2 corresponding to author attributes for author 7 (e.g., location, education, age, gender, profession).

The computer system spawns (AD07-202) a plurality of processor threads that operate simultaneously and share read, write and delete access to the array of array elements.

In some implementations, each array element in the array is (AD07-204) associated with an author.

The computer system receives (AD07-206) a delete request to delete at least one of the list elements associated with a respective array element, the delete request including an identifier of the array element and at least one list element key for each of the list elements indicated for deletion.

In some implementations, each list element for each array element is (AD07-208) associated with an author attribute.

The computer system, in response to receiving the delete request to delete the at least one list elements, spawns (AD07-210) a first thread (e.g., delete thread AD07_110).

The computer system (e.g., via the delete thread AD07_110) traverses the single attribute array and identify the respective array element associated with the identifier included in the delete request.

The computer system (e.g., via the delete thread AD07_110) traversing the list elements sequentially, and while traversing each list element sequentially, determine whether the respective pointer (e.g., pointer represented as 0000 0ID5 in FIG. 40A) to the next list element (e.g., list element AD07_106-2) identifies the list element (e.g., list element AD07_106-2) indicated for deletion.

The computer system (e.g., via the delete thread AD07_110), in accordance with a determination that the pointer to a next list element (e.g., list element AD07_106-2) identifies the list element (e.g., list element AD07_106-2) indicated for deletion, setting a delete indicator bit in the pointer to indicate that the next list element is set for deletion (e.g., pointer represented as 1000 0ID5 in FIG. 40D), such that a subsequent thread traversing the list element with the delete indicator bit in the pointer will perform the deletion of the next list element. For example, the delete thread AD07_110 may receive a request to delete author attribute data corresponding to linked list element AD07_106-2 for author 7. In response, delete thread AD07_110 may traverse the array AD07_100 until delete thread AD07_110 reaches author 7, and traverse linked list elements for author 7, until delete thread AD07_110 identifies a pointer pointing to the attribute required for deletion as shown in FIG. 40C by the representative arrow AD02_110-1 at a first time, representative arrow AD07_110-2 at a second subsequent time, a representative arrow AD02_110-3 at a subsequent third time. In response, the pointer AD07_110-3, corresponding to attribute AD02_106-2, and change the highest bit of the pointer from 0 to 1 as shown in FIG. 40D.

In some implementations, setting the delete indicator bit in the pointer (e.g., pointer represented as 1000 0ID5 in FIG. 40D), to indicate that the next list element (e.g., list element AD07_106-2) is set for deletion is (AD07-212) performed in a single atomic operation.

In some implementations, the computer system receives (AD07-214) an access request to retrieve at least one of the list elements associated with a respective identifier of one of the array elements, the request including the respective identifier of the one of the array elements and at least one list element key, each list element key being associated with at least one respective list element. In some implementations, the computer system, in response to receiving the access request, spawning a second thread (e.g. reader thread AD07_112). The computer system via a second thread (e.g. reader thread AD07_112).), traverses the single attribute array and identifying the respective array element associated with the respective identifier. The computer system (e.g., via the reader thread AD07_112)), traversing the list elements sequentially and selectively retrieving the at least one of the list elements associated with the access request. The computer system (e.g., via the reader thread AD07_112), while traversing each list element, determining whether the delete indicator bit in the respective pointer (e.g., pointer represented as 1000 0ID5 in FIG. 40D) to the next list element (e.g. list element AD07_106-2) indicates that the next list element (e.g. list element AD07_106-2) is designated for deletion. The computer system (e.g., via the reader thread AD07_112), in accordance with a determination that the delete indicator bit indicates that the next list element (e.g. list element AD07_106-2) is designated for deletion: deleting the next list element (e.g. list element AD07_106-2) by changing the respective pointer (e.g., pointer represented as 0000 0ID6 in FIG. 40F) to the subsequent list element (e.g. list element AD07_106-3) after the next list element; and continuing traversing the list elements until the at least one of the list elements are retrieved.

In some implementations, deleting the next list element (e.g. list element AD07_106-2) includes (AD07-216) storing the key/value pair of the next list element in a local memory associated with second thread (e.g. reader thread AD07_112).

In some implementations, the access request is (AD07-218) transmitted in response to receiving a document from an external data source and wherein the retrieved list elements are associated with the document while the document is traversing the mission filters (or data filter definitions as described herein).

(E1) In one aspect, some implementations include a method comprising: at a computer system including a multi-thread processor and memory, the memory including an array of array elements, each array element having an identifier, each array element being associated with an array of list elements, each list element including a key/value pair and a pointer to a next list element; the memory storing programs for execution by the multi-thread processor: spawning a plurality of processor threads that operate simultaneously and share read, write and delete access to the array of array elements; receiving a delete request to delete at least one of the list elements associated with a respective array element, the delete request including an identifier of the array element and at least one list element key for each of the list elements indicated for deletion; in response to receiving the delete request to delete the at least one list elements, spawn a first thread including: traversing the single attribute array and identify the respective array element associated with the identifier included in the delete request; traversing the list elements sequentially, and while traversing each list element sequentially, determine whether the respective pointer to the next list element identifies the list element indicated for deletion; in accordance with a determination that the pointer to a next list element identifies the list element indicated for deletion, setting a delete indicator bit in the pointer to indicate that the next list element is set for deletion, such that a subsequent thread traversing the list element with the delete indicator bit in the pointer will perform the deletion of the next list element.

(E2) In some implementations of the method of (E1) further comprising: receiving an access request to retrieve at least one of the list elements associated with a respective identifier of one of the array elements, the request including the respective identifier of the one of the array elements and at least one list element key, each list element key being associated with at least one respective list element; in response to receiving the access request, spawning a second thread including: traversing the single attribute array and identifying the respective array element associated with the respective identifier; traversing the list elements sequentially and selectively retrieving the at least one of the list elements associated with the access request, while traversing each list element, determining whether the delete indicator bit in the respective pointer to the next list element indicates that the next list element is designated for deletion; in accordance with a determination that the delete indicator bit indicates that the next list element is designated for deletion: deleting the next list element by changing the respective pointer to the subsequent list element after the next list element; and continuing traversing the list elements until the at least one of the list elements are retrieved.

(E3) In some implementations of the method of any of (E1)-(E2), wherein deleting the next list element includes storing the key/value pair of the next list element in a local memory associated with second thread.

(E4) In some implementations of the method of (E1)-(E3), wherein setting the delete indicator bit in the pointer to indicate that the next list element is set for deletion is performed in a single atomic operation.

(E5) In some implementations of the method of any of (E2)-(E4), wherein the access request is transmitted in response to receiving a document from an external data source and wherein the retrieved list elements are associated with the document while the document is traversing mission filters.

(E6) In some implementations of the method of any of (E1)-(E5), wherein each array element in the array is associated with an author.

(E7) In some implementations of the method of any of (E1)-(E6), wherein each list element for each array element is associated with an author attribute.

(E8) In some implementations a computer system comprising: one or more processors; and memory coupled to the one or more processors, the memory storing one or more programs configured to be executed by the one or more processors, the one or more programs including instructions for performing the method of any of (E1)-(E7).

(E9) In some implementations of a non-transitory computer-readable storage medium storing one or more programs, the one or more programs comprising instructions which, when executed by a computer system, cause the system to perform the method of any of (E1)-(E7).

Realtime Tagging System

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

For multiple data streams with individual data packets tagged with various unique attributes (e.g., packets tagged with attributes 507 and/or 509 of U.S. patent application Ser. No. 15/530,187), an individual packet can be in different data streams. In order to reconstruct the packet, it is necessary for a system (e.g., correlator 528 of U.S. patent application Ser. No. 15/530,187) to know all of the matching tags for the packet.

In some implementations, each individual data stream contains a set of unique attribute tags. In some implementations, the system (e.g., correlator 528) initializes a table with columns with the combined set of attribute tags from all of the data streams. The system tracks sets of data streams of any combinations, and creates a unique table for every set of data stream. For example:

data stream 1 includes packets tagged by attributes ACD data stream 2 includes packets tagged by attributes BEGR data stream 3 includes packets tagged by attributes FH The system (e.g., correlator 528) creates a table having columns for each of A, B, C, D, E, F, G, H, and R.

| | A | B | C | D | E | F | G | H | R |
|---|---|---|---|---|---|---|---|---|---|
| row 1 | | | | | | | | | |
| row 2 | | | | | | | | | |
| row 3 | | | | | | | | | |

The system analyzes received packets (received from all of the input streams) and records attributes included in respective packets in the table, with each row corresponding with a packet.

For example: A data packet received from one input stream (identified by "hello") is tagged with attributes A and C. data stream 1 includes attributes ACD; accordingly, the next available row of the table is labeled "hello" and attributes A and C are recorded in that row.

| | A | B | C | D | E | F | G | H | R |
|---|---|---|---|---|---|---|---|---|---|
| "hello" | <u>x</u> | | <u>x</u> | | | | | | |

A data packet received from another input stream (also identified by "hello") is tagged with attributes B, G, and R; accordingly, the "hello" row is updated to record attributes B, G, and R.

| | A | B | C | D | E | F | G | H | R |
|---|---|---|---|---|---|---|---|---|---|
| "hello" | x | <u>x</u> | x | | | | <u>x</u> | | <u>x</u> |

The system continues to analyze received packets and updates each row accordingly. For example:

| | A | B | C | D | E | F | G | H | R |
|---|---|---|---|---|---|---|---|---|---|
| "hello" | x | x | x | | | | x | | x |
| "world" | x | | x | | | x | | | x |
| "another_id" | | x | x | x | | x | | x | x |

In some implementations, the data table and/or results based on the data table are integrated with additional systems (e.g., Bouncer 536) for further analysis.

A method of reassembling data packets tagged with unique attributes, in accordance with some implementations, includes: (i) obtaining a plurality of data streams, each data stream containing a plurality of data packets, each data packet including one or more attribute tags; (ii) initializing a table with a plurality of columns and rows; (iii) associating each column with a unique attribute tag selected from a combined set of the plurality of attribute tags from each data stream (e.g., data stream 1: {ACD}, data stream 2: {BEGR}, data stream 3: {FH}⇒columns: A B C D ∈ F G H R); (iv) selecting a first data packet from a first of the plurality of data streams, wherein the first data packet is associated with a first unique identifier and a first set of attribute tags (e.g., ID: "hello" tags=AC); (v) associating a first of the plurality of rows with the first unique identifier; (vi) recording the first set of attribute tags into the first of the plurality of rows (e.g., "hello" associated with columns A and C in the table); (vii) selecting a second data packet from a second of the plurality of data streams, wherein the second data packet is associated with the first unique identifier and a second set of attribute tags (e.g., ID: "hello" tags=BGR); (viii) recording the second set of attribute tags into the first of the plurality of rows (e.g., "hello" associated with columns A and C from the previous packet, and additionally B, G, and R from the current packet); and (ix) associating each attribute tag recorded in the first row with a first reassembled data packet (e.g., the "hello" packet).

It is important to note that tables, columns, and rows are only one example of collecting, associating, and recording data. In alternative embodiments, similar results can be achieved without the use of a table. For example, an alternative method of reassembling data packets tagged with unique attributes includes: (i) selecting a plurality of data streams, each data stream containing a plurality of data packets, each data packet including one or more attribute tags; (ii) selecting a first data packet from a first of the plurality of data streams, wherein the first data packet is associated with a first unique identifier and a first set of attribute tags (e.g., ID: "hello" tags=AC); (iii) initializing a first tag collection associated with the first unique identifier (e.g., $T1=T1_{hello}$); (iv) adding the first set of attribute tags to the first tag collection (e.g., $T1_{hello}=\underline{AC}$); (v) selecting a second data packet from a second of the plurality of data streams, wherein the second data packet is associated with the first unique identifier and a second set of attribute tags (e.g., ID: "hello" tags=BGR); (vi) adding the second set of attribute tags to the first tag collection (e.g., $T1_{hello}=A\underline{BCG}R$); and (vii) associating each attribute tag in the first tag collection with a first reassembled data packet (e.g., the "hello" packet).

(F1) In one aspect, some implementations include a method comprising: obtaining a plurality of data streams, each data stream containing a plurality of data packets, each data packet including one or more attribute tags; initializing a table with a plurality of columns and rows; associating each column with a unique attribute tag selected from a combined set of the plurality of attribute tags from each data stream; selecting a first data packet from a first of the plurality of data streams, wherein the first data packet is associated with a first unique identifier and a first set of attribute tags; associating a first of the plurality of rows with the first unique identifier; recording the first set of attribute tags into the first of the plurality of rows; selecting a second data packet from a second of the plurality of data streams, wherein the second data packet is associated with the first unique identifier and a second set of attribute tags; recording the second set of attribute tags into the first of the plurality of rows; and associating each attribute tag recorded in the first row with a first reassembled data packet.

(F2) In one aspect, some implementations include a method comprising: obtaining a plurality of data streams, each data stream containing a plurality of data packets, each data packet including one or more attribute tags; selecting a first data packet from a first of the plurality of data streams, wherein the first data packet is associated with a first unique identifier and a first set of attribute tags; initializing a first tag collection associated with the first unique identifier; adding the first set of attribute tags to the first tag collection; selecting a second data packet from a second of the plurality of data streams, wherein the second data packet is associated with the first unique identifier and a second set of attribute tags; adding the second set of attribute tags to the first tag collection; and associating each attribute tag in the first tag collection with a first reassembled data packet.

(F3) In some implementations a computer system comprising: one or more processors; and memory coupled to the one or more processors, the memory storing one or more programs configured to be executed by the one or more processors, the one or more programs including instructions for performing the method of any of (F1)-(F2).

(F4) In some implementations of a non-transitory computer-readable storage medium storing one or more programs, the one or more programs comprising instructions which, when executed by a computer system, cause the system to perform the method of any of (F1)-(F2).

Near-Real-Time Current Event Detection, Cause Identification, and Alert System This application relates to methods, systems, and devices to automatically detect events and identify the causes of the events from streams of electronic posts (e.g., social media posts). Some embodiments can be used to issue alerts, e.g., in response to an on-going terrorist attack, that provide guidance to affected individuals (e.g., a "shelter-in-place" alert).

Social media enables one to be informed about happenings in the world. Every day, tens of millions of social media users go online to express opinions, share ideas, and publish media for the masses. When special (e.g., unusual) circumstances happen, the volume of social media data feeds can increase to higher than average levels, and the volume increase tends to occur suddenly (e.g., spike). For example, during the Paris terrorist attacks in 2015, TWITTER™ experienced volumes around tens of thousands of TWEETS per second in a relatively short period of time, compared to its average of around 6,000 TWEETS every second on a "normal" day.

Though important information could be gleaned from these data, the volume is overwhelming for conventional systems. Thus, conventional systems for determining "trending" topics on social media typically do no more than associate words with topics (e.g., the word "Paris" might be trending). These conventional systems might allow users to view the trending posts and decide for themselves what is happening, but are too slow to use sophisticated filters in real-time (or near-real-time). In addition, these systems are unable to distinguish between a "trending" topic (e.g., a video going "viral") and the occurrence of an event (e.g., a sudden event such as a terrorist attack or a tsunami). Even if conventional systems could detect events (versus trending topics), conventional systems would be too slow to attribute causes to such events.

Thus, there is a need for faster filters and faster algorithms to process social media posts.

The analysis of social media data, including content and volume changes (e.g., anomaly, spikes), not only enables one to be informed about happenings in the social media world, but also to identify relevant events (e.g., a sudden influx of positive sentiment about a presidential candidate) and ascribe a reason (e.g., cause) for the observed occurrence (e.g., a candidate has dropped out of the race).

In some circumstances, event detection can be used to issue alerts. For example, in many circumstances, social media is aware of the occurrence of an event (e.g., a terrorist attack) before authorities have fully processed what is happening. In such cases, the ability to, in near-real-time, detect an event, determine basic facts about the event (e.g., when it occurred, where it occurred), and attribute causes to the event allows alerts to be issued to affected individuals sooner. These alerts can include instructions to, for example, "shelter-in-place" (in the case of a terrorist attack) or "go to higher ground" (in the case of a Tsunami). The ability to carefully filter information relevant to a subject prevents false alarms, as described in U.S. patent application Ser. No. 14/214,410, filed Mar. 14, 2014, entitled "Hierarchical, Parallel Models for Extracting in Real-Time High-Value Information from Data Streams and System and Method for Creation of Same." Thus, a touchdown scored in a University of Miami Hurricane's football game will not cause South Florida to receive shelter-in-place alerts. Further, the ability to distinguish between mere viral topics and true events further avoids false alarms.

Avoidance of false alarms is critical to the effectiveness of such systems. By issuing highly-precise and accurate alerts faster than authorities are able to, some embodiments mitigate loss of human life in emergencies (e.g., mitigate natural disasters, counter terrorist attacks) by spreading the word faster in a way that users take seriously.

In addition, some embodiments of the present disclosure are used in non-emergency situations to allow users to stay up-to-date on current events.

Thus, there is a need for methods, devices and systems to automatically detect current events, and identify their causes, from streams of electronic posts (e.g., social media posts). Various implementations of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used for automatic (without user input) detection of current events and identification of causes from streams of electronic posts (e.g., social media posts).

In some implementations, a method for automatically detecting events and identifying the causes of the events from streams of electronic posts is performed at a computer system that identifies high value information in real-time. Examples of such a computer system are described in U.S. patent application Ser. No. 14/214,410, which is incorporated by reference herein in its entirety. The computer system described in U.S. patent application Ser. No. 14/214,410 make use of a massively parallel set of executable filter definitions, called "missions," that identify individual electronic posts as high-value (e.g., highly relevant) to a particular subject.

Some embodiments described herein use missions to detect events. For example, detection of events is carried out by polling mission results and using signal processing to detect sudden spikes in volume or sentiment related to the mission's subject. The detected signal is statistically analyzed to determine its significance, both relative to the subject's own social media timeline as well as relative to similar subjects in the same field.

Further, when an event is deemed significant, the computer system is then polled for other mission results (e.g., using a Harvester, such as the Harvester 522 described in U.S. patent application Ser. No. 14/214,410) relating to specific issues relevant to the subject. The above analysis is carried out on these issues, and those that match the event in terms of volume or sentiment are logged as potential causes for the event.

In some implementations, the computer system further includes a topic discovery system that greatly increases the speed of topic discovery such that, in some circumstances, it can be used to discover, for example, social media topics in near real-time. The topic discovery system is described in further detail in U.S. patent application Ser. No. 14/688,865. In this example, the topic discovery system is polled to give greater detail to the cause for the event. For instance, if one relevant issue for a candidate's popularity is "foreign policy," and a range of topics is discovered talking about the candidate's recent speech on treaties, it can be concluded that: (a) the candidate recently spoke about foreign treaties and (b) that many people on social media liked the candidate's statement, and are therefore likely to support the candidate on this issue.

Accordingly, as illustrated above, the computer system is able to track social media, record significant happenings within it for specific subjects, and accurately analyze the cause for each event.

For event detection, social media statistics (volume and sentiment) for a given subject are tracked for specific missions relating to that subject, e.g., via an application programming interface (API) of the computer system. The API is polled at regular time intervals (e.g., every 30 sec) to obtain a time series for the subject at a low-resolution timeframe (e.g., 1 week binned every hour). A Fast Fourier Transform (FFT) is performed on this data to obtain data frequencies that stand out from the rest of the time series. To determine which of these are significant, the FFT distribution is assumed to be log-normal and a band-pass filter is applied that permits only those data frequencies within two standard deviations for that distribution. The frequencies that remain after filtering are then used to find the corresponding data points in the original time series. These are determined to be significant events relative to the subject's social media timeline.

In some embodiments, the band-pass filter is used to distinguish between viral topics and true events (e.g., where numerous users are reacting to the same stimulus, rather than, e.g., reacting to other users). The use of band-pass filters to distinguish between event surges and viral surges is based on the insight that events will cause a more rapid (e.g., higher frequency) reaction on social media.

In some situations, however, finding events that are significant in terms of the subject's own social media behavior may not be sufficient when comparing multiple subjects. That is, if one subject consistently receives many more mentions than another (e.g., one candidate gets talked about much more than another), then it becomes necessary to determine how significant the event is in terms of all subjects being compared. For example, a factor-of-ten increase in mentions for a heavily-talked-about subject is more significant in the broader perspective than a factor-of-ten increase for a subject that is not talked about very much. For this reason, the permissive threshold for the aforementioned band-pass filter must be weighted relative to all subjects being compared. This is done by adding in a coefficient obtained by normalizing the average of the data (volume or sentiment) for the low-resolution timeframe for all subjects being compared. If the signal still passes, it is considered definitively significant.

In some embodiments, when a signal of interest is found in this time series, the process is repeated using a higher-resolution time series (e.g., 24 hours binned every 5 min) in order to narrow down the timeframe within which the event occurred. If a significant event is present in this timeframe (say, within the last hour), then the significant event is considered to be recent and is logged. Since the API is polled at a higher rate than the span of the low resolution time series, this helps ensure that not only is the time range of the event acquired in high detail, but also that the same event is not "discovered" more than once.

In some embodiments, the computer systems and methods described herein are able to automatically, without user intervention, determine causes for an event. For cause detection, when an event is detected for a subject (e.g., deemed significant and recent), the computer system is polled for two sources of information as to what might have caused it: issues and topics.

Issues are general ideas associated with a subject as determined by preconfigured missions (e.g., for a presidential candidate these might be missions for "foreign policy", "economy", "environment", etc.). In some embodiments, the obtained data for the API is identical to the aforementioned data related to the subject, but filtered for mentions that relate to both the subject and the issue. When an event is found, the time series for each issue for the subject is obtained for the same high-resolution timeframe as that in which the event was discovered. The same significance determination as described above is used on each issue, with the exception of the weighting factor, since it has already been determined that the event is significant both relative to the subject as well as to other subjects of interest. Those issues that demonstrate their own "event" in the same timeframe as the general event for the subject are then deemed to be potential causes for this event (e.g., if "foreign policy" and "economy" get many mentions in the context of talking about the candidate when an event is detected, then the candidate probably said or did something about both of them that generated a lot of social media buzz).

In some embodiments, when the issues that potentially caused the event are found, the API is used to further obtain topic discovery data in order to narrow down the root cause. The computer system's topic discovery system is described in U.S. patent application Ser. No. 14/688,865, filed Apr. 16, 2015, entitled "Automatic Topic Discovery in Streams of Unstructured Data," which is incorporated by reference in its entirety. The array of discovered topics for the time interval in which an event was found is cross-referenced with the issues that proved to be significant during this time, and any topics matching these issues are then logged as likely causes.

After an event is detected and likely causes are logged, these results can be referenced in the future or broadcast to an alarm system (e.g., issue an alert) to tell users of an important occurrence relating to their subject of choice.

Accordingly, the methods described here ensure not only that are events discovered for any desired subject on social media, but that these events are of interest both in terms of the subject itself and any subjects to which it is being compared. Further, the cause attribution algorithm determines one or more likely causes of the event. In addition, the signal processing and statistical methods are fast enough to keep up with social media data, so that events can be detected in near-real-time and causes can be attributed to detected events not long after. Combined, this methodology ensures an efficient, focused, and reliable method for detecting social media events and their causes.

To that end, the present disclosure provides a method of classifying and storing data stream history. The method is performed at a computer system including a plurality of processors and memory storing programs for execution by the processors. The method includes: without user intervention, performing a continuous monitoring process. The continuous monitoring process includes receiving a data stream that includes a plurality of packets. The continuous monitoring process further includes distributing the plurality of packets to a filter, wherein the filter accepts packets that meet relevance criteria with respect to a subject. The continuous monitoring process further includes identifying, using the filter, respective packets of the plurality of packets as relevant to the subject. The continuous monitoring process further includes producing a first time-series comprising a series of first time values, each time value in the series of first time values comprising a count of packets identified within a respective first time window by the filter as relevant to the subject. The continuous monitoring process further includes transforming the first time-series into a frequency domain to produce a first spectral density. The continuous monitoring process further includes determining whether the first spectral density has a respective spectral value that meets an alert threshold. The continuous monitoring process further includes, in accordance with a determination that the first spectral density has the value that meets the alert threshold: identifying the subject as an object of an event and issuing an alert based on the determination.

In another aspect, some implementations include a computing system including one or more processors and memory coupled to the one or more processors, the memory storing one or more programs configured to be executed by the one or more processors, the one or more programs including instructions for performing any of the methods described herein.

In yet another aspect, some implementations include a non-transitory computer-readable storage medium storing one or more programs for execution by one or more processors of a computing system, the one or more programs including instructions for performing any of the methods described herein.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 43:
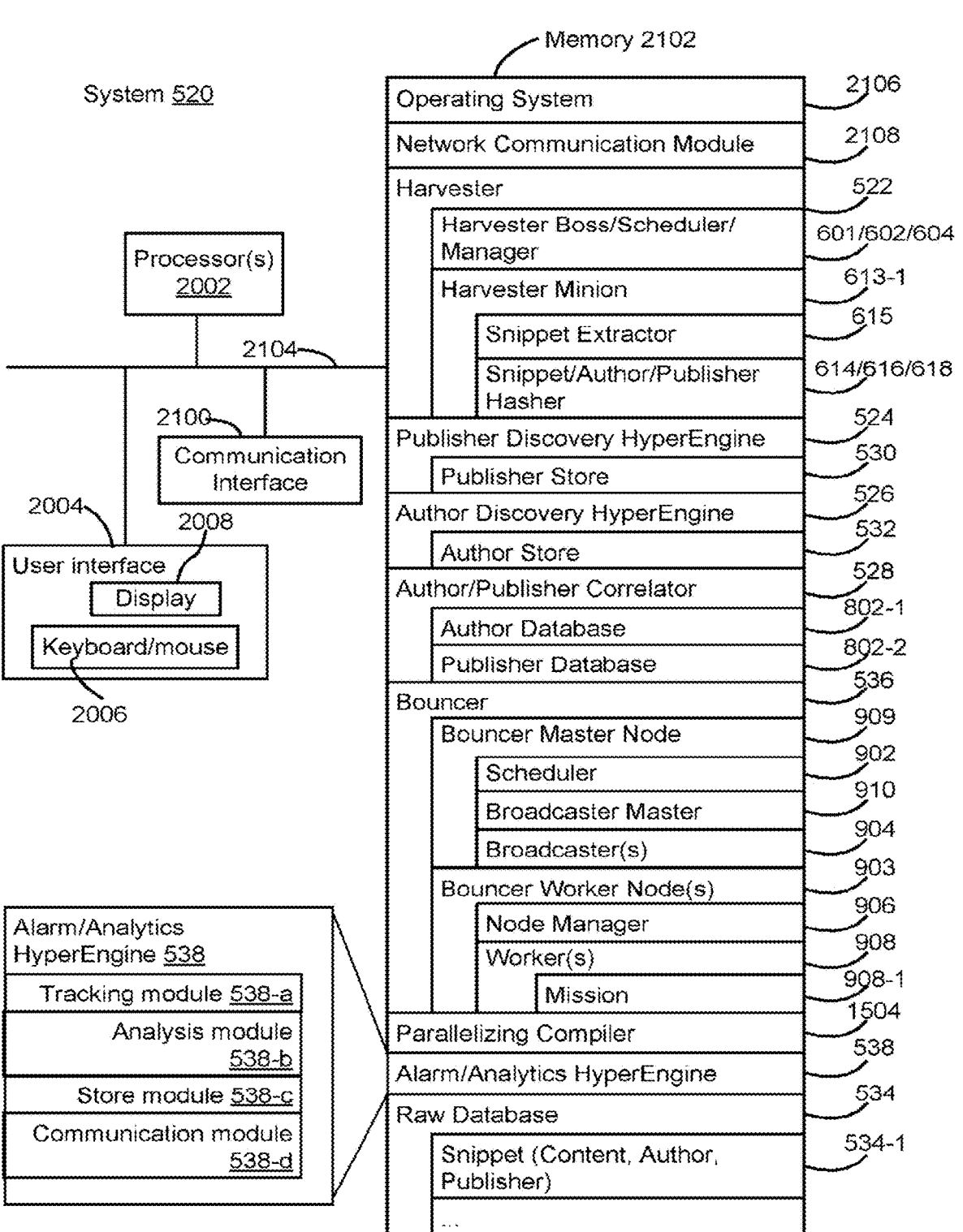
FIG. 43 is a block diagram of a computer system for automatically detecting events and identifying the causes of the events from electronic posts.
Figure 44C:
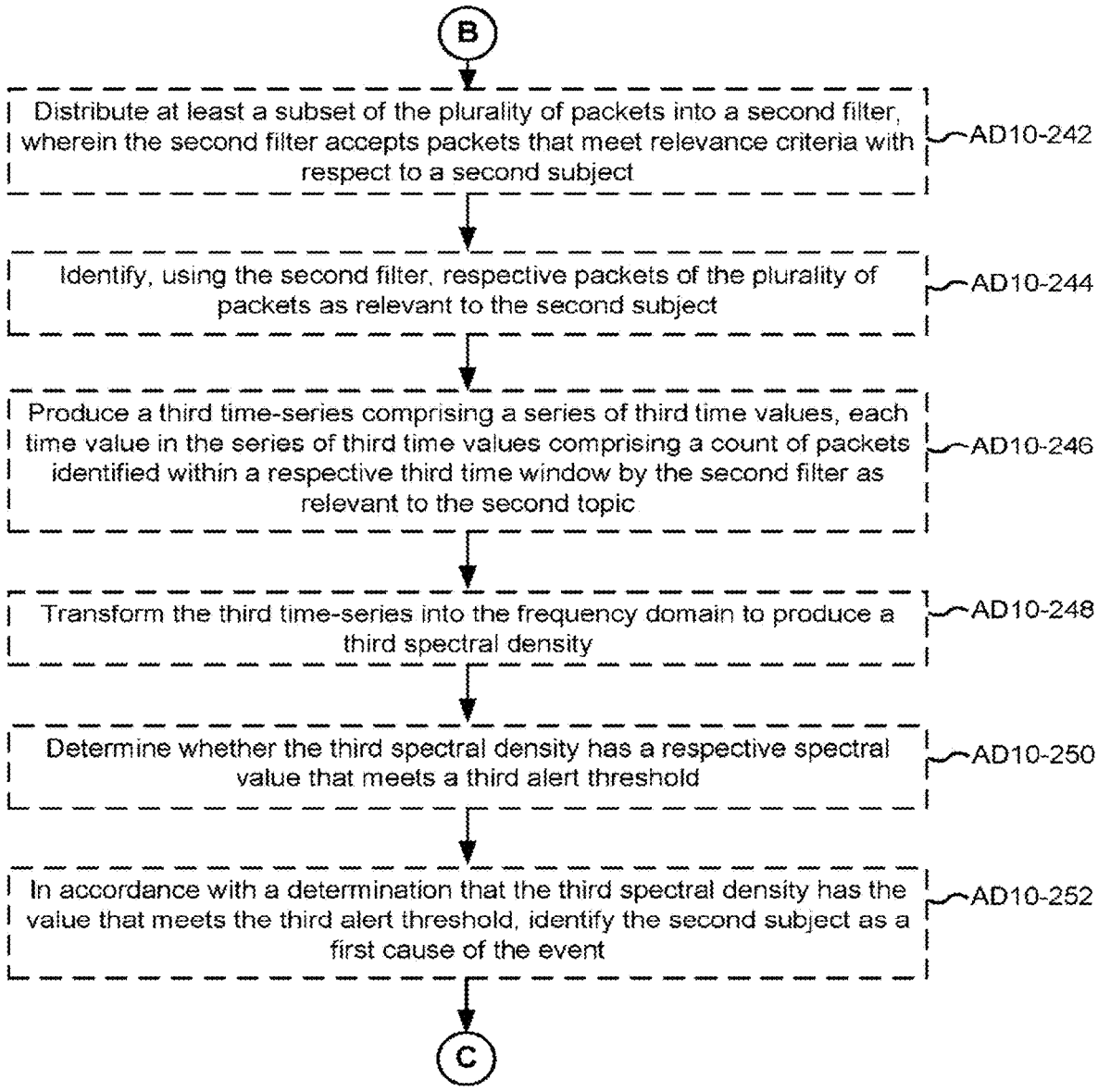
Figure 44D:
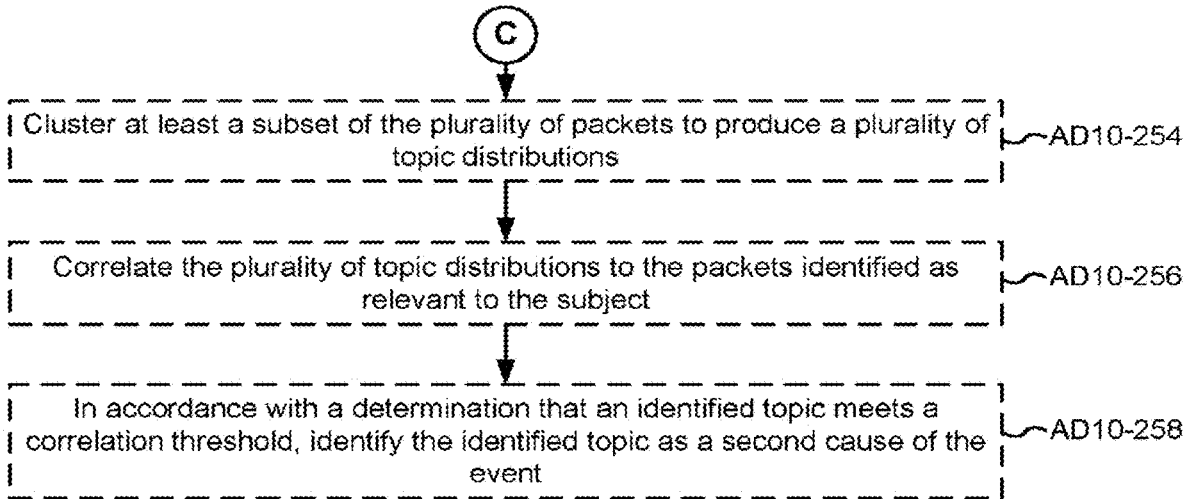

FIG. 43 is a modified block diagram of the computer system 520 shown in FIG. 5B of U.S. patent application Ser. No. 14/214,410, for automatically detecting events and identifying the causes of the events from electronic posts, in accordance with some implementations. The system 520 includes one or more processors 2002 for executing modules, programs and/or instructions stored in memory 2102 and thereby performing predefined operations; one or more network or other communications interfaces 2100; memory 2102; and one or more communication buses 2104 for interconnecting these components. In some implementations, the system 520 includes a user interface 2004 comprising a display device 2008 and one or more input devices 2006 (e.g., keyboard or mouse).

In some implementations, the memory 2102 includes high-speed random access memory, such as DRAM, SRAM, or other random access solid state memory devices. In some implementations, memory 2102 includes non-volatile memory, such as one or more magnetic disk storage devices, optical disk storage devices, flash memory devices, or other non-volatile solid state storage devices. In some implementations, memory 2102 includes one or more storage devices remotely located from the processor(s) 2002. Memory 2102, or alternately one or more storage devices (e.g., one or more nonvolatile storage devices) within memory 2102, includes a non-transitory computer readable storage medium. In some implementations, memory 2102 or the computer readable storage medium of memory 2102 stores the following programs, modules and data structures, or a subset thereof:

an operating system 2106 that includes procedures for handling various basic system services and for performing hardware dependent tasks;

a network communications module 2108 that is used for connecting the system 520 to other computers (e.g., the data sources 502 in FIG. 5A) via the communication network interfaces 2100 and one or more communication networks (wired or wireless), such as the Internet, other wide area networks, local area networks, metropolitan area networks, etc.;

a Harvester 522 for collecting and processing (e.g., normalizing) data from multiple data sources 502 in FIG. 5A, the Harvester 522 further including a Harvester Boss 601, a Scheduler 602, a Harvester Manager 604, and one or more Harvester Minions 613-1, which are described above in connection with FIG. 6, and a Harvester Minion 613-1 further including a snippet extractor 615 for generating packets for the snippets, authors, and publishers encoded using appropriate data structures as described above with reference to FIG. 7, and a snippet hasher 614, an author hasher 616, and a publisher hasher 618 for generating a hash key for the snippet content, author, and publisher of the snippet, respectively;

a Publisher Discovery HyperEngine 524 for inspecting the data stream from the data sources 502 in order to develop a publisher profile for a data source based on, e.g., the snippets published on the data source and storing the publisher profile in the publisher store 530;

an Author Discovery HyperEngine 526 for inspecting the data stream from the data sources 502 in order to develop an author profile for an individual based on, e.g., the snippets written by the individual on the same or different data sources and storing the author profile in the author store 532;

an Author/Publisher Correlator 528 for performing real-time data correlation with existing author information in the author database 802-1 and existing publisher information in the publisher database 802-2 to determine a respective snippet's author and publisher;

a Bouncer 536 for identifying high-value information for a client of the system 520 from snippets coming from different data sources by applying the snippets to mission definitions associated with the client, the Bouncer 536 further including a bouncer master node 909 and one or more bouncer worker nodes 903, the bouncer master node 909 further including a scheduler 902, a broadcaster master 910, and one or more broadcasters 904, whose functions are described above in connection with FIG. 9, and each bouncer master node 909 further including a node manager 906 and one or more workers 908 (each worker handling at least one mission definition 908-1), a more detailed description of the components in the Bouncer 536 can be found above in connection with FIG. 9;

a Parallelizing Compiler 1504 for optimizing a filter network specification associated with a client of the system 520 by, e.g., appropriately merging, reordering filters and removing cycles from the resulting filter network, etc.;

an Alarm/Analytics HyperEngine 538 for determining if and how to deliver alarm messages produced by the Bouncer 536 to end-users using, e.g., predefined communication protocols with the end-users, and generating short-term or long-term statistics through analyzing the incoming information as well historical information from the data sources and determining whether or not to trigger alarms for any violations of predefined criteria associated with a client of the system; and a Raw Database 534 for backing up snippets from the data sources, e.g., after the snippets are normalized by Harvester 522, each snippet having content, author, and publisher information.

FIG. 43 further illustrates modules of the Alarm/Analytics HyperEngine 538, in accordance with some implementations. In some implementations, the Alarm/Analytics HyperEngine 538 includes the following datasets or a subset or superset thereof:

a tracking module 538-a for receiving data packets from the Harvester 522 and for tracking social media statistics (volume and sentiment) for a given subject, for specific missions relating to that subject;

an analysis module 538-b for analyzing data packets, generating data analytics, and predicting trends;

a store module 538-c for storing data packets and other predetermined parameters; and a communication module 538-d for communicating analytics data, alerts, and any other relevant information.

The components of the Alarm/Analytics HyperEngine 538 and their associated descriptions are found in FIGS. 14 and 15.

It should be noted that the programs, modules, databases, etc. in the Alarm/Analytics HyperEngine 538 described above in connection with FIG. 43 may be implemented on a single computer system (e.g., server) or distributed among multiple computer servers that are connected by a computer network. Although a specific hardware configuration may affect the performance of the Alarm/Analytics HyperEngine 538, the implementation of the present application does not have any dependency on a particular hardware configuration.

FIGS. 44A to 44D are flowcharts illustrating a method AD10-200 of current event detection and cause identification, in accordance with some implementations. The method AD10-200 is performed at a computer system (e.g., computer system 520 in FIG. 43) including a plurality of processors (e.g., processors 2002 in FIG. 43) and memory (e.g., memory 2102 in FIG. 43) storing programs for execution by the processor. In some implementations, the method AD10-200 is a continuous monitoring process that is performed without user intervention.

The computer system receives (AD10-202) a data stream that includes a plurality of packets. In some implementations, the data stream includes a plurality of posts, and/or any type of information received over a network. In some implementations, the data (e.g., posts) are received by a Harvester of the computer system (e.g., the Harvester 522 in FIG. 5B), and from multiple data sources (e.g., Data sources 502 in FIG. 5A) such as social media websites, internet forums that host conversation threads, blogs, news sources, etc. Alternatively, in some implementations, posts (e.g., from the Data Sources 502) can include updates from smart thermostats, smart utility meters, automobiles, information from a mobile device (e.g., a smart-phone, Fitbit™ device, etc.), or any other source of real-time data.

In some implementations, the received posts include a content portion and one or more source characteristics, such as an author and/or a publisher. Each of these portions and/or characteristics is referred to as a packet.

Alternatively, in some implementations, the received posts are raw data. Accordingly, after receiving the data stream (e.g., posts), the Harvester 522 performs an initial normalization of each post, including identifying the content, the author, and the publisher. The Harvester 522 then generates one or more packets from each post, including, in some implementations, a content packet (sometimes hereinafter referred to as a "snippet"), a publisher packet and/or an author packet.

In some implementations, the plurality of packets comprise (AD10-204) social media posts. For example, the social media posts include TWITTER™ TWEETS, FACE-BOOK™ posts, online forum comments, YOUTUBE™ videos, and the like. In some implementations, the plurality of packets are received (AD10-206) from a plurality of distinct social media platforms (e.g., TWITTER™ TWEETS, FACEBOOK™ posts, and online forum comments).

In some implementations, the plurality of packets are received (AD10-208) from a plurality of distinct users. The plurality of distinct users include users with distinct social media user names, social media user accounts, social media platforms, demographics etc.

The computer system distributes (AD10-212) the plurality of packets to a filter, wherein the filter accepts packets that meet relevance criteria with respect to a subject. In some implementations, the filter is also known as a filter node (e.g., filter node 110 in FIG. 1) or a classification model. In some implementations, the filter accepts packets based on content and/or metadata of the packets. In some implementations, the filter is one of a plurality of filters that are interconnected to form a model (e.g., model 102 in FIG. 1). In some implementations, the filter is part of a mission definition (e.g., mission definition 100 in FIG. 1 and/or mission definition 200 in FIG. 2). In some implementations, the filter is the mission definition. In some implementations, the filter is part of a real-time massively parallel classification system (e.g., Bouncer 536 in FIG. 9).

In some implementations, the filter includes one or more of the group consisting of: lexical filters 304, vocabulary filters 306, semantic filters 308, statistical filters 310, thematic ontologies 312, and corrective feedback 314. The filter can also be embodied as regular expressions, such as the regular expression 402 which accepts phrases like "Best Car Wash Ever," "Best Burger Ever," and "Best Movie I have ever seen."

The computer system identifies (AD10-214), using the filter, respective packets of the plurality of packets as relevant to the subject. In some implementations, the filter identifies respective packets of the plurality of packets as relevant to the subject, based on contents and metadata (such as author/publisher information, demographics, author influences, etc.) associated with the post/snippet.

In some implementations, relevance criteria can include one or more nouns (e.g., name of a person, name of a place, a location, a brand name, name of a competitor) and/or one or more verbs associated with the one or more nouns.

In some implementations, the filter identifies respective packets of the plurality of packets as relevant to the subject, based on contents and metadata (such as author/publisher information, demographics, author influences, etc.) associated with the post/snippet.

In some implementations, identifying, using the filter, respective packets of the plurality of packets as relevant to the subject further includes tagging the respective packets of the plurality of packets with an identifier of the filter.

In some implementations, identification of respective packets as relevant to the subject causes the respective packets to progress further downstream in the mission definition. In some implementations, an identification of respective packets as relevant to the subject causes the respective identified packets to be directed to one or more other channels (e.g., a subsequent filter in the Bouncer 536, the Alarm/Analytics HyperEngine 538, and the Topic Discovery HyperEngine 586. See FIG. 5B).

In some implementations, identification of respective packets as relevant to the subject causes the respective packets to be directed to the Alarm/Analytics HyperEngine 538, where further analyses are performed on the respective packets. For example, the tracking module 538-a of the Alarm/Analytics HyperEngine 538 receives the respective packets from the Harvester 522 and tracks the packets according to the filter classification. The analysis module 538-b of the Alarm/Analytics HyperEngine 538 analyzes the respective received packets to generate data analytics and predict trends.

The computer system produces (AD10-216) a first time-series comprising a series of first time values, wherein each time value in the series of first time values comprises a count of packets identified within a respective first time window by the filter as relevant to the subject. In some implementations, the first time-series comprising a series of first time values is produced using the analysis module 538-b. The analysis module 538-b includes an option to define the time span of the first time window. In some implementations, the first time window can range anywhere from seconds, minutes, hours, weeks, months, and years (e.g., within the last hour, in the last three days, etc.). Furthermore, in some implementations, fractions of the respective time units (e.g., milliseconds) can be defined for the first time window. In addition, in some implementations, the first time window can be defined using specific dates and/or time ranges (e.g., from 2:30:05 PM on 23 Jan. 2016 to 1:03:00 AM on 24 Jan. 2016), and/or excluding specific dates (e.g., from 23 Jan. 2016 to 23 Mar. 2016 excluding Mondays).

The computer system transforms (AD10-218) the first time-series into a frequency domain (e.g., Fast Fourier transform) to produce a first spectral density. In some implementations, the transforming step is carried out using the analysis module 538-b. In some implementations, the analysis module 538-b further performs a normalization step before or after transforming the time series into the frequency domain. For example, prior to the transforming step, the analysis module 538-b normalizes (AD10-217) the time series based on a static relevance for the subject compared to a plurality of other subjects. Alternatively, in some implementations, after the first spectral density has been produced, the analysis module 538-b normalizes (AD10-

219) the first spectral density based on a static relevance for the subject compared to a plurality of other subjects.

The computer system determines (AD10-222) whether the first spectral density has a respective spectral value that meets an alert threshold (e.g., using the analysis module 538-b).

In some implementations, the alert threshold value is predetermined (e.g., fixed) and is stored in the store module 538-c. In this example, the analysis module 538-b computes a maximum value for the first spectral density, compares the computed value with the predetermined alert threshold value, and determines if the computed value exceeds the predetermined alert threshold value.

In some implementations, the alert threshold value is defined as a parameter of the first spectral density. For example, the alert threshold is defined as a fixed number of standard deviations (e.g., $2\sigma$), or a fixed percentage, above the average value of the respective first spectral density. In this instance, the analysis module 538-b calculates an average value, a standard deviation, and a maximum value for the first spectral density, calculates an alert threshold value based on the calculated average and standard deviation, compares the maximum value of the first spectral density and the calculated alert threshold value, and determines if the maximum value exceeds the calculated alert threshold value.

In accordance with a determination that the first spectral density has the value that meets the alert threshold, the computer system 520 identifies (AD10-224) the subject as an object of an event, and issues (AD10-227) an alert based on the determination (e.g., using the communication module 538-d). In some embodiments, the alert is issued to users based on a set of one or more demographics for the user. For example, in some circumstances, the alert will include a "shelter-in-place" alert in response to an on-going terrorist attack, and the system will provide the alert only to users in the affected location. In other embodiments, alerts are provided to user's who sign up for alerts related to the subject (e.g., who have signed up to stay informed as to a particular political candidate).

In some implementations, the analysis module 538-b includes a band-pass filter with adjustable cutoff frequencies. According to this implementation, the first spectral density is filtered (AD10-220) using the band-pass filter after transforming the first time-series into frequency domain, and before determining whether the first spectral density has the respective value that meets the alert threshold.

Furthermore, as described above, the plurality of packets are received from users, including (AD10-210) users of a respective demographic. Accordingly, in some implementations, the filter can be configured to accept packets associated with the respective demographic, and the event is identified (AD10-226) as relevant for the respective demographic.

As disclosed above, the steps of determining (AD10-222), identifying (AD10-224), and issuing (AD10-227) are performed in the frequency domain. However, in some implementations (not shown), the analysis module 538-b includes capabilities to perform analyses in the time domain. For example, the computer system calculates a first time derivative and a second time derivative of the first time-series to identify the rate of volume changes (e.g., using the analysis module 538-b).

In some embodiments (AD10-230), operations AD10-232 through AD10-238 are performed in accordance with an identification of the subject as an object of an event.

In some implementations, in accordance with an identification of the subject as an object of an event, the computer system produces (AD10-232) a second time-series comprising a series of second time values (e.g., using the analysis module 538-b), each time value in the series of second time values comprising a count of packets identified within a respective second time window by the filter as relevant to the subject, wherein the second time value has a shorter duration than the first time value. (As an example, the first time value is 30 seconds and the second time value is 5 seconds.) In some implementations, the second time window is defined using the analysis module 538-b, in ways analogous to the definition of the first time window using the analysis module 538-b.

After the second time-series is produced, the computer system transforms (AD10-234) the second time-series into the frequency domain (e.g., Fast Fourier transform) to produce a second spectral density. The computer system determines (AD10-236) whether the second spectral density has a respective spectral value that meets a high-resolution alert threshold.

In accordance with the implementations of the alert threshold for the first spectral density, as described above, the high-resolution alert threshold can be a predetermined (i.e. fixed) value that is stored (e.g., in the store module 538-c). Alternatively, the high-resolution alert threshold can be defined as a parameter of the second spectral density.

In accordance with a determination that the second spectral density has the value that meets the high-resolution alert threshold, the computer system confirms (AD10-238) that the subject is the object of the event. In some implementations, the computer system further determines (AD10-240), from the second time-series, when the event occurred.

As described above with respect to step AD10-214, in some implementations, an identification of respective packets as relevant to the subject causes the respective packets to progress further downstream and be directed to a subsequent filter (e.g., the Bouncer 536 in FIG. 5B). Accordingly, in this implementation, the computer system distributes (AD10-242) at least a subset of the plurality of packets into a second filter, wherein the second filter accepts packets that meet relevance criteria with respect to a second subject. The computer system identifies (AD10-244), using the second filter, respective packets of the plurality of packets as relevant to the second subject.

(As an example, the filter pertaining to "Chevron" identifies a plurality of packets including the V-shape mark and gas company. A designation of the second filter with the term "Oil OR Natural gas" allows packets relevant to the company Chevron oil and natural gas to be identified.)

In some implementations, after identifying respective packets of the plurality of packets as relevant to the second subject, the computer system produces (AD10-246) a third time-series comprising a series of third time values (e.g., using the analysis module 538-b), each time value in the series of third time values comprising a count of packets identified within a respective third time window by the second filter as relevant to the second topic. In some implementations, the third time window is defined using the analysis module 538-b, in ways analogous to the definition of the first time window using the analysis module 538-b.

The computer system transforms (AD10-248) the third time-series into the frequency domain (e.g., Fast Fourier Transform) to produce a third spectral density.

The computer system determines (AD10-250) whether the third spectral density has a respective spectral value that meets a third alert threshold. In accordance with the implementations of the alert threshold for the first spectral density, as described above, the third alert threshold can be a predetermined (i.e. fixed) value that is stored (e.g., in the store module 538-*c*). Alternatively, the third alert threshold can be defined as a parameter of the third spectral density.

In some implementations, in accordance with a determination that the third spectral density has the value that meets the third alert threshold, the computer system identifies (AD10-252) the second subject as a first cause of the event.

Further, as described above with respect to step AD10-214, in some implementations, an identification of respective packets as relevant to the subject causes the respective packets to progress further downstream and be directed to the Topic Discovery HyperEngine 586 (see FIG. 5B) Accordingly, in this implementation, the computer system clusters (AD10-254) at least a subset of the plurality of packets to produce a plurality of topic distributions (e.g., using the clustering module 586-*c* that is described in U.S. patent application Ser. No. 14/688,865). The computer system correlates (AD10-256) the plurality of topic distributions to the packets identified as relevant to the subject. In accordance with a determination that an identified topic meets a correlation threshold, the computer system identifies (AD10-258) the identified topic as a second cause of the event.

(G1) In one aspect, some implementations include a computer system including a plurality of processors and memory storing programs for execution by the processors: without user intervention, performing a continuous monitoring process, including: receiving a data stream that includes a plurality of packets; distributing the plurality of packets to a filter, wherein the filter accepts packets that meet relevance criteria with respect to a subject; identifying, using the filter, respective packets of the plurality of packets as relevant to the subject; producing a first time-series comprising a series of first time values, each time value in the series of first time values comprising a count of packets identified within a respective first time window by the filter as relevant to the subject; transforming the first time-series into a frequency domain to produce a first spectral density; determining whether the first spectral density has a respective spectral value that meets an alert threshold; and in accordance with a determination that the first spectral density has the value that meets the alert threshold: identifying the subject as an object of an event; and issuing an alert based on the determination.

(G2) In some implementations of the method of (G1), further including: before determining that the first spectral density has the respective value that meets the alert threshold, filtering the first spectral density using a band-pass filter.

(G3) In some implementations of the method of any of (G1)-(G2), further including: normalizing, based on a static relevance for the subject compared to a plurality of other subjects, at least one of: the time series; the spectral density; and the relevance threshold.

(G4) In some implementations of the method of any of (G1)-(G3), wherein the plurality of packets comprise social media posts.

(G5) In some implementations of the method of any of (G1)-(G4), wherein the plurality of packets are received from a plurality of distinct social media platforms.

(G6) In some implementations of the method of any of (G1)-(G5), wherein the plurality of packets are received from a plurality of distinct users.

(G7) In some implementations of the method of any of (G1)-(G6), wherein: the plurality of packets are received from a respective demographic; and the event is identified as relevant for the respective demographic.

(G8) In some implementations of the method of any of (G1)-(G7), further comprising: in accordance with an identification of the subject as an object of an event: producing a second time-series comprising a series of second time values, each time value in the series of second time values comprising a count of packets identified within a respective second time window by the filter as relevant to the subject, wherein the second time value has a shorter duration than the first time value; transforming the second time-series into the frequency domain to produce a second spectral density; determining whether the second spectral density has a respective spectral value that meets a high-resolution alert threshold; and in accordance with a determination that the second spectral density has the value that meets the high-resolution alert threshold, confirming that the subject is the object of the event.

(G9) In some implementations of the method of (G8 ), from the second time-series, determining when the event occurred.

(G10) In some implementations of the method of any of (G1)-(G9), further comprising: distributing at least a subset of the plurality of packets to a second filter, wherein the second filter accepts packets that meet relevance criteria with respect to a second subject; identifying, using the second filter, respective packets of the plurality of packets as relevant to the second subject; producing a third time-series comprising a series of third time values, each time value in the series of third time values comprising a count of packets identified within a respective third time window by the second filter as relevant to the second topic; transforming the third time-series into the frequency domain to produce a third spectral density; determining whether the third spectral density has a respective spectral value that meets a third alert threshold; and in accordance with a determination that the third spectral density has the value that meets the third alert threshold, identifying the second subject as a first cause of the event.

(G11) In some implementations of the method of any of (G1)-(G10), further comprising: clustering at least a subset of the plurality of packets to produce a plurality of topic distributions; correlating the plurality of topic distributions to the packets identified as relevant to the subject; and in accordance with a determination that an identified topic meets a correlation threshold, identifying the identified topic as a second cause of the event.

(G12) In some implementations a computer system comprising: one or more processors; and memory coupled to the one or more processors, the memory storing one or more programs configured to be executed by the one or more processors, the one or more programs including instructions for performing the method of any of (G1)-(G11).

(G13) In some implementations of a non-transitory computer-readable storage medium storing one or more programs, the one or more programs comprising instructions which, when executed by a computer system, cause the system to perform the method of any of (G1)-(G11).

Neural Nets Server

This application relates to deep learning based on images and labels.

Computational models can be developed that to some extent can identify particular subjects that appear in images. Training such models is a lengthy and computationally complex task and, even then, the models that are developed produce results that might not have desired success rates (i.e., the models do not identify the particular subjects in images with a desired degree of accuracy) and/or the models and/or the model outputs are not suited for use in particular data analysis applications. Therefore, there is a need for methods for training image recognition models that allows for faster training of models that are appropriate for specific data analysis applications.

In some implementations, an end-to-end neural network-based system allows deep learning from images and labels corresponding to those images. For example, a system can employ methods described herein to identify demographic characteristics associated with individuals shown in images associated with one or more electronic messages (e.g., demographic criteria of authors and/or subjects of social media posts or chat messages that include images of those authors and/or subjects). In some implementations, the demographic characteristics that can be identified include but are not limited to: age, gender and/or ethnicity of individuals shown in images. As another example, a system can employ methods described herein to identify physical characteristics of objects depicted in images associated with one or more electronic messages. In some implementations, the objects can be any object type, including but not limited to: food items, store fronts, vehicles, personal goods (e.g., watches, pens, wallets, handbags), electronic devices (e.g., mobile phones, laptops, tablets) and/or printed matter (e.g., books, magazines, newspapers).

In some implementations, a neural network that is employed for the above-described purposes is trained using labeled sets of training images, where the labels identify specific characteristics of objects or individuals depicted in the training images. In some implementations, the neural network is trained by a method described herein to identify for a wide range of untrained images (e.g., images associated with electronic messages) the same specific characteristics used to label the training images. Typically, these specific characteristics are limited in number and are highly relevant to specific data analysis missions. For example, a particular data analysis mission might involve identifying for a large corpus of electronic messages (or online content sources) the age, gender and/or ethnicity (or ranges of those characteristics) of individuals shown in images associated with those electronic messages or online sources who are drinking or holding a specific brand of soft drink. In some implementations, once a neural network is trained to recognize image characteristics, the labels from the training set can be employed to provide a standard set of labels for images with corresponding recognized image characteristics. This facilitates system notifications or explanations that are generated as a result of the system successfully analyzing subject characteristics in one or more messages with associated images, including high value messages, which might relate to an emergency situation analyzed/filtered by a data analysis system in real time (as described in the applications incorporated by reference herein).

Figure 45:
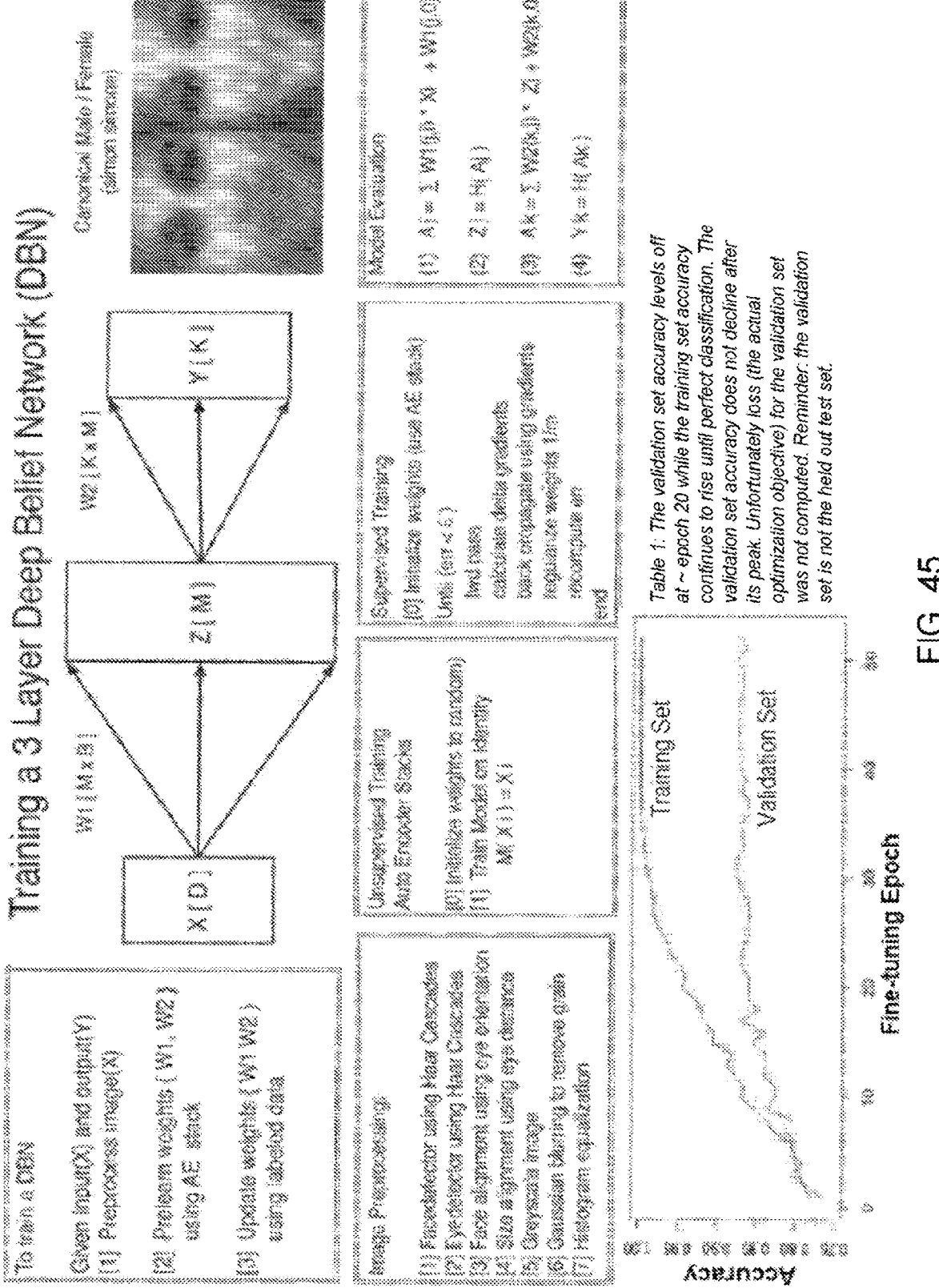
FIG. 45 illustrates training a neural network, in accordance with some implementations.
Figure 46:
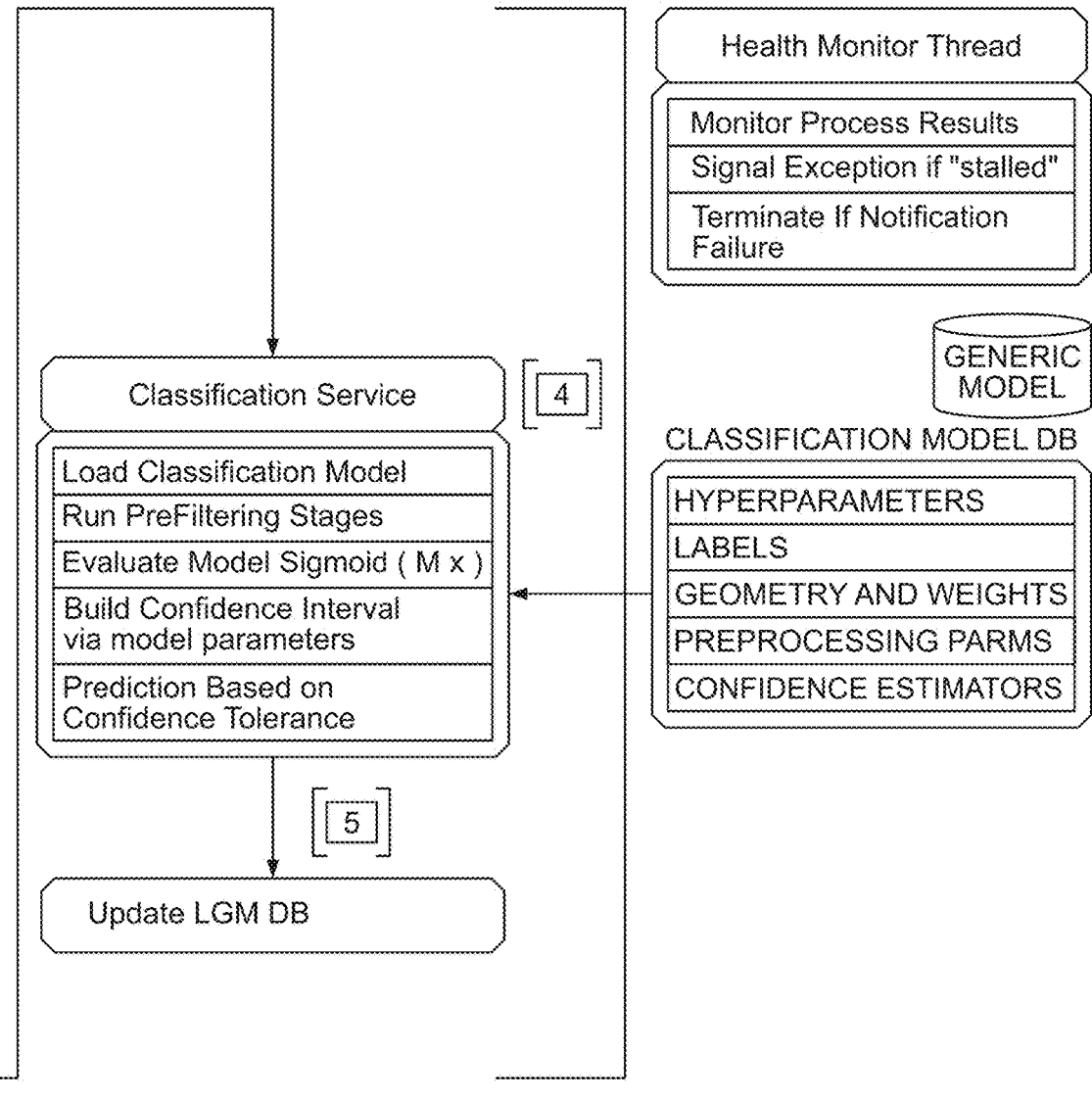
FIG. 46 illustrates neural nets classifier service, in accordance with some implementations.
Figure 47:
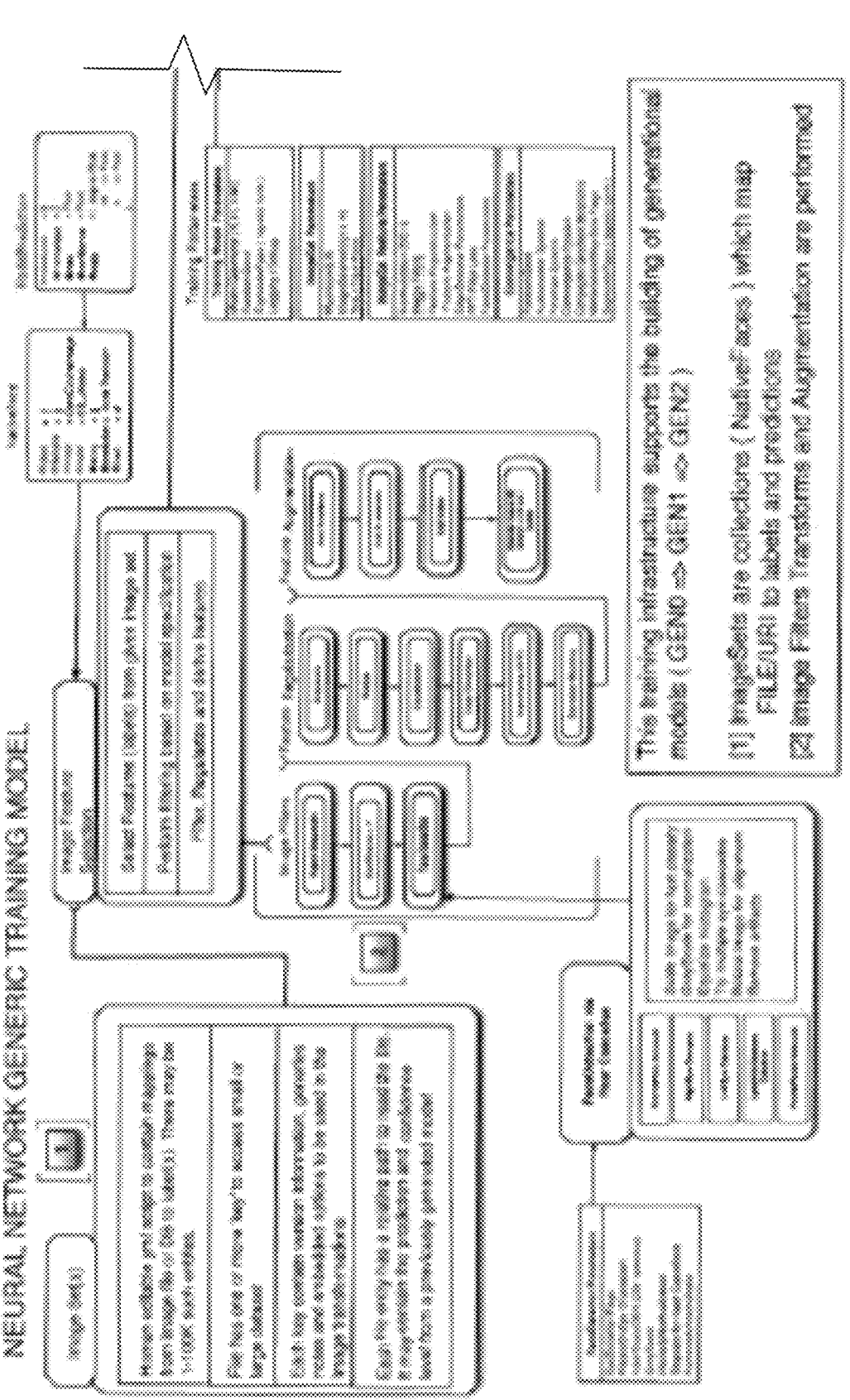
FIG. 47 illustrates neural network generic training model, in accordance with some implementations.
Figure 47:
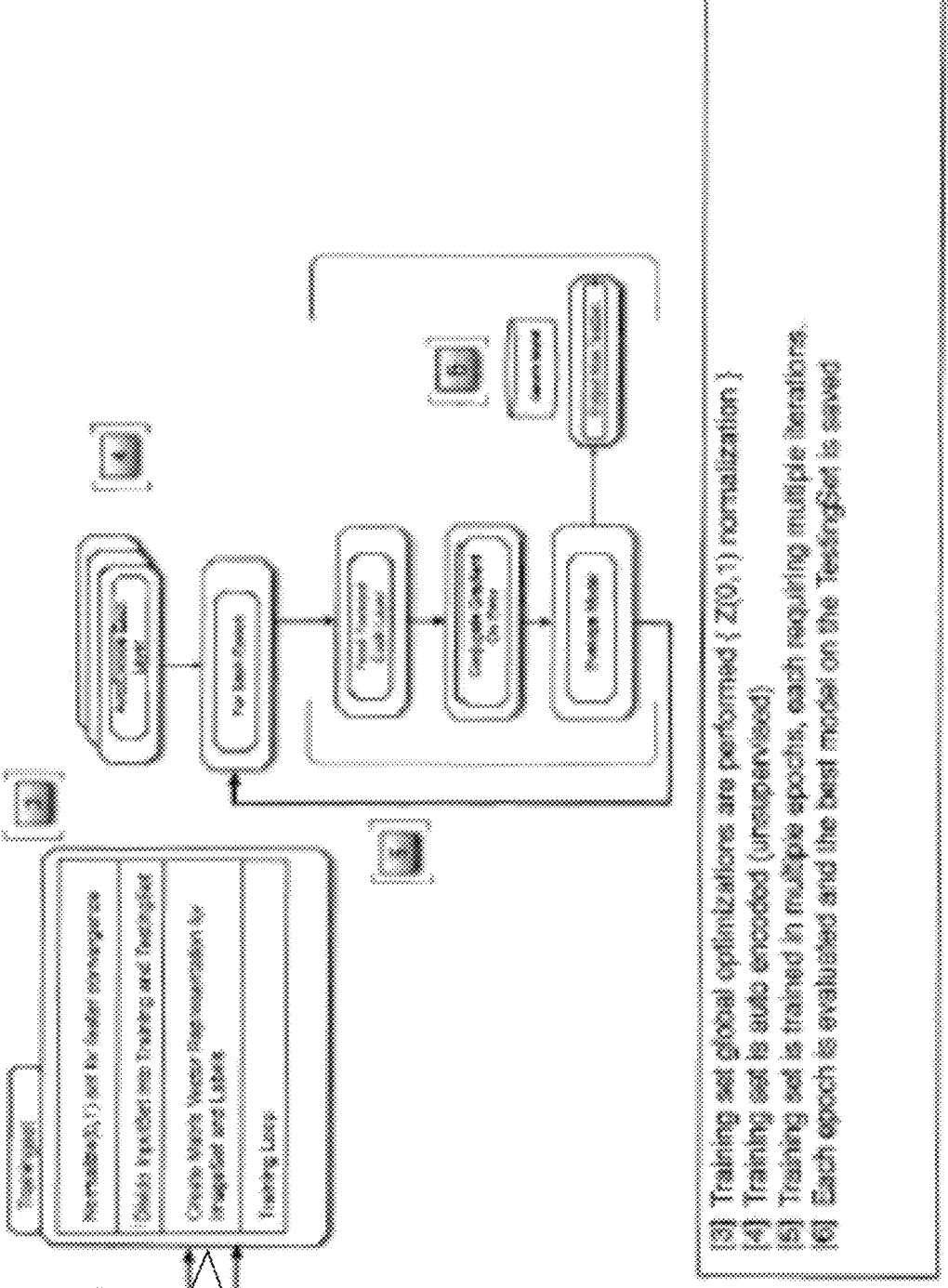

In some implementations, an efficient method described herein and shown in FIGS. 45-47, for training the image recognition models allows a neural network model to be quickly trained to perform as accurately as possible given the subject domain, image characteristics, and/or types of images analyzed by the neural network. In some implementations, the training method employs two or more training epochs, wherein in each epoch a neural network model is trained to recognize at least a predefined percentage of images in a training set with subject characteristics that are more likely than not to belong to predefined classes with respect to that subject characteristic. For example, if an image characteristic to be identified for one or more persons in an image is age, then the neural network model is trained in each of the one more epochs to identify whether a person in an image of a set of training images is more likely than not to be in one of plurality of age ranges—e.g., 0-2, 3-5, 6-10, 11-14, 15-19, 20-30, etc. Once a training epoch is completed, a subsequent training epoch is initiated in which images with subject characteristics that were correctly identified by the neural network model in the prior epoch are gradually/slowly removed from the set of training images. In this way, the neural network model is configured to recognize subject characteristics that it was not able to successfully recognize in particular images in a prior epoch while retaining its ability to correctly identify subject characteristics in particular images that were successfully identified in the prior epoch or epochs. This iterative training process can continue for two or more epochs until a desired success rate is achieved. Also, due to this iterative/staged approach, training in each epoch and therefore overall training for the model via a series of training epochs can proceed more rapidly than with a single training cycle wherein the neural network is trained to reach a desired accuracy rate. That is, in some implementations, neural networks trained as described herein can be trained to achieve acceptable image recognition results with a high training rate compared to conventional methods.

In some implementations, image recognition methods described herein can be employed as software module in message filtering systems similar to those described in the applications incorporated herein by reference to provide additional information and/or notifications derived from images that are associated with high value messages that meet message filtering criteria. The training methods described herein used to train neural network models can be implemented offline, or as a training module in the context of a message filtering system as described in the incorporated applications, on actual images and messages filtered by the system, which are retained as historical messages in an associated database. When implemented as a system module, additional data flags and information related to performance/completion of the training epochs (e.g., the images and characteristics that were successfully classified) are provided, tracked and/or managed by the neural training module.

In some implementations, methods described herein can be implemented in message filtering systems similar to those described in the applications incorporated herein by reference to provide additional information from images that is used to evaluate whether a message and/or notifications derived from images that are associated with high value messages that meet message filtering criteria.

In some implementations, a neural-network-based deep learning module is employed to identify characteristics of interest from images that are obtained from streams of messages. For example, the images can be associated with or attached to text messages, chat messages, social media posts, or bulletin board posts.

In some implementations, geometry and parameters for the learning module may be defaulted to the best set known and allow overrides.

A novel method of creating confidence intervals for the generated models may be presented.

For the final output layer, the raw scores may be saved before the sigmoidal activation is applied. Three classes of statistics may be calculated as follows: (labels are 0|1)

$$p0 = (label == 0) \&\& (prediction == 0)$$

$$p1 = (label == 1) \&\& (prediction == 1)$$

$$ne = label \,!= prediction$$

STD(0,1) statistics may be calculated on {p0 p1 ne} giving a strength to the classification event. The {p0 p1 ne} statistics may be stored with the model to calculate confidence intervals for data that has not been classified.

Models may be created and evaluated in minutes due to the efficiency of the atlas blas libraries. A priority based deep learning methodology may be created that accelerates learning by: training records which may be evaluated w.r.t {LR—learning rate, PR—priority rate, with the base rates set at 1.0}. For each epoch if a record trained correctly, the LR may be incremented by the [0..1] normalized confidence. For each epoch, if a record has not trained correctly PR may be incremented by one. For each epoch, base statistics (BS(0,1)) may be established for each label and labels may be removed whose LR scores are within 2-3 sd of BS. This may remove labels that may be learned.

In some implementations, methods described herein can be employed in message filtering systems similar to those described in the applications incorporated herein by reference to provide additional information and/or notifications derived from images that are associated with high value messages that meet message filtering criteria.

In some implementations, methods described herein can be implemented in message filtering systems similar to those described in the applications incorporated herein by reference to provide additional information from images that is used to evaluate whether a message and/or notifications derived from images that are associated with high value messages that meet message filtering criteria.

In some implementations, a neural-network-based deep learning module is employed to identify characteristics of interest from images that are obtained from streams of messages. For example, the images can be associated with or attached to text messages, chat messages, social media posts, or bulletin board posts. For example, neural network models configured as described herein can be used to process images in real time streams of electronic messages as described in the applications incorporated herein.

In some implementations, geometry and parameters for the learning module may be defaulted to the best set known and allow overrides.

A novel method of creating confidence intervals for the generated models may be presented.

For the final output layer, the raw scores may be saved before the sigmoidal activation is applied. Three classes of statistics may be calculated as follows: (labels are 0|1)

$$p0 = (label == 0) \&\& (prediction == 0)$$

$$p1 = (label == 1) \&\& (prediction == 1)$$

$$ne = label \,!= prediction$$

STD(0,1) statistics may be calculated on {p0 p1 ne} giving a strength to the classification event. The {p0 p1 ne} statistics may be stored with the model to calculate confidence intervals for data that has not been classified.

Models may be created and evaluated in minutes due to the efficiency of the Atlas Blas libraries. A priority based deep learning methodology may be created that accelerates learning by: training records which may be evaluated with respect to {LR-learning rate, PR—priority rate, with the base rates set at 1.0}. For each epoch if a record trained correctly, the LR may be incremented by the [0..1] normalized confidence. For each epoch, if a record has not trained correctly PR may be incremented by one. For each epoch, base statistics (BS(0,1)) may be established for each label and labels may be removed whose LR scores are within 2-3 sd of BS. This may remove labels that may be learned.

(H1) In one aspect, some implementations include a method for real-time extraction of high-value information from data streams, comprising: at a data filtering system that includes one or more computers having a plurality of processors and memory storing programs for execution by the processors: receiving an image from a source, wherein the source has a source identifier; determining, by analyzing the image, one or more attributes for the source; storing in memory, as a source profile identified by the source identifier for the source, the one or more attributes for the source; receiving a post from the source, wherein the post includes content; in real time, for the post: determining, from the post, the source identifier for the source; using the source identifier for the post, querying the memory to access the source profile; correlating the post with attributes of the source stored in the source profile to produce a correlated post, including the one or more attributes determined from the image; and broadcasting the correlated post to a plurality of filter graph definitions, wherein each of the filter graph definitions in the plurality of filter graph definitions is configured to identify posts with high value information according to the respective filter graph definition, wherein posts are identified at least in part based on both the attributes of the source and the content of the second post.

(H2) In some implementations of the method of (H1), wherein the analyzing the image includes analyzing the image using a neural network.

(H3) In some implementations of the method of (H1) or (H2), wherein correlating the second post with attributes of the source includes appending the source profile to the second post.

(H4) In some implementations of the method of any of (H1)-(H3), wherein the source profile is a universal array of source attributes, wherein the universal array of source attributes stores information for each attributed in a set of attributes that is independent of the source.

(H5) In some implementations of the method of (H4), wherein the universal array of source attributes is stored as a run-length-encoded bitvector.

(H6) In some implementations of the method of any of (H4)-(H5), wherein the set of attributes that is independent of the sources is a set of ZIP codes.

(H7) In some implementations of the method of any of (H1)-(H6), wherein: the source profile is stored in a multi-level cache; and the method further comprises maintaining the multi-level cache, including: upon occurrence of pre-defined eviction criteria, evicting, from a first level of the multi-level cache, one or more source profiles corresponding to respective sources; upon eviction from the first level of the multi-level cache, updating the attributes stored in the evicted source profiles.

(H8) In some implementations of the method of (H7), wherein the multi-level cache is a lockless cache.

(H9) In some implementations of the method of any of (H7)-(H8), wherein the multi-level cache is unprimed.

(H10) In some implementations of the method of any of (H7)-(H9), wherein the eviction is random or pseudo-random.

(H11) In some implementations of the method of any of (H7)-(H10), wherein updating the attributes stored in the evicted source profiles includes, for a respective evicted source profile:updating the respective evicted source profile with information obtained from other posts received from the corresponding source during the time that the respective evicted source profile was in the first level of the multi-level cache.

(H12) In some implementations of the method of any of (H7)-(H11), wherein updating the attributes stored in the evicted source profiles includes, for a respective evicted source profile:determining that a respective attribute stored in the respective evicted source profile is stale; and removing the respective attribute from the respective evicted source profile.

(H13) In one aspect, some implementations include a computer system comprising: one or more processors; and memory coupled to the one or more processors, the memory storing one or more programs configured to be executed by the one or more processors, the one or more programs including instructions for performing the method of any of (H1)-(H12).

(H14) In one aspect, some implementations include a non-transitory computer-readable storage medium storing one or more programs, the one or more programs comprising instructions which, when executed by a computer system, cause the system to perform the method of any of (H1)-(H12).

Real-Time K-Means Classification

The application relates to methods of classifying structured data streams in real-time and computer systems that perform such methods.

Several methods exist for classifying structured data. Structured data are data that are human readable and indexed. Examples of structured data include database objects and spreadsheets. Classification is the problem of mapping input data to a category. Classification is an instance of supervised learning, i.e., learning where a training set of correctly identified observations is available. Some of the common supervised classification techniques include Decision Tree, Support Vector Machine (SVM), Linear Discriminants, K-Nearest Neighbors, and Neural Networks. K-means is one of the most popular clustering method for large datasets. While the primary application of k-means is clustering or unsupervised classification, the algorithm can be adapted for the purpose of supervised classification. K-means clustering is first used to find groups in unlabeled data. The algorithm iteratively assigns each data point to one of k groups based on a known set of features. Data points are thus clustered based on feature similarity. The results of the clustering algorithm include the centroids of the k clusters. The centroids can then be used to classify new data.

Classification of data in real-time environments is challenging, however. Extremely high rate data streams combined with low latency requirements test the limits of conventional techniques. For example, typical latency requirements are in the order of milliseconds while data rate can be several Gigabytes per second. Classification by itself is computationally expensive. The time complexity increases as the size of the training data increases. Parallelization through data partitioning can significantly reduce computation time. Known techniques, such as the GTS Indexing System and HADOOP-based solutions, pose scalability and latency problems. Spark and pipelining based approaches reduce the latency somewhat by copying data across host nodes and by use of deep pipelines, but the latency is still in the order of minutes if not hours. Broadcasting of data replicas bottleneck performance in some such systems. Data broadcasting trees avoid this bottleneck but the latency jumps back to hours or even days. Besides, the cost of such systems is exorbitant.

Accordingly, there exists a need to overcome the deficiencies and limitations described hereinabove.

To address the aforementioned problems with conventional techniques, systems and methods are described herein that greatly increase the speed of data classification such that, in some circumstances, it can be used to classify structured data in near real-time. The real-time parallel k-means clustering system described herein provides the functionality of asynchronously classifying structured data packet streams through a massively scalable network of classifying engines (e.g., linear algebra engines implemented using BLAS routines). The system is designed with the goal of training a model to find centroids for K clusters in N dimensions and utilizing either the computed centroids or using user-provided centroids to find the P nearest clusters that an input data packet belongs to, where, K represents the number of classification categories, N represents the data-dimensionality, and P represents the number of clusters to which a data point could be potentially classified.

In some implementations, a method is performed at a computer system including a plurality of processors and memory storing programs for execution by the processors. The method includes receiving a data stream that includes a plurality of data packets. The method further includes segmenting each respective data packet in the plurality of data packets to a plurality of data segments, and storing the plurality of data segments to a first transitional memory, while continuing to receive data streams. The method further includes clustering the plurality of data segments, using a plurality of classifying engines, to compute a plurality of data clusters including by: (1) reading one or more data segments in the plurality of data segments from the first transitional memory, and (2) calculating a L-2 norm (i.e., Euclidean norm or Euclidean distance) for each respective data segment in the one or more data segments, and storing the plurality of data clusters to a second transitional memory, wherein each respective data cluster in the plurality of data clusters comprises of one or more data segments in the plurality of data segments. The method further includes aggregating the plurality of data clusters, using a lockless hash-map, to compute a plurality of min-distance vectors including by reading one or more data clusters in the plurality of data clusters from the second transitional memory, and storing the plurality of min-distance vectors to a third transitional memory, wherein each respective min-distance vector in the plurality of min-distance vectors corresponds to a data packet in the plurality of data packets. The method further includes sorting each respective min-distance vector in the plurality of min-distance vectors to compute a plurality of minimum distances for each respective data packet in the plurality of data packets including by reading the plurality of min-distance vectors from the third transitional memory (e.g., using an efficient sorting algorithm, such as an N-selection sort that guarantees $O(n^2)$ performance). The method further includes outputting, for each respective data packet in the plurality of data packets, the plurality of minimum distances that corresponds to the respective data packet.

In another aspect, a server system is provided to perform the steps of the method. In some implementations, a non-transitory computer readable storage medium storing a set of instructions, which when executed by a server system with one or more processors cause the one or more processors to perform the steps of the method.

In yet another aspect, some implementations include a non-transitory computer-readable storage medium storing one or more programs for execution by one or more processors of a computing system, the one or more programs including instructions for performing any of the methods described herein.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figures 48A, 48B:
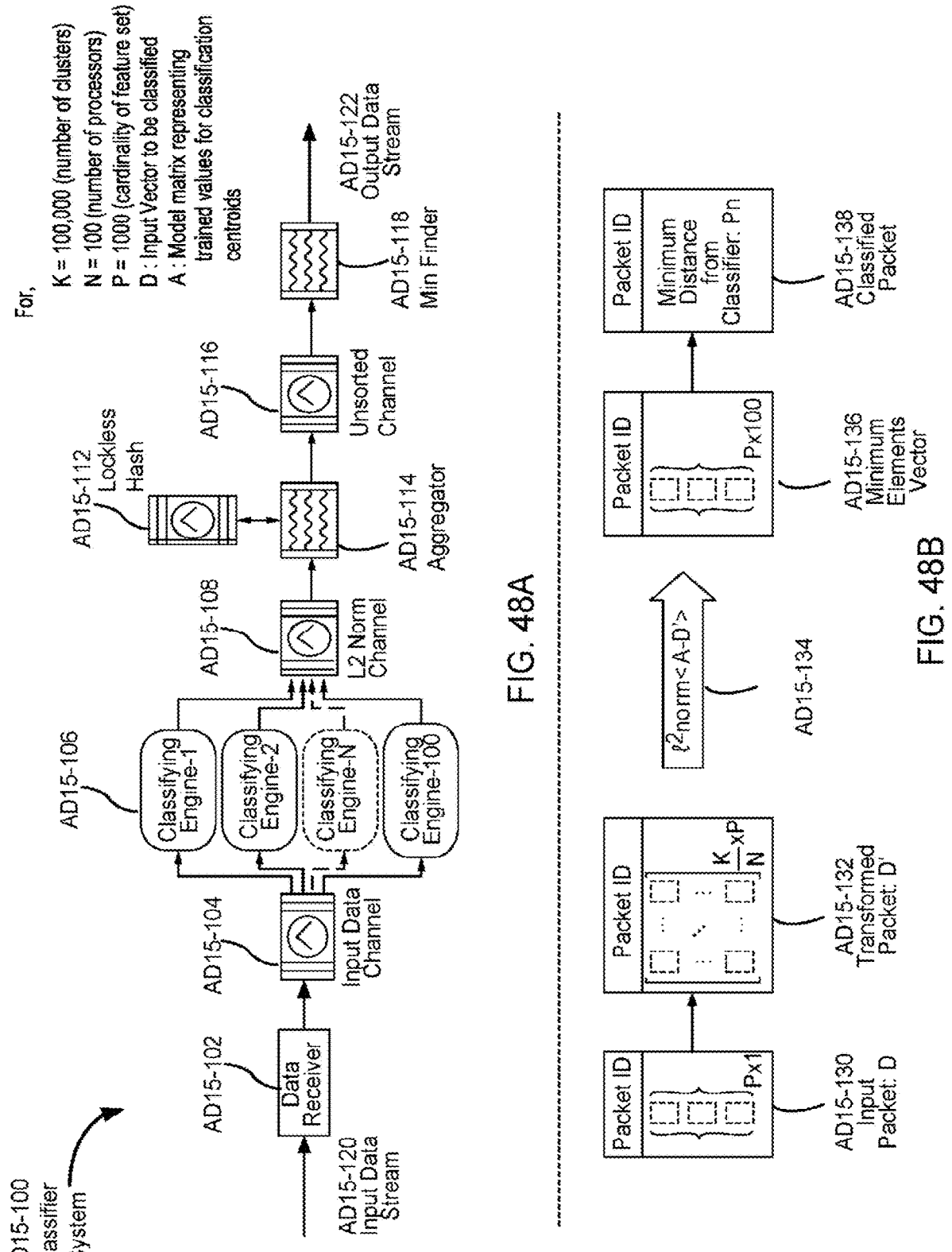
FIGS. 48A-48B illustrate an architecture for real-time k-means classification of structured data, in accordance with some implementations.

FIGS. 48A-48B illustrates an architecture for real-time k-means classification of structured data, in accordance with some implementations. The classifier system AD15-100 includes a data receiver AD15-102, a plurality of classifying engines AD15-106, an aggregator AD15-114, a sorter AD15-118, an input data channel AD15-104, a L2 Norm Channel AD15-108, and an unsorted channel AD15-116, according to some implementations. Each of these components is described in greater detail below. The top portion of FIG. 48 (48A) represents the overall system architecture and the bottom portion (48B) represents a data-centric view of the system illustrating how incoming data is transformed as it passes through the various components of the system, according to some implementations.

Data Receiver

A data receiver AD15-102 provides the endpoint (e.g., an API) that is used to push data into the classifier system AD15-100, according to some implementations. Data streams AD15-120 arrive in the form of data packets (e.g., 1,000 bytes/packet) at extremely high rates (e.g., 1,000,000 documents/second). The data receiver AD15-102 has the compute power to handle the data rate. The data receiver AD15-102 assigns each of the packets a unique non-repeating packet identifier (packet-ID) and divides the packets into N segments to match the number of classifying engines AD15-106 (e.g., Linear Algebra engines) in the system, according to some implementations. The annotated and segmented packets are then pushed into the Input Data Channel AD15-104 wherefrom the classifying engines AD15-106 read the packets. The Input Data Channel AD15-104 is a transitional memory (e.g., memory buffer) used to store data from the receiver AD15-102 before the data is processed by the classifying engines AD15-106. Buffering the data packets allows for independent processing of the data packets, i.e., asynchronous execution. For example, the data receiver AD15-102 continues to process the data stream and buffers packets without waiting for the classifying engines AD15-106 to finish processing data segments.

The data packet format of the input data stream AD15-120 is illustrated by AD15-130, and includes at least the packet identifier (sometimes herein referred to as packet ID)

assigned by the receiver AD15-102 and information related to the features present in the data packet, according to some implementations. For example, if the cardinality of the feature set is P, then the packet format has P slots (shown as Px1) for each of the features. In some implementations, the data receiver AD15-102 prepares data input for the classifying engines by transforming the input packet (AD15-130) to a different packet format (e.g., transformed packet AD15-132).

In some implementations, the system AD15-100 dynamically selects the number of classifying engines AD15-106 based on system performance, incoming traffic, and data dimensionality. In some implementations, the data receiver AD15-102 co-ordinates with system performance monitors (not shown) to calculate an optimal number for the number of classifying engines. The number of classifying engines AD15-106 is also continuously tuned to maintain optimal system performance and hence makes the system AD15-100 easily adaptable to the incoming traffic and data dimensionality, according to some implementations.

Classifying Engines

Classifying engines AD15-106 do the bulk of the mathematical processing, according to some implementations. The classifying engines AD15-106 use the model centroids previously generated by a clustering algorithm (e.g., k-means clustering algorithm), according to some implementations. A brief description of the k-means clustering algorithm is provided here as background and as an example to understand the overall algorithm. The k-means clustering algorithm uses an iterative refinement approach to produce a final result. The input to that algorithm are the number of clusters k and the dataset which is a collection of features for each data point. The algorithm starts with initial estimates for the k centroids, which can be either be randomly generated, randomly selected from the dataset, or selected based on detailed analysis of the dataset. The algorithm then iterates between two steps. In the first step, each data point is assigned to its nearest centroid, based on the squared Euclidean distance (sometimes herein called L2-norm). In the second step, the centroids are recomputed by computing the mean of all data points assigned to that centroid's cluster. The algorithm iterates between the two steps until some criteria is met (e.g., no data points change clusters, the sum of the distances is minimized, or when a maximum number of iterations is reached). The algorithm is guaranteed to converge, although the result may be a local optimum and not necessarily the best possible outcome. Various techniques exist to improve the quality of k-means clustering. Repeating the algorithm starting with different centroids generally provides better outcomes. Another example is using domain knowledge to choose the features. The process of classification based on results of a clustering algorithm, such as k-means clustering, closely follows the methodology employed during clustering. To classify a new data point using the model clusters produced by a clustering algorithm such as the k-means clustering algorithm, a classifier calculates the Euclidean distance to each cluster centroid to determine the closest centroid, and then the data point is classified to the cluster that corresponds to the closest centroid.

The classification models (e.g., produced by a k-means clustering step) are provided to the classifying engines AD15-106 as input during startup, according to some implementations. The model contains the centroids of the clusters that data need be classified to. Each of the engines AD15-106 calculates the L-2 Norm (Euclidean distance or Euclidean norm) of a given data segment relative to the input model (centroids). Some implementations use Linear Algebra engines and utilize the BLAS library implemented in FORTRAN. The L-2 norm is a standard operation provided by BLAS and is calculated in an extremely efficient manner using vector optimization techniques. Following the L2-Norm calculation, the classifying engines (AD15-106) select the P-smallest distances from the set of available model centroids for the data segment, according to some implementations.

In some implementations, the engine AD15-106 creates a packet with the relevant information about the corresponding classification categories. An example of the packet is shown as AD15-132. The packet identifier (Packet ID) in the incoming packet AD15-130 is retained in the transformed packet AD5-132. In some implementations, the data receiver AD15-102 prepares the transformed packet AD15-132 for the classifying engines AD15-106. The engines AD15-106 continuously read the segmented packets (e.g., AD15-130 input packet D or AD15-132 transformed packet D') annotated with a unique, non-repeating packet ID, calculate the L2-norms (illustrated by AD15-134), and push the packets in a lockless, asynchronous manner into a transitional memory buffer (e.g., the L-2 Norm Channel AD15-108). The asynchronous execution of the components of the classifier system AD15-100 is achieved through at least the packet identification, the buffering through the channel buffers (e.g., AD15-104, AD15-108, and AD15-116 Channel buffers), and a lockless hash (e.g., AD15-112 lockless hash-map).

Aggregator

An Aggregator AD15-114 is a process that collates the segmented packets obtained from the L-2 Norm Channel in a parallel manner, according to some implementations. In some implementations, the aggregator AD15-112 is a multi-threaded process. The Aggregator AD15-114 utilizes a lockless hash-map AD15-112 (e.g., Lockless Akuda Hash-map) for achieving parallel and asynchronous packet aggregation, according to some implementations. In some implementations, the unique packet identifier (e.g., packet ID in AD15-132) is used as a key for the lockless hash-map. Each individual packet (e.e.g, AD15-132) received from the classifying engine AD15-106 is enqueued in a linked-list (not shown) corresponding to the packet identifier in the lockless hash-map. When all the N packets (corresponding to the N classifying engines AD15-106) with the same unique packet identifier are enqueued in the linked-list (the length of the linked-list equals N), the linked list is aggregated, according to some implementations.

In some implementations, an output packet (e.g., packet AD15-136) is constructed with N*P values corresponding to each of the P nearest centroids (classification centroids) from each of the N classifying engine AD15-106 outputs that are entered in a min-distance vector. The output packet containing the unsorted min-distance vector is assigned the same unique packet ID as in the incoming packet (e.g., AD15-132). The packet is pushed to a channel buffer (e.g., Unsorted Channel AD15-116) for the consumption of a sorting module (described below), according to some implementations.

Sorter (Min-Finder)

A sorter (sometimes herein referred to as Min-Finder) (illustrated by AD15-118) finds the P-minimum distances for the corresponding classification centroids for each packet, according to some implementations. In some implementations, the sorter AD15-118 is a multi-threaded process. The process AD15-118 dequeues packets from a buffer (e.g., Unsorted Channel AD15-116) and performs an N-selection sort on the min-distance vector contained within the packet (e.g., AD15-136), according to some implementations. N-selection sort is a highly efficient algorithm to find the N largest or smallest values in an array and consistently guarantees O(n^2) performance. Some implementations use other sorting algorithms for this step. In some implementations, the sorter AD15-118 also tabulates the P smallest values corresponding to the classification centroids along with the centroid-IDs. In some implementations, the sorter AD115-118 creates a new data packet (e.g., AD15-138) that includes the minimum distances and the unique packet ID, and sends the data packet on the output data stream (e.g., AD15-122). Although not shown, the information from a classifier system, such as system AD15-100, can be used in a variety of circumstances including in sensor networks or Internet of Things (IoT) environments to classify data in real-time.

FIG. 49 is block diagram of a computer system for real-time k-means classification of structured data, in accordance with some implementations. FIG. 49 is a modified block diagram of the computer system 520 shown in FIG. 5B of U.S. patent application Ser. No. 14/214,410, for automatically detecting events and identifying the causes of the events from electronic posts, in accordance with some implementations. The system 520 includes one or more processors 2002 for executing modules, programs and/or instructions stored in memory 2102 and thereby performing predefined operations; one or more network or other communications interfaces 2100; memory 2102; and one or more communication buses 2104 for interconnecting these components. In some implementations, the system 520 includes a user interface 2004 comprising a display device 2008 and one or more input devices 2006 (e.g., keyboard or mouse).

In some implementations, the memory 2102 includes high-speed random access memory, such as DRAM, SRAM, or other random access solid state memory devices. In some implementations, memory 2102 includes non-volatile memory, such as one or more magnetic disk storage devices, optical disk storage devices, flash memory devices, or other non-volatile solid state storage devices. In some implementations, memory 2102 includes one or more storage devices remotely located from the processor(s) 2002. Memory 2102, or alternately one or more storage devices (e.g., one or more nonvolatile storage devices) within memory 2102, includes a non-transitory computer readable storage medium. In some implementations, memory 2102 or the computer readable storage medium of memory 2102 stores the following programs, modules and data structures, or a subset thereof:

- an operating system 2106 that includes procedures for handling various basic system services and for performing hardware dependent tasks;
- a network communications module 2108 that is used for connecting the system 520 to other computers (e.g., the data sources 502 in FIG. 5A) via the communication network interfaces 2100 and one or more communication networks (wired or wireless), such as the Internet, other wide area networks, local area networks, metropolitan area networks, etc.;
- a Harvester 522 for collecting and processing (e.g., normalizing) data from multiple data sources 502 in FIG. 5A, the Harvester 522 further including a Harvester Boss 601, a Scheduler 602, a Harvester Manager 604, and one or more Harvester Minions 613-1, which are described above in connection with FIG. 6, and a Harvester Minion 613-1 further including a snippet extractor 615 for generating packets for the snippets, authors, and publishers encoded using appropriate data structures as described above with reference to FIG. 7, and a snippet hasher 614, an author hasher 616, and a publisher hasher 618 for generating a hash key for the snippet content, author, and publisher of the snippet, respectively;

a Publisher Discovery HyperEngine 524 for inspecting the data stream from the data sources 502 in order to develop a publisher profile for a data source based on, e.g., the snippets published on the data source and storing the publisher profile in the publisher store 530;

an Author Discovery HyperEngine 526 for inspecting the data stream from the data sources 502 in order to develop an author profile for an individual based on, e.g., the snippets written by the individual on the same or different data sources and storing the author profile in the author store 532;

an Author/Publisher Correlator 528 for performing real-time data correlation with existing author information in the author database 802-1 and existing publisher information in the publisher database 802-2 to determine a respective snippet's author and publisher;

a Bouncer 536 for identifying high-value information for a client of the system 520 from snippets coming from different data sources by applying the snippets to mission definitions associated with the client, the Bouncer 536 further including a bouncer master node 909 and one or more bouncer worker nodes 903, the bouncer master node 909 further including a scheduler 902, a broadcaster master 910, and one or more broadcasters 904, whose functions are described above in connection with FIG. 9, and each bouncer master node 909 further including a node manager 906 and one or more workers 908 (each worker handling at least one mission definition 908-1), a more detailed description of the components in the Bouncer 536 can be found above in connection with FIG. 9;

a Parallelizing Compiler 1504 for optimizing a filter network specification associated with a client of the system 520 by, e.g., appropriately merging, reordering filters and removing cycles from the resulting filter network, etc.;

an Alarm/Analytics HyperEngine 538 for determining if and how to deliver alarm messages produced by the Bouncer 536 to end-users using, e.g., predefined communication protocols with the end-users, and generating short-term or long-term statistics through analyzing the incoming information as well historical information from the data sources and determining whether or not to trigger alarms for any violations of predefined criteria associated with a client of the system;

a Raw Database 534 for backing up snippets from the data sources, e.g., after the snippets are normalized by Harvester 522, each snippet having content, author, and publisher information; and a Real-Time K-Means Classifier 15200 for classifying structured data streams in real-time.

FIG. 49 further illustrates modules of the Real-Time K-Means Classifier 15200, in accordance with some implementations. In some implementations, the Real-Time K-Means Classifier 15200 includes the following datasets or a subset or superset thereof:

a data receiver 15200-a for receiving data packets from a data stream;

a data segmentation module 15200-b for segmenting the received data packets;

classifying engines 15200-c that classify the segmented data packets;

an aggregator 15200-d that aggregates the output of the classifying engines 15200-c;

a sorting module 15200-e that sorts the output of the aggregator; and an output module 15200-f that prepares the output of the classifier.

Each of the component modules of the Real-Time K-Means Classifier 15200 listed above corresponds to one or more blocks described above in reference to FIG. 48A, according to some implementations. For example, in some implementations, data receiver module 15200-a and segmentation module 15200-b correspond to the receiver AD15-102; classifying engines 15200-c correspond to the classifying engines AD15-106; the aggregator 15200-d corresponds to aggregator AD15-114; and the sorting module 15200-e corresponds to the Min Finder AD15-118.

Further, it should be noted that the programs, modules, databases, etc. in the Real-Time K-Means Classifier 15200 described above in connection with FIG. 48A may be implemented on a single computer system (e.g., server) or distributed among multiple computer servers that are connected by a computer network. Although a specific hardware configuration may affect the performance of the Real-Time K-Means Classifier 15200, the implementation of the present application does not have any dependency on a particular hardware configuration.

In some implementations, the Real-Time K-Means Classifier 15200 described above is part of a filter, wherein the filter accepts packets that meet relevance criteria with respect to a subject. In some implementations, the filter is also known as a filter node (e.g., filter node 110 in FIG. 1) or a classification model. In some implementations, the filter accepts packets based on content and/or metadata of the packets. In some implementations, the filter is one of a plurality of filters that are interconnected to form a model (e.g., model 102 in FIG. 1). In some implementations, the filter is part of a mission definition (e.g., mission definition 100 in FIG. 1 and/or mission definition 200 in FIG. 2). In some implementations, the filter is the mission definition. In some implementations, the filter is part of a real-time massively parallel classification system (e.g., Bouncer 536 in FIG. 9).

In some implementations, the filter includes one or more of the group consisting of: lexical filters 304, vocabulary filters 306, semantic filters 308, statistical filters 310, thematic ontologies 312, and corrective feedback 314. The filter can also be embodied as regular expressions, such as the regular expression 402 which accepts phrases like "Best Car Wash Ever," "Best Burger Ever," and "Best Movie I have ever seen."

The computer system identifies, using the filter, respective packets of the plurality of packets as relevant to the subject. In some implementations, the filter identifies respective packets of the plurality of packets as relevant to the subject, based on contents and metadata (such as author/publisher information, demographics, author influences, etc.) associated with the post/snippet.

In some implementations, relevance criteria can include one or more nouns (e.g., name of a person, name of a place, a location, a brand name, name of a competitor) and/or one or more verbs associated with the one or more nouns.

In some implementations, the filter identifies respective packets of the plurality of packets as relevant to the subject, based on contents and metadata (such as author/publisher information, demographics, author influences, etc.) associated with the post/snippet.

In some implementations, identifying, using the filter, respective packets of the plurality of packets as relevant to the subject further includes tagging the respective packets of the plurality of packets with an identifier of the filter.

In some implementations, identification of respective packets as relevant to the subject causes the respective packets to progress further downstream in the mission definition. In some implementations, an identification of respective packets as relevant to the subject causes the respective identified packets to be directed to one or more other channels (e.g., a subsequent filter in the Bouncer 536, the Alarm/Analytics HyperEngine 538, and the Topic Discovery HyperEngine 586. See FIG. 5B).

In some implementations, identification of respective packets as relevant to the subject causes the respective packets to be directed to the Alarm/Analytics HyperEngine 538, where further analyses are performed on the respective packets. For example, the tracking module 538-a of the Alarm/Analytics HyperEngine 538 receives the respective packets from the Harvester 522 and tracks the packets according to the filter classification. The analysis module 538-b of the Alarm/Analytics HyperEngine 538 analyzes the respective received packets to generate data analytics and predict trends.

FIG. 50A to 50D represent a flowchart of a method AD15-300 for classifying structured data in real-time using k-means classification, in accordance with some implementations. The method AD15-300 is performed at a computer system (e.g., computer system 520 in FIG. 49) storing programs for execution by the processor. In some implementations, the method AD10-200 is a continuous monitoring process that is performed without user intervention. The computer system receives (AD10-202), using a data receiver (e.g., data receiver 15200-a), a data stream that includes a plurality of packets. In some implementations, the data stream includes a plurality of posts, and/or any type of information received over a network. In some implementations, the data (e.g., posts) are received by a Harvester of the computer system (e.g., the Harvester 522 in FIG. 5B), and from multiple data sources (e.g., Data sources 502 in FIG. 5A) such as social media websites, internet forums that host conversation threads, blogs, news sources, etc. Alternatively, in some implementations, posts (e.g., from the Data Sources 502) can include updates from smart thermostats, smart utility meters, automobiles, information from a mobile device (e.g., a smart-phone, Fitbit™ device, etc.), or any other source of real-time data.

In some implementations, the received posts include a content portion and one or more source characteristics, such as an author and/or a publisher. Each of these portions and/or characteristics is referred to as a packet.

Alternatively, in some implementations, the received posts are raw data. Accordingly, after receiving the data stream (e.g., posts), the Harvester 522 performs an initial normalization of each post, including identifying the content, the author, and the publisher. The Harvester 522 then generates one or more packets from each post, including, in some implementations, a content packet (sometimes hereinafter referred to as a "snippet"), a publisher packet and/or an author packet.

In some implementations, the plurality of packets comprise social media posts. For example, the social media posts include TWITTER™ TWEETS, FACEBOOK™ posts, online forum comments, Youtube™ videos, and the like. In some implementations, the plurality of packets are received from a plurality of distinct social media platforms (e.g., TWITTER™ TWEETS, FACEBOOK™ posts, and online forum comments). In some implementations, the plurality of packets are received from a plurality of distinct users. The plurality of distinct users include users with distinct social media user names, social media user accounts, social media platforms, demographics etc.

The computer system segments (AD15-320), using a segmentation module (e.g., 15200-b), each respective data packet in the plurality of data packets to a plurality of data segments, and stores the plurality of data segments to a first transitional memory, while continuing to receive data streams, according to some implementations. In some implementations, the segmentation module of the computer system assigns (AD15-322) a unique non-repeating packet identifier to the respective data packet, and annotating each respective data segment corresponding to the respective data packet with the assigned packet identifier.

The computer system then classifies (AD15-330), using a plurality of classifying engines (e.g., classifying engines 15200-c), the plurality of data segments, to compute a plurality of data clusters including by: (1) reading one or more data segments in the plurality of data segments from the first transitional memory, and (2) calculating a L-2 norm for each respective data segment in the one or more data segments, and storing the plurality of data clusters to a second transitional memory, wherein each respective data cluster in the plurality of data clusters comprises of one or more data segments in the plurality of data segments. In some implementations, the computer system selects (AD15-332), in co-ordination with the segmentation module 15200-b), a number of classifying engines in the plurality of classifying engines based on the received data stream, and using a subset of the plurality of classifying engines to classify the plurality of data segments. Further, in some implementations, each respective classifying engine in the plurality of classifying engines is a Linear Algebra engine utilizing BLAS library, as illustrated by AD15-334.

As illustrated in 50C, the computer system, in some implementations, accomplishes the step of classification (AD15-330), using the classifying engines, by first training (AD15-370) a model to compute centroids for K clusters in N dimensions, wherein K is a predetermined number of classification categories and N is a predetermined data dimensionality for the data stream. The computer system then calculates (AD15-372) the L2-Norm for each respective data segment in the one or more data segments using either the computed centroids or a predetermined list of centroids. Next, the computer system computes (AD15-374) the plurality of clusters based on the L2-norm of the one or more data segments.

After the data segments are classified, the computer system aggregates (AD15-340), using an aggregator (e.g., aggregator module 15200-d), the plurality of data clusters to compute a plurality of min-distance vectors including by reading one or more data clusters in the plurality of data clusters from the second transitional memory, and storing the plurality of min-distance vectors to a third transitional memory, wherein each respective min-distance vector in the plurality of min-distance vectors corresponds to a data packet in the plurality of data packets. In some implementations, the aggregator uses a lockless hash-map. In some implementations, the computer system uses the packet identifier (AD15-342) in each respective data segment in the plurality of data segments that comprise the plurality of data clusters as a key for the lockless hash-map. In some implementations, the aggregator is implemented (AD15-344) using multi-threaded processes. Further, in some implementations, the lockless hash-map is a Lockless Akuda Hash-Map, as illustrated by AD15-346.

In some implementations, the computer system accomplishes the aggregation (AD15-340) by performing a series of steps shown in FIG. 50D. The computer system enqueues (AD15-380) the one or more data clusters read from the second transitional memory to one or more ready queues in a plurality of ready queues based on the packet identifier in the one or more data segments in the one or more data clusters, wherein each respective ready queue in the plurality of ready queues corresponds to a respective data packet. Then the computer system determines (AD15-382) if the length of a respective ready queue is equal to the number of clustering engines in the plurality of clustering engines. If it is determined that the length of the respective ready queue is equal to the number of classifying engines, the computer system dequeues (AD15-384) each respective data cluster from the respective ready queue, and computes a respective min-distance vector in the plurality of min-distance vectors corresponding to the respective data packet. Then, the computer system stores (AD15-386) the packet identifier corresponding to the respective data packet along with the respective min-distance vector to the third transitional memory, in accordance with some implementations.

In some implementations, if it is determined (AD15-390) that the length of the respective ready queue is not equal to the number of classifying engines, the computer system reads (AD15-392) one or more data clusters from the second transitional memory, and enqueues (AD15-394) the one or more data clusters read from the second transitional memory to one or more ready queues in the plurality of ready queues based on the packet identifier in the one or more data segments in the one or more data clusters.

In accordance with some implementations, the computer system sorts (AD15-350), using a sorting module (e.g., sorting module 15200-e), each respective min-distance vector in the plurality of min-distance vectors to compute a plurality of minimum distances for each respective data packet in the plurality of data packets including by reading the plurality of min-distance vectors from the third transitional memory. In some implementations, the sorting module is implemented (AD15-352) using multi-threaded processes. Further in some implementations, the computer system accomplishes the sorting step AD15-350 by identifying (AD15-354) a respective min-distance vector in the plurality of min-distance vectors read from the third transitional memory that corresponds to a respective data packet based on a packet identifier corresponding to the respective data packet, and sorting the respective min-distance vector.

The computer system then outputs (AD15-360), for each respective data packet in the plurality of data packets, the plurality of minimum distances that corresponds to the respective data packet, in accordance with some implementations. In some implementations, the computer system tabulates (AD15-362) the plurality of minimum distances along with information related to centroid of the clusters and packet identifiers for the plurality of data packets.

(I1) In one aspect, some implementations include a method of classifying data streams, in real-time, comprising: in a computer including one or more processors and a memory storing instructions for execution by the one or more processors: receiving a data stream that includes a plurality of data packets; segmenting each respective data packet in the plurality of data packets to a plurality of data segments, and storing the plurality of data segments to a first transitional memory, while continuing to receive data streams; clustering the plurality of data segments, using a plurality of classifying engines, to compute a plurality of data clusters including by: (1) reading one or more data segments in the plurality of data segments from the first transitional memory, and (2) calculating a L-2 norm for each respective data segment in the one or more data segments, and storing the plurality of data clusters to a second transitional memory, wherein each respective data cluster in the plurality of data clusters comprises of one or more data segments in the plurality of data segments; aggregating the plurality of data clusters, using a lockless hash-map, to compute a plurality of min-distance vectors including by reading one or more data clusters in the plurality of data clusters from the second transitional memory, and storing the plurality of min-distance vectors to a third transitional memory, wherein each respective min-distance vector in the plurality of min-distance vectors corresponds to a data packet in the plurality of data packets; sorting each respective min-distance vector in the plurality of min-distance vectors to compute a plurality of minimum distances for each respective data packet in the plurality of data packets including by reading the plurality of min-distance vectors from the third transitional memory; and outputting, for each respective data packet in the plurality of data packets, the plurality of minimum distances that corresponds to the respective data packet.

(I2) In some implementations of the method of any of (I1), further including: while segmenting a respective data packet in the plurality of data packets, assigning a unique non-repeating packet identifier to the respective data packet, and annotating each respective data segment corresponding to the respective data packet with the assigned packet identifier; and while aggregating the plurality of data clusters, using the packet identifier in each respective data segment in the plurality of data segments that comprise the plurality of data clusters as a key for the lockless hash-map.

(I3) In some implementations of the method of any of (I1)-(I2), wherein clustering the plurality of data segments further includes selecting a number of classifying engines in the plurality of classifying engines based on the received data stream, and using a subset of the plurality of classifying engines to cluster the plurality of data segments.

(I4) In some implementations of the method of any of (I1)-(I3), wherein clustering the plurality of data segments further includes: training a model to compute centroids for K clusters in N dimensions, wherein K is a predetermined number of classification categories and N is a predetermined data-dimensionality for the data stream; calculating the L2-norm for each respective data segment in the one or more data segments using either the computed centroids or a predetermined (or alternatively, user defined or user provided) list of centroids; and computing the plurality of clusters based on the L2-norm of the one or more data segments.

(I5) In some implementations of the method of any of (I2)-(I4), wherein aggregating the plurality of data clusters further includes: enqueuing the one or more data clusters read from the second transitional memory to one or more ready queues in a plurality of ready queues based on the packet identifier in the one or more data segments in the one or more data clusters, wherein each respective ready queue in the plurality of ready queues corresponds to a respective data packet; determining if the length of a respective ready queue is equal to the number of classifying engines in the plurality of classifying engines; in accordance with a determination that the length of the respective ready queue is equal to the number of classifying engines, dequeueing each respective data cluster from the respective ready queue, and computing a respective min-distance vector in the plurality of min-distance vectors corresponding to the respective data packet; and storing the packet identifier corresponding to the respective data packet along with the respective min-distance vector to the third transitional memory.

(I6) In some implementations of the method of (I5), further comprising: in accordance with a determination that the length of the respective ready queue is not equal to the number of classifying engines: reading one or more data clusters from the second transitional memory; and enqueuing the one or more data clusters read from the second transitional memory to one or more ready queues in the plurality of ready queues based on the packet identifier in the one or more data segments in the one or more data clusters.

(I7) In some implementations of the method of any of (I1)-(I6), wherein sorting to compute the plurality of minimum distances further includes identifying a respective min-distance vector in the plurality of min-distance vectors read from the third transitional memory that corresponds to a respective data packet based on a packet identifier corresponding to the respective data packet, and sorting the respective min-distance vector.

(I8) In some implementations of the method of any of (I1)-(I7), wherein each respective classifying engine in the plurality of classifying engines is a Linear Algebra engine utilizing BLAS library.

(I9) In some implementations of the method of any of (I1)-(I8), wherein aggregating the plurality of data clusters and sorting to compute the plurality of minimum distances are implemented as multi-threaded processes.

(I10) In some implementations of the method of any of (I1)-(I9), wherein the lockless hash-map is a Lockless Akuda Hash-map.

(I1) In some implementations of the method of any of (I1)-(I10), wherein outputting the plurality of minimum distances further includes tabulating the plurality of minimum distances along with information related to centroid of the clusters and packet identifiers for the plurality of data packets.

(I12) In one aspect, some implementations include a server system comprising one or more processors and memory, the memory storing a set of instructions that cause the one or more processors to: receiving a data stream that includes a plurality of data packets; segmenting each respective data packet in the plurality of data packets to a plurality of data segments, and storing the plurality of data segments to a first transitional memory, while continuing to receive data streams; clustering the plurality of data segments, using a first plurality of classifying engines, to compute a plurality of data clusters including by: (1) reading one or more data segments in the plurality of data segments from the first transitional memory, and (2) calculating a L-2 norm for each respective data segment in the one or more data segments, and storing the plurality of data clusters to a second transitional memory, wherein each respective data cluster in the plurality of data clusters comprises of one or more data segments in the plurality of data segments; aggregating the plurality of data clusters, using a lockless hash-map, to compute a plurality of min-distance vectors including by reading one or more data clusters in the plurality of data clusters from the second transitional memory, and writing the plurality of min-distance vectors to a third transitional memory, wherein each respective min-distance vector in the plurality of min-distance vectors corresponds to a data packet in the plurality of data packets; sorting each respective min-distance vector in the plurality of min-distance vectors to compute a plurality of minimum distances for each respective packet in the plurality of data packets including by reading the plurality of min-distance vectors from the third transitional memory; and outputting, for each respective data packet in the plurality of data packets, the plurality of minimum distances that corresponds to the respective data packet.

(I13) In some implementations of the server system of (I12), wherein the server system is configured to perform the method of any of (I1)-(I11).

(I14) In one aspect, some implementations include a non-transitory computer readable storage medium storing a set of instructions, which when executed by a server system with one or more processors cause the one or more processors to: receiving a data stream that includes a plurality of data packets; segmenting each respective data packet in the plurality of data packets to a plurality of data segments, and storing the plurality of data segments to a first transitional memory, while continuing to receive data streams; clustering the plurality of data segments, using a first plurality of classifying engines, to compute a plurality of data clusters including by: (1) reading one or more data segments in the plurality of data segments from the first transitional memory, and (2) calculating a L-2 norm for each respective data segment in the one or more data segments, and storing the plurality of data clusters to a second transitional memory, wherein each respective data cluster in the plurality of data clusters comprises of one or more data segments in the plurality of data segments; aggregating the plurality of data clusters, using a lockless hash-map, to compute a plurality of min-distance vectors including by reading one or more data clusters in the plurality of data clusters from the second transitional memory, and storing the plurality of min-distance vectors to a third transitional memory, wherein each respective min-distance vector in the plurality of min-distance vectors corresponds to a data packet in the plurality of data packets; sorting each respective min-distance vector in the plurality of min-distance vectors to compute a plurality of minimum distances for each respective packet in the plurality of data packets including by reading the plurality of min-distance vectors from the third transitional memory; and outputting, for each respective data packet in the plurality of data packets, the plurality of minimum distances that corresponds to the respective data packet.

(I15) In some implementations of a non-transitory computer readable storage medium of (I14), wherein the set of instructions is configured to cause a server system with one or more processors to perform any of the methods of (I1)-(11).

Systems and Methods for Real-Time Data Harvesting, Scalable Data Storage and Organization This application relates to methods, systems, and devices for real-time harvesting, storage, and organization of data from streams (e.g., streams of electronic posts, including social media posts) and online sources (e.g., websites), for fast and efficient indexing and retrieval of said data.

Social media enables one to be informed about the happenings in the world. Every day, tens of millions of social media users go online to express opinions, share ideas, and publish media for the masses. Consumers control the conversation and play a significant role in shaping, for example, the purchasing decisions of others. Thus, companies have to work harder to manage their reputations and engage consumers in this fluid medium. Businesses that learn to understand and mine consumer-generated content across blogs, social networks, and forums have the opportunity to leverage the insights from others, make strategic business decisions and drive their bottom line. Social media monitoring is often the first step to adopting and integrating the social Web into business.

One technical problem that arises in the context of filtering the immense quantity of data produced by the internet is the need to store the data in an easily and quickly retrievable fashion. Thus, there is a need for a file storage system that makes the file saving, retrieval, and indexing processes faster. Such a file system should strike a balance between its depth (e.g., the number of subdirectories vertically arranged within a directory tree, as too deep a file system causes added latency to the file retrieval process) and the number of files stored in any one subdirectory (as an excessive number files stored in a single subdirectory will increase the indexing time for that subdirectory). Thus, an improvement to the file system, and more particularly, an improvement to the file directory structure, improves the functioning of a computer by improving its speed.

To that end, some implementations include a method of real-time data harvesting, and scalable data storage and organization, performed at a computer system including a plurality of processors and memory storing programs for execution by the processors. The method includes: (1) receiving a file having a filename; (2) applying a hash function to the file name to obtain a hash result; (3) generating at least a portion of a directory path for the file from the hash result, including: (3A) determining, as a disk partition number of the directory path, a remainder of a division of the hash result by a predefined number of available partitions; (3B) determining first, second, and third subdirectories of the directory path by, for each respective subdirectory of the first, second, and third subdirectories of the directory path, generating a string comprising: (3B-1) a decimal representation of a first predefined byte of the first representation of the hash result; and (3B-2) a decimal representation of one or more bits of a second predefined byte of the first representation of the hash result; and (4) storing the file according the directory path for the file.

In another aspect, some implementations include a computing system including one or more processors and memory coupled to the one or more processors, the memory storing one or more programs configured to be executed by the one or more processors, the one or more programs including instructions for performing any of the methods described herein.

In yet another aspect, some implementations include a non-transitory computer-readable storage medium storing one or more programs for execution by one or more processors of a computing system, the one or more programs including instructions for performing any of the methods described herein.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 51A:
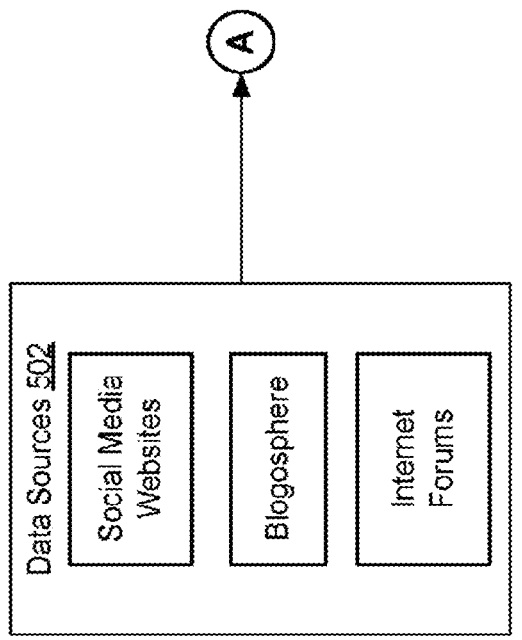
FIGS. 51A-51B illustrate a schematic representation of a massively parallel computer system for real-time data harvesting, and scalable data storage and organization, from data streams (e.g., streams of electronic posts, including social media posts) and online sources (e.g., websites).
Figure 51B:
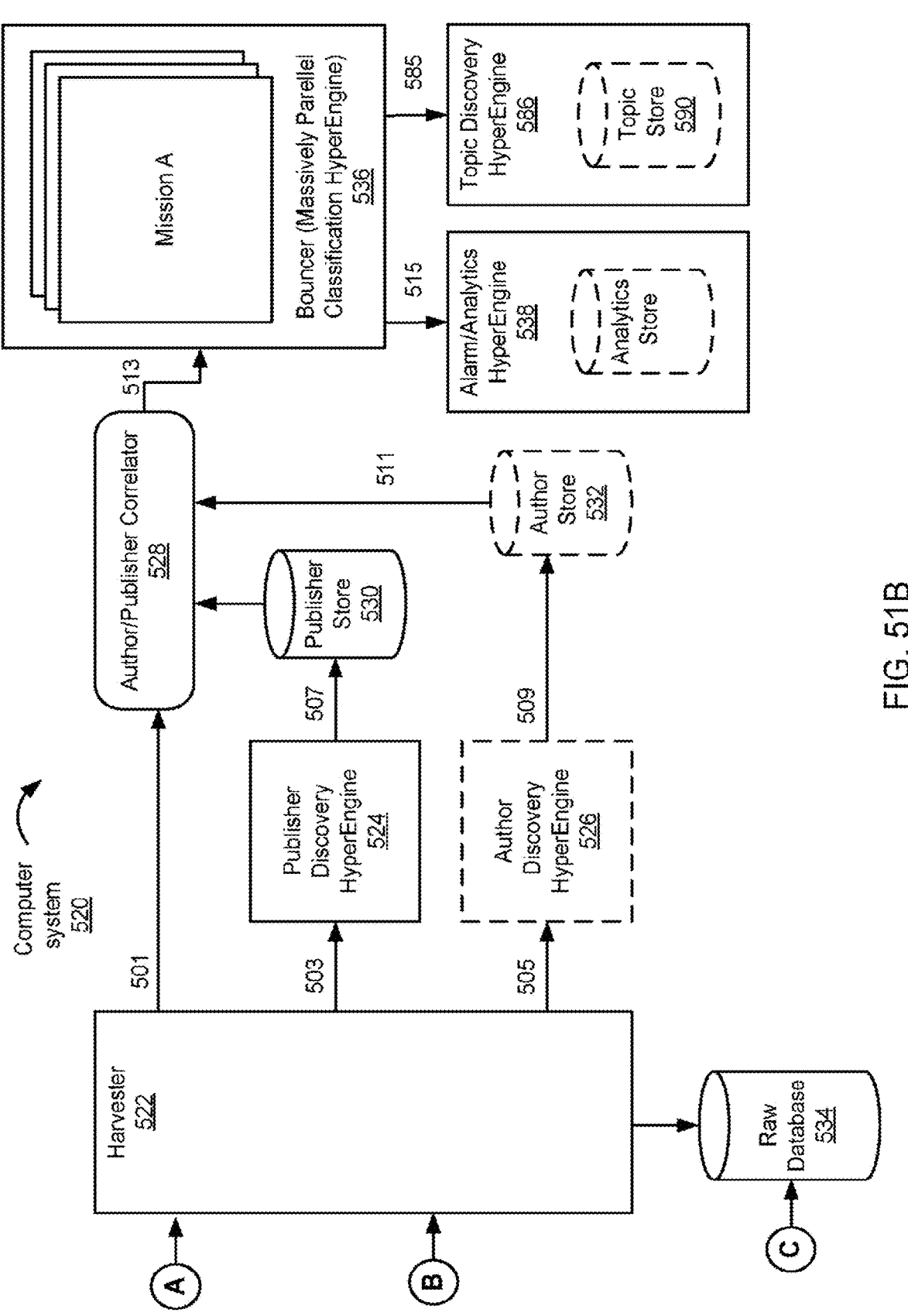

FIGS. 51A and 51B illustrate a modified representation of the massively parallel computer system 520 shown in FIGS. 5A and 5B of U.S. patent application Ser. No. 14/214,410, for real-time data harvesting, and scalable data storage and organization, from data streams (e.g., streams of electronic posts, including social media posts) and online sources (e.g., websites), in accordance with some implementations.

Figure 52:
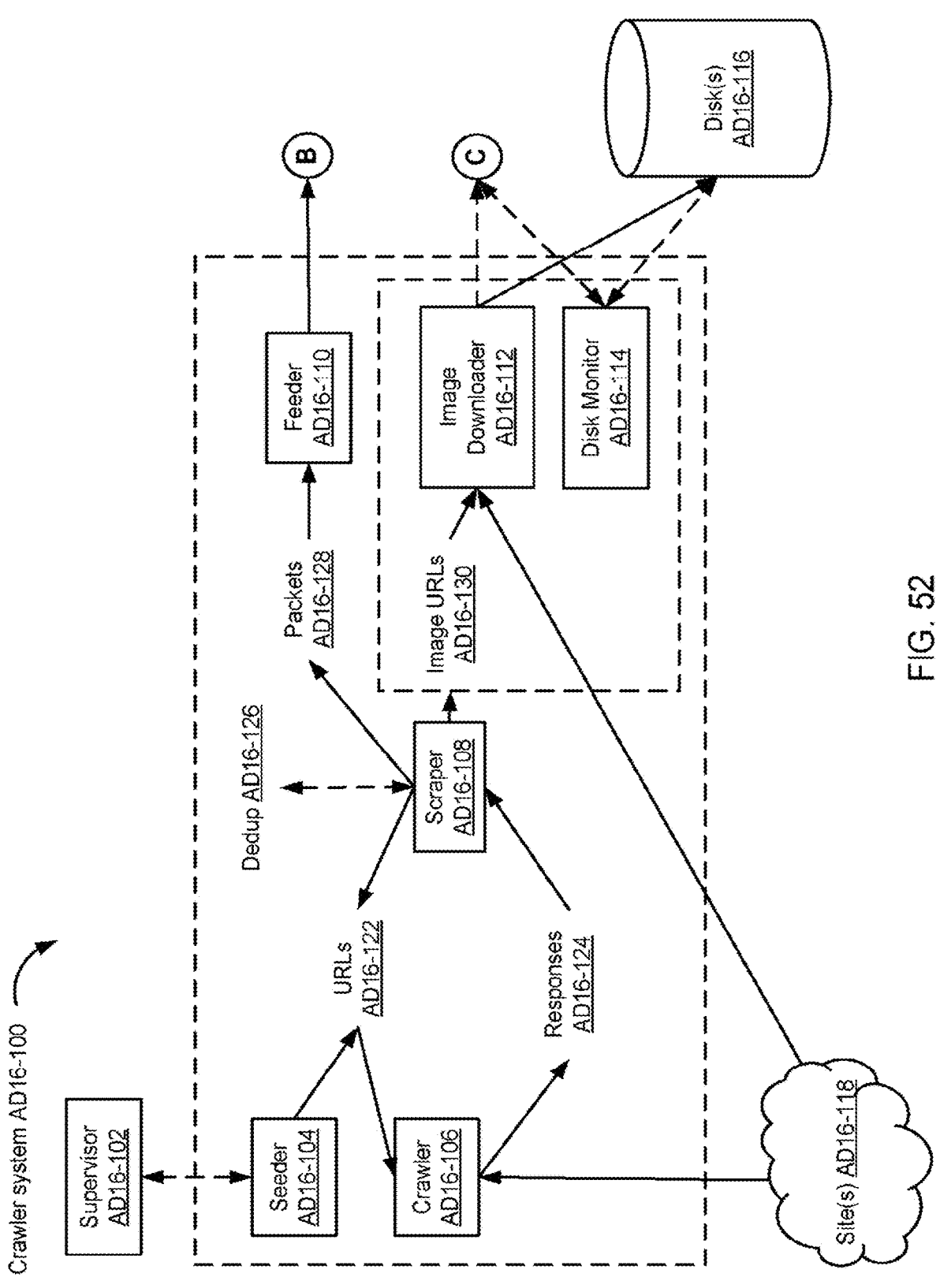
FIG. 52 illustrates a schematic representation of a crawler system, in accordance with some implementations.

The computer system 520 includes a Harvester 522 that collects data (e.g., streams of electronic posts, including social media posts, and data from websites) from multiple data sources such as data sources 502 depicted in FIG. 51A and a feeder process AD16-110 that is part of a crawler system AD16-100 (see, e.g., FIG. 52). The data sources 502 include data streams from social media websites, internet forums that host conversation threads, blogs, news sources, etc. In some implementations, the data sources 502 generate a plurality of posts that are information updates received over a network. For example, in some implementations, the posts include TWITTER™ TWEETS, FACEBOOK™ posts, online forum comments, Youtube™ videos, and the like. Alternatively, in some embodiments, posts can include updates from smart thermostats, smart utility meters, information from a mobile device (e.g., a smart-phone, Fitbit device, etc.), or any other source of real-time data (e.g., from the internet of things, IoT).

In some implementations, the Harvester 522 further harvests data from online sources that do not generate posts and/or data streams (e.g., websites). In some implementations, data is harvested from online sources using crawler systems AD16-100 that include the feeder process AD16-110. As used herein, a crawler system AD16-100 refers to a single instance of a crawler, e.g., an instance that crawls a respective website. In some embodiments, as describe below, each website crawled will have a corresponding crawler system AD16-100. Various implementations of the crawler system AD16-100 are described in FIG. 52.

As further illustrated in FIG. 51B, the computer system 520 also includes a raw database 534, a snippet path 501, a publisher path 503, an author path 505, a Publisher Discovery HyperEngine 524 that is connected to a Publisher Store 530 via a path 507, and an Author Discovery HyperEngine 526 that is connected to an Author Store 532 via a path 509. An Author/Publisher Correlator 528 performs real-time data correlation with existing information about the respective snippet's author and publisher. A respective correlated snippet is transmitted, via a path 513, to a Bouncer 536 that filters the correlated snippet using one or more high specificity data stream filters (e.g., executable mission definitions), each defined by a set of models, each model including one or more filters. These components and their functionalities have been described in greater detail in U.S. patent application Ser. No. 14/688,865, which is incorporated by reference herein in its entirety.

FIG. 52 illustrates a schematic representation of the crawler system AD16-100 that harvests data from online sources, in accordance with some implementations.

The crawler system AD16-100 is tasked with continuously obtaining the maximum amount of recent data posted to site(s) AD16-118. Data from the sites AD16-118 include: text and images posted by users, information on the post's attributes as defined by the sites AD16-118 (e.g., likes, views, shares, etc.), information on the author of the post (e.g., age, sex, location, occupation, etc.), and image metadata. In some implementations, data collected from the sites AD16-118 are normalized (e.g., using step 2212 of the method 2200 described in U.S. patent application Ser. No. 14/214,410). The data are packaged as data packets in a format that is defined by the computer system 520, and are sent to the Harvester 522 for filtering and further processing downstream. If the sites AD16-118 contain images, the images are written to one or more partitions on disk (e.g. disk(s) AD16-116) (e.g., using the file system method described with reference to FIG. 55).

Thus, the crawler system AD16-100 provides a supplemental data source alongside the data streams (e.g. from data sources 502), direct site feeds, automated aggregators, etc., to the Harvester 522. The crawler system AD16-100 is designed to harvest data from online sources such as sites AD16-118 (e.g., websites, online business listings, search engines etc.), and feed the online data to the Harvester 522 for further processing.

In some implementations, the crawler system AD16-100 is the most upstream process in the data processing workflow. Unlike data streams that originate from one or more data sources 502, the sites AD16-118 do not transmit direct data feed. Furthermore, information that is supplied to the various sites AD16-118 (e.g., information supplied to search engines by data aggregators) may be of different quality and granularity. To overcome these shortcomings, the crawler system AD16-100 is tailored (e.g., customized) for each of the sites AD16-118. For example, in some implementations, one or more of the sites AD16-118 further contain images of interest. Accordingly, in this example, the crawler system AD16-100 further harvests these images and saves them to disk(s) AD16-116 in an intelligent and balanced way.

The crawler system AD16-100 can be described, at a high level, as consisting of a supervisor process AD16-102 and worker processes AD16-120 that include a seeder AD16-104, a crawler AD16-106, a scraper AD16-108, a feeder AD16-110, an image downloader AD16-112, and a disk monitor AD16-114. In some implementations, one or more of the worker processes AD16-120 may be optional. In some implementations, the crawler system AD16-100 is a subsystem of the computer system 520. In some implementations, at least a portion of the crawler system AD16-100 (e.g., the worker processes) are performed at a server system (e.g., a remote Redis server). In some implementations, the computer system 520 and/or the server system are designed to be able to efficiently transfer and handle large amounts of data and maintain state. In some implementations, all transactions performed on the computer system 520 and/or the server system are atomic (e.g., indivisible and irreducible) and accordingly, there is no partial updates. In some implementations, the crawler system AD16-100 is configured such that it does not transmit duplicate data, and all needed queues are drained when a new crawl epoch begins (an epoch is defined here as a period of time in which the crawler system AD16-100 continuously scrapes a site AD16-118). Thus, data are accessed in an asymmetrical way without error.

In some implementations, the computer system 520 includes one or more crawler systems AD16-100, each configured in the same way or in a slightly different way as the crawler system AD16-100 described in FIG. 52. In general, each crawler system AD16-100 corresponds to a respective site AD16-118 being crawled and is unique owing to, e.g., the site's overall structure, the structure of its HTML pages, the way in which it indexes data and whether it does so according to date and/or time, whether an index of data is available for crawling, the style of the site's pagination, whether the site provides an API or RSS feed, and whether the site uses JavaScript to generate content, etc. Each of these factors and other factors decide the final architecture of each crawler. Accordingly, in some implementations, the configuration (e.g., architecture) of the crawler system AD16-100 is customized based on the site AD16-118 being crawled. In some implementations, it is necessary to monitor each crawler continuously and apply fixes as each site changes. For example, one can expect crawl-breaking site changes on a six to twelve month basis.

In some implementations, the crawler system AD16-100 includes one or more disks AD16-116 for indexing, storage, and retrieval of data (e.g., files). Each of the one or more disk(s) AD16-116 includes one or more partitions. In some implementations, the one or more disks AD16-116 use a file system that makes file saving, retrieving and indexing faster, as described with reference to FIG. 53.

In some implementations, each crawler instance generates all necessary queues on a single computer system (e.g., computer system 520) and/or server system. The queues corresponding to a crawler instance are differentiated from those belonging to all other crawler instances by unique identifiers that are amalgamated from the crawler supervisor process ID and the timestamp at which it was run. Accordingly, this makes it easy to poll and manipulate all queues belonging to a single crawler and not others. As shown in FIG. 52, the process queues include URLs queue AD16-122, responses queue AD16-124, deduplication queue AD16-126, packets queue AD16-128, and image URLs queue AD16-130. Because every crawler instance is unique, the number and type of queues can differ from one crawler instance to another (e.g., the scraper process AD16-108 can be divided into several different types of scrapers for certain sites), though the queues described above are always present.

In some implementations, the crawler system AD16-100 conducts its crawl in epochs in order to ensure that the data being gathered is recent and that no new data is skipped. An epoch is defined here as a period of time in which the crawler system AD16-100 continuously scrapes a site AD16-118. When the epoch ends, the crawler system AD16-100 effectively stops itself, finalizes sending packets and writing images, then begins the crawl all over again, making sure to avoid gathering duplicates. As most crawls begin at the front page or equivalent of a site AD16-118, and since most sites index their posts to some degree according to datetime, this ensures that the crawler system AD16-100 does not go so far into the site's posts that it only sees older posts, and cannot get the new submissions that have been posted in the meantime.

At the end of each crawl epoch, the packets AD16-128 and images queued for delivery are first drained, then all the queues belonging to a crawler instance are purged in order to facilitate starting the crawl over. However, it is possible that when restarting the crawl, the crawler system AD16-100 will scrape the same snippet (or page of snippets) twice. As a result, the crawler system AD16-100 implements a two-layer system of de-duplication. At the first level is a 'temporary' deduplication set. Here, temporary means that all items in the set (usually URLs) are fully purged at the end of an epoch. The second level consists of a 'permanent' deduplication set. Here, permanent means that all data held in the set is retained across crawls. It is only purged after a certain time interval has passed that is longer than the duration of the crawl epoch. This time interval is determined by the publication datetime limit for snippets to which the crawler instance is limited, e.g., only scrape snippets published within a predefined time interval are scraped, usually twenty-four hours. The duration of the permanent deduplication set is this interval plus one hour, since by the time this period has passed, the crawler instance will no longer be collecting snippets from the preceding time period.

The supervisor AD16-102 is responsible for spawning and maintaining all worker processes AD16-120, logging the state of the crawler system AD16-100, restarting all necessary processes and queues, and performing a clean shutdown when it is time for the crawler AD16-106 to terminate.

When initialized, the supervisor AD16-102 will generate all the required queues (e.g., the URLs queue AD16-122, the responses queue AD16-124, the deduplication queue AD16-126, the packets queue AD16-128, and the image URLs queue AD16-130). It then generates all required workers (e.g., the seeder AD16-104, the crawler AD16-106, the scraper AD16-108, the feeder AD16-110, the image downloader AD16-112, and the disk monitor AD16-114). From there, the supervisor AD16-102 enters a main loop, in which the remainder of its actions take place. With each iteration of the loop, the supervisor AD16-102 benchmarks the rate of the sites AD16-118 crawled, packets sent, and images downloaded by polling across all queues.

In some implementations, the supervisor AD16-102 also checks whether it is time to start a new epoch and/or whether it is time to purge the 'permanent' deduplication set.

Before restarting a crawl instance, the supervisor AD16-102 manually kills all current existing processes and purges all the queues apart from the packets queue AD16-128 and the image queue AD16-130, and their associated feeder process AD16-110 and image downloader process AD16-112. In some implementations, the supervisor AD16-102 is idle while the feeder process AD16-110 and the image downloader process AD16-112 work to complete (e.g., drain) all the remaining packets and images gathered during the newly terminated epoch. Once this is done, the feeder process AD16-110 and the image downloader process AD16-112 are purged. Then, the supervisor AD16-102 respawns all the worker processes AD16-120 to ensure that the new process IDs are recorded in place of the old ones.

In some implementations, the supervisor AD16-102 is configured to include termination conditions. As an example, one or more errors (e.g., errors deemed to be critical) that are not specifically handled by the supervisor AD16-102 will immediately initiate a shutdown of the entire crawler system AD16-100. If the crawler system AD16-100 must be shut down for any reason, the supervisor AD16-102 will attempt to do so cleanly. This means systematically killing all worker processes and deleting all queues belonging to that instance of the crawler system AD16-100. The shutdown process can be configured to ignore the 'permanent' deduplication queue if the data within needs to be maintained. As another example, if the supervisor AD16-102 detects that nothing is happening to the worker processes (e.g., no packet AD16-128 is being sent, no image AD16-130 are being downloaded, and no new URL AD16-122 is being processed etc.) over a predetermined period of time, the supervisor AD16-112 interprets the non-activity to mean that something is amiss (e.g., the crawler system AD16-100 can no longer access the target site AD16-118). In this instance, the supervisor AD16-1020 waits for a certain time interval (e.g., five minutes, 30 minutes etc.) and initiates shutdown of the crawler system AD16-100.

The worker processes AD16-120 include the seeder AD16-104, the crawler AD16-106, the scraper AD16-108, the feeder AD16-110, the image downloader AD16-112, and the disk monitor AD16-114. Each of these worker processes is responsible for processing a different part of the workflow and is spawned and maintained by the supervisor AD16-102. In some implementations, each of the workers contains common features, including:

Each worker is initialized with a client (e.g., a Redis client) that is connected to the same server system (e.g. a Redis server) and the same log defined as output. The worker then enters its main loop following the initialization;

With each iteration of the main loop, the worker first checks that the supervisor AD16-102 process that spawned it is running. If this is not the case, then the worker has been orphaned and will immediately self-terminate;

With each iteration, the worker will poll each of its input and output queues to make sure the queue is not empty (for input) and is not too large (for output). The maximum allowable queue size is predefined in the configuration. If none of its queues allow for any action, the worker will idle, then resume the loop; and The worker will continue to accumulate inbound and outbound data until it reaches or surpasses its predefined batch size for that data. When this happens, the worker will process the data according to the logic defined in its main loop.

The seeder AD16-104 is responsible for generating URLs and seeding the URL queue AD16-122 to start the crawl. In some implementations, the seeder process AD16-104 is an optional process used for when a large number of starting URLs are necessary. In some implementations, seeding is carried out by the supervisor AD16-102 when a crawl epoch is started.

The crawler process AD16-106 is responsible for accumulating URLs and sending GET requests to these URLs. The crawler AD16-106 accumulates the responses from these requests and outputs them to a responses queue AD16-124. The URLs come from the scraper process AD16-108, as will be described below. In some implementations, the crawler AD16-106 further includes optional functions such as de-duplication of URLs and/or scraping content of response bodies.

In some implementations, the crawler process AD16-106 uses one or more library functions to make its requests (e.g., the crawler process AD16-106 uses a client library such as Faraday Ruby gem for making HTTP requests). In some implementations, the requests are made concurrently to the site AD16-118 (e.g. requests are run in parallel). In some implementations, the concurrent requests are facilitated using one or more plugins (e.g., Typhoeus and Hydra plugins) that are compatible with the library. In some implementations, the requests are sent through a proxy system, and further include custom request headers that are created by the one or more library functions.

In some implementations, after the crawler process AD16-106 issues a request (e.g., a HTTP request), the crawler AD16-106 receives a 'bad' response (e.g., response code 404). In some implementations, in accordance to receiving a bad response and/or if half or more of the last batch of requests returned HTTP errors, the crawler AD16-106 backs off and idles for a certain amount of time. In some implementations, the crawler AD16-106 backs off in greater time increments (e.g. geometrically) in accordance with receiving repeated bad responses and/or repeated failed requests.

In some implementations (e.g., while handling entire web pages that tend to be large relative to the other data), the crawler process AD16-106 further includes compressing the responses AD16-124 before outputting them to the disk(s)

AD16-116. In some implementations, the crawler AD16-124 further sets the maximum queue and batch size for responses AD16-124 to a lower level than other data types.

The scraper AD16-108 is responsible for taking the site responses AD16-124 accumulated by the crawler AD16-106 and scraping the body of these responses for desired content. Page content from the sites AD16-118 include text and images posted by users, information on the post's attributes as defined by the sites AD16-118 (e.g., likes, views, shares, etc.), information on the author of the post (e.g., age, sex, location, occupation, etc.), and image metadata. The scraper AD16-108 analyzes the body of the responses and outputs site URLs (e.g. URLs AD16-122), image URLs AD16-130, and data packets AD16-128. The image downloader AD16-112 takes the image URLs AD16-130 to download images and to store the images in the disk(s) AD16-116. The flat data packets AD16-128 are sent to the Harvester 522 (via the feeder AD16-110) for further processing.

In some implementations, all site URLs AD16-122 obtained from a response body are deduped (e.g., using a deduplication process AD16-126) by polling the deduplication sets in the database. The de-duplication process AD16-126 deletes all duplicates prior to exporting the URLs AD16-122 to Redis. In some implementations, the scraper AD16-108 also differentiates between those URLs destined for the 'temporary' deduplication set and those for the 'permanent' deduplication set. In some implementations, the scraper AD16-108 transforms URLs found in the page body, or generates them wholesale based on information found on the page.

In some implementations, image processing is set to run for the crawler AD16-106. Accordingly, the image URLs AD16-130 are processed in the same way as described above with respect to the site URLs AD16-122.

As illustrated in FIG. 52 and described above, the scraper AD16-108 outputs both image URLs AD16-130 and data (non-image) packets AD16-128 which are then sent through different paths. The image downloader AD16-112 receives the image URLs AD16-122 and using the image URLs AD16-122, downloads images and stores the images in the disk(s) AD16-116. The data (e.g., data that do not contain images) packets AD16-128 are sent to the Harvester 522 via the feeder AD16-110. In some instances, the images and data packets are related to each other. In order to maintain the association between the images and their respective data packets, the images are stored on the disk(s) AD16-116 using a unique path manufactured by the scraper AD16-108. The unique path is retained in the data packet to which the image belongs prior to sending the data packet to the feeder AD16-110.

In some implementations, the unique path is manufactured in the scraper AD16-108 so as to maintain synchronicity between a packet AD16-130 and its corresponding image AD16-130. Accordingly, the image downloader AD16-112 is also aware of the unique (e.g., internal) path. In some implementations, the scraper AD16-108 uses the logic defined in a DiskMonitUtils auxiliary library AD16-400-2 to determine this internal image path. In some implementations, the image path output by the scraper AD16-108 is in a hash format and contains both the URL and the path for the image.

As described above, each of the sites AD16-118 being crawled is unique. Thus, in some implementations. the page content for each of the sites AD16-118 is processed uniquely and comprises the main logical framework of the entire crawler system AD16-100. As most page content arrives in the form of HTML, XML, or JSON, the scraper AD16-108 must be aware of the format and handle it appropriately.

Once all the desired data is scraped from the page, the scraper AD16-108 uses the scraped data to form packets in a format that is defined by the computer system 520. These 'flat' packets AD16-128 are then collected by the feeders (e.g., feeder AD16-110) and transmitted to the Harvester 522. In some implementations, the feeder AD16-110 maintains a communication connection to the harvester broker (e.g., a ZMQ connection). In some implementations, the feeder AD16-110 further keeps track of the number of packets AD16-128 it has transmitted in the previous transaction, and updates the packet counter in the computer system 520 and/or the server system, for benchmarking by the supervisor AD16-102.

In some implementations, one or more threshold values are set for one or more of the URLs queue AD16-122, the responses queue AD16-124, the packets queue AD16-128, and the image URLs queue AD16-130. In some implementations, each of the queues has the same threshold value (e.g., a fixed number of items in each queue) whereas in other implementations, each of the queues has its unique threshold value. In some implementations, the threshold values are set according to the data sizes (e.g., the threshold on the packets queue AD16-128 and batch sizes can be set higher than for other data types because the data packets are more compact compared to images).

The image downloader AD16-112 is responsible for taking image URL hashes manufactured by the scraper AD16-108 and using them to download images and to store images at the internal paths contained in those hashes. To do so, the image downloader AD16-112 uses the same GET request handling methods as the crawler AD16-106, as well as its own logic for writing the images to disk. In some implementations, the images are stored at the disk(s) AD16-116. In some implementations, the disk(s) AD16-116 corresponds to the raw database 534 for the Harvester 522.

In some implementations, the image downloader AD16-112 polls the disk(s) AD16-116 (and/or the raw database 534) periodically to determine the state of the disk. In some implementations, the image downloader AD16—delegates the task of determining the state of the disk(s) AD16-116 to the disk monitor process AD16-114.

In some implementations, the image downloader AD16-112 is an optional process and is not spawned for sites that do not contain images of interest.

The disk monitor AD16-114 constantly polls the disk(s) to which images are being written (e.g., by using iostat and df methods). The disk monitor AD16-114 is responsible for determining the state of the disk(s) AD16-116, and will stop the crawl if all partitions are close to being filled (e.g., 95% full). In some implementations, the disk monitor AD16-114 uses the methods defined in the auxiliary library ImgDownloadUtils AD16-400-3 that is described in FIG. 54B to determine the state of the disk(s) AD16-116. In some implementations, the disk monitor AD16-114 continuously 'touches' an empty file on the disk to keep it mounted. In some implementations, the disk monitor AD16-114 is an optional process and is not spawned for sites that do not contain images of interest.

In some implementations, the crawler system AD16-100 is asynchronous. Accordingly, the supervisor AD16-102 and all the worker processes AD16-120 operate independently of one another and do not need to keep track of the state of the crawler system AD16-100. Thus, all the processes are effectively decoupled. Nonetheless, the worker processes AD16-120 are still able to poll the supervisor AD16-102, and vice versa, to see if they are running. If the supervisor AD16-102 detects that a child (e.g. worker AD16-120) process is dead, it must respawn it. Conversely, if a child (e.g. worker AD16-120) process detects that the supervisor AD16-102 is dead, it must self-terminate. However, no process needs to keep track of any other process in the workflow, nor of any other instances of itself running in parallel.

In some implementations, the crawler system AD16-100 is able to monitor itself in one or more of the following ways:

The crawler system AD16-100 benchmarks its own rate of data processing, kills and respawns errant processes, backs off if its request rate is so high that the servers associated with the sites AD16-118 start to block its access;

The crawler system AD16-100 goes into an idle mode if there is a lull in incoming data;

The crawler system AD16-100 (e.g., via the supervisor AD16-102) ensures that each child process self-terminates if it is orphaned;

The crawler system AD16-100 terminates if there is no incoming data for an extended period of time;

If gathering images, the crawler system AD16-100 must be able to monitor the destination disk (e.g., using the disk monitor AD16-114) and to make sure that images are being written in a balanced manner to all partitions, as well as terminating further writes if all partitions are full.

Figure 53:
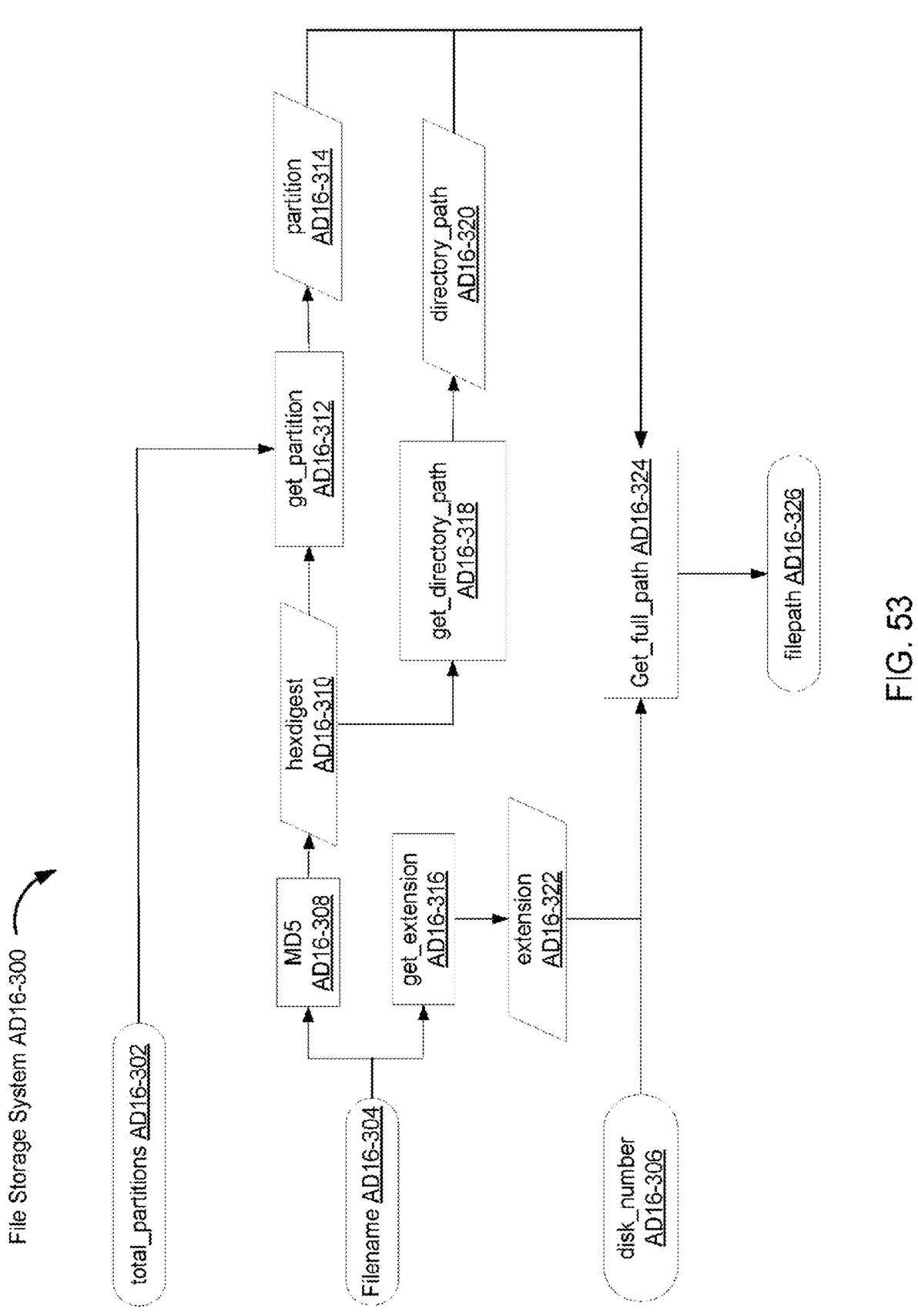
FIG. 53 illustrates a schematic representation of a file system, in accordance with some implementations.

FIG. 53 illustrates a file system AD16-300 used by the computer system 520 for saving and retrieving files (e.g., images) that are obtained by the Crawler System AD16-100, in accordance with some implementations.

As described earlier in FIG. 52, the crawler system AD16-100 scrapes content from sites AD16-118. Images are saved to the disk(s) AD16-116 using file system AD16-300.

2. The image filename (excluding the extension) is converted to an MD5 (AD16-308) hexdigest (AD16-310). The MD5 hashing algorithm accepts a message of any length as input and returns as output a fixed-length (e.g. 32 letters and/or digits) digest value, 3. A partition (AD16-312) is obtained from the hexdigest (AD16-310) and the total number of available partitions.

In some implementations, the partition (AD16-312) is obtained using the following algorithm:

```
Algorithm:
get_partition(hexdigest, total_partitions):
return convert_to_integer(hexdigest) % total_partitions
Example:
original_filename : image.jpg
hexdigest : 78805a221a988e79ef3f42d7c5bfd418
number_of_partitions: 22
partition_number:
get_partition("78805a221a988e79ef3f42d7c5bfd418", 22) = 16
```

In the above example, the disk AD16-116 that has 22 partitions. The image filename ("image") is "78805a221a988e79ef3f42d7c5bfd418" in MD5 hexdigest format, and converting from Hex Digest format to Decimal format it becomes "160173801610935256625506951419867943960". Dividing "160173801610935256625506951419867943960" by the total number of partitions (22) returns a remainder of 16, which is the partition obtained in the above example.

After the partition (AD16-312) is obtained, (4) a directory path of the file is generated from the hexdigest of the file name in accordance with the following algorithm:

```
Algorithm:
get_directory_path(hexdigest) :
dir_path = "/"
for i = 0, 2, 4 do
    dir_path += convert_to_integer(hexdigest[i])
    dir_path += convert_to_integer(convert_to_binary(hexdigest[i+1])[0..1])
    dir_path += "/"
end
return dir_path
Example:
hexdigest : 78805a221a988e79ef3f42d7c5bfd418
dir level 1 : 78805a221a988e79ef3f42d7c5bfd418 -> 78 -> 0111 1000 -> 72
dir level 2 : 78805a221a988e79ef3f42d7c5bfd418 -> 80 -> 1000 0000 -> 80
dir level 3 : 78805a221a988e79ef3f42d7c5bfd418 -> 5a -> 0101 1010 -> 52
get_directory_path ("78805a221a988e79ef3f42d7c5bfd418") = "/72/80/52/"
```

The file system AD16-300 is designed to have a shallow depth (e.g., avoids generating many subdirectories and/or inodes) for easy file retrieval. At the same time, the file system AD16-300 is also designed to be deep enough to avoid storing too many images in any single directory that will cause indexing to slow down. Furthermore, each image must be renamed in such a way as its original filename can be recovered and that its new name is unique to its current directory. The following paragraphs provide details about how this is accomplished.

In some implementations, when the crawler AD16-106 determines where to write an image to the disk AD16-116, the following workflow is established:

1. The disk(s) AD16-116 to which to write the image to is determined ahead of time In summary, the path to the filename is determined by each successive byte of the hexdigest, as well as the one following it. Each level of the target directory is named for the decimal conversion of the first byte and the first two bits of the second byte. This is done for three directory levels. In accordance with some implementations, because of the way in which the directory name is assembled, there can be a maximum of just 64 inodes per directory, including subdirectories and image files (e.g., in each directory, there are 16 possible values for the first bye and 4 possible values for the second byte, thus making it 16×4=64 in total). This ensures fast indexing at every directory level. In addition, because there are only three directory levels, each partition will contain approximately 17 million inodes at full capacity, of which over 16 million will be image files. This keeps the ratio of file to image inodes low.

The final step of the workflow includes: (5) assembling the disk number, the partition number, the directory path, the hexdigest filename, and the file extension into the complete path to which the image is written, in accordance with the following algorithm:

```
Algorithm:
get_full_path(disk_number, partition_number, directory_path, hexdigest,
    extension) :
return
"/<disk_number><partition_number>/<directory_path>/<hexdigest>.<extension>"
Example:
get_full_path("01","16","/72/80/52",
    "78805a221a988e79ef3f42d7c5bfd418","jpg")
= "/0116/72/80/52/78805a221a988e79ef3f42d7c5bfd418.jpg"
```

The full algorithm is then as follows:

```
Algorithm:
get_path(disk_number, total_partitions, filename) :
extension = split(filename)[−1]
hexdigest = md5_hexdigest(filename)
partition_number = get_partition(hexdigest, total_partitions)
directory_path = get_directory_path(hexdigest)
full_path = get_full_path(disk_number, partition_number,
    directory_path, hexdigest, extension)
return full_path
Example:
disk_number = 01
total_partitions = 22
original_filename = "image.jpg"
get_path(01,22, "image.jpg") =
"/0116/72/80/52/78805a221a988e79ef3f42d7c5bfd418.jpg"
```

In some implementations, the disk number is taken from the snippet delivery timestamp. The time at which the disk began being written is noted. As soon as that disk is full, the time when writing to the disk stops is noted. Then, the date and time range is mapped to the volume number, and recorded in a stored hash.

As an example, a representation of the hash is as follows:

```
{
    "disk1" => [1437079472..1446274800],
    "disk2" => [1446274801..1454486400],
    ...
}
```

As this database will have just one entry per disk, it is unlikely to ever get very large, and to look up an image from its corresponding snippet requires only the file path and the timestamp of that snippet. Note that this requires the date and time that the snippet was harvested, not the date and time of the original post. The harvest date and time is included in each snippet as its own field.

Figure 54A:
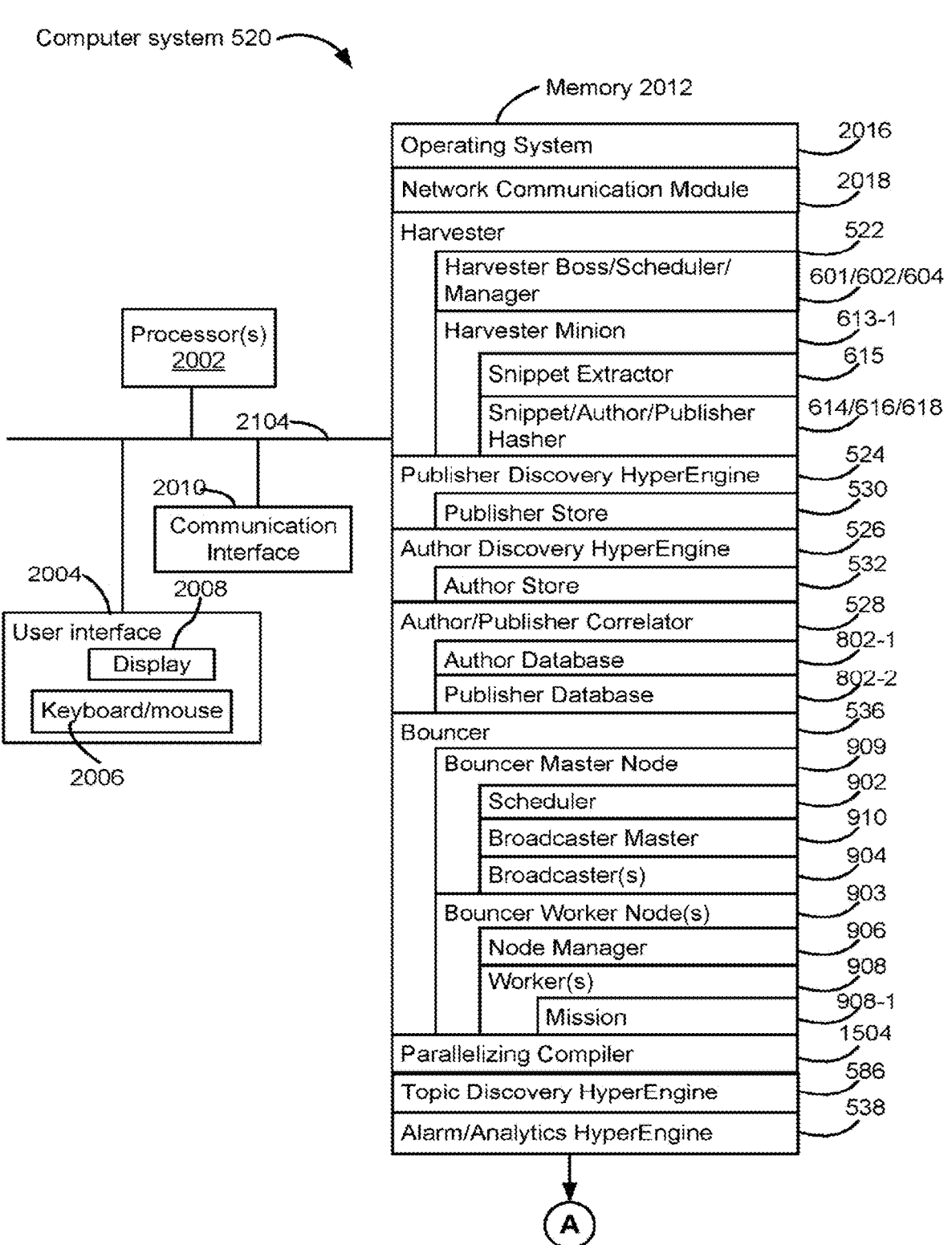
FIGS. 54A-54B illustrate a block diagram of a computer system for real-time data harvesting, and scalable data storage and organization, in accordance with some implementations.
Figure 54B:
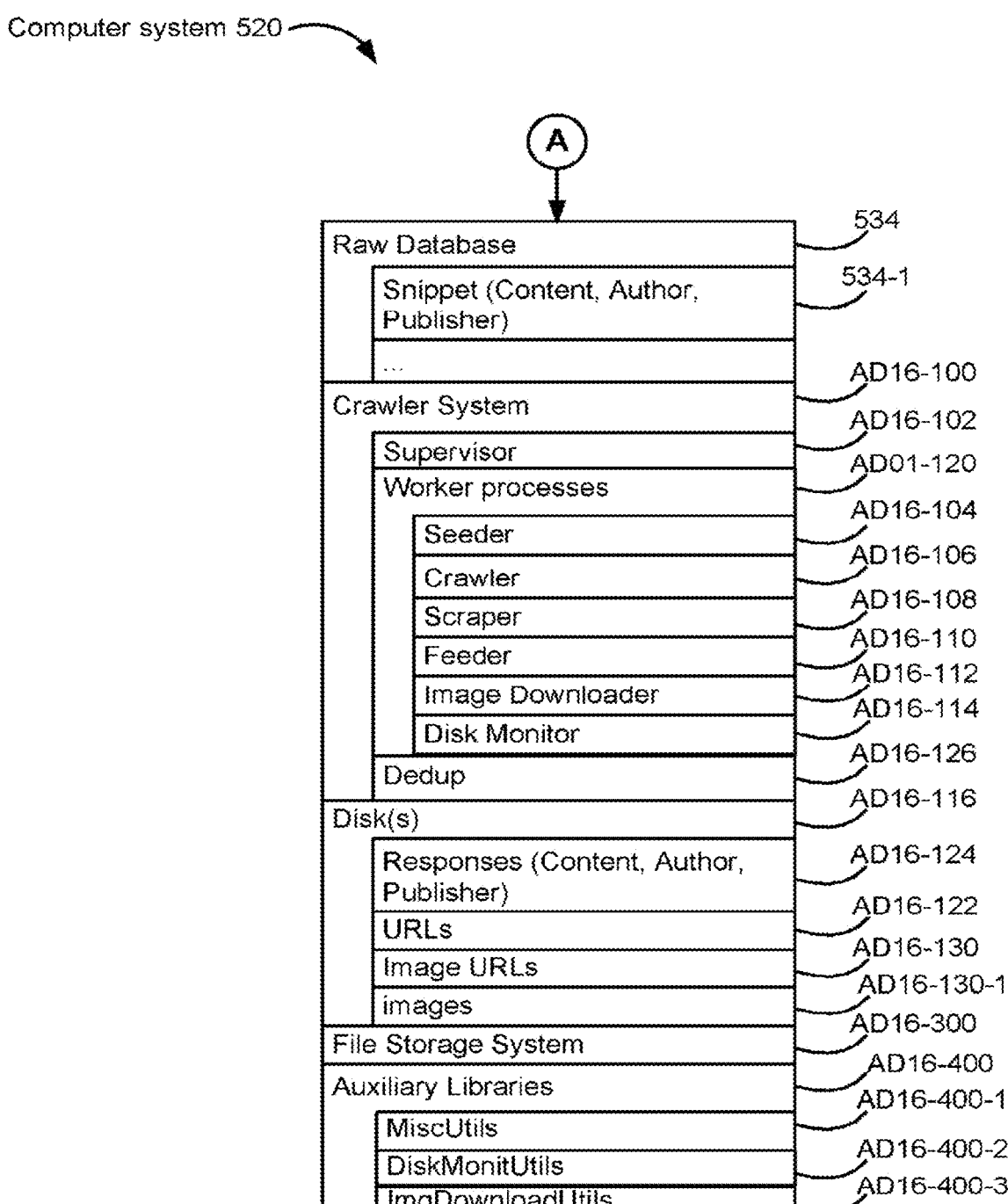

FIGS. 54A and 54B show a modified block diagram of the computer system 520 presented in FIG. 20 of U.S. patent application Ser. No. 14/214,410 for real-time harvesting, classification, and storage of data, including data streams (e.g., streams of electronic posts, including social media posts) and online sources (e.g., websites), in accordance with some implementations. The system 520 includes one or more processors 2002 for executing modules, programs and/or instructions stored in memory 2102 and thereby performing predefined operations; one or more network or other communications interfaces 2100; memory 2102; and one or more communication buses 2104 for interconnecting these components. In some implementations, the system 520 includes a user interface 2004 comprising a display device 2008 and one or more input devices 2006 (e.g., keyboard or mouse).

In some implementations, the memory 2102 includes high-speed random access memory, such as DRAM, SRAM, or other random access solid state memory devices. In some implementations, memory 2102 includes non-volatile memory, such as one or more magnetic disk storage devices, optical disk storage devices, flash memory devices, or other non-volatile solid state storage devices. In some implementations, memory 2102 includes one or more storage devices remotely located from the processor(s) 2002. Memory 2102, or alternately one or more storage devices (e.g., one or more nonvolatile storage devices) within memory 2102, includes a non-transitory computer readable storage medium. In some implementations, memory 2102 or the computer readable storage medium of memory 2102 stores the following programs, modules and data structures, or a subset thereof:

- an operating system 2106 that includes procedures for handling various basic system services and for performing hardware dependent tasks;
- a network communications module 2108 that is used for connecting the system 520 to other computers (e.g., the data sources 502 in FIG. 5A) via the communication network interfaces 2100 and one or more communication networks (wired or wireless), such as the Internet, other wide area networks, local area networks, metropolitan area networks, etc.;
- a Harvester 522 for collecting and processing (e.g., normalizing) data from multiple data sources 502 in FIG. 5A, the Harvester 522 further including a Harvester Boss 601, a Scheduler 602, a Harvester Manager 604, and one or more Harvester Minions 613-1, which are described above in connection with FIG. 6, and a Harvester Minion 613-1 further including a snippet extractor 615 for generating packets for the snippets, authors, and publishers encoded using appropriate data structures as described above with reference to FIG. 7, and a snippet hasher 614, an author hasher 616, and a publisher hasher 618 for generating a hash key for the snippet content, author, and publisher of the snippet, respectively;
- a Publisher Discovery HyperEngine 524 for inspecting the data stream from the data sources 502 in order to develop a publisher profile for a data source based on, e.g., the snippets published on the data source and storing the publisher profile in the publisher store 530;
- an Author Discovery HyperEngine 526 for inspecting the data stream from the data sources 502 in order to develop an author profile for an individual based on, e.g., the snippets written by the individual on the same or different data sources and storing the author profile in the author store 532;
- an Author/Publisher Correlator 528 for performing real-time data correlation with existing author information in the author database 802-1 and existing publisher information in the publisher database 802-2 to determine a respective snippet's author and publisher;

a Bouncer 536 for identifying high-value information for a client of the system 520 from snippets coming from different data sources by applying the snippets to mission definitions associated with the client, the Bouncer 536 further including a bouncer master node 909 and one or more bouncer worker nodes 903, the bouncer master node 909 further including a scheduler 902, a broadcaster master 910, and one or more broadcasters 904, whose functions are described above in connection with FIG. 9, and each bouncer master node 909 further including a node manager 906 and one or more workers 908 (each worker handling at least one mission definition 908-1), a more detailed description of the components in the Bouncer 536 can be found above in connection with FIG. 9;

a Parallelizing Compiler 1504 for optimizing a filter network specification associated with a client of the system 520 by, e.g., appropriately merging, reordering filters and removing cycles from the resulting filter network, etc.;

an Alarm/Analytics HyperEngine 538 for determining if and how to deliver alarm messages produced by the Bouncer 536 to end-users using, e.g., predefined communication protocols with the end-users, and generating short-term or long-term statistics through analyzing the incoming information as well historical information from the data sources and determining whether or not to trigger alarms for any violations of predefined criteria associated with a client of the system; and a Topic Discovery HyperEngine 586, for generating a statistical topic model associated with the plurality of snippets a Raw Database 534 for backing up snippets from the data sources, e.g., after the snippets are normalized by Harvester 522, each snippet having content, author, and publisher information;

a Crawler System AD16-100 for continuously obtaining recent data posted to one or more sites AD16-118, including writing images obtained from the sites to one or more partitions on the disk(s) AD16-116 and transmitting data packets of the one or more sites AD16-118 to the Harvester 522 for further post-processing;

one or more disk(s) AD16-116 for storing images scraped from the one or more sites AD16-118;

an file system AD16-300 for saving and retrieving files (e.g., images) that are obtained by the Crawler System AD16-100;

an Auxiliaries libraries AD16-400 that contain collections of precompiled routines that the computer system 520 can recall and use, including:

a MiscUtils library AD16-400-1 that contains miscellaneous methods to facilitate easier logging and output, as well as the logic with which child processes (e.g., the worker processors AD16-120) can check whether they are orphaned;

a DiskMonitUtils library AD16-400-2 that contains methods to obtain all present partition paths across all mounted disks, check the amount of space left on these partitions, check the written kbps, and obtain a summary of the above; and an ImgDownloadUtils library AD16-400-3 that contains methods used in generating the internal path to which to download an image. The first method checks which partitions are free and removes those that are not from the array of available partitions returned. The second generates the image download path itself.

It should be noted that the programs, modules, databases, etc. in the Crawler System AD16-100 and the data storage system AD16-300 described above in connection with Figures AD16-1 to 53 may be implemented on a single computer system (e.g., server) or distributed among multiple computer servers that are connected by a computer network. Although a specific hardware configuration may affect the performance of the Crawler System AD16-100 and the data storage system AD16-300, the implementation of the present application does not have any dependency on a particular hardware configuration.

FIG. 55 is a flowchart illustrating a method AD16-500 of for real-time data harvesting, and scalable data storage and organization, in accordance with some implementations. The method AD16-500 is performed at a computer system (e.g., computer system 520 in FIG. 25B), including a plurality of processors (e.g., processors 2002 in FIG. 54A) and memory (e.g., memory 2102 in FIG. 54A) storing programs for execution by the processor.

The computer system receives (AD16-502) a file having a filename. In some implementations, the file is (AD16-503) an image. In some implementations, the file includes text and other information such as author information, a date and/or a time in which the file was created.

In some implementations, the computer system includes a crawler system (e.g., crawler system AD16-100) that crawls (AD16-504) a website to receive the file.

The computer system applies (AD16-506) a hash function to the file name to obtain a first representation of a hash result. In some implementations, the computer system applies the hash function to the file name and disregards the file extension (e.g., file type) (e.g., the file extension can be .doc, .docx, .pdf, .jpg, etc.). In some implementations, the hash function maps data of arbitrary size to data of fixed value.

In some implementations, applying the hash function to the file name produces (AD16-508) a hexadecimal (e.g., base 16) value. Accordingly, using the hexadecimal value, the file name is represented using any of the 16 symbols 0,1,2,3,4,5,6,7,8,9, A, B, C, D, E and F.

In some implementations, the first representation of the hash result is (AD16-510) a hexadecimal (e.g., base 16) representation of the hash result.

In some implementations, the hash function is (AD16-512) an MD5 value. In some implementations, the hash function is an MD5 hashing algorithm that accepts a message of any length as input and returns as output a fixed-length (e.g., 32) digest value.

The computer system generates (AD16-514) at least a portion of a directory path for the file from the hash result. This includes determining, as a disk partition number of the directory path, a remainder of a division of a decimal representation of the hash result by a predefined number of available partitions (e.g., the decimal representation modulo the predefined number of available partitions), and determining first, second, and third subdirectories of the directory path by, for each respective subdirectory of the first, second, and third subdirectories of the directory path, generating a string comprising a decimal representation of a first predefined byte of the first representation of the hash result; and a decimal representation of one or more bits of a second predefined byte of the first representation of the hash result.

In some embodiments, generating at least a portion of a directory path for the file from the hash result includes: This includes determining, as a disk partition number of the directory path, a remainder of a division of the hash result by a predefined number of available partitions (e.g., the hash result modulo the predefined number of available partitions), and determining first, second, and third subdirectories of the directory path by, for each respective subdirectory of the first, second, and third subdirectories of the directory path, generating a string comprising a first predefined byte of the hash result expressed in the first representation; and one or more bits of a second predefined byte of the hash result expressed in the first representation (e.g., as described above with reference to AD16-312).

In some implementations, the first predefined byte corresponding to the first, second, and third subdirectories are all distinct from each other. In some implementations, the second predefined byte corresponding to the first, second, and third subdirectories are all distinct from each other.

In some implementations, the one or more bits includes (AD16-516) exactly two bits. Thus, since the first predefined byte of the hash result, in a hexadecimal (base 16) representation, can take on any of 16 symbols (e.g., 0, 1, 2, 3, 4, 5, 6, 7, 8, 9, A, B, C, D, E and F) and the two bits from the second predefined byte can take on any of four values (e.g., 0-3), each of the first, second, and third subdirectory is a string having one of 64 values (i.e., 16 times 4). Accordingly, this limits the size of the directory tree so that indexing can be done quickly. At the same time, the use of three levels of subdirectories (and one level of disk partition) provides an appropriately shallow depth for fast retrieval of files. Thus, the file system AD16-300 improves the computer system 520 by making file retrieval and indexing faster.

The computer system stores (AD16-518) the file according the directory path for the file. In some implementations, the directory path for the file is generated by the scraper AD16-108. In some implementations, the directory path for the file is generated using the filename and after applying the hash function to the file name to obtain the first representation of a hash result. In some implementations, the scraper AD16-108 uses the logic defined in a library (e.g., an DiskMonitUtils auxiliary library AD16-400-2) to determine the directory path for the file.

In some implementations the file is (AD16-520) an image and the directory path is for an image storage database.

In some implementations, the directory path is for a directory in the disk(s) AD16-116 to store the image. In some implementations, the image file has a related data packet and the decretory path is retained in the related data packet prior to sending the data packet to the feeder AD16-110 and the Harvester 522.

(J1) In one aspect, some implementations include a method, comprising: at a computer system including a plurality of processors and memory storing programs for execution by the processors: receiving a file having a filename; applying a hash function to the file name to obtain a hash result; generating at least a portion of a directory path for the file from the hash result, including: determining, as a disk partition number of the directory path, a remainder of a division of the hash result by a predefined number of available partitions; determining first, second, and third subdirectories of the directory path by, for each respective subdirectory of the first, second, and third subdirectories of the directory path, generating a string comprising: a first predefined byte of the hash result expressed in a first representation of the hash result; and one or more bits of a second predefined byte of the hash result expressed in the first representation of the hash result; and storing the file according the directory path for the file.

(J2) In some implementations of the method of (J1), wherein: applying the hash function to the file name produces a hexadecimal value; and the first representation of the hash result is a hexadecimal representation of the hash result.

(J3) In some implementations of the method of (J2), wherein the one or more bits includes exactly two bits.

(J4) In some implementations of the method of any of (J2) or (J3), wherein the hash function is an MD5 hash.

(J5) In some implementations of the method of any of (J1)-(J4), wherein receiving the file includes crawling a website for the file.

(J6) In some implementations of the method of any of (J1)-(J5), wherein the file is an image and the directory path is for an image storage database.

(J7) A computer system comprising: one or more processors; and memory coupled to the one or more processors, the memory storing one or more programs configured to be executed by the one or more processors, the one or more programs including instructions for performing the method of any of (J1)-(J6).

(J8) A non-transitory computer-readable storage medium storing one or more programs, the one or more programs comprising instructions which, when executed by a computer system, cause the system to perform the method of any of (J1)-(J6).

In some implementations, the computer system further assembles one or more of: a disk number, a disk partition number, the directory path for the file, the file name after the application of the hash function, and the file extension, into the complete path to which the image is written, before storing the file.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first image could be termed a second image, and, similarly, a second image could be termed a first image, without departing from the scope of the various described implementations. The first image and the second image are both images, but they are not the same type of images.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

Word Set Visual Normalized Weight Dampening

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Given a set of words with a weight from a given corpus (e.g., a set of words resulting from classification, clustering, and/or labeling processes described in U.S. patent application Ser. No. 15/530,187, which is incorporated by reference herein in its entirety, with respect to at least FIGS. 5B, 24, and 25), a dampening algorithm, in accordance with some implementations, allows for a consistent visual display of the words resulting from such processes. More specifically, by dampening (or otherwise making less prevalent) words that have higher weight versus words with a lower weight, all of the words are displayed in a consistent manner, thereby ensuring that the display is consistent with any size data set. Further, outliers are kept from being too large or too small to display, since dampening ensures that weights are mapped to a readable font size.

In accordance with some implementations, a user interface (e.g., front-end UI 5005) displays words represented by respective scores. In some implementations, the words are displayed in different sizes based on the scores. For example, if one word is more relevant to a certain classification or label, then that word is displayed in a bigger size (e.g., using a larger font) or in an otherwise more prevalent manner (e.g., bolder or in a more noticeable color) than another word that is less relevant.

For a dampening method in accordance with some implementations, given a collection of documents denoted as a corpus, there is a set of words W with weight WT, based on, in some implementations, a calculated frequency of their occurrence in the corpus.

In some implementations, a function that transforms a number x to a dampened number x' uses the function: x'=damp(x), where damp(x) can be log(x), $\sqrt{x}$ or any other function that elicits x'≤x.

In some implementations:
(i) there is a set of normalized weights, nweight $\in$ NWT
(ii) there is a set of font weights, fweight $\in$ FWT, and
(iii) the largest and smallest font size are $MAX_{FONT}$ and $MIN_{FONT}$ respectively.

$$max = max(W), min = min(W)$$

$$max' = \sqrt{max}, min' = \sqrt{min}$$

$$\forall\ weight' \in WT':weight' = \sqrt{weight}$$

$$\forall\ nweight \in NWT:nweight = \frac{weight' - min'}{max' - min'}$$

$$\forall\ fweight \in FWT:fweight = nweight*(MAX_{FONT} - MIN_{FONT}) + MIN_{FONT}$$

After getting all dampened fweights, the words can be visually displayed as a word cloud, histogram, or other visual display that correlates the size, color, highlighting, or combination of each word using the fweight.

In the example Figure below (FIG. 1), the Reference Text 1 through Reference Text 5 on the left ascend linearly by font size. Some displays may not be able to adequately render both ReferenceText 1 and ReferenceText 5 due to the large difference in sizes (e.g., by rendering based on size 5, size 1 may be too small to read, and by rendering based on size 1, size 5 may be too large to read). On the other hand, by dampening the font sizes using one of the techniques described above, the resulting difference in sizes (ReferenceText sqrt(2) through ReferenceText sqrt(5) below) is less dramatic, and it is more likely that a display would be able to properly render each size (e.g., making both sizes 1 and 5 readable on the same display at the same time).

A method of displaying a word cloud (or any grouping of words that are associated with respective scores or weights), in accordance with some implementations includes: (i) receive a plurality of words, each word associated with a score indicating the frequency of the word associated with a plurality of documents; (ii) applying a dampening transform to each score to determine a dampened score; and (iii) generating a word cloud based on the dampened scores and causing a display to display the word cloud.

(K1) In one aspect, some implementations include a method for displaying a plurality of words associated with a corpus of documents or posts from one or more data streams, comprising, at a computer system including a plurality of processors and memory storing programs for execution by the processors, receiving the plurality of words and a plurality of raw scores, each word of the plurality of words corresponding to a respective raw score of the plurality of raw scores; determining a respective dampened score for each of the plurality of words by applying a dampening transform to each respective raw score; generating a visual element including the plurality of words, each word of the plurality of words being depicted in the visual element in accordance with a corresponding respective dampened score; and causing a display to display the visual element.

(K2) In some implementations of the method (K1), the method further comprises: determining a minimum word display size associated with the display; and determining a maximum word display size associated with the display; wherein determining the dampened scores includes adjusting the dampening transform to accommodate the minimum word display size and/or the maximum word display size.

(K3) In some implementations of any of the methods (K1)-(K2), the minimum and maximum word display sizes are determined based on minimum and maximum readable font sizes associated with the display.

(K4) In some implementations of any of the methods (K1)-(K3), the minimum and maximum word display sizes are determined based on a relative weighting factor, such that the minimum word display size corresponds to a font size that is readable on the display, and the maximum word display size corresponds to a font size that allows the longest word of the plurality of words to be displayed in a single line in the visual element.

(K5) In some implementations of any of the methods (K1)-(K4), each respective raw score denotes frequency of occurrence of a respective corresponding word in the corpus of documents.

(K6) In some implementations of any of the methods (K1)-(K5), each respective raw score denotes relevance of a respective corresponding word to a classification or label associated with the corpus of documents.

(K7) In some implementations of any of the methods (K1)-(K6), the dampening transform is based on (i) the square root of the raw score, (ii) a logarithmic function of the raw score, (iii) an exponential function of the raw score, and/or (iv) a function which results in the dampened score being less than or equal to the raw score.

(K8) In some implementations of any of the methods (K1)-(K7), the visual element is a display element that correlates the size, color, highlighting, and/or combination of each word using respective dampened scores in the form of a word cloud, a histogram, and/or a visual display, thereby visually demonstrating relevance or frequency of occurrence of each word of the plurality of words to the corpus of documents.

(K9) In some implementations of any of the methods (K1)-(K8), depicting the plurality of words in the visual element in accordance with the corresponding dampened scores includes depicting the plurality of words based on a proportional relationship between dampened scores and word display sizes.

(K10) In some implementations of any of the methods (K1)-(K9), the higher the dampened score, the larger the word display size, and the lower the dampened score, the smaller the word display size.

(K11) In some implementations, an electronic device comprising one or more processors and memory storing instructions that, when executed by the one or more processors, causes the one or more processors to perform any of the methods (K1)-(K10).

(K12) In some implementations, a non-transitory computer-readable storage medium storing instructions that, when executed by an electronic device with one or more processors, causes the one or more processors to perform any of the methods (K1)-(K10).

Architecture for Hierarchical, Parallel Models for Extracting in Real-Time High-Value Information from Data Streams This application relates to computer architectures for extraction of high-value information from streams of data.

The growing phenomenon of social media has resulted in a new generation of "influencers." Every day, tens of millions of consumers go online to express opinions, share ideas and publish media for the masses. Consumers control the conversation and play a significant role in shaping, for example, the purchasing decisions of others. Thus, companies have to work harder to manage their reputations and engage consumers in this fluid medium. Businesses that learn to understand and mine consumer-generated content across blogs, social networks, and forums have the opportunity to leverage the insights from others, make strategic business decisions and drive their bottom line. Social media monitoring is often the first step to adopting and integrating the social Web into business.

The problem with monitoring social media (or more generally, the internet) for business (and other) interests is that it is difficult to "separate the wheat from the chaff." Conventional tools and methods for monitoring the internet often fail to turn data into actionable intelligence. Too often, such methods produce only statistical views of social media data, or produce far more data than a company can react to while missing critical pieces of data.

One crucial bottleneck in monitoring the internet for actionable intelligence is the capabilities of the computer itself. The technical problem that arises in this context is that conventional computing architectures for monitoring the internet (which may comprise a combination of hardware, firmware, and software) simply cannot keep up with the enormous stream of data that is produced by social media, let alone the entirety of the internet, because of scalability and latency problems.

Therefore, there is a need for new computer architectures for identifying valuable information, and only valuable information, (e.g., as defined with respect to a particular interest, such as a business interest) in real-time, from enormous amounts of data streaming in from the internet.

Figure 57:
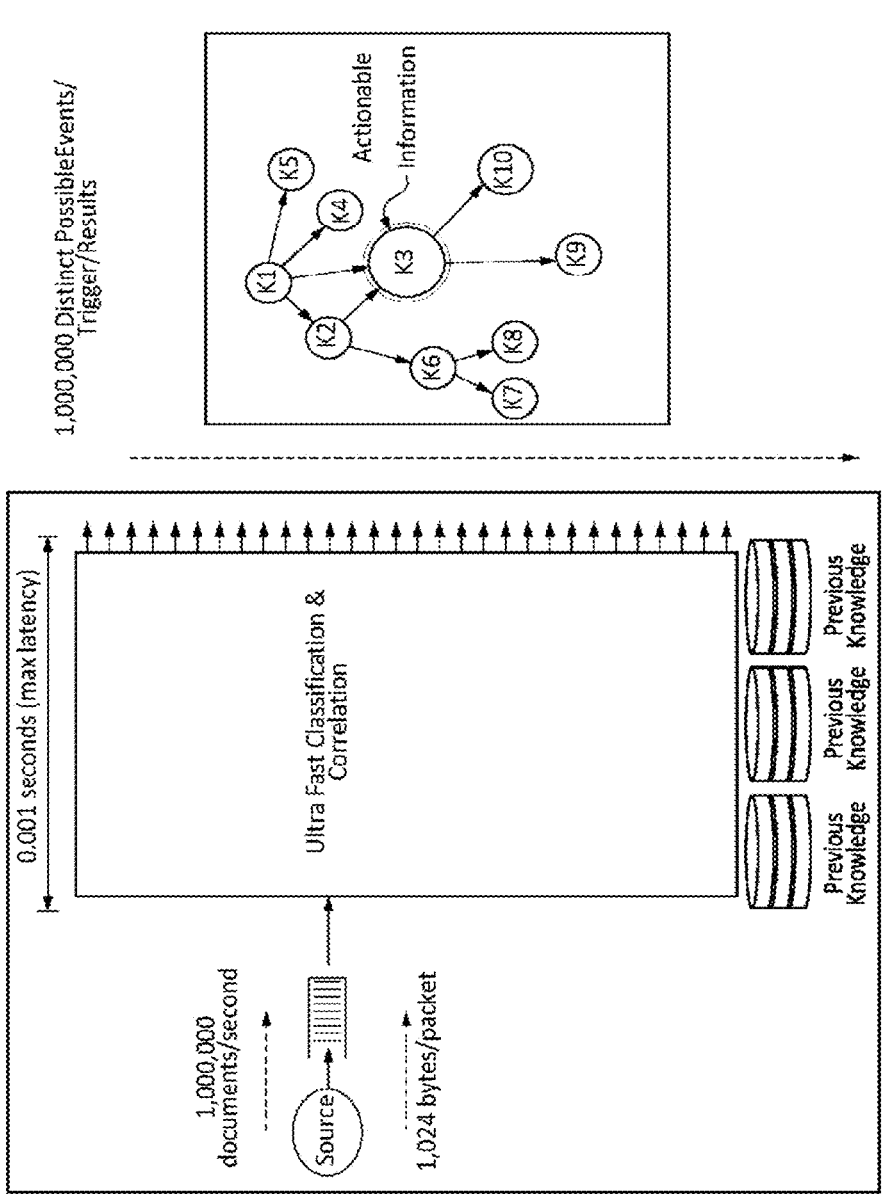
FIG. 57 illustrates a schematic diagram of a system for real-time identification of valuable information from the internet, according to some implementations.

FIG. 57 illustrates a schematic diagram of a system for real-time identification of valuable information, according to some implementations. Data arrives in packets from sources on the internet. As a typical value, a million documents may be received each second from the various sources on the internet, and that number is only expected to grow. The documents (sometimes called packets) are correlated with previous knowledge. For example, a document received from a particular author (e.g., a social media user who posts something) is correlated with knowledge about that author that was deduced from previous documents received from that author. This process is described in greater detail with reference to U.S. patent application Ser. No. 14/214,443, filed Mar. 14, 2014, entitled "Massively-Parallel System Architecture and Method for Real-Time Extraction of High-Value Information from Data Streams," which is incorporated by reference herein in its entirety.

Figure 58:
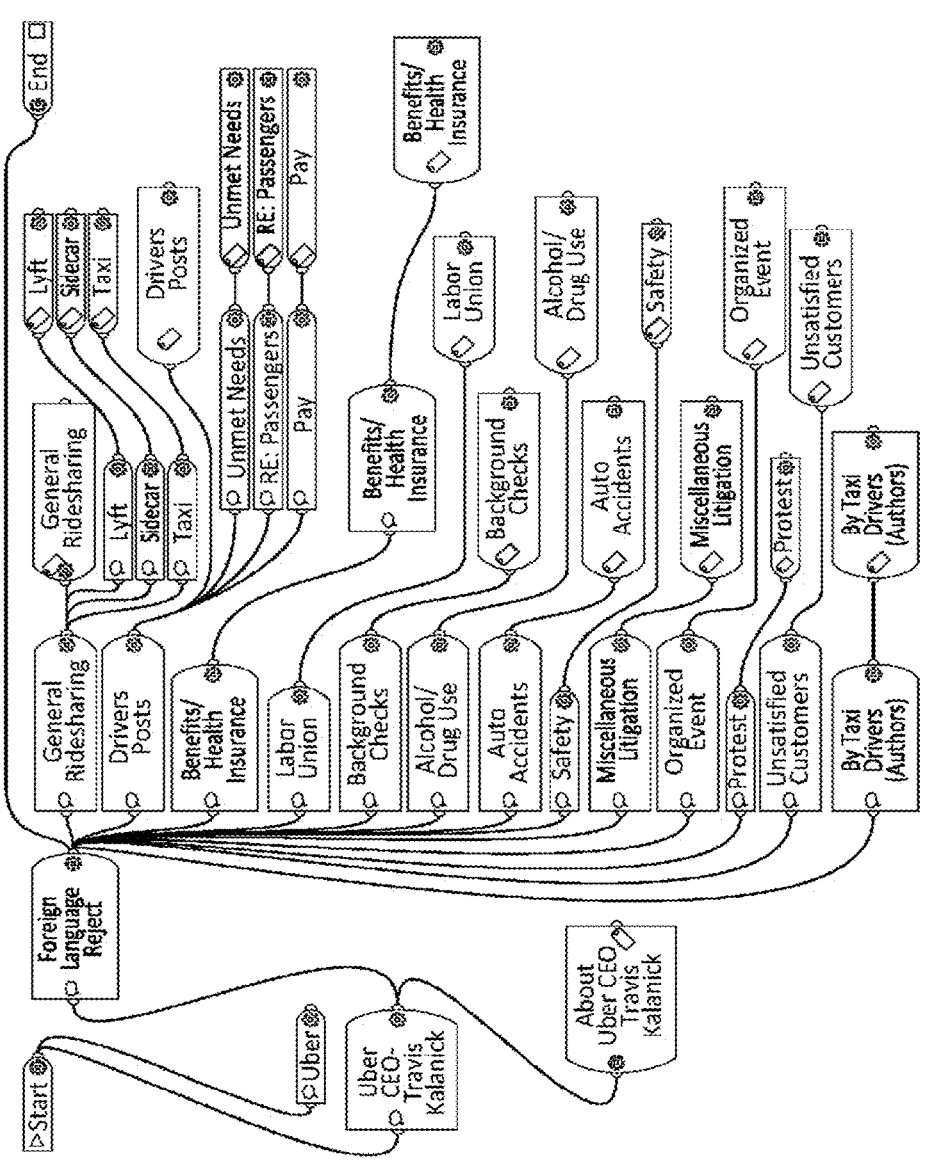
FIG. 58 shows an example of a hierarchical mission for identifying, from the internet, high-value information relevant to the ride sharing company Uber, according to some implementations.

In addition, documents are classified to identify actionable information (e.g., information identified as high-value because of its particular relevance to a respective subject). A filter that identifies actionable information with respect to a particular topic is referred to herein as a "mission." Missions can be formed in a hierarchical structure (as shown on the right-hand side of FIG. 57) so that individual missions can be used to build up other missions (a further example is shown in FIG. 58). For example, the right-hand side of FIG. 57 shows missions K1 through K10, arranged hierarchically to form a larger mission (e.g., such that missions K1 through K10 are nodes of the larger mission). Actionable intelligence can be extracted at any node.

To keep up with the flow of documents (e.g., to maintain operation in a "real-time" mode), each document must be processed within a timeframe that is on the order of thousandths of a second. The architectures provided herein solve the technical problem noted above by improving the functioning of the filtering computer system, thus allowing the filtering computer system to meet the demands of real-time monitoring of the internet, where systems using conventional architectures cannot.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 58 shows an example of a hierarchical mission for identifying high-value information relevant to the ride sharing company Uber. The mission shown in FIG. 58 is similar to those described in FIG. 1 and FIG. 2, but with greater detail. The Uber mission is made up of other missions, arranged in a graph (e.g., a tree).

The missions making up the Uber mission are configured to accept or reject individual packets (e.g., documents) in a data stream based on content and/or metadata associated with individual posts corresponding to the individual packets. For example, the foreign language mission is configured to reject documents that are in a foreign language, since the word "Uber" is a German word and thus documents in German that use the word "Uber" are unlikely to be referring to the ride-sharing company.

As shown in FIG. 58, actionable information can optionally be extracted from the mission at a plurality of different locations in the filter definition. For example, documents reaching the various leaves of the tree making up the filter graph are indexed as results of the mission. In some embodiments, the leaves are not themselves missions, but are instead "taps" as described with reference to FIG. 1. Thus, the Uber mission has a tap for posts about former Uber CEO Travis Kalanick, for unsatisfied customers, for safety, etc.

The hierarchical nature of the missions allows users to easily edit the mission definition using, at least in part, general filters in a library (e.g., the foreign language reject filter). Creation and editing of a mission definition can be done using the dashboard editor shown in FIG. 62.

Figure 59:
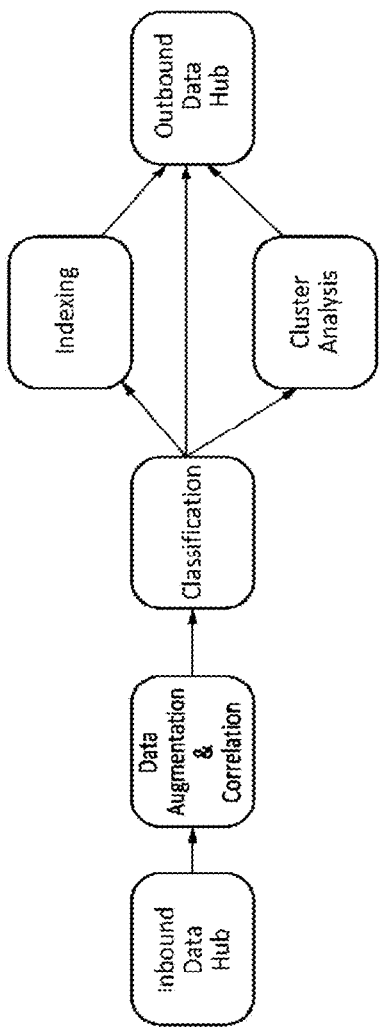
FIG. 59 illustrates various stages of a process for real-time identification of valuable information from the internet, in accordance with some embodiments.

FIG. 59 illustrates the various stages of a process for real-time identification of actionable information, in accordance with some embodiments. Data is received through an inbound data hub, augmented and correlated with additional data already existing in the system (e.g., previous knowledge, as shown in FIG. 57, author attributes, as shown in FIGS. 60 and 61, etc.), classified according to mission definitions (e.g., as described with reference to FIG. 5A-5B and FIG. 60 through 62), indexed and optionally stored (e.g., so that the data can be "replayed" as described with reference to the figures labeled AD01), and clustered according to a topic discovery process (e.g., as described with reference to U.S. patent application Ser. No. 14/688,865, entitled "Automatic Topic Discovery in Streams of Unstructured Data").

Results are passed through an outbound data hub to, e.g., external computing systems. For example, when the Uber mission triggers an alert, the alert is passed through the outbound data hub to Uber headquarters. In addition, non-real-time analytics are also optionally passed through the outbound data hub.

FIG. 60 through FIG. 62 illustrate a schematic diagram of a system architecture AD18-400 for identifying valuable information from the internet, in accordance with some embodiments. In some implementations, the system architecture shown in FIG. 60 through FIG. 62 includes components with functionalities analogous to the system diagram shown in FIGS. 5A-5B, but with greater detail.

To that end, system AD18-400 collects data (e.g., posts) from a plurality of sources, including social media sources (e.g., using a social media harvester), image sources (e.g., using an image harvester), and general content on the internet (blogs, news articles, etc., e.g., using a general data integration hub). After optional normalization, the data is stored in one or more databases (e.g., universal store and image store) and is searchable using one or more searchable indexes (e.g. universal searchable index and image universal searchable index). System AD18-400 then aggregates the data from the plurality of sources (e.g. using a real-time stream aggregator).

System AD18-400 analyses the data about the author (e.g., the user who wrote the post or the source of the image). This is done, for example, using an author information analyzer, an author geolocation analyzer (e.g., to determine where, geographically-speaking, the post originated), and an author image analyzer. From these data, various author attributes are determined, processed by an author attribute processor, and stored in an author attribute store. In some embodiments, the author attributes include one or more demographics and/or one or more interests of the author. Author attribute determination is described in more detail elsewhere in this document.

From the real-time stream aggregator, the data is passed to a real-time stream correlator, that (using the author attribute store and the author attribute processor) correlates the real-time packets with information gleaned from previous posts by that author. The correlated packets (e.g., posts) are then broadcast to a massively parallel real-time classification engine that processes packets according to "missions" (e.g., executable filter graph definitions that identify posts as being of high-value with respect to a subject). The executable filter graph definitions are created and compiled using a mission editor that can include a graphical user interface (GUI). Mission execution is described in U.S. patent application Ser. No. 14/214,410, entitled "Hierarchical, Parallel Models for Extracting in Real-Time High-Value Information from Data Streams and System and Method for Creation of Same," as well as the remainder of this document.

In addition, missions can be automatically created based on topics that are "discovered" from social media posts. For example, system AD18-400 can analyze the past hour's social media posts (or the past day's, week's, minute's, etc.) to discover topics that are trending on the internet. This can be done using the modified latent Dirichlet allocation process described in U.S. patent application Ser. No. 14/688, 865, entitled "Automatic Topic Discovery in Streams of Unstructured Data." The automatically generated missions can be made available to users, using the GUI, in the creation of their own missions (e.g., in a hierarchical manner, where the automatically-created missions are sub-missions of the user created mission).

The compiled missions are then optimized by an optimizing parallelizing compiler as described in U.S. patent application Ser. No. 14/214,490, entitled "Optimization For Real-Time, Parallel Execution Of Models For Extracting High-Value Information From Data Streams," which is incorporated by reference herein in its entirety.

Various analytics can be performed on the results of the real-time classification process, including visualization analysis, alerts and alarms for particularly high-value posts (e.g., actionable information).

FIGS. 63 through 71 deal specifically with an architecture for broadcasting a processing packets in real-time. FIGS. 63 through 67 illustrate architectures that, while improving the current state-of-the-art, nonetheless cannot meet the scalability and latency demands of monitoring the internet. FIGS. 68 through 71 provide details on an architecture that can meet these demands.

Figure 63:
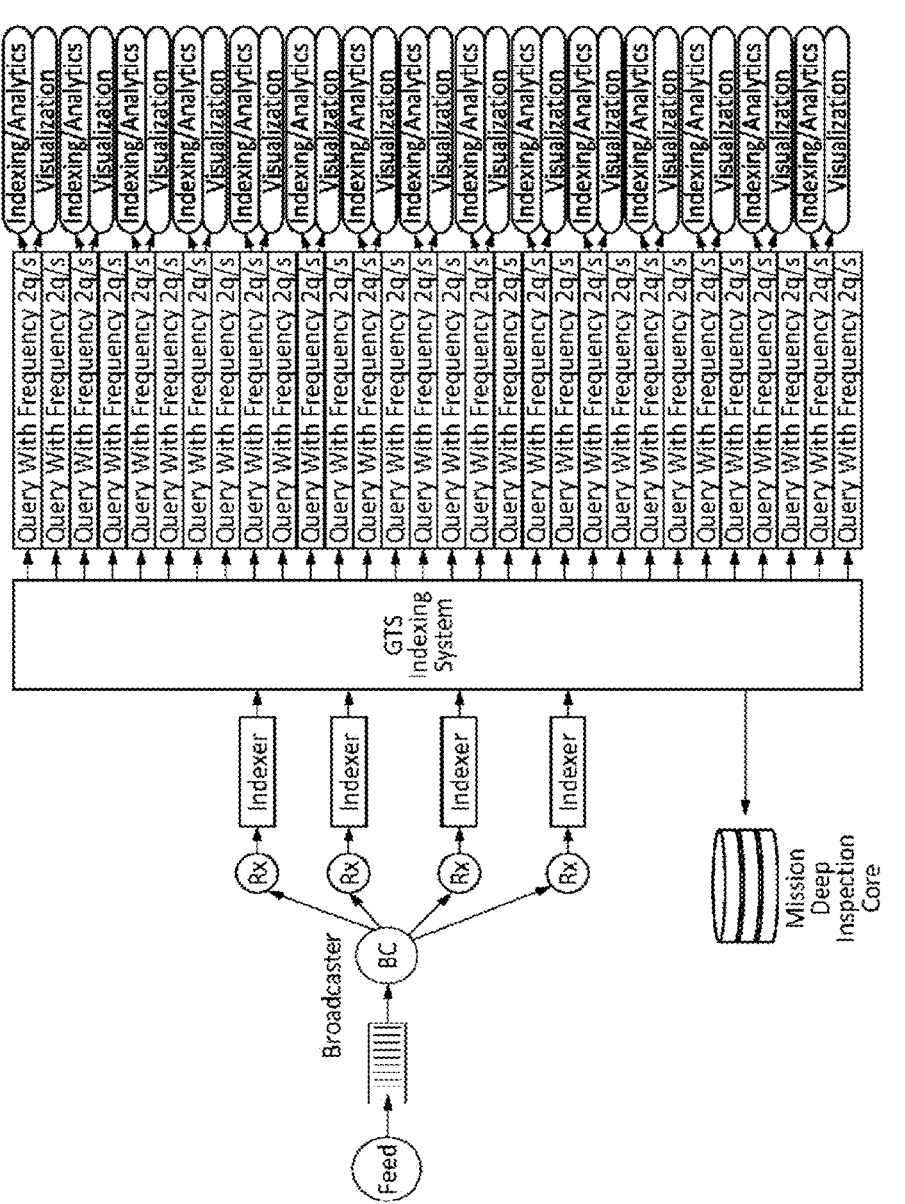
FIG. 63 illustrates a SAP GTS-indexing-based architecture for identification of valuable information, in accordance with some embodiments.

FIG. 63 illustrates a SAP Global Trade Services (GTS)—indexing-based architecture for identification of valuable information, in accordance with some embodiments. In these embodiments, the feed (e.g., from the real-time stream aggregator and correlator) enters a queue before being broadcast by a broadcaster (BC) to a plurality of receivers (Rx). Each receiver has an indexer that indexes the feed before passing the feed to a GTS indexing system, with a plurality of query processes running in parallel. The results are then indexed and used for analytics and visualization. The problem with this architecture, however, is that it has both scalability and latency problems in the context of monitoring the internet for high-value information.

Figure 64:
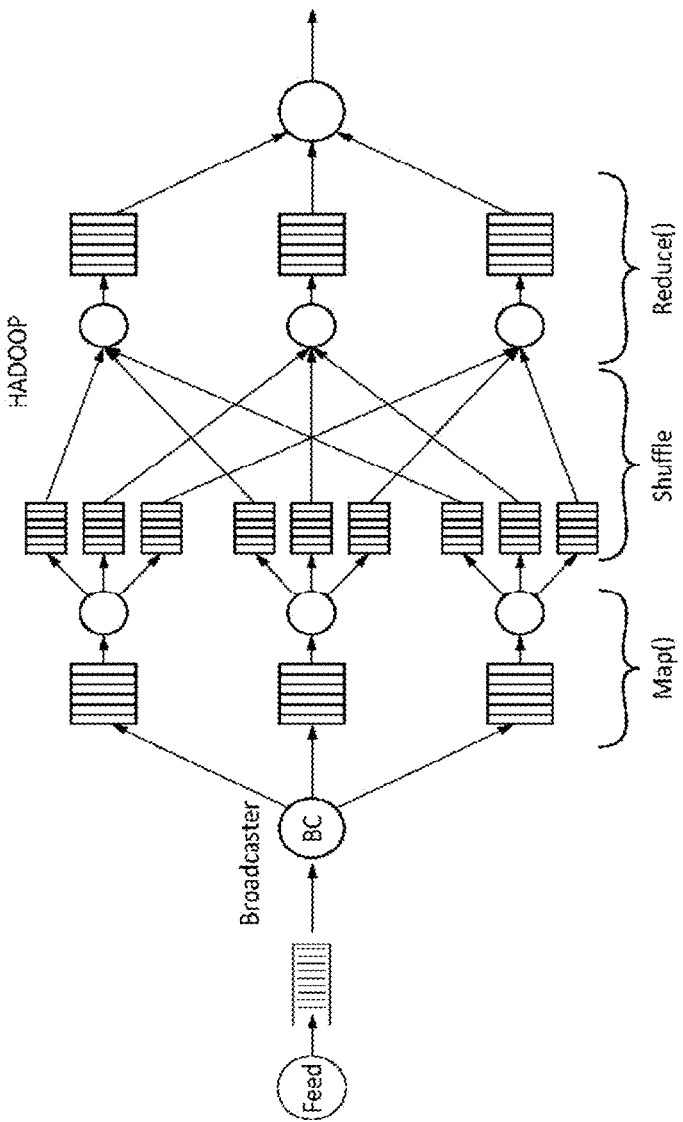
FIG. 64 illustrates an Apache Hadoop-based architecture for identification of valuable information, in accordance with some embodiments.

FIG. 64 illustrates an Apache Hadoop-based architecture for identification of valuable information, in accordance with some embodiments. The Apache Hadoop software library is a framework that allows for the distributed processing of large data sets across clusters of computers using simple programming models. The architecture shown in FIG. 64 improves the state-of-the-art by using map, shuffle, and reduce stages to process the feed using a plurality of parallel processing, but introduces too much latency to be used for the real-time monitoring processes described herein.

Figure 65:
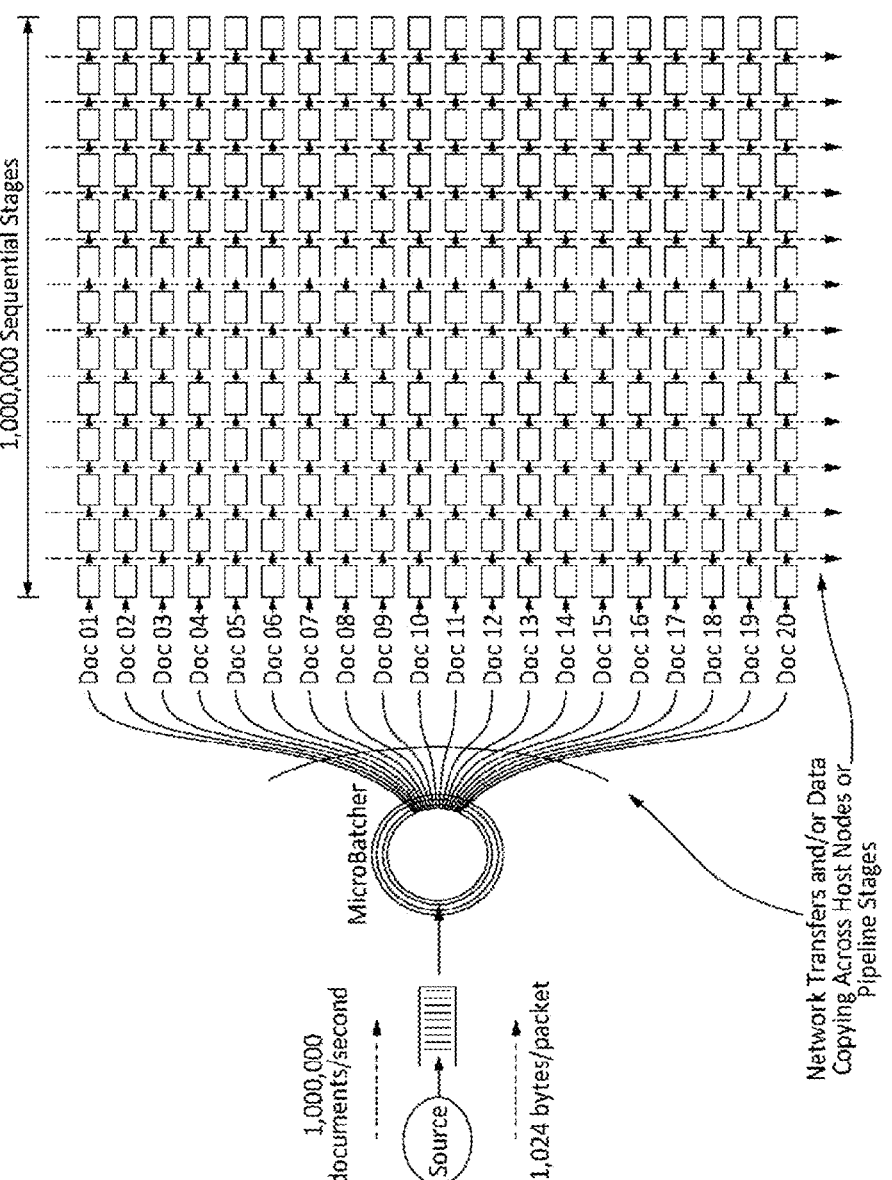
FIG. 65 illustrates an architecture for identification of valuable information using Apache Spark Pipelines, in accordance with some embodiments.

FIG. 65 illustrates an architecture for identification of valuable information using Apache Spark Pipelines, in accordance with some embodiments. Recalling that each document is passed to a plurality of missions, the architecture shown in FIG. 65 uses a micro-batcher to distribute the documents to a plurality of sequential pipelines, where each sequential pipeline includes pipelines corresponding to all of the missions that the document is to be distributed to. The system in FIG. 65 reduces the latency to perhaps minutes or hours by distributing the documents across, e.g., thousands of sequential pipelines. The number of sequential pipelines can be chosen so that, in effect, the broadcaster can keep up. But a latency of hours or minutes is still not good enough for real-time monitoring of the internet.

Figure 66:
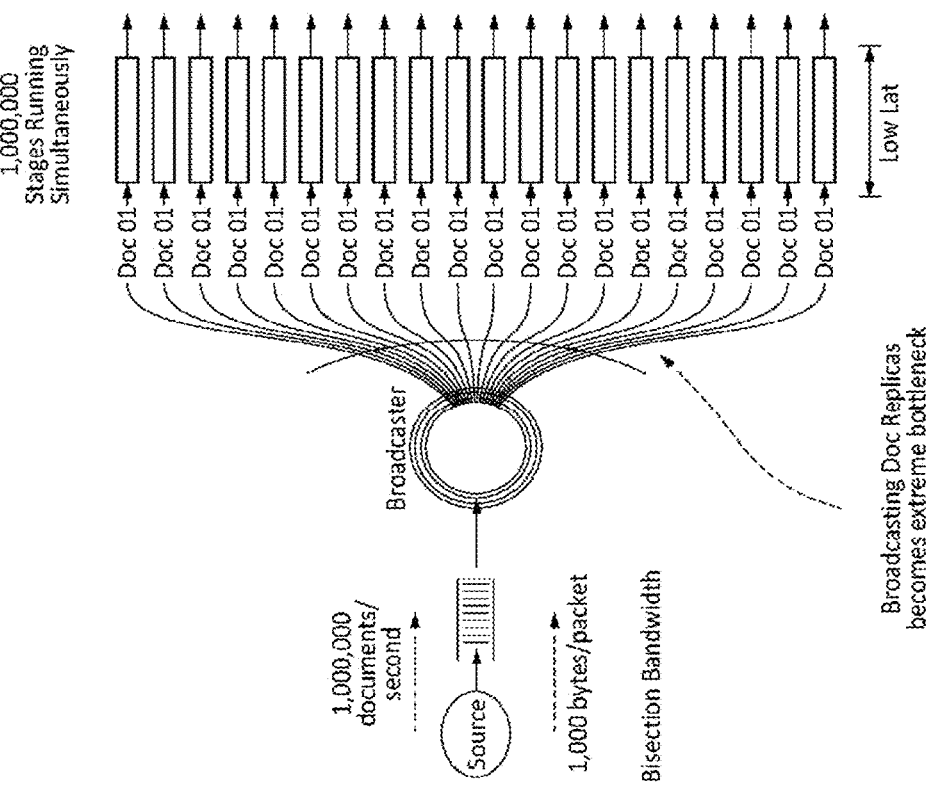
FIG. 66 illustrates another architecture for identification of valuable information using Apache Spark Pipelines, in accordance with some embodiments.

FIG. 66 illustrates an architecture for identification of valuable information using Apache Spark Pipelines, in accordance with some embodiments. In contrast to the architecture shown in 65, the architecture shown in 66 uses data replication so that each pipeline processes only a single mission, and the documents are processed by all the necessary missions by replicating the documents for each necessary pipeline. In this case, as many as a million pipelines may be running in parallel. While the pipelines are no longer sequential, and thus their latency is reduced, the broadcaster can no longer keep up, as it has to replicate documents and distribute them to an enormous number of parallel pipelines.

Figure 67:
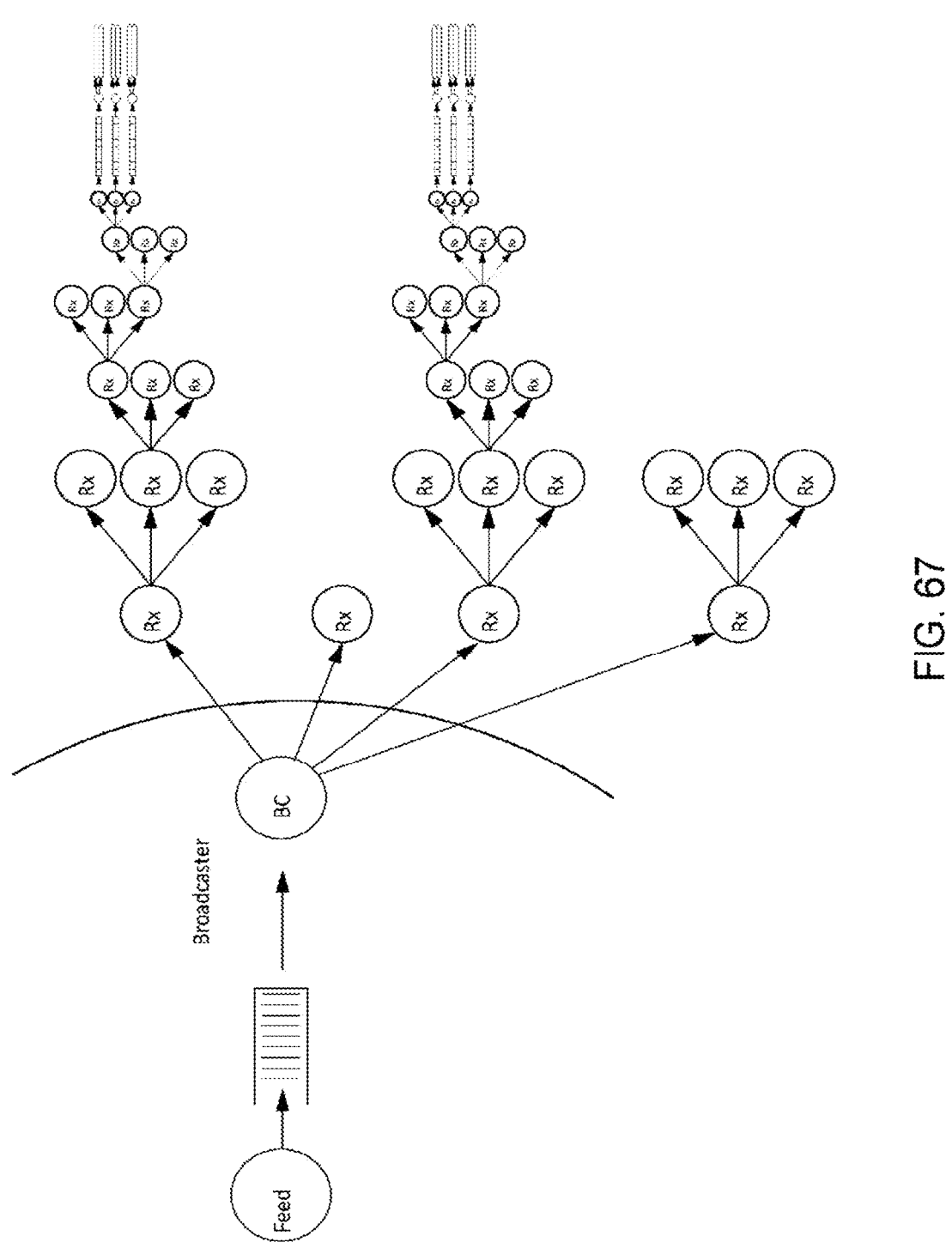
FIG. 67 illustrates an architecture for identification of valuable information using a receiver tree, in accordance with some embodiments.

FIG. 67 illustrates an architecture for identification of valuable information using a receiver tree, in accordance with some embodiments. In these embodiments, receivers (other than leaf receivers) replicate and distribute documents to other receivers, in a tree structure. Leaf receivers distribute documents to missions. To distribute documents to, e.g., a million missions, the receiver tree needs, e.g., well over a million receivers. In addition to being prohibitively expensive to operate (e.g., if each receiver resides on a server that costs $1,000 per month to operate, the operational cost could be a billion dollars per month), the latency introduced by the replication and distribution of all of the receivers is on the orders of days.

Figure 68:
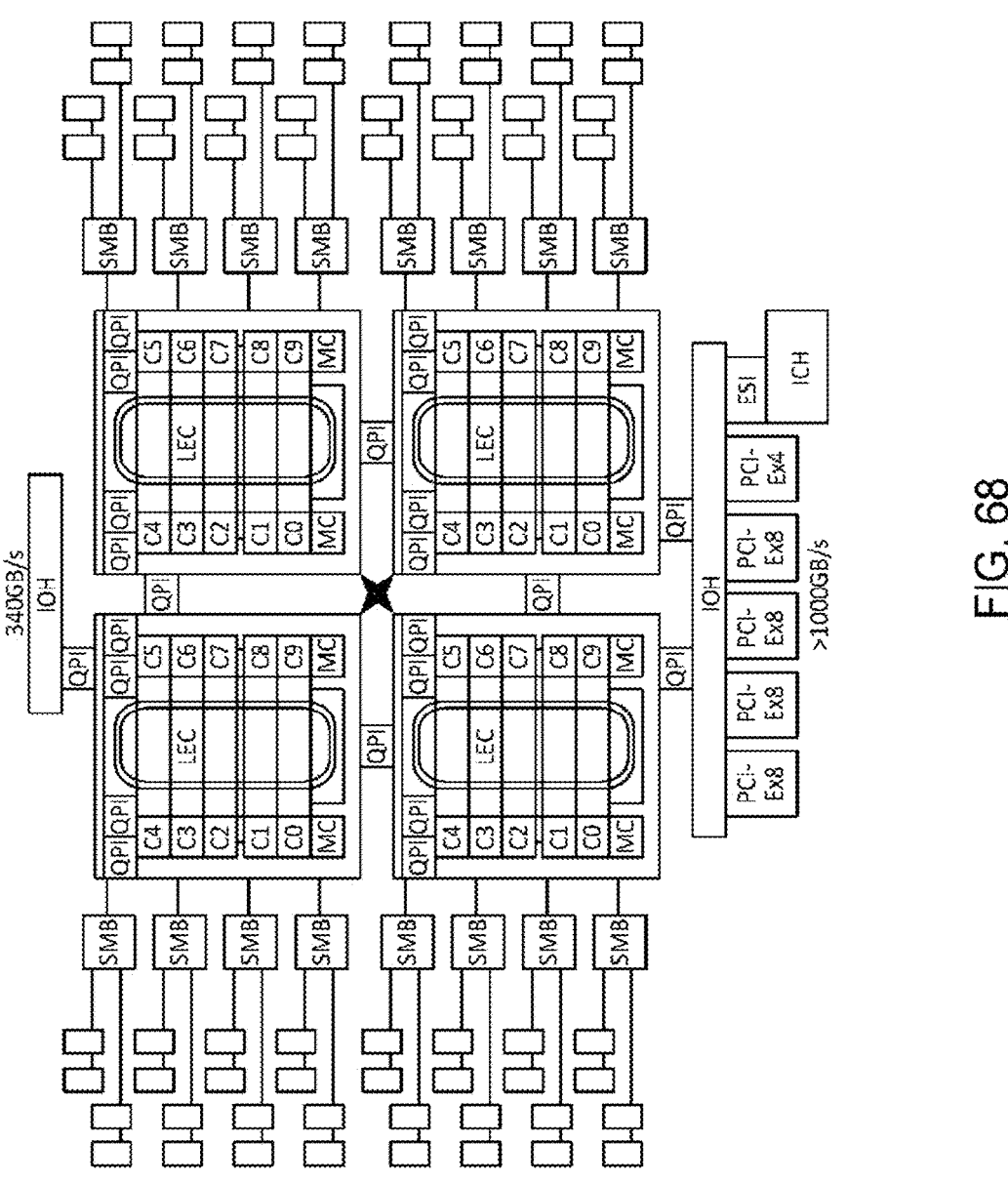
FIG. 68 illustrates a chip-architecture for identification of valuable information.
Figure 69:
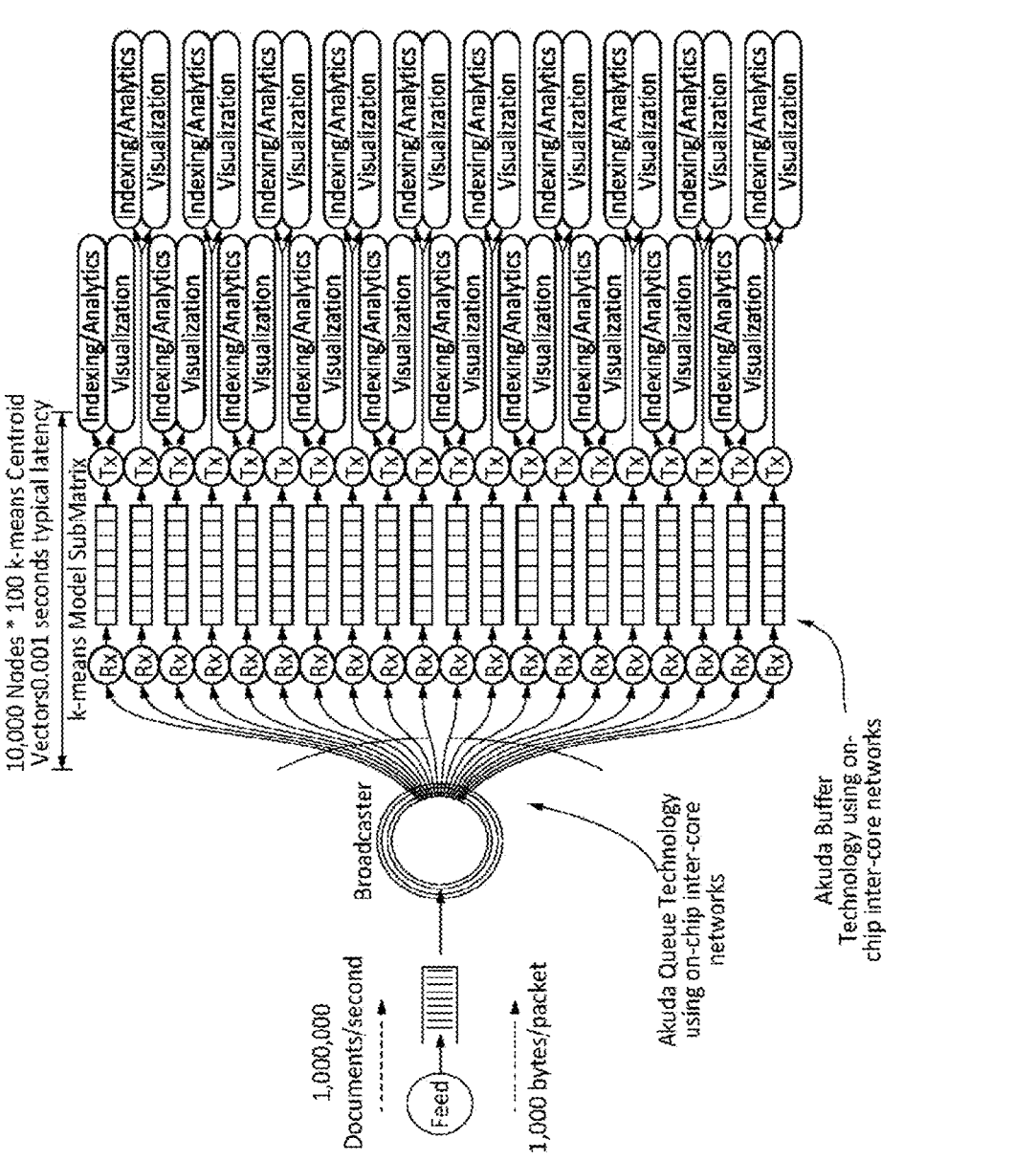
FIG. 69 illustrates a process of broadcasting, receiving, and classifying documents for identification of high-value information, wherein the process is performed using an on-chip inter-core network, in accordance with some embodiments.
Figure 70:
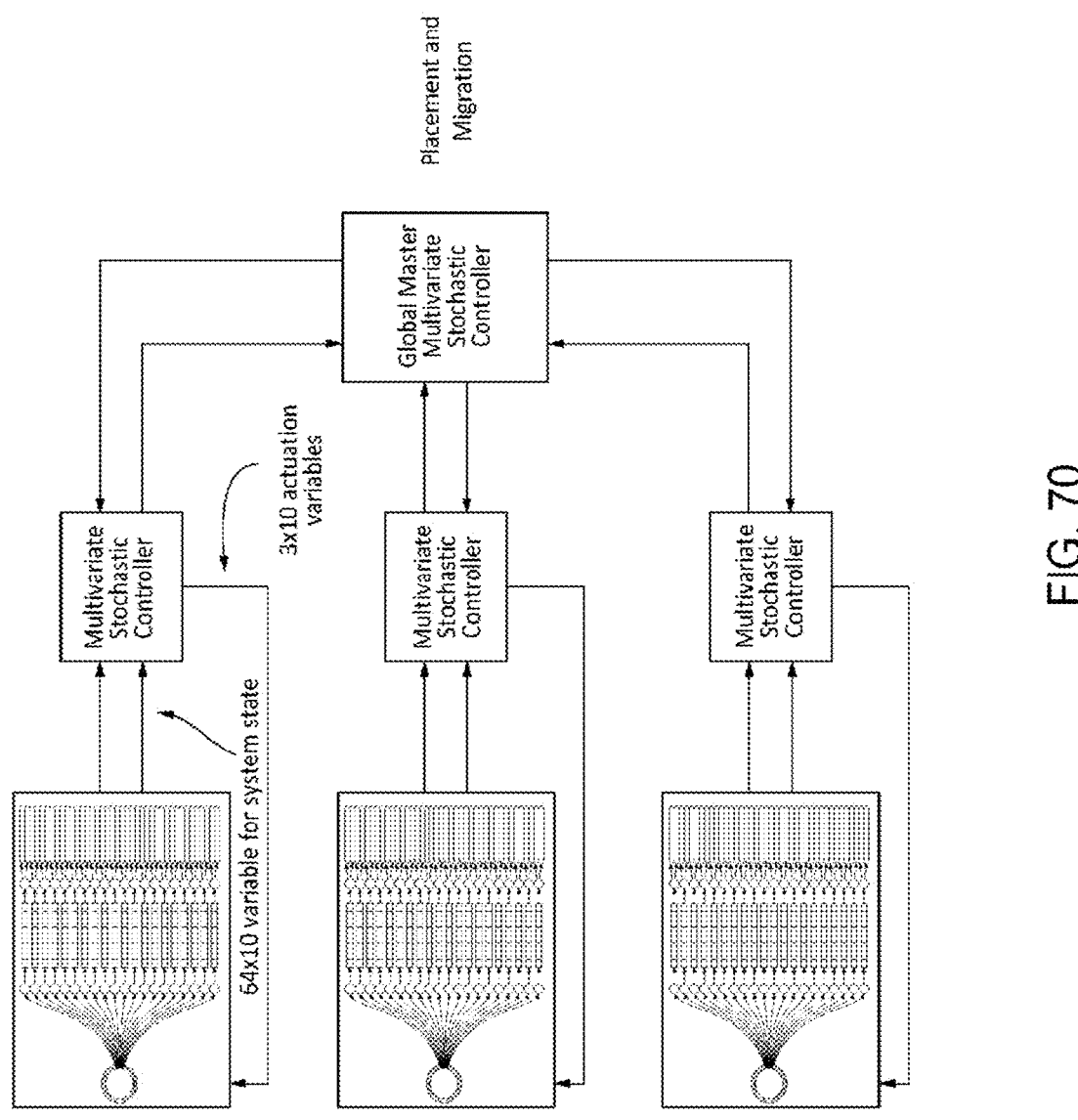
FIG. 70 illustrates parallelization of the process shown in FIG. 69 across a plurality of cores, in accordance with some embodiments.
Figure 71:
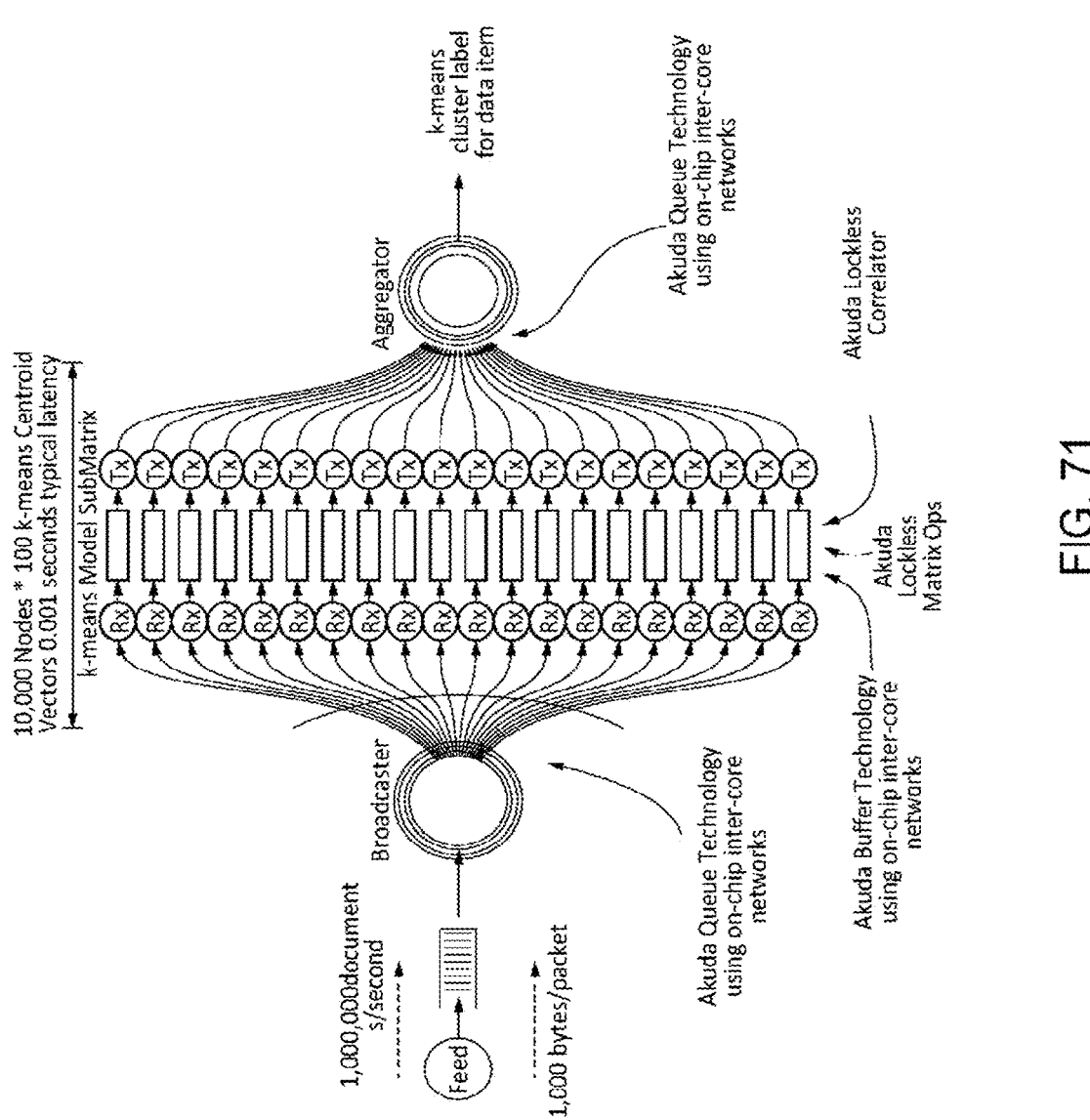
FIG. 71 illustrates a process analogous to that shown in FIG. 69, with the addition of an aggregation operation that makes use of k-means clustering, in accordance with some embodiments.

FIGS. 68 through 72 illustrate an architecture for identification of valuable information that can meet the scalability and latency requirements of monitoring the internet for high value information, in accordance with some embodiments. One key to this architecture is that the processes are parallelized such that portions of the broadcasting, receiving, and classification processes are performed in an inter-core manner, using a core architecture as shown in FIG. 68. Each core then handles an instance of the process shown in FIG. 69, which is performed using an entirely on-chip inter-core network. The results from many cores are combined as shown in FIG. 70. In some embodiments, as shown in FIG. 70, the on-chip processes also include an aggregation process, that uses k-means clustering to create a single processed data stream from the inter-core process that can easily be combined with similar processed data streams from other inter-core processes (as shown in FIG. 70).

In addition to being performed using the on-chip inter-core networks as described above, the architecture shown in FIGS. 68 through 71 obviates the need for document replication. Further, the following processes and operations are performed in a lock-free manner, dramatically reducing the latency of the monitoring system: queuing, pipeline control, correlation (e.g., with previously-obtained author information), and multithreading. The resulting system is scalable with a latency on the order of thousandths of a second.

Figure 72:
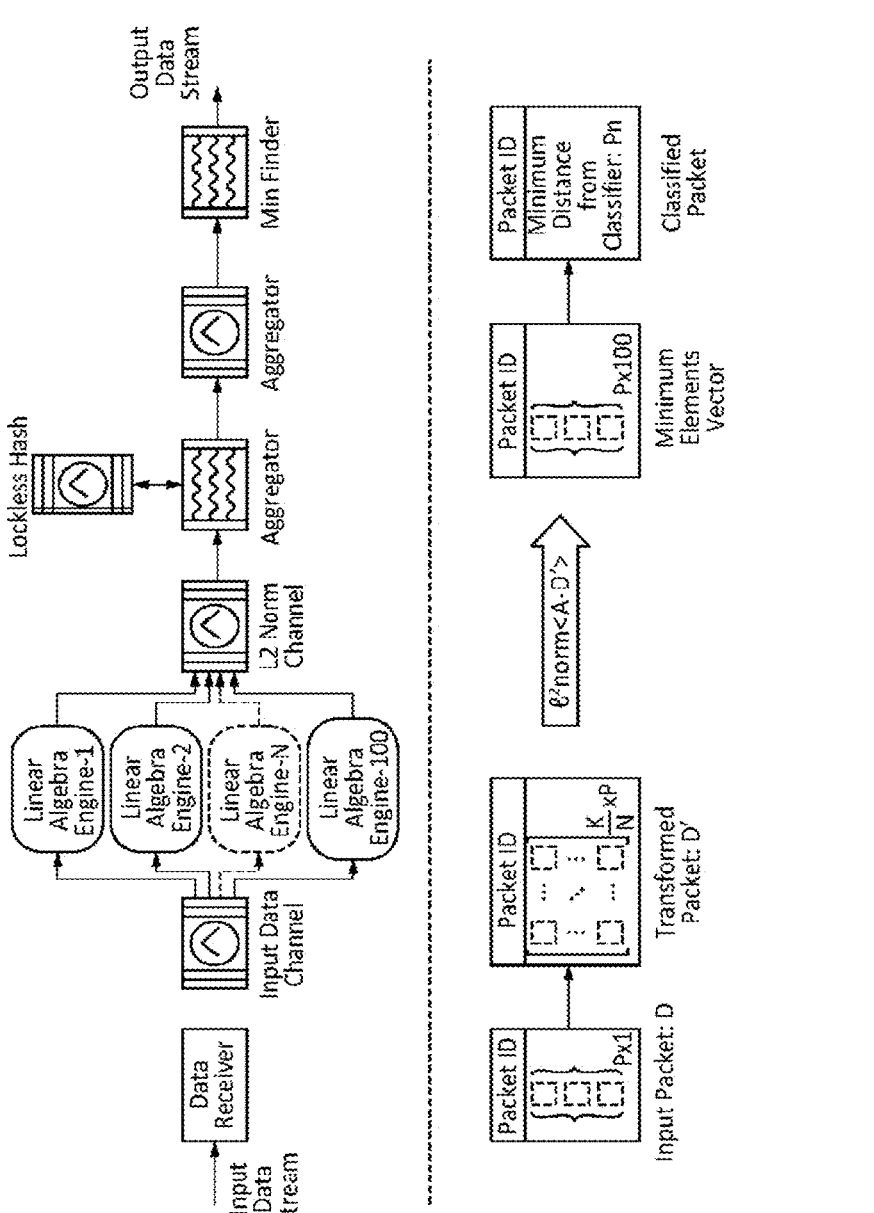
FIG. 72 illustrates a k-means clustering process for identifying high-value information from the internet, as described above, in accordance with some embodiments.

FIG. 72 illustrates a k-means clustering process for identifying high-value information from the internet, as described above, in accordance with some embodiments. As used herein, k-means clustering is a method of vector quantization, originally from signal processing, that is popular for cluster analysis in data mining. To that end, the k-means clustering process used herein aims to partition n document into k clusters in which each document belongs to the cluster with the nearest mean, serving as a prototype of the cluster. Typical values for this system include K=100, 000, where K is the number of clusters, N=100, where N is the number of processors, and P=1,000, where P is the cardinality of the feature set.

Figure 73:
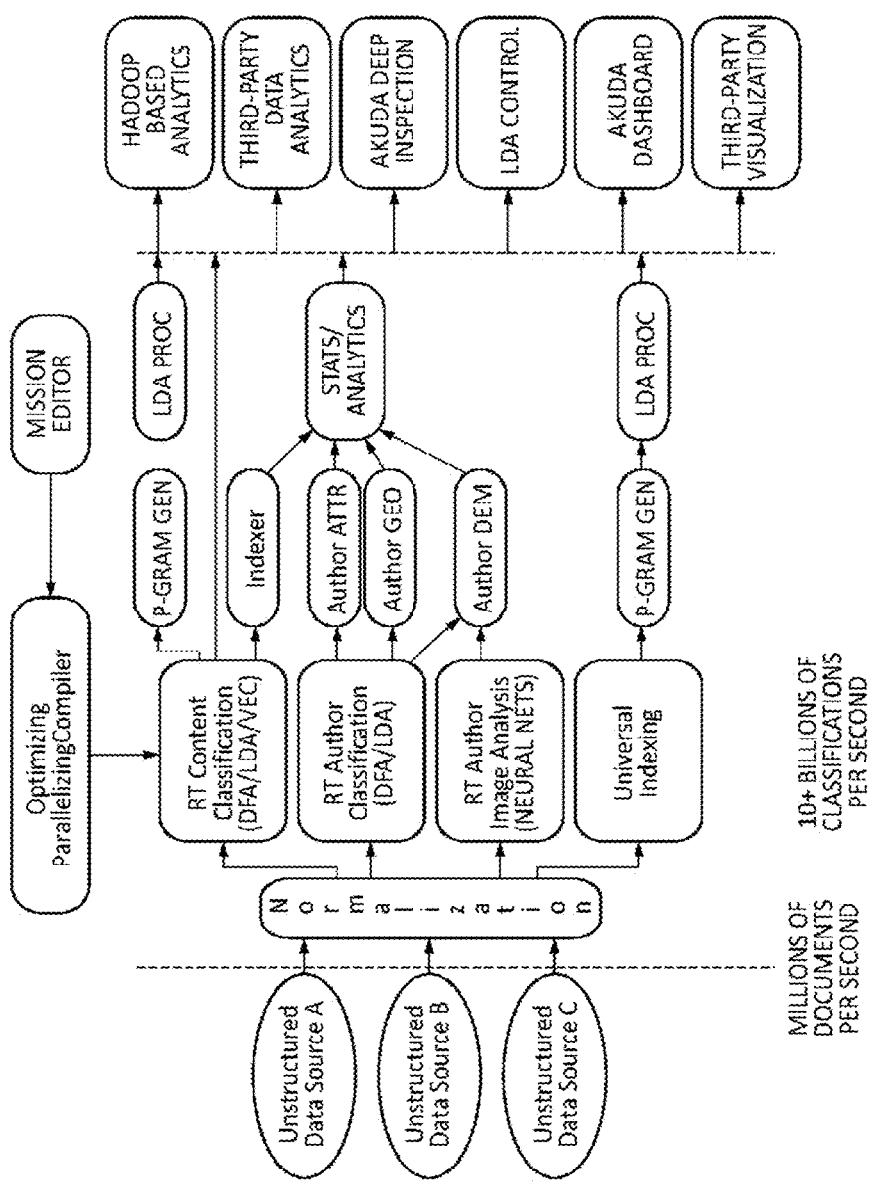
FIG. 73 illustrates a functional view of a system for monitoring information from the internet, in accordance with some embodiments.

FIG. 73 illustrates a functional view of a system for monitoring information from the internet, in accordance with some embodiments. Thus, the system shown in FIG. 73 illustrates the potential capabilities of, for example, the architecture shown in FIG. 60 through FIG. 62 with the additional details described with reference to FIG. 68 through 72. For example, the system shown in FIG. 73 can perform real-time (RT) classification of documents (e.g., posts, packets) using deterministic finite automata (DFAs), latent Dirichlet allocation (LDA), and vector analysis (VEC), real-time author classification using DFA and/or LDA, real-time image analysis using neural nets, and index and store all data received. Various front-ends are provided for editing missions, analytics, LDA control, visualization, and the like.

Figure 74:
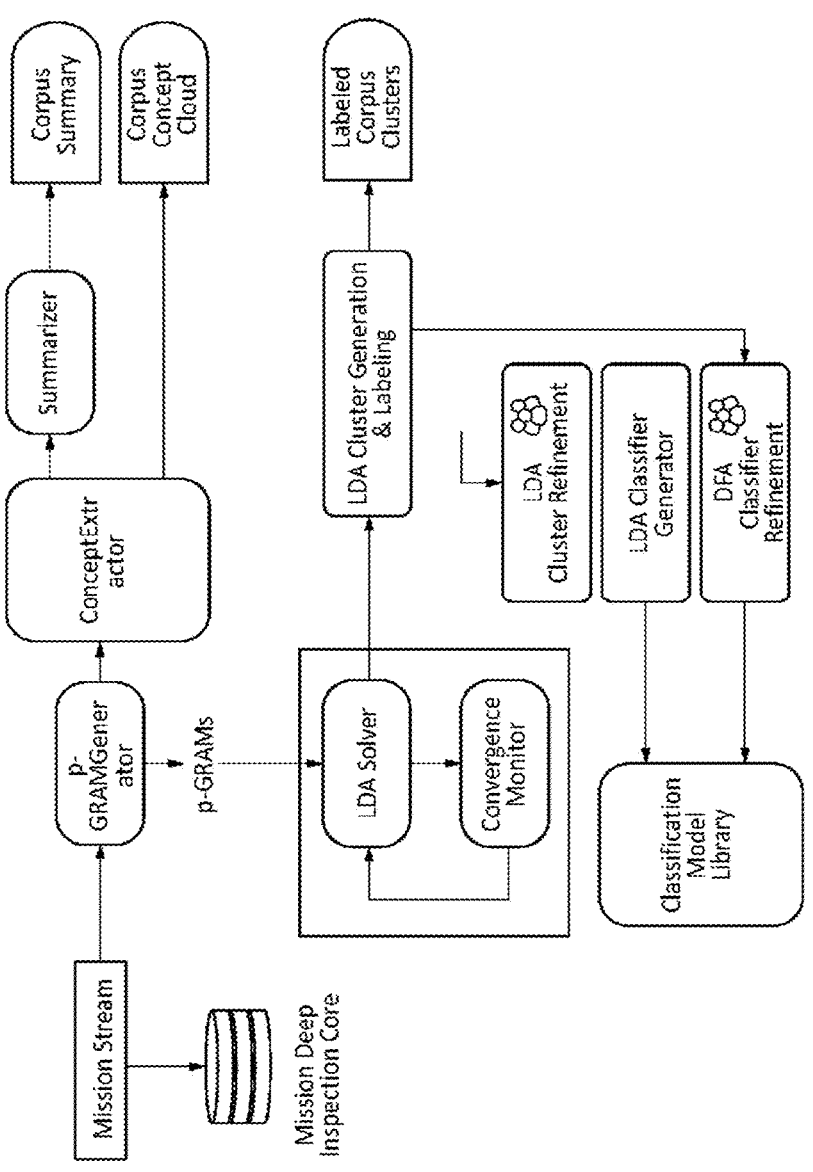
FIG. 74 illustrates a schematic representation of a real-time topic discovery, clustering, and summarization process implemented using the system architectures described herein.

FIG. 74 illustrates a schematic representation of a real-time topic discovery, clustering, and summarization process implemented using the system architectures described herein. In some embodiments, the real-time topic discovery, clustering, and summarization process is an LDA-based process, as described elsewhere in this document as well as U.S. patent application Ser. No. 14/688,865 entitled "Automatic Topic Discovery in Streams of Unstructured Data."

Figure 75:
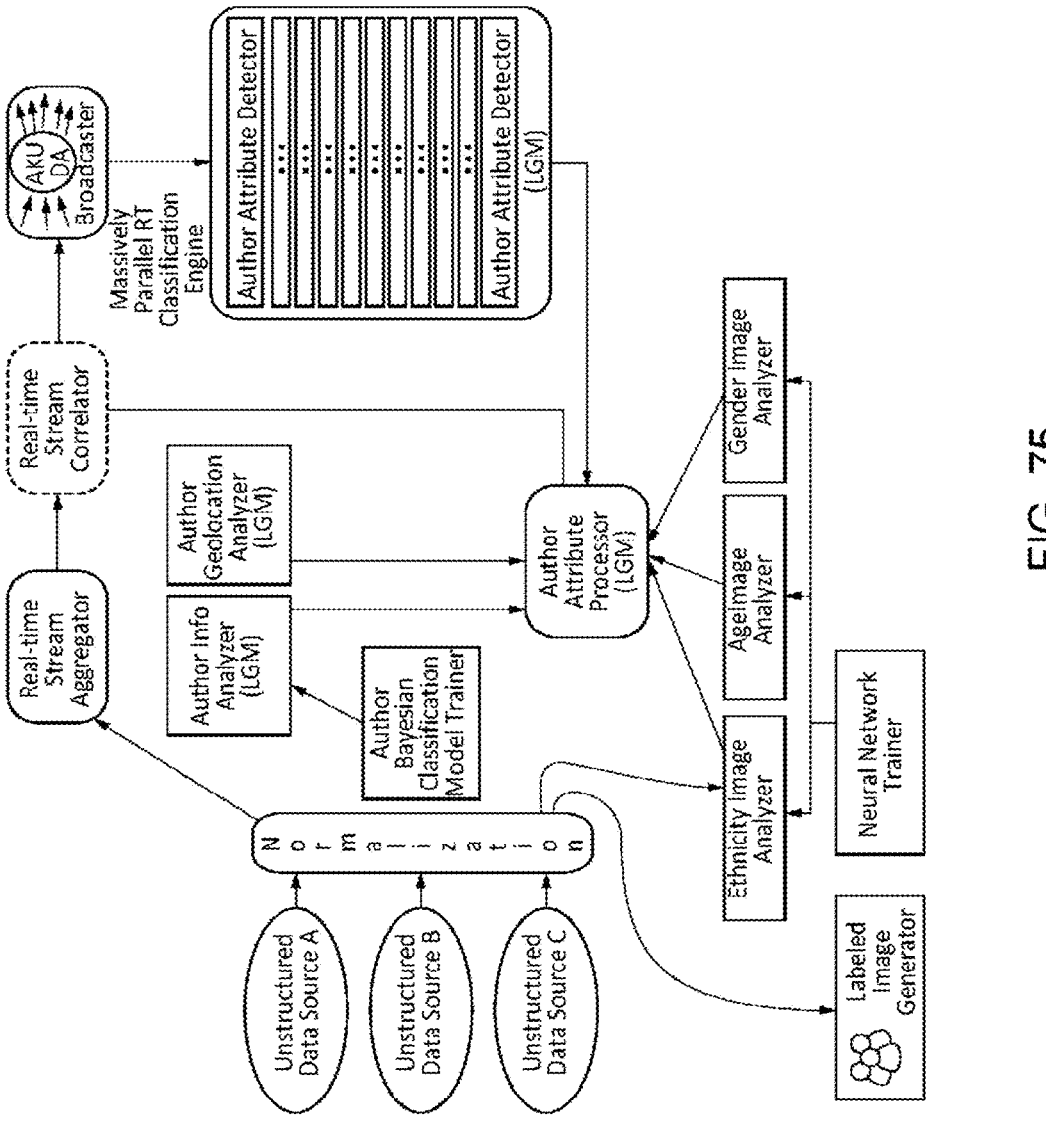
FIG. 75 illustrates an author attribute discovery and correlation process, in accordance with some embodiments.

FIG. 75 illustrates an author attribute discovery and correlation process, in accordance with some embodiments. Author attribute determination is described in more detail elsewhere in this document.

Figure 76:
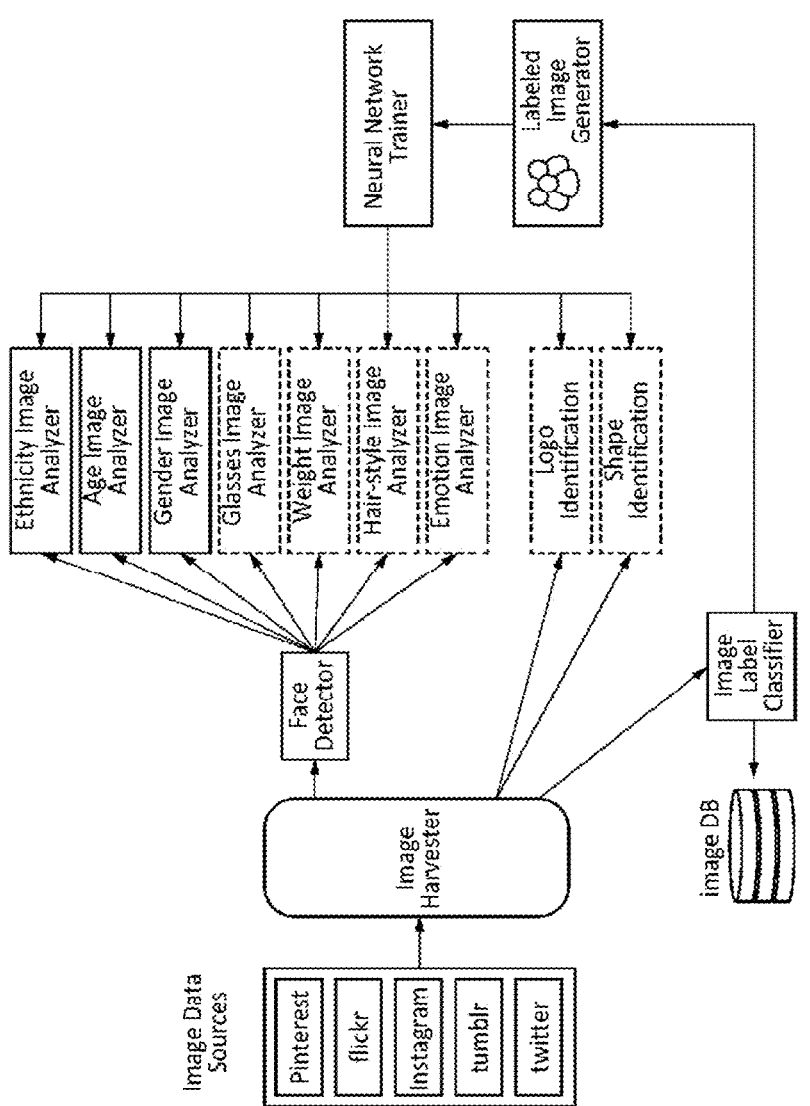
FIG. 76 illustrates a neural network-based author attribute discovery process, in which author attributes are discovered from image analysis, in accordance with some embodiments.

FIG. 76 illustrates a neural network-based author attribute discovery process, in which author attributes are discovered from image analysis, in accordance with some embodiments. Author attribute determination using neural network-based image analysis is described in more detail elsewhere in this document.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not the same type of electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

(Z1) In one aspect, some implementations include a method comprising: receiving a plurality of filter graph definitions, wherein each of the filter graph definitions includes a plurality of filter nodes arranged in a two-dimensional graph by a plurality of graph edges, each filter node being configured to accept or reject individual packets in a data stream based on content and/or metadata information associated with individual posts corresponding to the individual packets; performing a first set of operations on a single multi-core chip, the set of operations including: receiving first data stream with a plurality of first packets; in response to receiving the first data stream with the plurality of first packets, broadcasting each of the first packets to inputs of each of the executable filter graph definitions; classifying, using each of the executable filter graph definitions, respective ones of the first packets with high value information according to the respective filter graph definition, based on parallel execution of the filter nodes included in the respective filter graph definition.

(Z2) In some implementations of the method of (Z1), further including aggregating the results of the classifying to create a single processed data stream from the first set operations.

(Z3) In some implementations of the method of (Z2), wherein the aggregating includes k-means clustering.

(Z4) In some implementations of the method of (Z1)-(Z3) wherein, prior to broadcasting each of the first packets to inputs of each of the executable filter graph definitions, queuing, in a lock-free manner, the first packets, wherein queuing the first packets includes performing pipeline control on the first packets.

(Z5) In some implementations of the method of (Z1)-(Z4), wherein, for each of the first packets, prior to broadcasting a respective first packet: in real time, in a lock-free manner, correlating the packet with information from a source profile to produce a correlated content packet.

(Z6) In some implementations of the method of (Z5), wherein the source profile is a profile corresponding to an author of the respective first packet.

(Z7) In some implementations of the method of (Z6), wherein the source profile includes an attribute of the author of the respective packet that has been automatically determined from previously processed packets corresponding to the author.

(Z8) In some implementations of the method of (Z1)-(Z7), wherein the two dimensional graph is a directed graph.

(Z9) In some implementations of the method of (Z1)-(Z8), wherein each filter node is configured to accept or reject individual packets in a data stream based on the relevance of content and/or metadata information associated with individual posts corresponding to the individual packets to a respective interest associated with the filter node.

(Z10) In some implementations of the method of (Z1)-(Z9), wherein each of the filter nodes includes one or more accept or reject filters at least partially embodied as regular expressions, wherein the reject filters are configured to reject packets based on the content and/or metadata information associated with the individual packets and the accept filters are configured to accept packets based on the content and/or metadata information associated with the individual packets.

(Z11) In some implementations a computer system comprising, one or more processors; and memory storing instructions that, when executed by the one or more processors, cause the one or more processors to perform the method of any of claims (Z1)-(Z 10).

(Z12) A non-transitory computer-readable storage medium storing instructions that, when executed by an electronic device with one or more processors, cause the one or more processors to perform the method of any of claims (Z1)-(Z10).

Sentiment Analysis

Sentiment Analysis is the classification of snippets (e.g., social media information processed by system 520 in general, and/or bouncer 513 in particular, of U.S. patent application Ser. No. 15/530,187, which is incorporated by reference herein in its entirety) according to the sentiment expressed in the social media post. In some implementations, there are four categories: Neutral, Positive, Negative, and Unknown. By classifying snippets into these four categories a mathematical understanding of the snippet's meaning can be derived. By using Lexical or Statistical analysis on snippets, sentiment analysis uses words to break down the semantic barrier and understand what sentiment the user is trying to convey.

In some implementations, a snippet is first classified as objective (neutral) or subjective (containing sentiment) according to the snippet's relation to the neutrals in a data set trained on neutral snippets. Then, the subjective snippets are classified as positive or negative according to the snippet's association to the pos/negs in the training set. The snippet is matched up against the positive/negative training sets. In some implementations, the snippet is categorized into the section with which the snippet has the most similarities, and if the snippet is equally similar to each section, then the classifier places the snippet into the category in which words most match the positive or negative training set. Finally, the snippets that failed to fit into the positive or negative categories are dumped into the "unknown" category.

In some implementations, a protocol for classifying snippets must be established before any snippets can be classified. Below are example criteria for classifying snippets:

(1) How the user feels. This is helpful in identifying slang between categories (e.g., "dirty" may generally be considered negative, but "ridin dirty" may be considered positive when talking about cars).

(2) Relevance toward the product (or any other object of analysis). This includes indirect relationships (e.g., references or experiences) and direct relationships (e.g., complaints or usage) to the product.

(3) Classification. Positive: expressing good for the user or the product; Neutral: informative, objective, or query; and Negative: the user expresses malicious/bad feelings or a problem with the product.

Examples of positive classification (being good for the user or the product) include: "the Camaro is awesome" or "Camaros are so cool!" Additionally, "I'm getting a Camaro!" "I want a Camaro so baaaad!" and "I get to drive the Camaro tomorrow!" are not usually considered positive, but the user feels good and this is good for the product so they are classified as positive under this example classification scheme.

Examples of neutral classification (if it is informative, objective, or a query) include: "I drove the Silverado down to Maine" "The Malibu is top in its class . . . " "where/how can I change my A/C on my Malibu?" On the other hand, snippets that contain the keyword, however do not involve any definite action (e.g., "hahaha no we are not going to bike there, we will take my white malibu") are not classified as neutral under this example classification scheme.

Examples of negative classification (if the user feels bad, expresses malicious intent, or has a problem with the product) include: "the new camaros are weak" "I would kill for a camaro" "My taillight is out . . . for the FIFTH TIME. see if I ever buy chevy again." "Having no A/C on a 67 malibu SUCKS." "I miss my old Silverado"

In some implementations, when training the classifiers, the trainer only considers what the snippet is saying, instead of what the user may mean, because the classifier may not be able to understand meaning. Instead, the classifier may only understand what is contained in the words of the snippet itself.

Additionally, snippets like: "I love my Silverado, but that ford truck is waaay sexier" would still be positive because it is saying positive things. Snippets like "Malibu mercy, my car, she so thirsty" are neutral. To a trainer it may be negative because the owner is explaining the Malibu is a gas guzzler, but the snippet is not SAYING anything negative. Therefore it is neutral for purposes of training classifiers. For example, if a classifier is trained based on deeper meanings, some words (e.g., "thirsty"), may take on negative connotations to the classifier (or vice versa). Thus the next time there is a snippet "Ridin the Malibu to Sonic #thirsty" this could be classified as negative based on the presence of "thirsty". When classifying snippets in the training set, it is important to consider the implications of potential misclassifications and mistakes.

In some implementations, when creating a classification model, the snippets that are used for training the model are taken from the missions (e.g., the missions in bouncer 536) to generate models for those same missions. This is done to make sure that the models are accurate for each particular mission. Furthermore, this ensures that the training set contains the language of the mission and can correctly classify those snippets. Additionally, it takes out multiple meanings of words. For example, if classifying the Chevy Malibu, the training set is more likely to contain snippets on Malibu the car, not Malibu Rum, Malibu Barbie, or the hard streets of Malibu, CA, as long as the snippets come from the Chevy Malibu mission. Each concept (car, rum, Barbie . . . ) uses a different set of words, tone, speech and style. By not considering the extraneous data (e.g., rum and Barbie-related snippets), the distinctions between each type of snippet that mentions Malibu become more clear.

In some implementations, the various implementations of sentiment analysis described herein are not required to be very accurate (e.g., over 90% accurate). Instead, it is important merely to be accurate enough to provide relevant and helpful information (e.g., information to help guide business decisions and/or lead to new opportunities). In some implementations, sentiment analysis provides a way for businesses to understand what their customers are saying in order to make better decisions and achieve a greater ROI. In some implementations, sentiment analysis in conjunction with aggregation of social media information allows companies to learn what customers are saying. Finally, sentiment analysis provides companies with the opportunity to interact and get involved with consumers, creating bonds that reinforce brand loyalty.

In some implementations, applications of sentiment analysis further include one or more of: Politics (provide news companies a sentiment grade on TWITTER/FACEBOOK/blogs; Capital Markets (provide companies an idea of where the markets are headed and whether people are optimistic or pessimistic); Brand Reputation Management (provide alarms to companies when potentially bad or good things are happening); and Comments (review comment pages/forums of products to give sentiment ratings in addition to consumer star ratings).

In some implementations, sentiment analysis provides more substantial and valuable insight when used in conjunction with other tools described in the related patent applications listed above. For example, using the word counts, some implementations use classified snippets to identify stopwords. Moreover, using topic discovery, some implementations discover new collections of meanings from positive phrases, negative phrases, or neutral ones, which uncovers concepts. Furthermore, with the application of context, using the author, the publisher, geotagging, and other demographic information, some implementations construct personas for companies (e.g., knowing what particular groups of people are saying and what they mean).

(L1) In one aspect, some implementations include a method for classifying data from a corpus of documents or posts from one or more data streams, comprising, at a computer system including a plurality of processors and memory storing programs for execution by the processors: receiving a plurality of data snippets from the corpus; filtering the plurality of data snippets into subsets of data snippets in accordance with one or more topics; comparing a first data snippet from a first subset with a first training set, wherein the first training set is associated with the first subset; classifying the first data snippet as objective or subjective in accordance with the comparison with the first training set; in accordance with a subjective classification for the first data snippet: (i) comparing the first data snippet with a second training set, wherein the second training set is derived from a subjectivity training scheme; and (ii) classifying the first data snippet as positive, negative, or unknown in accordance with the comparison of the first data snippet with the second training set.

(L2) In some implementations of the method (L1), the objective classification is associated with neutral user sentiment regarding a product or service associated with the corpus, and the subjective classification is associated with positive or negative user sentiment regarding the product or service associated with the corpus.

(L3) In some implementations of any of the methods (L1)-(L2), classifying the first data snippet as objective or subjective includes: determining whether the first data snippet has more similarities with objective or subjective snippets, respectively, in the first training set; and classifying the first data snippet in accordance with the determination.

(L4) In some implementations of any of the methods (L1)-(L3), classifying the first data snippet as positive or negative includes: determining whether the first data snippet has more similarities with positive or negative snippets, respectively, in the second training set; and classifying the first data snippet in accordance with the determination.

(L5) In some implementations of any of the methods (L1)-(L4), determining whether the first data snippet has more similarities with object or subject snippets includes: determining that the first data snippet is equally similar to both positive and negative data snippets in the second training set; and in accordance with the determination: (i) comparing words in the first data snippet to words in the data snippets in the second training set; and (ii) determining, based on the comparison, whether the first data snippet has more similarities with positive or negative snippets in the second training set.

(L6) In some implementations of any of the methods (L1)-(L5), classifying the first data snippet as unknown includes: determining that the first data snippet has no more similarities with positive snippets in the second training set than similarities with negative snippets in the second training set; and/or determining that the first data snippet has no similarities to a threshold of data snippets in the second training set.

(L7) In some implementations of any of the methods (L1)-(L6), the subjectivity training scheme is based on a prior classification of data snippets in the second training set as positive or negative based on subjectively determined user sentiment regarding a product or service associated with the corpus.

(L8) In some implementations of any of the methods (L1)-(L7), the subjectively determined user sentiment is based on (i) how a user feels about the product or service, (ii) a user's direct or indirect relationship to the product or service, and/or (iii) a positive, neutral, or negative user-derived classification of the product or service.

(L9) In some implementations of any of the methods (L1)-(L8), filtering the plurality of data snippets into subsets of data snippets in accordance with one or more topics is based on one or more of the filtering operations described in the methods (A1)-(Z12) and/or claims disclosed herein.

(L10) In some implementations, an electronic device comprising one or more processors and memory storing instructions that, when executed by the one or more processors, causes the one or more processors to perform any of the methods (L1)-(L9).

(L11) In some implementations, a non-transitory computer-readable storage medium storing instructions that, when executed by an electronic device with one or more processors, causes the one or more processors to perform any of the methods (L1)-(L10).

Notes Regarding the Disclosure

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not the same type of electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of classifying data streams in real-time, the method comprising:

receiving a data stream that includes a plurality of data packets;

segmenting each data packet of the plurality of data packets into a plurality of data segments;

calculating a L-2 norm for each data segment of the plurality of data segments for each data packet of the plurality of data packets;

based on the L-2 norm for each data segment of the plurality of data segments for each data packet of the plurality of data packets, clustering the plurality of data segments into a plurality of data clusters, wherein each of the plurality of data clusters comprises one or more data segments of the plurality of data segments;

aggregating the plurality of data clusters associated with each data packet of the plurality of data packets into a respective aggregated data cluster, wherein the aggregating is performed by multi-threaded aggregating processes;

using a lockless hash-map, computing a plurality of min-distance vectors associated with each respective aggregated data cluster associated with each data packet of the plurality of data packets in parallel and asynchronously, wherein each min-distance vector of the plurality of min-distance vectors corresponds to each data packet of the plurality of data packets;

sorting each respective min-distance vector in the plurality of min-distance vectors to compute a plurality of minimum distances for each respective data packet in the plurality of data packets, wherein the sorting is performed by multi-threaded sorting processes; and outputting, for each respective data packet of the plurality of data packets, the plurality of minimum distances that corresponds to the respective data packet.

2. The method of claim 1, further comprising:

while segmenting the respective data packet of the plurality of data packets, assigning a unique non-repeating packet identifier to the respective data packet, and annotating each respective data segment corresponding to the respective data packet with the unique non-repeating packet identifier; and while aggregating the plurality of data clusters, using the unique non-repeating packet identifier that the respective data segment is annotated with as a key for the lockless hash-map.

3. The method of claim 1, wherein a plurality of classifying engines is used in clustering the plurality of data segments.

4. The method of claim 3, further comprising: selecting a number of classifying engines in the plurality of classifying engines based on the received data stream and using a subset of the plurality of classifying engines to cluster the plurality of data segments.

5. The method of claim 3, wherein each classifying engine of the plurality of classifying engines is a Linear Algebra engine.

6. The method of claim 2, wherein clustering the plurality of data segments further includes:

training a classification model to compute centroids for K clusters in N dimensions, wherein K is a predetermined number of classification categories and N is a predetermined data-dimensionality for the data stream; and calculating the L2-norm for each data segment of the plurality of data segments using the computed centroids or a predetermined list of centroids.

7. The method of claim 6, wherein outputting the plurality of minimum distances further includes tabulating the plurality of minimum distances along with information related to the computed centroid of the clusters and the packet identifiers for the plurality of data packets.

8. The method of claim 1, wherein sorting to compute the plurality of minimum distances further includes identifying a respective min-distance vector of the plurality of min-distance vectors that corresponds to a respective data packet based on a packet identifier corresponding to the respective data packet and sorting the respective min-distance vector.

9. The method of claim 1, wherein aggregating the plurality of data clusters and sorting to compute the plurality of minimum distances are implemented as multi-threaded processes.

10. A system for classifying data streams in real-time, the system comprising:

a computing system with one or more processors and memory, the memory storing instructions that when executed by the one or more processors cause the computing system to:

receive a data stream that includes a plurality of data packets;

segment each data packet of the plurality of data packets into a plurality of data segments;

store the plurality of data segments in a first memory buffer, while continuing to receive data streams;

cluster the plurality of data segments into a plurality of data clusters, wherein the clustering includes:

read the plurality of data segments from the first memory buffer; and calculate a L-2 norm for each data segment of the plurality of data segments, wherein each data cluster of the plurality of data clusters comprises one or more data segments of the plurality of data segments;

store the plurality of data clusters to a second memory buffer;

aggregate the plurality of data clusters, using a lockless hash map, to compute a plurality of min-distance vectors in parallel and asynchronously, including by reading one or more data clusters of the plurality of data clusters from the second memory buffer, wherein the aggregating is performed by multi-threaded aggregating processes;

store the plurality of min-distance vectors to a third memory buffer, wherein each respective min-distance vector in the plurality of min-distance vectors corresponds to a data packet in the plurality of data packets, wherein the sorting is performed by multi-threaded sorting processes;

sort each respective min-distance vector in the plurality of min-distance vectors to compute a plurality of minimum distances for each respective data packet of the plurality of data packets, including by reading the plurality of min-distance vectors from the third memory buffer; and output, for each respective data packet of the plurality of data packets, the plurality of minimum distances that corresponds to the respective data packet.

11. The system of claim 10, wherein the instructions when executed by the one or more processors further cause the computing system to:

while segmenting the respective data packet of the plurality of data packets, assign a unique non-repeating packet identifier to the respective data packet, and annotating each respective data segment corresponding to the respective data packet with the unique non-repeating packet identifier; and while aggregating the plurality of data clusters, use the unique non-repeating packet identifier that the respective data segment is annotated with as a key for the lockless hash-map.

12. The system of claim 10, wherein a plurality of classifying engines is used in clustering the plurality of data segments.

13. The system of claim 12, wherein the instructions when executed by the one or more processors further cause the computing system to:

select a number of classifying engines in the plurality of classifying engines based on the received data stream and using a subset of the plurality of classifying engines to cluster the plurality of data segments.

14. The system of claim 12, wherein each classifying engine of the plurality of classifying engines is a Linear Algebra based engine.

15. The system of claim 11, wherein to cluster the plurality of data segments further includes to:

train a classification model to compute centroids for K clusters in N dimensions, wherein K is a predetermined number of classification categories and N is a predetermined data-dimensionality for the data stream; and calculate the L2-norm for each data segment of the plurality of data segments using the computed centroids or a predetermined list of centroids.

16. The system of claim 15, wherein to output the plurality of minimum distances further includes to tabulate the plurality of minimum distances along with information related to the computed centroid of the clusters and the packet identifiers for the plurality of data packets.

17. The system of claim 10, wherein to sort to compute the plurality of minimum distances further includes to identify a respective min-distance vector of the plurality of min-distance vectors that corresponds to a respective data packet based on a packet identifier corresponding to the respective data packet and sorting the respective min-distance vector.

18. The system of claim 10, wherein aggregating the plurality of data clusters and sorting to compute the plurality of minimum distances are implemented as multi-threaded processes.

19. A non-transitory computer readable storage medium storing a set of instructions, which when executed by a computing system with one or more processors cause the computing system to:

receive a data stream that includes a plurality of data packets;

segment each data packet of the plurality of data packets into a plurality of data segments;

calculate a L-2 norm for each data segment of the plurality of data segments for each data packet of the plurality of data packets;

based on the L-2 norm for each data segment of the plurality of data segments for each data packet of the plurality of data packets, cluster the plurality of data segments into a plurality of data clusters, wherein each of the plurality of data clusters comprises one or more data segments of the plurality of data segments;

aggregate the plurality of data clusters associated with each data packet of the plurality of data packets into a respective aggregated data cluster, wherein the aggregating is performed by multi-threaded aggregating processes;

using a lockless hash-map, compute a plurality of min-distance vectors associated with each respective aggregated data cluster associated with each data packet of the plurality of data packets in parallel and asynchronously, wherein each min-distance vector of the plurality of min-distance vectors corresponds to each data packet of the plurality of data packets; and sort each respective min-distance vector in the plurality of min-distance vectors to compute a plurality of minimum distances for each respective data packet in the plurality of data packets, wherein the sorting is performed by multi-threaded sorting processes; and output, for each respective data packet of the plurality of data packets, the plurality of minimum distances that corresponds to the respective data packet.

20. The system of claim 19, wherein to cluster the plurality of data segments further includes to:

train a classification model to compute centroids for K clusters in N dimensions, wherein K is a predetermined number of classification categories and N is a predetermined data-dimensionality for the data stream; and calculate the L2-norm for each data segment of the plurality of data segments using the computed centroids or a predetermined list of centroids.

* * * * *